US007924174B1

(12) United States Patent
Gananathan

(10) Patent No.: US 7,924,174 B1
(45) Date of Patent: Apr. 12, 2011

(54) SYSTEM FOR CONTROLLING A LIGHTING LEVEL OF A LAMP IN A MULTI-ZONE ENVIRONMENT

(75) Inventor: Ranjit Devanesan Gananathan, Richmond Hill (CA)

(73) Assignee: Cooper Technologies Company, Houston, TX (US)

(*) Notice: Subject to any disclaimer, the term of this patent is extended or adjusted under 35 U.S.C. 154(b) by 1334 days.

(21) Appl. No.: 11/420,561

(22) Filed: May 26, 2006

(51) Int. Cl.
*H04B 14/00* (2006.01)

(52) U.S. Cl. ........................................ 340/999; 315/149

(58) Field of Classification Search .................. 340/999; 315/149–159
See application file for complete search history.

(56) References Cited

U.S. PATENT DOCUMENTS

| | | | |
|---|---|---|---|
| 3,898,383 | A | 8/1975 | Herbits |
| 4,225,808 | A | 9/1980 | Saraceni |
| 4,233,545 | A | 11/1980 | Webster et al. |
| 4,305,006 | A | 12/1981 | Walthall et al. |
| 4,433,328 | A | 2/1984 | Saphir |
| 4,595,915 | A | 6/1986 | Close |
| 4,661,720 | A | 4/1987 | Cameron et al. |
| 4,663,521 | A | 5/1987 | Maile |
| 4,703,171 | A | 10/1987 | Kahl et al. |
| 4,719,363 | A | 1/1988 | Gallacher |
| 4,751,399 | A | 6/1988 | Koehring et al. |
| 4,792,731 | A | 12/1988 | Pearlman et al. |
| 4,843,283 | A | 6/1989 | Chen |
| 4,873,469 | A | 10/1989 | Young et al. |
| 5,142,199 | A | 8/1992 | Elwell |
| 5,293,097 | A | 3/1994 | Elwell |
| 5,357,170 | A | 10/1994 | Luchaco et al. |
| 5,406,173 | A | 4/1995 | Mix et al. |
| 6,628,091 | B2 | 9/2003 | Griffin et al. |
| 6,841,945 | B1 | 1/2005 | Elwell |
| 7,119,694 | B2 | 10/2006 | Ehlers |
| 2005/0024321 | A1 | 2/2005 | Tsai |
| 2007/0273509 | A1 | 11/2007 | Gananathan |
| 2007/0273539 | A1 | 11/2007 | Gananathan |

OTHER PUBLICATIONS

U.S. Appl. No. 11/420,597, Gananathan.

*Primary Examiner* — Jeffery Hofsass
(74) *Attorney, Agent, or Firm* — King & Spalding LLP

(57) ABSTRACT

System for controlling a lighting level of a lamp in a multi-zone environment.

20 Claims, 213 Drawing Sheets

169x71.2x37.8mm
(Original: 163x68x30mm)

CONFIGURATION DATA
3208a

| | |
|---|---|
| OFF DELAY | VALUE |
| PANIC ON TIME | VALUE |
| PANIC ENABLED | VALUE |
| POWER LOSS PRESET | VALUE |
| POWER ON STATE | VALUE |

FIG. 32b

DEVICE NAME - VERSION
3308a

| | |
|---|---|
| NODE ID | VALUE |
| APPLICATION | VALUE |
| PROTOCOL | VALUE |
| LIBRARY | VALUE |
| MANUFACTURER | VALUE |
| PRODUCT TYPE | VALUE |
| PRODUCT ID | VALUE |

FIG. 33b

DEVICE NAME - ALL SWITCH
3410a

NOT INCLUDED
ALL ON ONLY
ALL OFF ONLY
ALL ON AND OFF ONLY

FIG. 34b

| PANIC GROUP 1202 | |
|---|---|
| 1 : LIVINGROOM LIGHT | YES |
| 2 : HALL LIGHT | |
| 3 : BEDROOM LIGHT | YES |
| 4 : PORCH LIGHT | YES |
| 5 : FRONT DOOR | |
| 6 : KITCHEN LIGHT | |

FIG. 46b

AWAY GROUP
1402

| | |
|---|---|
| 1 : LIVINGROOM LIGHT | YES |
| 2 : HALL LIGHT | |
| 3 : BEDROOM LIGHT | YES |
| 4 : PORCH LIGHT | YES |
| 5 : FRONT DOOR | |
| 6 : KITCHEN LIGHT | |

FIG. 51b

13500

<table>
<tr><td>7</td><td>6</td><td>5</td><td>4</td><td>3</td><td>2</td><td>1</td><td>0</td></tr>
<tr><td colspan="8">Start (0x01)</td></tr>
<tr><td colspan="8">Length</td></tr>
<tr><td colspan="8">Command</td></tr>
<tr><td colspan="8">Data</td></tr>
<tr><td colspan="8">……</td></tr>
<tr><td colspan="8">Checksum</td></tr>
</table>

*Fig. 135a*

13502

<table>
<tr><td>7</td><td>6</td><td>5</td><td>4</td><td>3</td><td>2</td><td>1</td><td>0</td></tr>
<tr><td colspan="8">ACK (0x02)</td></tr>
</table>

*Fig. 135b*

13504

<table>
<tr><td>7</td><td>6</td><td>5</td><td>4</td><td>3</td><td>2</td><td>1</td><td>0</td></tr>
<tr><td colspan="8">NAK (0x03)</td></tr>
</table>

*Fig. 135c*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 1 | | | | | | | |
| Default | | | | | Size = 1 | | |
| Off Delay (minutes) | | | | | | | |

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 1 | | | | | | | |
| | | | | | Size = 1 | | |
| Off Delay (minutes) | | | | | | | |

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 2 | | | | | | | |
| Default | | | | | Size = 1 | | |
| Panic Mode On Time (seconds) | | | | | | | |

*Fig. 143*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 2 | | | | | | | |
| | | | | | Size = 1 | | |
| Panic Mode On Time (seconds) | | | | | | | |

*Fig. 144*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 3 | | | | | | | |
| Default | | | | | Size = 1 | | |
| Panic Mode Off Time (seconds) | | | | | | | |

*Fig. 145*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 3 | | | | | | | |
| | | | | | Size = 1 | | |
| Panic Mode Off Time (seconds) | | | | | | | |

*Fig. 146*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 6 | | | | | | | |
| Default | | | | | Size = 1 | | |
| Panic Mode Enable | | | | | | | |

*Fig. 147*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 6 | | | | | | | |
| | | | | | Size = 1 | | |
| Panic Mode Enable | | | | | | | |

*Fig. 148*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 7 | | | | | | | |
| Default | | | | | Size = 2 | | |
| New Lamp Burn In Time (MSB) | | | | | | | |
| New Lamp Burn In Time (LSB) | | | | | | | |

*Fig. 149*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 7 | | | | | | | |
| | | | | | Size = 2 | | |
| New Lamp Burn in time (MSB) | | | | | | | |
| New Lamp Burn in time (LSB) | | | | | | | |

*Fig. 150*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 8 | | | | | | | |
| Default | | | | | Size = 1 | | |
| Motion Sensor Enabled | | | | | | | |

*Fig. 151*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 8 | | | | | | | |
| | | | | | Size = 1 | | |
| Motion Sensor Enabled | | | | | | | |

*Fig. 152*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 9 | | | | | | | |
| Default | | | | | Size = 1 | | |
| Photo Sensor Enabled | | | | | | | |

*Fig. 153*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 9 | | | | | | | |
| | | | | | Size = 1 | | |
| Photo Sensor Enabled | | | | | | | |

*Fig. 154*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 10 | | | | | | | |
| Default | | | | | Size = 1 | | |
| Lock Time (minutes) | | | | | | | |

*Fig. 155*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 10 | | | | | | | |
| | | | | | Size = 1 | | |
| Lock Time (minutes) | | | | | | | |

*Fig. 156*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 11 | | | | | | | |
| Default | | | | | Size = 1 | | |
| Start To High Time (minutes) | | | | | | | |

*Fig. 157*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 11 | | | | | | | |
| | | | | | Size = 1 | | |
| Start To High Time (minutes) | | | | | | | |

*Fig. 158*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _SET = 0x04 | | | | | | | |
| Parameter Number = 12 | | | | | | | |
| Default | | | | | Size = 1 | | |
| Evacuation Time (minutes) | | | | | | | |

*Fig. 159*

| 7 | 6 | 5 | 4 | 3 | 2 | 1 | 0 |
|---|---|---|---|---|---|---|---|
| COMMAND_CLASS_CONFIGURATION = 0x70 | | | | | | | |
| CONFIGURATION _REPORT = 0x06 | | | | | | | |
| Parameter Number = 12 | | | | | | | |
| | | | | | Size = 1 | | |
| Evacuation Time (minutes) | | | | | | | |

*Fig. 160*

| 7 | 6 | 5 | 4 | 3 | 2 | 1 | 0 |
|---|---|---|---|---|---|---|---|
| COMMAND_CLASS_MANUFACTURER_SPECIFIC = 0x86 | | | | | | | |
| MANUFACTURER_SPECIFIC_REPORT = 0x05 | | | | | | | |
| Manufacturer ID 1 = 0x00 | | | | | | | |
| Manufacturer ID 2 = 0x79 | | | | | | | |
| Product Type ID 1 = 0x00 | | | | | | | |
| Product Type ID 2= Refer to Table 8 | | | | | | | |
| Product ID 1 = 0x00 | | | | | | | |
| Product ID 2 = Refer to Table 8 | | | | | | | |

*Fig. 161*

| 7 | 6 | 5 | 4 | 3 | 2 | 1 | 0 |
|---|---|---|---|---|---|---|---|
| COMMAND_CLASS_CONFIGURATION = 0x85 | | | | | | | |
| ASSOCIATION_SET = 0x01 | | | | | | | |
| Group Identifier | | | | | | | |
| Node ID 1 | | | | | | | |
| ... | | | | | | | |
| Node ID 3 | | | | | | | |

*Fig. 162*

| 7 | 6 | 5 | 4 | 3 | 2 | 1 | 0 |
|---|---|---|---|---|---|---|---|
| COMMAND_CLASS_ASSOCIATION = 0x85 | | | | | | | |
| ASSOCIATION_SET = 0x03 | | | | | | | |
| Group Identifier = 1 | | | | | | | |
| Max Nodes Supported = 231 | | | | | | | |
| Reports To Follow = 0 | | | | | | | |
| Node ID 1 | | | | | | | |
| Node ID 2 | | | | | | | |
| ... | | | | | | | |
| Node ID 231 | | | | | | | |

*Fig. 163*

| 7 | 6 | 5 | 4 | 3 | 2 | 1 | 0 |
|---|---|---|---|---|---|---|---|
| COMMAND_CLASS_ASSOCIATION = 0x85 | | | | | | | |
| ASSOCIATION_GROUPINGS_REPORT = 0x06 | | | | | | | |
| Supported Groups = 1 | | | | | | | |

*Fig. 164*

SYSTEM FOR CONTROLLING A LIGHTING LEVEL OF A LAMP IN A MULTI-ZONE ENVIRONMENT

CROSS REFERENCE TO RELATED APPLICATIONS

The present application is related to the following U.S. utility patent applications: 1) U.S. Ser. No. 11/420,524, filed on May 26, 2006; 2) U.S. Ser. No. 11/420,585, filed on May 26, 2006; and 3) U.S. Ser. No. 11/420,597, filed on May 26, 2006, the disclosures of which are incorporated herein by reference.

The present application is related to the following U.S. utility patent application Ser. No. 11/322,765, filed on Jan. 13, 2006; Ser. No. 11/332,673, filed on Jan. 13, 2006; Ser. No. 11/332,690, filed on Jan. 13, 2006; Ser. No. 11/332,073, filed on Jan. 13, 2006; Ser. No. 11/332,691, filed on Jan. 13, 2006; and Ser. No. 11/331,553, filed on Jan. 13, 2006; the disclosures of which are incorporated herein by reference.

BACKGROUND

The present disclosure relates in general to lighting and in particular to an electrical control system.

BRIEF DESCRIPTION OF THE DRAWINGS

FIGS. 32*a*-32*b* is a flow chart illustration of an exemplary embodiment of a method of configuring a device in the system.

FIGS. 33*a*-33*b* is a flow chart and schematic illustration of an exemplary embodiment of a method of viewing the version of a device in the system.

FIGS. 34*a*-34*b* is a flow chart illustration of an exemplary embodiment of a method of selecting a level of functionality for all switch operation of devices in the system.

FIGS. 46*a*-46*b* is a flow chart and schematic illustration of an exemplary embodiment of a method of configuring a panic group for the system.

FIGS. 51*a*-51*b* is a flow chart and schematic illustration of an exemplary embodiment of a method of editing an away group of the system.

FIG. 113 is a schematic illustration of an exemplary embodiment of the device database of the memory of the RF dimmer.

FIG. 114 is a flow chart illustration of an exemplary embodiment of a method of installation for the RF dimmer.

FIG. 115 is a flow chart illustration of an exemplary embodiment of a method of operating the RF dimmer.

FIG. 116 is a flow chart illustration of an exemplary embodiment of a method of operating the RF dimmer.

Figure 117A:
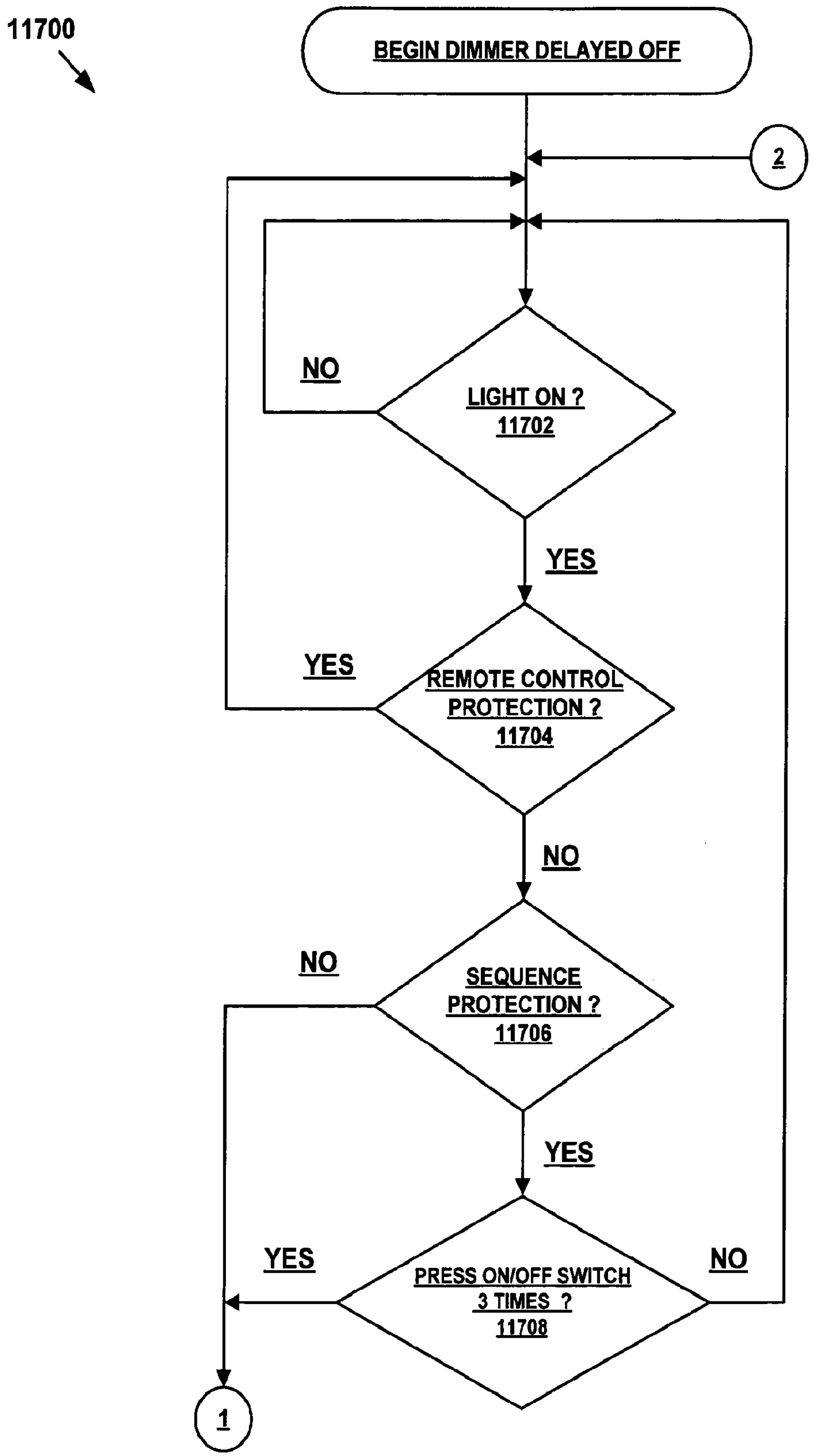
Figure 117B:
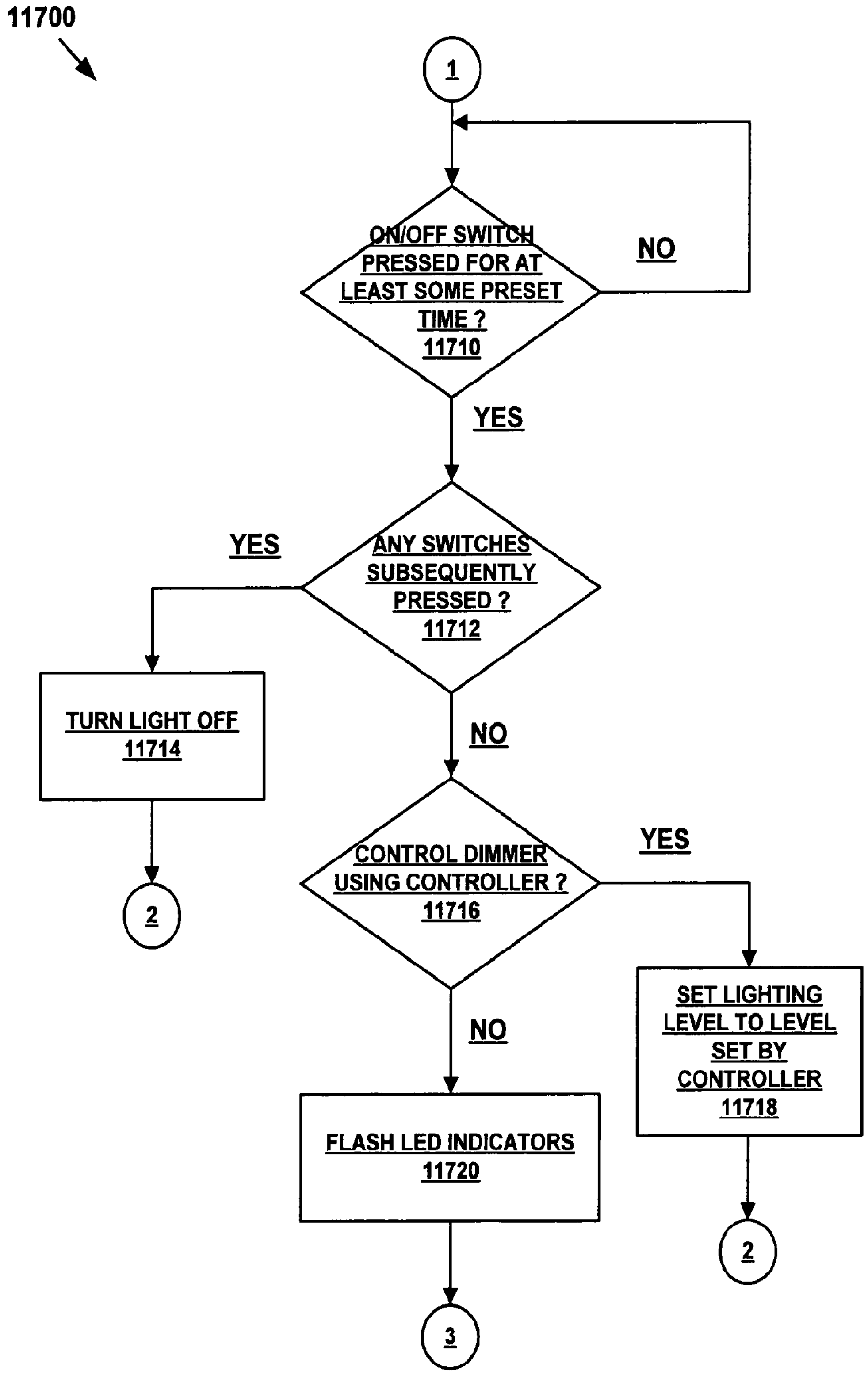
Figure 117C:
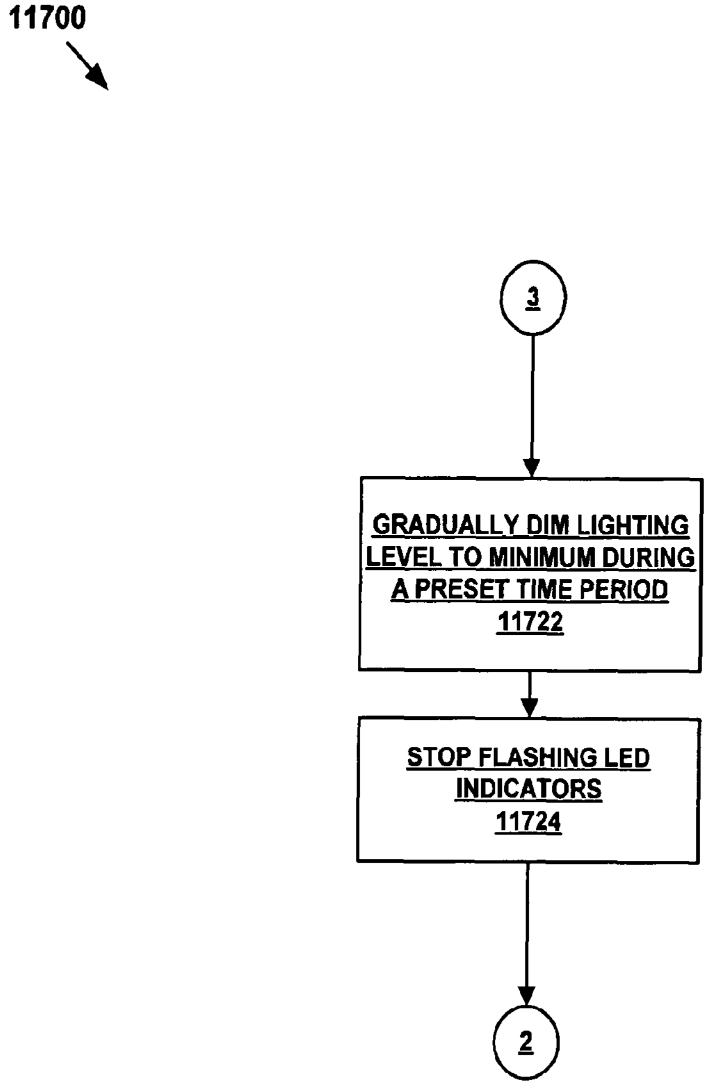

FIGS. 117*a* to 117*c* is a flow chart illustration of an exemplary embodiment of a method of delayed off for the RF dimmer.

Figure 118A:
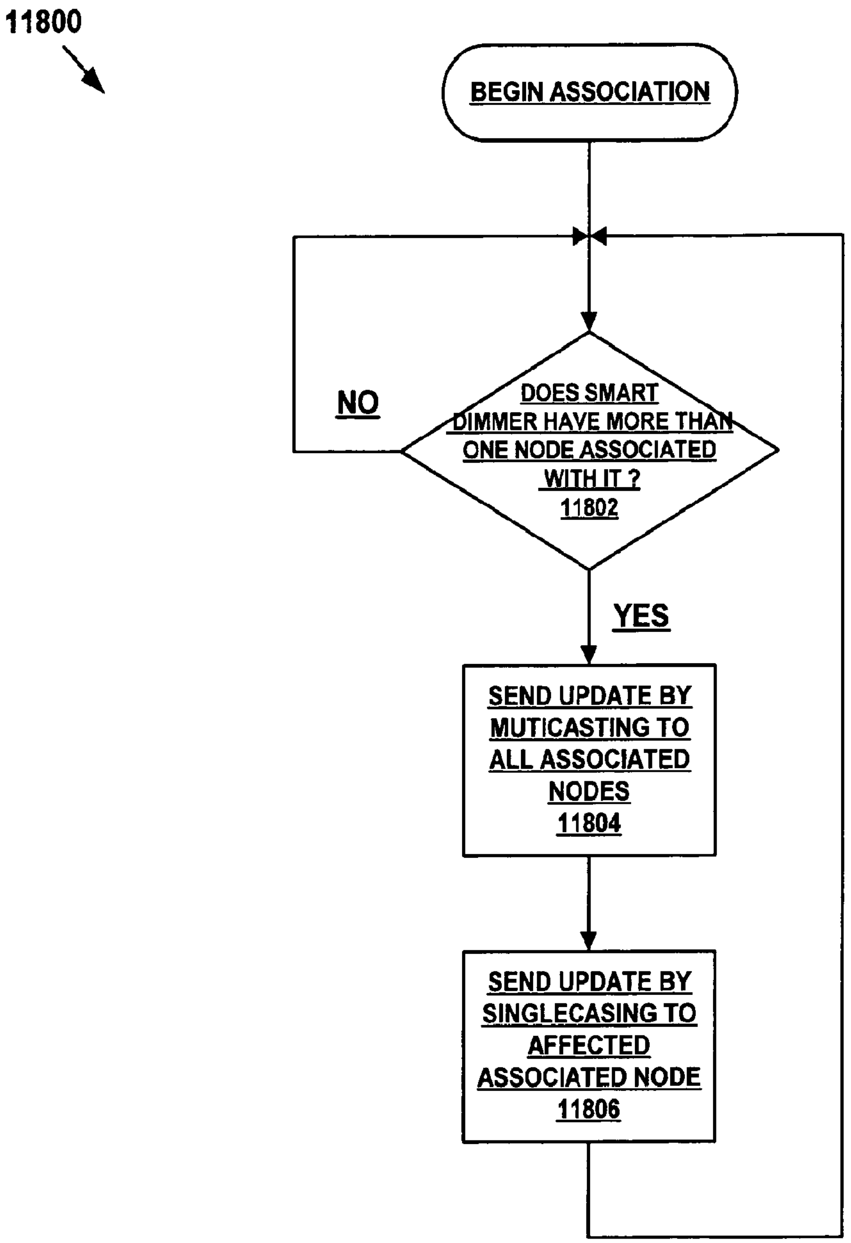
Figure 118B:
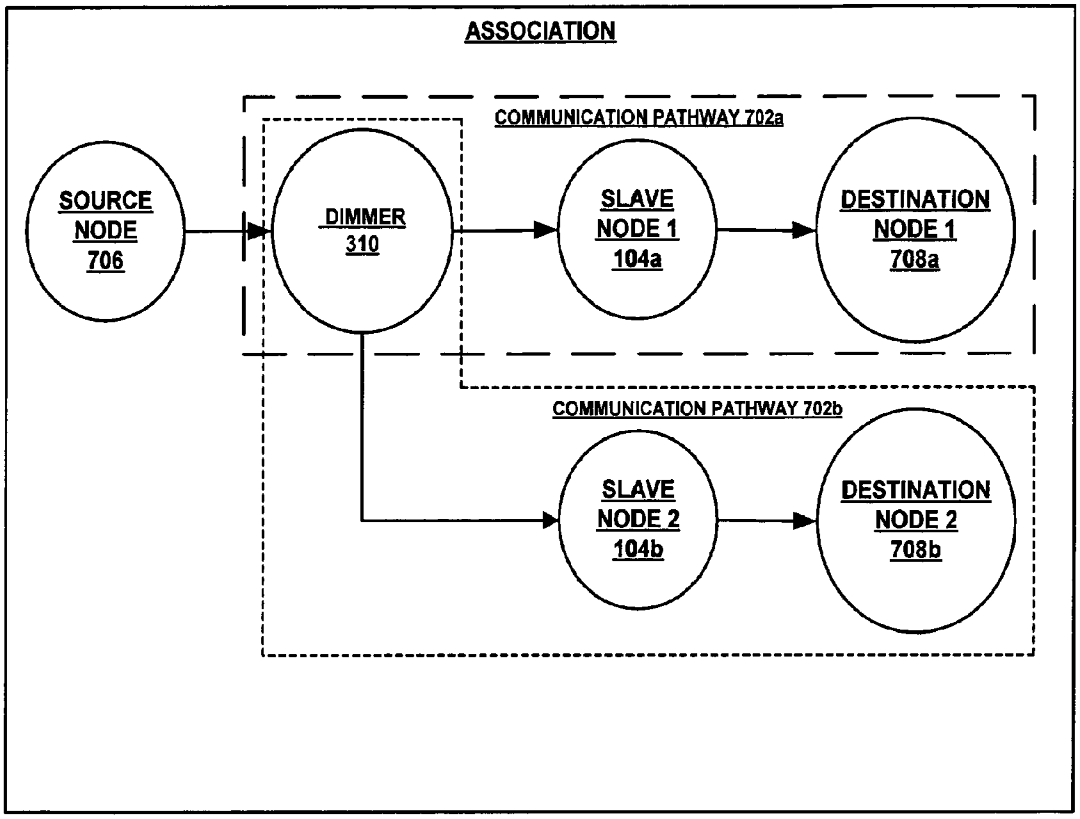

FIGS. 118*a* and 118*b* is a flow chart and schematic illustration of an exemplary embodiment of a method of association for the RF dimmer.

Figure 119:
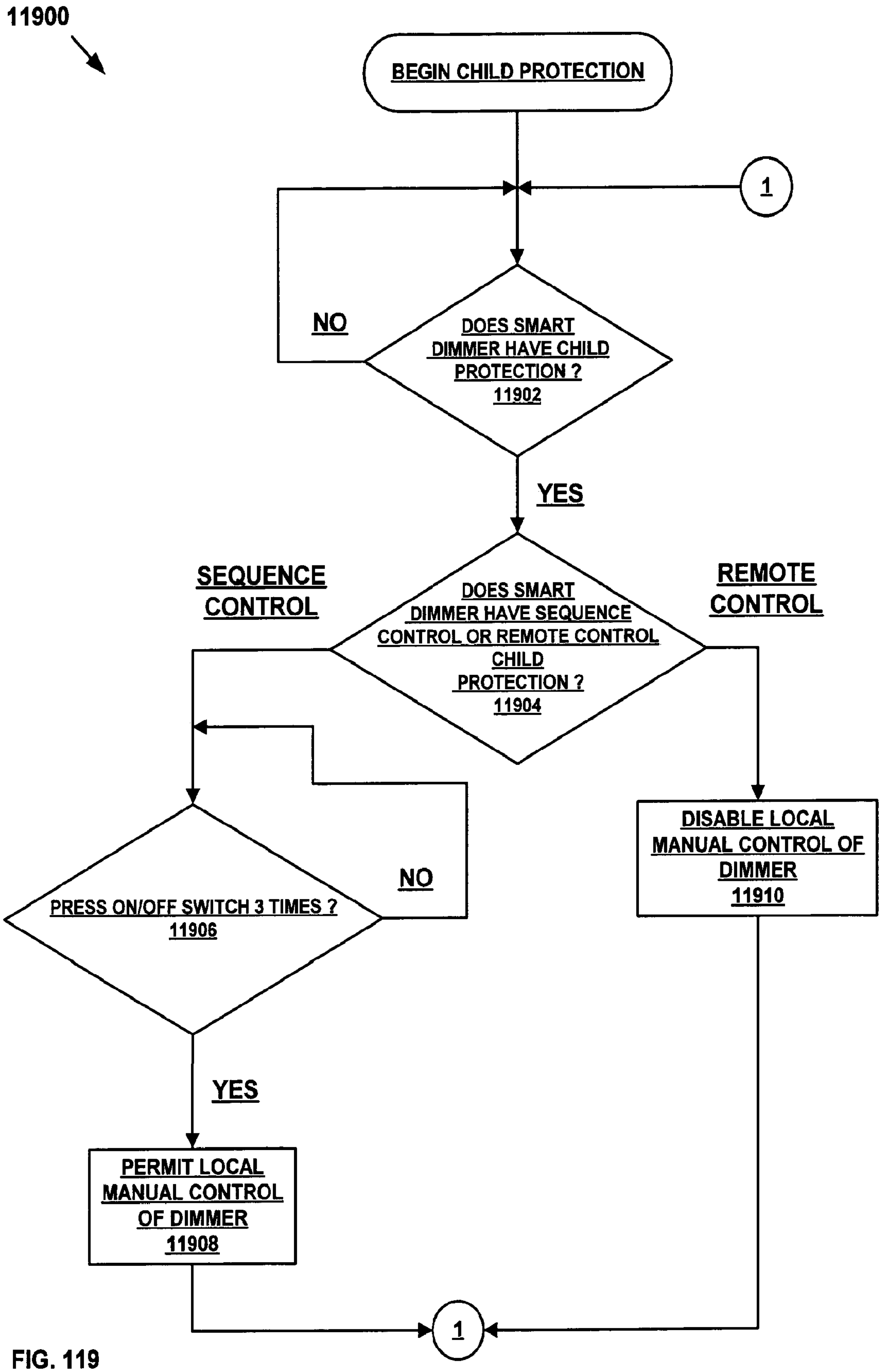

FIG. 119 is a flow chart illustration of an exemplary embodiment of a method of child protection for the RF dimmer.

Figure 120A:
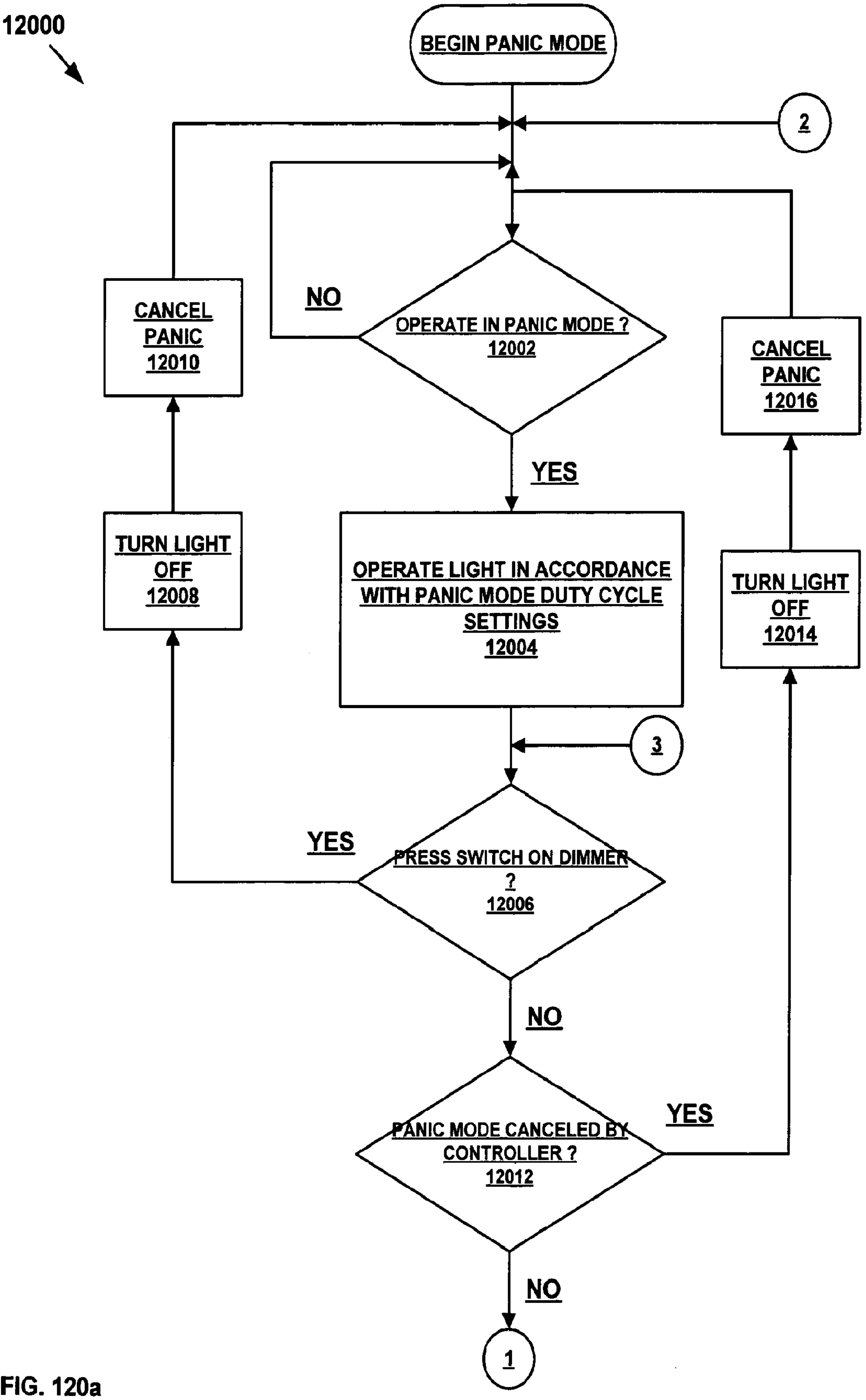
Figure 120B:
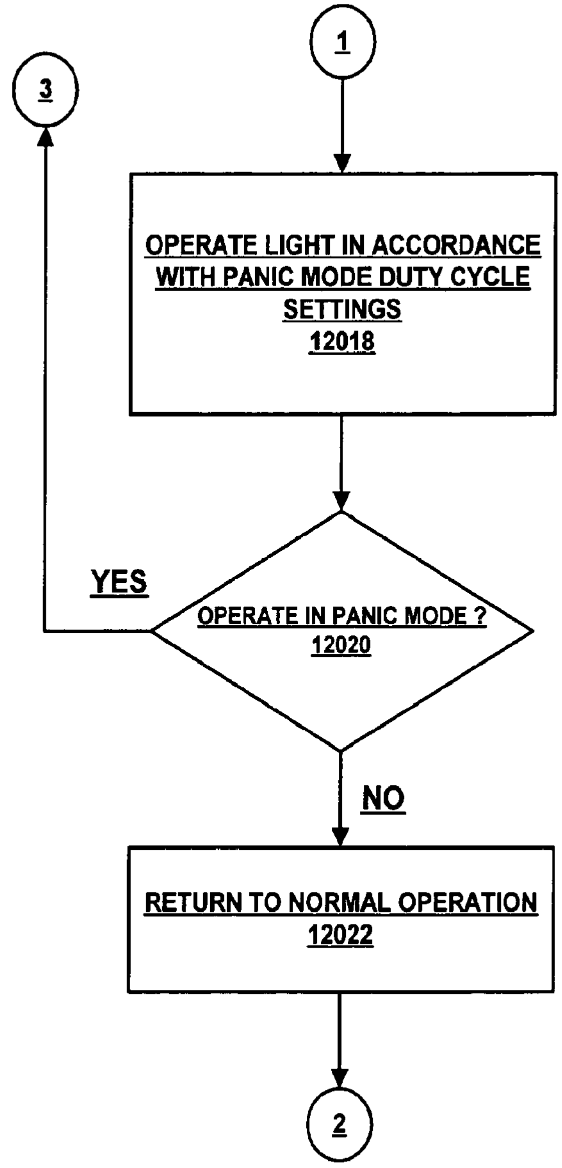

FIGS. 120*a* and 120*b* is a flow chart illustration of an exemplary embodiment of a method of panic mode for the RF dimmer.

Figure 121:
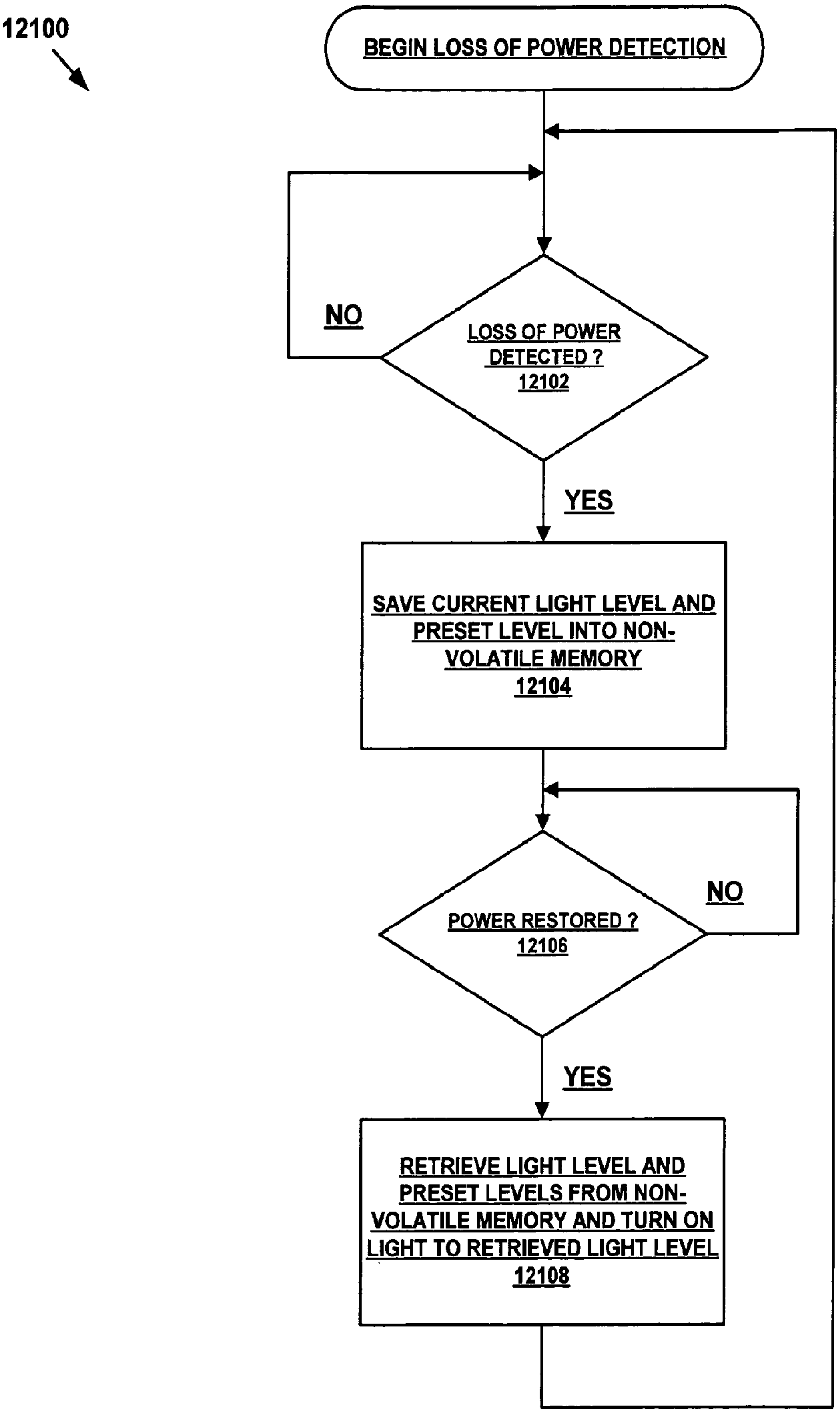

FIG. 121 is a flow chart illustration of an exemplary embodiment of a method of loss of power detection for the RF dimmer.

Figure 122:
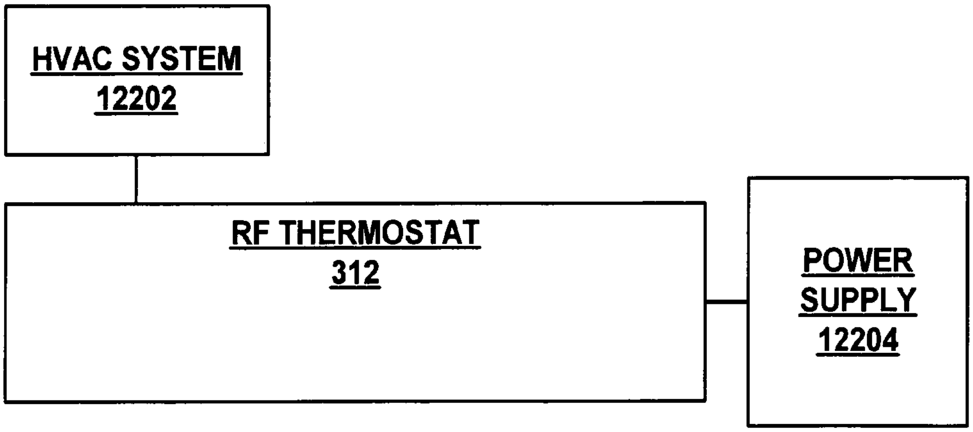

FIG. 122 is a schematic illustration of an exemplary embodiment of an RF thermostat.

Figure 123:
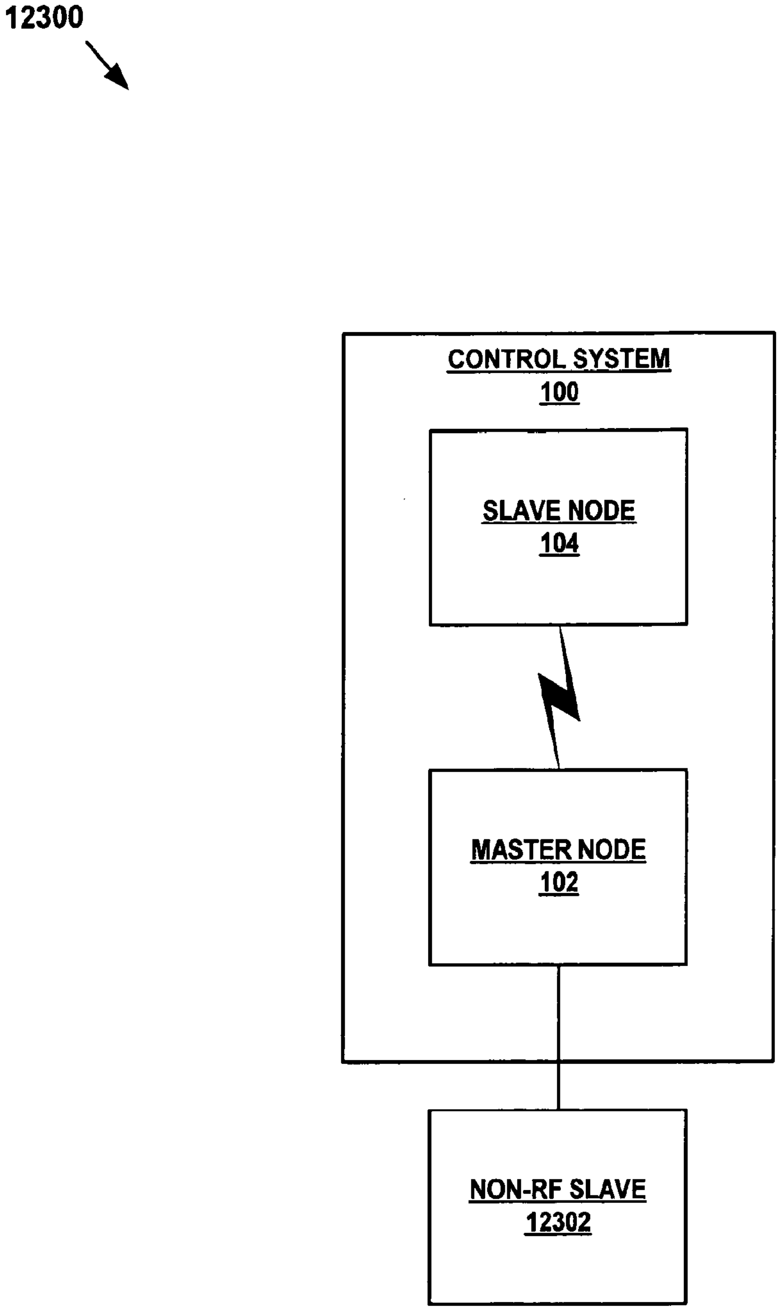

FIG. 123 is a schematic illustration of an exemplary embodiment of a control system.

Figure 124:
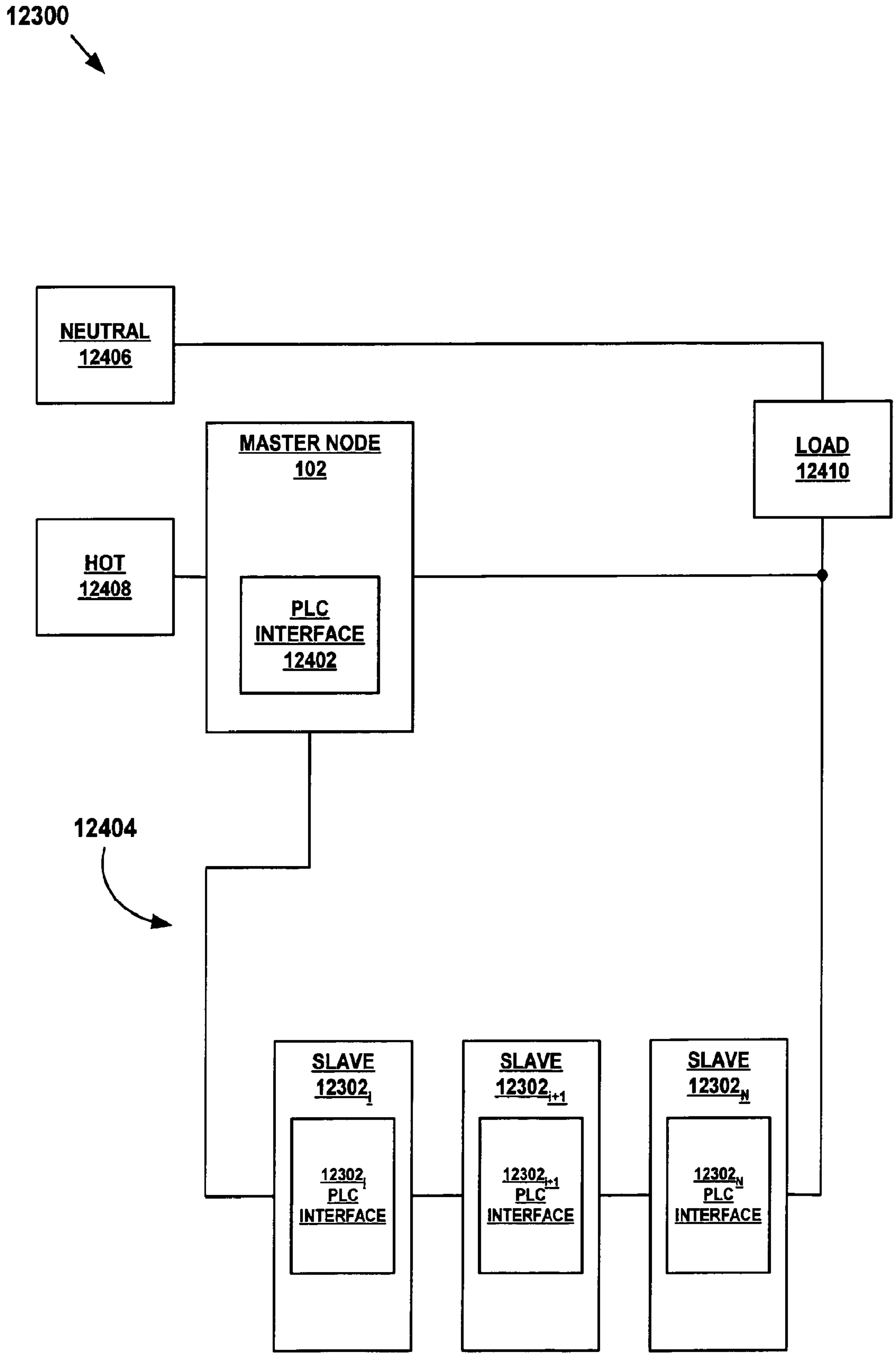

FIG. 124 is a schematic illustration of the system of FIG. 123.

Figure 125:
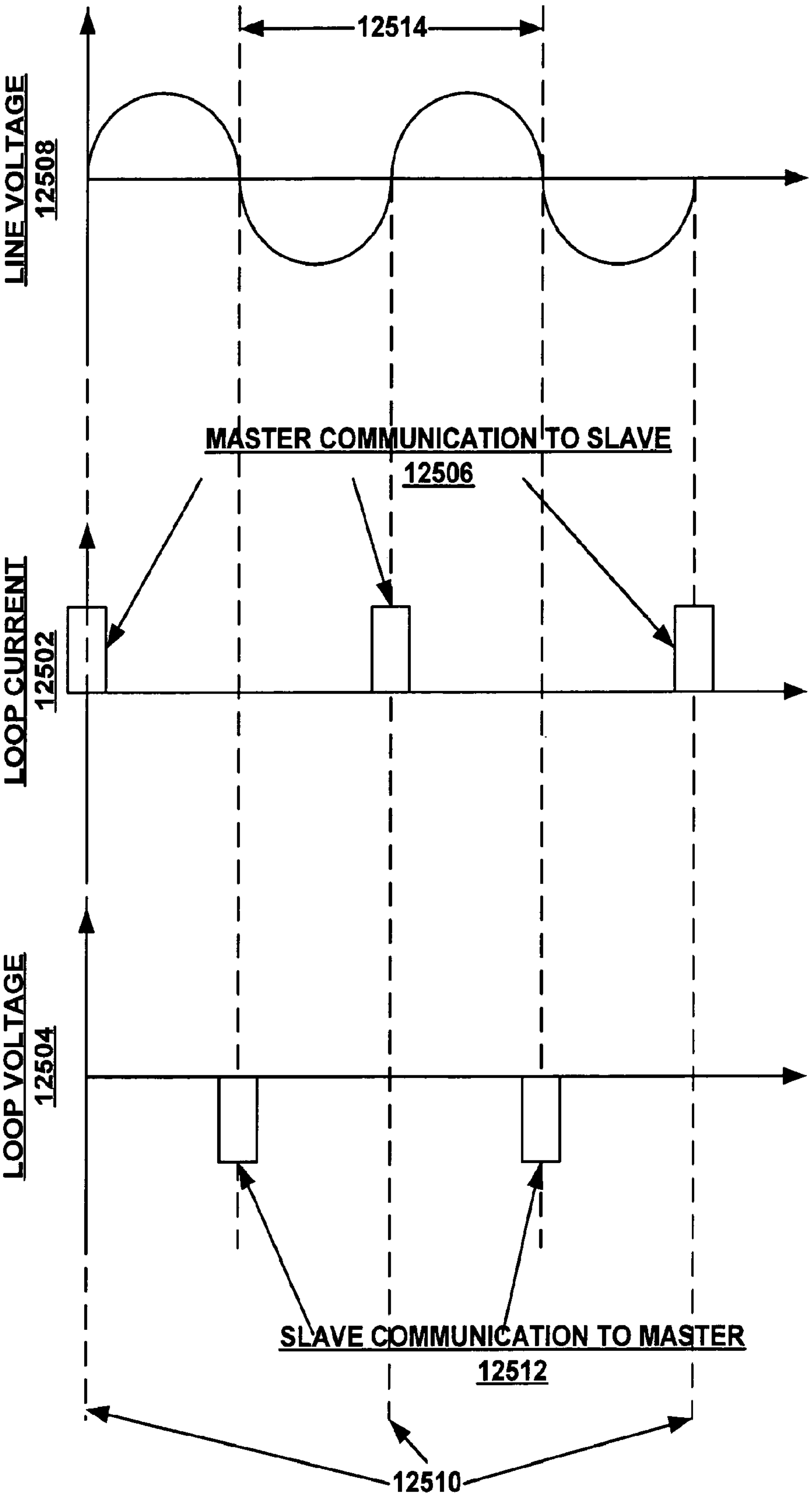

FIG. 125 is a graphical illustration of an exemplary embodiment of the operation of the system of FIG. 123.

Figure 126:
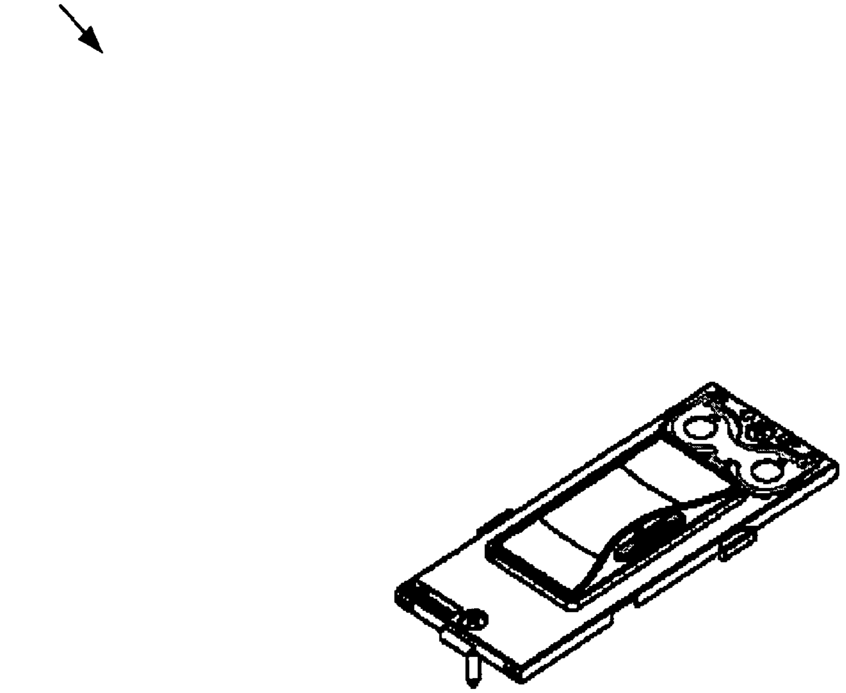

FIG. 126 is an illustration of an exemplary embodiment of a battery powered RF switch.

Figure 127:
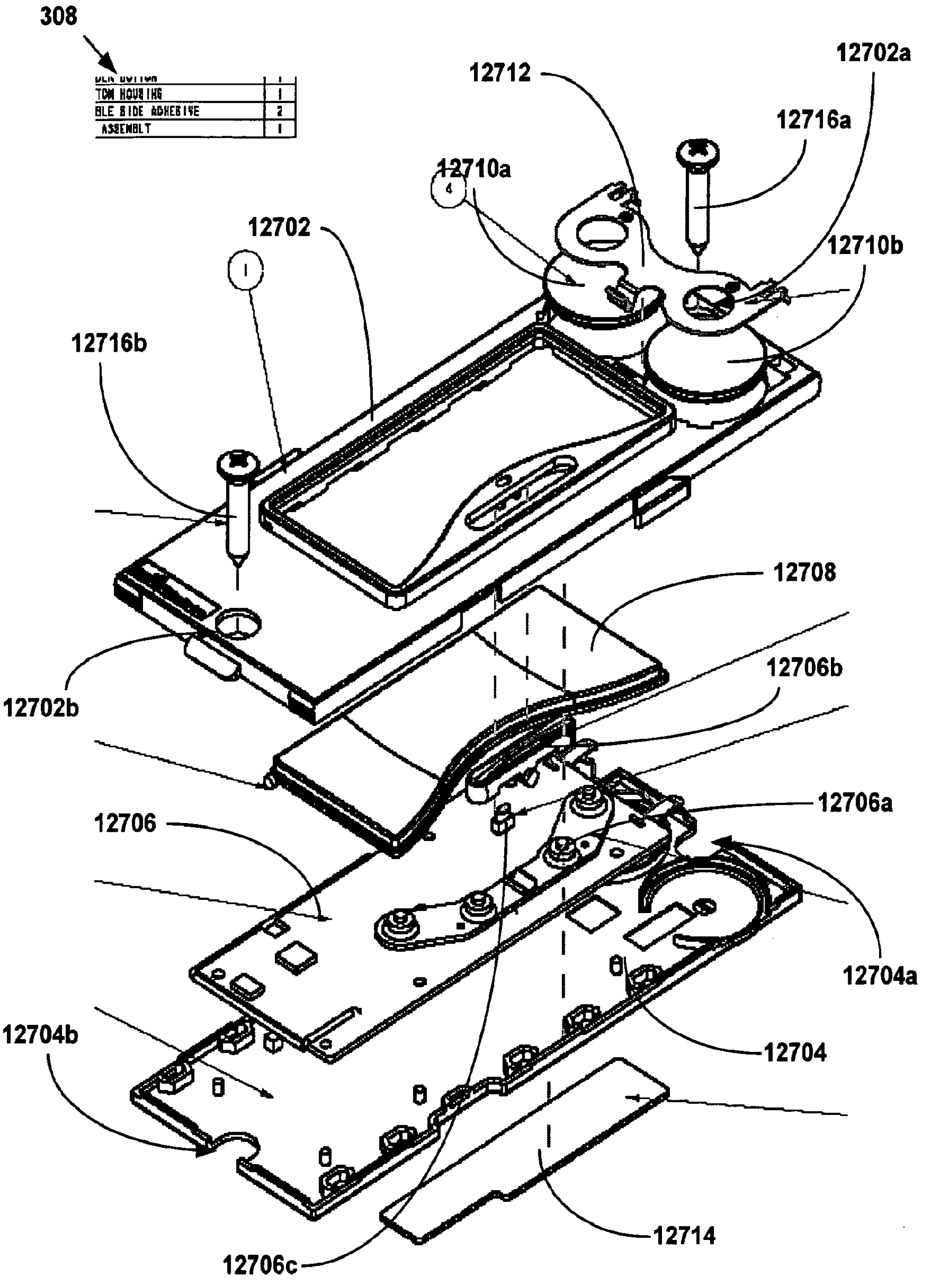

FIG. 127 is an exploded view of the battery powered RF switch of FIG. 126.

Figure 128:
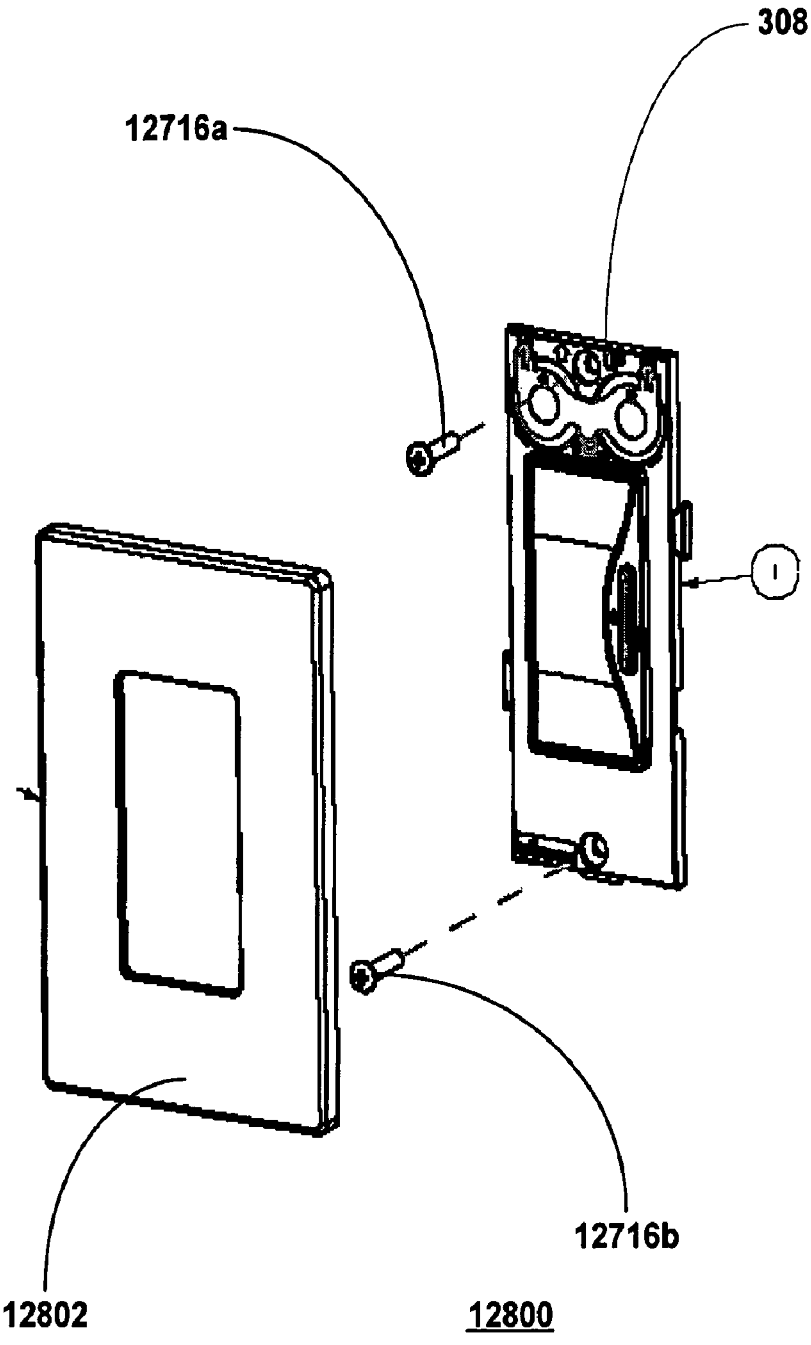

FIG. 128 is an exploded view of an exemplary embodiment of a method of mounting the battery powered RF switch of FIG. 126 on a surface.

Figure 129:
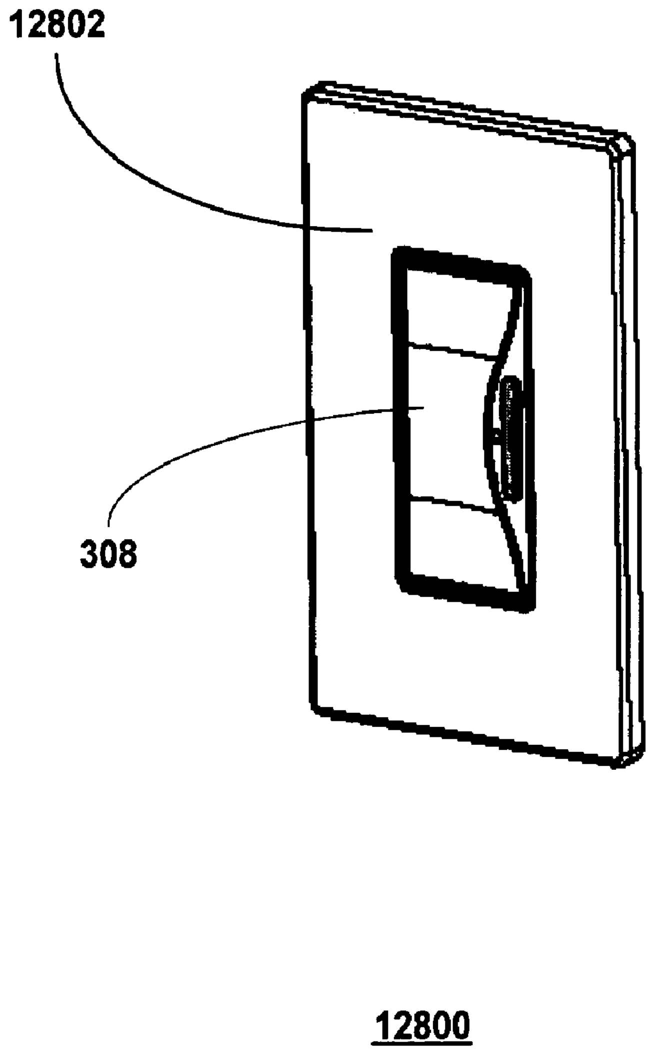

FIG. 129 is an illustration of an exemplary embodiment of the battery powered RF switch of FIG. 126 mounted onto a surface.

Figure 130:
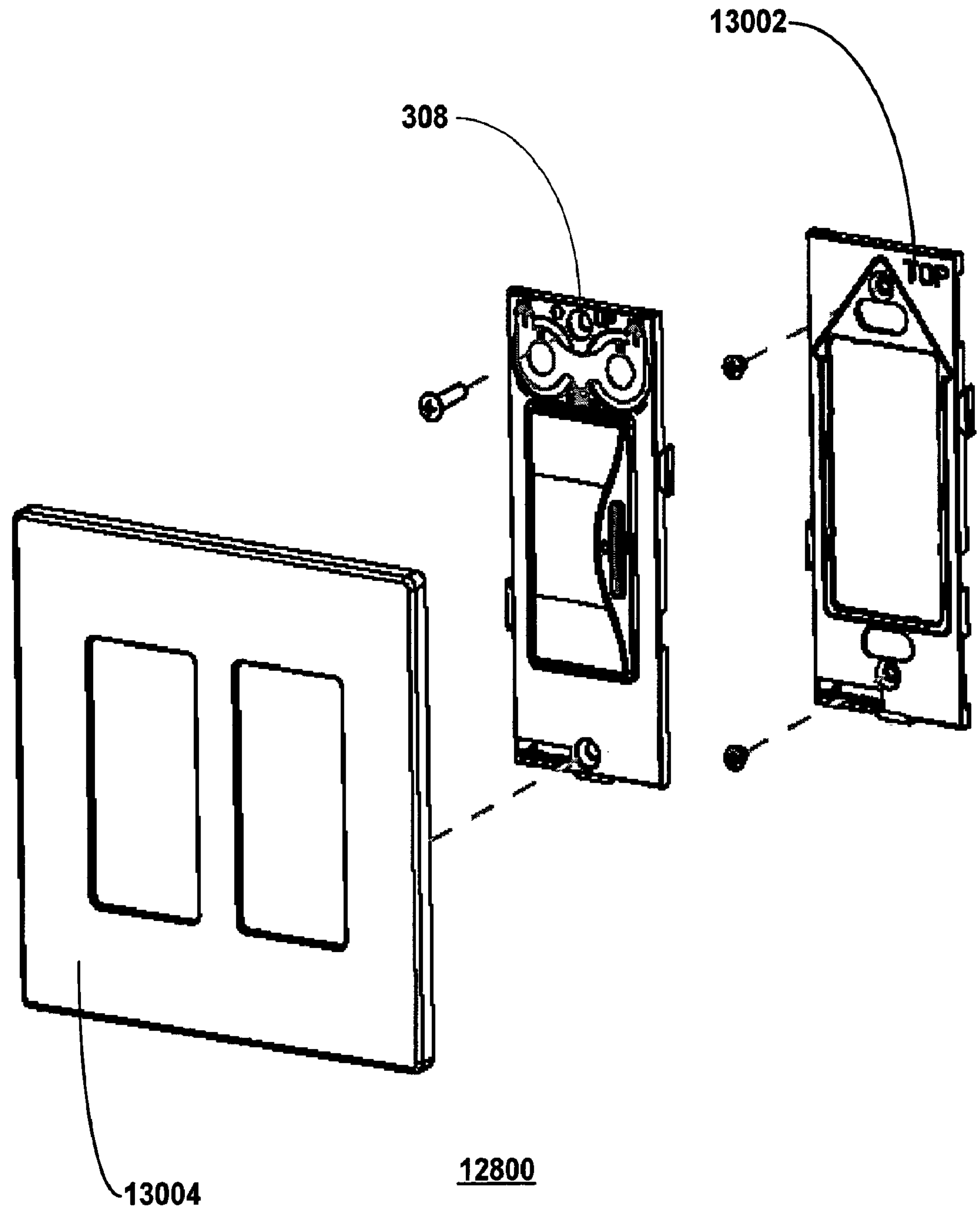

FIG. 130 is an exploded view of an exemplary embodiment of a method of mounting the battery powered RF switch of FIG. 126 on a surface.

Figure 131:
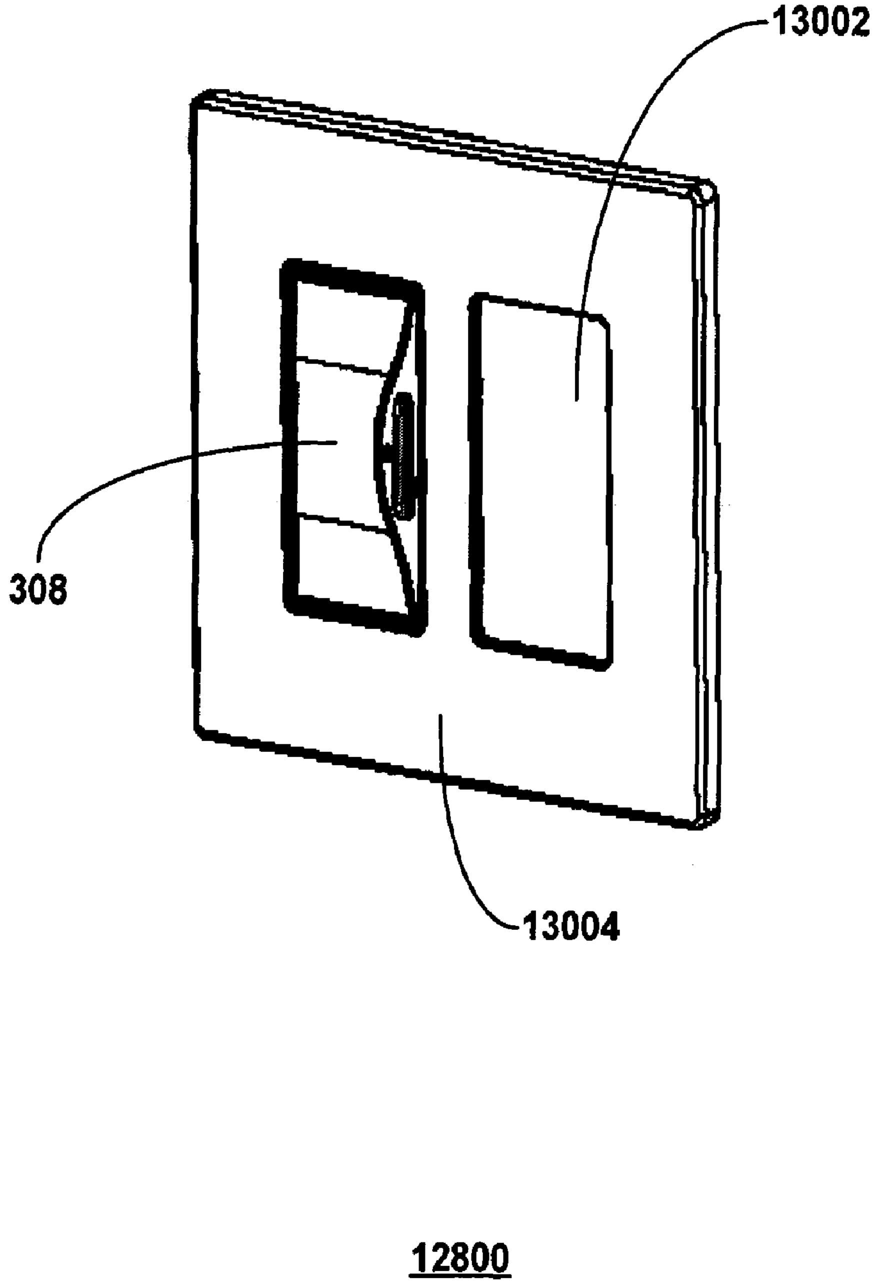

FIG. 131 is an illustration of an exemplary embodiment of the battery powered RF switch of FIG. 130 mounted onto a surface.

Figure 132:
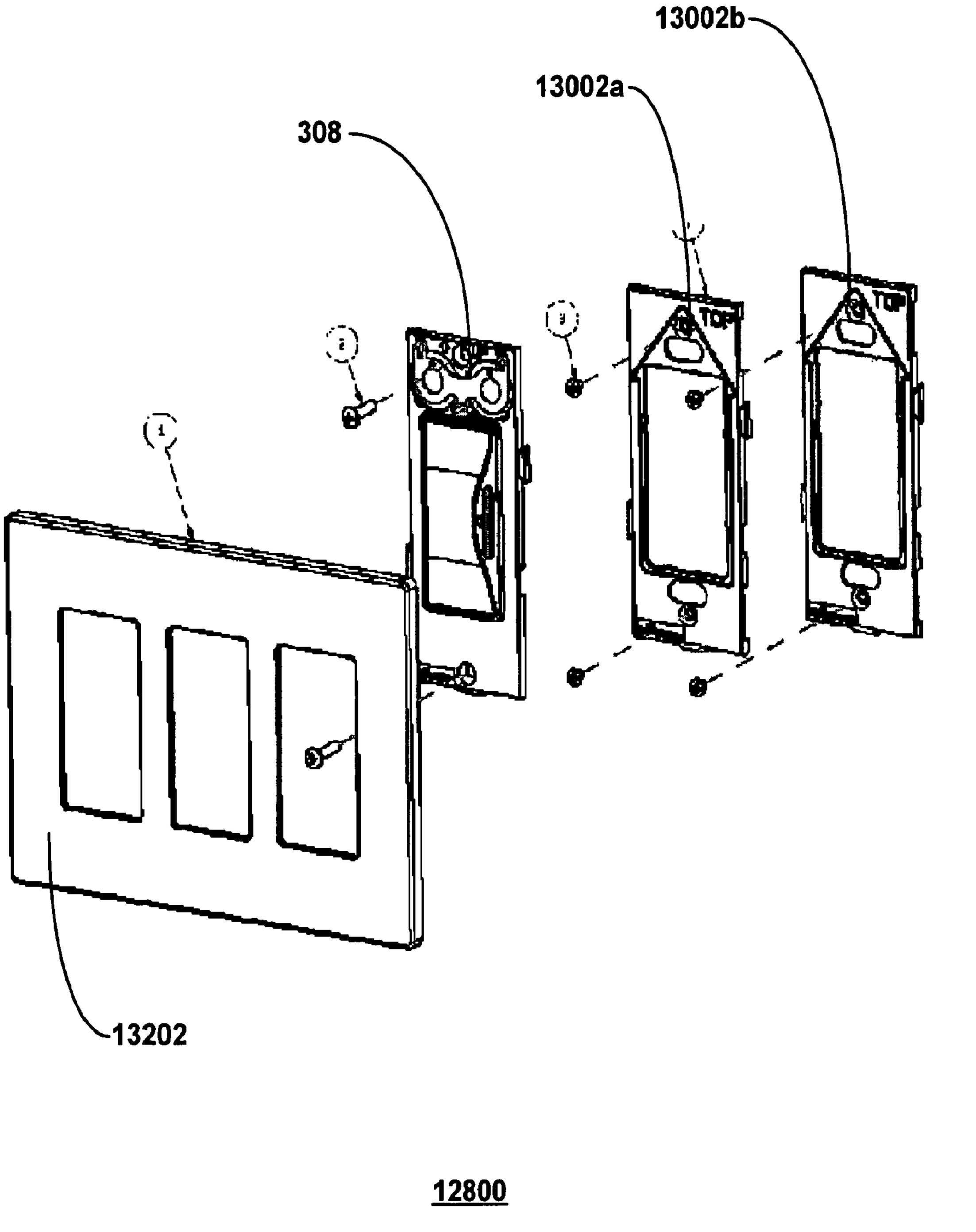

FIG. 132 is an exploded view of an exemplary embodiment of a method of mounting the battery powered RF switch of FIG. 126 on a surface.

Figure 133:
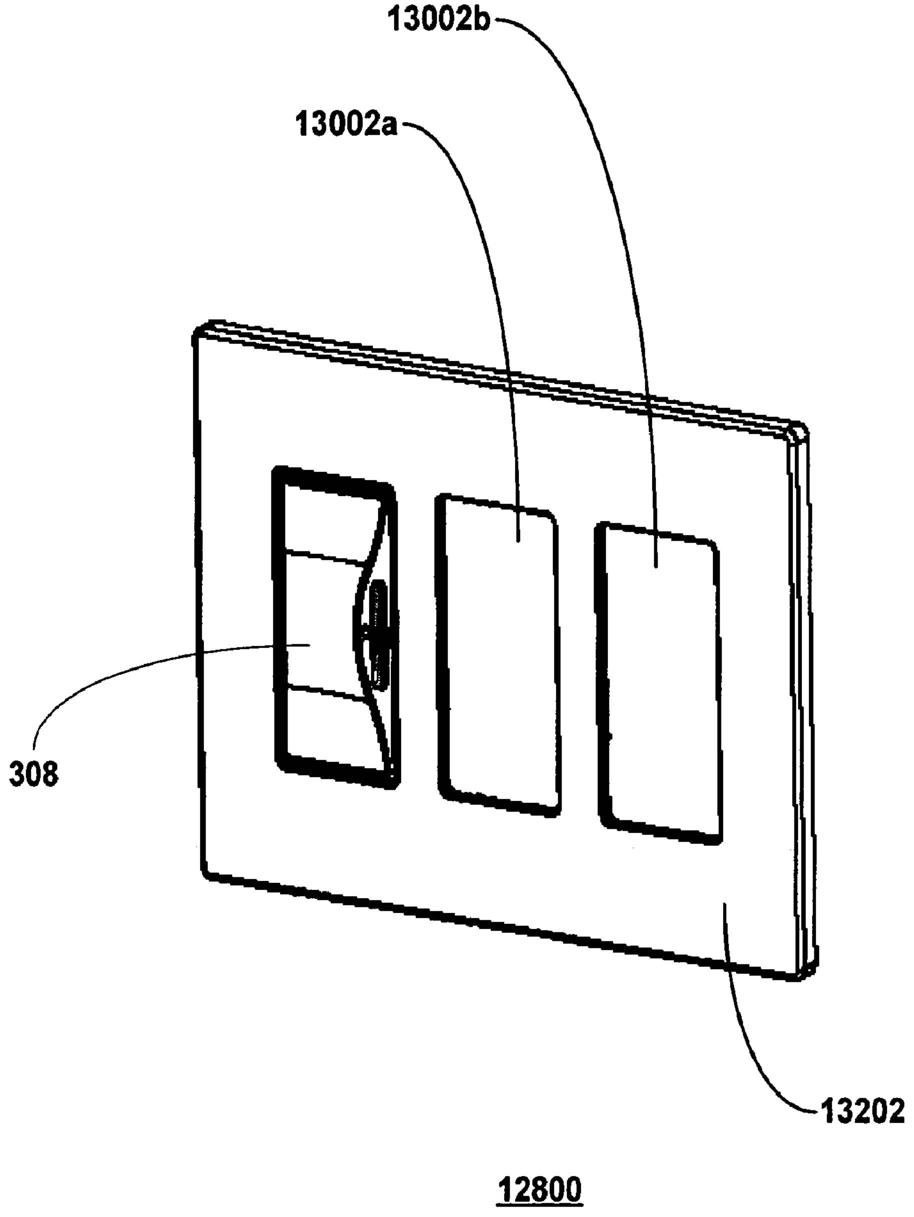

FIG. 133 is an illustration of an exemplary embodiment of the battery powered RF switch of FIG. 132 mounted onto a surface.

Figure 134A:
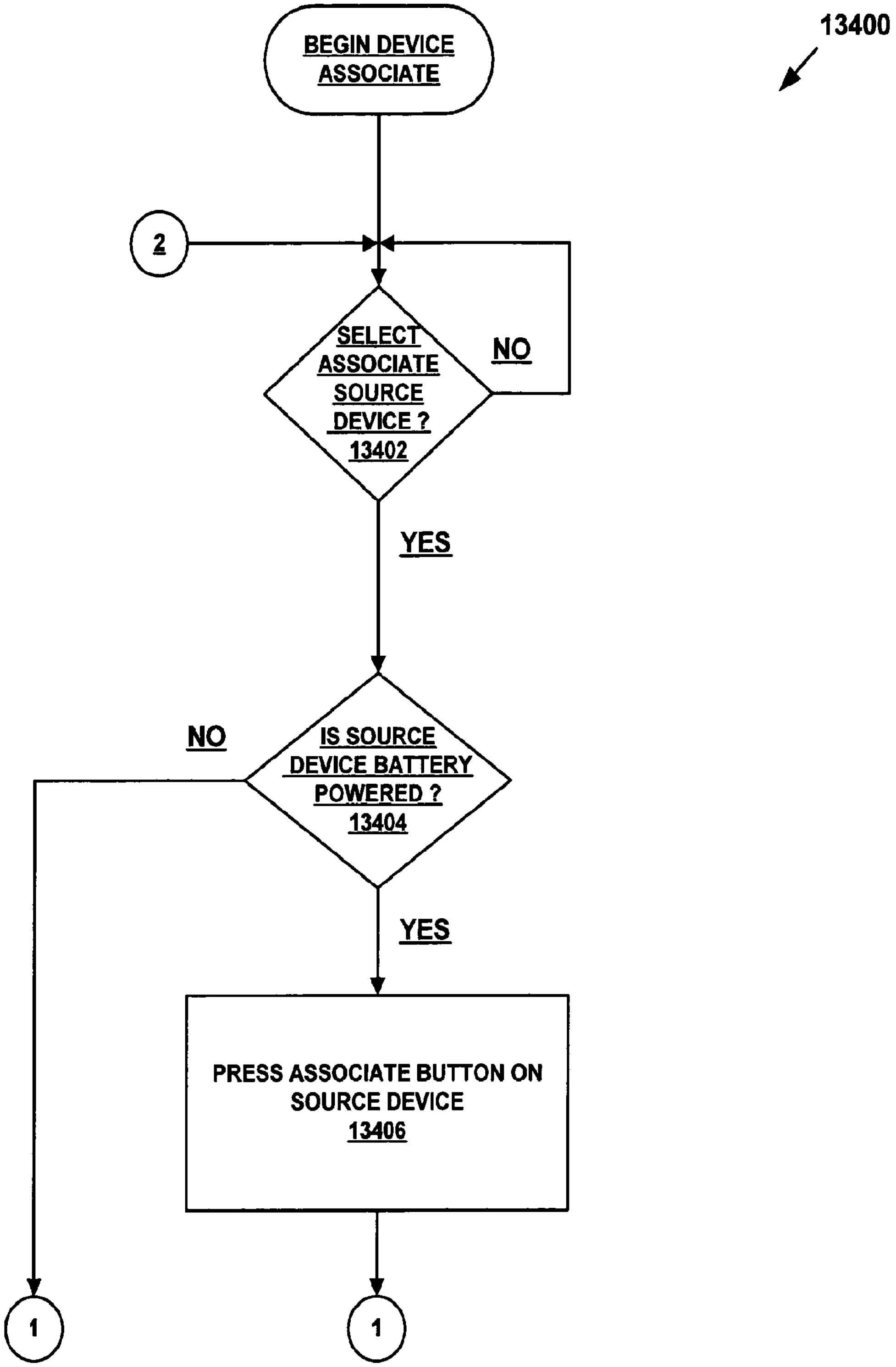
Figure 134B:
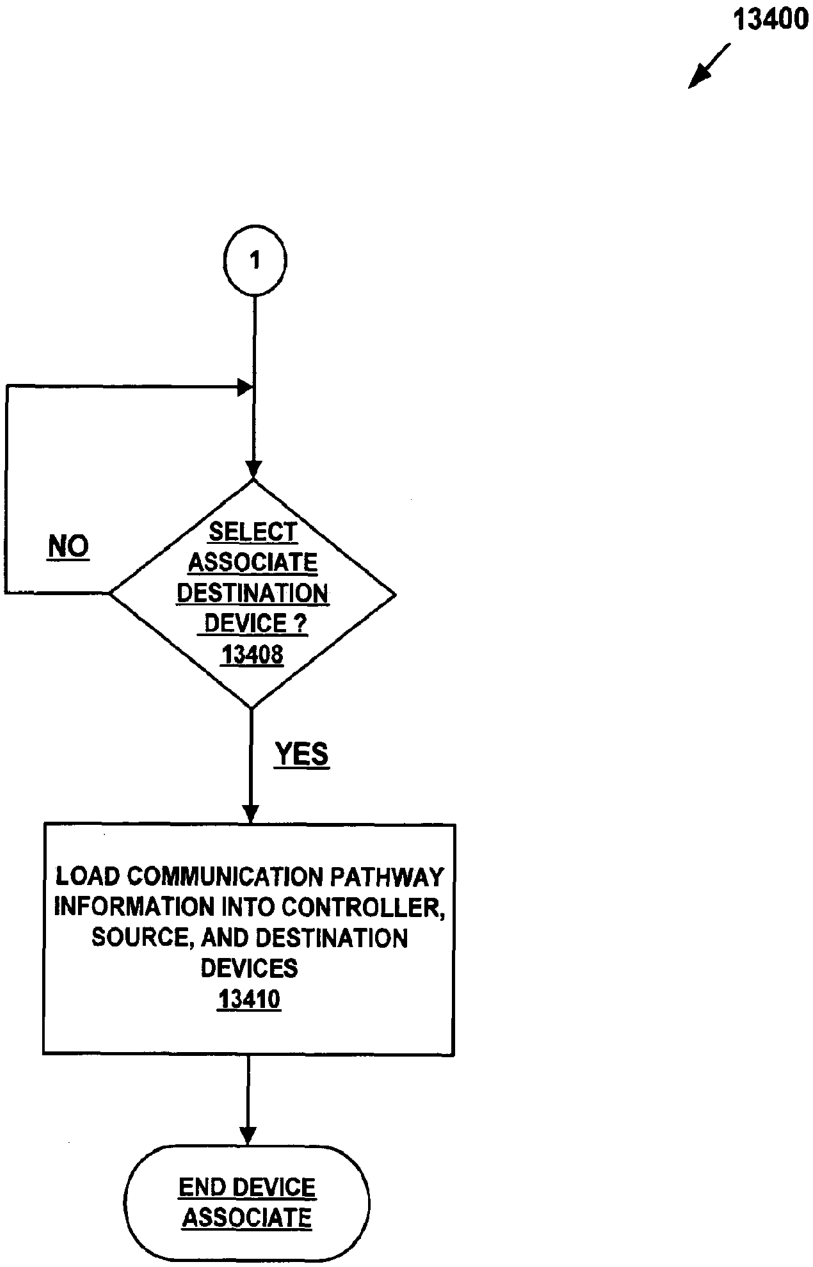

FIGS. 134*a*-134*b* is a flow chart illustration of an exemplary embodiment of a method of associating devices in the system.

FIGS. 135*a*, 135*b* and 135*c* are exemplary embodiments of data frame layouts each according to one or more aspects of the present disclosure.

Figure 136:
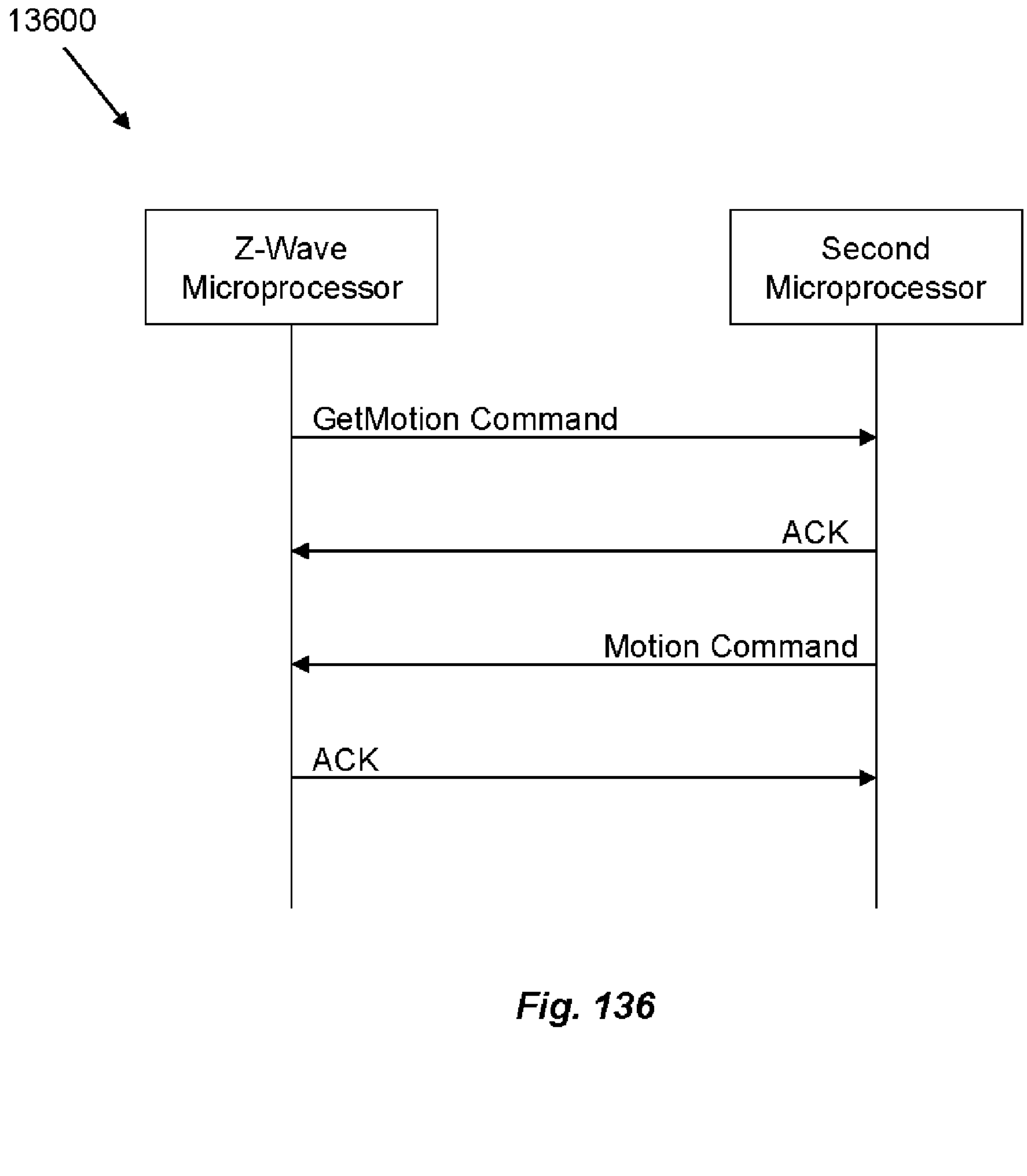

FIG. 136 is an exemplary embodiment of a sequence of frames communicated according to one or more aspects of the present disclosure.

Figure 137:
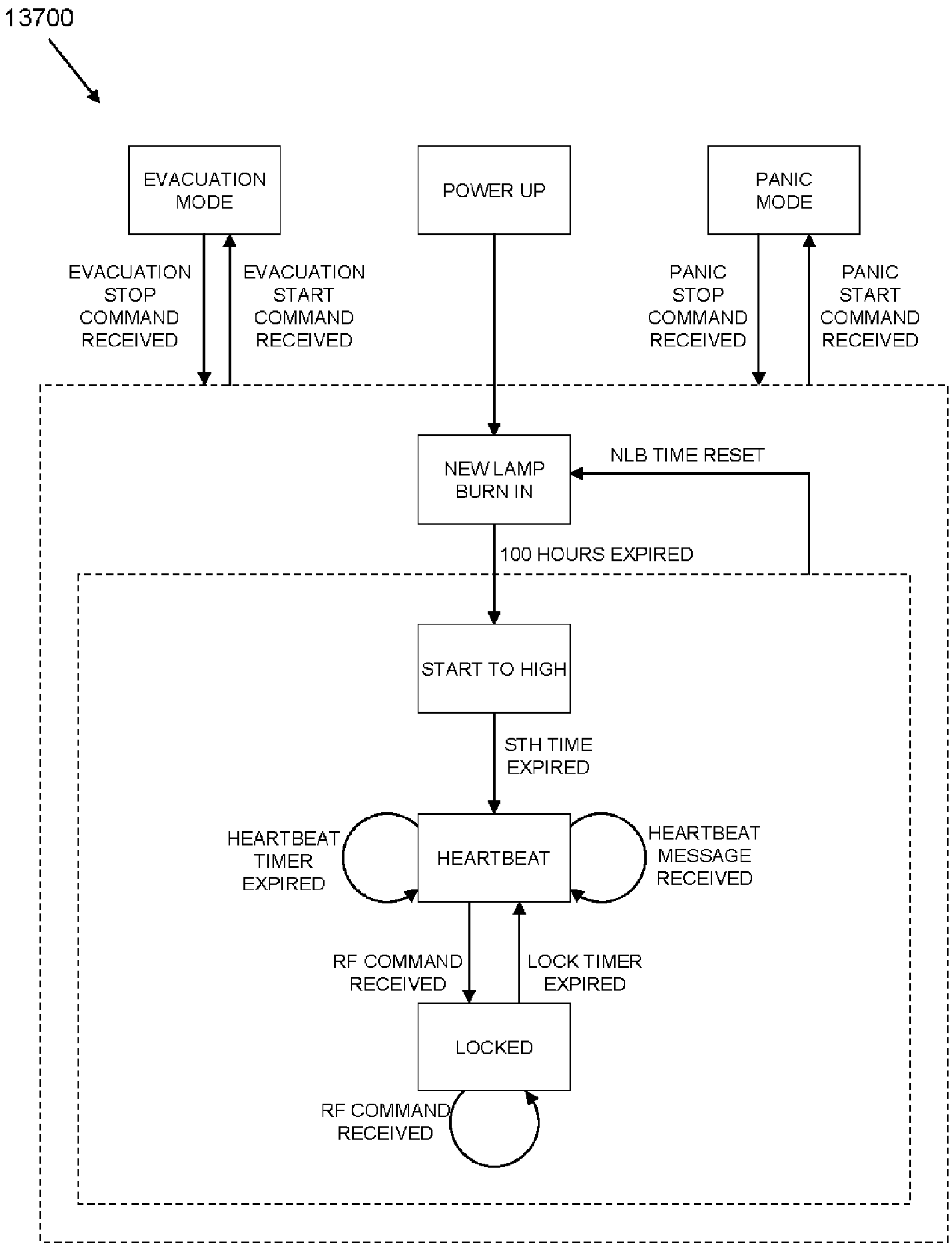

FIG. 137 is an exemplary embodiment of a relay state machine according to one or more aspects of the present disclosure.

Figure 138:
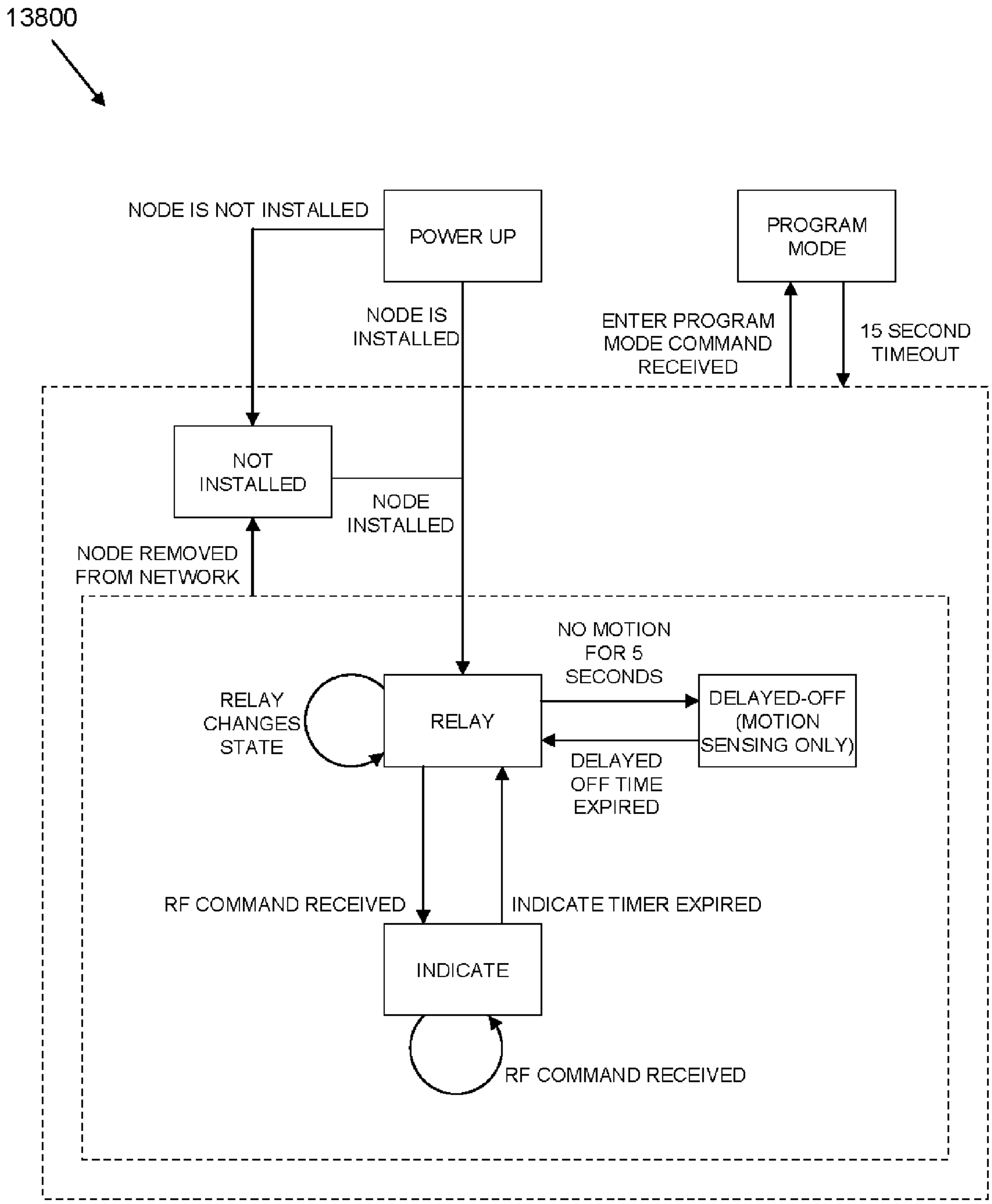

FIG. 138 is an exemplary embodiment of an LED state machine according to one or more aspects of the present disclosure.

Figure 139:
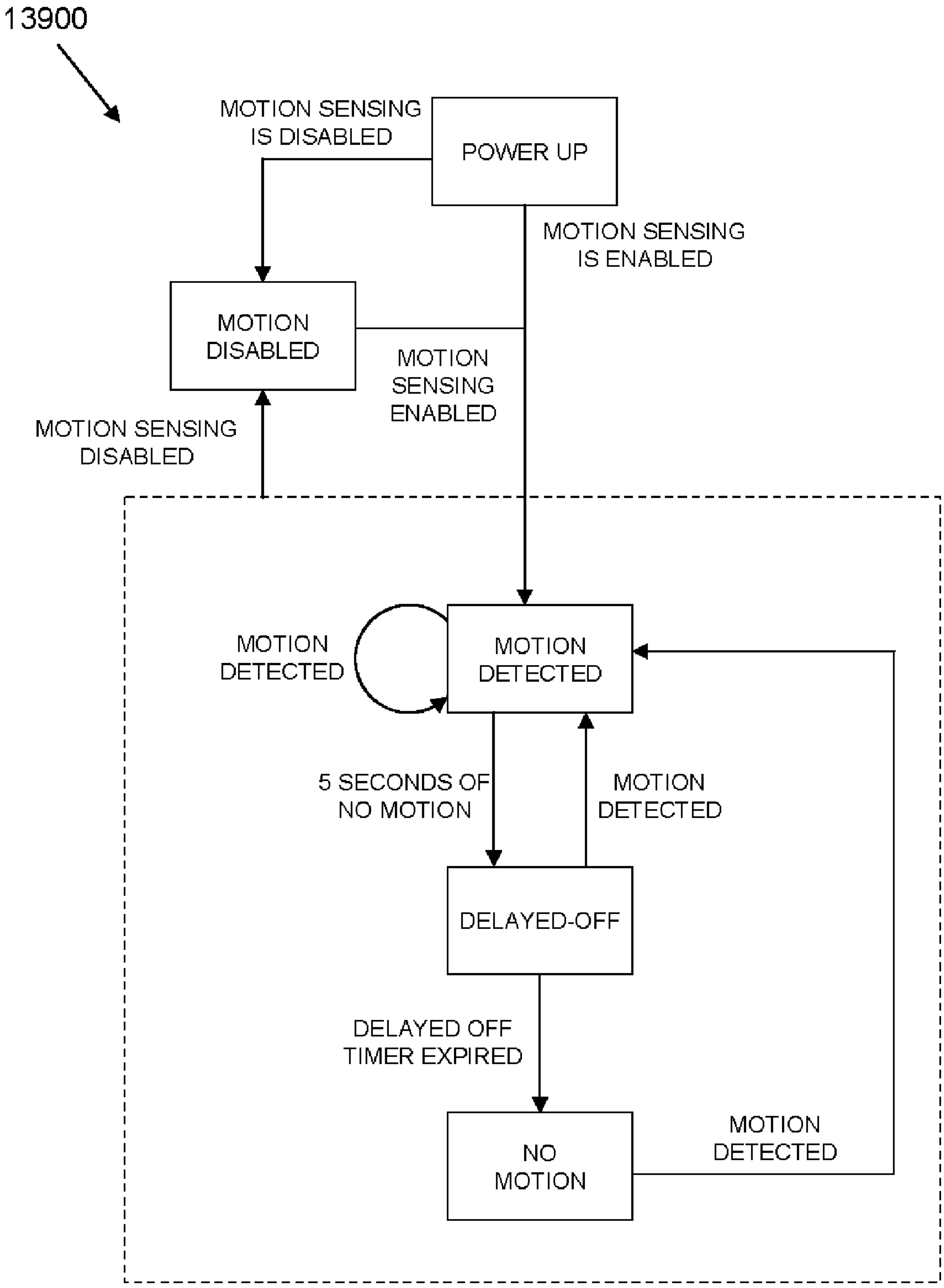

FIG. 139 is an exemplary embodiment of a motion sensing state machine according to one or more aspects of the present disclosure.

Figures 140, 141, 142:
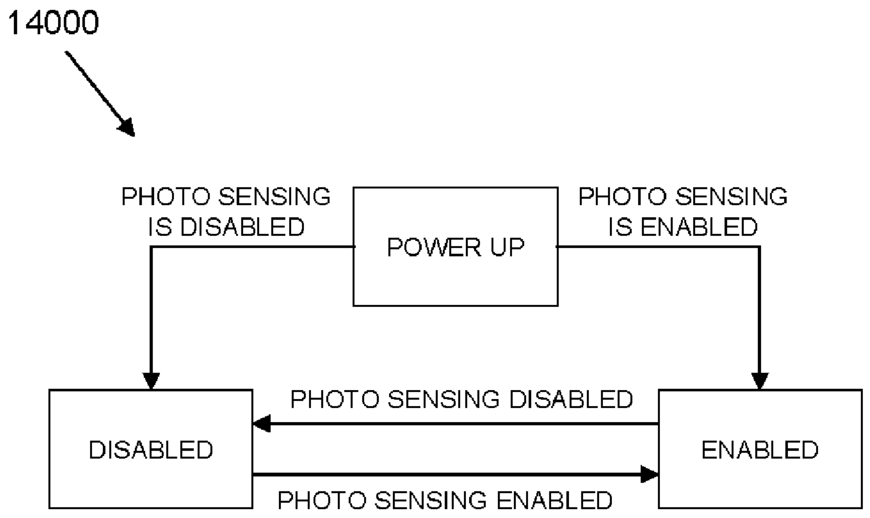

FIG. 140 is an exemplary embodiment of a photo sensing state machine according to one or more aspects of the present disclosure.

FIGS. 141-164 are exemplary embodiments of data frame layouts each according to one or more aspects of the present disclosure.

Figure 165:
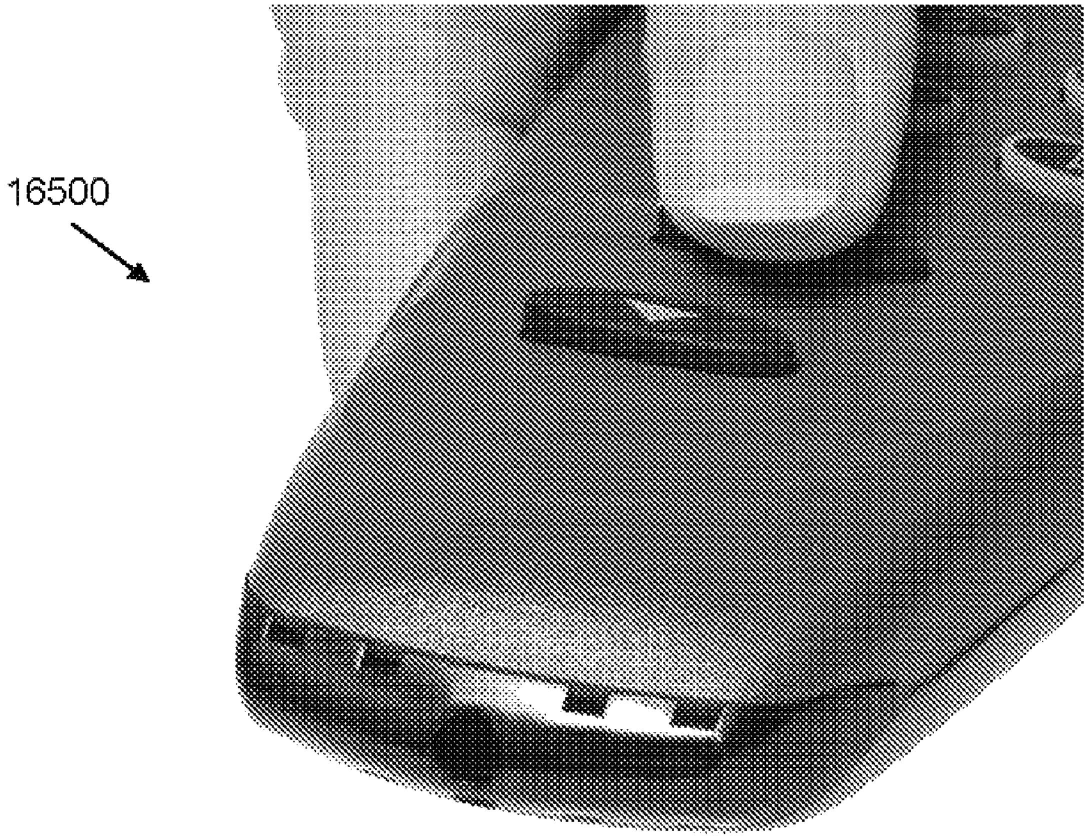

FIG. 165 is an exemplary embodiment of a handheld controller according to one or more aspects of the present disclosure.

Figure 166A:
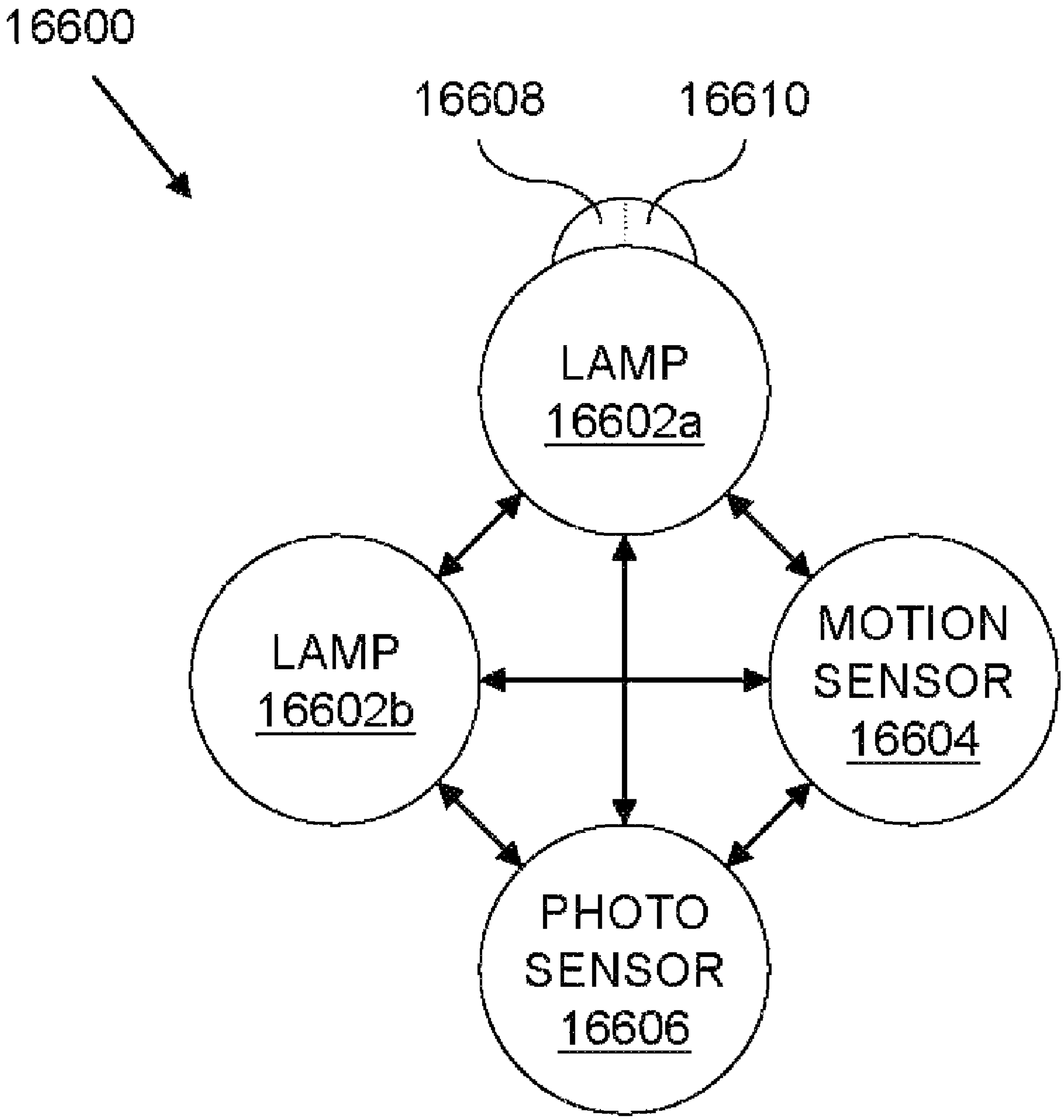
Figure 166B:
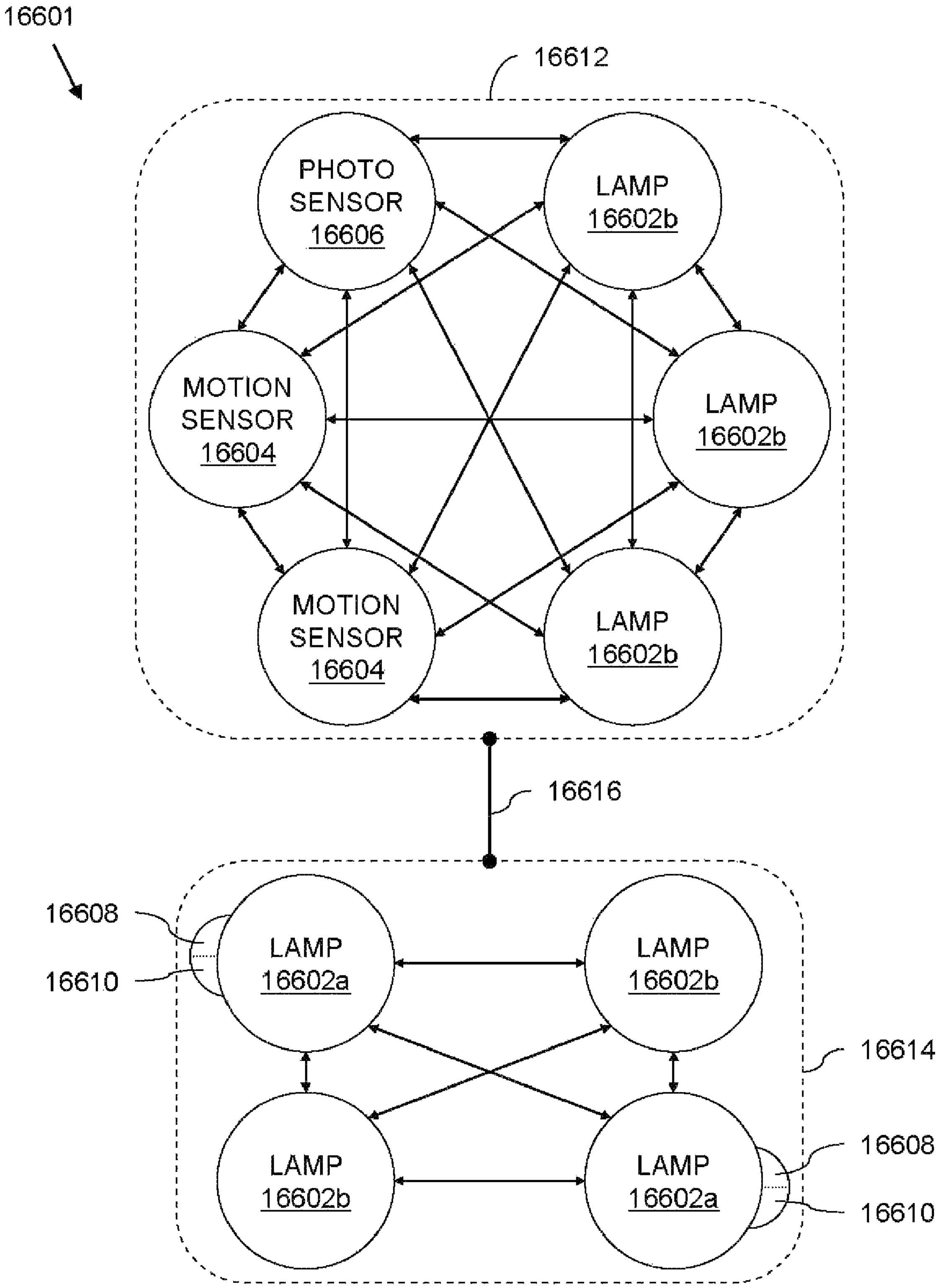

FIGS. 166*a* and 166*b* are each a schematic illustration of an exemplary embodiment of a control system according to one or more aspects of the present disclosure.

Figure 167A:
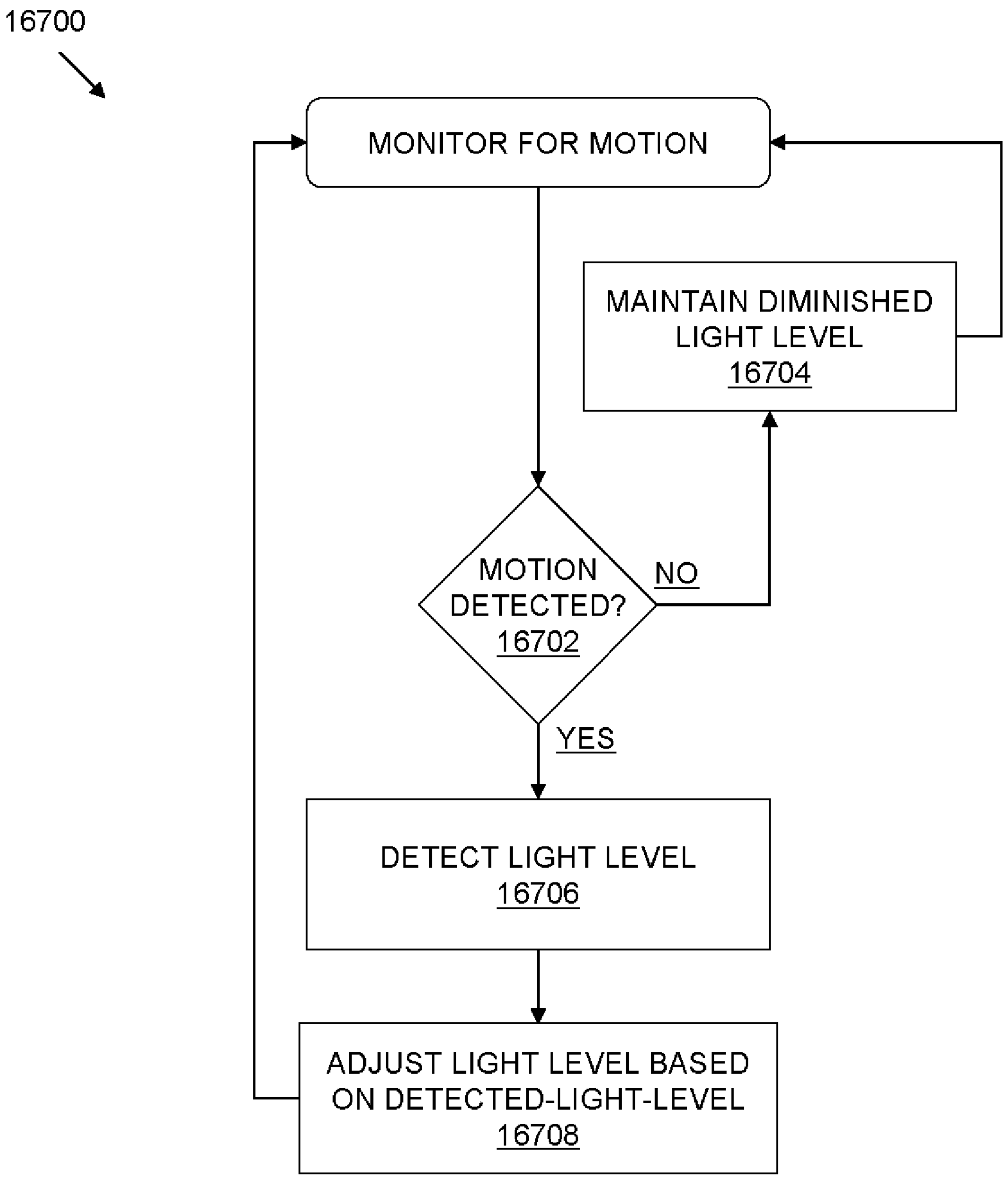

FIG. 167*a* is a flow-chart diagram of an exemplary embodiment of a method according to one or more aspects of the present disclosure.

Figure 167B:
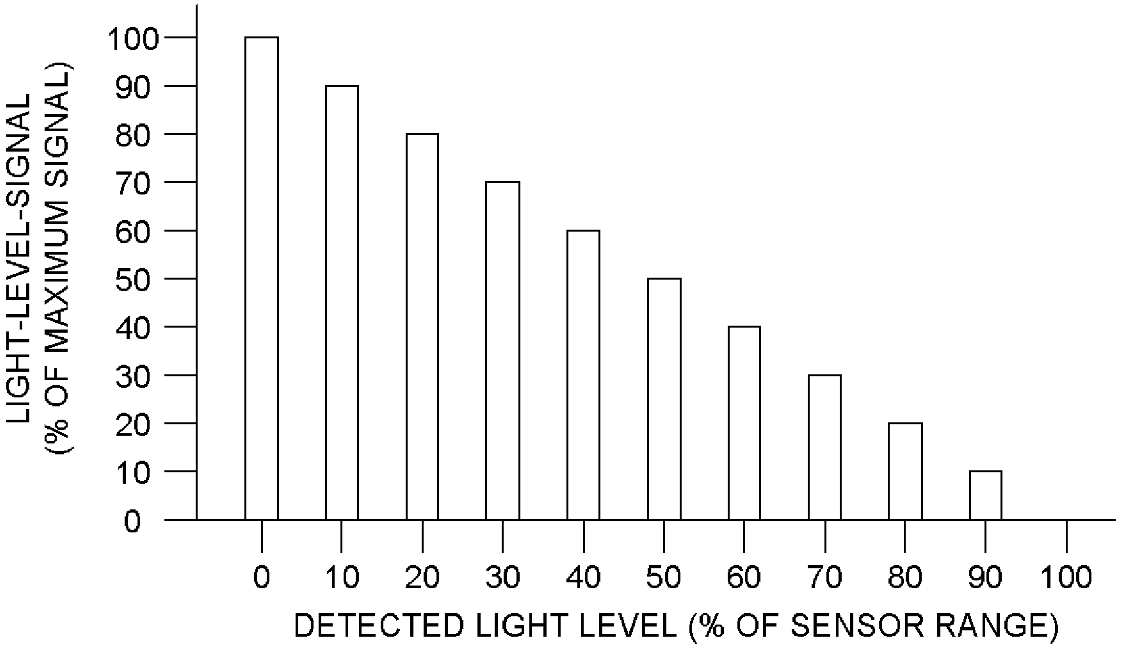

FIG. 167*b* is a graph depicting a relationship between lamp energization and ambient natural light according to one or more aspects of the present disclosure.

Figure 168:
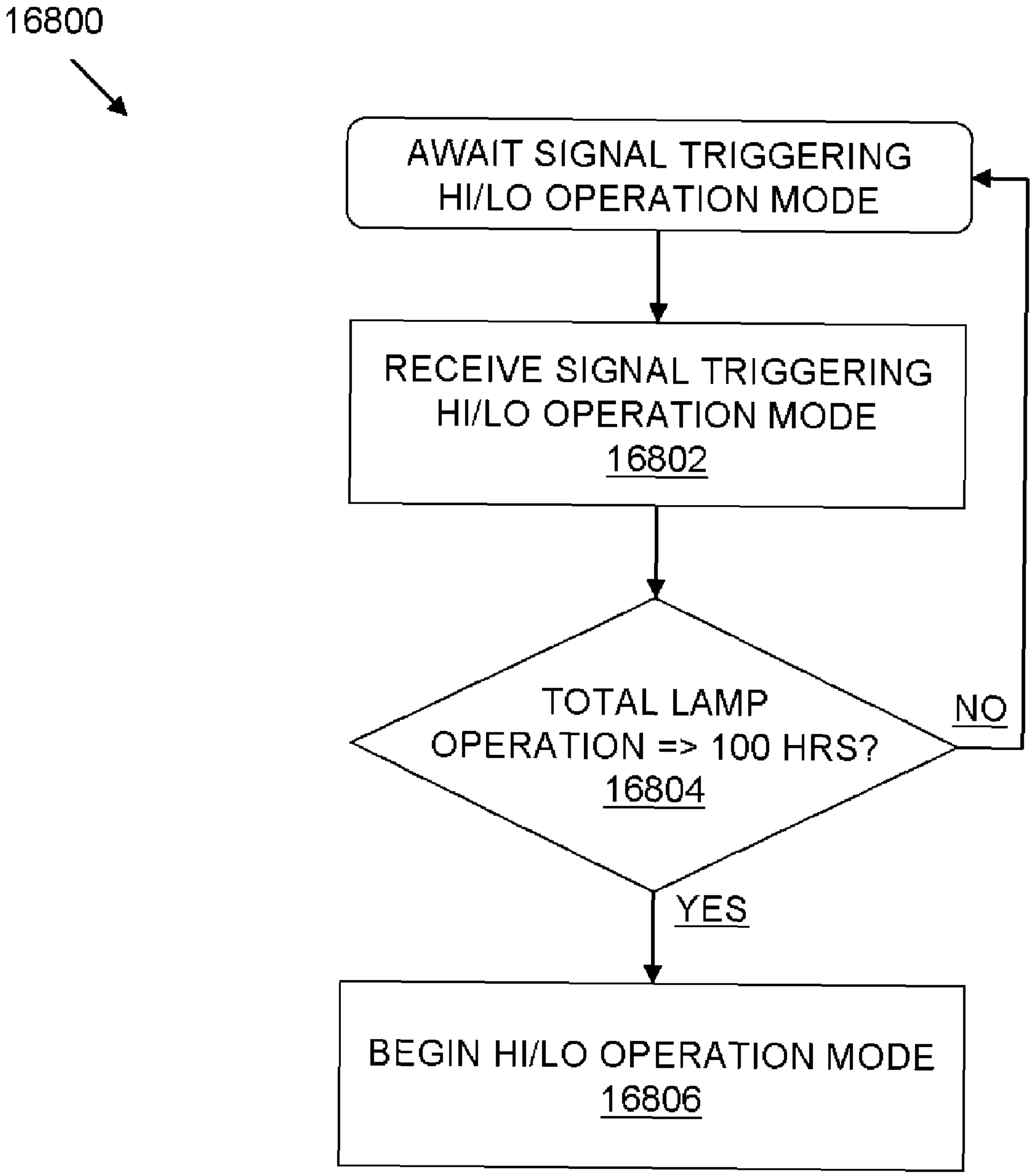

FIG. 168 is a flow-chart diagram of an exemplary embodiment of a method according to one or more aspects of the present disclosure.

Figure 169:
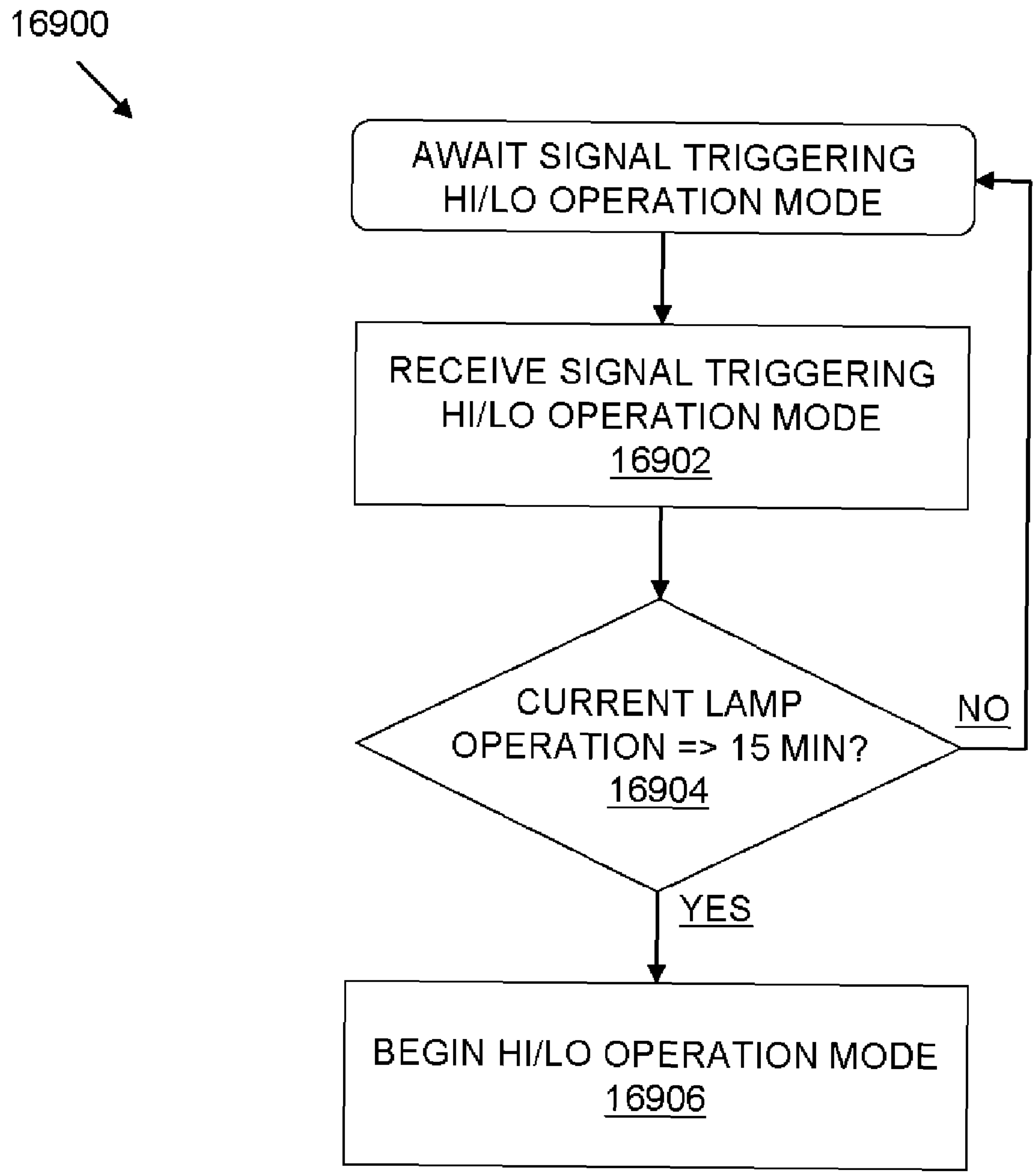

FIG. 169 is a flow-chart diagram of an exemplary embodiment of a method according to one or more aspects of the present disclosure.

Figure 170:
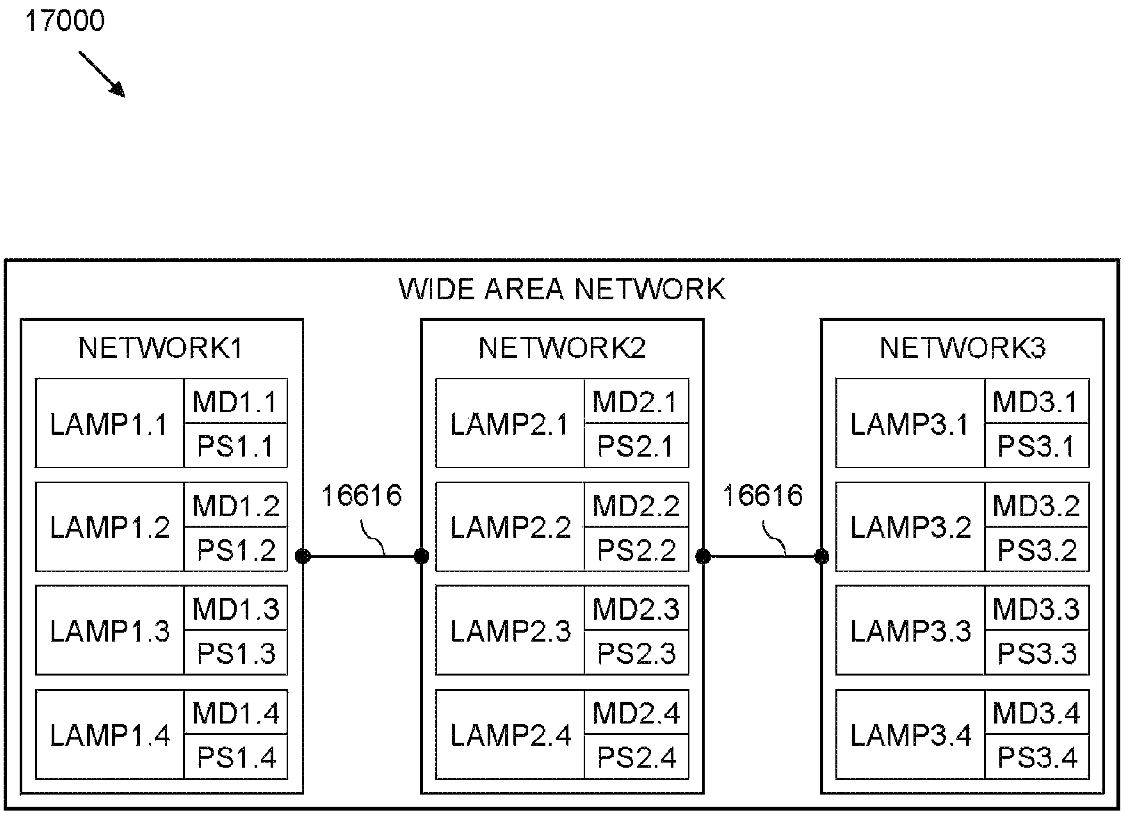

FIG. 170 is a schematic illustration of an exemplary embodiment of a wireless device network according to one or more aspects of the present disclosure.

Figure 171:
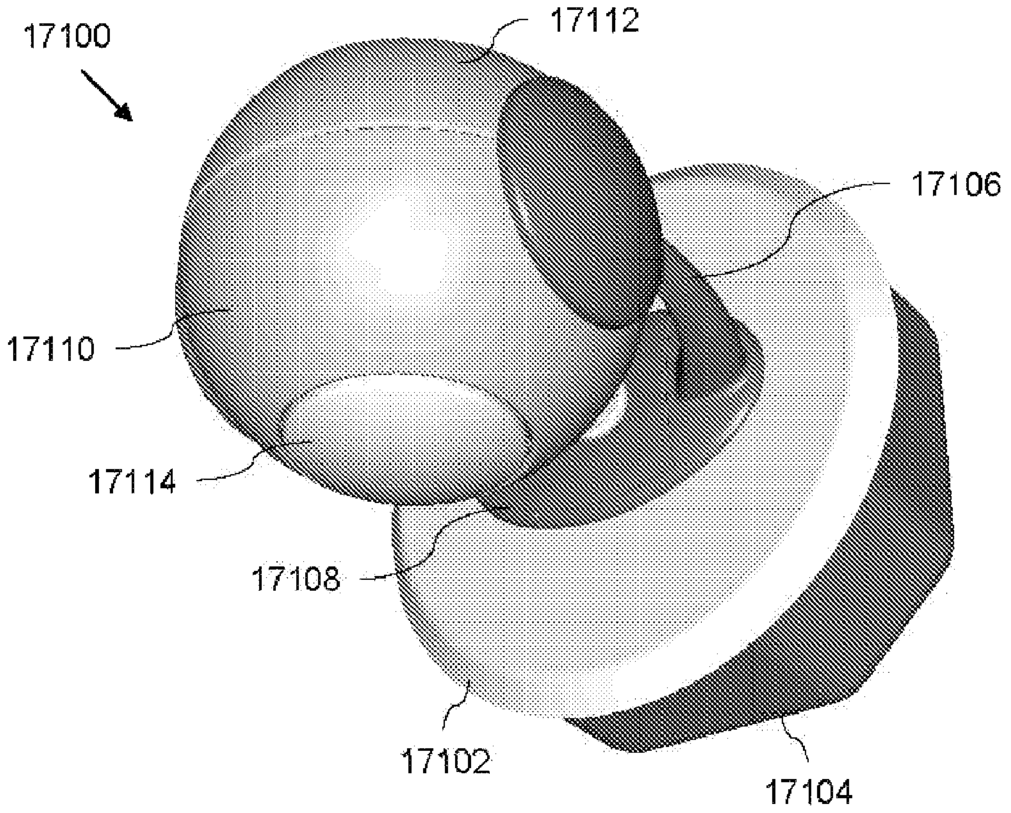

FIG. 171 is a perspective illustration of an exemplary embodiment of apparatus according to one or more aspects of the present disclosure.

Figure 172:
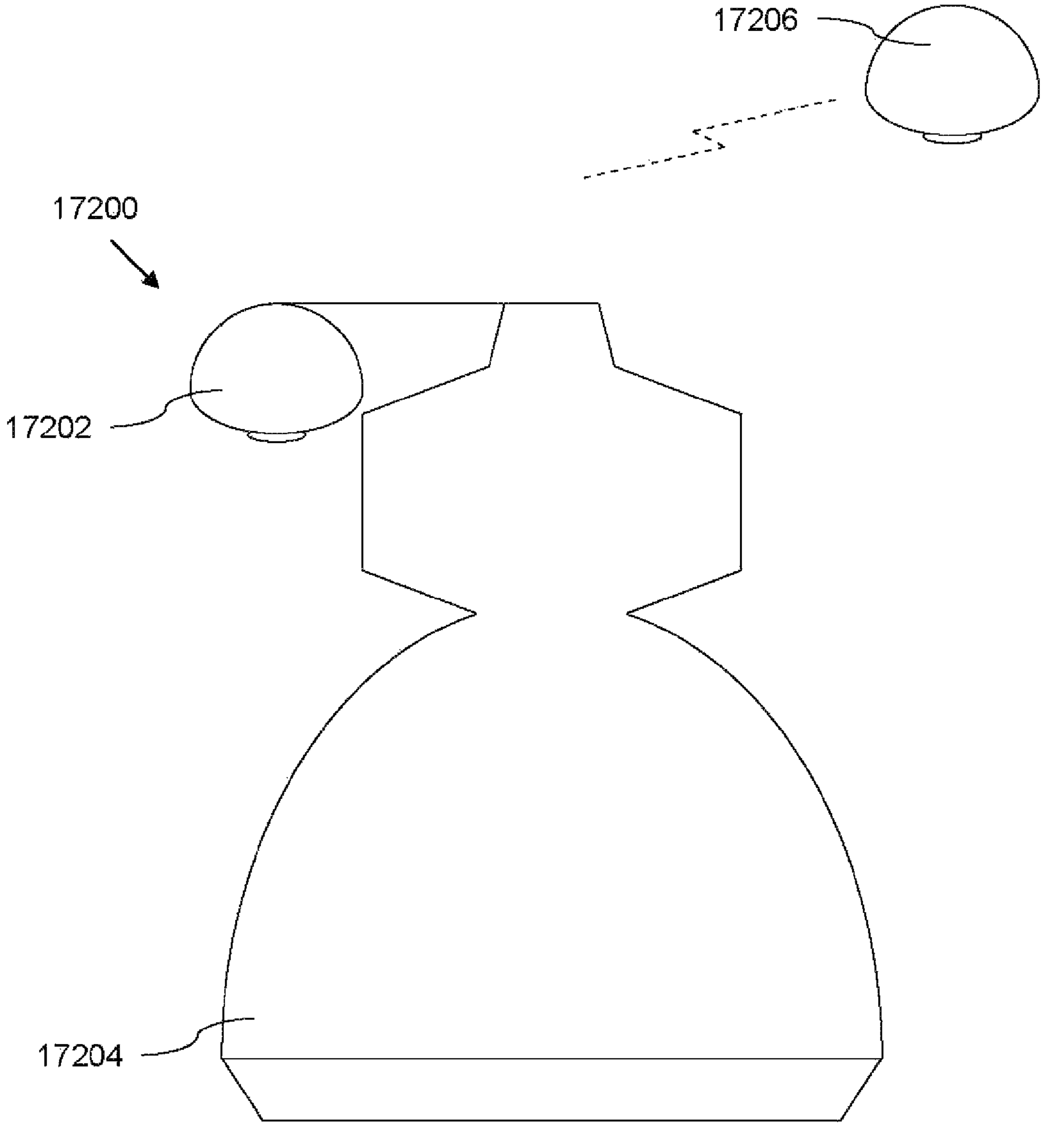

FIG. 172 is a schematic illustration of an exemplary embodiment of apparatus according to one or more aspects of the present disclosure.

Figure 173:
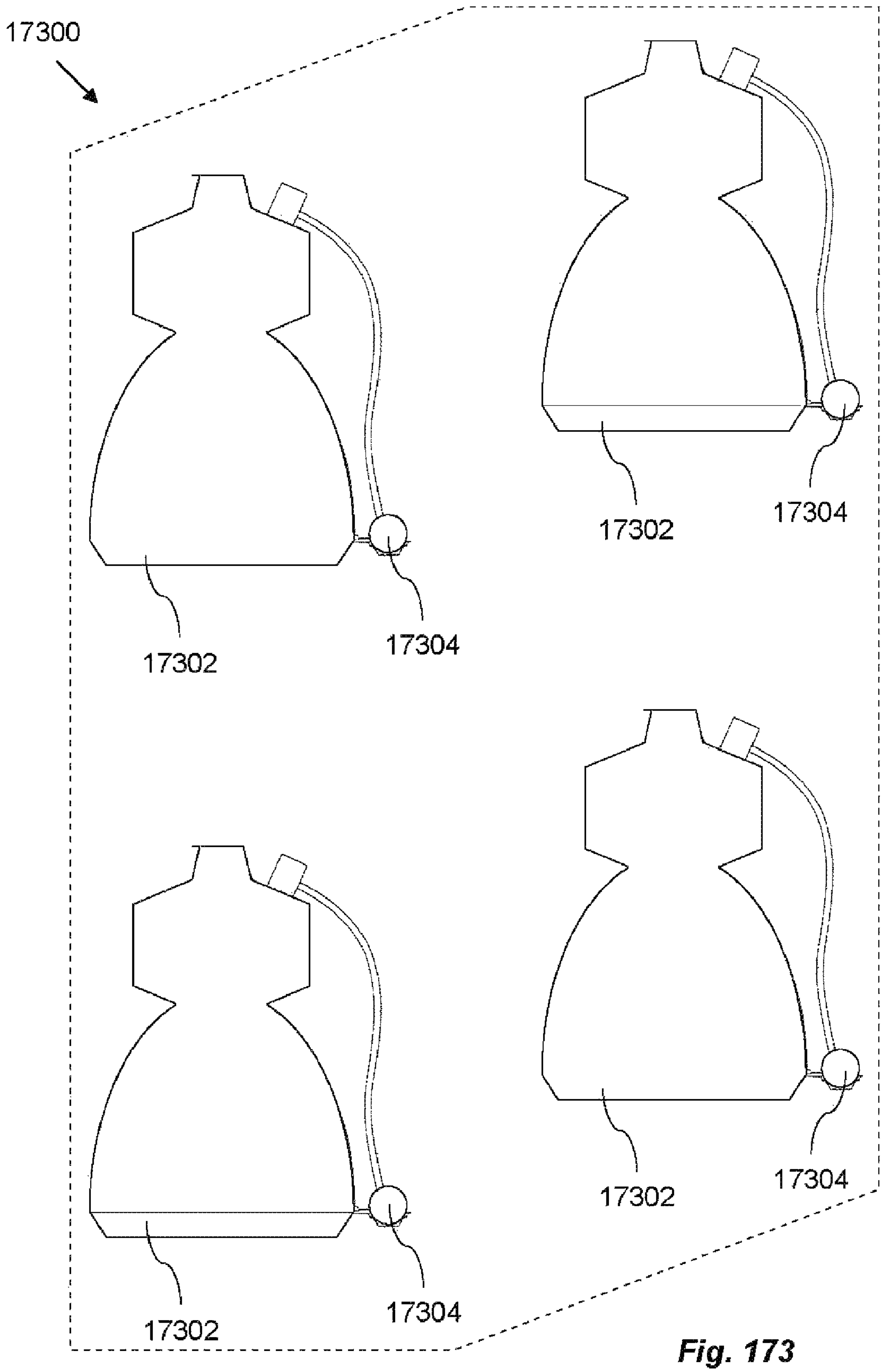

FIG. 173 is a schematic illustration of an exemplary embodiment of apparatus according to one or more aspects of the present disclosure.

Figure 174:
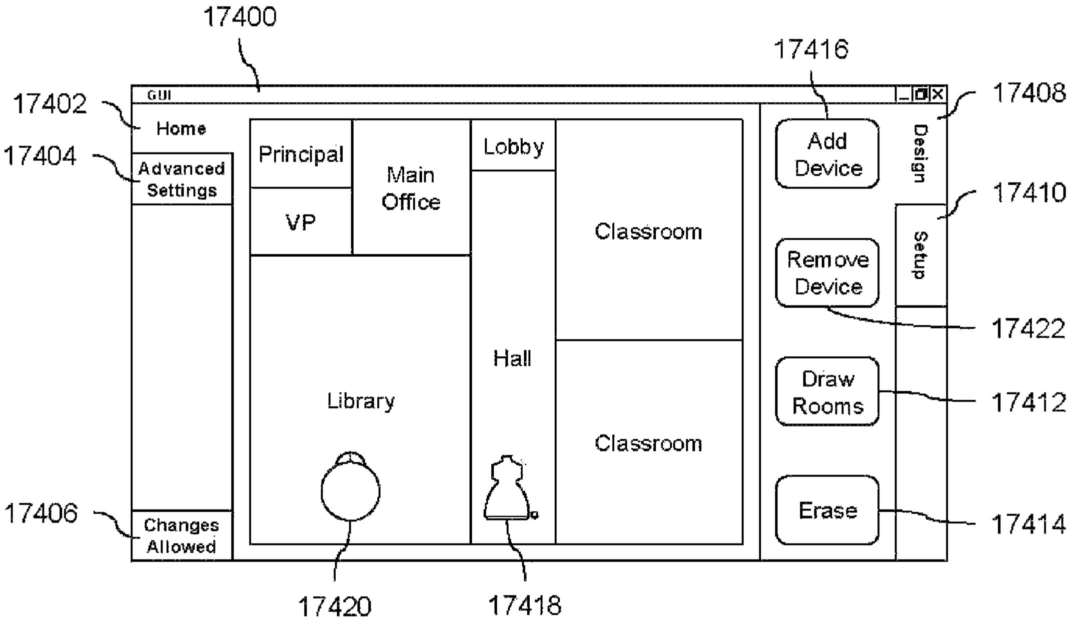

FIG. 174 is a schematic illustration of an exemplary embodiment of a graphical user interface (GUI) according to one or more aspects of the present disclosure.

Figure 175:
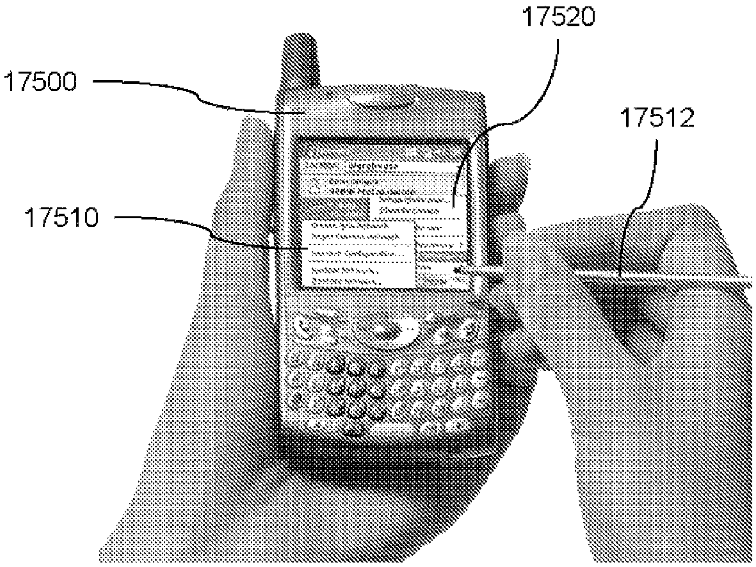

FIG. 175 is a perspective illustration of an exemplary embodiment of a wireless user interface according to one or more aspects of the present disclosure.

Figure 176:
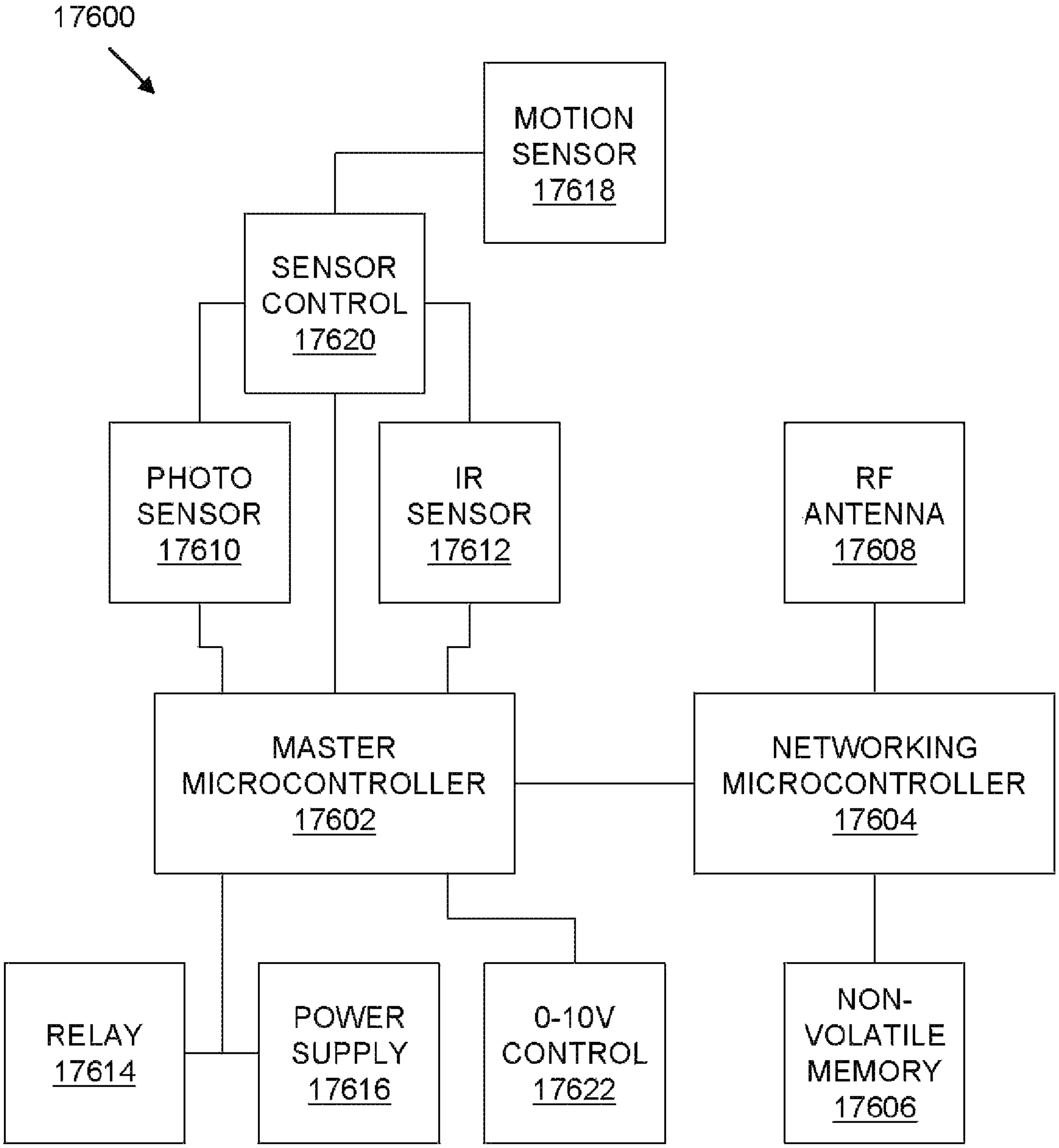

FIG. 176 is a schematic illustration of an exemplary embodiment of an apparatus according to one or more aspects of the present disclosure.

DETAILED DESCRIPTION

Figure 1:
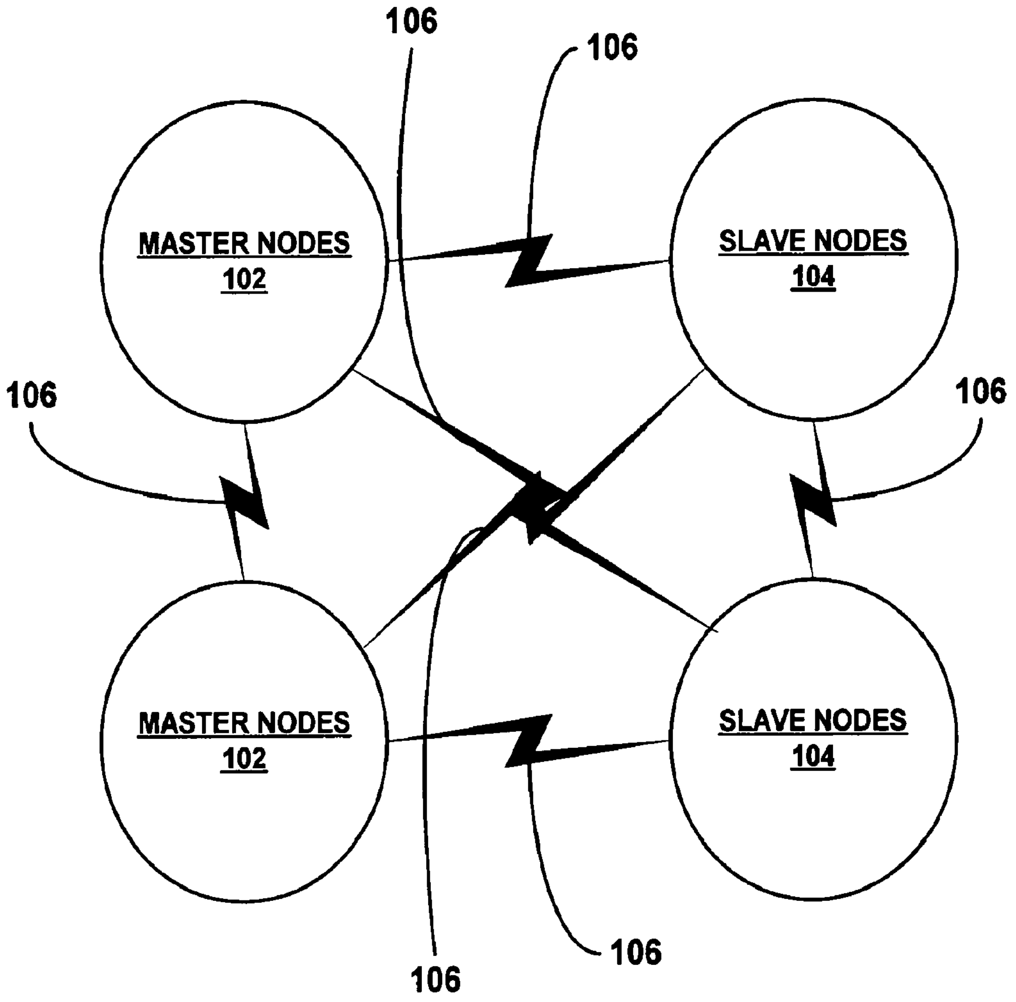
FIG. 1 is a schematic illustration of an exemplary embodiment of a control system.

Referring now to FIG. 1, a control system 100 includes one or more master nodes 102 that are adapted to control and monitor the operation of one or more slave nodes 104. In an exemplary embodiment, the master nodes 102 and the slave nodes 104 are operably coupled by one or more communication interfaces 106 that may, for example, include one or more of the following: radio frequency (RF), Internet Protocol (IP), power line, or other conventional communication interfaces.

Figure 2:
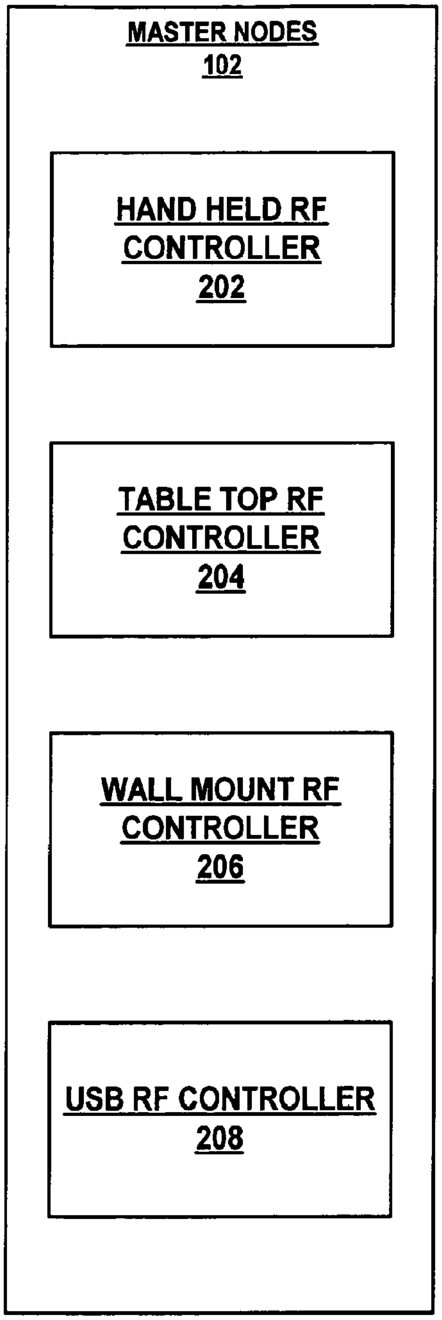
FIG. 2 is a schematic illustration of an exemplary embodiment of master nodes.

Referring now to FIG. 2, in an exemplary embodiment, the master nodes 102 may include one or more of the following: a hand held RF controller 202, a table top RF controller 204, a wall mounted RF controller 206, and/or a Universal Serial Bus (USB) RF Controller 208.

Figure 3:
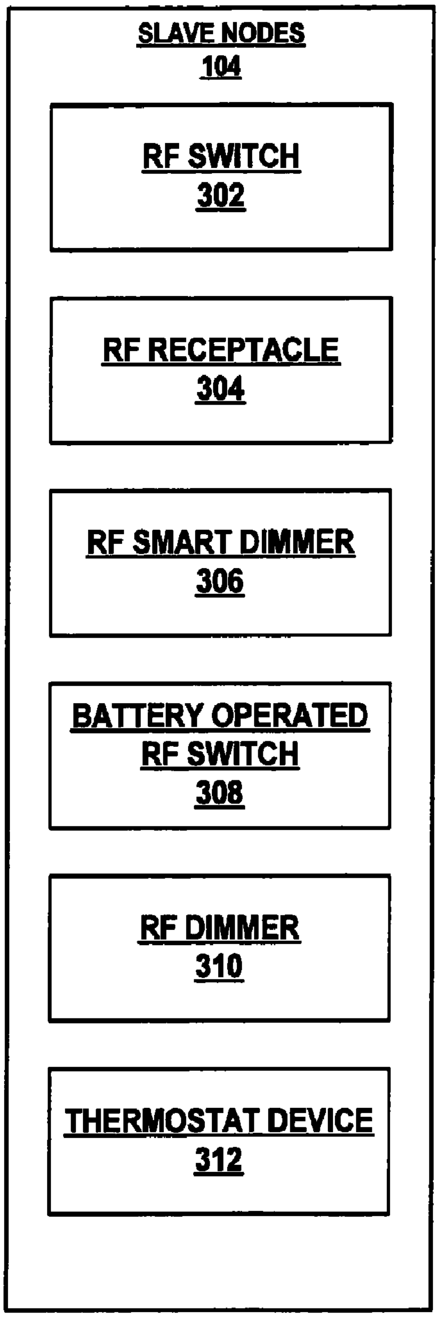
FIG. 3 is a schematic illustration of an exemplary embodiment of slave nodes.

Referring now to FIG. 3, in an exemplary embodiment, the slave nodes 104 may include one or more of the following: an RF switch 302, an RF receptacle 304, an RF smart dimmer 306, a battery operated RF switch 308, an RF dimmer 310, and a thermostat device 312.

Figure 4:
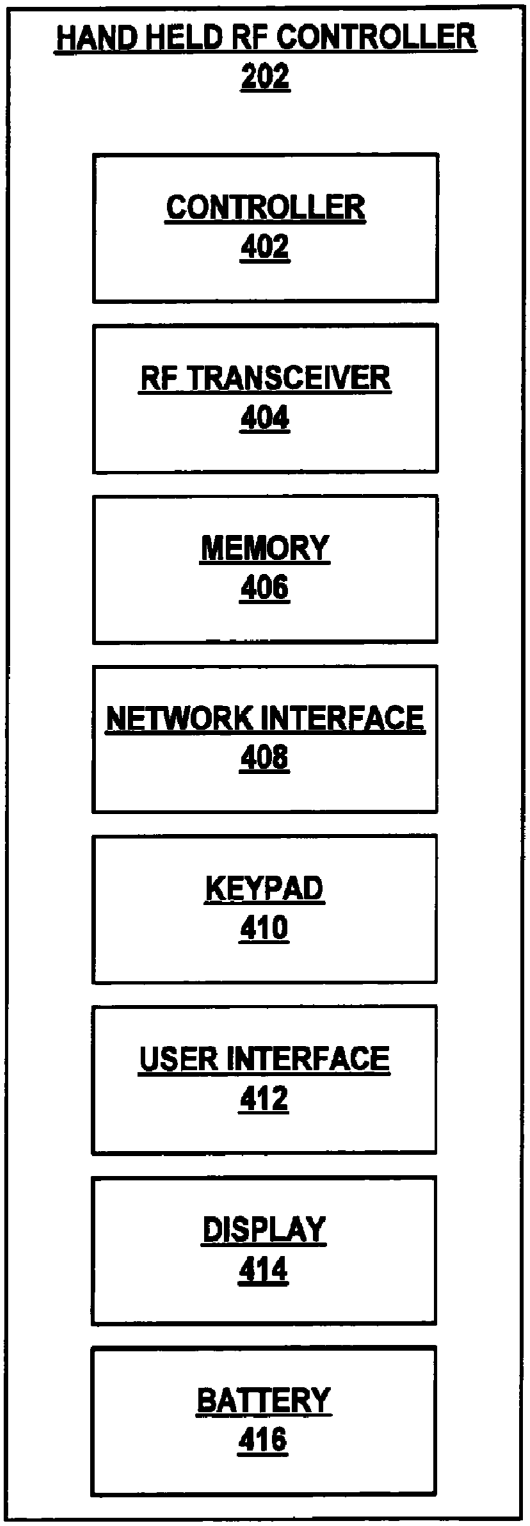
FIG. 4 is a schematic illustration of an exemplary embodiment of a hand held radio frequency controller.

Referring now to FIG. 4, in an exemplary embodiment, the hand held RF controller 202 includes a controller 402 that is operably coupled to an RF transceiver 404, a memory 406, a network interface 408, a keypad 410, a user interface 412, a display 414, and a battery 416.

In an exemplary embodiment, the controller 402 is adapted to control and monitor the operation of the RF transceiver 404, the memory 406, the network interface 408, the keypad 410, the user interface 412, the display 414, and the battery 416. In an exemplary embodiment, the controller 402 includes one or more of the following: a conventional programmable general purpose controller, an application specific integrated circuit (ASIC), or other conventional controller devices. In an exemplary embodiment, the controller 402 includes a model ZW0201 controller, commercially available from Zensys A/S.

Figure 5:
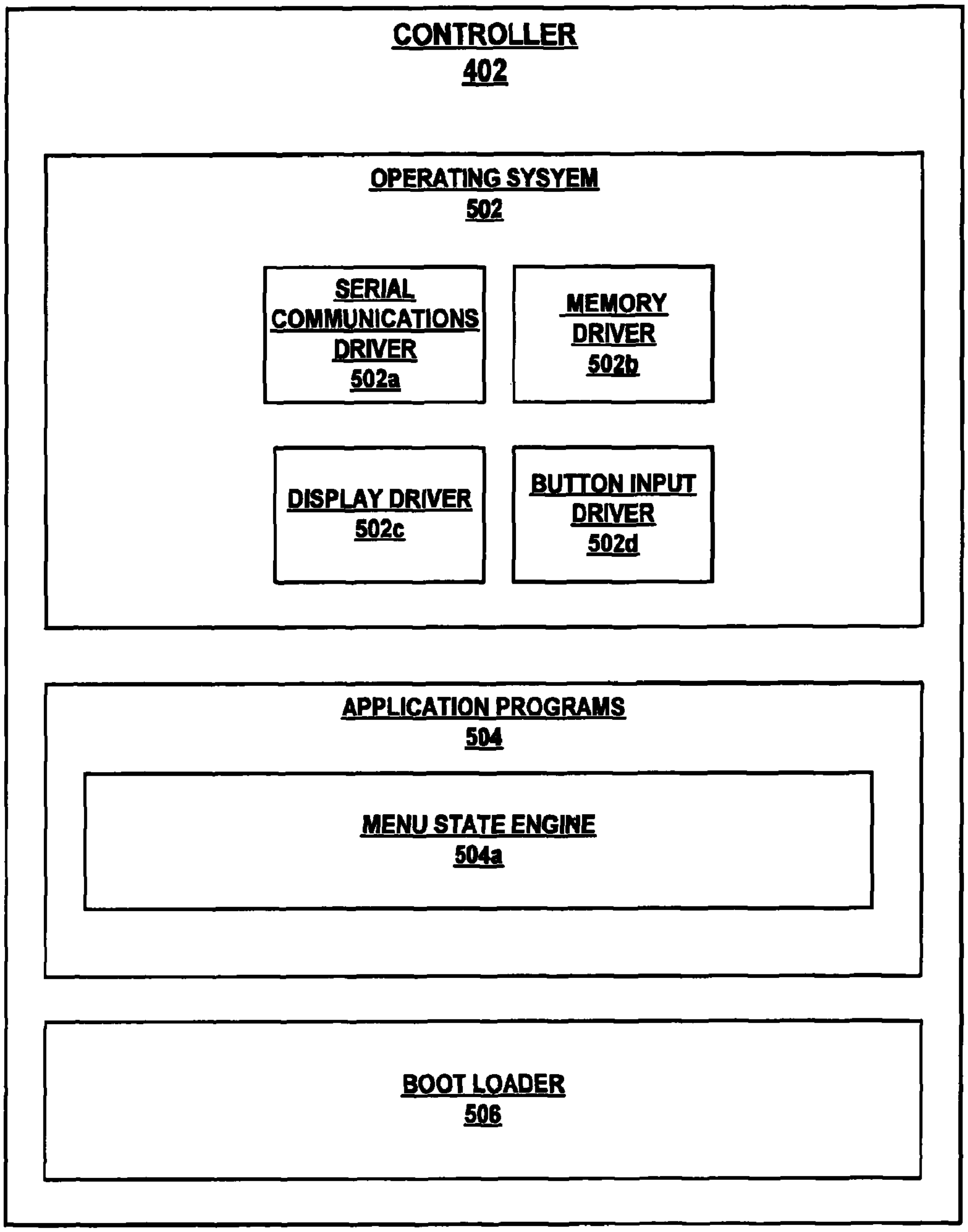
FIG. 5 is a schematic illustration of an exemplary embodiment of the controller of the radio frequency controller of FIG. 4.

Referring now to FIG. 5, in an exemplary embodiment, the controller 402 includes an operating system 502, application programs 504, and a boot loader 506. In an exemplary embodiment, the operating system 502 includes a serial communications driver 502*a*, a memory driver 502*b*, a display driver 502*c*, and a button input driver 502*d*. In an exemplary embodiment, the serial communications driver 502*a* controls serial communications using the RF serial transceiver 404, the memory driver 502*b* controls the memory 406, the display driver 502*c* controls the generation of all text and graphics on the display 414, and the button input driver 502*d* debounces button inputs provided by a user using the keypad 410. In an exemplary embodiment, the serial communications driver 502*a* includes a Z-Wave™ serial API driver that implements a Z-Wave™ serial API protocol. The Z-Wave™ serial API driver that implements a Z-Wave™ serial API protocol are both commercially available from Zensys A/S.

In an exemplary embodiment, the application programs 504 include a menu-state engine 504*a*. In an exemplary embodiment, the menu-state engine 504*a* permits an operator of the hand held RF controller 202 to customize the operation of the system 100.

Figure 6:
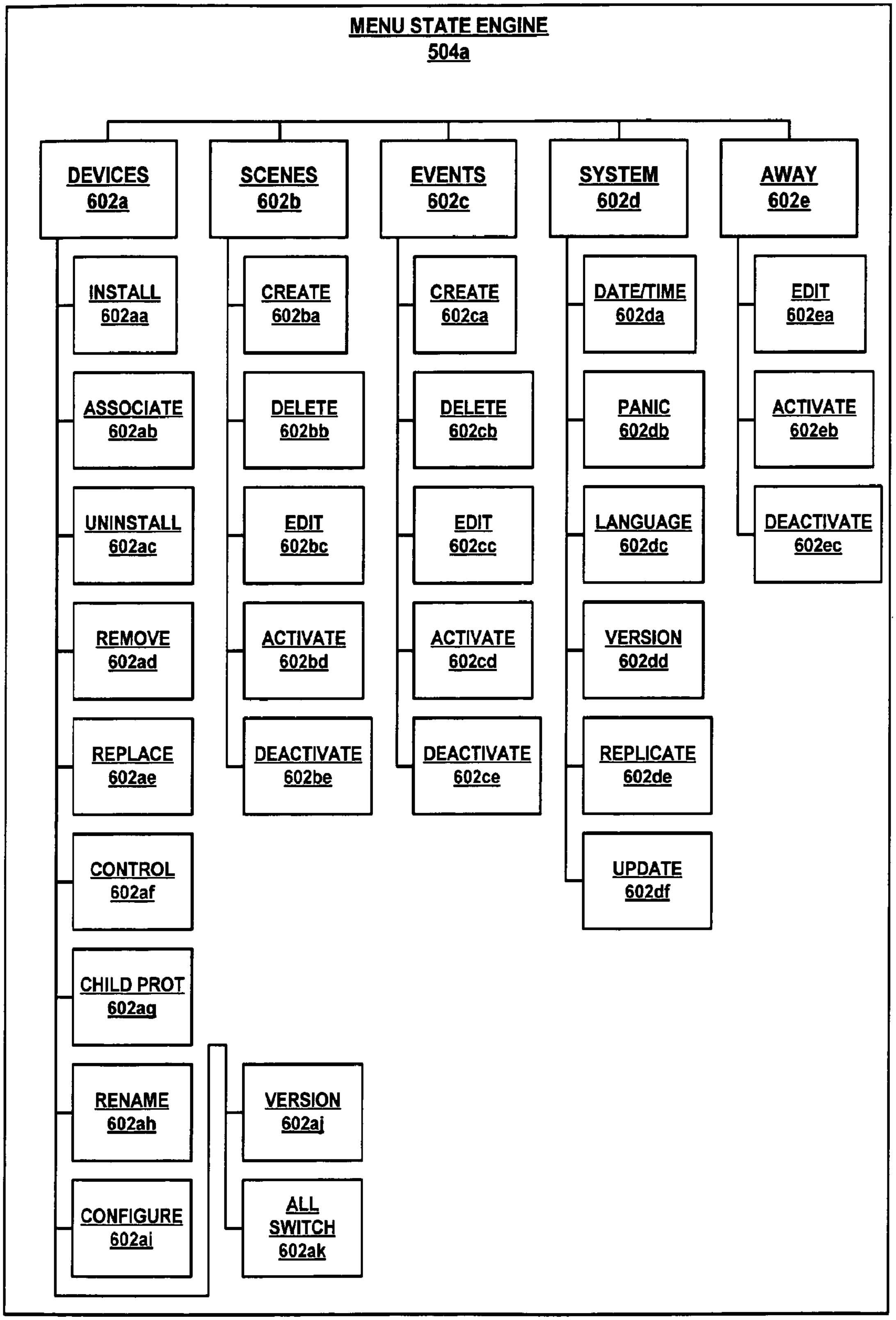
FIG. 6 is a schematic illustration of an exemplary embodiment of the menu state machine of the application programs of the controller of FIG. 5.

Referring now to FIG. 6, in an exemplary embodiment, the menu state engine 504*a* includes a device engine 602*a*, a scenes engine 602*b*, an events engine 602*c*, a system engine 602*d*, and an away engine 603*e*.

In an exemplary embodiment, the device engine 602*a* permits the operator of the hand held RF controller 202 to customize the operation of at least some of the aspects of the master and slave nodes, 102 and 104, respectively. In an exemplary embodiment, the device engine 602*a* includes a device install engine 602*aa*, a device associate engine 602*ab*, a device uninstall engine 602*ac*, a device remove engine 602*ad*, a device replace engine 602*ae*, a device control engine 602*af*, a device child protection engine 602*ag*, a device rename engine 602*ah*, a device configure engine 602*ai*, a device version engine 602*aj*, and a device all switch engine 602*ak*.

Figure 7:
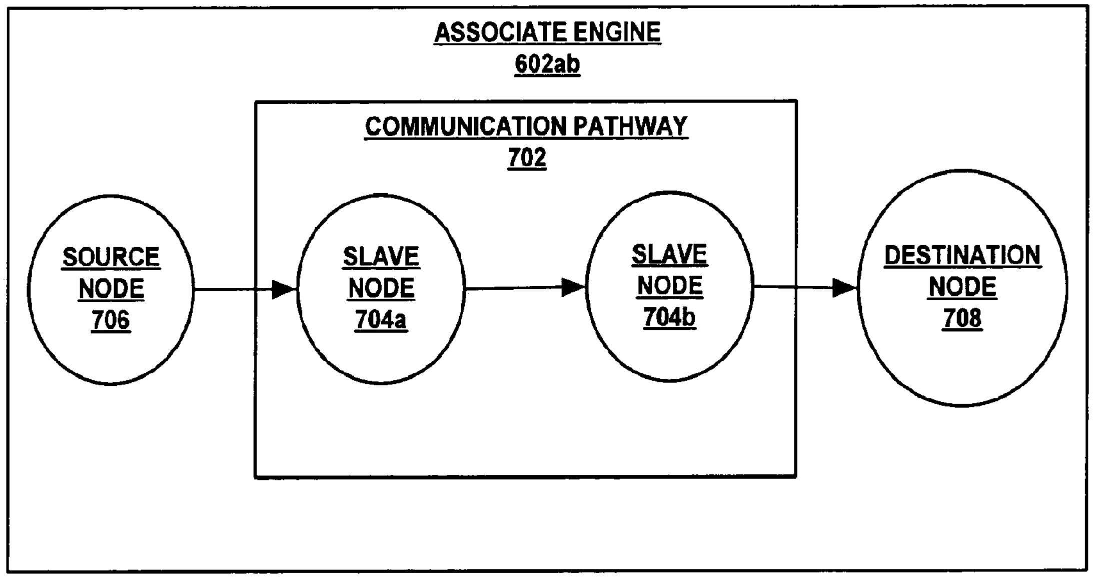
FIG. 7 is a schematic illustration of an exemplary embodiment of a communication pathway of the associate engine of the menu state machine of FIG. 6.

In an exemplary embodiment, the device install engine 602*aa* permits an operator of the hand held RF controller 202 to install one or more master and/or slave nodes, 102 and 104, respectively, into the system 100. In an exemplary embodiment, as illustrated in FIG. 7, the device associate engine 602*ab* permits the operator of the hand held RF controller 202 to associate one or more master and/or slave nodes, 102 and 104, with one another to thereby define a communication pathway 702 that includes the associated nodes, e.g., 704*a* and 704*b*. As a result, communications between a source node 706 and a destination node 708 within the system 100 may employ the defined pathway 702.

In an exemplary embodiment, the device uninstall engine 602*ac* permits an operator of the hand held RF controller 202 to uninstall one or more master and/or slave nodes, 102 and 104, respectively, out of the system 100. In an exemplary embodiment, the device remove engine 602*ad* permits an operator of the hand held RF controller 202 to remove one or more master and/or slave nodes, 102 and 104, respectively, from the system 100.

In an exemplary embodiment, the device replace engine 602*ae* permits an operator of the hand held RF controller 202 to replace one or more master and/or slave nodes, 102 and 104, respectively, with other master and/or slave nodes in the system 100. In an exemplary embodiment, the device control engine 602*af* permits an operator of the hand held RF controller 202 to control one or more master and/or slave nodes, 102 and 104, respectively, in the system 100.

In an exemplary embodiment, the device child protection engine 602*ag* permits an operator of the hand held RF controller 202 to define the level of child protection for one or more master and/or slave nodes, 102 and 104, respectively, in the system 100. In an exemplary embodiment, the device rename engine 602*ah* permits an operator of the hand held RF controller 202 to rename one or more master and/or slave nodes, 102 and 104, respectively, in the system 100.

In an exemplary embodiment, the device configure engine 602*ai* permits an operator of the hand held RF controller 202 to configure one or more master and/or slave nodes, 102 and 104, respectively, in the system 100. In an exemplary embodiment, the device version engine 602*aj*, permits an operator of the hand held RF controller 202 to determine and/or configure the version of one or more master and/or slave nodes, 102 and 104, respectively, in the system 100.

In an exemplary embodiment, the device all switch engine 602*ak* permits an operator of the hand held RF controller 202 to define and configure the operation of the master and/or slave nodes, 102 and 104, respectively, to be included in an all switch group defined within the system 100.

Figure 8:
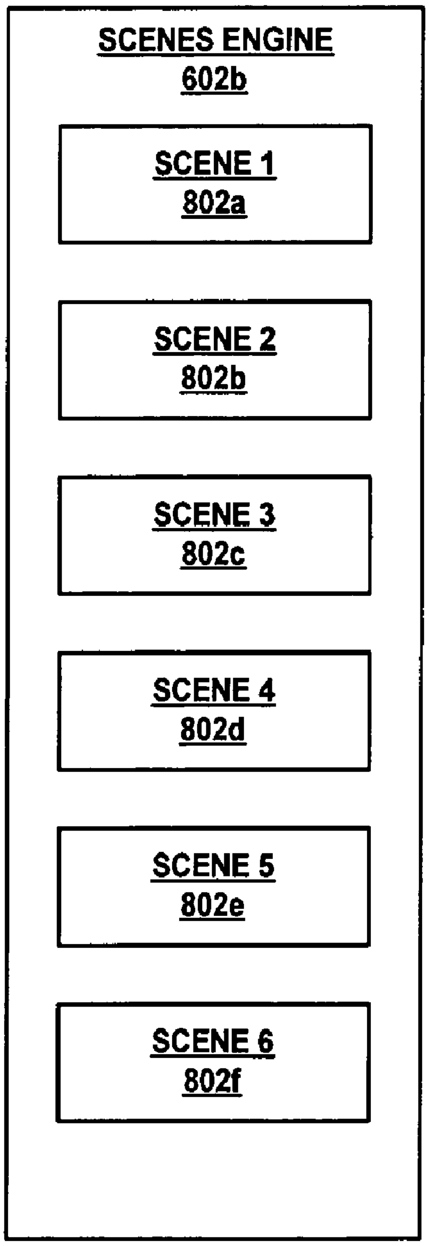
FIG. 8 is a schematic illustration of an exemplary embodiment of the scenes engine of the menu state machine of FIG. 6.
Figure 9:
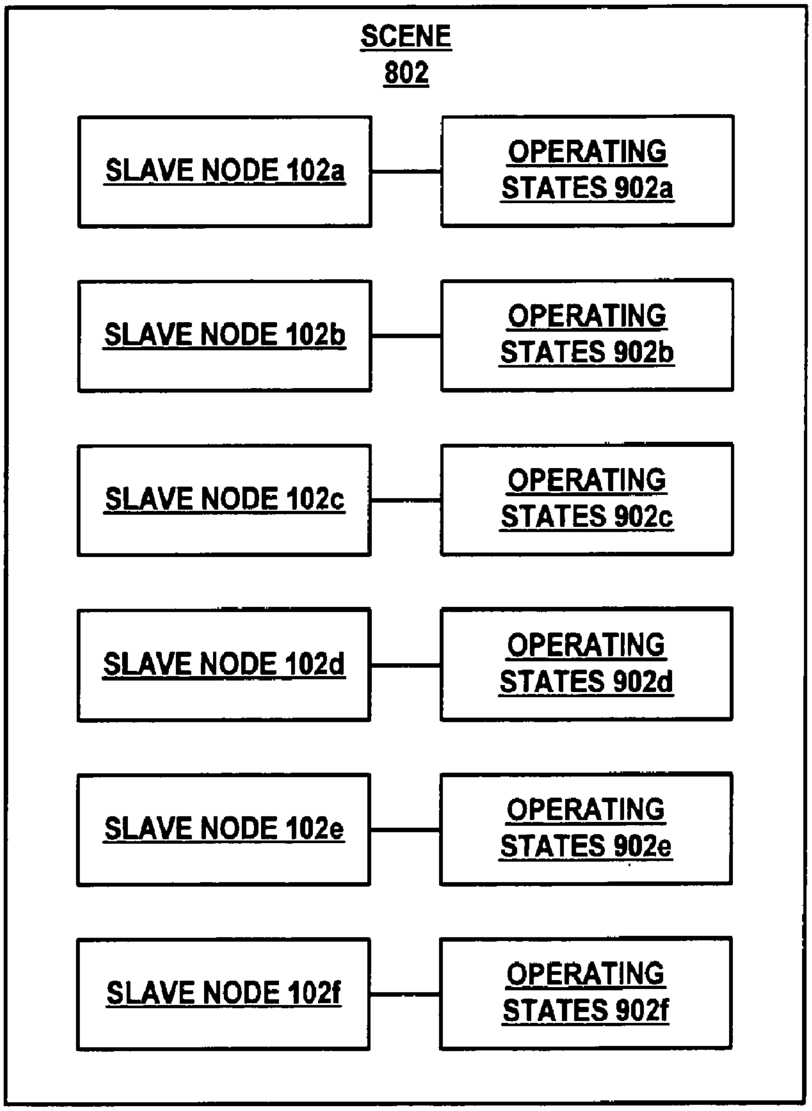
FIG. 9 is a schematic illustration of an exemplary embodiment of a scene in the scenes engine of FIG. 8.

In an exemplary embodiment, as illustrated in FIG. 8, the scenes engine 602*b* permits the operator of the hand held RF controller 202 to customize, define, and otherwise control the operation of one or more scenes, e.g., 802*a*-802*f*, using one or more of the slave nodes 102 in the system 100. In an exemplary embodiment, as illustrated in FIG. 9, each scene 802 defines the operating states, e.g., 904*a*-904*f* one or more corresponding slave nodes 102*a*-102*f*, in the system 100.

In an exemplary embodiment, the scenes engine 602*b* includes a scenes create engine 602*ba*, a scenes delete engine 602*bb*, a scenes edit engine 602*bc*, a scenes activate engine 602*bd*, and a scenes deactivate engine 602*be*.

In an exemplary embodiment, the scenes create engine 602*ba* permits an operator of the hand held RF controller 202 to create one or more scenes 802 in the system 100. In an exemplary embodiment, the scenes delete engine 602*bb* permits an operator of the hand held RF controller 202 to delete one or more scenes 802 from the system 100.

In an exemplary embodiment, the scenes edit engine 602*bc* permits an operator of the hand held RF controller 202 to edit one or more scenes 802 in the system 100. In an exemplary embodiment, the scenes activate engine 602*bd* permits an operator of the hand held RF controller 202 to activate one or more scenes 802 in the system 100. In an exemplary embodiment, the scenes deactivate engine 602*be* permits an operator of the hand held RF controller 202 to deactivate one or more scenes 802 in the system 100.

Figure 10:
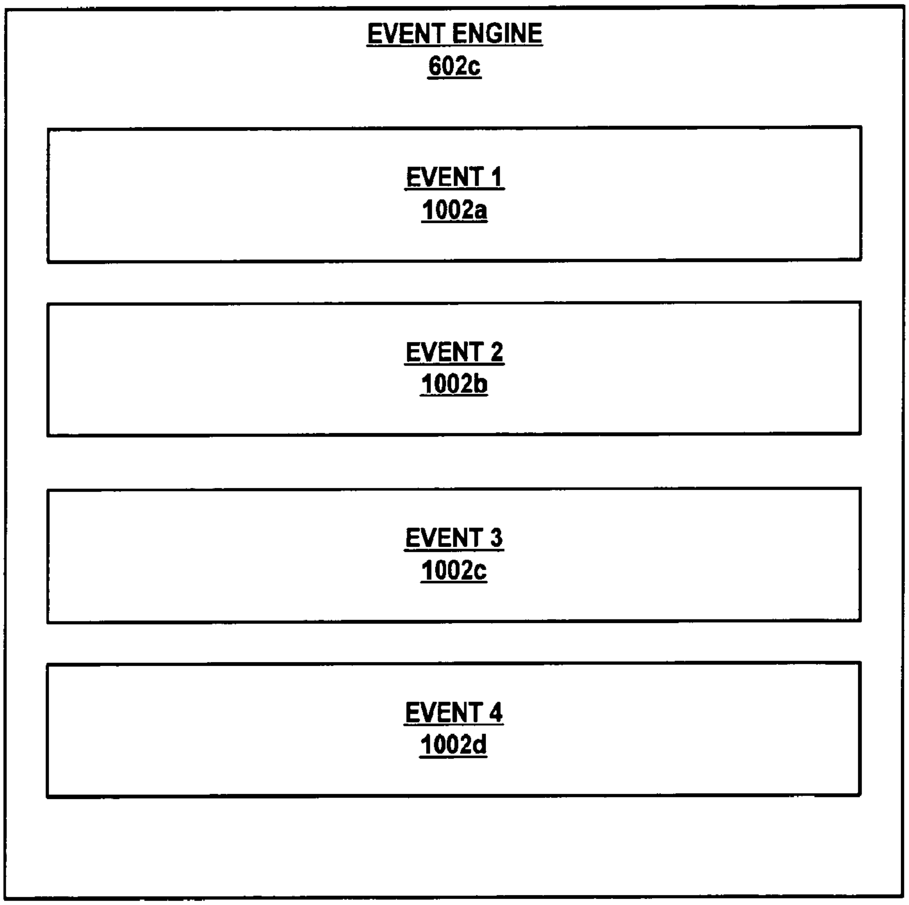
FIG. 10 is a schematic illustration of an exemplary embodiment of the event engine of the menu state engine of FIG. 6.
Figure 11:
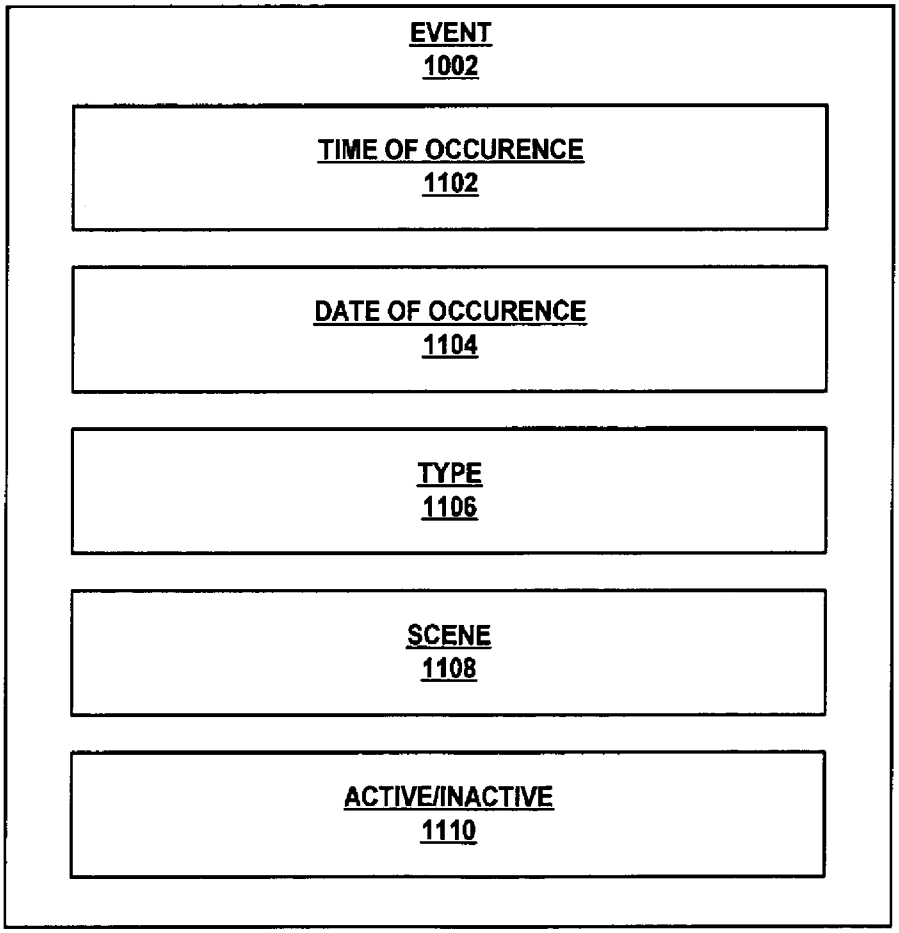
FIG. 11 is a schematic illustration of an exemplary embodiment of an event in the event engine of FIG. 10.

In an exemplary embodiment, as illustrated in FIG. 10, the events engine 602*c* permits the operator of the hand held RF controller 202 to customize, define, and otherwise control the operation of one or more events, e.g., 1002*a*-1002*d*, using one or more of the slave nodes 102 in the system 100. In an exemplary embodiment, as illustrated in FIG. 11, each event 1002 includes a time of occurrence 1102, a day of occurrence 1104, an event type 1106, the scene to be used in the event 1108, and whether the event is active or inactive 1110.

In an exemplary embodiment, the events engine 602*c* includes an events create engine 602*ca*, an events delete engine 602*cb*, an events edit engine 602*cc*, an events activate engine 602*cd*, and an events deactivate engine 602*ce*.

In an exemplary embodiment, the events create engine 602*ca* permits an operator of the hand held RF controller 202 to create one or more events 1002 in the system 100. In an exemplary embodiment, the events delete engine 602*cb* permits an operator of the hand held RF controller 202 to delete one or more events 1002 from the system 100.

In an exemplary embodiment, the events edit engine 602*cc* permits an operator of the hand held RF controller 202 to edit one or more events 1002 in the system 100. In an exemplary embodiment, the events activate engine 602*cd* permits an operator of the hand held RF controller 202 to activate one or more events 1002 in the system 100. In an exemplary embodiment, the events deactivate engine 602*ce* permits an operator of the hand held RF controller 202 to deactivate one or more events 1002 in the system 100.

In an exemplary embodiment, the system engine 602*d* includes a system date/time engine 602*da*, a system panic engine 602*db*, a system language engine 602*dc*, a system version engine 602*dd*, a system replicate engine 602*de*, and a system update engine 602*df*.

In an exemplary embodiment, the system date/time engine 602*da* permits an operator of the hand held RF controller 202 to enter and/or edit the date and time of the system 100.

Figure 12:
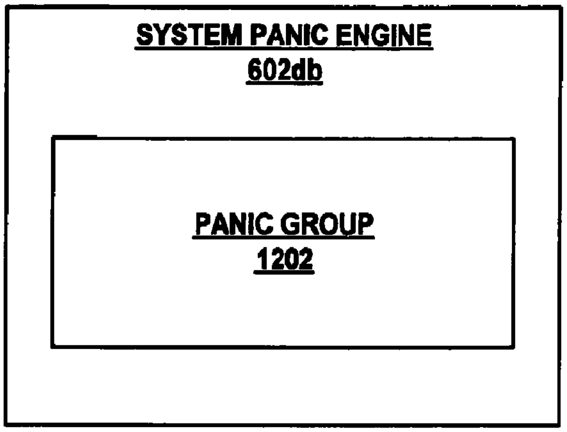
FIG. 12 is a schematic illustration of an exemplary embodiment of the system panic engine of the menu state engine of FIG. 6.
Figure 13:
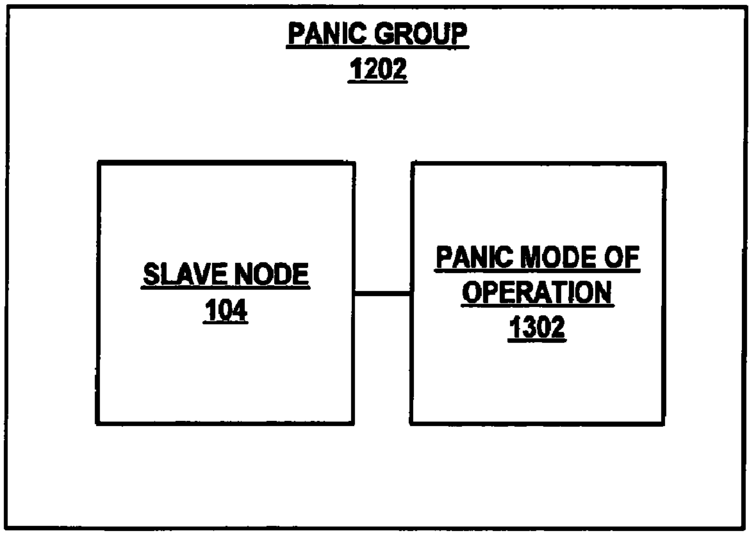
FIG. 13 is a schematic illustration of an exemplary embodiment of a panic group in the system panic engine of FIG. 12.

In an exemplary embodiment, as illustrated in FIG. 12, the system panic engine 602*db* permits an operator of the hand held RF controller 202 to define a panic group 1202 within the system 100. In an exemplary embodiment, as illustrated in FIG. 13, the panic group 1202 includes one or more slave nodes 104 and corresponding panic modes of operation 1302 for each of the slave nodes included in the panic group 1202.

In an exemplary embodiment, the system language engine 602*dc* permits an operator of the hand held RF controller 202 to define the language to be used in the system 100. In an exemplary embodiment, the system version engine 602*dd* permits an operator of the hand held RF controller 202 to view the system version of the system 100 on, for example, the display 414.

In an exemplary embodiment, the system replicate engine 602*de* permits an operator of the hand held RF controller 202 to replicate one or more aspects of the hand held RF controller into another master node 102 to be used in the system 100. In an exemplary embodiment, the system update engine 602*df* permits an operator of the hand held RF controller 202 to update one or more aspects of the operating system 502 or application programs 504 to be used in the system 100.

Figure 14:
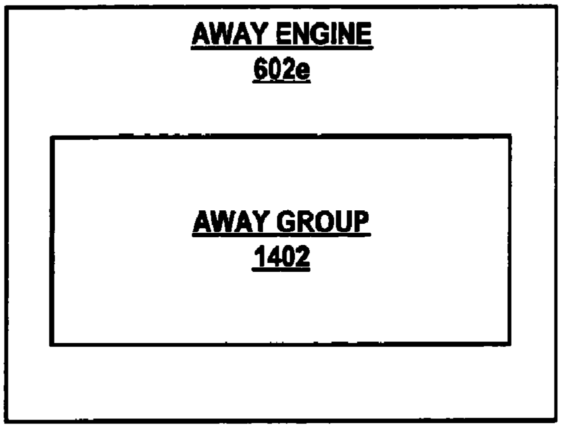
FIG. 14 is a schematic illustration of an exemplary embodiment of the away engine of the menu state engine of FIG. 6.
Figure 15:
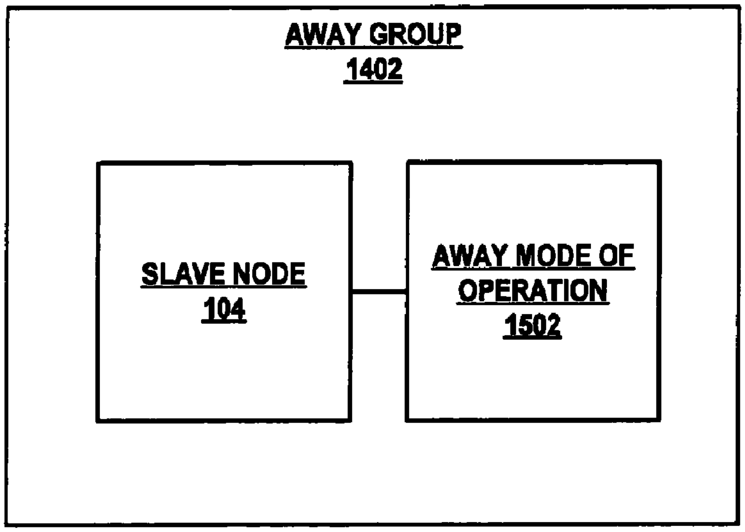
FIG. 15 is a schematic illustration of an exemplary embodiment of an away group in the away engine of FIG. 14.

In an exemplary embodiment, as illustrated in FIG. 14, the away engine 602*e* permits an operator of the hand held RF controller 202 to define an away group 1402 within the system 100. In an exemplary embodiment, as illustrated in FIG. 15, the away group 1402 includes one or more slave nodes 104 and corresponding away modes of operation 1502 for each of the slave nodes included in the away group 1402.

In an exemplary embodiment, the away engine 602*e* includes an away group edit engine 602*ea*, an away group activate engine 602*eb*, and an away group deactivate engine 602*ec*.

In an exemplary embodiment, the away group edit engine 602*ea* permits an operator of the hand held RF controller 202 to edit one or more aspects of the away group 1402 to be used in the system 100. In an exemplary embodiment, the away group activate engine 602*eb* permits an operator of the hand held RF controller 202 to activate one or more aspects of the away group 1402 used in the system 100. In an exemplary embodiment, the away group deactivate engine 602*ec* permits an operator of the hand held RF controller 202 to deactivate one or more aspects of the away group 1402 used in the system 100.

In an exemplary embodiment, the RF transceiver 404 is operably coupled to and controlled by the controller 402. In an exemplary embodiment, the RF transceiver 404 transmits and receives RF communications to and from other master and slave nodes, 102 and 104, respectively. In an exemplary embodiment, the RF transceiver 404 may, for example, include one or more of the following: a conventional RF transceiver, and/or the model ZW0201 RF transceiver commercially available from Zensys A/S.

Figure 16:
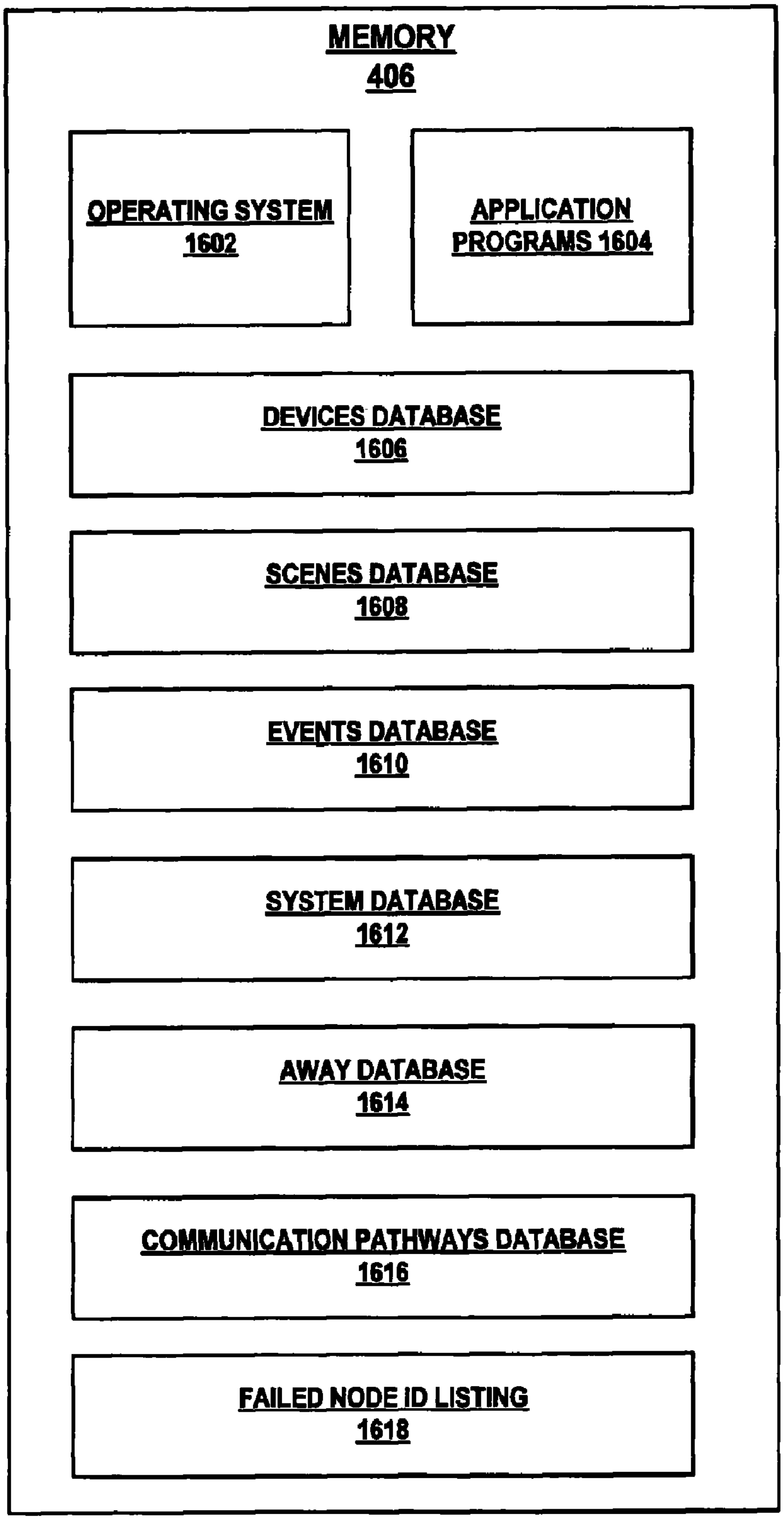
FIG. 16 is a schematic illustration of an exemplary embodiment of the memory of the radio frequency controller of FIG. 4.

In an exemplary embodiment, the memory 406 is operably coupled to and controlled by the controller 402. In an exemplary embodiment, as illustrated in FIG. 16, the memory 406 includes a copy of the operating system 1602, a copy of the application programs 1604, a devices database 1606, scenes database 1608, an events database 1610, a system database 1612, an away database 1614, a communications pathway database 1616, and a failed node ID listing 1618. In an exemplary embodiment, the memory 406 includes a model 24LC256 non volatile memory, commercially available from Microchip.

Figure 17:
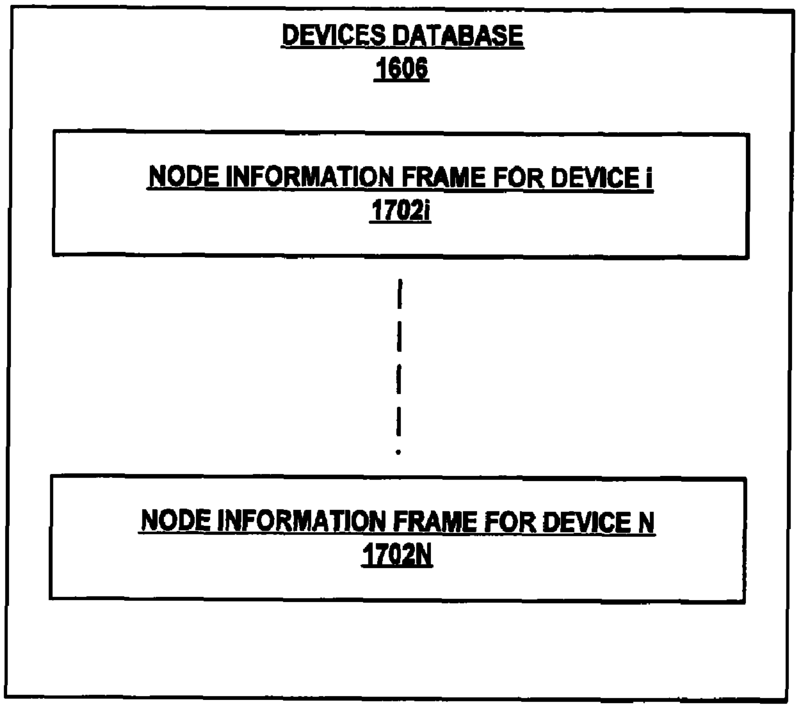
FIG. 17 is a schematic illustration of an exemplary embodiment of the devices database of the memory of FIG. 16.
Figure 18:
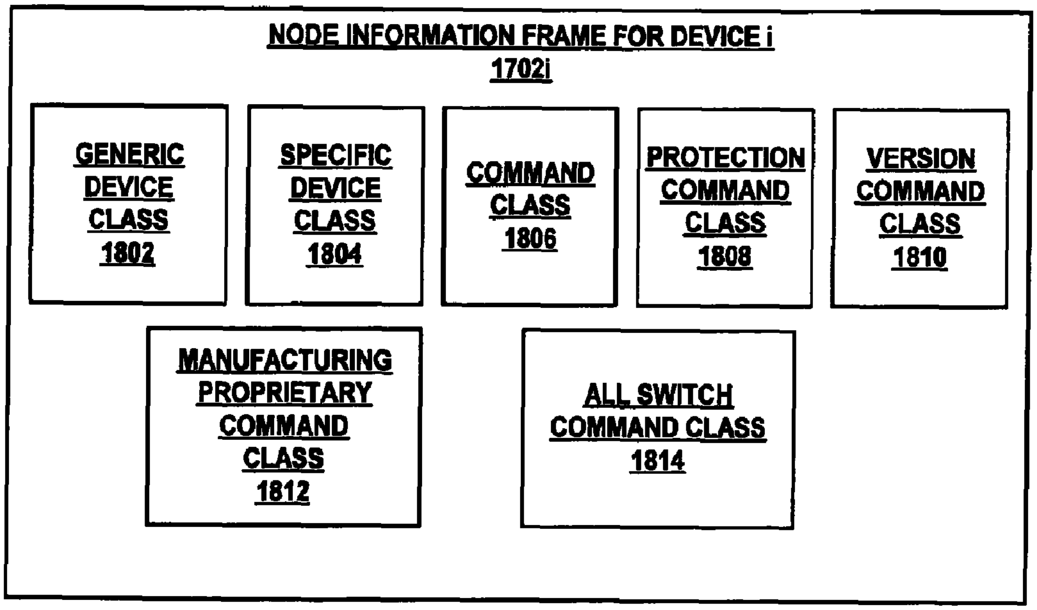
FIG. 18 is a schematic illustration of an exemplary embodiment of the node information frame for the devices database of FIG. 17.

In an exemplary embodiment, as illustrated in FIGS. 17 and 18, the devices database 1606 includes a node information frame 1702 for each of the nodes in the system 100 that each include a generic device class 1802, a specific device class 1804, a command class 1806, a protection command class 1808, a version command class 1810, a manufacturing proprietary command class 1810, and an all switch command class 1812. In an exemplary embodiment, the devices database 1606 includes database information used by at least the devices engine 602*a*.

In an exemplary embodiment, the scenes database 1608 includes database information used by at least the scenes engine 602*b*. In an exemplary embodiment, the events database 1610 includes database information used by at least the events engine 602*c*. In an exemplary embodiment, the system database 1612 includes database information used by at least the system engine 602*d*. In an exemplary embodiment, the away database 1614 includes database information used by at least the away engine 602*e*.

In an exemplary embodiment, the communications pathway database 1616 includes database information regarding the communication pathways 702, and the failed node ID listing 1618 includes information regarding the master and slave nodes, 102 and 104, respectively, that have failed in the system 100.

In an exemplary embodiment, the network interface 408 is operably coupled to and controlled and monitored by the controller 402. In an exemplary embodiment, the network interface 408 permits the hand held RF controller 202 to communicate with external devices via conventional communication interfaces such as, for example, internet protocol.

Figure 19:
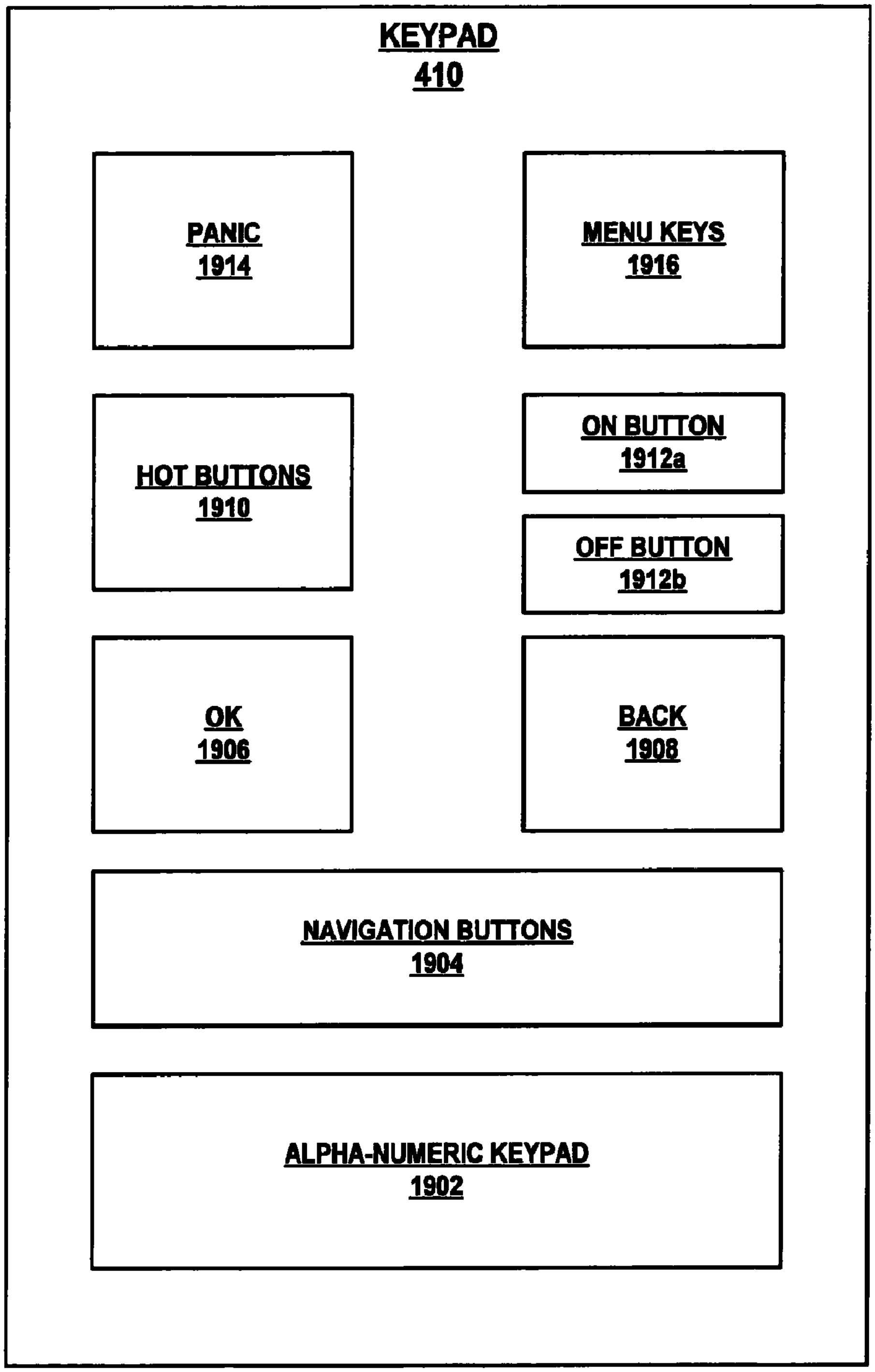
FIG. 19 is a schematic illustration of an exemplary embodiment of the keypad of the radio frequency controller of FIG. 4.

In an exemplary embodiment, the keypad 410 is operably coupled to and controlled and monitored by the controller 402. In an exemplary embodiment, the keypad 410 permits a user of the hand held RF controller 202 to input information into the controller to thereby control the operation of the controller. In an exemplary embodiment, as illustrated in FIG. 19, the keypad 410 includes an alpha-numeric keypad 1902, navigation buttons 1904, an OK button 1906, a BACK button 1908, one or more user programmable HOT BUTTONS 1910, ON button 1912*a*, OFF button 1912*b*, a PANIC button 1914, and one or more user programmable MENU KEYS 1916.

In an exemplary embodiment, the user interface 412 is operably coupled to and controlled and monitored by the controller 402. In an exemplary embodiment, the user interface 412 permits a user of the hand held RF controller 202 to interface with the controller to thereby monitor and control the operation of the controller.

In an exemplary embodiment, the display 414 is operably coupled to and controlled and monitored by the controller 402. In an exemplary embodiment, the display 414 permits a user of the hand held RF controller 202 to interface with the controller to thereby monitor and control the operation of the controller. In an exemplary embodiment, the display 414 includes a model JCM13064D display, commercially available from Jinghua.

In an exemplary embodiment, the battery 416 provides electrical power for and is operably coupled to all of the elements of the hand held RF controller 202.

Figures 19A, 19B:
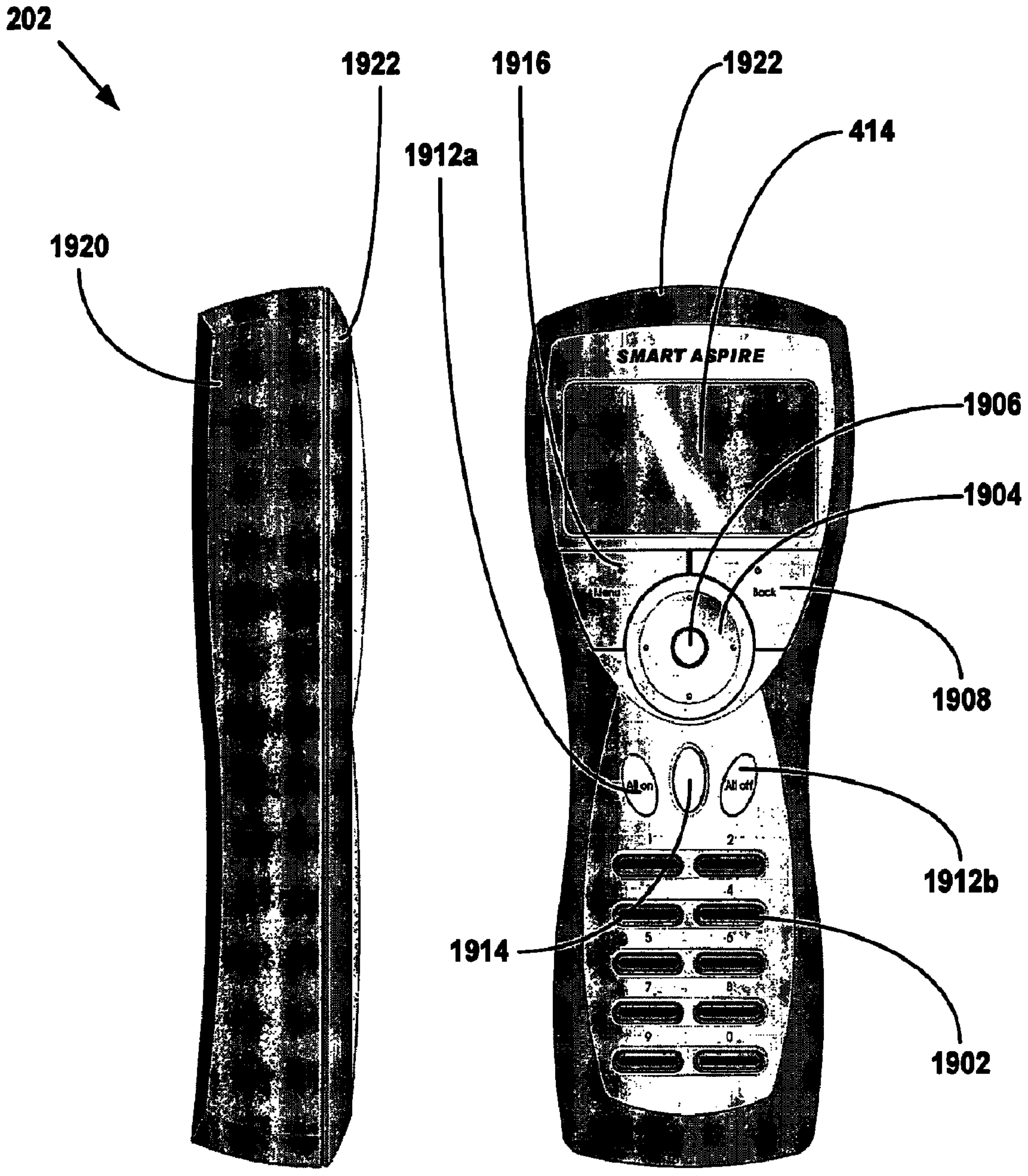
FIGS. 19*a* and 19*b* are side and front view illustrations of an exemplary embodiment of the housing of the hand held radio frequency controller.

In an exemplary embodiment, as illustrated in FIGS. 19*a* and 19*b*, the elements of the hand held RF controller 202 may be positioned within and supported by a housing 1920 having a cover 1922 that defines one or more openings for the keypad 410, including one or more of the alpha-numeric keypad 1902, the navigation buttons 1904, the OK button 1906, the BACK button 1908, the ALL ON button 1912*a*, the ALL OFF button 1912*b*, the PANIC button 1914, and the MENU keys 1916, and the display 414.

Figure 20:
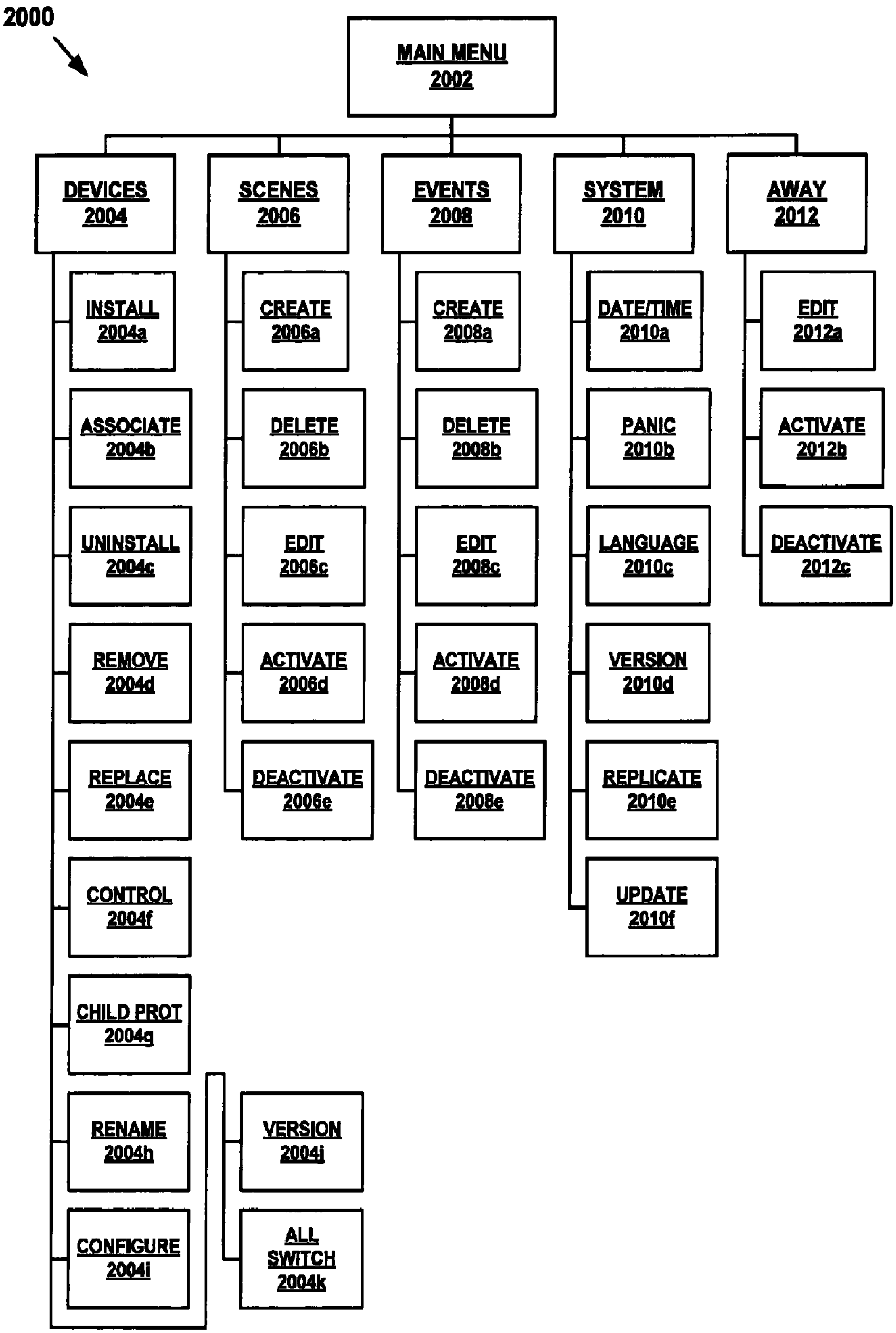
FIG. 20 is a schematic illustration of an exemplary embodiment of the main menu during operation of the radio frequency controller of FIG. 4.

Referring now to FIG. 20, in an exemplary embodiment, during the operation of the hand held RF controller 202, the controller implements a menu-based program 2000 having a main menu 2002 in which a user of the hand held RF controller may initially select: DEVICES 2004, SCENES 2006, EVENTS 2008, SYSTEM 2010, or AWAY 2012 using the keypad 410.

In an exemplary embodiment, user selection of DEVICES 2004 permits the user to control, monitor and/or configure one or more aspects of the master and slave nodes, 102 and 104, respectively of the system 100 using the device engine 602*a*. In an exemplary embodiment, user selection of SCENES 2006 permits the user to control, monitor, and/or configure one or more aspects of the scenes 802 of the system 100 using the scenes engine 602*b*. In an exemplary embodiment, user selection of EVENTS 2008 permits the user to control, monitor, and/or configure one or more aspects of the events 1002 of the system 100 using the event engine 602*c*. In an exemplary embodiment, user selection of SYSTEM 2010 permits the user to control, monitor, and/or configure one or more aspects of the system 100 using the system engine 602*d*. In an exemplary embodiment, user selection of AWAY 2012 permits the user to control, monitor, and/or configure one or more aspects of the away group 1402 of the system 100 using the away engine 602*e*.

After selecting DEVICES 2004, the user of the hand held RF controller 202 may then select: INSTALL 2004*a*, ASSOCIATE 2004*b*, UNINSTALL 2004*c*, REMOVE 2004*d*, REPLACE 2004*e*, CONTROL 2004*f*, CHILD PROTECTION 2004*g*, RENAME 2004*h*, CONFIGURE 2004*i*, VERSION 2004*j*, or ALL SWITCH 2004*k*. In an exemplary embodiment, user selection of: a) INSTALL 2004*a*, b) ASSOCIATE 2004*b*, c) UNINSTALL 2004*c*, d) REMOVE 2004*d*, e) REPLACE 2004*e*, f) CONTROL 2004*f*, g) CHILD PROTECTION 2004*g*, h) RENAME 2004*h*, i) CONFIGURE 2004*i*, j) VERSION 2004*j*, or k) ALL SWITCH 2004*k* permits the user to control, monitor, and/or configure one or more aspects of: a) the installation of master and/or slave nodes, 102 and 104, respectively; b) the association of slave nodes; c) the uninstallation of master and/or slave nodes; d) the removal of master and/or slave nodes; e) the replacement of master and/or slave nodes; f) the control of master and/or slave nodes; g) child protection for master and/or slave nodes; h) renaming master and/or slave nodes; i) configuring master and for slave nodes; j) controlling, editing, and monitoring the version of master and/or slave nodes; or k) configuring and controlling the slave nodes in the all switch group, respectively, in the system 100 using the devices engine 602*a*.

After selecting SCENES 2006, the user of the hand held RF controller 202 may then select: CREATE 2006*a*, DELETE 2006*b*, EDIT 2006*c*, ACTIVATE 2006*d*, or DEACTIVATE 2006*e*. In an exemplary embodiment, user selection of a) CREATE 2006*a*, b) DELETE 2006*b*, c) EDIT 2006*c*, d) ACTIVATE 2006*d*, or e) DEACTIVATE 2006*e* permits the user to control, monitor, and/or configure one or more aspects of: a) creating scenes 802; b) deleting scenes; c) editing scenes; d) activating scenes; or e) deactivating scenes, respectively, in the system 100 using the scenes engine 602*b*.

After selecting EVENTS 2008, the user of the hand held RF controller 202 may then select: CREATE 2008*a*, DELETE 2008*b*, EDIT 2008*c*, ACTIVATE 2008*d*, or DEACTIVATE 2008*e*. In an exemplary embodiment, user selection of a) CREATE 2008*a*, b) DELETE 2008*b*, c) EDIT 2008*c, d)* ACTIVATE 2008*d*, or e) DEACTIVATE 2008*e* permits the user to control, monitor, and/or configure one or more aspects of: a) creating events 1002; b) deleting events; c) editing events; d) activating events; or e) deactivating events, respectively, in the system 100 using the event engine 602*c*.

After selecting SYSTEM 2010, the user of the hand held RF controller 202 may then select: DATE/TIME 2010*a*, PANIC 2010*b*, LANGUAGE 2010*c*, VERSION 2010*d*, REPLICATE 2010*e*, or UPDATE 2010*f*. In an exemplary embodiment, user selection of a) DATE/TIME 2010*a*, b) PANIC 2010*b*, c) LANGUAGE 2010*c, d)* VERSION 2010*d*, e) REPLICATE 2010*e*, or f) UPDATE 2010*f* permits the user to control, monitor, and/or configure one or more aspects of: a) the date and time for the system 100; b) the configuration and operation of the panic group 1202; c) the language used in the system; d) the version of one or more aspects of the system; e) replicating master and/or slave nodes, or f) updating one or more aspects of the system, respectively, in the system using the system engine 602*d*.

After selecting AWAY 2012, the user of the hand held RF controller 202 may then select: EDIT 2012*a*, ACTIVATE 2012*b*, or DEACTIVATE 2012*c*. In an exemplary embodiment, user selection of a) EDIT 2012*a*, b) ACTIVATE 2012*b*, or c) DEACTIVATE 2012*c* permits the user to control, monitor, and/or configure one or more aspects of: a) the configuration and operation of the away group 1402; b) activation of the away group; or c) deactivation of the away group, respectively, in the system using the away engine 602*e*.

Figure 21:
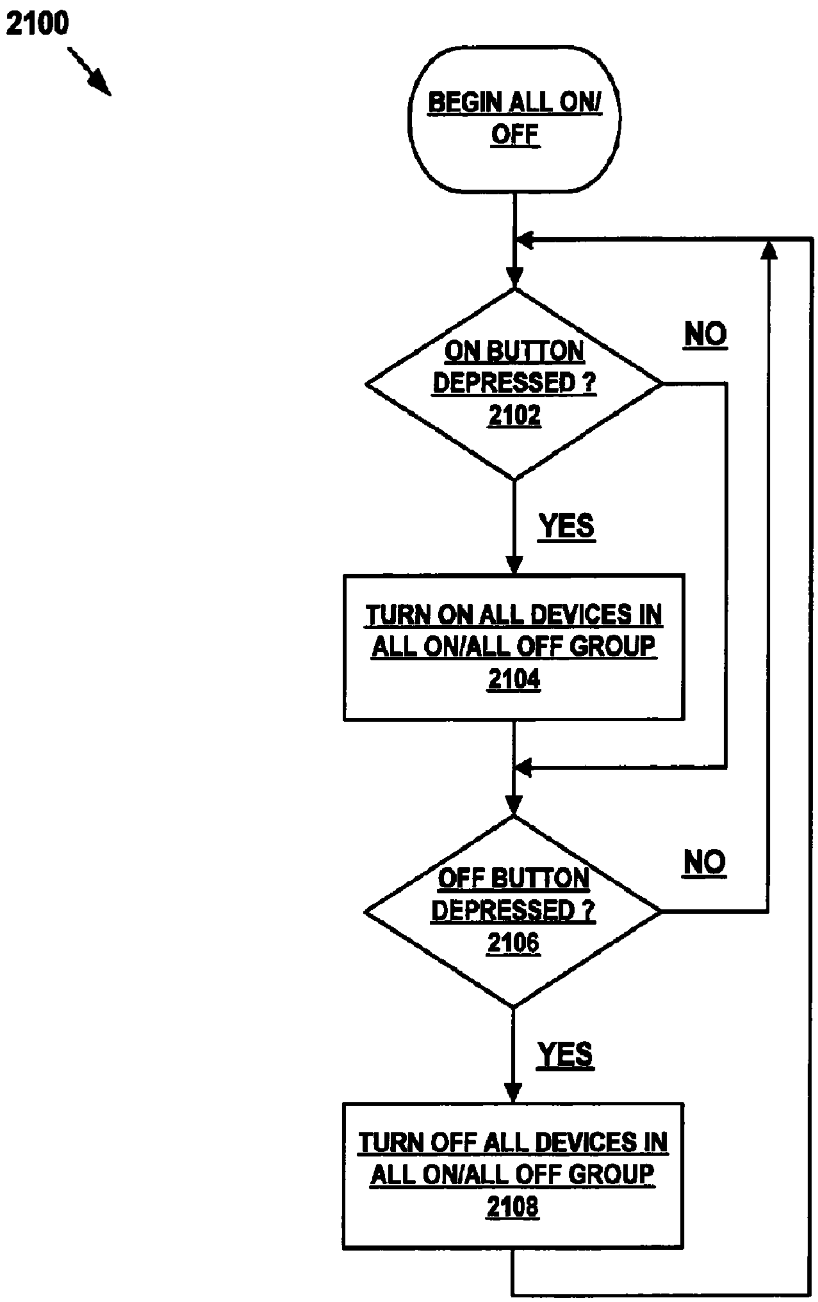
FIG. 21 is a flow chart illustration of an exemplary embodiment of a method of operating the radio frequency controller of FIG. 4 to turn on or off all of the slave nodes within an all on/off group.

Referring now to FIG. 21, in an exemplary embodiment, during the operation of the hand held RF controller 202, the controller implements a method 2100 in which all of the slave nodes 104, within a user defined all on/off group, may be turned on or off. In particular, in step 2102, the controller 302 determines if the ON button 1912*a* has been depressed by the user. If the ON button 1912 has been depressed by the user, the controller 302 turns on all of the slave nodes 104 within the all on/off group in step 2104. Alternatively, if the controller determines that the OFF button 1912*b* has been depressed by the user in step 2106, then the controller 302 turns off all of the slave nodes 104 within the all on/off group in step 2108. In this manner, the hand held RF controller 202 may control the operation of all of the slave nodes 104 included within the all on/off group.

Figure 22A:
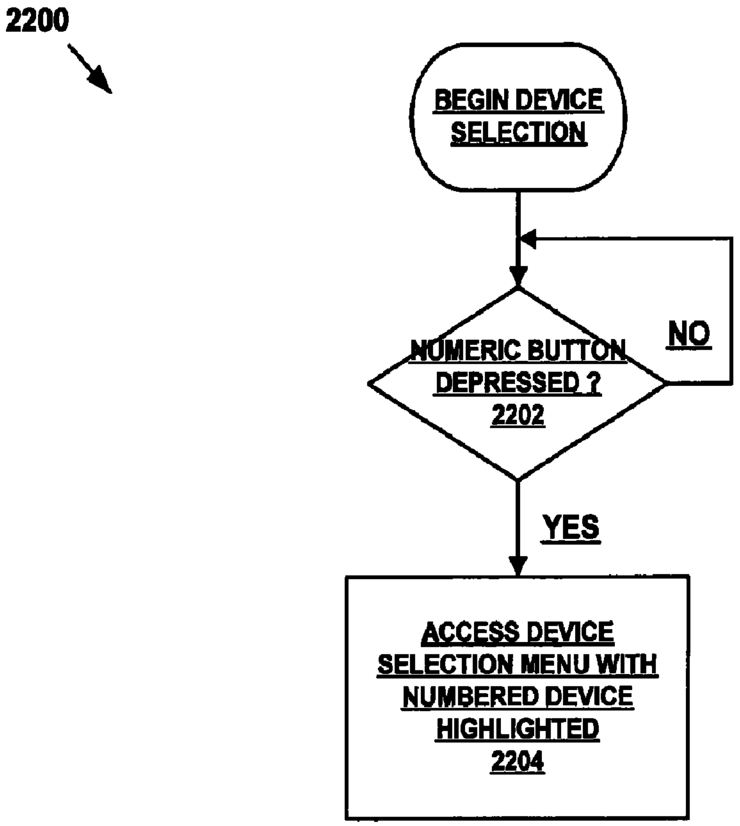
FIGS. 22*a*-22*b* is a flow chart and schematic illustration of an exemplary embodiment of a method of highlighting a device in the system.
Figure 22B:
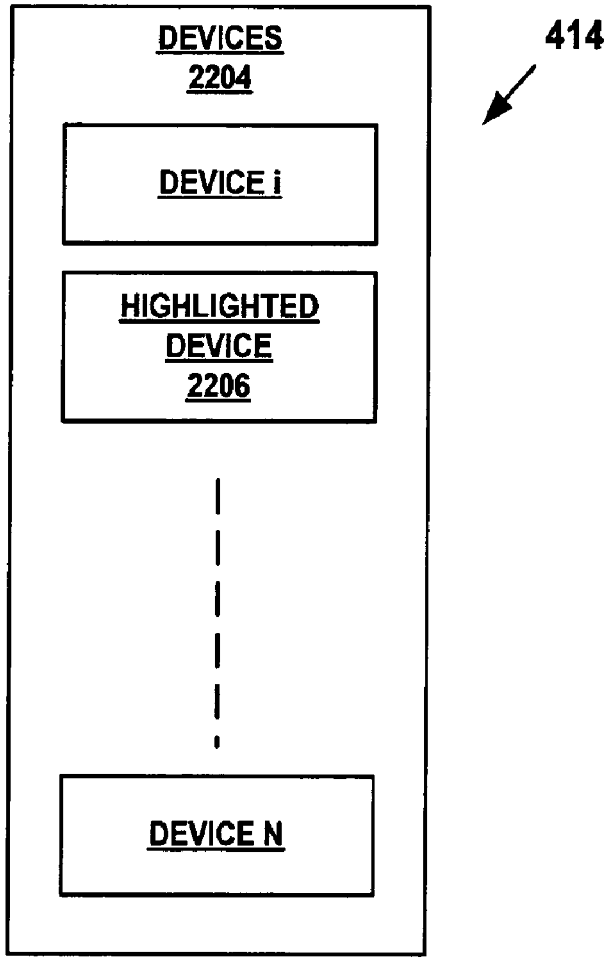

Referring now to FIGS. 22*a* and 22*b*, in an exemplary embodiment, during the operation of the hand held RF controller 202, the controller implements a method 2200 in which the controller determines if a numeric button has been depressed on the keypad 1902 by a user in step 2202. If a numeric button has been depressed on the keypad 1902 by a user, then a device access display screen 2204 is displayed on the display 414 that includes a highlighted device 2206 that corresponds to the numeric button depressed highlighted in step 2208. In this manner, the hand held RF controller 202 permits a user to quickly and efficiently select, view and/or edit the configuration and operational details for a particular master and slave node, 102 and 104, respectively.

Figure 23A:
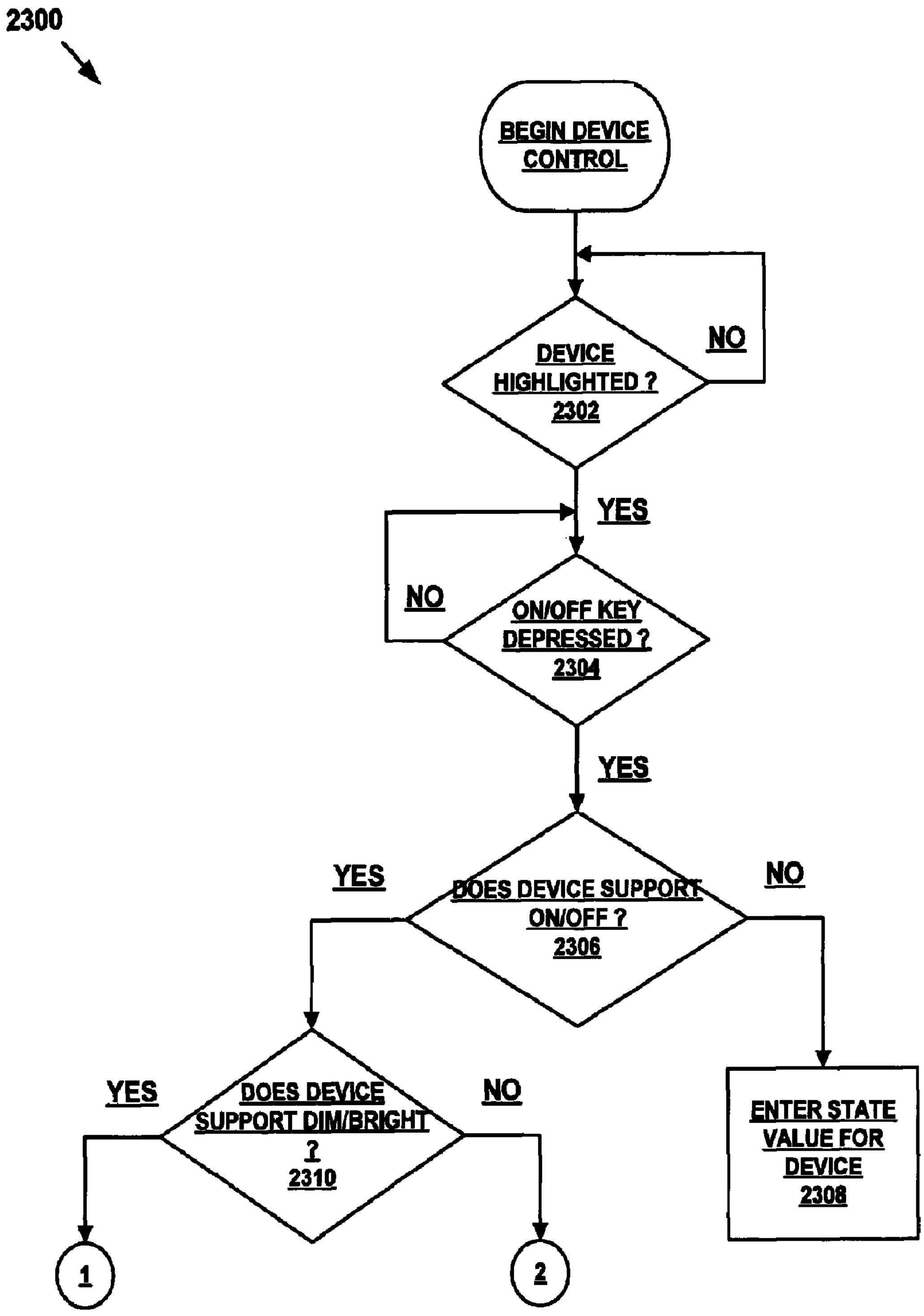
FIGS. 23*a*-23*b* is a flow chart illustration of an exemplary embodiment of a method of controlling a highlighted in the system.
Figure 23B:
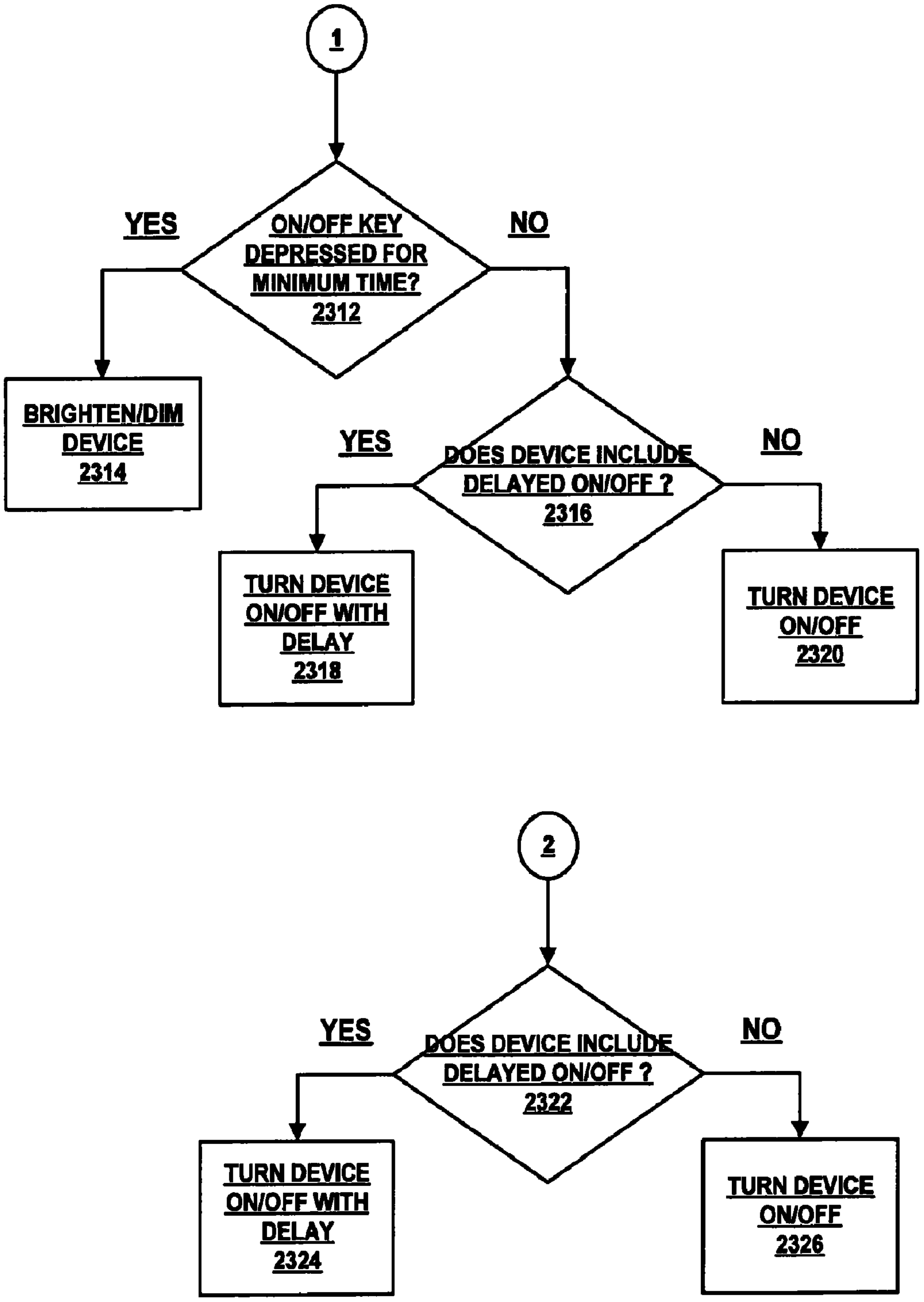

Referring now to FIGS. 23*a* and 23*b*, in an exemplary embodiment, during the operation of the hand held RF controller 202, after highlighting a selected device using the method 2200, the controller implements a method 2300 in which the controller determines if a highlighted device 2206 has been selected on the display 414 in step 2302. If a highlighted device 2206 has been selected, the hand held RF controller 202 then determines if the ON or OFF buttons, 1912*a* or 1912*b*, respectively, have been depressed on the keypad 410 by a user in step 2304. If the ON or OFF buttons, 1912*a* or 1912*b*, respectively, have been depressed on the keypad 410 by a user, then the hand held RF controller 202 then determines if the highlighted device 2206 supports on or off operational states in step 2306. If the highlighted device 2206 does not support on or off operational states, then the hand held RF controller 202 prompts the user to enter a value for the desired operational state of the highlighted device 2206 in step 2308. For example, if the highlighted device 2206 is a thermostat, the hand held RF controller 202 may prompt the user for the desired temperature setting and/or whether air conditioning or heating is desired.

Alternatively, if the highlighted device 2206 does support on or off operational states, then the hand held RF controller 202 determines if the highlighted device 2206 supports dimming or brightening operational states in step 2310. If the highlighted device 2206 supports dimming or brightening operational states, then the hand held RF controller 202 determines if the ON or OFF button, 1912*a* or 1912*b*, respectively, were depressed by a user for predetermined minimum time period in step 2312. If the ON or OFF button, 1912*a* or 1912*b*, respectively, were depressed by a user for predetermined minimum time period, then the hand held RF controller 202 brightens or dims the highlighted device 2206 in step 2314. Alternatively, if the ON or OFF button, 1912*a* or 1912*b*, respectively, were not depressed by a user for predetermined minimum time period, then the hand held RF controller 202 determines if the highlighted device 2206 permits a delay in turning the device on or off in step 2316. If the highlighted device 2206 permits a delay in turning the device on or off, then the hand held RF controller 202 turns the device on or off with a predetermined time delay in step 2318. Alternatively, if the highlighted device 2206 does not permit a delay in turning the device on or off, then the hand held RF controller 202 turns the device on or off without a predetermined time delay in step 2320.

Alternatively, if the highlighted device 2206 does not support dimming or brightening operational states, then the hand held RF controller 202 determines if the highlighted device 2206 permits a delay in turning the device on or off in step 2322. If the highlighted device 2206 permits a delay in turning the device on or off, then the hand held RF controller 202 turns the device on or off with a predetermined time delay in step 2324. Alternatively, if the highlighted device 2206 does not permit a delay in turning the device on or off, then the hand held RF controller 202 turns the device on or off without a predetermined time delay in step 2326. In this manner, the hand held RF controller 202 permits a user to quickly and efficiently control the operational state of a particular slave node 104, and thereby control the operational state of the highlighted device 2206 by: a) turning the device on or off without a time delay; b) turning the device on or off with a time delay; or c) brighten or dim the device.

Figure 24A:
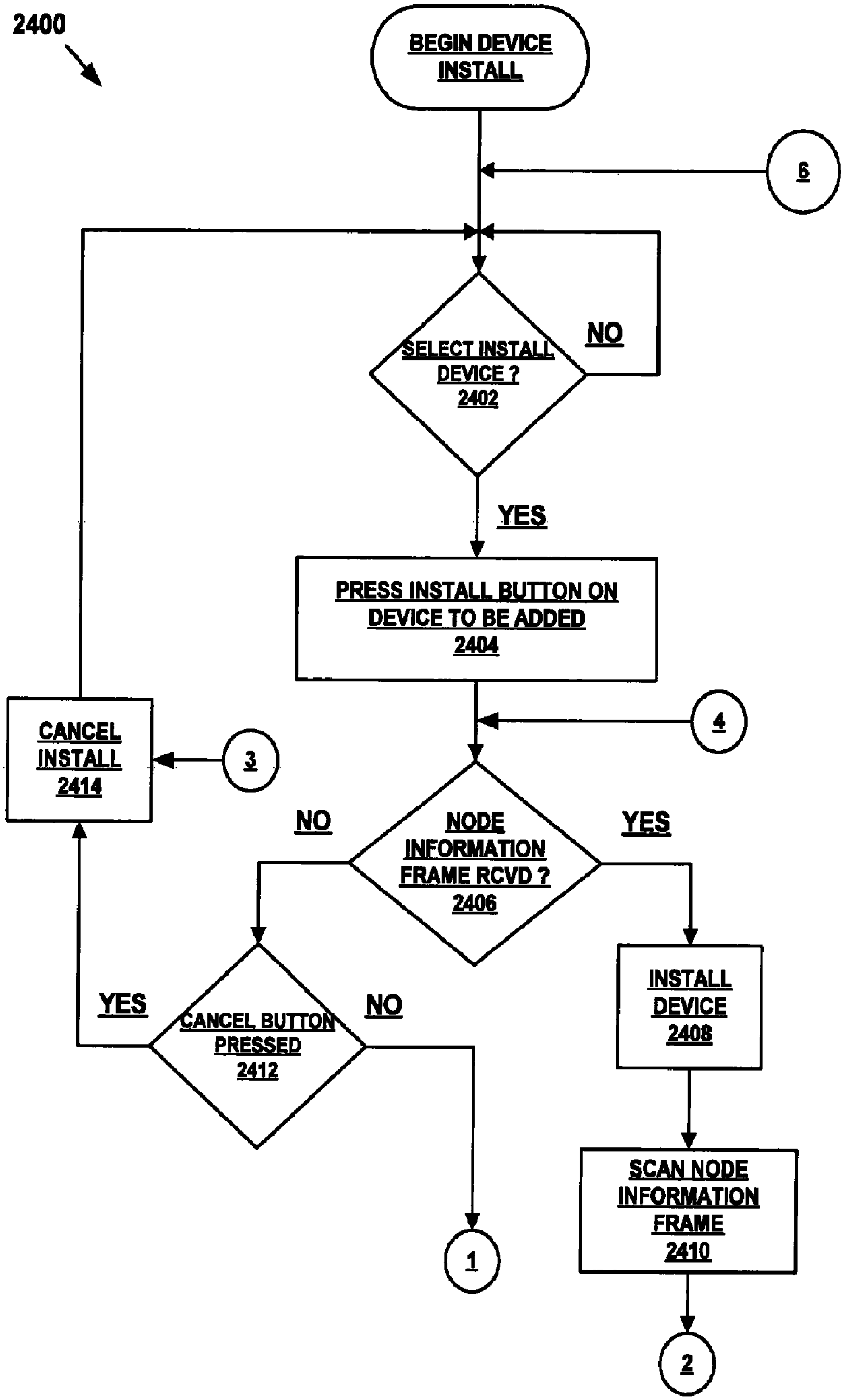
FIGS. 24*a*-24*c* is a flow chart illustration of an exemplary embodiment of a method of installing a device in the system.
Figure 24B:
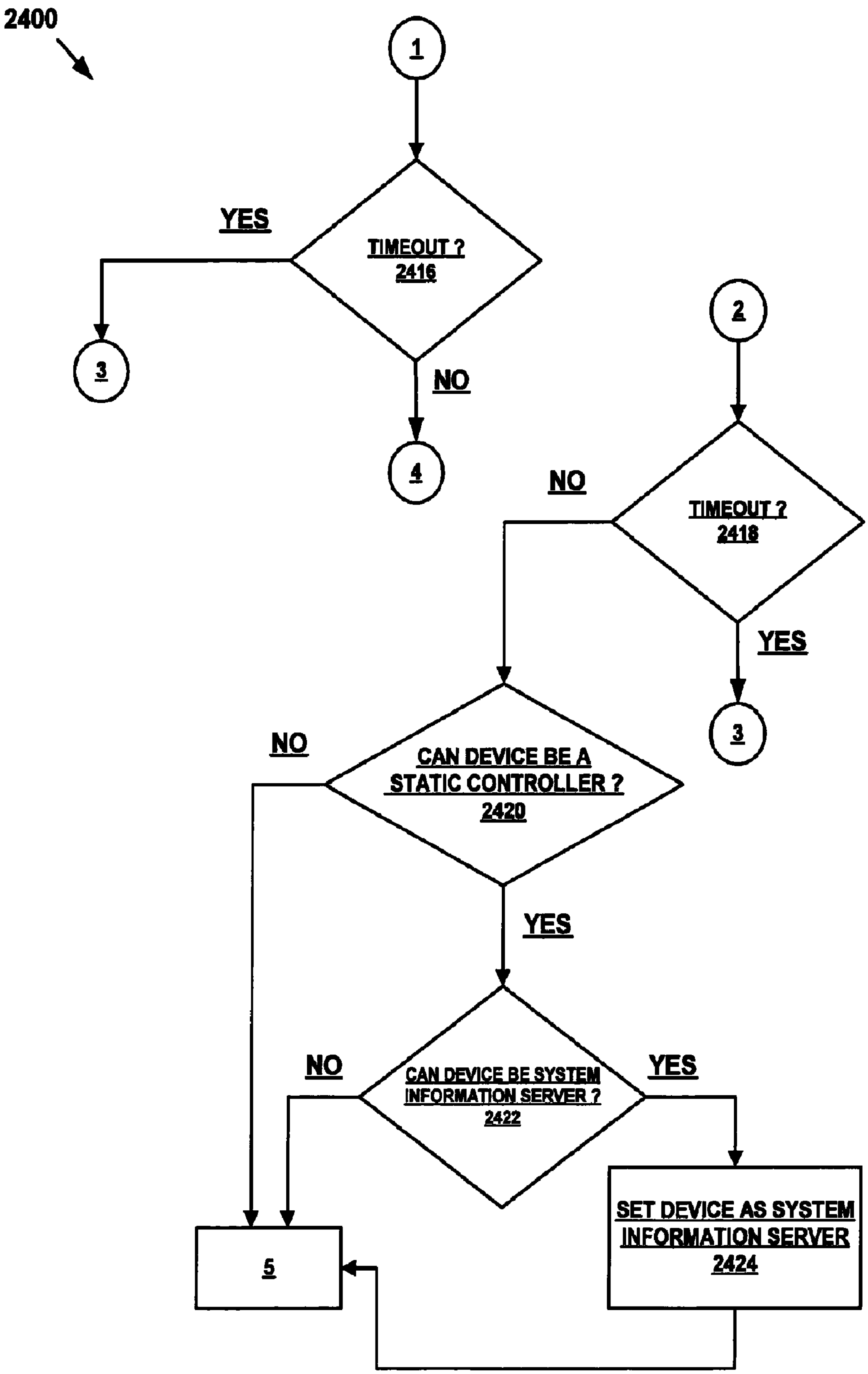
Figure 24C:
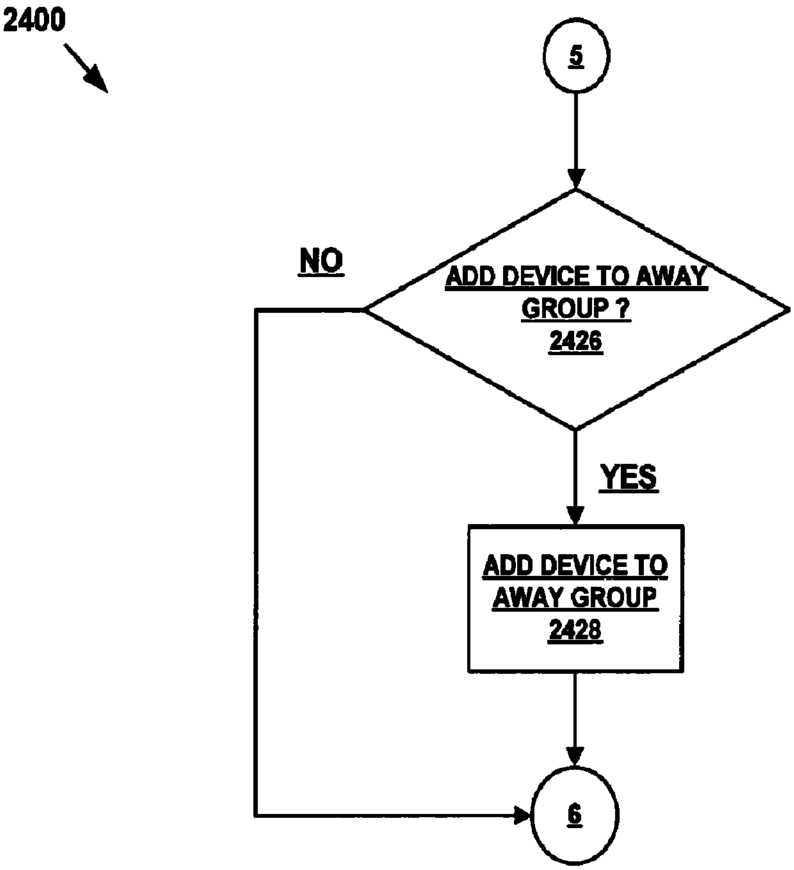

Referring now to FIGS. 24*a*-24*c*, in an exemplary embodiment, during the operation of the hand held RF controller 202, after a user sequentially selects DEVICES 2004 and INSTALL 2004*a*, using the menu-based program 2000, the controller implements a method 2400 in which the controller permits a user to install one or more devices, such as, for example, master and slave nodes, 102 and 104, respectively, in the system 100. In particular, in step 2402 the hand held RF controller 202 determines if a user has selected the installation of a device in the system 100. If the user has selected the installation of device in the system 100, then the display 414 of the hand held RF controller 202 prompts the user to press the install button on the device to be installed in the system in step 2404. Depression of the install button on the device to be installed in the system 100 will cause the device to be installed in the system to transmit the node information frame 1702 for the device to the hand held RF controller 202.

If the node information frame 1702 for the device to be installed in the system 100 is received by the hand held RF controller 202 in step 2406, then the controller will permit the installation of the device to proceed in step 2408. As part of the installation of the device into the system 100, the hand held RF controller 202 will also scan the node information frame 1702 for the device to be installed in the system 100 in step 2410.

Alternatively, if the node information frame 1702 for the device to be installed in the system 100 is not received by the hand held RF controller 202 in step 2406, then the controller will determine if the installation of the device has been canceled by the user in step 2412. If the hand held RF controller 202 determines that the installation of the device has been canceled by the user, then the controller will display an installation cancellation message on the display 414 in step 2414. If the hand held RF controller 202 determines that the installation of the device has not been canceled by the user in step 2412, then the controller will determine if a predetermined timeout has occurred in step 2416. If the hand held RF controller 202 determines that a predetermined timeout has occurred, then the controller will display an installation cancellation message on the display 414 in step 2414.

If the hand held RF controller 202 determines that the installation of the device in steps 2408 and 2410 did not occur within a predetermined timeout in step 2418, then the controller will display an installation cancellation message on the display 414 in step 2414. Alternatively, if the hand held RF controller 202 determines that the installation of the device in steps 2408 and 2410 did occur within a predetermined timeout in step 2418, then the controller will determine if the installed device can be a static controller by interrogating the node information frame 1702 for the installed device in step 2420.

If the hand held RF controller 202 determines that the installed device can be a static controller in step 2420, then the controller will determine if the installed device can be a system information server by interrogating the node information frame 1702 for the installed device in step 2422. If the hand held RF controller 202 determines that the installed device can be a system information server in step 2422, then the controller will designate the installed device as a system information server for the system 100 in step 2424. When the installed device provides a system information server, it stores a record of the configuration and operational details of the system 100. As a result, it provides an archival back-up record of the design and operation of the system 100.

If: a) the hand held RF controller 202 determines that the installed device cannot be a static controller in step 2420, b) the controller determines that the installed device cannot be a system information server in step 2422, or c) after completing step 2424, the controller determines if the installed device supports an all switch command class in step 2426. If the hand held RF controller 202 determines that the installed device supports an all switch command class in step 2426, then the controller adds the installed device to the away group 1402 in step 2428.

Figure 25A:
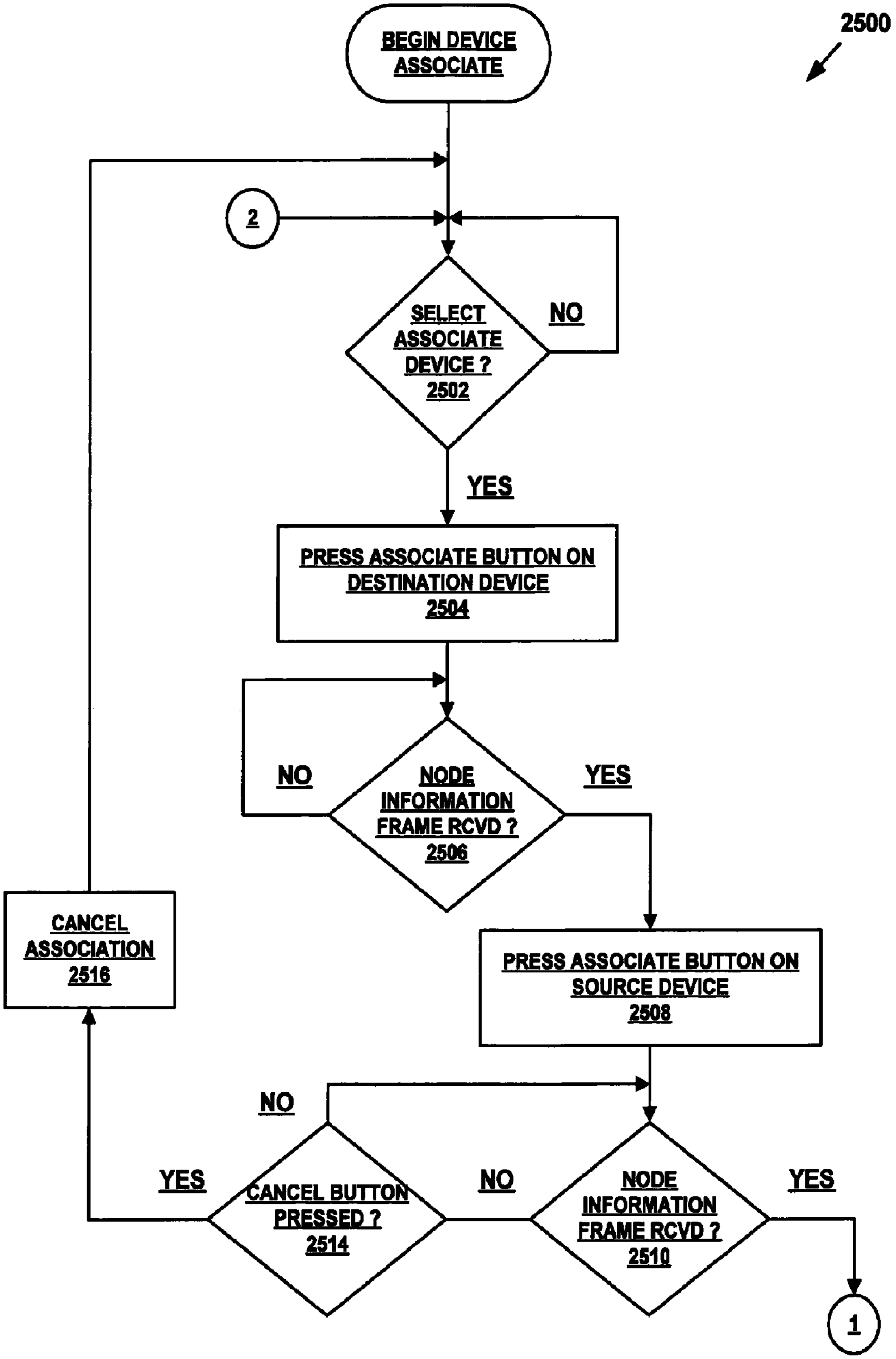
FIGS. 25*a*-25*b* is a flow chart illustration of an exemplary embodiment of a method of associating devices in the system.
Figure 25B:
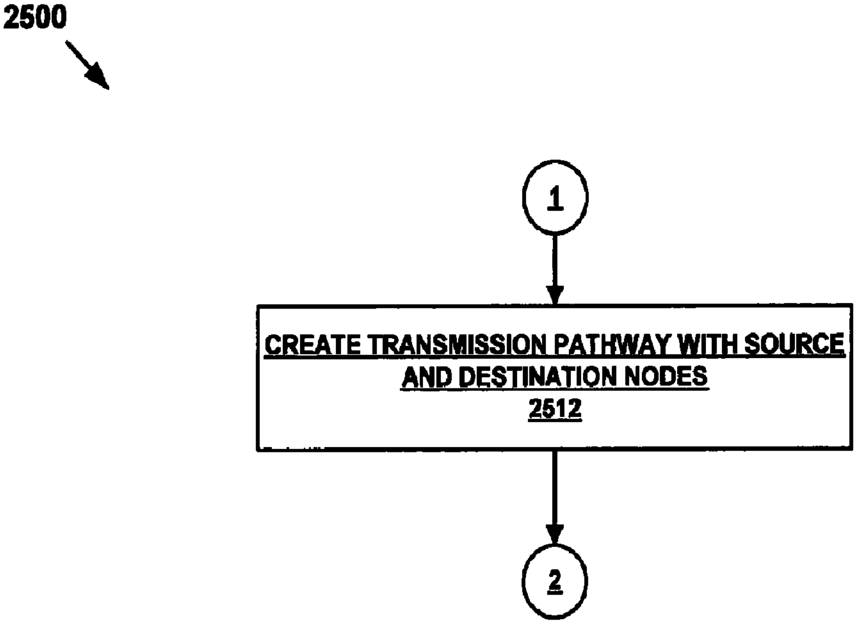

Referring now to FIGS. 25*a*-25*b*, in an exemplary embodiment, during the operation of the hand held RF controller 202, after a user sequentially selects DEVICES 2004 and ASSOCIATE 2004*b*, using the menu-based program 2000, the controller implements a method 2500 in which the controller permits a user to associate devices, such as, for example, master and slave nodes, 102 and 104, respectively, to define a communication pathway 702 within the system 100. In particular, in step 2502 the hand held RF controller 202 determines if a user has selected the association of a device in the system 100 with a communication pathway 702. If the user has selected the association of device in the system 100 with a communication pathway 702, then the display 414 of the hand held RF controller 202 prompts the user to press the associate button on the device to be designated as a destination node 708 within a communication pathway in the system in step 2504. Depression of the associate button on the device to be designated as a destination node 708 within a communication pathway 702 in the system 100 will cause the device to transmit the node information frame 1702 for the device to the hand held RF controller 202.

If the node information frame 1702 for the device to be designated as a destination node 708 within a communication pathway 702 in the system 100 is received by the hand held RF controller 202 in step 2506, then the display 414 of the hand held RF controller 202 prompts the user to press the associate button on the device to be designated as a source node 706 within a communication pathway 702 in the system 100 in step 2508. If the node information frame 1702 for the device to be designated as a source node 706 within a communication pathway 702 in the system 100 is received by the hand held RF controller 202 in step 2510, then the sequentially associated nodes are associated with one another in the communication pathway 702 and designated as destination and source nodes, 708 and 706, respectively, in step 2512.

Alternatively, if the node information frame 1702 for the device to be designated as a destination node 708 within the communication pathway 702 in the system 100 is not received by the hand held RF controller 202 in step 2506, then the controller determines if a user has cancelled the association in step 2514. If the hand held RF controller 202 determines that a user has cancelled the association, then the association is cancelled in step 2516.

Figure 26A:
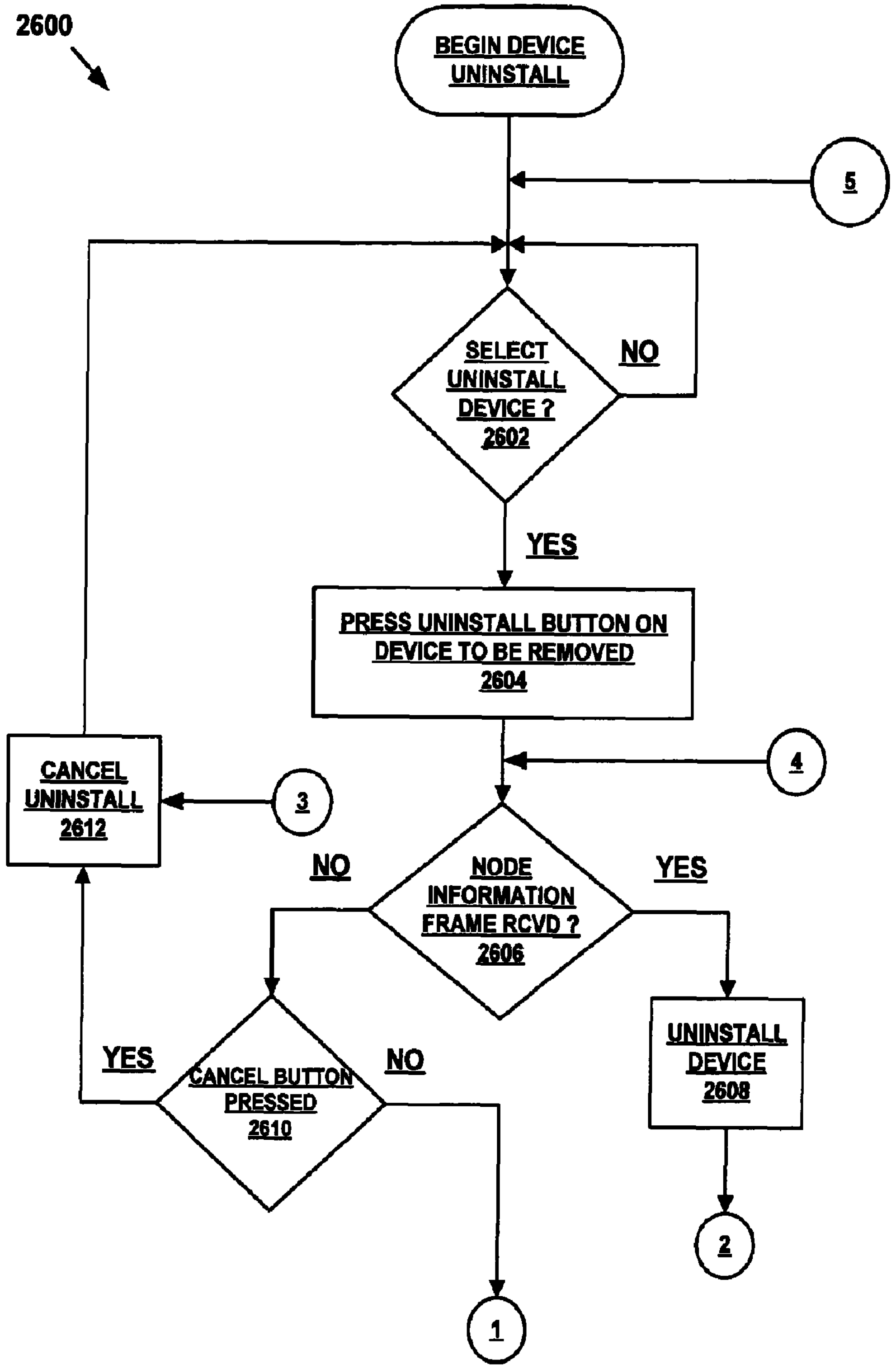
FIGS. 26*a*-26*b* is a flow chart illustration of an exemplary embodiment of a method of uninstalling a device from the system.
Figure 26B:
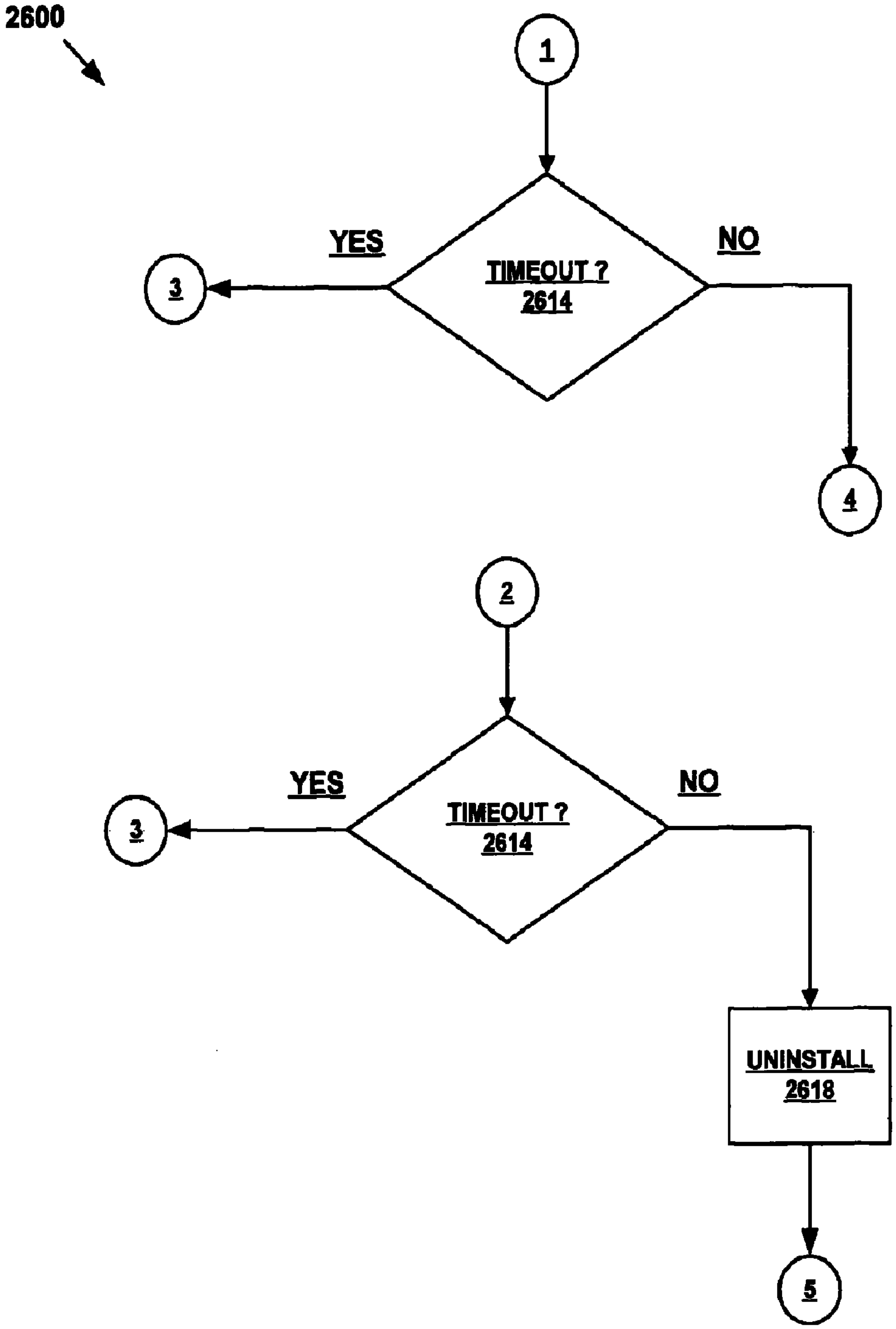

Referring now to FIGS. 26*a*-26*b*, in an exemplary embodiment, during the operation of the hand held RF controller 202, after a user sequentially selects DEVICES 2004 and UNINSTALL 2004*c*, using the menu-based program 2000, the controller implements a method 2600 in which the controller permits a user to uninstall one or more devices, such as, for example, master and slave nodes, 102 and 104, respectively, from the system 100. In particular, in step 2602 the hand held RF controller 202 determines if a user has selected the uninstallation of a device from the system 100. If the user has selected the uninstallation of device from the system 100, then the display 414 of the hand held RF controller 202 prompts the user to press the uninstall button on the device to be uninstalled from the system in step 2604. Depression of the uninstall button on the device to be uninstalled in the system 100 will cause the device to be uninstalled in the system to transmit the node information frame 1702 for the device to the hand held RF controller 202.

If the node information frame 1702 for the device to be uninstalled in the system 100 is received by the hand held RF controller 202 in step 2606, then the controller will permit the uninstallation of the device from the system 100 to proceed in step 2608.

Alternatively, if the node information frame 1702 for the device to be uninstalled from the system 100 is not received by the hand held RF controller 202 in step 2606, then the controller will determine if the uninstallation of the device has been canceled by the user in step 2610. If the hand held RF controller 202 determines that the uninstallation of the device has been canceled by the user, then the controller will cancel the uninstallation in step 2612. If the hand held RF controller 202 determines that the uninstallation of the device has not been canceled by the user in step 2610, then the controller will determine if a predetermined timeout has occurred in step 2614. If the hand held RF controller 202 determines that a predetermined timeout has occurred, then the controller will cancel the uninstallation in step 2612.

If the hand held RF controller 202 determines that the uninstallation of the device in steps 2606 and 2608 did not occur within a predetermined timeout in step 2616, then the controller will cancel the uninstallation in step 2612. Alternatively, if the hand held RF controller 202 determines that the uninstallation of the device in steps 2606 and 2608 did occur within a predetermined timeout in step 2616, then the controller will uninstall the device from the system 100 in step 2618.

Figure 27:
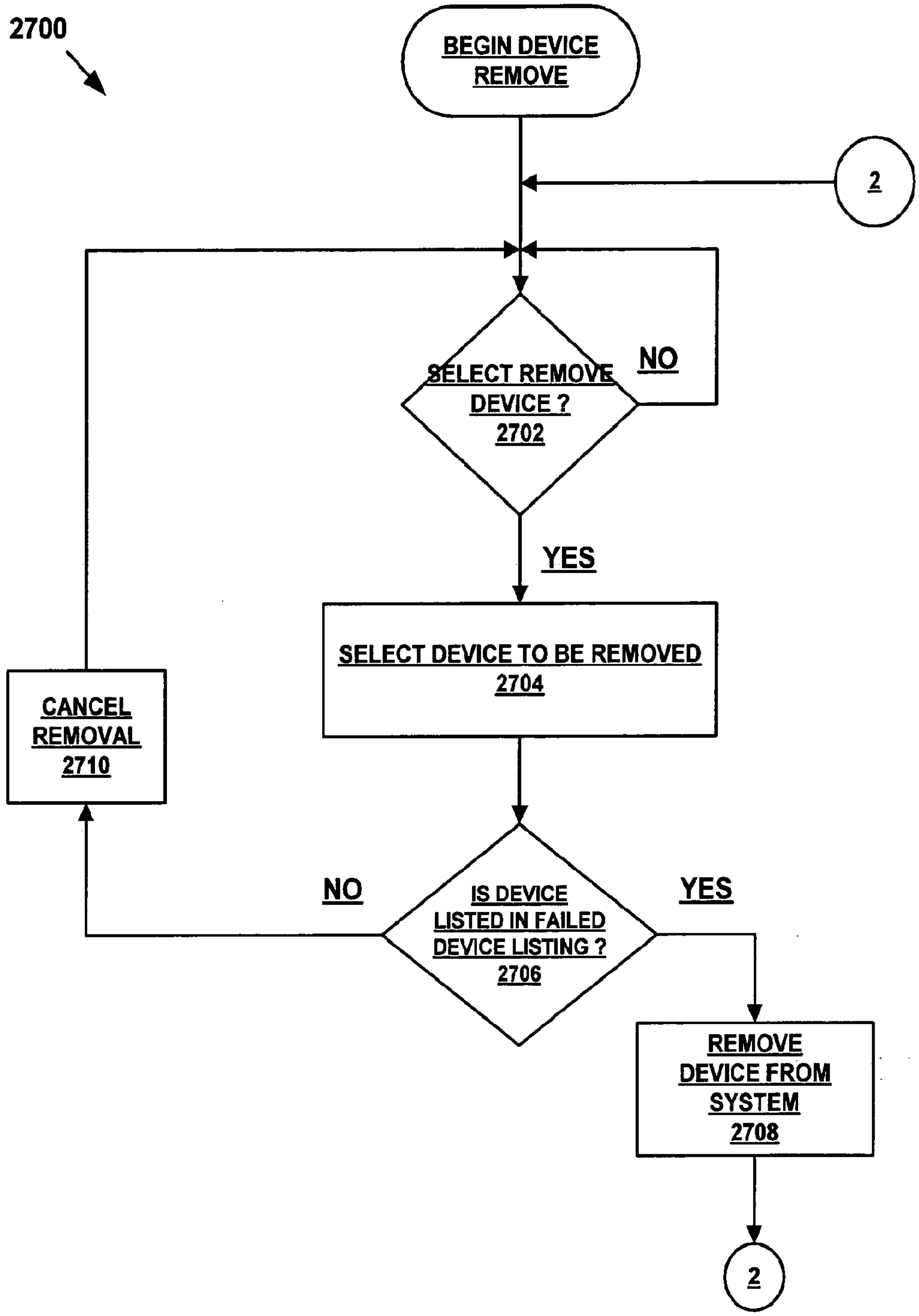
FIG. 27 is a flow chart illustration of an exemplary embodiment of a method of removing a device from the system.
Figure 28A:
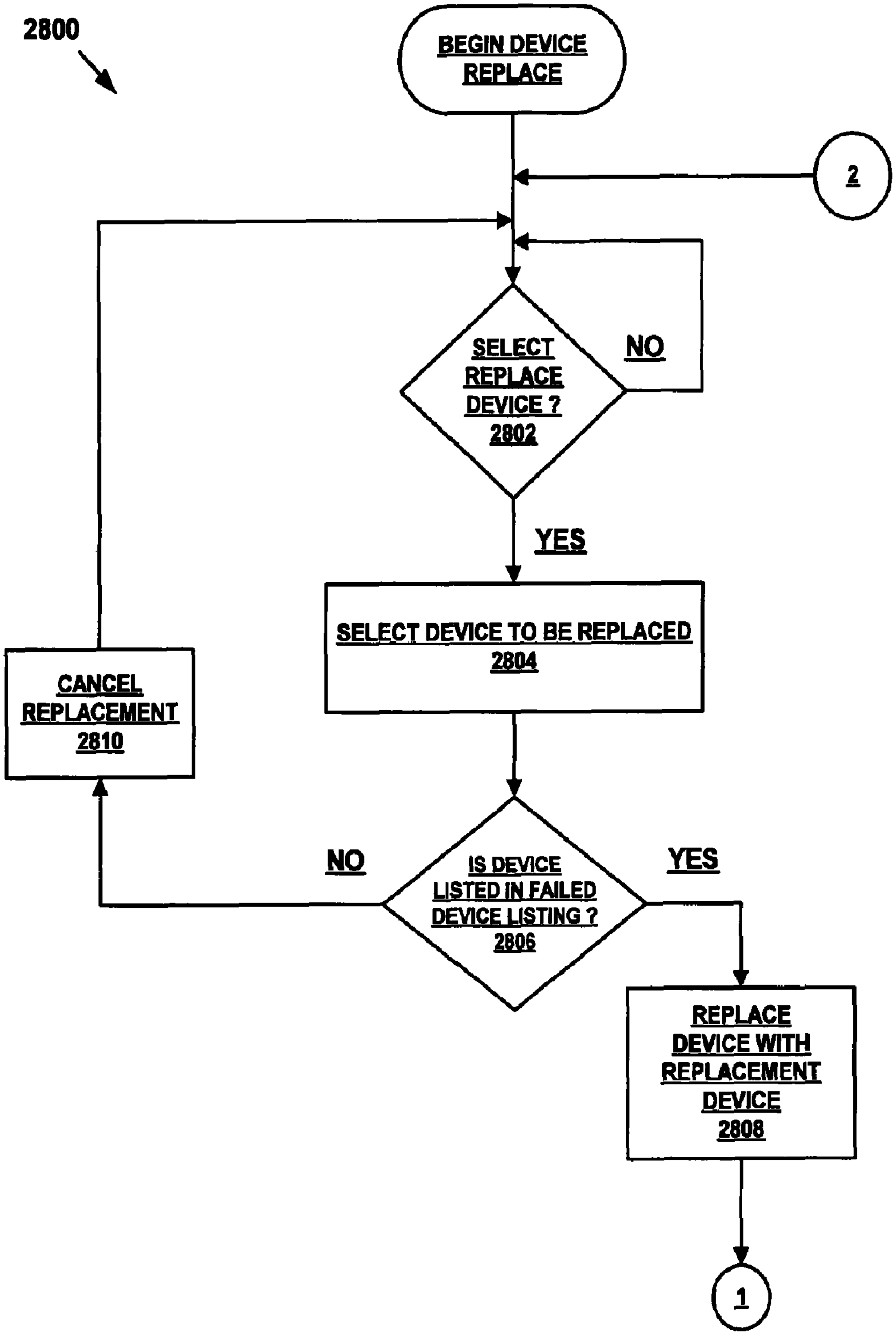
FIGS. 28*a*-28*d* is a flow chart illustration of an exemplary embodiment of a method of replacing a device in the system.
Figure 28B:
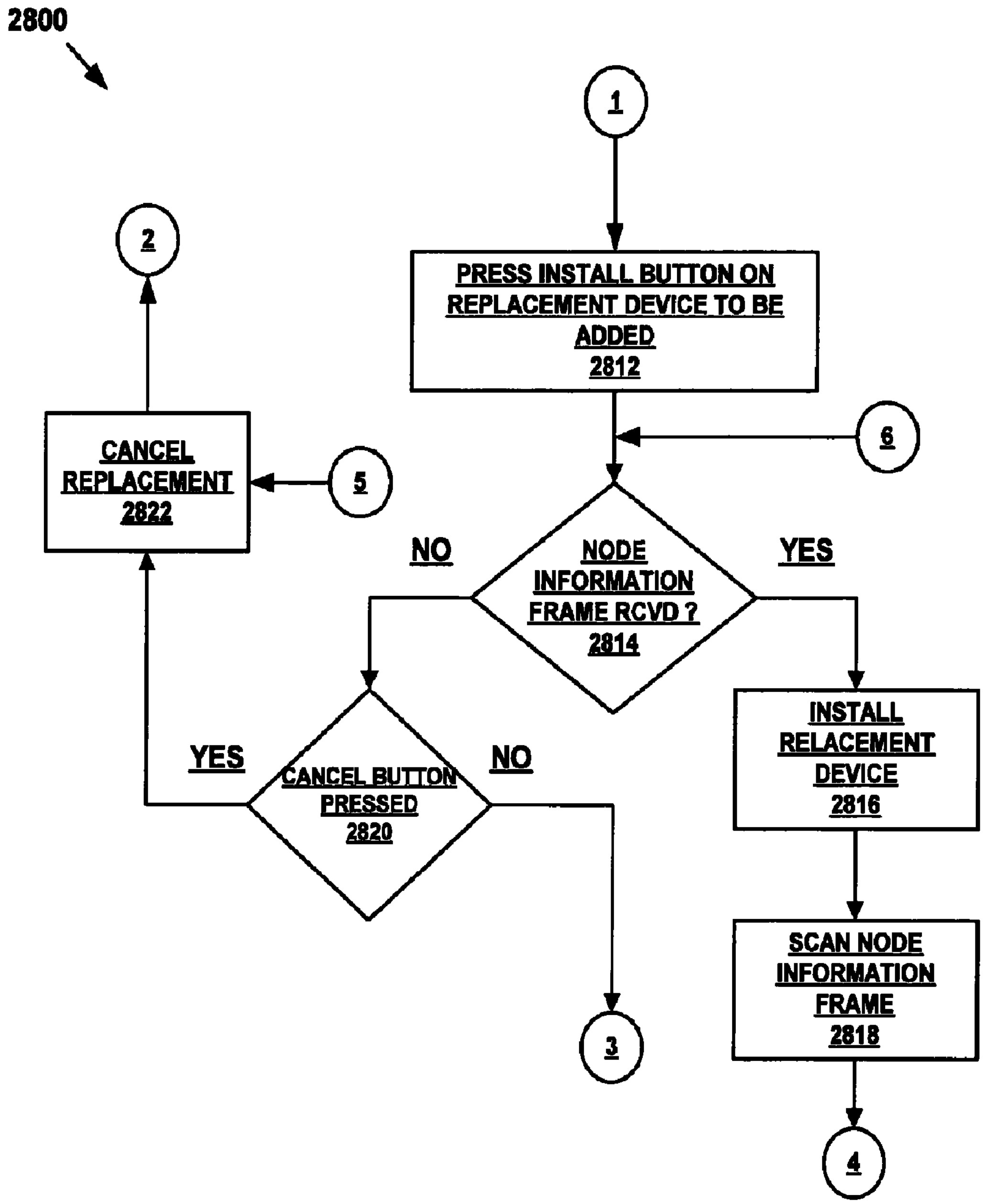
Figure 28C:
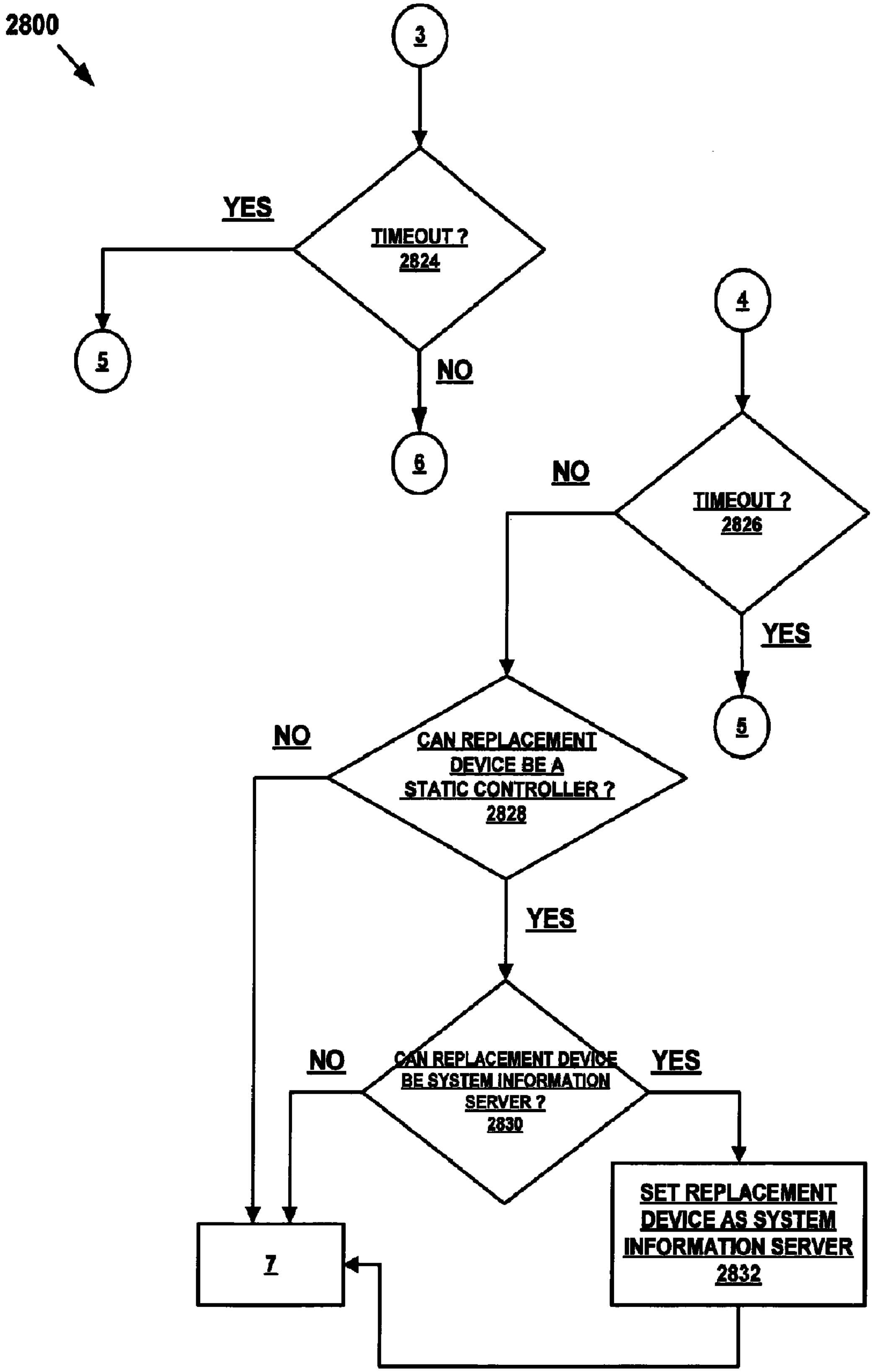
Figure 28D:
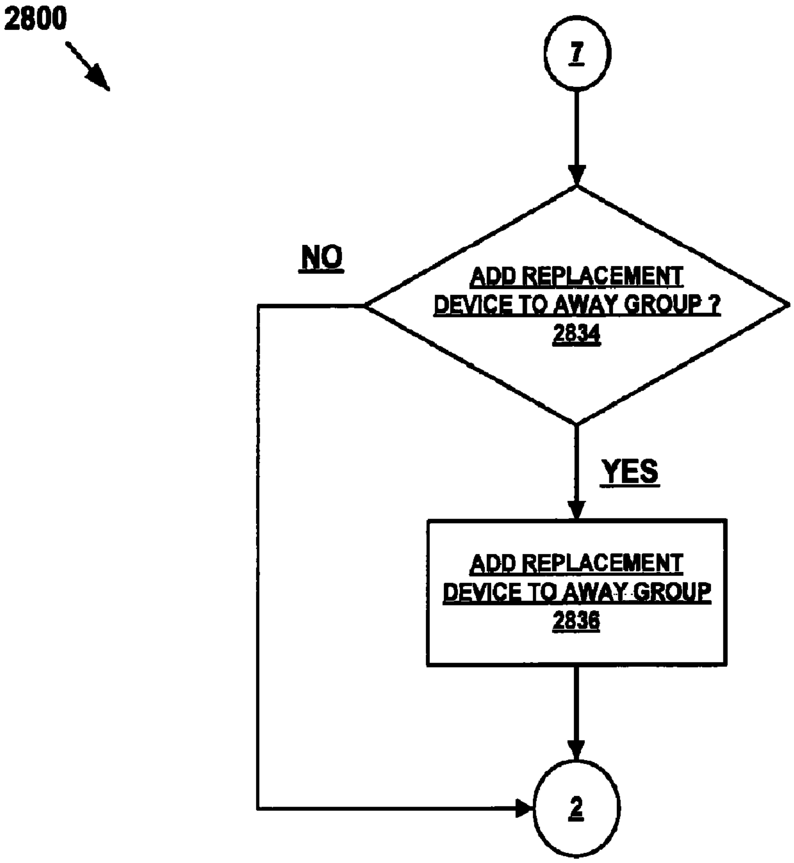

Referring now to FIG. 27, in an exemplary embodiment, during the operation of the hand held RF controller 202, after a user sequentially selects DEVICES 2004 and REMOVE 2004*d*, using the menu-based program 2000, the controller implements a method 2600 in which the controller permits a user to remove one or more devices, such as, for example, master and slave nodes, 102 and 104, respectively, from the system 100. In particular, in step 2702 the hand held RF controller 202 determines if a user has selected the removal of a device from the system 100. If the user has selected the removal of device from the system 100, then the display 414 of the hand held RF controller 202 prompts the user to select the device to be removed from the system in step 2704.

If the hand held RF controller 202 determines that the device selected by a user for removal from the system 100 is listed in the failed node ID listing 1618 in step 2706, then the device is removed from the system in step 2708. Alternatively, if the hand held RF controller 202 determines that the device selected by a user for removal from the system 100 is not listed in the failed node ID listing 1618 in step 2706, then the removal of the device is canceled in step 2710.

Referring now to FIGS. 28*a*-28*d*, in an exemplary embodiment, during the operation of the hand held RF controller 202, after a user sequentially selects DEVICES 2004 and REPLACE 2004*e*, using the menu-based program 2000, the controller implements a method 2800 in which the controller permits a user to replace one or more devices, such as, for example, master and slave nodes, 102 and 104, respectively, with one or more other devices, such as, for example, master and slave nodes, 102 and 104, respectively, within the system 100. In particular, in step 2802 the hand held RF controller 202 determines if a user has selected the replacement of a device within the system 100. If the user has selected the replacement of device within the system 100, then the display 414 of the hand held RF controller 202 prompts the user to select the device to be replaced within the system in step 2804.

If the hand held RF controller 202 determines that the device selected by a user for replacement within the system 100 is listed in the failed node ID listing 1618 in step 2806, then the device may be replaced within the system in step 2808. Alternatively, if the hand held RF controller 202 determines that the device selected by a user for replacement within the system 100 is not listed in the failed node ID listing 1618 in step 2806, then the replacement of the device is canceled in step 2810.

If the device may be replaced within the system in step 2808, then the display 414 of the hand held RF controller 202 prompts the user to press the install button on the replacement device to be installed in the system in step 2812. Depression of the install button on the replacement device to be installed in the system 100 will cause the replacement device to be installed in the system to transmit the node information frame 1702 for the device to the hand held RF controller 202.

If the node information frame 1702 for the replacement device to be installed in the system 100 is received by the hand held RF controller 202 in step 2814, then the controller will permit the installation of the replacement device to proceed in step 2816. As part of the installation of the device into the system 100, the hand held RF controller 202 will also scan the node information frame 1702 for the replacement device to be installed in the system 100 in step 2818.

Alternatively, if the node information frame 1702 for the replacement device to be installed in the system 100 is not received by the hand held RF controller 202 in step 2814, then the controller will determine if the installation of the replacement device has been canceled by a user in step 2820. If the hand held RF controller 202 determines that the installation of the replacement device has been canceled by a user, then the controller will cancel the replacement in step 2822. If the hand held RF controller 202 determines that the installation of the replacement device has not been canceled by a user in step 2820, then the controller will determine if a predetermined timeout has occurred in step 2824. If the hand held RF controller 202 determines that a predetermined timeout has occurred, then the controller will cancel the replacement in step 2822.

If the hand held RF controller 202 determines that the installation of the replacement device in steps 2816 and 2818 did not occur within a predetermined timeout in step 2826, then the controller will cancel the replacement in step 2822. Alternatively, if the hand held RF controller 202 determines that the installation of the replacement device in steps 2816 and 2818 did occur within a predetermined timeout in step 2826, then the controller will determine if the installed replacement device can be a static controller by interrogating the node information frame 1702 for the installed replacement device in step 2828.

If the hand held RF controller 202 determines that the installed replacement device can be a static controller in step 2828, then the controller will determine if the installed device can be a system information server by interrogating the node information frame 1702 for the installed replacement device in step 2830. If the hand held RF controller 202 determines that the installed replacement device can be a system information server in step 2830, then the controller will designate the installed replacement device as a system information server for the system 100 in step 2832. When the installed replacement device provides a system information server, it stores a record of the configuration and operational details of the system 100. As a result, it provides an archival back-up record of the design and operation of the system 100.

If: a) the hand held RF controller 202 determines that the installed replacement device cannot be a static controller in step 2828, b) the controller determines that the installed replacement device cannot be a system information server in step 2830, or c) after completing step 2832, the controller determines if the installed replacement device supports an all switch command class in step 2834. If the hand held RF controller 202 determines that the installed replacement device supports an all switch command class in step 2834, then the controller adds the installed replacement device to the away group 1402 in step 2836.

Figure 29A:
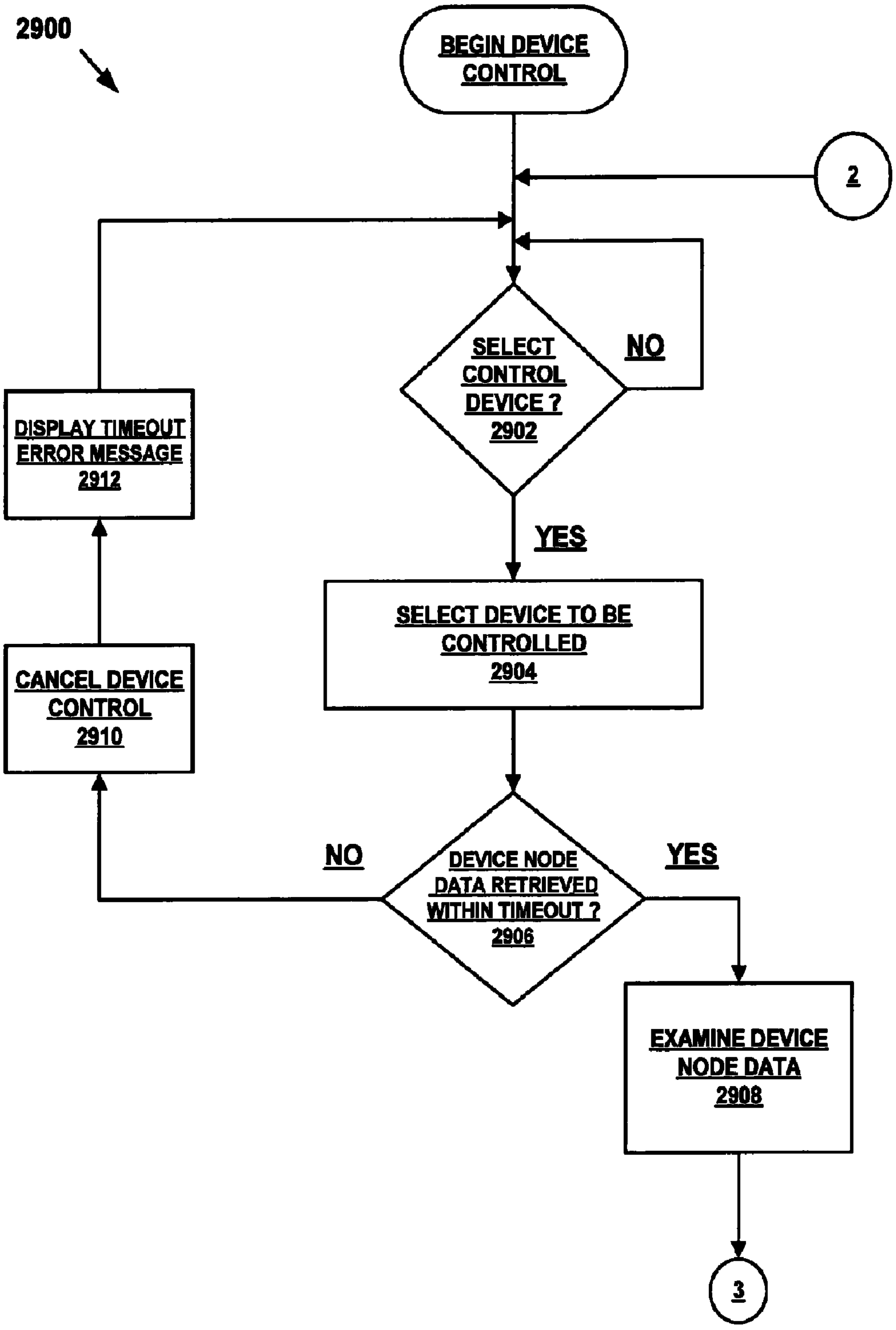
FIGS. 29*a*-29*b* is a flow chart illustration of an exemplary embodiment of a method of controlling a device in the system.
Figure 29B:
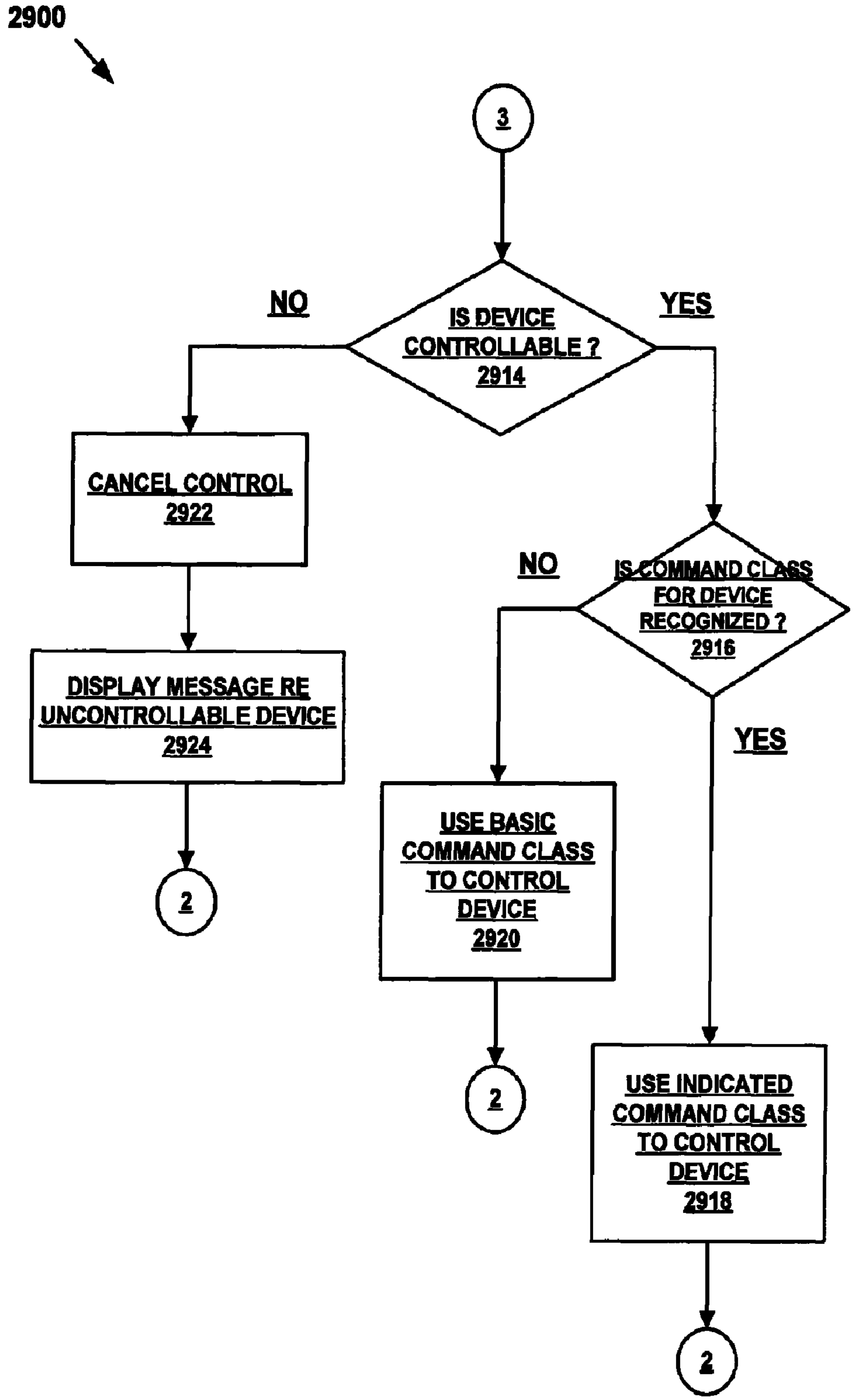

Referring now to FIGS. 29*a*-29*b*, in an exemplary embodiment, during the operation of the hand held RF controller 202, after a user sequentially selects DEVICES 2004 and CONTROL 2004*f*, using the menu-based program 2000, the controller implements a method 2900 in which the controller permits a user to control one or more devices, such as, for example, master and slave nodes, 102 and 104, respectively, within the system 100. In particular, in step 2902 the hand held RF controller 202 determines if a user has selected the control of a device within the system 100. If the user has selected the control of a device within the system 100, then the display 414 of the hand held RF controller 202 prompts the user to select the device to be controlled within the system in step 2904.

Once a user of the hand held RF controller 202 has selected the device to be controlled, the node data for the selected device is then retrieved by the controller. In and exemplary embodiment, the node data for the selected device includes the node information frame 1702 for the selected device. If the node data for the selected device is retrieved by the hand held RF controller 202 within a predetermined time out period in step 2906, then the controller examines the node data for the selected device in step 2908. Alternatively, if the node data for the selected device is not retrieved by the hand held RF controller 202 within a predetermined time out period in step 2906, then the controller cancels the control of the selected device in step 2910 and displays an error message on the display 414 in step 2912.

After examining the node data for the selected device in step 2908, the hand held RF controller 202 then determines if the selected device is controllable in step 2914. If the hand held RF controller 202 determines that the selected device is controllable, the controller then determines if the command class for the selected device is one recognized by the system 100 in step 2916. If the command class for the selected device is one recognized by the system 100, then the hand held RF controller 202 will use the command class for the selected device to control the selected device in step 2918. Alternatively, if the command class for the selected device is not one recognized by the system 100, then the hand held RF controller 202 will use a basic command class for the selected device to control the selected device in step 2920.

Alternatively, if, after examining the node data for the selected device in step 2908, the hand held RF controller 202 then determines if the selected device is not controllable in step 2914, then the controller cancels the control of the selected device in step 2922 and displays an error message on the display 414 in step 2924.

Figure 30:
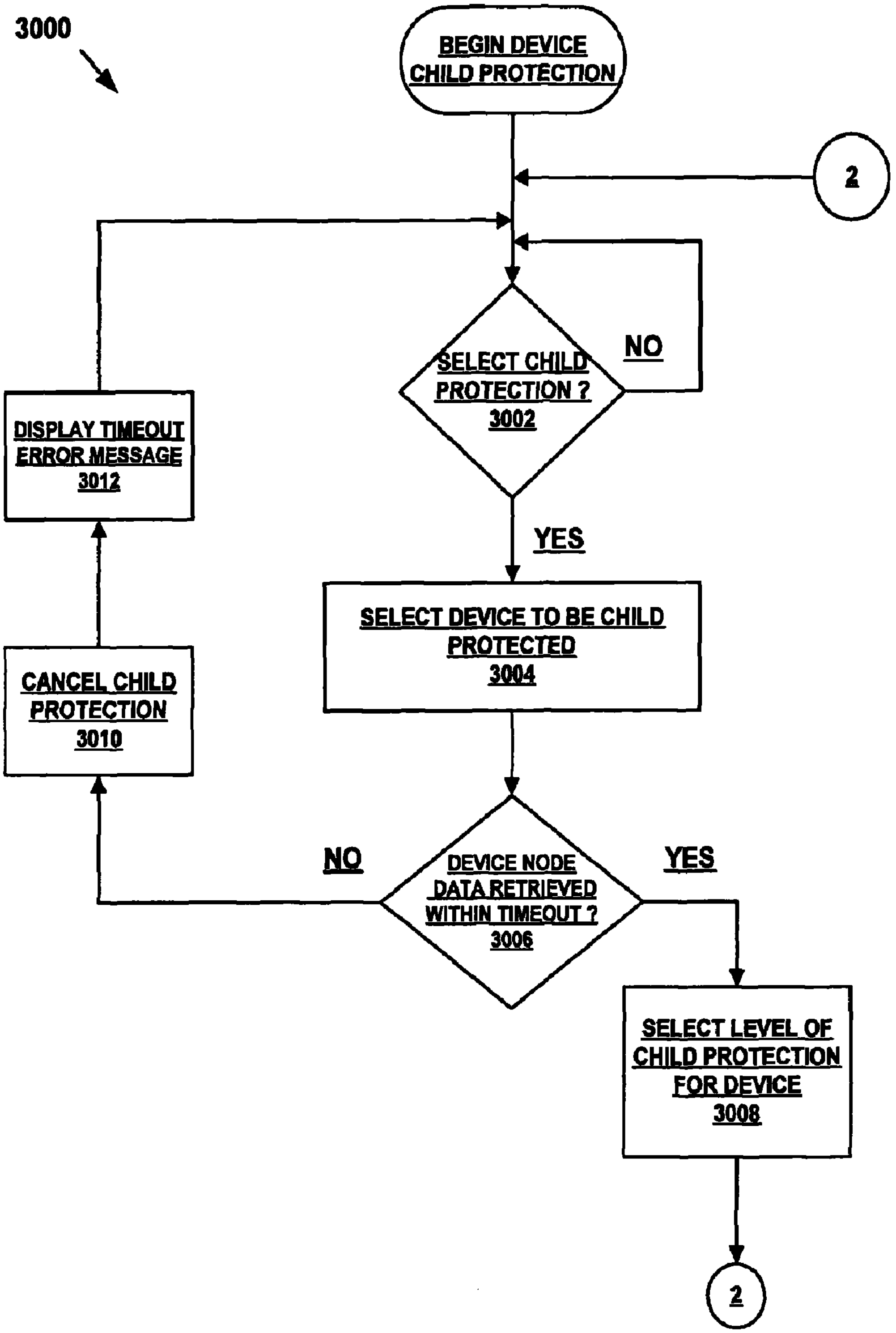
FIG. 30 is a flow chart illustration of an exemplary embodiment of a method of selecting child protection for a device in the system.

Referring now to FIG. 30, in an exemplary embodiment, during the operation of the hand held RF controller 202, after a user sequentially selects DEVICES 2004 and CHILD PROTECTION 2004*g*, using the menu-based program 2000, the controller implements a method 3000 in which the controller permits a user to control the level of child protection for one or more devices, such as, for example, master and slave nodes, 102 and 104, respectively, within the system 100. In particular, in step 3002 the hand held RF controller 202 determines if a user has selected the control of a device within the system 100. If the user has selected the control the level of child protection of device within the system 100, then the display 414 of the hand held RF controller 202 prompts the user to select the device for which the level of child protection will be controlled within the system in step 3004.

Once a user of the hand held RF controller 202 has selected the device for which the level of child protection will be controlled, the node data for the selected device is then retrieved by the controller. In an exemplary embodiment, the node data for the selected device includes the node information frame 1702 for the selected device. If the node data for the selected device is retrieved by the hand held RF controller 202 within a predetermined time out period in step 3006, then the controller permits a user to select the level of child protection for the selected device in step 3008.

In an exemplary embodiment, the possible levels of child protection that may be selected in step 3008 may include one or more of the following: 1) no child protection; 2) sequence child protection; and/or 3) remote control child protection. In an exemplary embodiment, no child protection is the default level of child protection. In an exemplary embodiment, sequence child protection requires a user of a device to depress one or push buttons provided on the device in a predetermined sequence within a predetermined time period in order to enable the use to adjust an operating state of the device. In an exemplary embodiment, sequence child protection requires a user of a device to depress a push button provided on the device three times in a row within two seconds in order to enable the use to adjust an operating state of the device. In an exemplary embodiment, remote control child protection only permits a user to change an operational state of a device by using the hand held RF controller 202.

Alternatively, if the node data for the selected device is not retrieved by the hand held RF controller 202 within a predetermined time out period in step 3006, then the controller cancels the control of the level of child protection for the selected device in step 3010 and displays an error message on the display 414 in step 3012.

Figure 31:
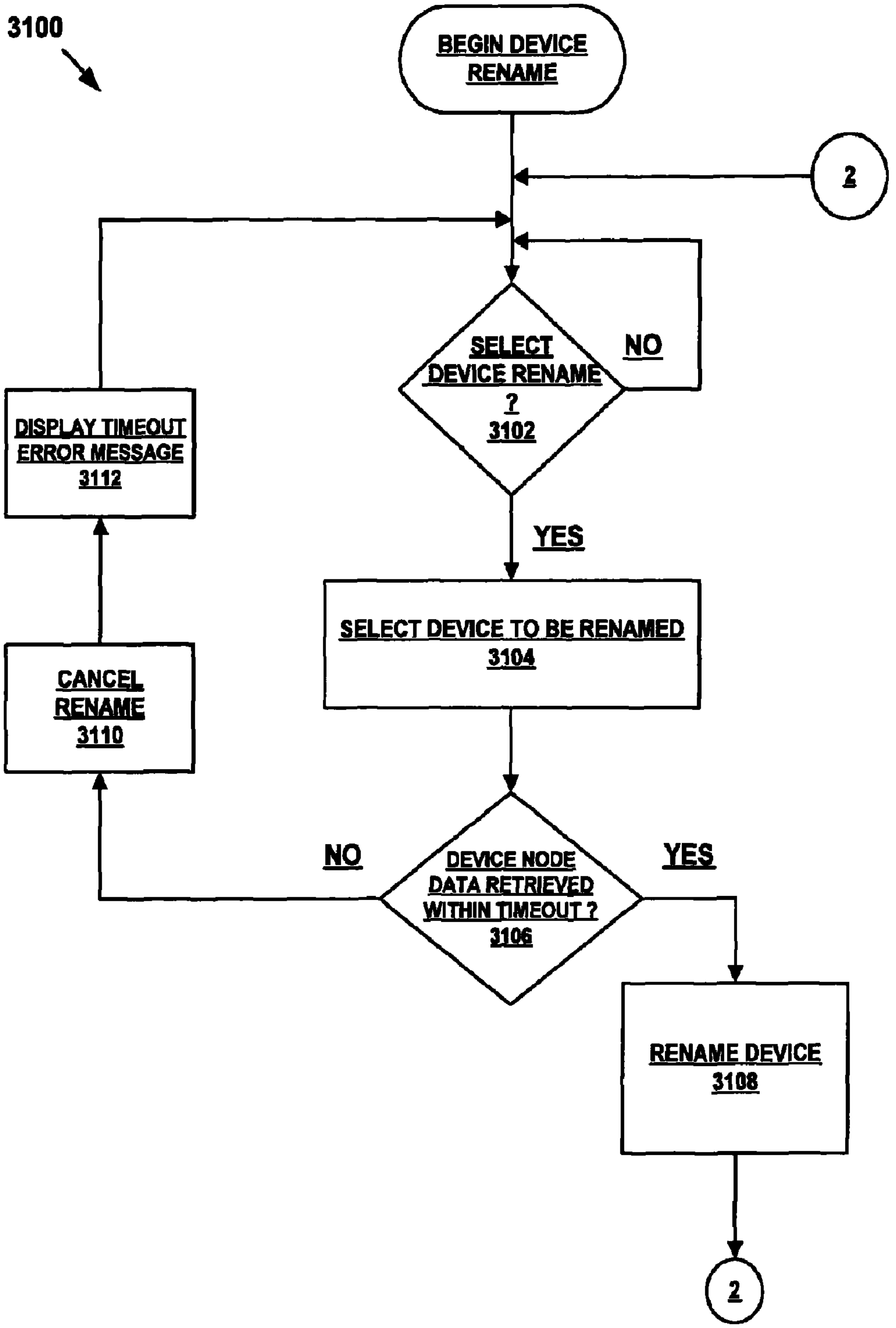
FIG. 31 is a flow chart illustration of an exemplary embodiment of a method of renaming a device in the system.

Referring now to FIG. 31, in an exemplary embodiment, during the operation of the hand held RF controller 202, after a user sequentially selects DEVICES 2004 and RENAME 2004*h*, using the menu-based program 2000, the controller implements a method 3100 in which the controller permits a user to rename one or more devices, such as, for example, master and slave nodes, 102 and 104, respectively, within the system 100. In particular, in step 3102 the hand held RF controller 202 determines if a user has selected the renaming of a device within the system 100. If the user has selected the renaming of a device within the system 100, then the display 414 of the hand held RF controller 202 prompts the user to select the device to be renamed within the system in step 3104.

Once a user of the hand held RF controller 202 has selected the device that will be renamed, the node data for the selected device is then retrieved by the controller. In an exemplary embodiment, the node data for the selected device includes the node information frame 1702 for the selected device. If the node data for the selected device is retrieved by the hand held RF controller 202 within a predetermined time out period in step 3106, then the controller permits a user to rename the selected device in step 3108. Alternatively, if the node data for the selected device is not retrieved by the hand held RF controller 202 within a predetermined time out period in step 3106, then the controller cancels the renaming of the selected device in step 3110 and displays an error message on the display 414 in step 3112.

Figure 32A:
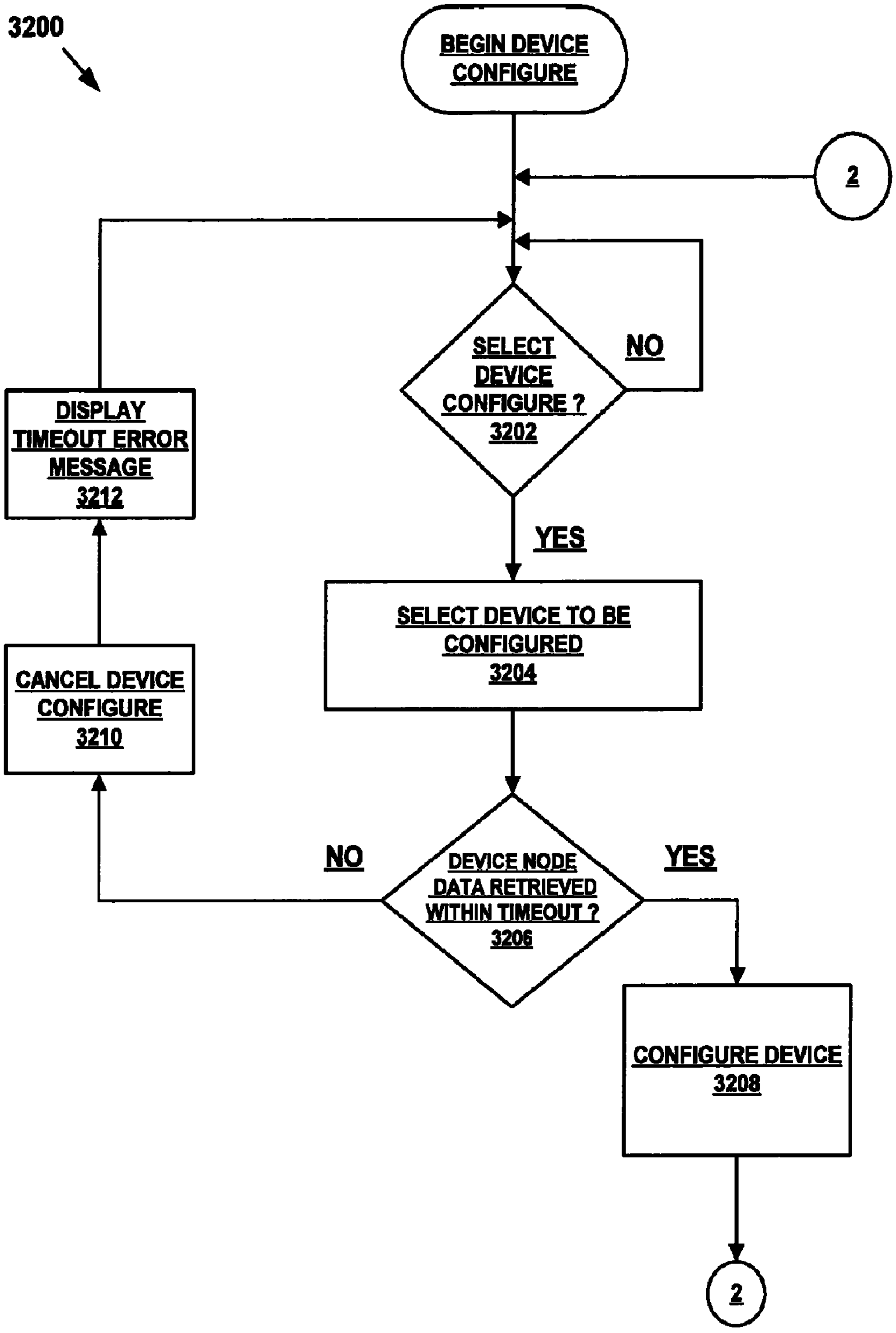

Referring now to FIGS. 32*a*-32*b*, in an exemplary embodiment, during the operation of the hand held RF controller 202, after a user sequentially selects DEVICES 2004 and CONFIGURE 2004*i*, using the menu-based program 2000, the controller implements a method 3200 in which the controller permits a user to configure one or more devices, such as, for example, master and slave nodes, 102 and 104, respectively, within the system 100. In particular, in step 3202 the hand held RF controller 202 determines if a user has selected the configuring of a device within the system 100. If the user has selected the configuring of a device within the system 100, then the display 414 of the hand held RF controller 202 prompts the user to select the device to be configured within the system in step 3204.

Once a user of the hand held RF controller 202 has selected the device that will be configured, the node data for the selected device is then retrieved by the controller. In an exemplary embodiment, the node data for the selected device includes the node information frame 1702 for the selected device. If the node data for the selected device is retrieved by the hand held RF controller 202 within a predetermined time out period in step 3206, then the controller permits a user to configure the selected device in step 3208. In an exemplary embodiment, the configuration data 3208*a* for the selected device includes: the value for the off delay for the selected device, the value for the panic on time for the selected device, the value for panic enabled for the selected device, the power loss preset value for the selected device, and the power on state value for the selected device.

In an exemplary embodiment, the value for the off delay for the selected device may, for example, be 1 second. In an exemplary embodiment, the value for the panic on time for the selected device may, for example, be 1 second. In an exemplary embodiment, the value for panic enabled for the selected device may, for example, be PANIC ENABLED. In an exemplary embodiment, the power loss preset value for the selected device may, for example, be the permissible tolerance in the power supply. In an exemplary embodiment, the power on state value for the selected device may, for example, be operational state of the device prior to the loss of power.

Alternatively, if the node data for the selected device is not retrieved by the hand held RF controller 202 within a predetermined time out period in step 3206, then the controller cancels the configuring of the selected device in step 3210 and displays an error message on the display 414 in step 3212.

Figure 33A:
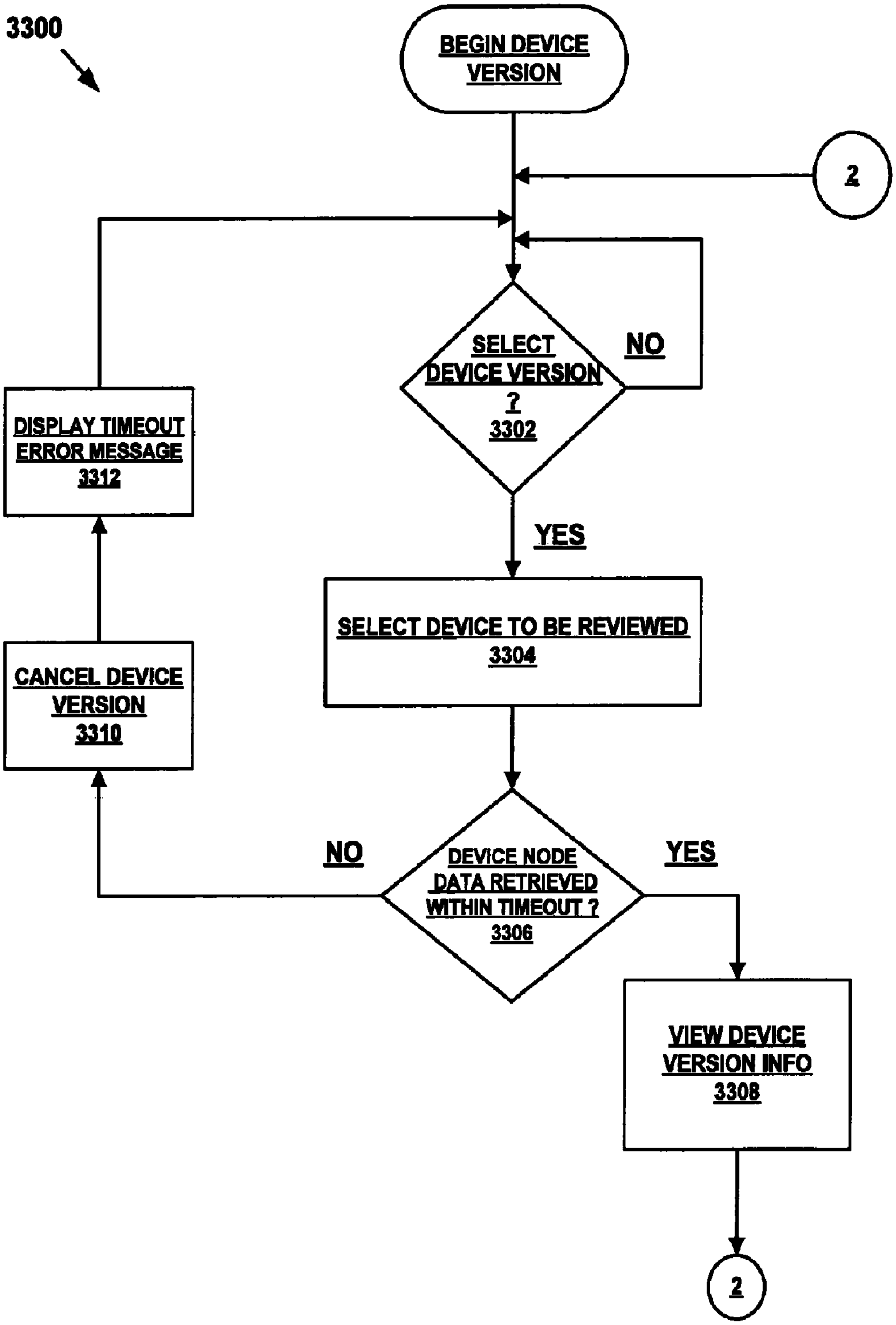

Referring now to FIGS. 33*a*-33*b*, in an exemplary embodiment, during the operation of the hand held RF controller 202, after a user sequentially selects DEVICES 2004 and VERSION 2004*j*, using the menu-based program 2000, the controller implements a method 3300 in which the controller permits a user to view the device version for one or more devices, such as, for example, master and slave nodes, 102 and 104, respectively, within the system 100. In particular, in step 3302 the hand held RF controller 202 determines if a user has selected the viewing of the version of a device within the system 100. If the user has selected the viewing of the version of a device within the system 100, then the display 414 of the hand held RF controller 202 prompts the user to select the device to be configured within the system in step 3304.

Once a user of the hand held RF controller 202 has selected the device for which the version will be viewed, the node data for the selected device is then retrieved by the controller. In an exemplary embodiment, the node data for the selected device includes the node information frame 1702 for the selected device. If the node data for the selected device is retrieved by the hand held RF controller 202 within a predetermined time out period in step 3306, then the controller permits a user to view the version information for the selected device in step 3308. In an exemplary embodiment, the version information 3308*a* for the selected device includes: the node ID value for the selected device, the application value for the selected device, the protocol value for the selected device, the library value for the selected device, the manufacturer value for the selected device, the product type value for the selected device, and the product ID value for the selected device.

In an exemplary embodiment, the node ID value for the selected device may, for example, be a numeric value. In an exemplary embodiment, the application value for the selected device may, for example, be a numeric decimal value. In an exemplary embodiment, the protocol value for the selected device may, for example, be a numeric decimal value. In an exemplary embodiment, the library value for the selected device may, for example, be a numeric decimal value. In an exemplary embodiment, the manufacturer value for the selected device may, for example, be an alpha-numeric value. In an exemplary embodiment, the product type value for the selected device may, for example, be an alpha-numeric value. In an exemplary embodiment, the product ID value for the selected device may, for example, be an alpha-numeric value.

Alternatively, if the node data for the selected device is not retrieved by the hand held RF controller 202 within a predetermined time out period in step 3306, then the controller cancels the viewing the version of the selected device in step 3310 and displays an error message on the display 414 in step 3312.

Figure 34A:
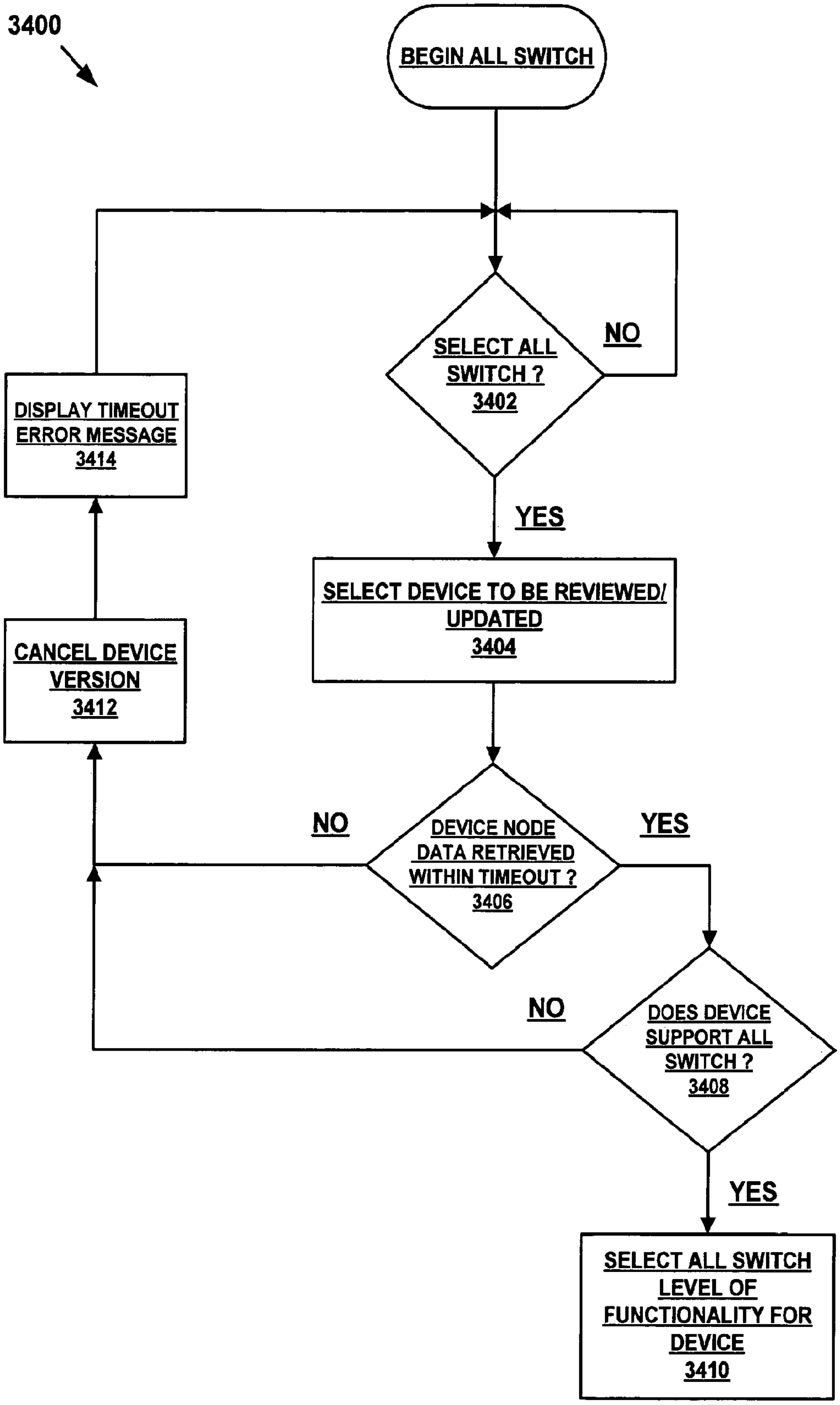

Referring now to FIGS. 34*a*-34*b*, in an exemplary embodiment, during the operation of the hand held RF controller 202, after a user sequentially selects DEVICES 2004 and ALL SWITCH 2004*k*, using the menu-based program 2000, the controller implements a method 3400 in which the controller permits a user to control the level of functionality for all switch for one or more devices, such as, for example, master and slave nodes, 102 and 104, respectively, within the system 100. In particular, in step 3402 the hand held RF controller 202 determines if a user has selected the controlling of the level of functionality for all switch of a device within the system 100. If the user has selected the controlling of the level of functionality for all switch of a device within the system 100, then the display 414 of the hand held RF controller 202 prompts the user to select the device for which the level of functionality for all switch will be configured within the system in step 3404.

Once a user of the hand held RF controller 202 has selected the device for which the level of functionality for all switch will be configured, the node data for the selected device is then retrieved by the controller. In an exemplary embodiment, the node data for the selected device includes the node information frame 1702 for the selected device. If the node data for the selected device is retrieved by the hand held RF controller 202 within a predetermined time out period in step 3406, then the controller determines if the selected device support all switch functionality in step 3408. If the hand held RF controller 202 determines that the selected device supports all switch functionality, then the controller permits a user to configure the level of functionality for all switch for the selected device in step 3310. In an exemplary embodiment, the level of all switch functionality 3310*a* for the selected device may be: not included, all on only, all off only, all on and off only.

In an exemplary embodiment, the node ID value for the selected device may, for example, be a numeric value. In an exemplary embodiment, the application value for the selected device may, for example, be a numeric decimal value. In an exemplary embodiment, the protocol value for the selected device may, for example, be a numeric decimal value. In an exemplary embodiment, the library value for the selected device may, for example, be a numeric decimal value. In an exemplary embodiment, the manufacturer value for the selected device may, for example, be a alpha-numeric value. In an exemplary embodiment, the product type value for the selected device may, for example, be a alpha-numeric value. In an exemplary embodiment, the product ID value for the selected device may, for example, be a alpha-numeric value.

Alternatively, if the node data for the selected device is not retrieved by the hand held RF controller 202 within a predetermined time out period in step 3406 or if the selected device does not support all switch functionality in step 3408, then the controller cancels the configuring of the level of all switch functionality for the selected device in step 3412 and displays an error message on the display 414 in step 3414.

Referring now to FIGS. 35*a*-35*d*, in an exemplary embodiment, during the operation of the hand held RF controller 202, after a user sequentially selects SCENES 2006 and CREATE 2006*a*, using the menu-based program 2000, the controller implements a method 3500 in which the controller permits a user to create a scene using one or more devices, such as, for example, master and slave nodes, 102 and 104, respectively, within the system 100. In particular, in step 3502 the hand held RF controller 202 determines if a user has selected creating a scene within the system 100. If the user has selected creating a scene within the system 100, then the display 414 of the hand held RF controller 202 prompts the user to enter the name of the scene to be created within the system in step 3504.

Once a user of the hand held RF controller 202 has selected the name of the scene to be created in the system 100 in step 3504, the controller then waits for a user of the controller to select defining the scene to be created in step 3506. Once a user of the hand held RF controller 202 has selected defining the scene to be created in the system 100 in step 3506, the controller then waits for a user of the controller to select devices for the scene to be created in step 3508.

If the hand held RF controller 202 determines that the selected device for the scene to be created are not controllable in step 3510, then the controller cancels the selection of the device for the scene to be created and displays an error message on the display 414 in step 3512 and then allows a user of the controller to continue selecting devices for the scene to be created in step 3508.

Alternatively, if the hand held RF controller 202 determines that the selected device for the scene to be created is controllable in step 3510, then the controller enters the operational level for the device selected for the new scene in step 3514. The hand held RF controller 202 then waits for a user of the hand held RF controller 202 to indicate whether the selection of devices for the scene to be created in the system 100 has been completed in step 3516. If the selection of devices for the scene to be created in the system 100 is indicated by a user as not completed in step 3516, then the hand held RF controller 202 waits for a user of the controller to select devices for the scene to be created in step 3508.

Figure 35A:
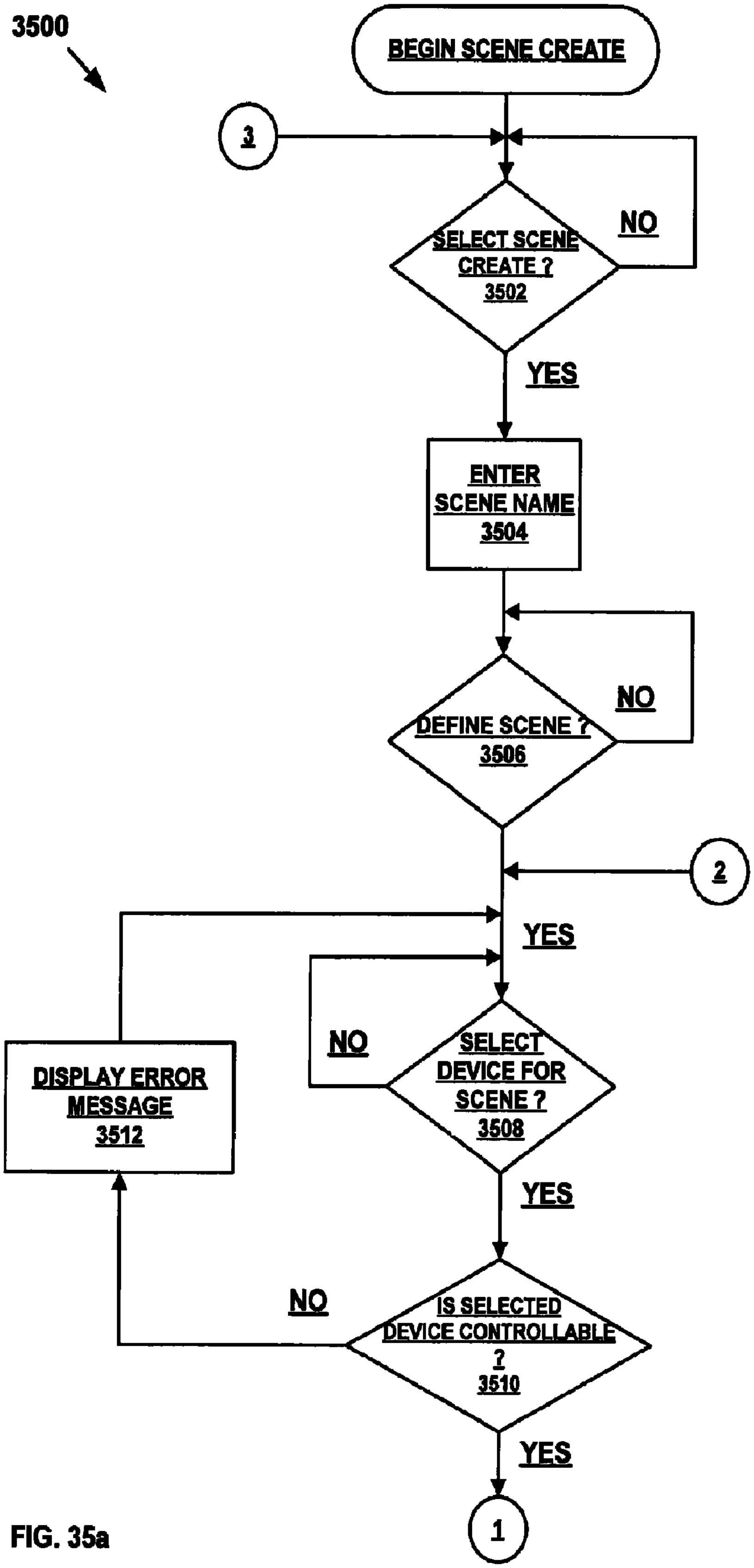
FIGS. 35*a*-35*d* is a flow chart and schematic illustration of an exemplary embodiment of a method of creating scenes in the system.
Figure 35B:
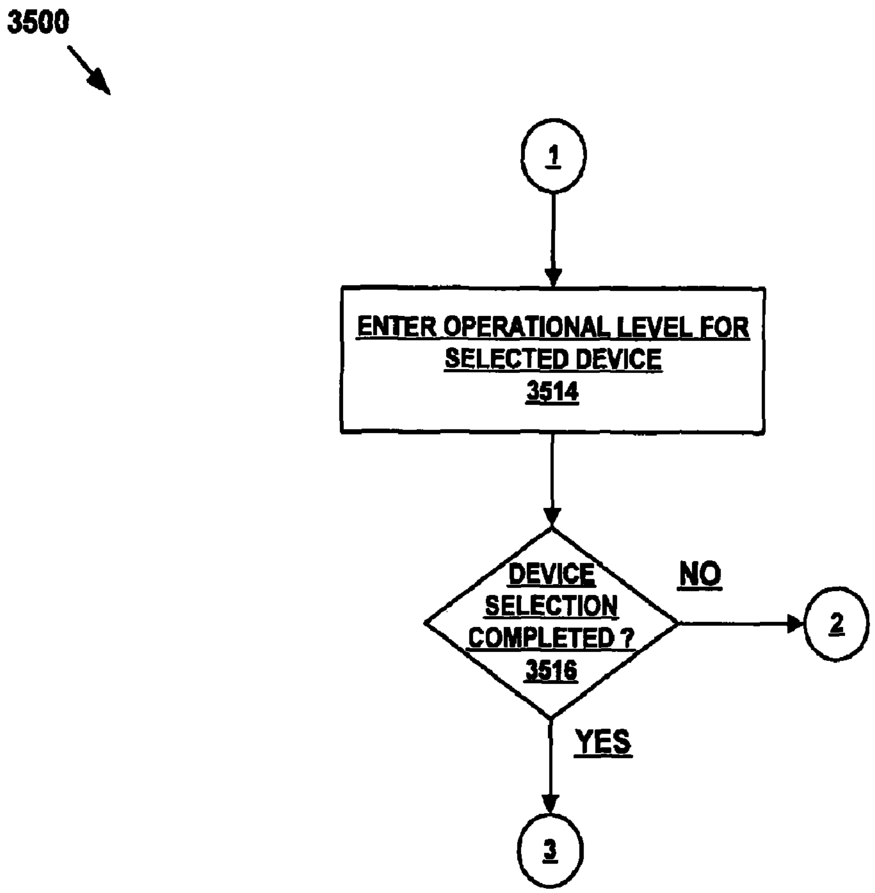
Figure 35C:
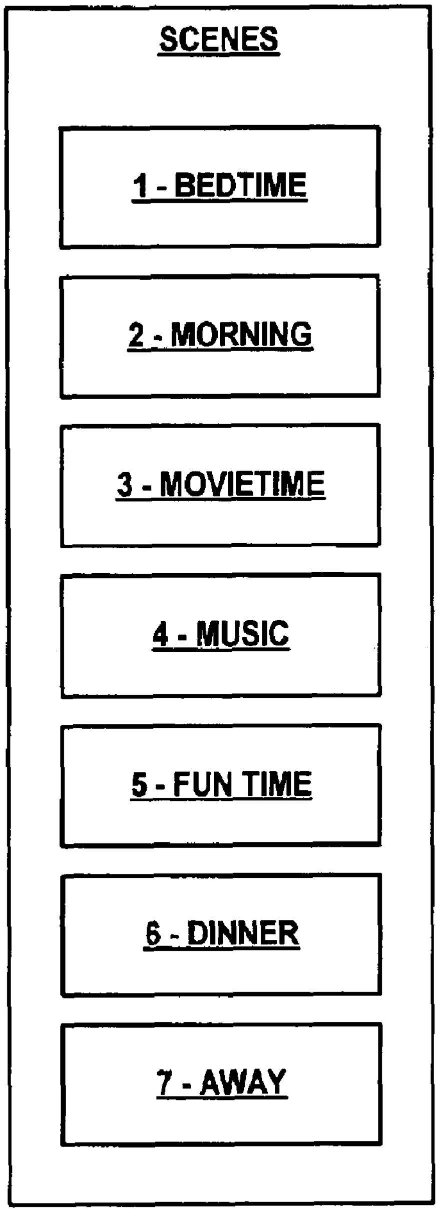
Figure 35D:
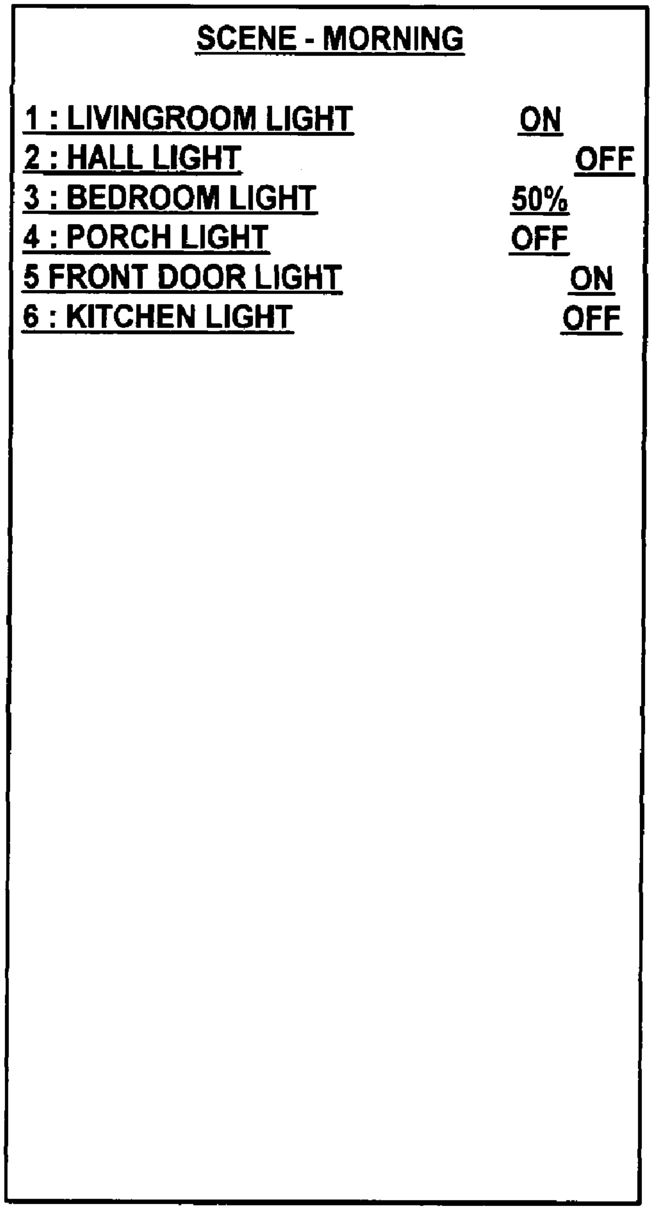

In an exemplary embodiment, as illustrated in FIG. 35*c*, the system 100 includes the following scenes: BEDTIME, MORNING, MOVIETIME, MUSIC, FUN TIME, DINNER, and AWAY. In an exemplary embodiment, as illustrated in FIG. 35*d*, the scene MORNING includes devices: LIVING ROOM LIGHT, HALL LIGHT, BEDROOM LIGHT, PORCH LIGHT, FRONT DOOR LIGHT, and KITCHEN LIGHT having operational values of ON, OFF, 50%, OFF, ON, and OFF.

In an exemplary embodiment, during the operation of the method 3500, the system 100 may provide one or more predetermined names for scenes for selection by the user in order speed up the process of scene creation.

Figure 36:
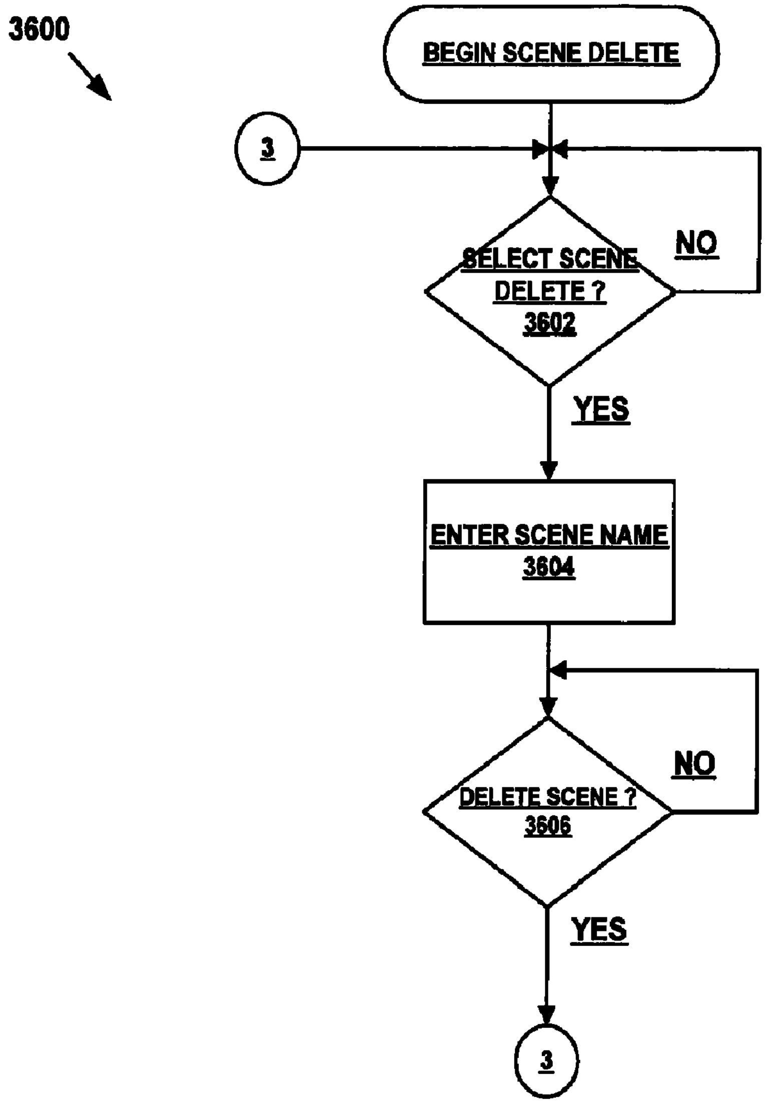
FIG. 36 is a flow chart illustration of an exemplary embodiment of a method of deleting scenes in the system.

Referring now to FIG. 36, in an exemplary embodiment, during the operation of the hand held RF controller 202, after a user sequentially selects SCENES 2006 and DELETE 2006*b*, using the menu-based program 2000, the controller implements a method 3600 in which the controller permits a user to delete a scene from the system 100. In particular, in step 3602 the hand held RF controller 202 determines if a user has selected deleting a scene within the system 100. If the user has selected deleting a scene within the system 100, then the display 414 of the hand held RF controller 202 prompts the user to enter the name of the scene to be deleted from the system in step 3604. Once a user of the hand held RF controller 202 has selected the name of the scene to be deleted from the system 100 in step 3604, the controller then waits for a user of the controller to confirm the deletion of the scene in step 3606.

Figure 37A:
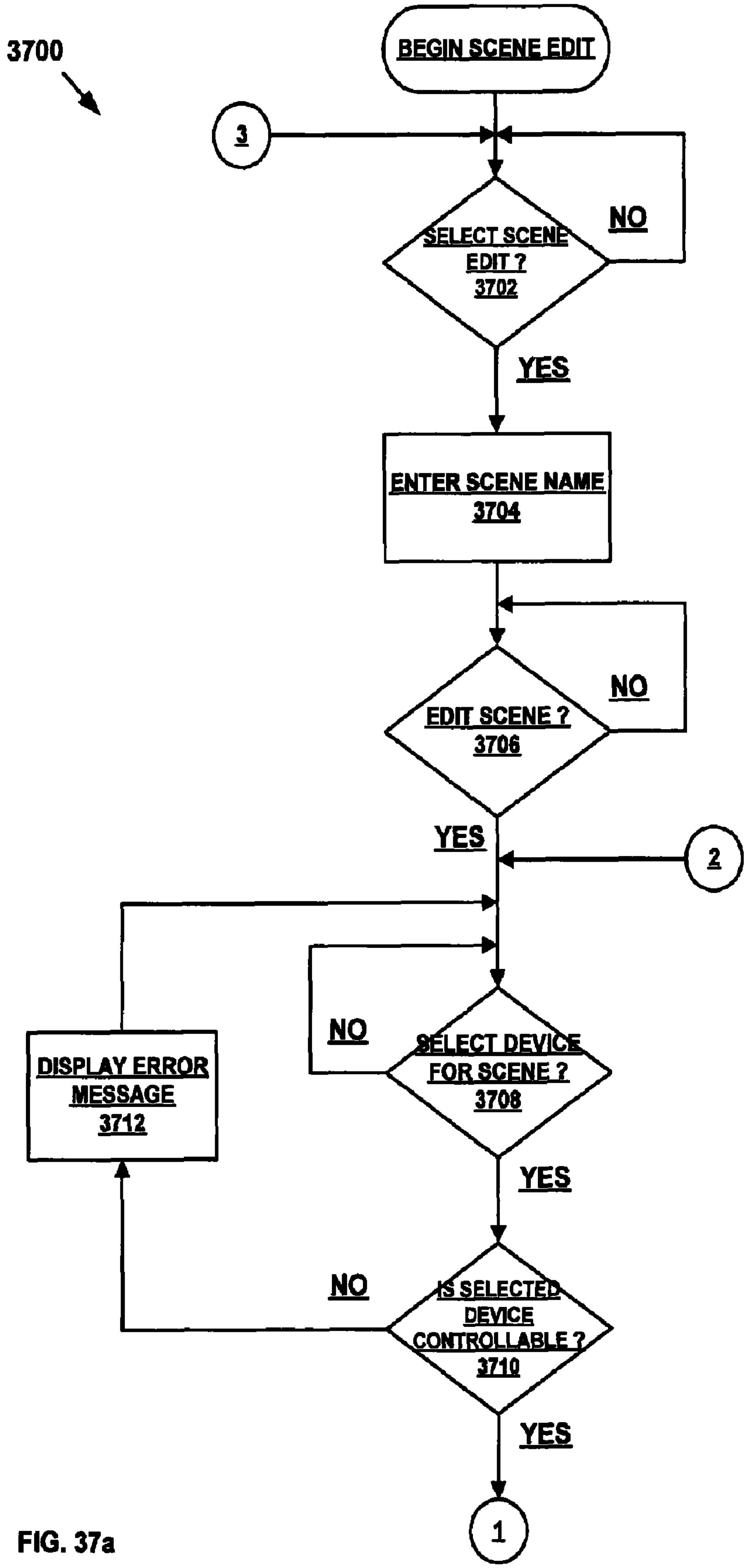
FIGS. 37*a*-37*b* is a flow chart illustration of an exemplary embodiment of a method of editing scenes in the system.
Figure 37B:
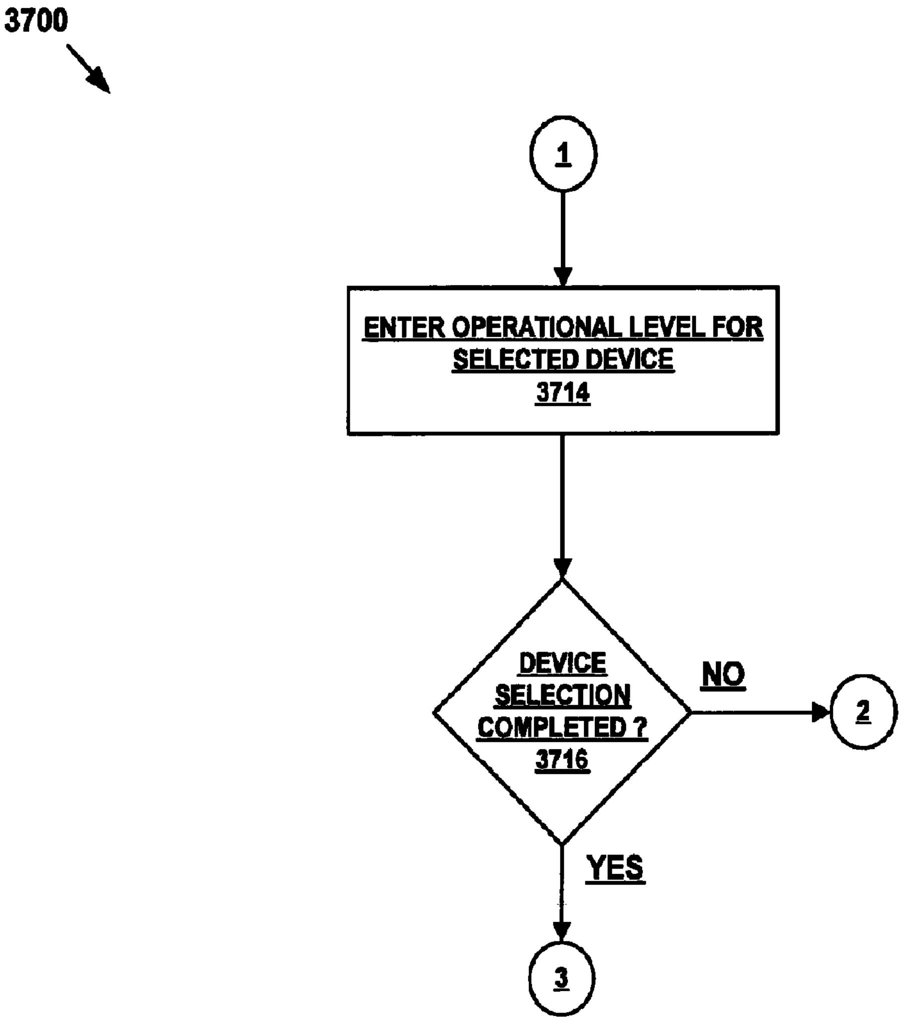

Referring now to FIGS. 37*a*-37*b*, in an exemplary embodiment, during the operation of the hand held RF controller 202, after a user sequentially selects SCENES 2006 and EDIT 2006*c*, using the menu-based program 2000, the controller implements a method 3700 in which the controller permits a user to edit a scene using one or more devices, such as, for example, master and slave nodes, 102 and 104, respectively, within the system 100. In particular, in step 3702 the hand held RF controller 202 determines if a user has selected editing a scene within the system 100. If a user has selected editing a scene within the system 100, then the display 414 of the hand held RF controller 202 prompts the user to enter the name of the scene to be edited within the system in step 3704.

Once a user of the hand held RF controller 202 has selected the name of the scene to be edited in the system 100 in step 3704, the controller then waits for a user of the controller to confirm the editing of the scene in step 3706. Once a user of the hand held RF controller 202 has confirmed editing of the scene in the system 100 in step 3706, the controller then waits for a user of the controller to select devices for the scene to be edited in step 3708.

If the hand held RF controller 202 determines that the selected device for the scene to be edited are not controllable in step 3710, then the controller cancels the selection of the device for the scene to be edited and displays an error message on the display 414 in step 3712 and then allows a user of the controller to continue selecting devices for the scene to be created in step 3708.

Alternatively, if the hand held RF controller 202 determines that the selected device for the scene to be created is controllable in step 3710, then the controller enters the operational level for the device selected for the scene to be edited in step 3714. The hand held RF controller 202 then waits for a user of the hand held RF controller 202 to indicate whether the selection of devices for the scene to be edited in the system 100 has been completed in step 3716. If the selection of devices for the scene to be edited in the system 100 is indicated by a user as not completed in step 3716, then the hand held RF controller 202 waits for a user of the controller to select devices for the scene to be created in step 3708.

In an exemplary embodiment, during the operation of the method 3700, a user of the hand held RF controller 202 may edit one or more of the following aspects of a selected scene:

the name of the scene, the number of the scene, the devices to be included in the scene, and the operational states of the devices to be included in the scene.

Figure 38:
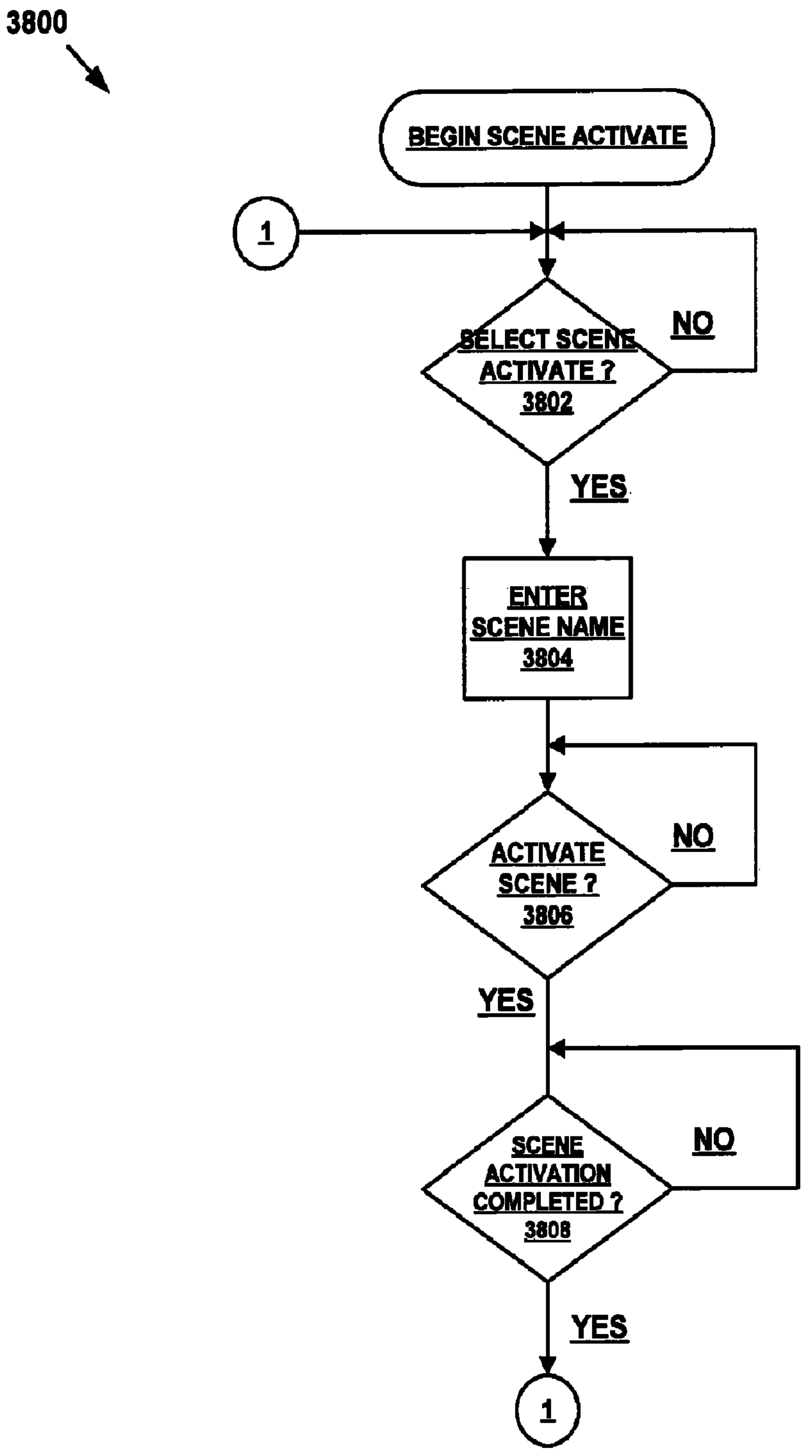
FIG. 38 is a flow chart illustration of an exemplary embodiment of a method of activating scenes in the system.

Referring now to FIG. 38, in an exemplary embodiment, during the operation of the hand held RF controller 202, after a user sequentially selects SCENES 2006 and ACTIVATE 2006*d*, using the menu-based program 2000, the controller implements a method 3800 in which the controller permits a user to activate a scene within the system 100. In particular, in step 3802 the hand held RF controller 202 determines if a user has selected activating a scene within the system 100. If a user has selected activating a scene within the system 100, then the display 414 of the hand held RF controller 202 prompts the user to enter the name of the scene to be activated within the system in step 3804.

Once a user of the hand held RF controller 202 has selected the name of the scene to be activated in the system 100 in step 3804, the controller then waits for a user of the controller to confirm the activation of the scene in step 3806. Once a user of the hand held RF controller 202 has confirmed activating the scene in the system 100 in step 3806, the controller then activates the selected scene in the system 100. Once the hand held RF controller 202 determines that the selected scene has been activated in step 3808, the controller permits a user of the system 100 to activate additional scenes in step 3802.

Figure 39:
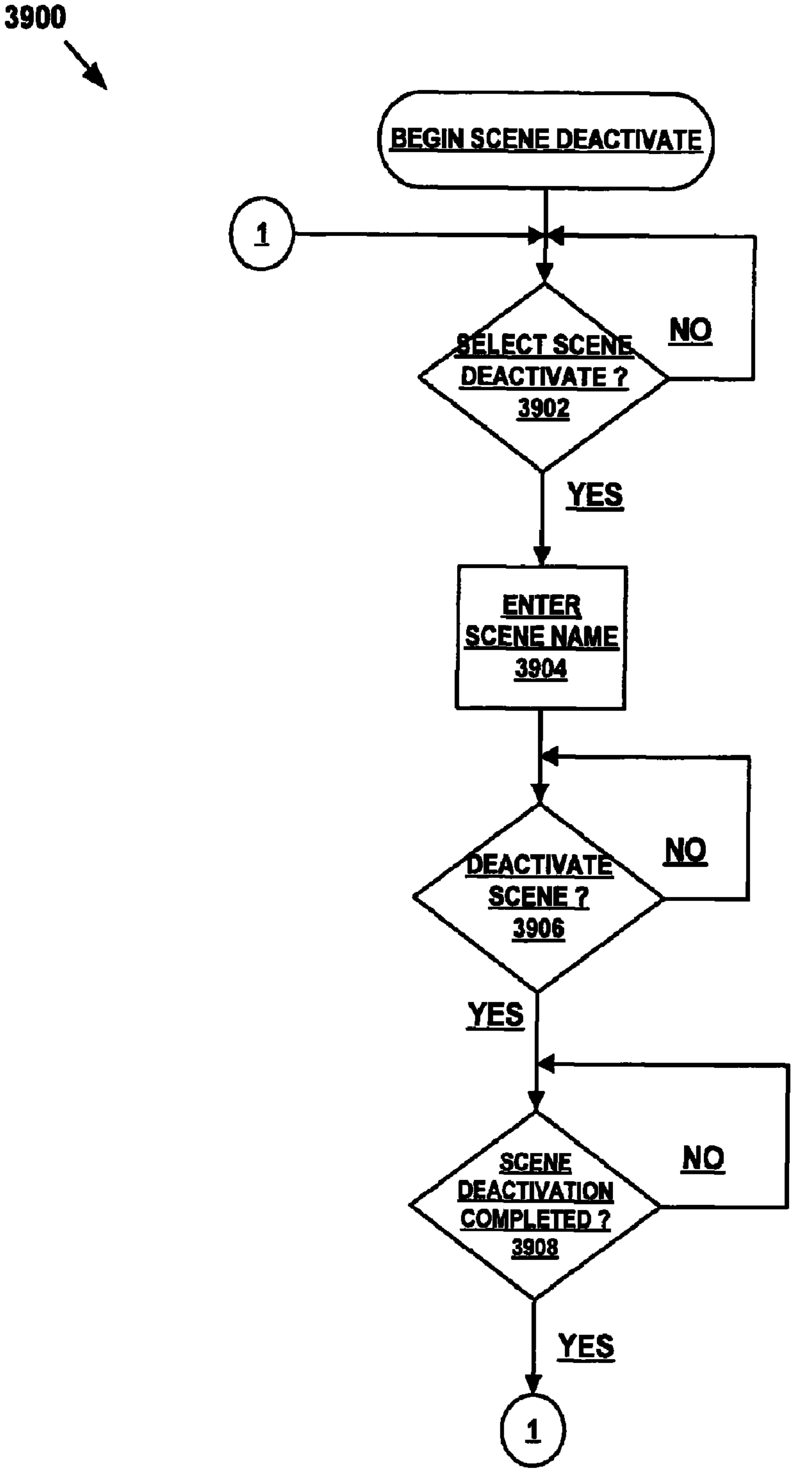
FIG. 39 is a flow chart illustration of an exemplary embodiment of a method of deactivating scenes in the system.

Referring now to FIG. 39, in an exemplary embodiment, during the operation of the hand held RF controller 202, after a user sequentially selects SCENES 2006 and DEACTIVATE 2006*e*, using the menu-based program 2000, the controller implements a method 3900 in which the controller permits a user to deactivate a scene within the system 100. In particular, in step 3902 the hand held RF controller 202 determines if a user has selected deactivating a scene within the system 100. If a user has selected deactivating a scene within the system 100, then the display 414 of the hand held RF controller 202 prompts the user to enter the name of the scene to be deactivated within the system in step 3904.

Once a user of the hand held RF controller 202 has selected the name of the scene to be deactivated in the system 100 in step 3804, the controller then waits for a user of the controller to confirm the deactivation of the scene in step 3906. Once a user of the hand held RF controller 202 has confirmed deactivating the scene in the system 100 in step 3906, the controller then deactivates the selected scene in the system 100. Once the hand held RF controller 202 determines that the selected scene has been deactivated in step 3908, the controller permits a user of the system 100 to deactivate additional scenes in step 3902.

Figure 40A:
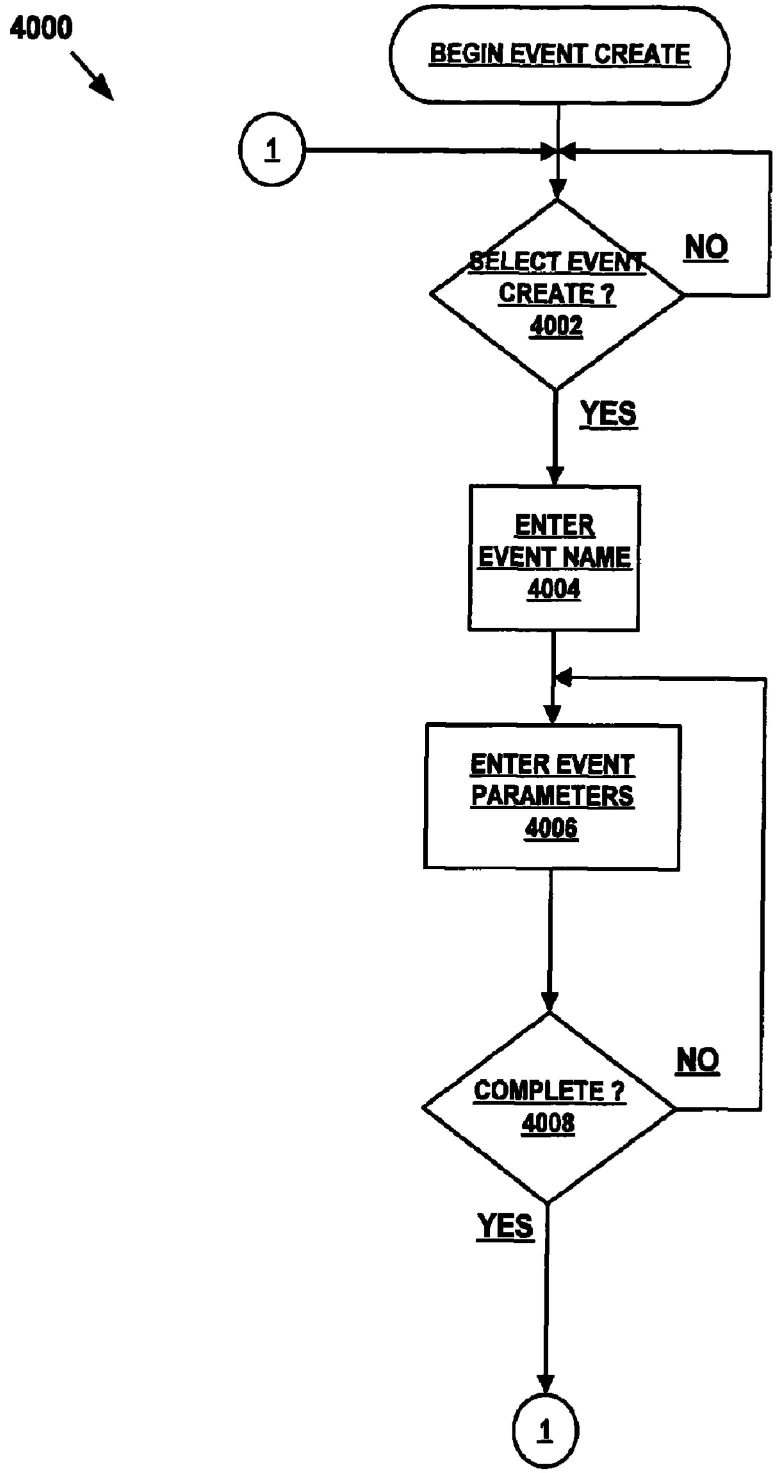
FIGS. 40*a*-40*b* is a flow chart and schematic illustration of an exemplary embodiment of a method of creating events in the system.
Figure 40B:
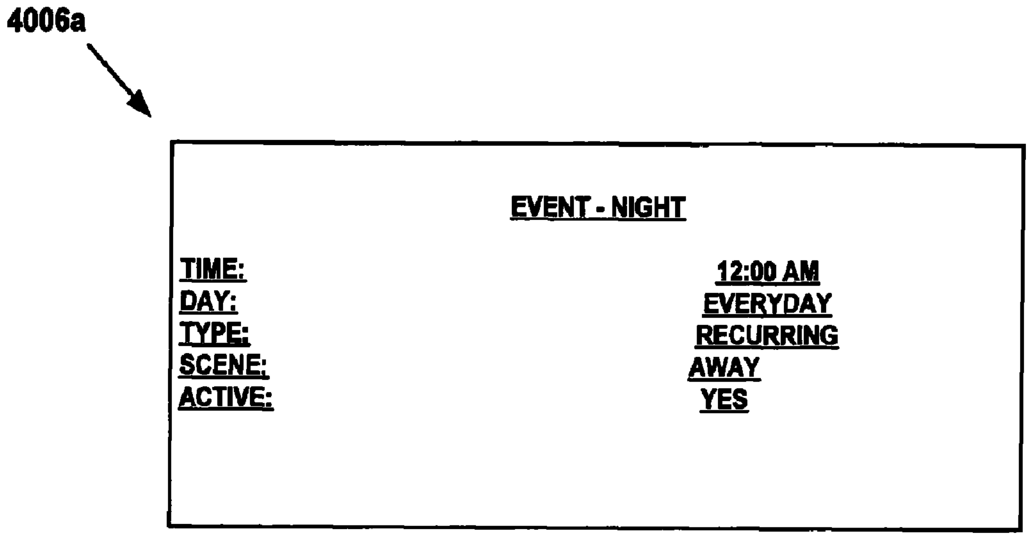

Referring now to FIGS. 40*a*-40*b*, in an exemplary embodiment, during the operation of the hand held RF controller 202, after a user sequentially selects EVENTS 2008 and CREATE 2008*a*, using the menu-based program 2000, the controller implements a method 4000 in which the controller permits a user to create an event using one or more user defined scenes within the system 100. In particular, in step 4002 the hand held RF controller 202 determines if a user has selected creating an event within the system 100. If the user has selected creating an event within the system 100, then the display 414 of the hand held RF controller 202 prompts the user to enter the name of the event to be created within the system in step 4004.

Once a user of the hand held RF controller 202 has selected the name of the event to be created in the system 100 in step 4004, the controller then permits a user of the controller to enter the parameters 4006*a* of the event in step 4006. In an exemplary embodiment, the parameters 4006*a* of the event include: the time of the event, the day of the event, the type of event, the scene to be used in the event, and the activity level of the event. If the event parameters have been completed in step 4008, then the hand held RF controller 202 permits a user to create further events in step 4002.

Figure 41:
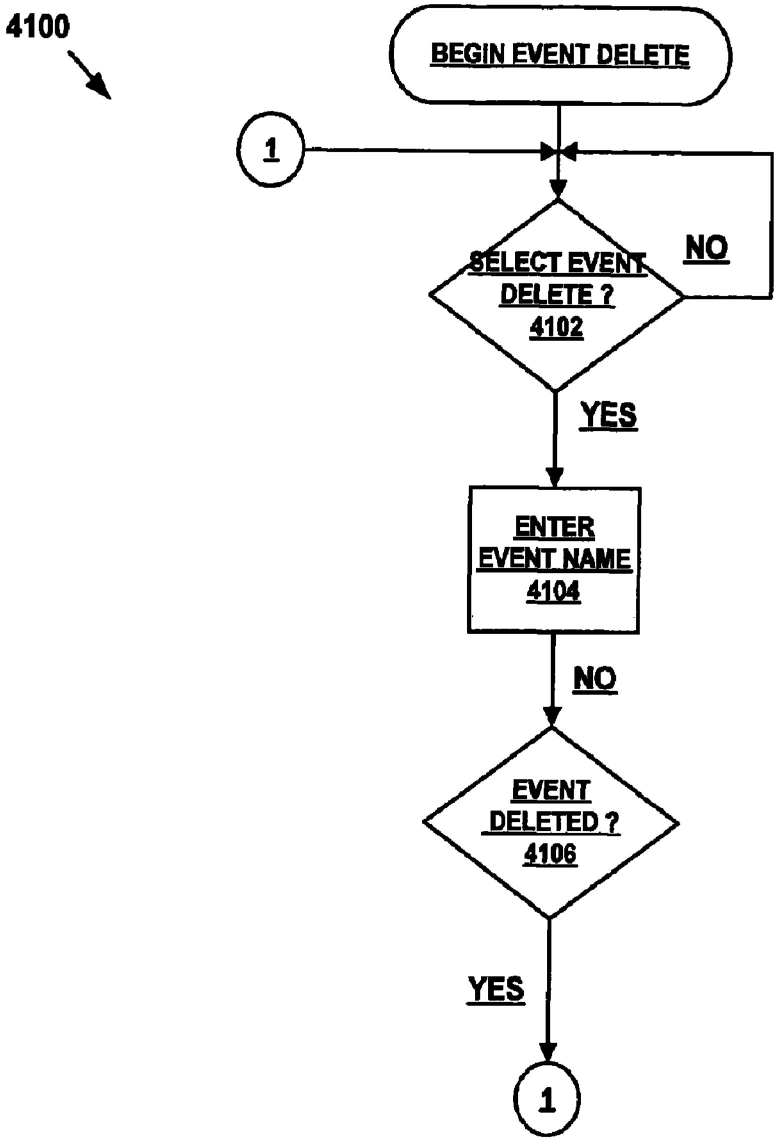
FIG. 41 is a flow chart illustration of an exemplary embodiment of a method of deleting events in the system.

Referring now to FIG. 41, in an exemplary embodiment, during the operation of the hand held RF controller 202, after a user sequentially selects EVENTS 2008 and DELETE 2008*b*, using the menu-based program 2000, the controller implements a method 4100 in which the controller permits a user to delete an event from the system 100. In particular, in step 4102 the hand held RF controller 202 determines if a user has selected deleting an event from the system 100. If the user has selected deleting an event from the system 100, then the display 414 of the hand held RF controller 202 prompts the user to enter the name of the event to be deleted from the system in step 4104. Once a user of the hand held RF controller 202 has selected the name of the event to be deleted from the system 100 in step 4104, the controller then waits for a user of the controller to confirm the deletion of the event in step 4106.

Figure 42:
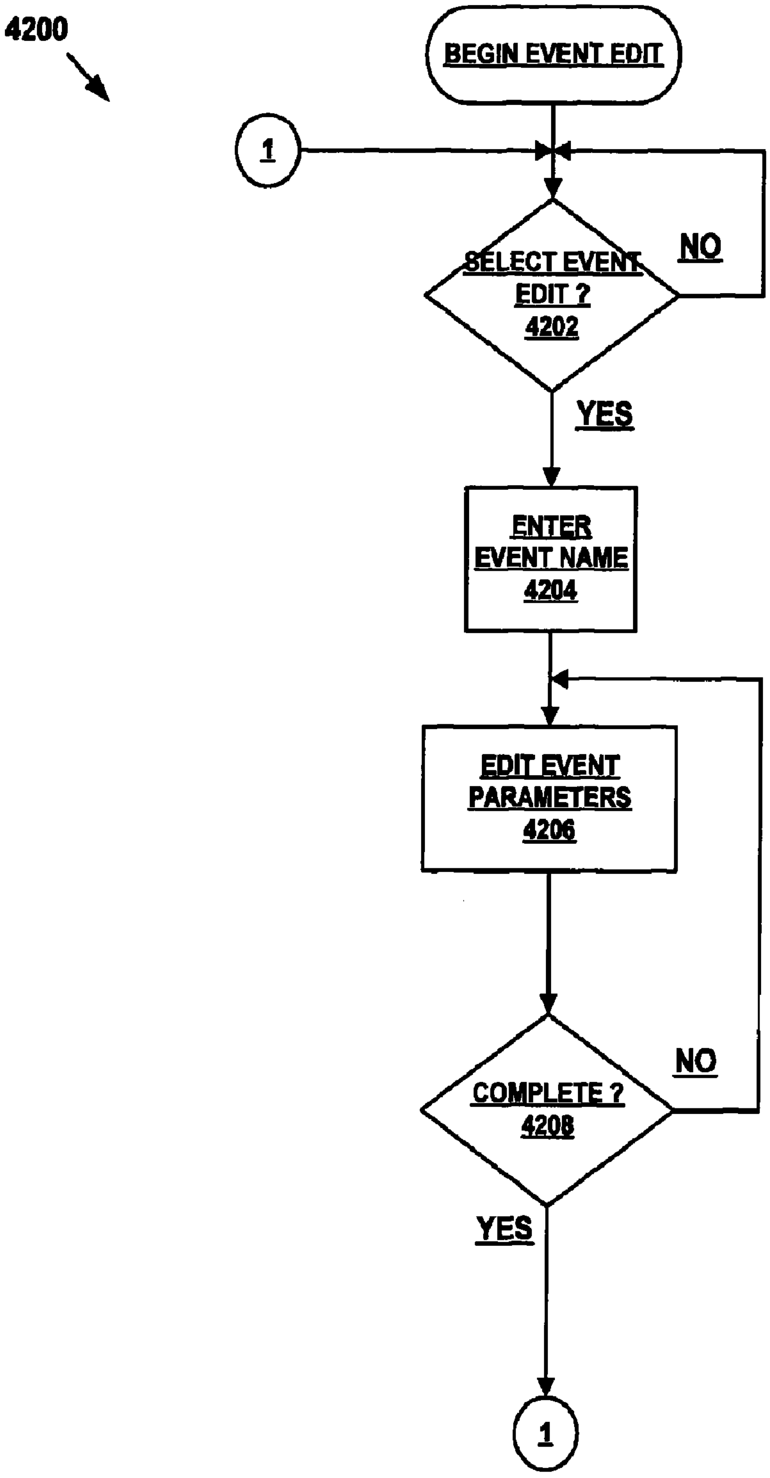
FIG. 42 is a flow chart illustration of an exemplary embodiment of a method of editing events in the system.

Referring now to FIG. 42, in an exemplary embodiment, during the operation of the hand held RF controller 202, after a user sequentially selects EVENTS 2008 and EDIT 2008*c*, using the menu-based program 2000, the controller implements a method 4200 in which the controller permits a user to edit an event in the system 100. In particular, in step 4202 the hand held RF controller 202 determines if a user has selected editing an event in the system 100. If the user has selected editing an event in the system 100, then the display 414 of the hand held RF controller 202 prompts the user to enter the name of the event to be edited in the system in step 4204. Once a user of the hand held RF controller 202 has selected the name of the event to be edited in the system 100 in step 4204, the controller then waits for a user of the controller to edit the parameters of the event in steps 4206 and 4208.

In an exemplary embodiment, during the operation of the method 4200, in steps 4206 and 4208, a user of the hand held RF controller 202 may edit one or more of the following aspects of a selected event: the name of the event, the number of the event, the scenes to be included in the scene, the operational states of the scenes to be included in the event, and the timing of the event.

Figure 43:
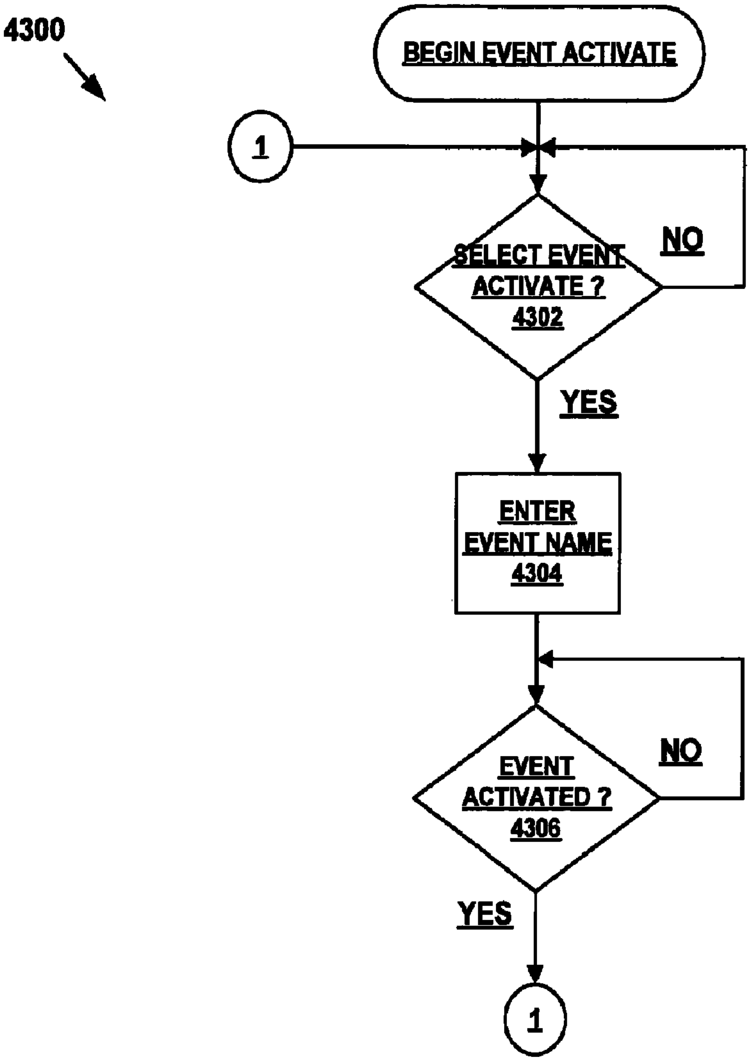
FIG. 43 is a flow chart illustration of an exemplary embodiment of a method of activating events in the system.

Referring now to FIG. 43, in an exemplary embodiment, during the operation of the hand held RF controller 202, after a user sequentially selects EVENTS 2008 and ACTIVATE 2008*d*, using the menu-based program 2000, the controller implements a method 4300 in which the controller permits a user to activate an event within the system 100. In particular, in step 4302 the hand held RF controller 202 determines if a user has selected activating an event within the system 100. If a user has selected activating an event within the system 100, then the display 414 of the hand held RF controller 202 prompts the user to enter the name of the event to be activated within the system in step 4304.

Once a user of the hand held RF controller 202 has selected the name of the event to be activated in the system 100 in step 4304, the controller then waits for a user of the controller to confirm the activation of the event in step 4306. Once a user of the hand held RF controller 202 has confirmed activating the event in the system 100 in step 4306, the controller then activates the selected event in the system 100. Once the hand held RF controller 202 activates the selected event in step 4306, the controller permits a user of the system 100 to activate additional events in step 4302.

Figure 44:
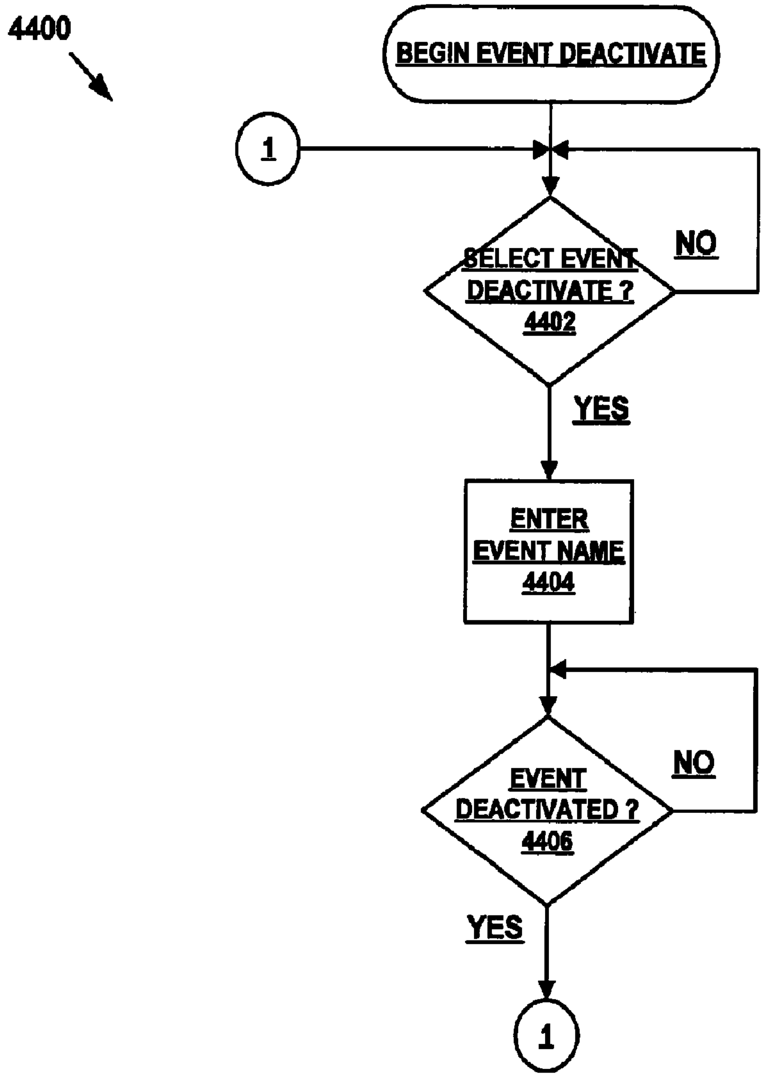
FIG. 44 is a flow chart illustration of an exemplary embodiment of a method of deactivating events in the system.

Referring now to FIG. 44, in an exemplary embodiment, during the operation of the hand held RF controller 202, after a user sequentially selects EVENTS 2008 and DEACTIVATE

2008*e*, using the menu-based program 2000, the controller implements a method 4400 in which the controller permits a user to deactivate an event within the system 100. In particular, in step 4402 the hand held RF controller 202 determines if a user has selected deactivating an event within the system 100. If a user has selected deactivating an event within the system 100, then the display 414 of the hand held RF controller 202 prompts the user to enter the name of the event to be deactivated within the system in step 4404.

Once a user of the hand held RF controller 202 has selected the name of the event to be deactivated in the system 100 in step 4404, the controller then waits for a user of the controller to confirm the deactivation of the event in step 4406. Once a user of the hand held RF controller 202 has confirmed deactivating the event in the system 100 in step 4406, the controller then deactivates the selected event in the system 100. Once the hand held RF controller 202 deactivates the selected event in step 4406, the controller permits a user of the system 100 to deactivate additional events in step 4402.

Figure 45:
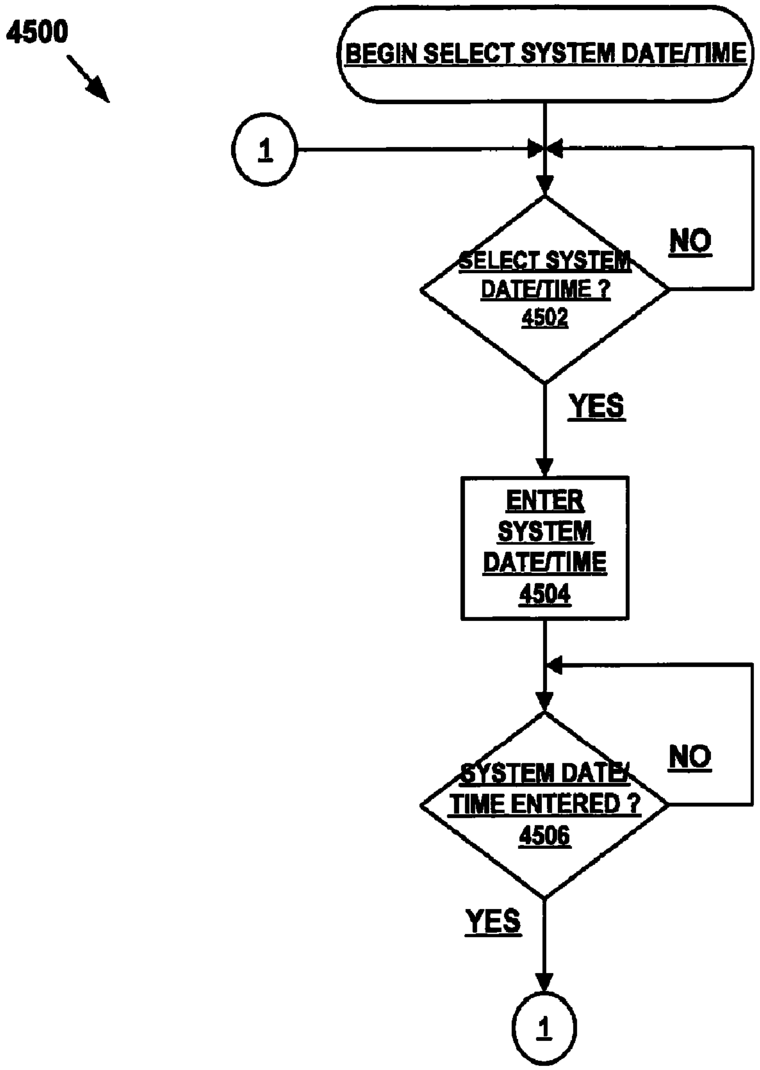
FIG. 45 is a flow chart illustration of an exemplary embodiment of a method of selecting a date and time for the system.

Referring now to FIG. 45, in an exemplary embodiment, during the operation of the hand held RF controller 202, after a user sequentially selects SYSTEM 2010 and DATE/TIME 2010*a*, using the menu-based program 2000, the controller implements a method 4500 in which the controller permits a user to select the date and time for the system 100. In particular, in step 4502 the hand held RF controller 202 determines if a user has selected entering the date and time for the system 100. If a user has selected entering the date and time for the system 100, then the display 414 of the hand held RF controller 202 prompts the user to enter the date and time for the system in step 4504. Once a user of the hand held RF controller 202 has entered and confirmed the date and time of the system in step 4506, the controller then permits a user of the controller to enter another date and time for the system 100 in step 4502.

Figure 46A:
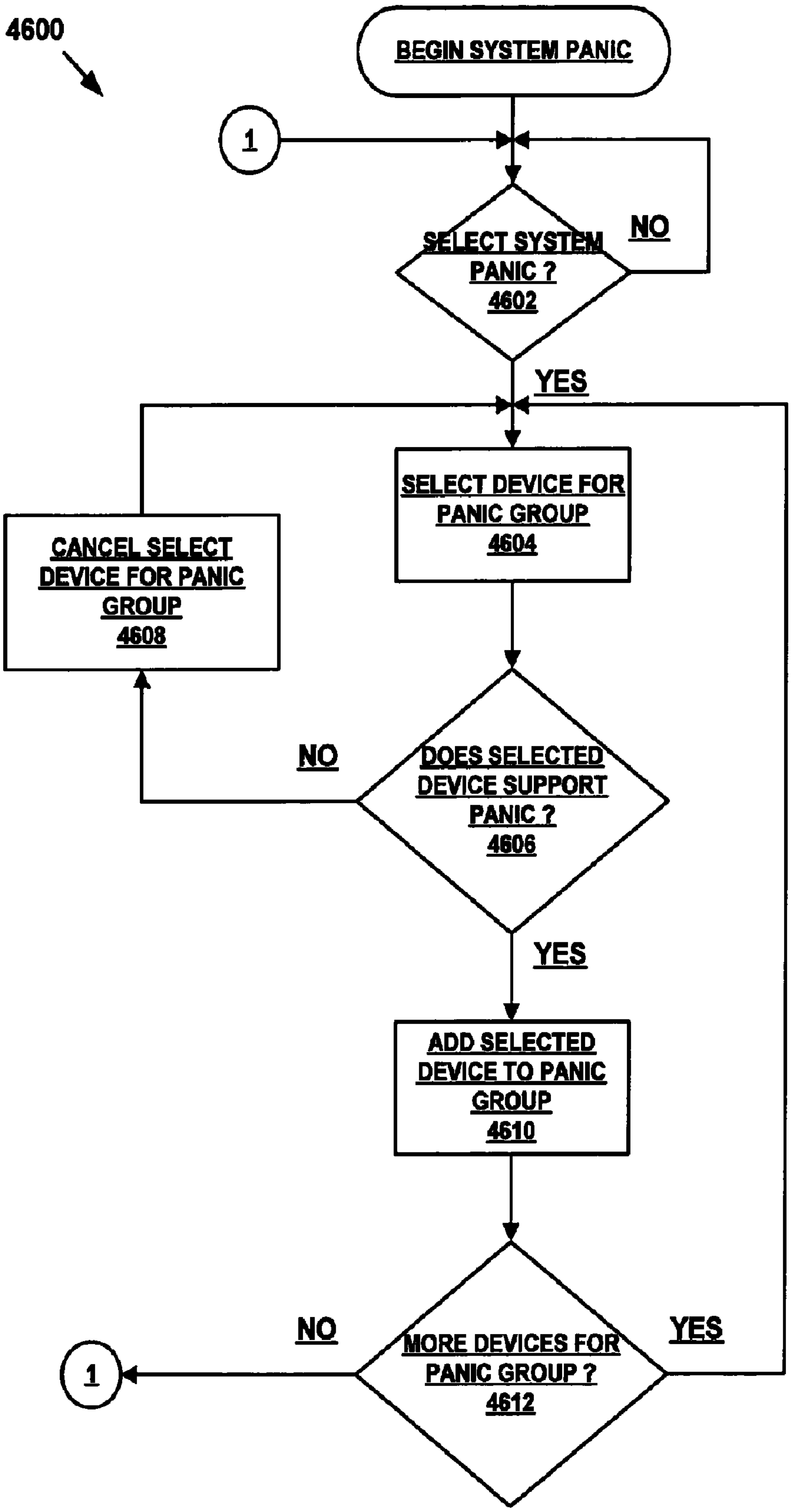
Figure 46B:
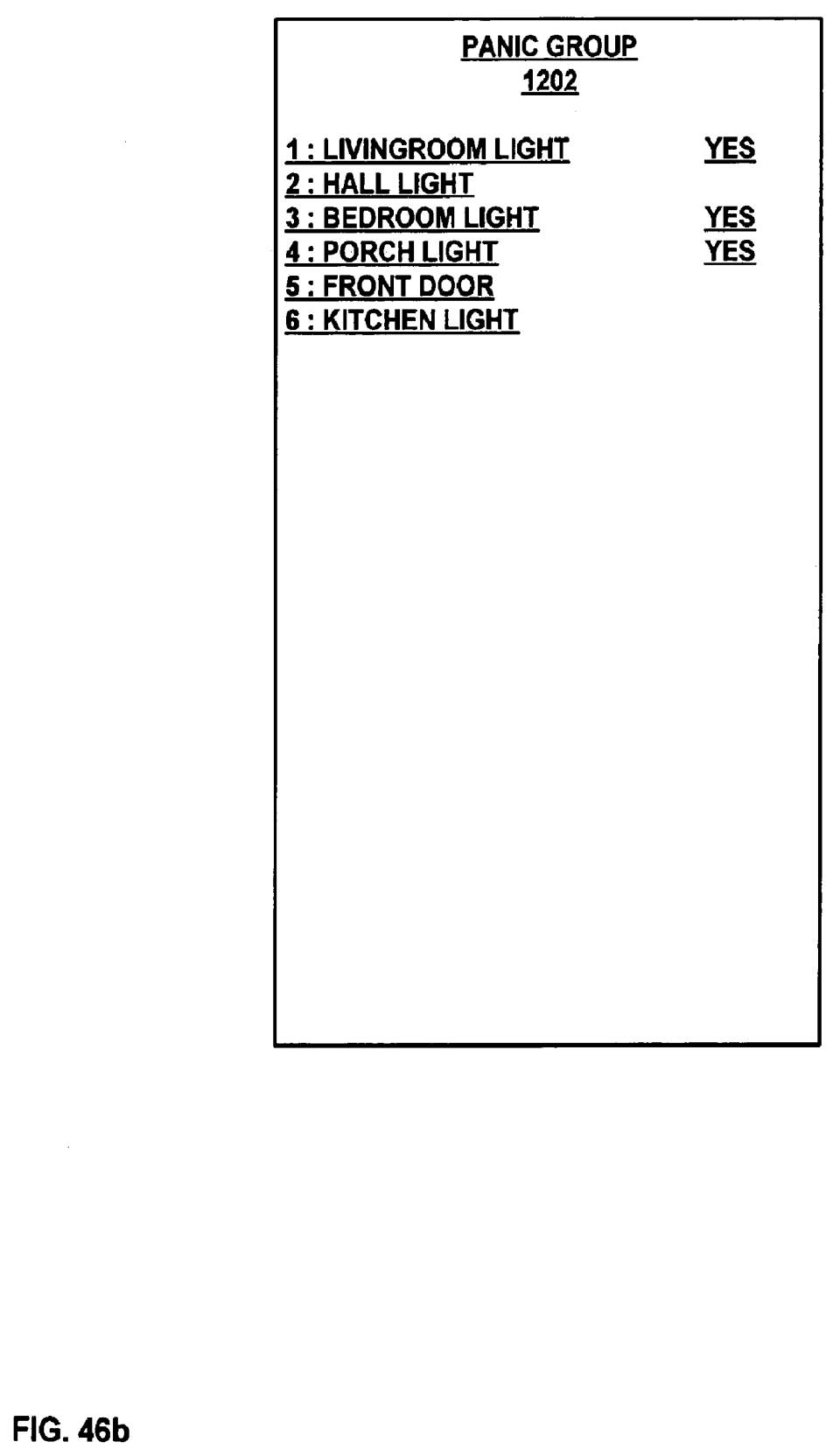

Referring now to FIGS. 46*a*-46*b*, in an exemplary embodiment, during the operation of the hand held RF controller 202, after a user sequentially selects SYSTEM 2010 and PANIC 2010*b*, using the menu-based program 2000, the controller implements a method 4500 in which the controller permits a user to configure the panic group 1202 for the system 100. In particular, in step 4602 the hand held RF controller 202 determines if a user has selected configuring the panic group 1202 for the system 100. If a user has selected configuring the panic group 1202 for the system 100, then the display 414 of the hand held RF controller 202 prompts the user to select a device such as, for example, a master or slave node, 102 or 104, respectively, for inclusion in the panic group of the system in step 4604. After a user of the hand held RF controller 202 has selected a device for inclusion in the panic group 1202 of the system 100 in step 4604, the controller then determines if the selected device for inclusion in the panic group of the system supports a panic operation in step 4606.

If the hand held RF controller 202 determines that the device selected for inclusion in the panic group 1202 of the system 100 does not support a panic operation in step 4606, then the controller displays an error message on the display 414 of the controller and cancels the selection of the device in step 4608, and permits a user of the controller to select another device in step 4604. Alternatively, if the hand held RF controller 202 determines that the device selected for inclusion in the panic group 1202 of the system 100 does support a panic operation in step 4606, then the selected device is added to the panic group for the system in step 4610.

If a user of the hand held RF controller 202 indicates that more devices will be selected for inclusion in the panic group 1202 of the system 100 in step 4612, then the controller permits a user of the controller to select more devices for inclusion in the panic group for the system in step 4604.

Figure 47:
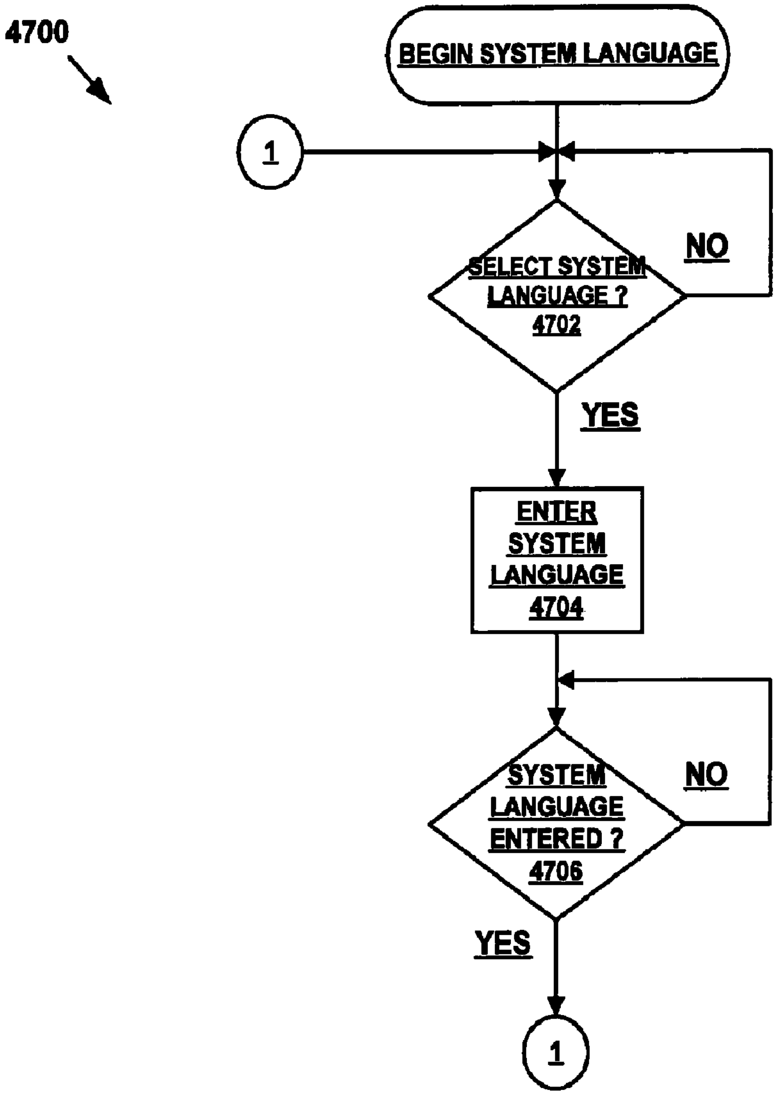
FIG. 47 is a flow chart illustration of an exemplary embodiment of a method of selecting a language for the system.

Referring now to FIG. 47, in an exemplary embodiment, during the operation of the hand held RF controller 202, after a user sequentially selects SYSTEM 2010 and LANGUAGE 2010*c*, using the menu-based program 2000, the controller implements a method 4700 in which the controller permits a user to select the language for the system 100. In particular, in step 4702 the hand held RF controller 202 determines if a user has selected entering the language for the system 100. If a user has selected entering the language for the system 100, then the display 414 of the hand held RF controller 202 prompts the user to enter the language for the system in step 4704. Once a user of the hand held RF controller 202 has entered and confirmed the language of the system in step 4706, the controller then permits a user of the controller to enter another language for the system 100 in step 4702.

Figure 48A:
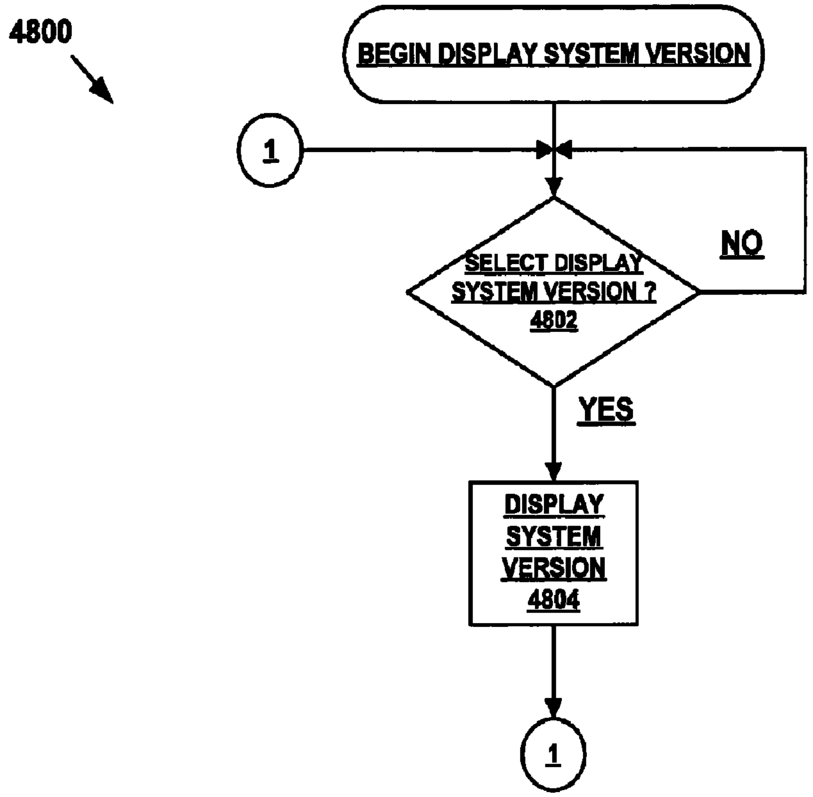
FIGS. 48*a*-48*b* is a flow chart and schematic illustration of an exemplary embodiment of a method of displaying a system version for the system.
Figure 48B:
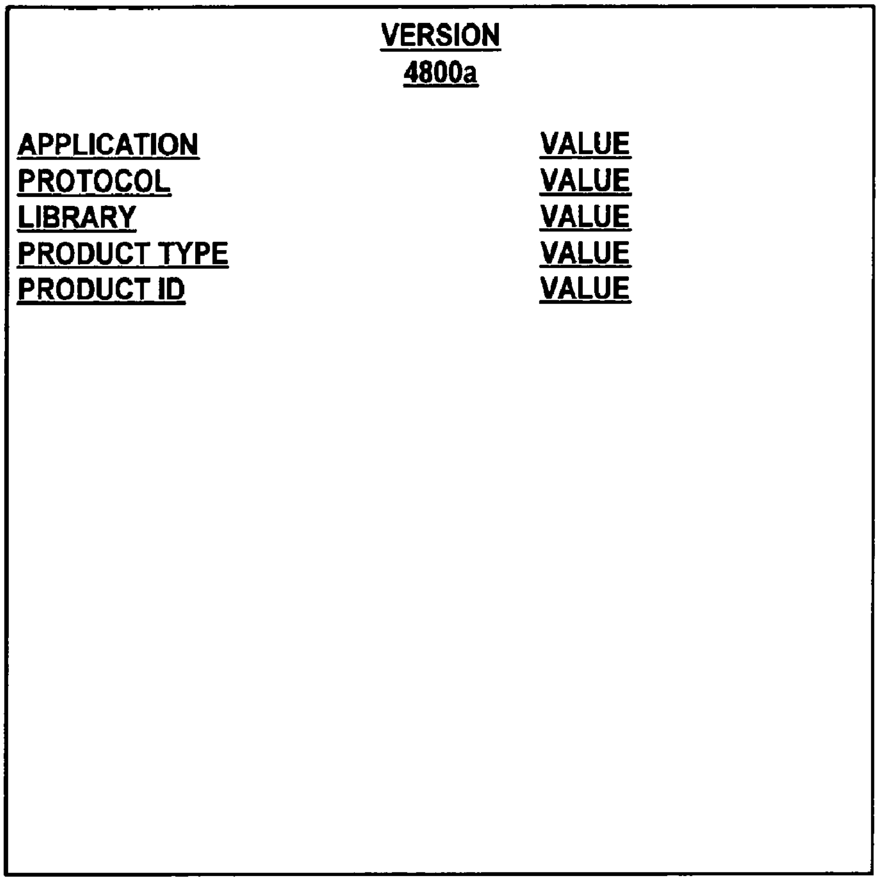

Referring now to FIGS. 48*a*-48*b*, in an exemplary embodiment, during the operation of the hand held RF controller 202, after a user sequentially selects SYSTEM 2010 and VERSION 2010*d*, using the menu-based program 2000, the controller implements a method 4800 in which the controller permits a user to display the version 4800*a* for the system 100. In particular, in step 4802 the hand held RF controller 202 determines if a user has selected displaying the version of the system 100. If a user has selected viewing the version of the system 100, then the display 414 of the hand held RF controller 202 displays the version 4800*a* of the system in step 4804.

Figure 49A:
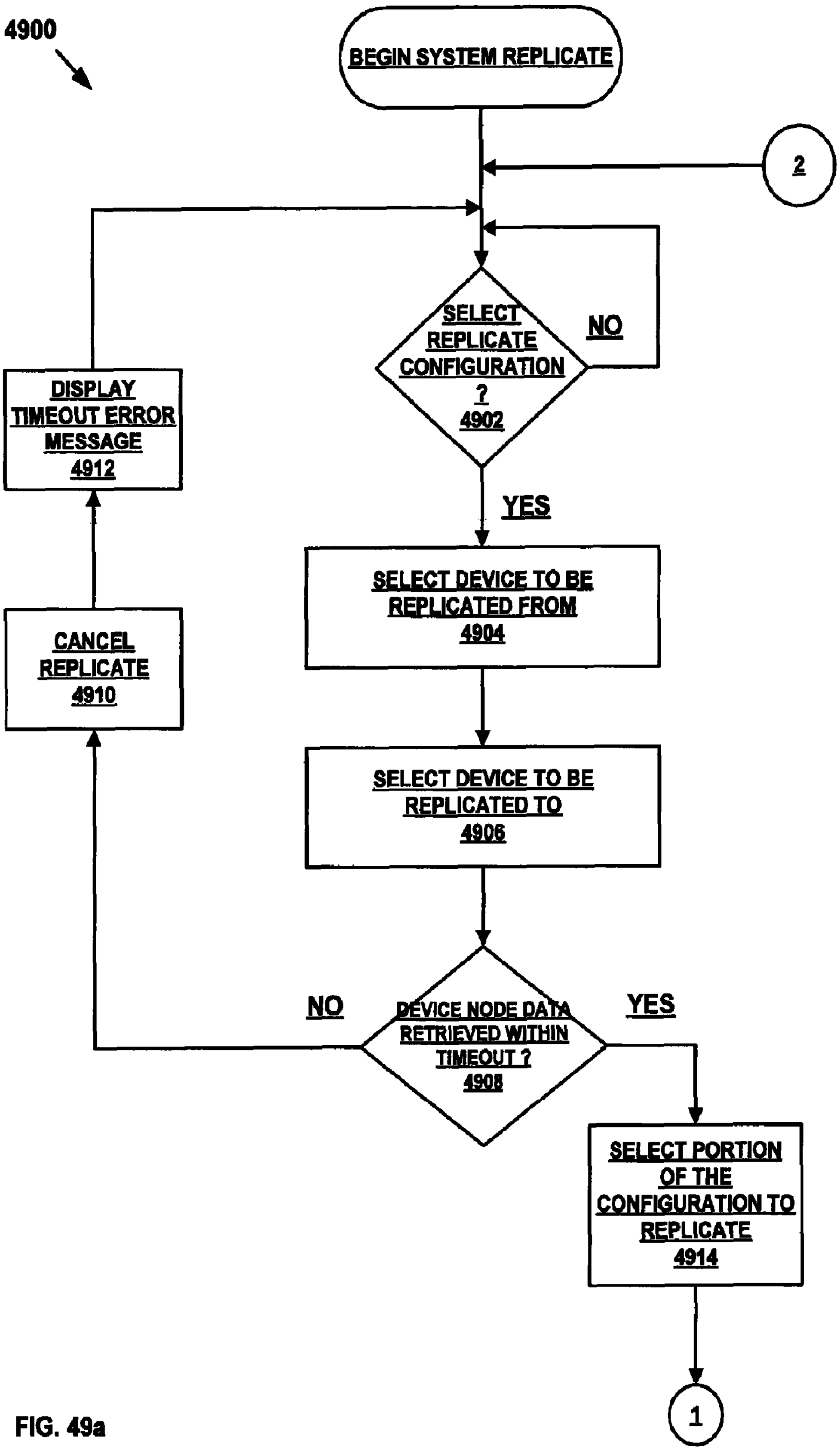
FIGS. 49*a*-49*c* is a flow chart and schematic illustration of an exemplary embodiment of a method of replicating a configuration of the system.
Figure 49B:
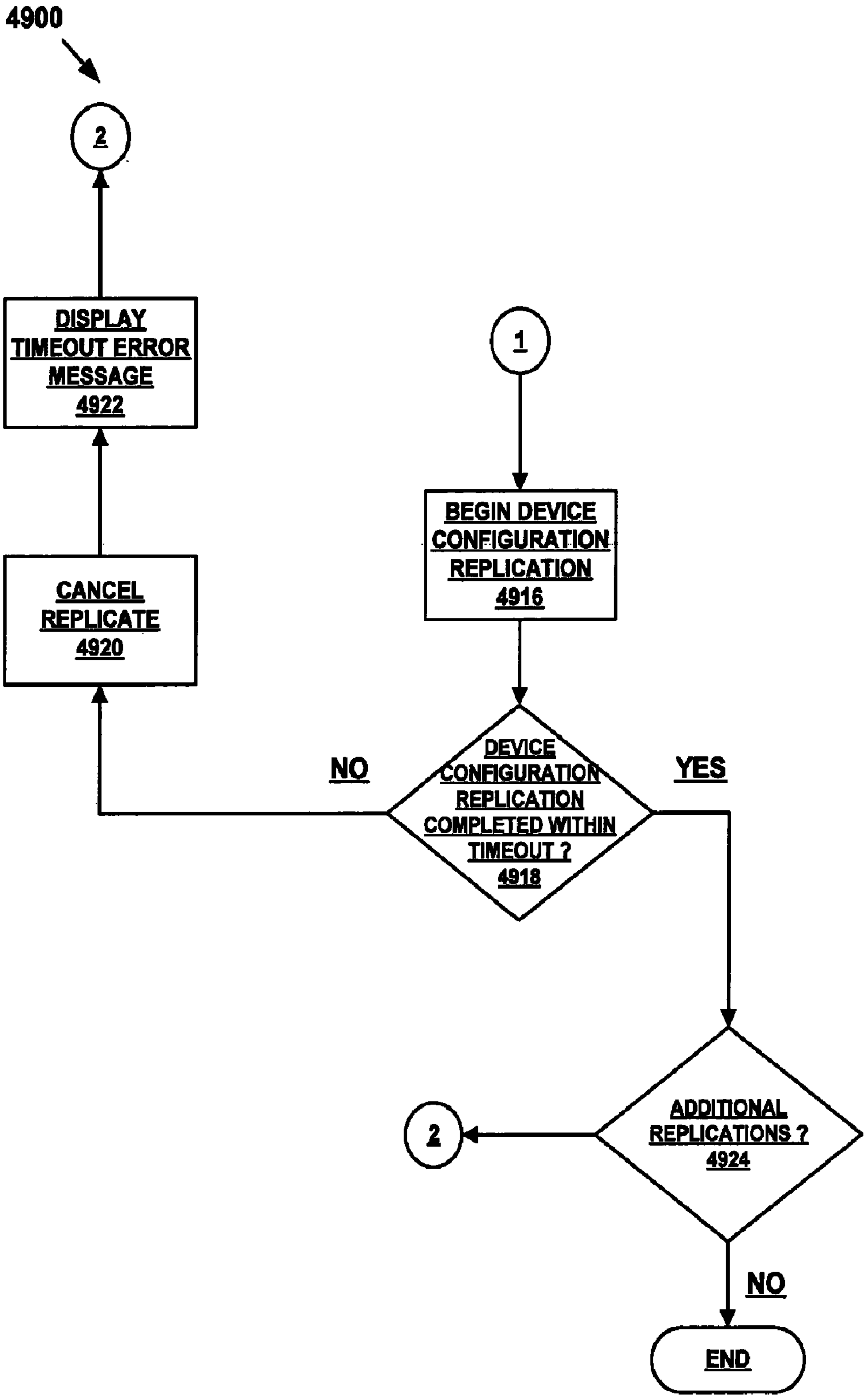
Figure 49C:
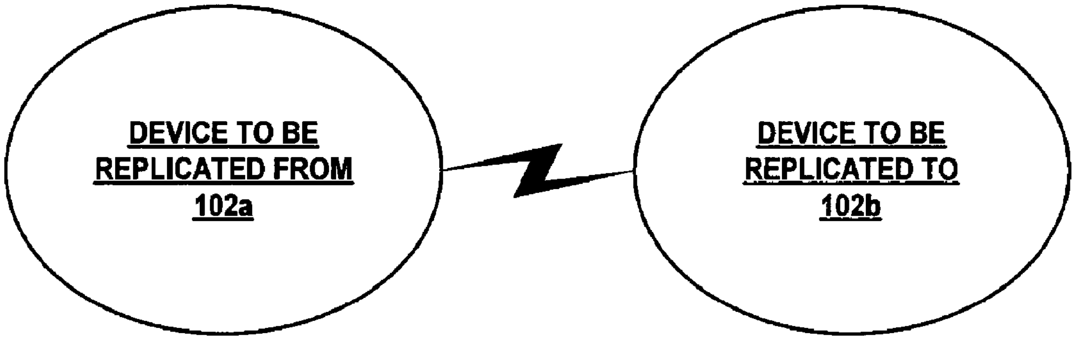

Referring now to FIGS. 49*a*-49*c*, in an exemplary embodiment, during the operation of the hand held RF controller 202, after a user sequentially selects SYSTEM 2010 and REPLICATE 2010*e*, using the menu-based program 2000, the controller implements a method 4900 in which the controller permits a user to replicate the configuration of a system 100 contained within a first device, such as, for a example a first master node 102*a* into another device such as, for example, a second master node 102*b*. In particular, in step 4902 the hand held RF controller 202 determines if a user has selected replicating the configuration of the system 100. If a user has selected replicating the configuration of the system 100, then the display 414 of the hand held RF controller 202 prompts a user of the controller to enter the name of the device to be replicated from in step 4904 and the name of the device to be replicated to in step 4906.

After a user of the hand held RF controller 202 has entered the name of the device to be replicated from in step 4904 and the name of the device to be replicated to in step 4906, the node information for both of the devices is transmitted to the controller. If the node information for both of the devices is not received by the hand held RF controller 202 within a predetermined timeout period in step 4908, then replication is canceled in step 4910 and the display 414 of controller displays an error message in step 4912.

Alternatively, if the node information for both of the devices is received by the hand held RF controller 202 within a predetermined timeout period in step 4908, then the display 414 of the controller prompts a user of the controller to select the portions of the configuration of the system 100 to be replicated from the first master node 102*a* to the second master node 102*b* in step 4914. After a user of the hand held RF controller 202 selects the portions of the configuration of the system 100 to be replicated from the first master node 102*a* to the second master node 102*b* in step 4914, the replication of the configuration of the system begins in step 4916.

If the replication of the configuration of the system 100 is not completed within a predetermined timeout period in step

4918, then replication is canceled in step 4920 and the display 414 of the hand held RF controller 202 displays an error message in step 4922. Alternatively, if the replication of the configuration of the system 100 is completed within a predetermined timeout period in step 4918, then the hand held RF controller 202 prompts a user of the controller to indicate if additional replications are to be performed in step 4924. If a user of the hand held RF controller 202 indicates that additional replications of the configuration of the system 100 are to be performed, the controller then permits a user to select further replications in step 4902.

Figure 50A:
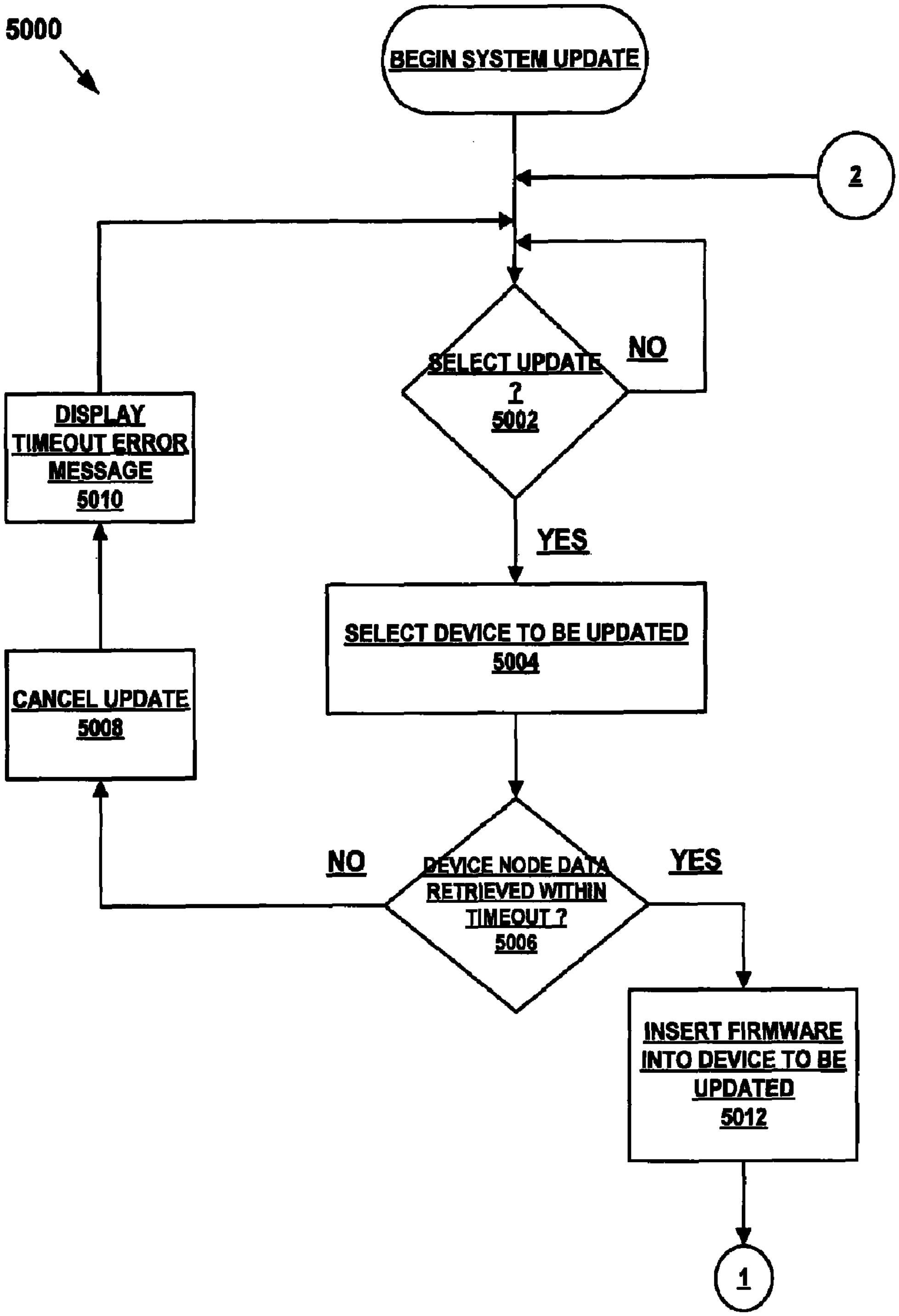
FIGS. 50*a*-50*c* is a flow chart and schematic illustration of an exemplary embodiment of a method of updating a configuration of the system.
Figure 50B:
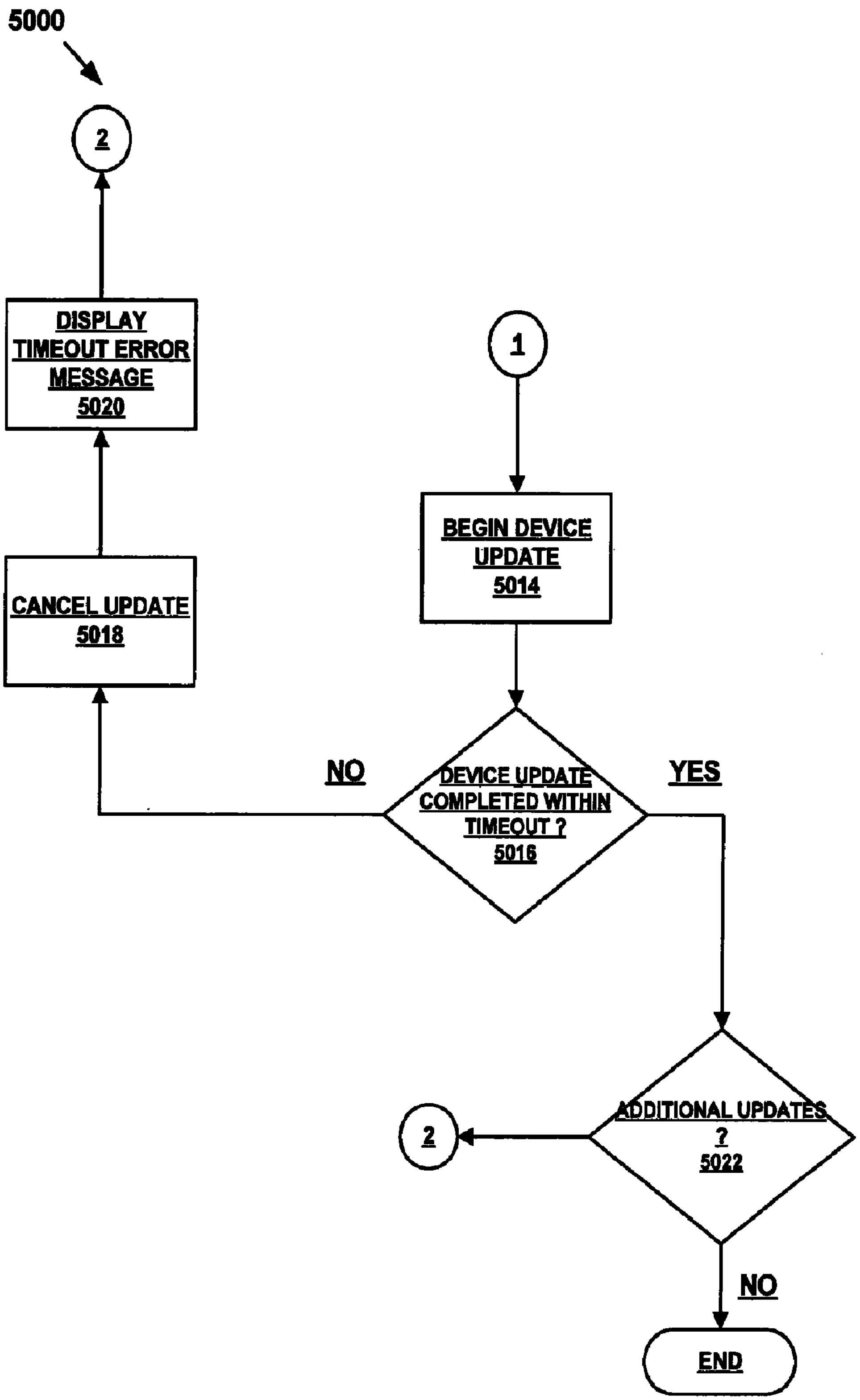
Figure 50C:
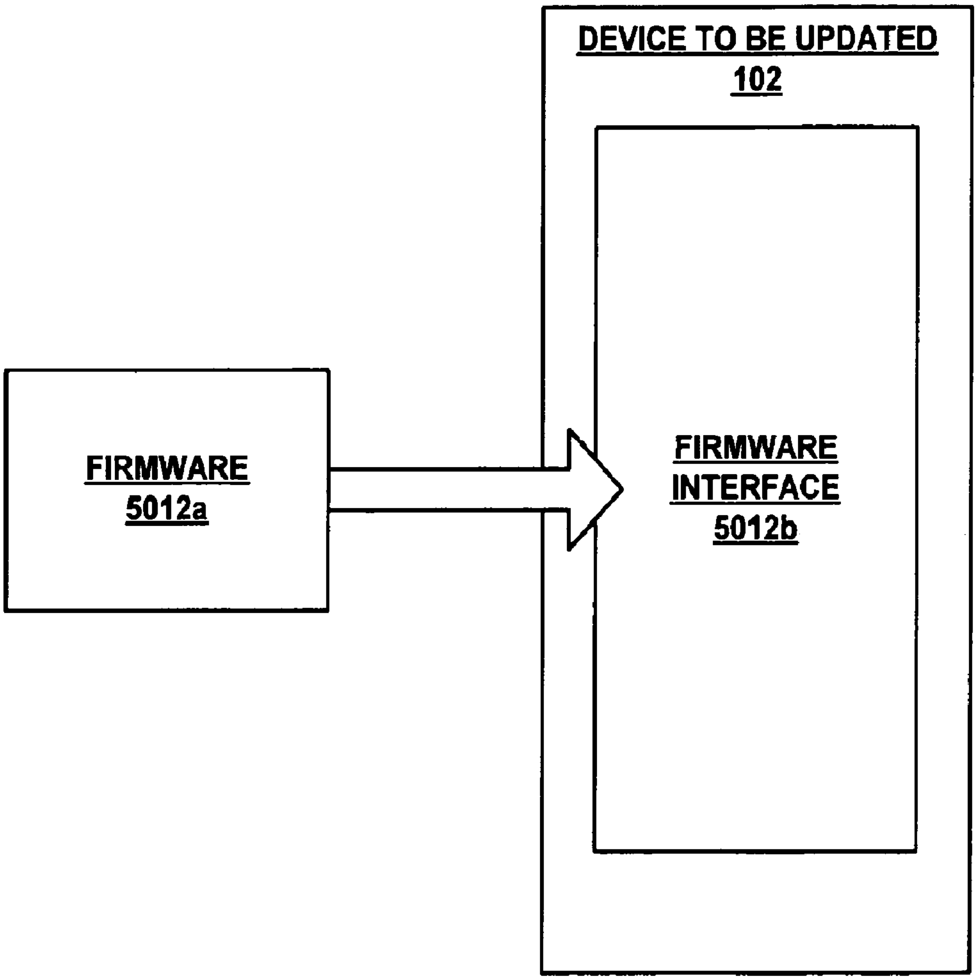

Referring now to FIGS. 50*a*-50*c*, in an exemplary embodiment, during the operation of the hand held RF controller 202, after a user sequentially selects SYSTEM 2010 and UPDATE 2010*f*, using the menu-based program 2000, the controller implements a method 5000 in which the controller permits a user to update one or more aspects of the configuration of a system 100 in a device, such as, for a example a master node 102. In particular, in step 5002 the hand held RF controller 202 determines if a user has selected updating the configuration of the system 100 in a device. If a user has selected updating the configuration of the system 100 in a device, then the display 414 of the hand held RF controller 202 prompts a user of the controller to enter the name of the device to be updated in step 5004.

After a user of the hand held RF controller 202 has entered the name of the device to be updated in step 5004, the node information for the device is transmitted to the controller. If the node information for the selected device is not received by the hand held RF controller 202 within a predetermined timeout period in step 5006, then the update is canceled in step 5008 and the display 414 of controller displays an error message in step 5010.

Alternatively, if the node information for both of the selected device is received by the hand held RF controller 202 within a predetermined timeout period in step 5006, then the display 414 of the controller prompts a user of the controller to insert a firmware 5012*a* containing the system update into a firmware interface 5012*b* in the device selected for updating in step 5012. After a user of the hand held RF controller 202 has inserted the firmware 5012*a* containing the system update into the firmware interface 5012*b* in the device selected for updating, the updating of the configuration of the system 100 in the selected device begins in step 5014.

If the updating of the configuration of the system 100 into the selected device is not completed within a predetermined timeout period in step 5016, then the update is canceled in step 5018 and the display 414 of the hand held RF controller 202 displays an error message in step 5020. Alternatively, if the update of the configuration of the system 100 in the selected device is completed within a predetermined timeout period in step 5016, then the hand held RF controller 202 prompts a user of the controller to indicate if additional updates are to be performed in step 5022. If a user of the hand held RF controller 202 indicates that additional updates of the configuration of the system 100 are to be performed, the controller then permits a user to select further updates in step 5002.

Figure 51A:
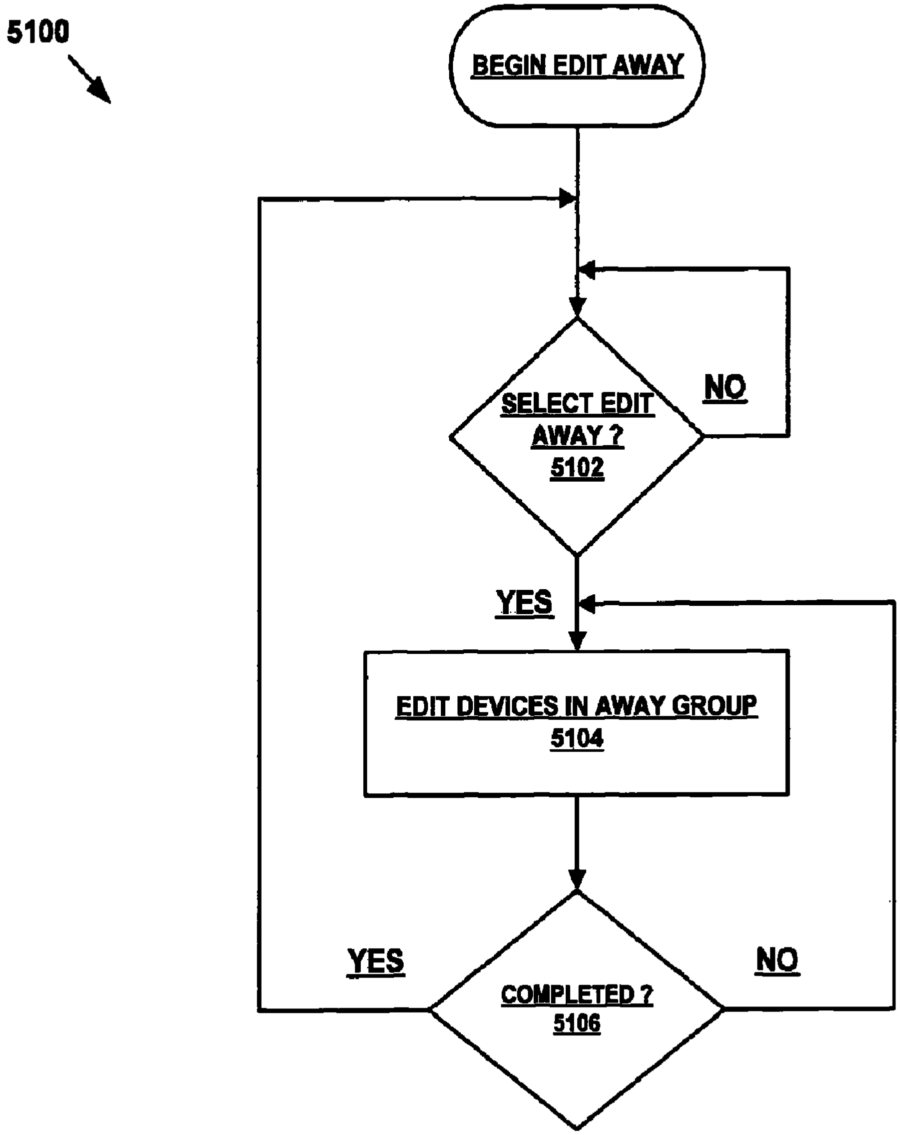
Figure 51B:
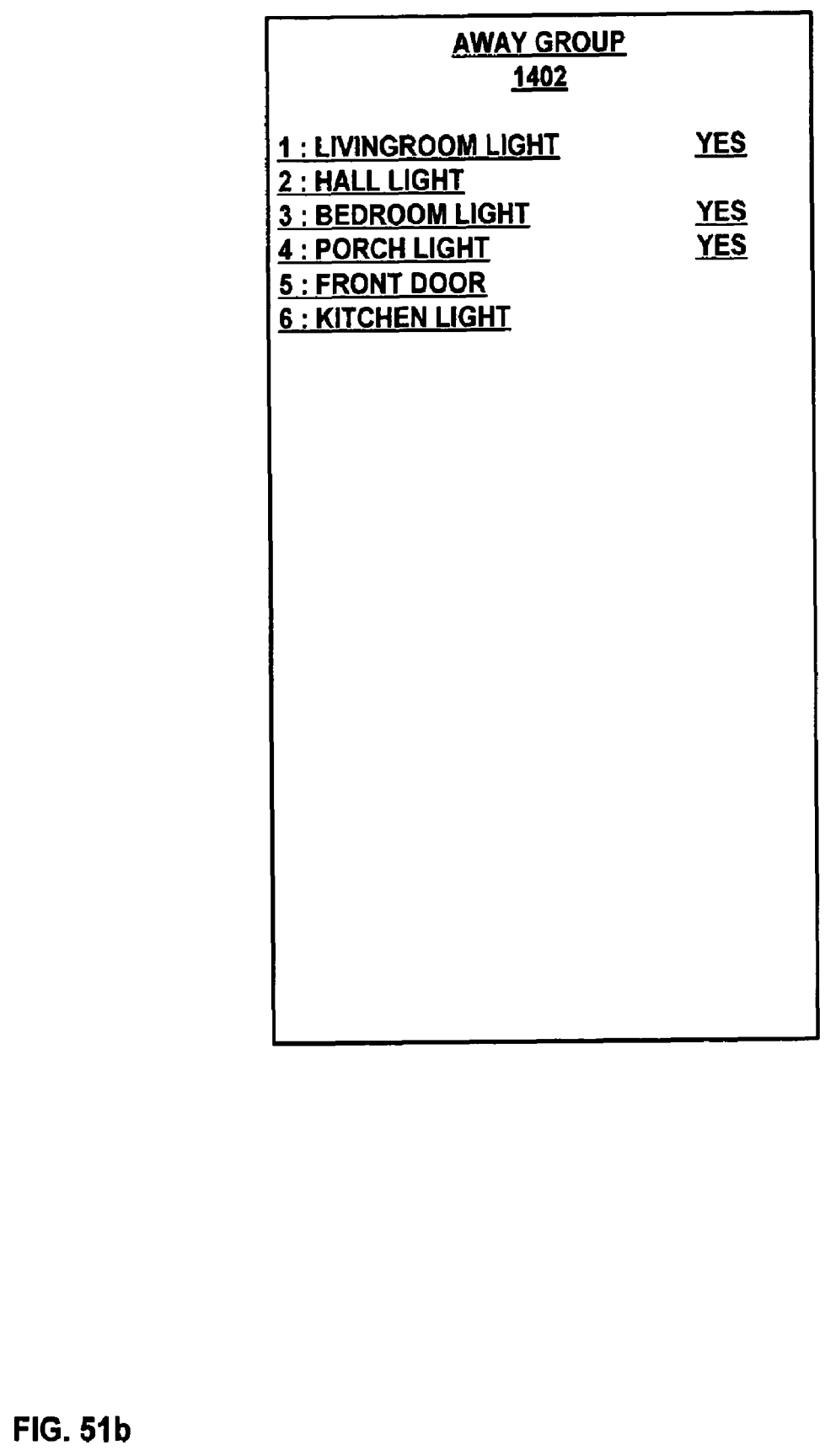

Referring now to FIGS. 51*a*-51*b*, in an exemplary embodiment, during the operation of the hand held RF controller 202, after a user sequentially selects AWAY 2012 and EDIT 2012*a*, using the menu-based program 2000, the controller implements a method 5100 in which the controller permits a user to edit the away group 1402 of the system 100. In particular, in step 5102 the hand held RF controller 202 determines if a user has selected editing the away group 1402 of the system 100. If a user has selected editing the away group 1402 of the system 100, then a user of the hand held RF controller 202 may then edit the away group in step 5104. If a user of the hand held RF controller 202 has not completed editing the away group 1402 of the system 100 in step 5106, the user may continue editing in step 5104.

Figure 52:
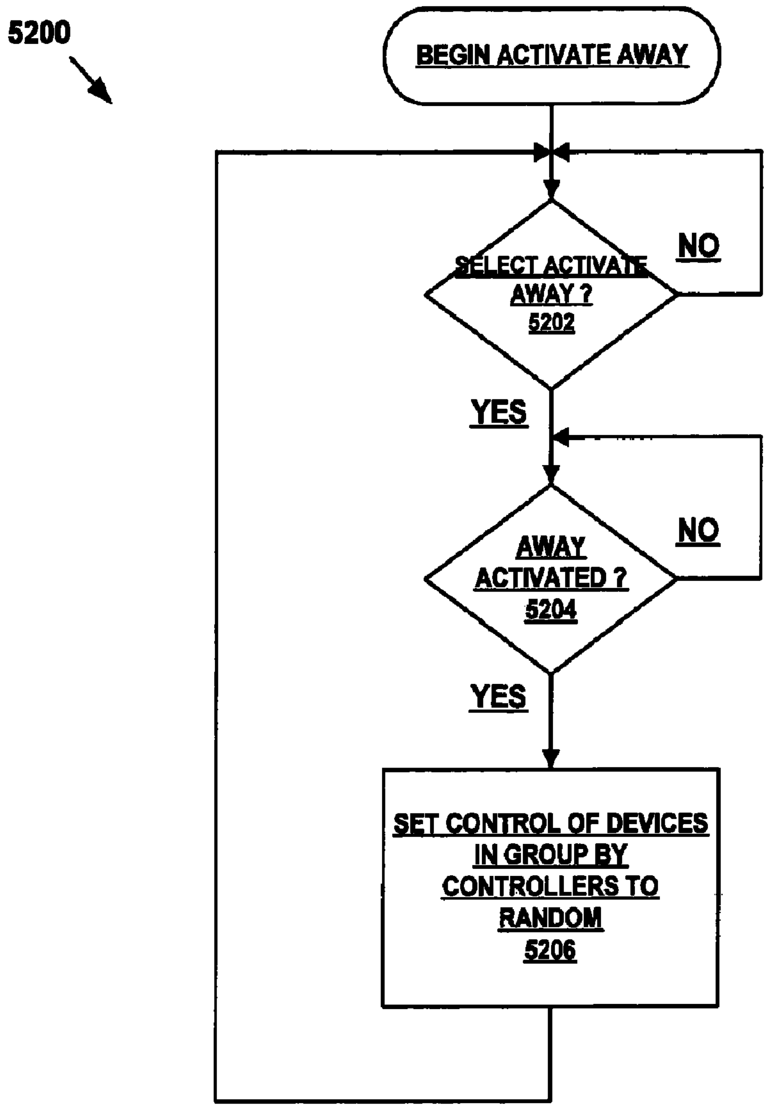
FIG. 52 is a flow chart illustration of an exemplary embodiment of a method of activating an away group of the system.

Referring now to FIG. 52, in an exemplary embodiment, during the operation of the hand held RF controller 202, after a user sequentially selects AWAY 2012 and ACTIVATE 2012*b*, using the menu-based program 2000, the controller implements a method 5200 in which the controller permits a user to activate the away group 1402 of the system 100. In particular, in step 5202 the hand held RF controller 202 determines if a user has selected activating the away group 1402 of the system 100. If a user has selected activating the away group 1402 of the system 100, then the hand held RF controller 202 requests the user to confirm the activation of the away group in step 5204. If a user of the hand held RF controller 202 confirms the activation of the away group 1402 of the system 100 in step 5204, then the controller randomly controls the operation of the devices included in the away group in step 5206.

Figure 53:
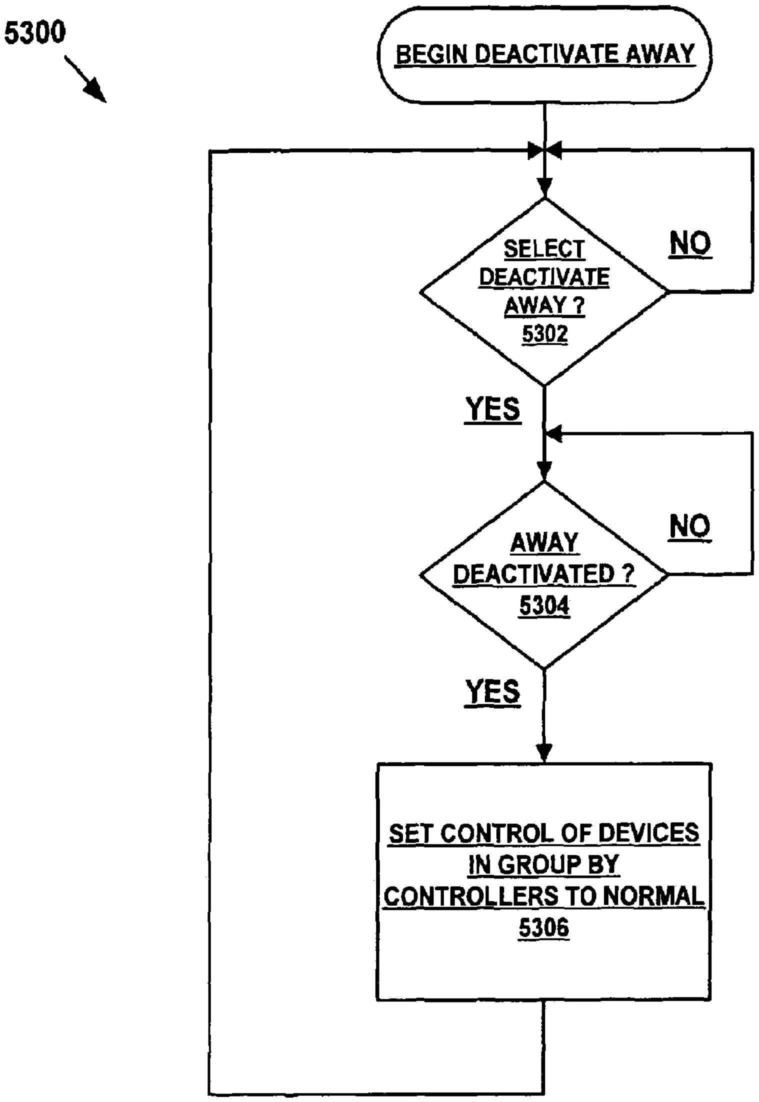
FIG. 53 is a flow chart illustration of an exemplary embodiment of a method of deactivating an away group of the system.

Referring now to FIG. 53, in an exemplary embodiment, during the operation of the hand held RF controller 202, after a user sequentially selects AWAY 2012 and DEACTIVATE 2012*c*, using the menu-based program 2000, the controller implements a method 5300 in which the controller permits a user to deactivate the away group 1402 of the system 100. In particular, in step 5302 the hand held RF controller 202 determines if a user has selected deactivating the away group 1402 of the system 100. If a user has selected deactivating the away group 1402 of the system 100, then the hand held RF controller 202 requests the user to confirm the deactivation of the away group in step 5304. If a user of the hand held RF controller 202 confirms the deactivation of the away group 1402 of the system 100 in step 5304, then the controller resumes normal control of the operation of the devices included in the away group in step 5306.

Figure 54:
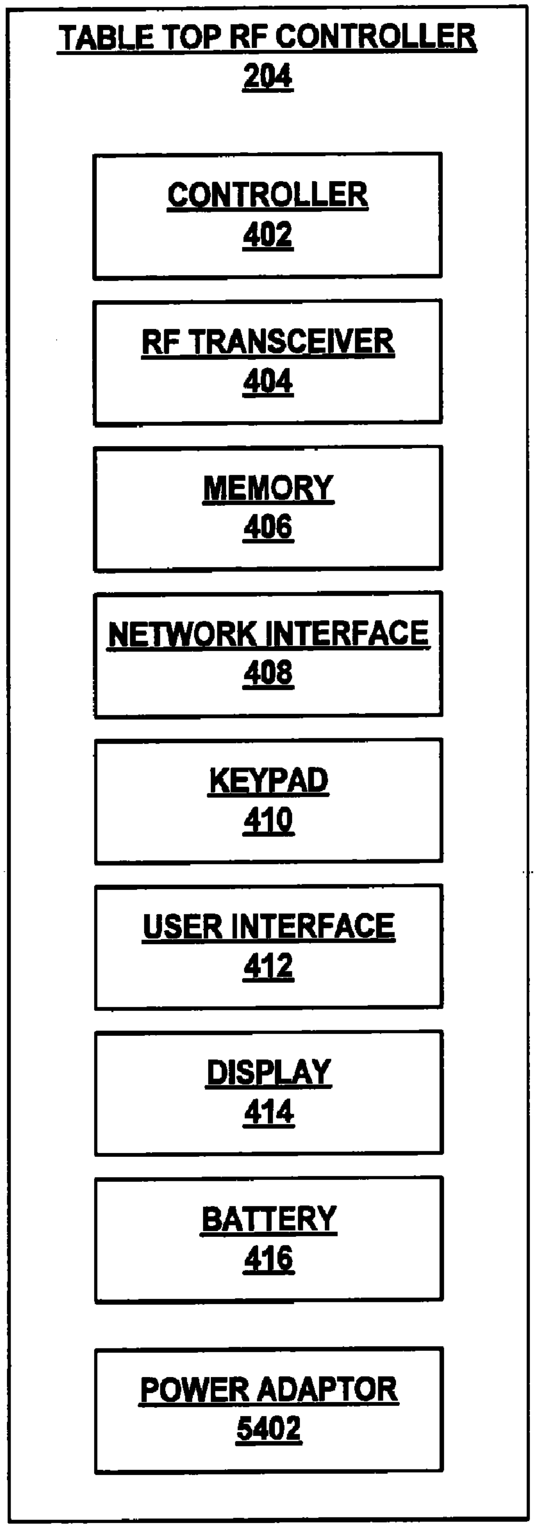
FIG. 54 is a schematic illustration of an exemplary embodiment of a table top RF controller for the system.

Referring now to FIG. 54, an exemplary embodiment of a table top RF controller 204 includes a controller 402 that is operably coupled to an RF transceiver 404, a memory 406, a network interface 408, a keypad 410, a user interface 412, a display 414, a battery 416, and a power adaptor 5402. In an exemplary embodiment, the power adaptor 5402 is adapted to be coupled to an external source of power and for adapting and coupling the external source of power to the controller 402, the RF transceiver 404, the memory 406, the network interface 408, the keypad 410, the user interface 412, and the display 414.

In an exemplary embodiment, within the exception of the addition of the power adaptor 5402, the design and operation of the table top RF controller 204 is substantially identical to the design and operation of the hand held RF controller 202.

Figure 54A:
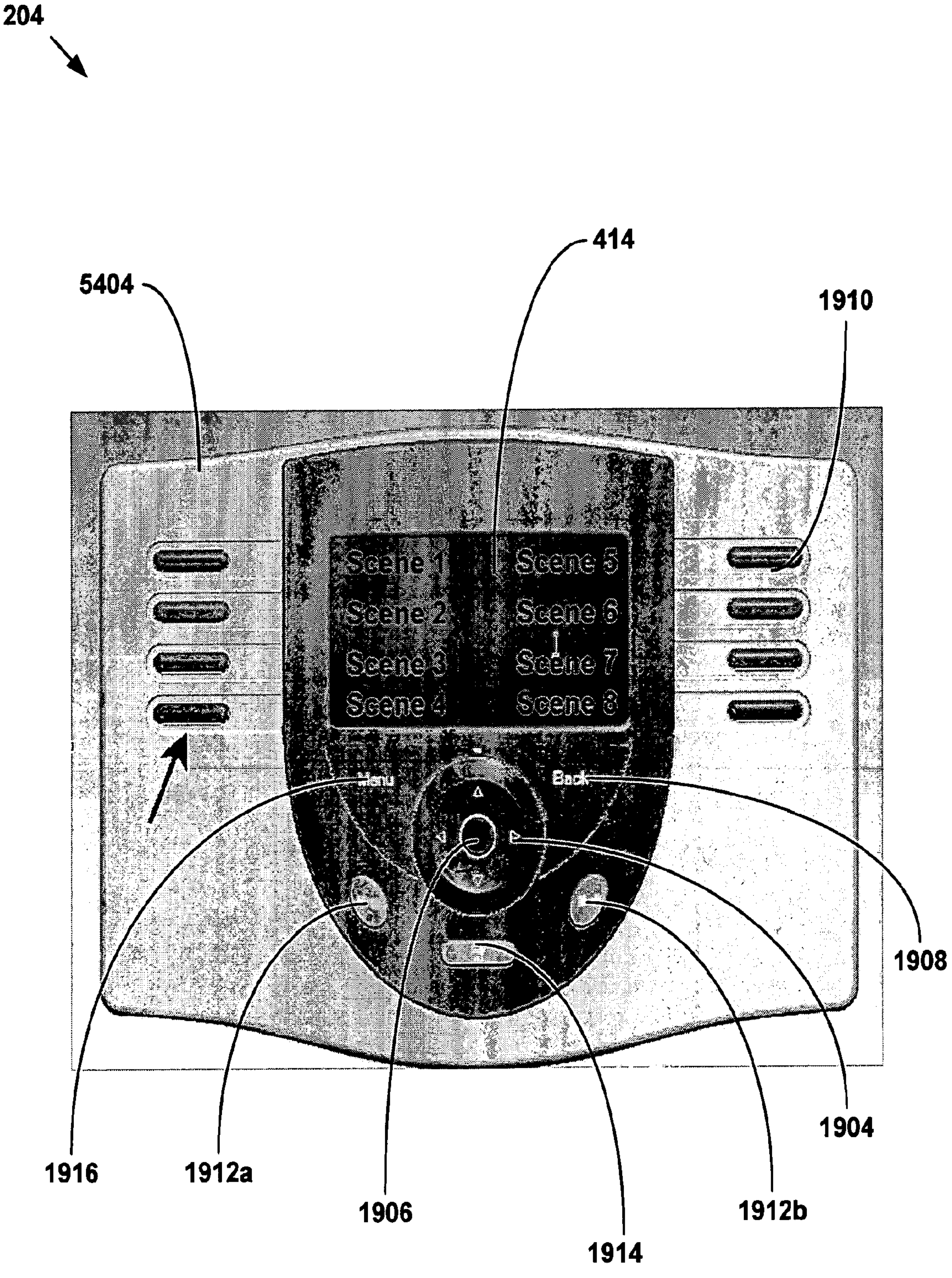
FIG. 54*a* is a front view illustration of an exemplary embodiment of the housing of the table top radio frequency controller.

In an exemplary embodiment, as illustrated in FIG. 54*a*, the elements of the table top controller 204 may be positioned within and supported by a housing 5404 having a cover 1922 that defines one or more openings for the keypad 410, including one or more of the navigation buttons 1904, the OK button 1906, the BACK button 1908, the HOT buttons 1910, the ALL ON button 1912*a*, the ALL OFF button 1912*b*, the PANIC button 1914, and the MENU keys 1916, and the display 414.

Figure 55:
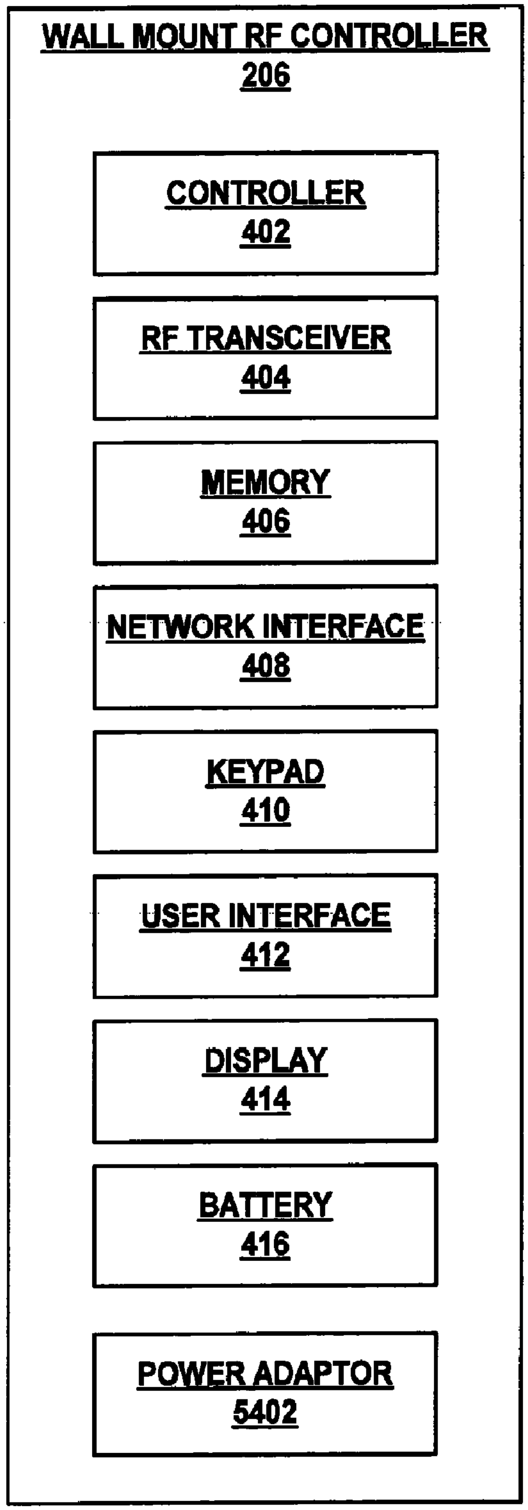
FIG. 55 is a schematic illustration of an exemplary embodiment of a wall mount RF controller for the system.

Referring now to FIG. 55, an exemplary embodiment of a wall mount RF controller 206 includes a controller 402 that is operably coupled to an RF transceiver 404, a memory 406, a network interface 408, a keypad 410, a user interface 412, a display 414, a battery 416, and a power adaptor 5402. In an exemplary embodiment, a power adaptor 5402 is adapted to be coupled to an external source of power and for adapting and coupling the external source of power to the controller 402, the RF transceiver 404, the memory 406, the network interface 408, the keypad 410, the user interface 412, and the display 414.

In an exemplary embodiment, the design and operation of the wall mount RF controller 206 is substantially identical to the design and operation of the table top controller 204.

In an alternative embodiment, the operation of the wall mount RF controller 206 is limited to the control of scenes 802. In particular, in an alternative embodiment, the menu state engine 504*a* of the wall mount RF controller 206 only includes a scene engine 602*b* that only enables a main menu 2002 that permits a selection of scenes 2006.

Figure 55A:
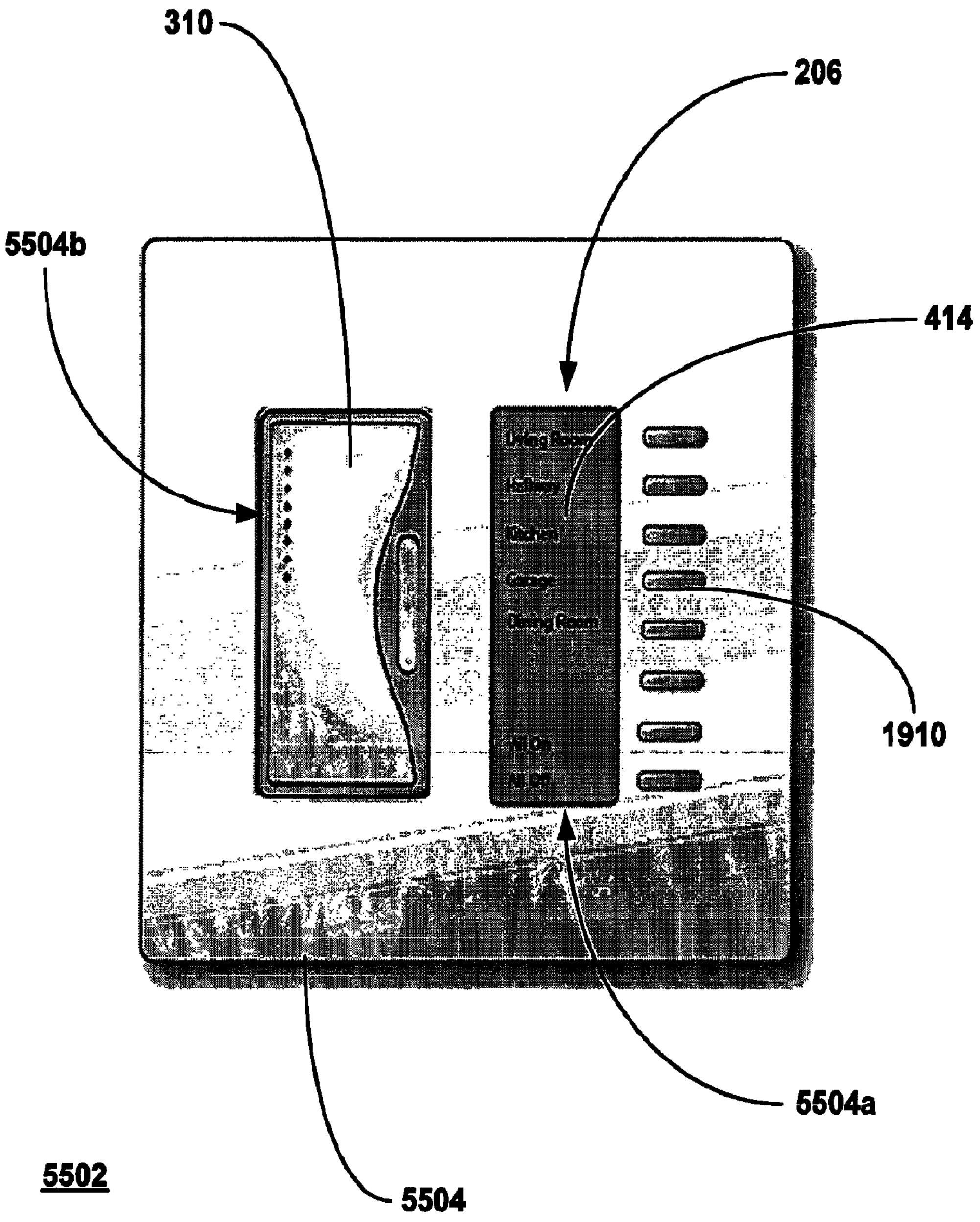
FIG. 55*a* is a front view illustration of an exemplary embodiment of the installation of the wall mount RF controller.

In an exemplary embodiment, as illustrated in FIG. 55*a*, the wall mount RF controller 206 may be positioned and mounted upon a surface 5502 using a cover plate 5504 that defines an opening 5504*a* for one or more of the hot buttons 1910 and the display 414. In an exemplary embodiment, one or more of hot buttons 1910 permit a user of the wall mount RF controller 206 to select one or more corresponding scenes 802 for implementation by the system 100. In an exemplary embodiment, the cover plate 5504 further defines one or more additional openings 5504*b* for mounting one or more corresponding other devices adjacent to the wall mount RF controller 206 such as, for example, the RF dimmer 310.

Figure 56:
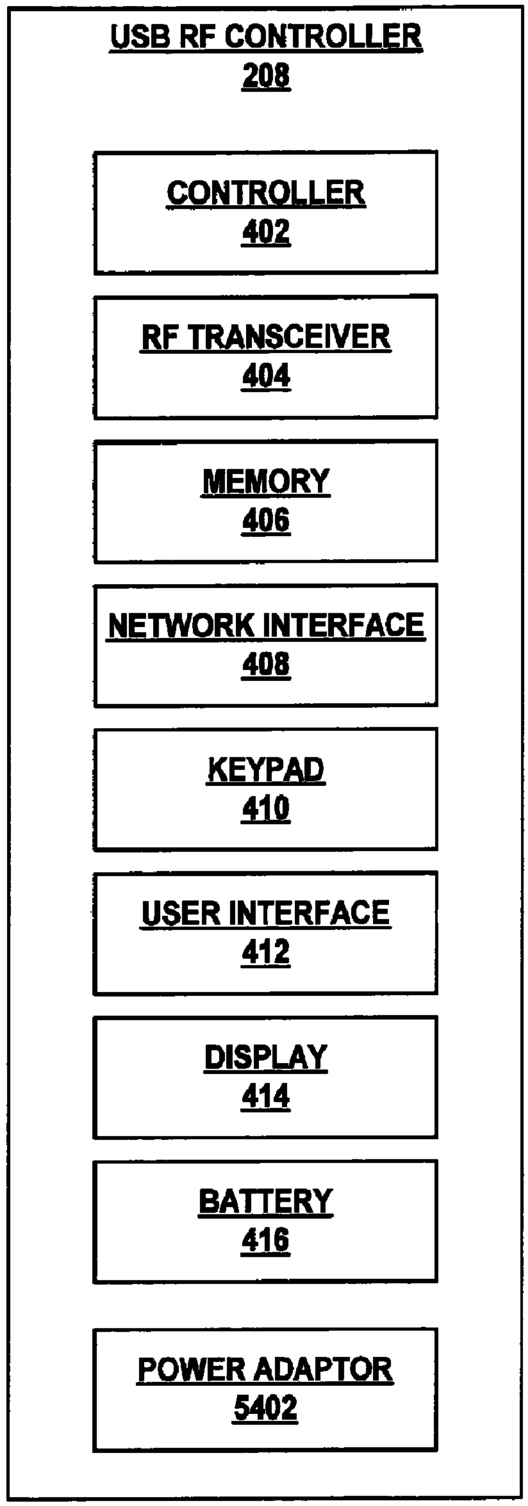
FIG. 56 is a schematic illustration of an exemplary embodiment of a USB RF controller for the system.

Referring now to FIG. 56, an exemplary embodiment of a USB RF controller 208 includes a controller 402 that is operably coupled to an RF transceiver 404, a memory 406, a network interface 408, a keypad 410, a user interface 412, a display 414, a battery 416, and a power adaptor 5402. In an exemplary embodiment, a power adaptor 5402 is adapted to be coupled to an external source of power and for adapting and coupling the external source of power to the controller 402, the RF transceiver 404, the memory 406, the network interface 408, the keypad 410, the user interface 412, and the display 414.

In an exemplary embodiment, the design and operation of the wall mount RF controller 206 is substantially identical to the design and operation of the table top controller 204.

In an alternative embodiment, the network interface 408 of the USB RF controller 208 enables a user of the USB RF controller to remotely control and interface with the system 100 using a network interface such as, for example, the Internet. In this manner, a user of the USB RF controller 208 may, for example, remotely configure the system from long distances using a desktop, laptop, portable digital assistant, cell phone, or other suitable device capable of being operably coupled to the USB RF controller.

Figure 57:
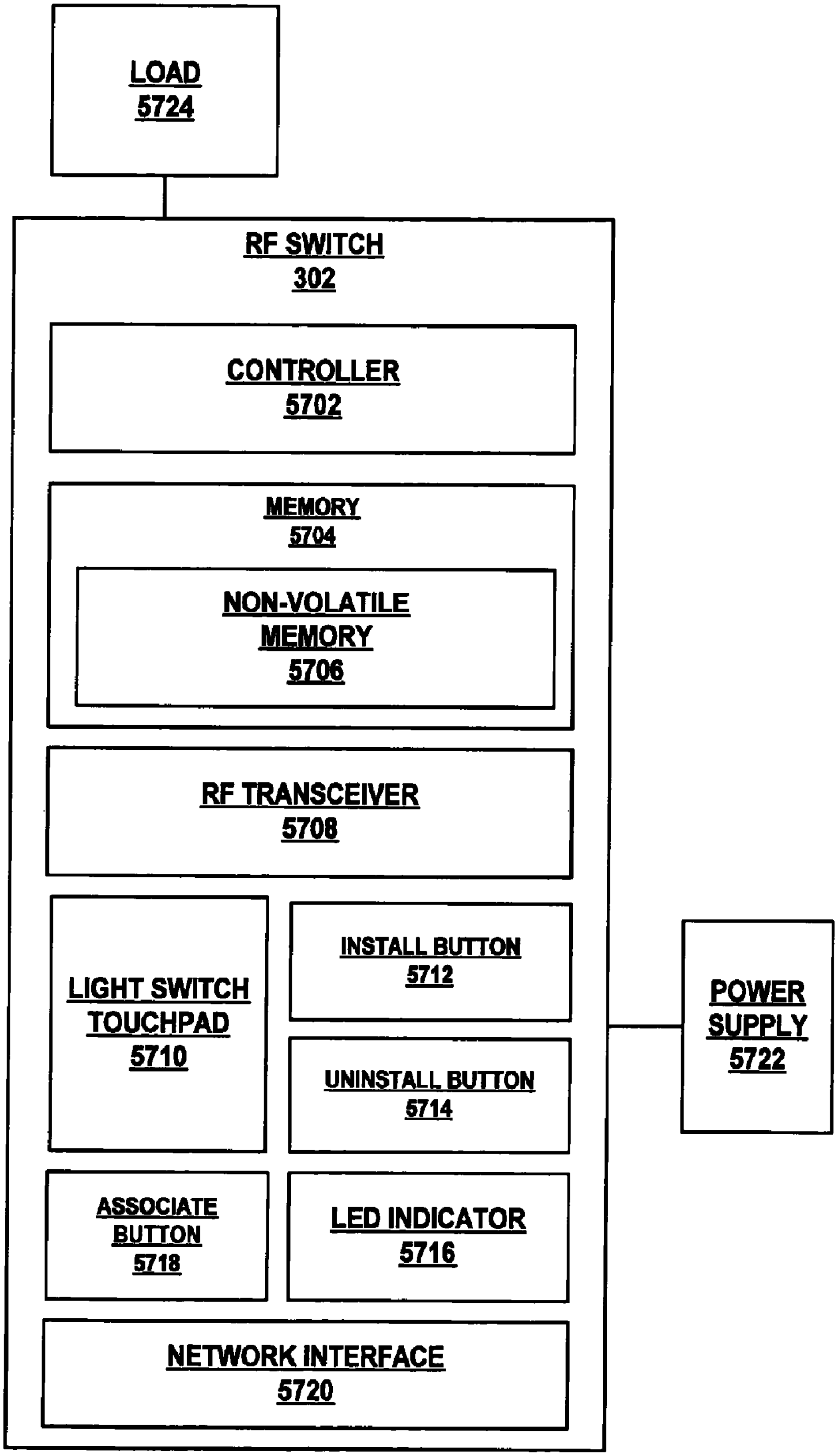
FIG. 57 is a schematic illustration of an exemplary embodiment of an RF switch for the system.

Referring now to FIG. 57, an exemplary embodiment of an RF switch 302 includes a controller 5702 that is operably coupled to: a memory 5704 including a non-volatile memory 5706, an RF transceiver 5708, a light switch touch pad 5710, an install button 5712, an uninstall button 5714, an LED indicator light 5716, an associate button 5718, and a network interface 5720. In an exemplary embodiment, a conventional power supply 5722 is operably coupled to the RF switch 302 for powering the operation of the RF switch, and the RF switch controllably couples and decouples a load 5724 to and from the power supply.

Figure 57A:
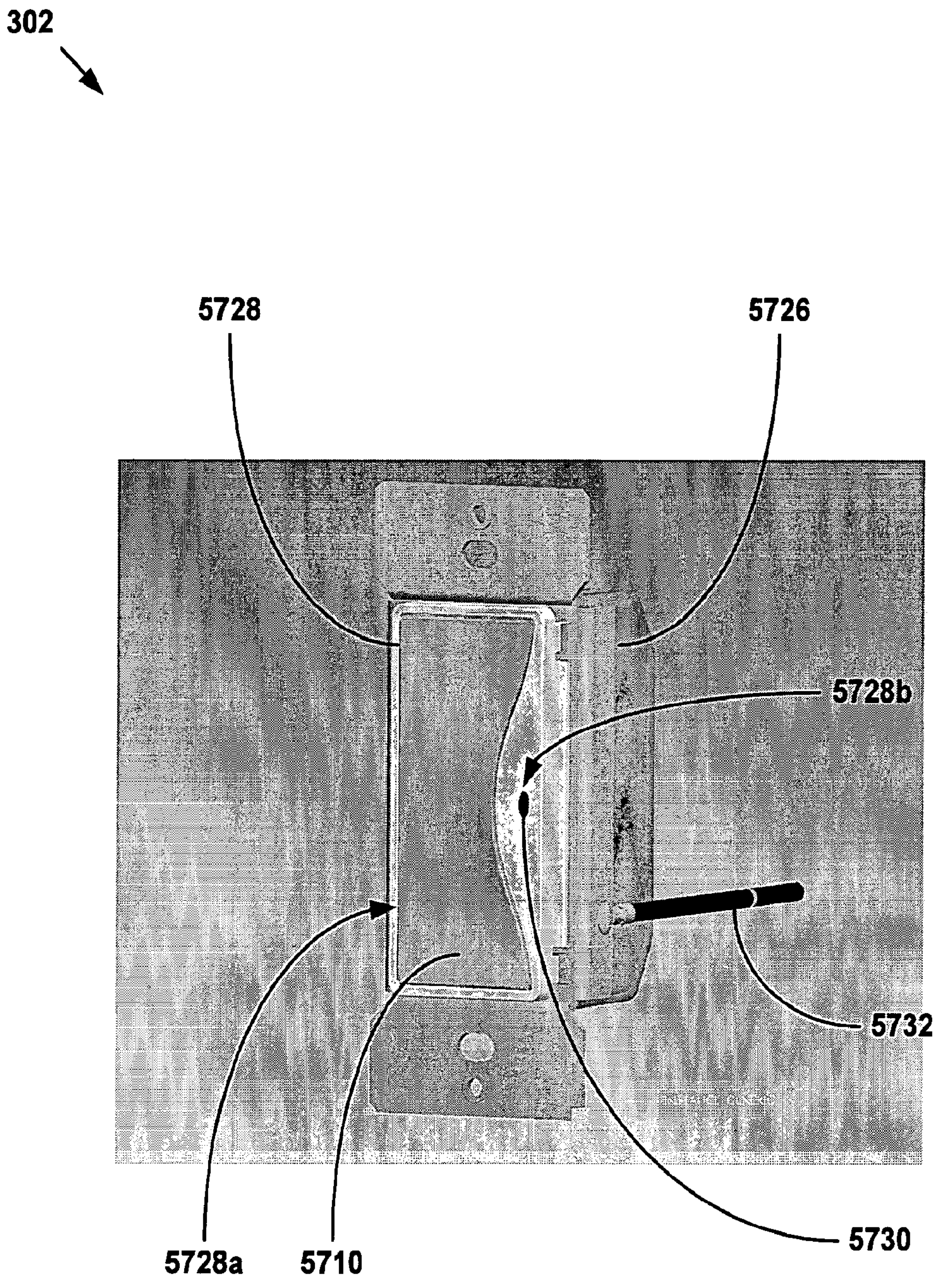
FIG. 57*a* is a perspective illustration of an exemplary embodiment of the RF switch.

Referring to FIG. 57*a*, in an exemplary embodiment, the RF switch 302 includes a housing 5726, for containing and supporting the elements of the RF switch, and a cover 5728 that defines an opening 5828*a* for the light switch touch pad 5710 and an opening 5828*b* for one or more other buttons 5730 that may, for example, include one or more of the following: the install button 5712, the uninstall button 5714, and the associate button 5718. In an exemplary embodiment, the RF switch 302 further includes an external RF antenna 5732 that is operably coupled to the RF transceiver 5708.

In an exemplary embodiment, the controller 5702 is adapted to monitor and control the operation of the memory 5704 including a non-volatile memory 5706, the RF transceiver 5708, the light switch touch pad 5710, the install button 5712, the install button 5714, the LED indicator light 5716, the associate button 5718, and the network interface 5720. In an exemplary embodiment, the controller 5702 includes one or more of the following: a conventional programmable general purpose controller, an application specific integrated circuit (ASIC), or other conventional controller devices. In an exemplary embodiment, the controller 5702 includes a model ZW0201 controller, commercially available from Zensys A/S.

Figure 58:
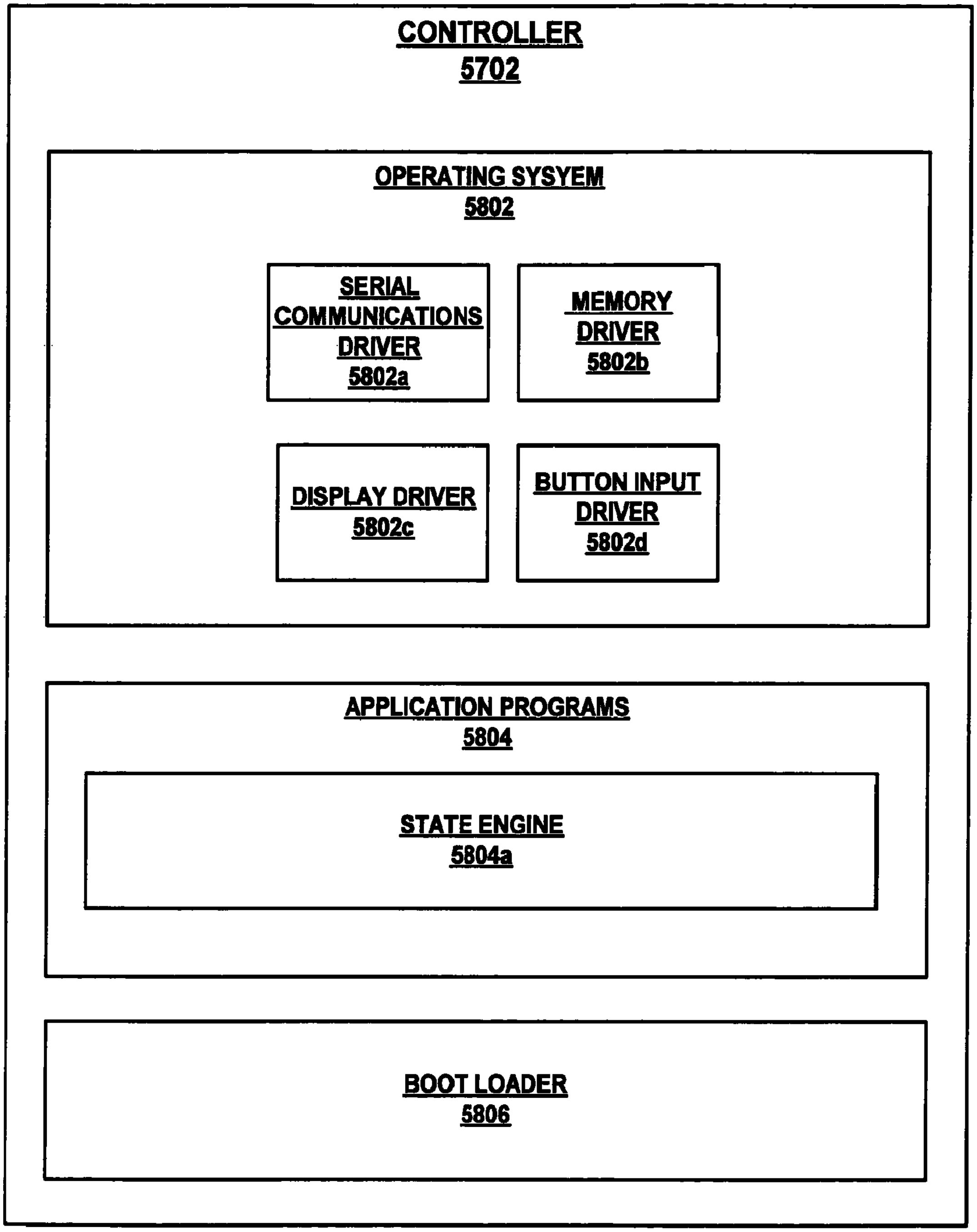
FIG. 58 is a schematic illustration of an exemplary embodiment of the controller of the RF switch.

Referring now to FIG. 58, in an exemplary embodiment, the controller 5702 includes an operating system 5802, application programs 5804, and a boot loader 5806. In an exemplary embodiment, the operating system 502 includes a serial communications driver 5802*a*, a memory driver 5802*b*, a display driver 5802*c*, and a button input driver 5802*c*. In an exemplary embodiment, the serial communications driver 5802*a* controls serial communications using the RF serial transceiver 5708, the memory driver 5802*b* controls the memory 5704 including the non volatile memory 5706, the display driver 5802*c* controls the LED indicator light 5716, and the button input driver 5802*d* debounces button inputs provided by a user using one or more of: the light switch touchpad 5710, the install button 5712, the uninstall button 5714, and the associate button 5718. In an exemplary embodiment, the serial communications driver 5802*a* includes a Z-Wave™ serial API driver that implements a Z-Wave™ serial API protocol. The Z-Wave™ serial API driver that implements a Z-Wave™ serial API protocol are both commercially available from Zensys A/S.

In an exemplary embodiment, the application programs 5804 include a state engine 5804*a*. In an exemplary embodiment, the state engine 5804*a* permits a user of one or more of the master nodes 102 to configure, control and monitor the operation of the RF switch 302.

Figure 59:
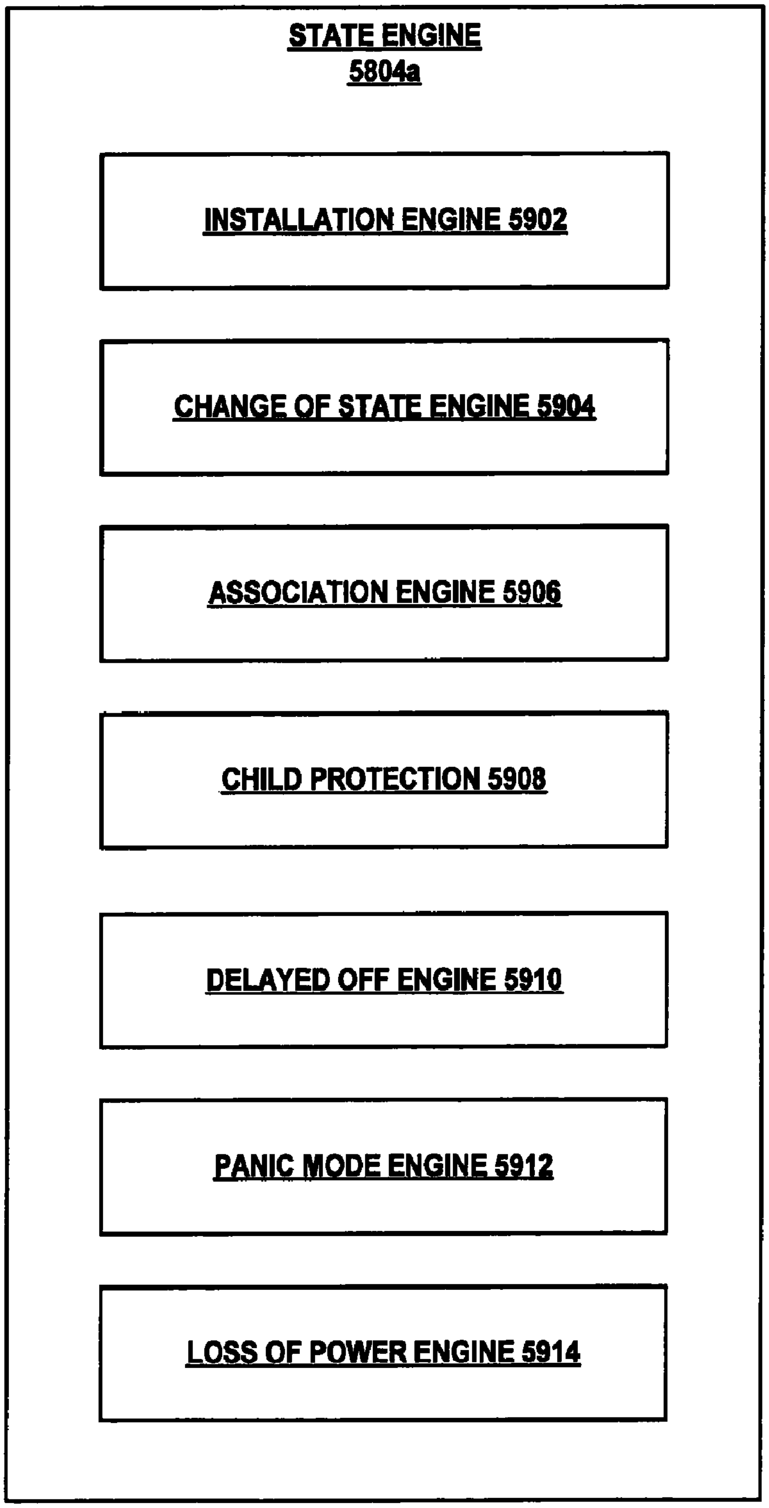
FIG. 59 is a schematic illustration of an exemplary embodiment of the state engine of the controller of the RF switch.

Referring now to FIG. 59, in an exemplary embodiment, the state engine 5804*a* includes an installation engine 5902, a change of state engine 5904, an association engine 5906, a child protection engine 5908, a delayed off engine 5910, a panic mode engine 5912, and a loss of power detection engine 5914.

In an exemplary embodiment, the installation engine 5902 monitors the operating state of the RF Switch 302 and provides an indication to a user of the system 100 as to whether or not the switch has been installed in the system. In this manner, the installation engine 5902 facilitates the installation of the RF switch 302 into the system 100.

In an exemplary embodiment, the change of state engine 5904 monitors the operating state of the RF switch 302 and, upon a change in operating state, transmits information to one or more of the master nodes 102 regarding the configuration of the RF switch.

In an exemplary embodiment, the association engine 5906 is adapted to monitor and control the operation of the RF switch 302 when the RF switch is associated with one or more communication pathway 702.

In an exemplary embodiment, the child protection engine 5908 is adapted to monitor and control the operation of the RF switch 302 when the RF switch is operated in a child protection mode of operation.

In an exemplary embodiment, the delayed off engine 5910 is adapted to monitor and control the operation of the RF switch 302 when the RF switch is operated in a delayed off mode of operation.

In an exemplary embodiment, the panic mode engine 5912 is adapted to monitor and control the operation of the RF switch 302 when the RF switch is operated in a panic mode of operation.

In an exemplary embodiment, the loss of power detection engine 5914 is adapted to monitor the operating state of the RF switch 302 and, upon the loss of power, save the operating state of the RF switch 302 into the non volatile memory 5706. Upon the resumption of power to the RF switch 302, the loss of power detection engine 5914 then retrieves the stored operating state of the RF switch 302 from the non volatile memory 5706 and restores the operating state of the RF switch.

information regarding the communication pathways 702 associated with the RF switch. In an exemplary embodiment, the child protection database 6104 for the RF switch 302 includes information regarding the operating characteristics of the RF switch when child protection is enabled. In an exemplary embodiment, the delayed off database 6106 for the RF switch 302 includes information regarding the operating characteristics of the RF switch when delayed off is enabled. In an exemplary embodiment, the panic database 6108 for the RF switch 302 includes information regarding the operating characteristics of the RF switch when panic is enabled. In an exemplary embodiment, the operating state database 6110 for the RF switch 302 includes information representative of the operating state of the RF switch.

In an exemplary embodiment, the device database 6006 includes one or more of the following information:

| Parameter | Offset | Size | Default Value | Description |
|---|---|---|---|---|
| Child Protection Mode | 1 | 1 | 0 | This is the child protection mode for the RF switch 302. The default value of 0 corresponds to no child protection. |
| Off Delay | 2 | 1 | 10 | This is the number of seconds that the RF switch 302 will flash the LED indicator 5716 before switching off the load 5724. |
| Panic On Time | 3 | 1 | 1 | This is the number of seconds the load 5724 will be on while in panic mode. |
| Panic Off Time | 4 | 1 | 1 | This is the number of seconds the load 5724 will be off while in panic mode. |
| Load State | 5 | 1 | 0 | This is the operational state of the load 5724. The default value is for the load to be OFF. |
| All Switch State | 6 | 1 | 0xFF | This indicates the operational state of the RF switch 302 with regard to the all switch group. The default is for the RF switch 302 to be included in the all switch group for both All ON and All OFF. |
| Location | 7 | 25 | "Lighted Switch" | This is the location name. There is a maximum of 24 characters plus a null terminator. |
| Load Boot State | 32 | 1 | LAST VALUE | This is the state the load 5724 takes upon booting up the RF switch 302. |
| Panic Mode Enable | 33 | 1 | Enabled | This controls whether Panic Mode is enabled or disabled. |
| Associated Nodes | 34 | 5 | 0 | The node IDs of nodes associated with the RF switch 302. |

Figure 60:
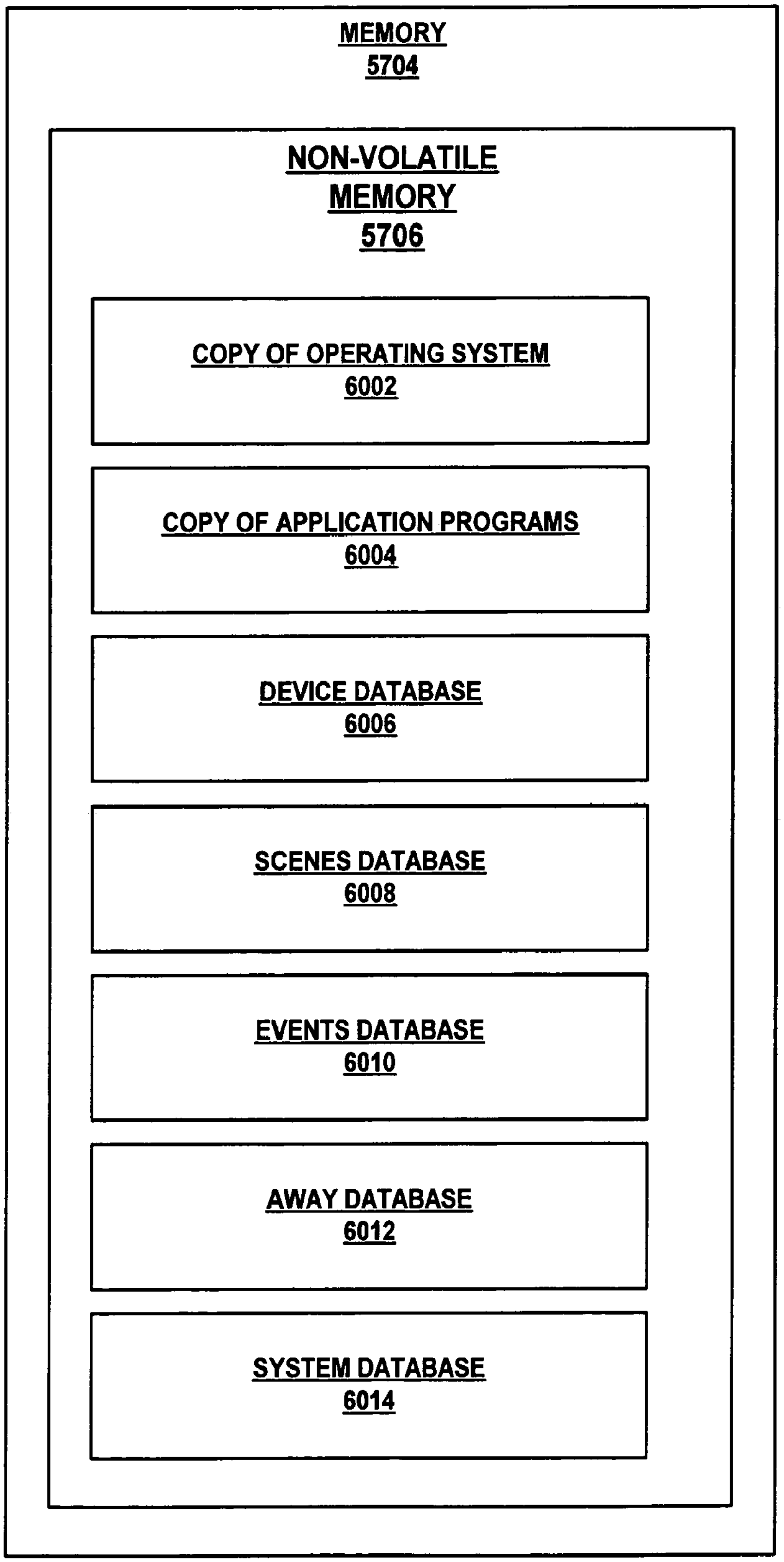
FIG. 60 is a schematic illustration of an exemplary embodiment of the memory of the RF switch.

In an exemplary embodiment, the memory 5704, including the non volatile memory 5706, is operably coupled to and controlled by the controller 5702. In an exemplary embodiment, as illustrated in FIG. 60, the memory 5704, including the non volatile memory 5706, includes a copy of the operating system 6002, a copy of the application programs 6004, a device database 6006, a scenes database 6008, an events database 6010, an away database 6012, and a system database 6014. In an exemplary embodiment, the memory 406 includes a model 24LC256 non volatile memory, commercially available from Microchip.

Figure 61:
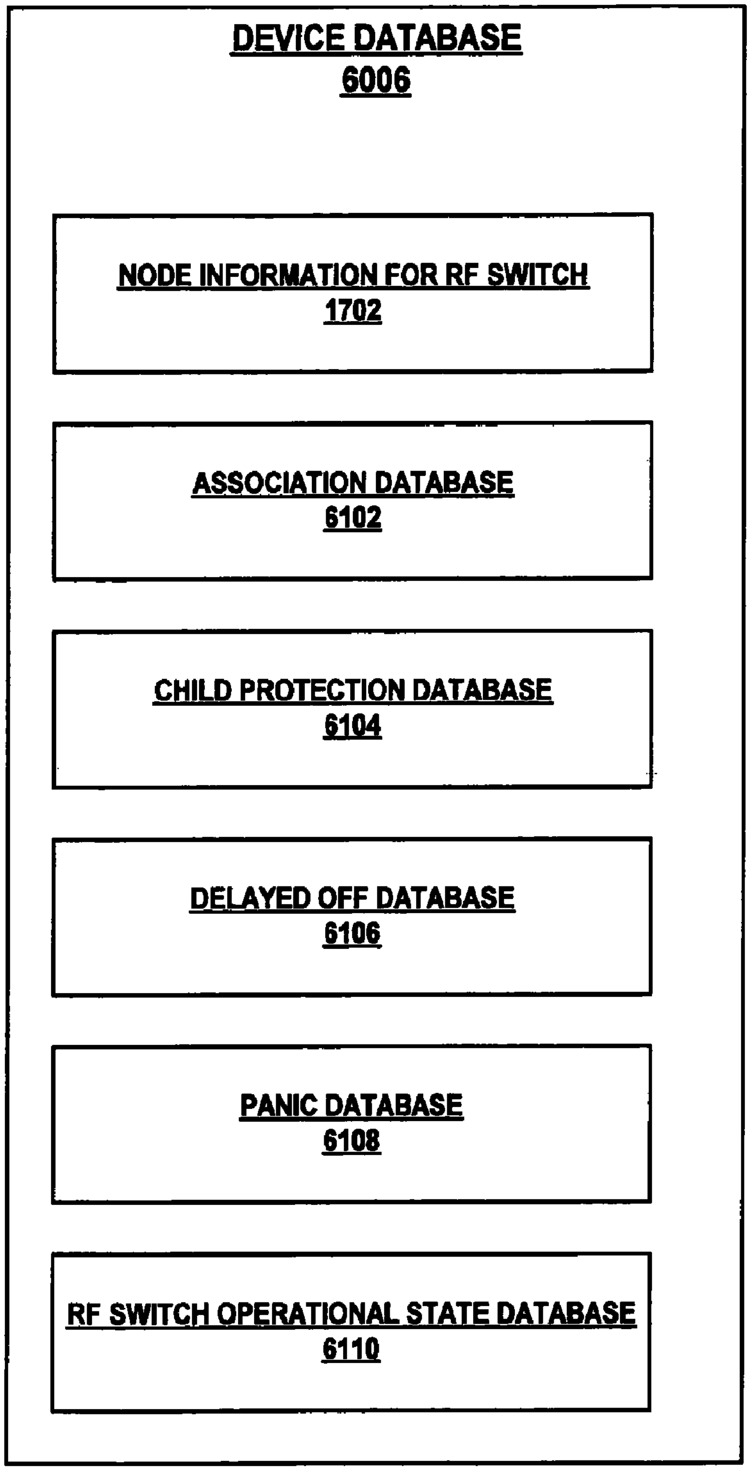
FIG. 61 is a schematic illustration of an exemplary embodiment of the device database of the memory of the RF switch.

In an exemplary embodiment, the device database 6006 includes information that is specific to the RF switch 302. In an exemplary embodiment, as illustrated in FIG. 61, the device database 6006 includes the node information frame 1702 for the RF switch 302, an association database 6102 for the RF switch, a child protection database 6104 for the RF switch, a delayed off database 6106 for the RF switch, a panic database 6108 for the RF switch, and an operating state database 6110 for the RF switch. In an exemplary embodiment, the association database 6102 for the RF switch 302 includes In an exemplary embodiment, the scenes database 6008 includes information regarding the scenes 802 that include the RF switch 302. In an exemplary embodiment, the events database 6010 includes information regarding the events 1002 that include the RF switch 302. In an exemplary embodiment, the away database 6012 includes information regarding the away group 1402 that includes the RF switch 302. In an exemplary embodiment, the system database 6014 includes system information that includes the RF switch 302.

In an exemplary embodiment, the RF transceiver 5708 is operably coupled to and controlled and monitored by the controller 5702. In an exemplary embodiment, the RF transceiver 5708 transmits and receives RF communications to and from other master and slave nodes, 102 and 104, respectively. In an exemplary embodiment, the RF transceiver 5708 may, for example, include one or more of the following: a conventional RF transceiver, and/or the model ZW0201 RF transceiver commercially available from Zensys A/S.

In an exemplary embodiment, the light switch touch pad 5710 is a conventional light switch touch pad and is operably coupled to and controlled and monitored by the controller 5702. In an exemplary embodiment, the light switch touch pad 5710 permits an operator of the RF switch 302, in combination with the system 100, to select the desired mode of operation of the load 5724.

In an exemplary embodiment, the install button 5712 is operably coupled to and controlled and monitored by the controller 5702. In an exemplary embodiment, the install button 5712 permits an operator of the RF switch 302, in combination with the system 100, to install the RF switch into the system.

In an exemplary embodiment, the uninstall button 5714 is operably coupled to and controlled and monitored by the controller 5702. In an exemplary embodiment, the uninstall button 5714 permits an operator of the RF switch 302, in combination with the system 100, to uninstall the RF switch from the system.

In an exemplary embodiment, the LED indicator light 5716 is operably coupled to and controlled and monitored by the controller 5702.

In an exemplary embodiment, the associate button 5718 is operably coupled to and controlled and monitored by the controller 5702. In an exemplary embodiment, the associate button 5718 permits an operator of the RF switch 302, in combination with the system 100, to associate the RF switch with communication pathways 702 in the system.

Figure 62:
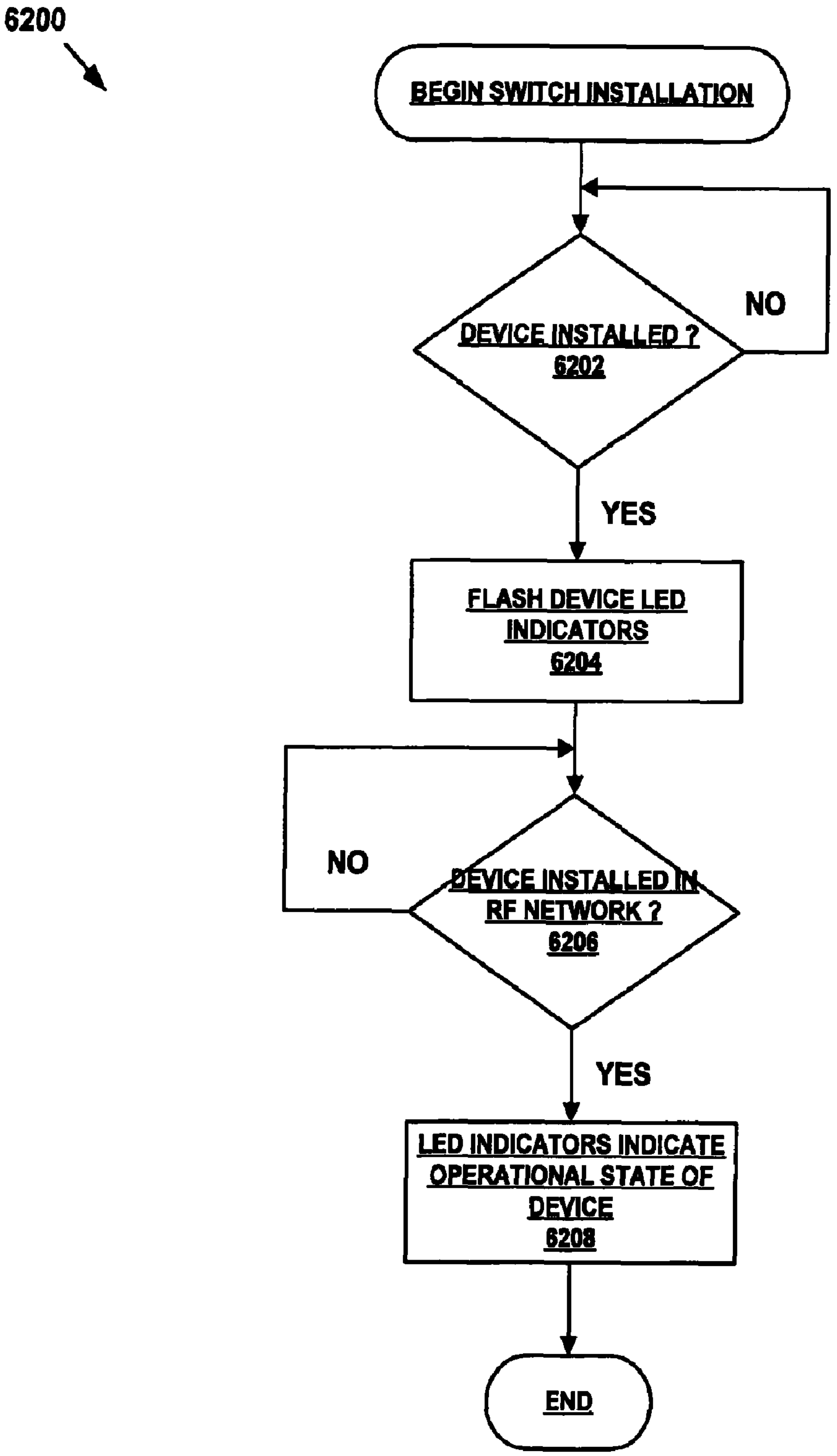
FIG. 62 is a flow chart illustration of an exemplary embodiment of a method of installation for the RF switch.

Referring to FIG. 62, in an exemplary embodiment, during operation of the RF switch 302, the RF switch implements a method of installation 6200 in which, if the RF switch has been operably coupled to the power supply 5722, then the LED indicator lights 5716 are operated to indicate this operational state in steps 6202 and 6204. Then, if the RF switch 302 has been installed in the system 100, then the LED indicator lights 5716 are operated to indicate this operational state in steps 6206 and 6208. In an exemplary embodiment, the LED indicator lights 5716 flash on an off to indicate the operational state in steps 6202 and 6204, and the LED indicator lights 5716 are turned on to indicate the operational state in steps 6206 and 6208. In this manner, an operator of the system 100 is provided with a visual and highly effective indication of the operational state of the RF switch 302 that is local to the RF switch. This permits an installer of the RF switch 302, in a large house or commercial building, with an effective means of determining the operational state of the RF switch 302 that is both local to the RF switch and avoids the need to interrogate a master node 102 to determine the operational state.

Figure 63:
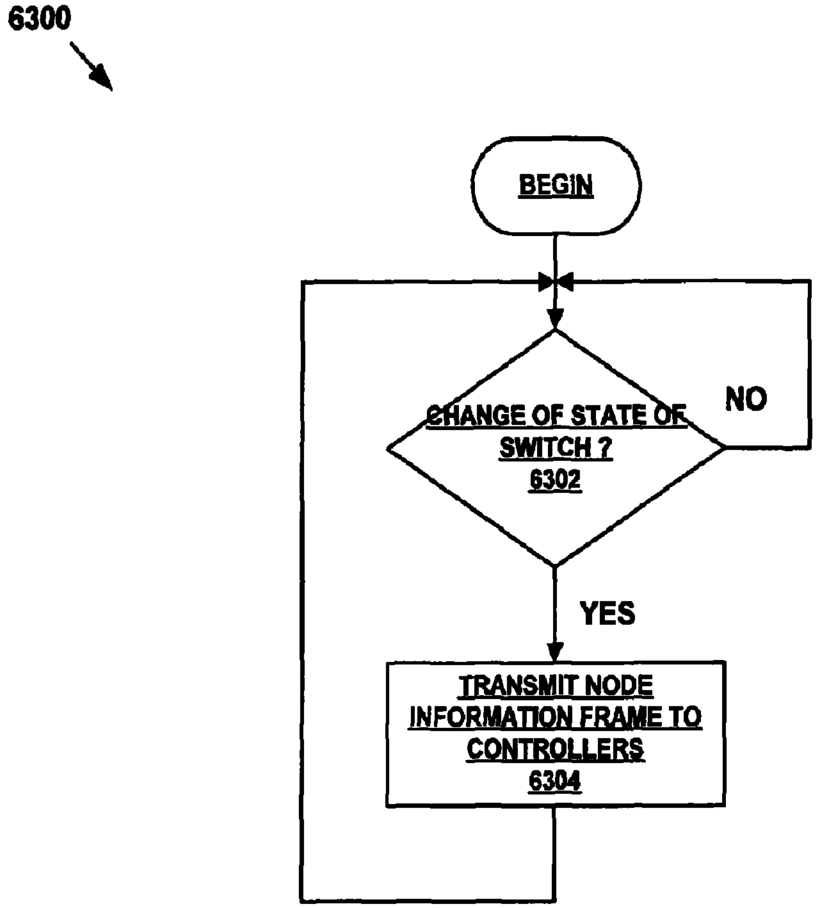
FIG. 63 is a flow chart illustration of an exemplary embodiment of a method of change of state for the RF switch.

Referring to FIG. 63, in an exemplary embodiment, during operation of the RF switch 302, the RF switch implements a method of detecting a change of state 6300 in which, if the operating state of the RF switch has changed, then the node information frame 1702 for the RF switch is transmitted to one or more of the master nodes 102 of the system 100 using the RF transceiver 5708 in steps 6302 and 6304.

Figure 64A:
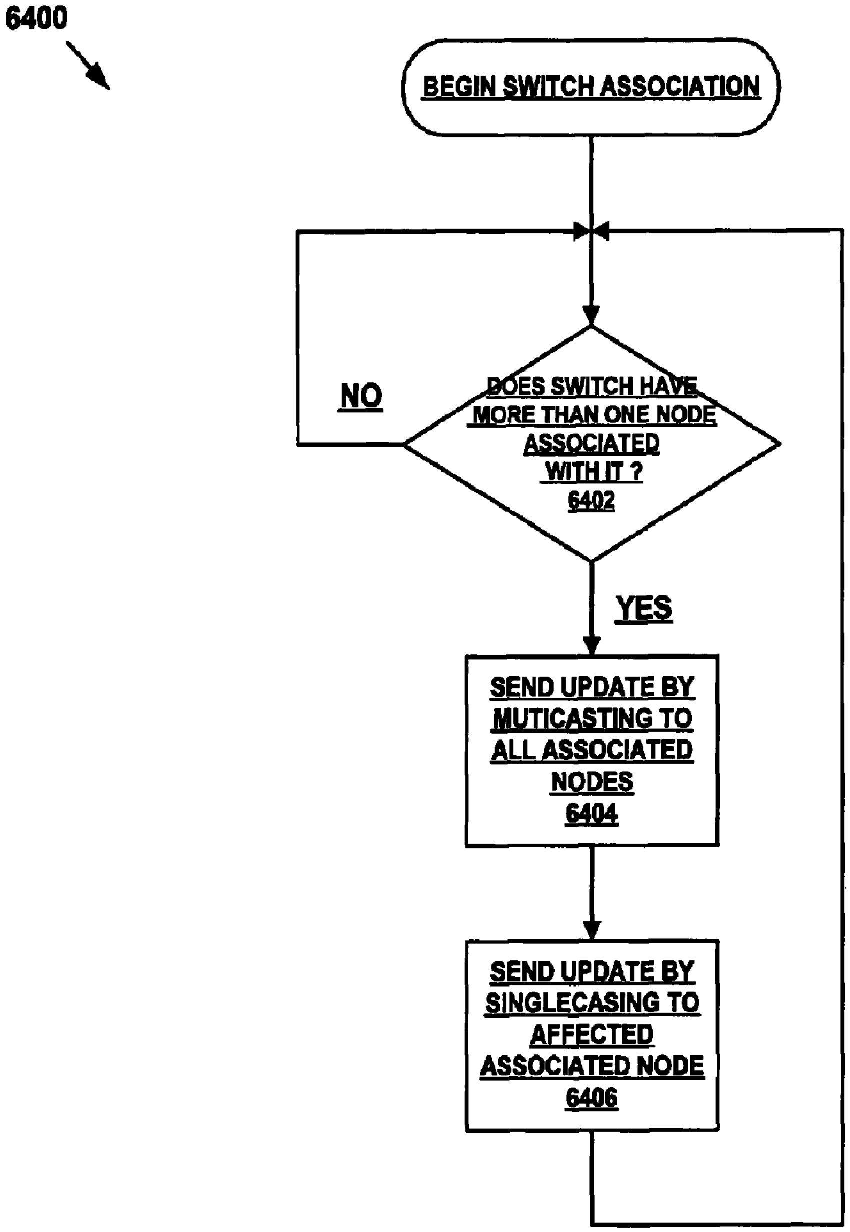
FIGS. 64*a* and 64*b* is a flow chart and schematic illustration of an exemplary embodiment of a method of association for the RF switch.
Figure 64B:
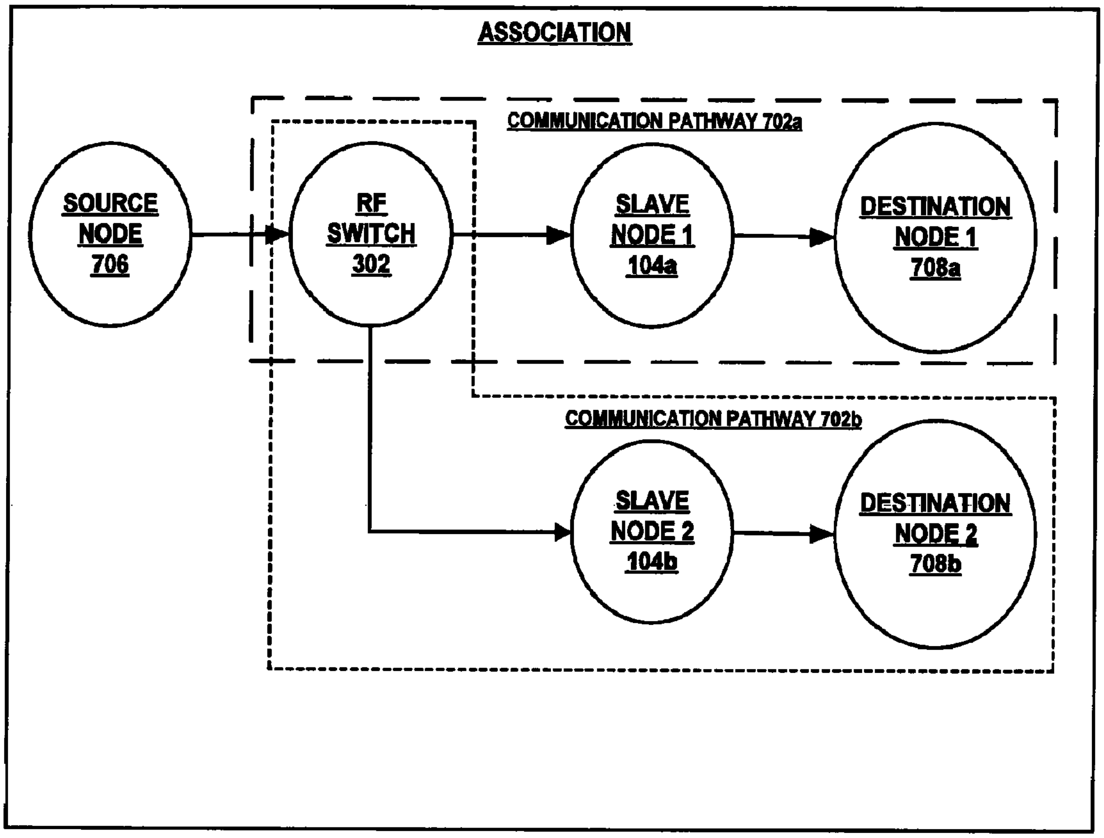

Referring to FIGS. 64*a*-64*b*, in an exemplary embodiment, during operation of the RF switch 302, the RF switch implements a method of association 6400 in which it is first determined if the RF switch is associated with a plurality of slave nodes 104, e.g., slave nodes 104*a* and 104*b*, and thereby is associated with a plurality of communication pathways, e.g., communication pathways 702*a* and 702*b*, in step 6402. If the RF switch is associated with a plurality of slave nodes 104 and thereby is associated with a plurality of communication pathways 702, then a communication from the source node 706 that is principally directed to, and directly affects, only one of the destination nodes 708*a*, is transmitted by multicasting the communication to all of the nodes associated with the RF switch 302 in step 6404. I.e., the communication is transmitted by the RF switch 302 through all of the communication pathways, 702*a* and 702*b*, that the RF switch is associated with thereby transmitting the communication to the slave nodes, 104*a* and 104*b*, and the destination nodes, 708*a* and 708*b*. The communication is then single-casted to only the nodes directly affected by the communication in step 6406. I.e., the communication is only transmitted by the RF switch 302 through the communication pathway 702*a* thereby transmitting the communication to the slave node 104*a* and the destination node 708*a*. In this manner, the communication of the information to the affected nodes in the system 100 is assured by performing a multi-cast prior to a single-cast.

Figure 65:
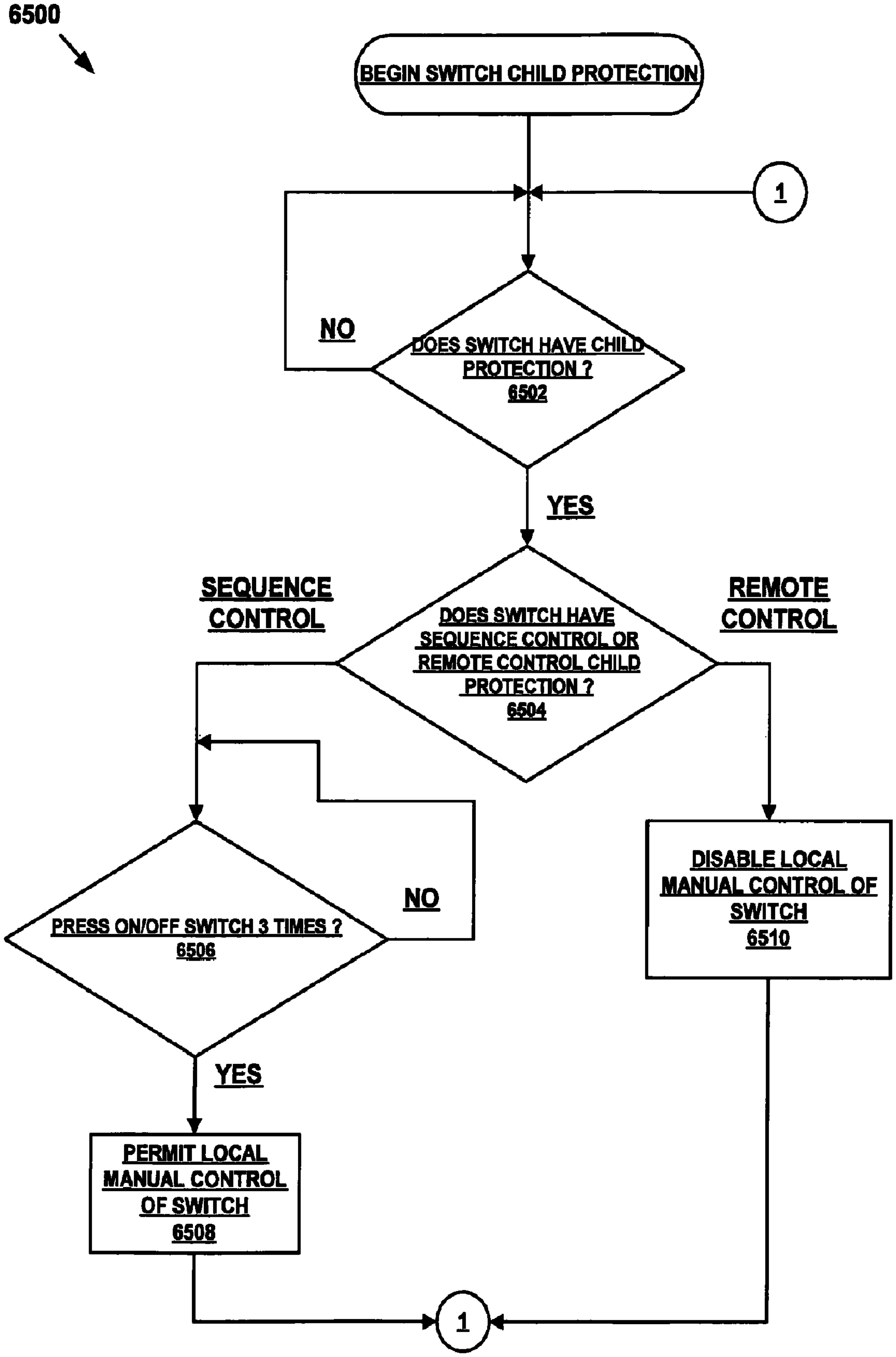
FIG. 65 is a flow chart illustration of an exemplary embodiment of a method of child protection for the RF switch.

Referring to FIG. 65, in an exemplary embodiment, during operation of the RF switch 302, the RF switch implements a method of child protection 6500 in which it is first determined if the RF switch has active child protection functionality in step 6502. If the RF switch 302 has active child protection functionality, then it is then determined if the RF switch has sequence control or remote control child protection functionality in step 6504.

If the RF switch 302 has sequence control child protection functionality, then, in order to permit local manual operation of the switch, a user must depress the touchpad 5710 three times in step 6506. If a user of the RF switch 302 depresses the touchpad 5710 three times in step 6506, then local manual operation of the RF switch, using the touchpad 5710, is permitted in step 6508.

Alternatively, if the RF switch 302 has remote control child protection functionality, then, local manual operation of the switch, using the touchpad 5710, is not permitted. Consequently, if the RF switch 302 has remote control child protection functionality, then local manual operation of the switch, using the touchpad 5710, is not permitted in step 6510. As a result, control of the RF switch 302 is provided by one or more of the master nodes 102 of the system 100.

Figure 66A:
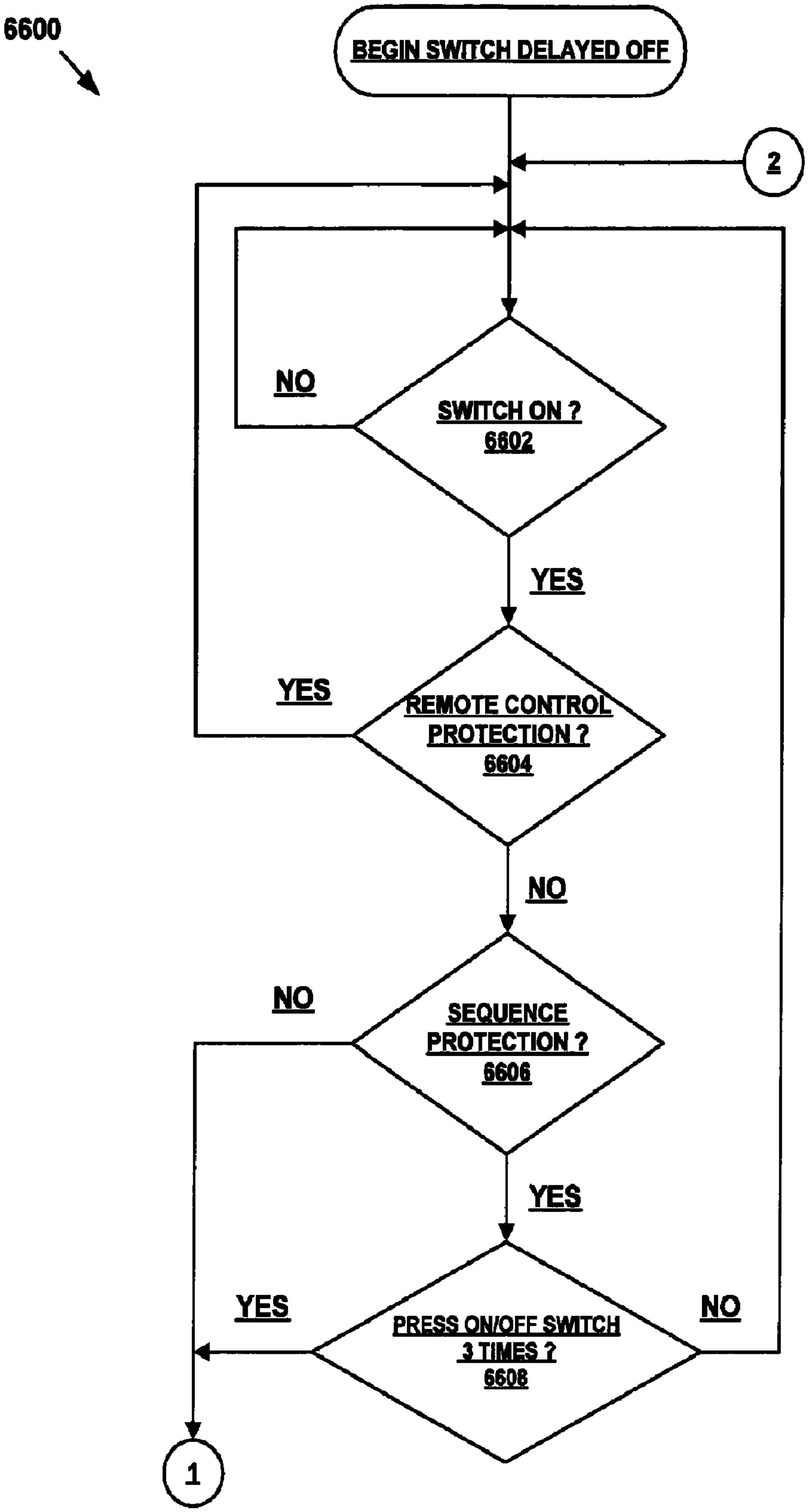
FIGS. 66*a* to 66*c* is a flow chart illustration of an exemplary embodiment of a method of delayed off for the RF switch.
Figure 66B:
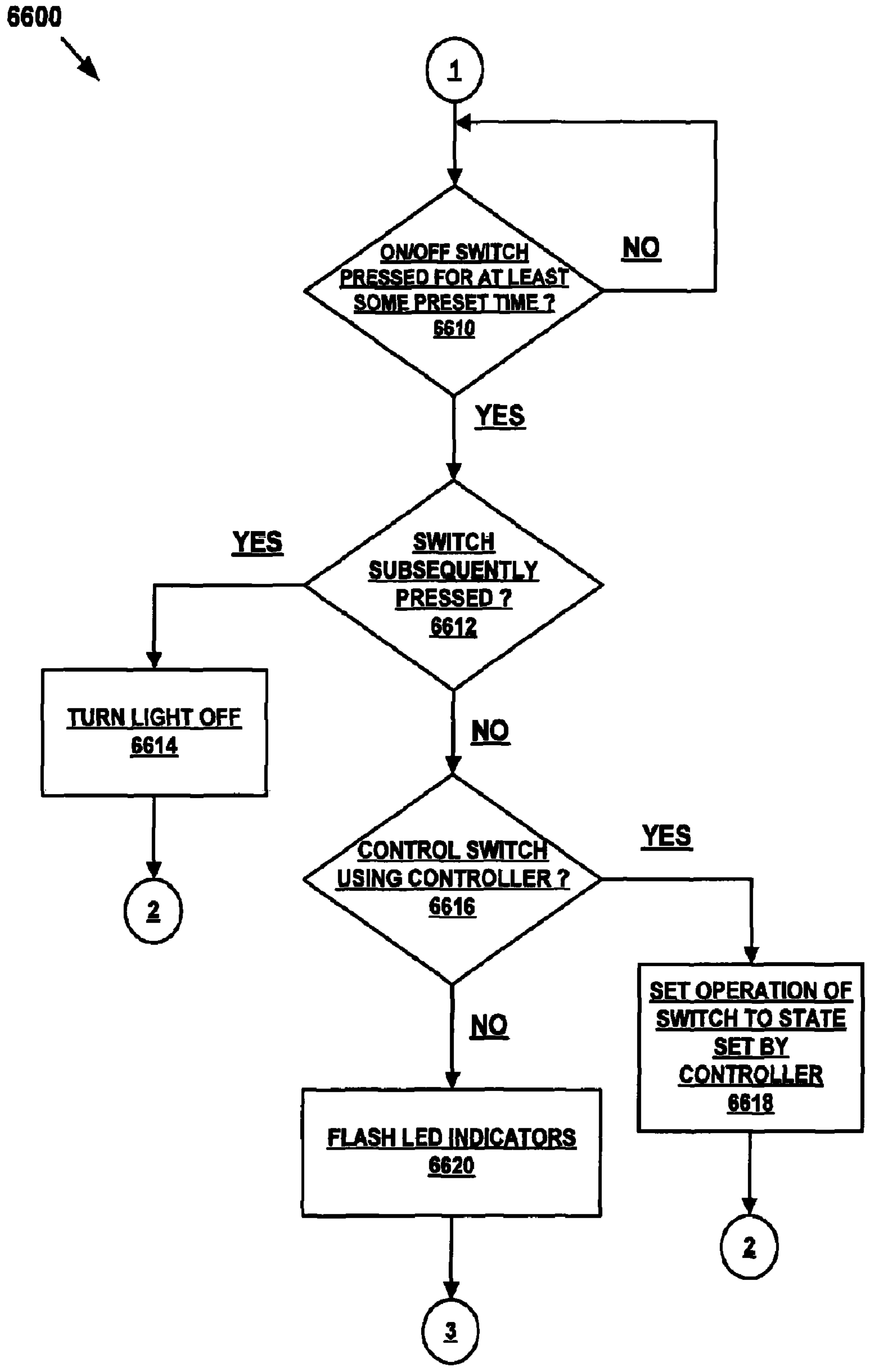
Figure 66C:
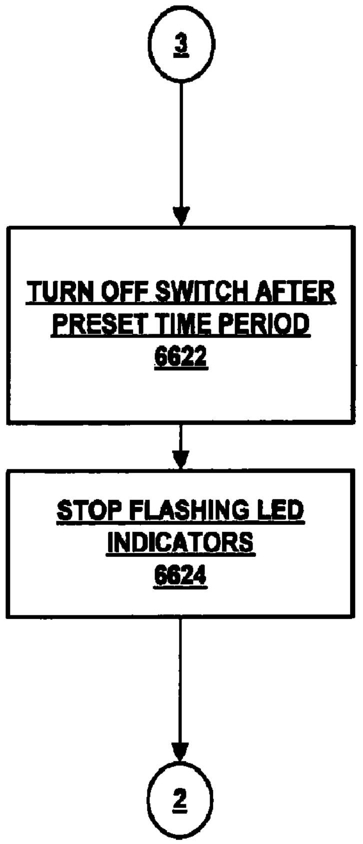

Referring to FIGS. 66*a* to 66*c*, in an exemplary embodiment, during operation of the RF switch 302, the RF switch implements a method of delayed off 6600 in which it is first determined if the touchpad 5710 of the RF switch is in an on position in step 6602. If the touchpad 5710 of the RF switch 302 is in an on position, then it is then determined if the RF switch has remote control protection in step 6604. If the RF switch 302 has remote control protection, then, local manual operation of the switch, using the touchpad 5710, is not permitted.

If the RF switch 302 does not have remote control protection, then it is then determined if the RF switch has sequence control protection in step 6606. If the RF switch 302 has sequence control protection, then, if a user of the RF switch depresses the touchpad 5710 of the RF switch three times in step 6608 or if the RF switch 302 does not have sequence control protection, then it is determined if the touchpad was depressed for at least some predefined minimum time period in step 6610.

If the touchpad 5710 of the RF switch 302 was depressed for at least some predefined minimum time, then it is determined if the touchpad was also subsequently depressed in step 6612. If the touchpad 5710 of the RF switch 302 was also subsequently depressed, then the load 5724 that is operably coupled to the RF switch is turned off in step 6614. If the touchpad 5710 of the RF switch 302 was not also subsequently depressed, then it is determined if the RF switch 302 will be controlled by one or more of the master nodes 102 in step 6616.

If the RF switch 302 will be controlled by one or more of the master nodes 102, then the operational state of the RF switch is controlled by one or more of the master nodes 102 in step 6618. Alternatively, if the RF switch 302 will not be controlled by one or more of the master nodes 102, then the LED indicator light 5716 of the RF switch are flashed in step 6620. The RF switch 302 is then operated to turn off the load 5724 operably coupled to the RF switch after a predetermined time period in step 6622, and then the LED indicator light 5716 of the RF switch are turned off in step 6624.

Figure 67A:
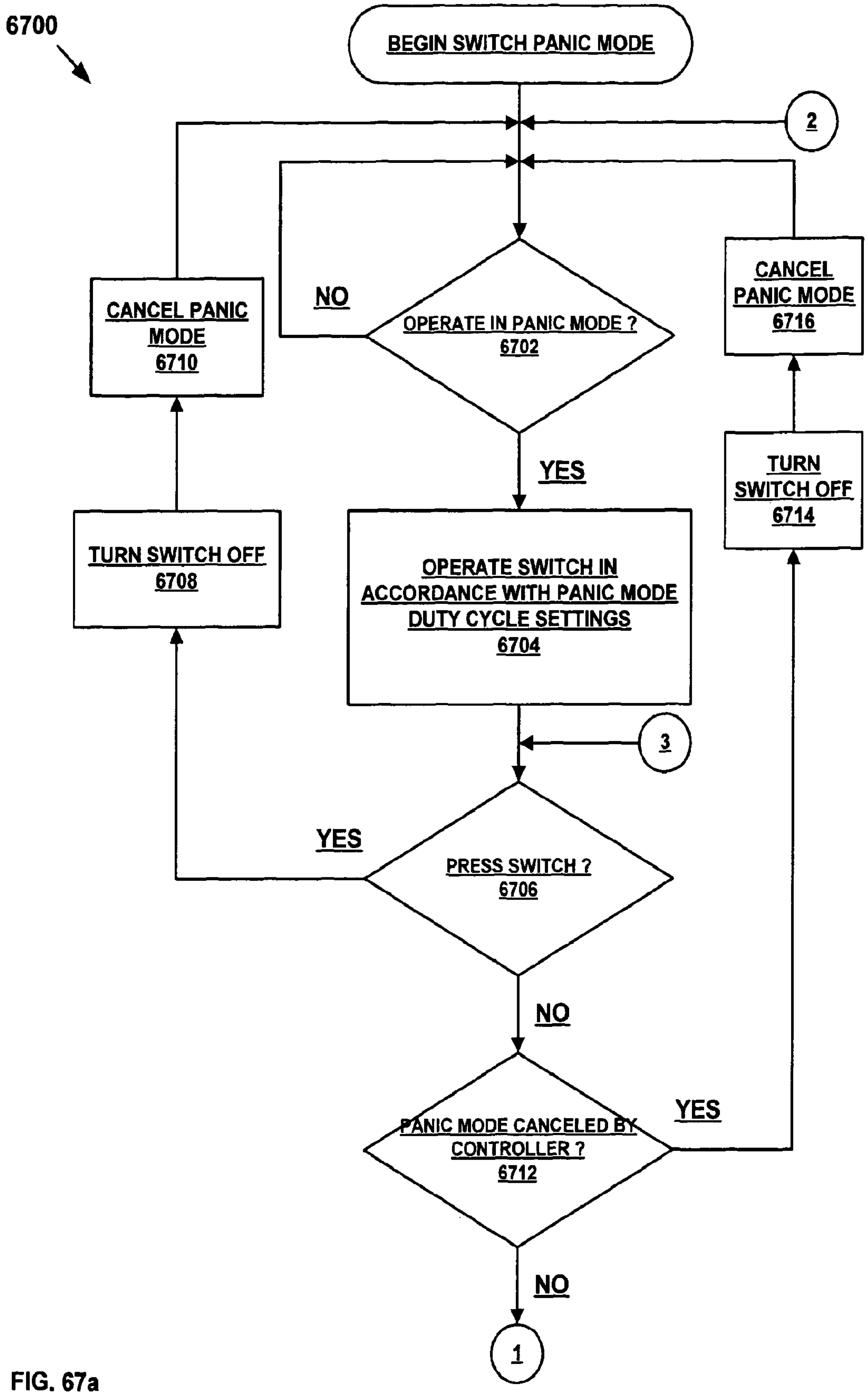
FIGS. 67*a* and 67*b* is a flow chart illustration of an exemplary embodiment of a method of panic mode for the RF switch.
Figure 67B:
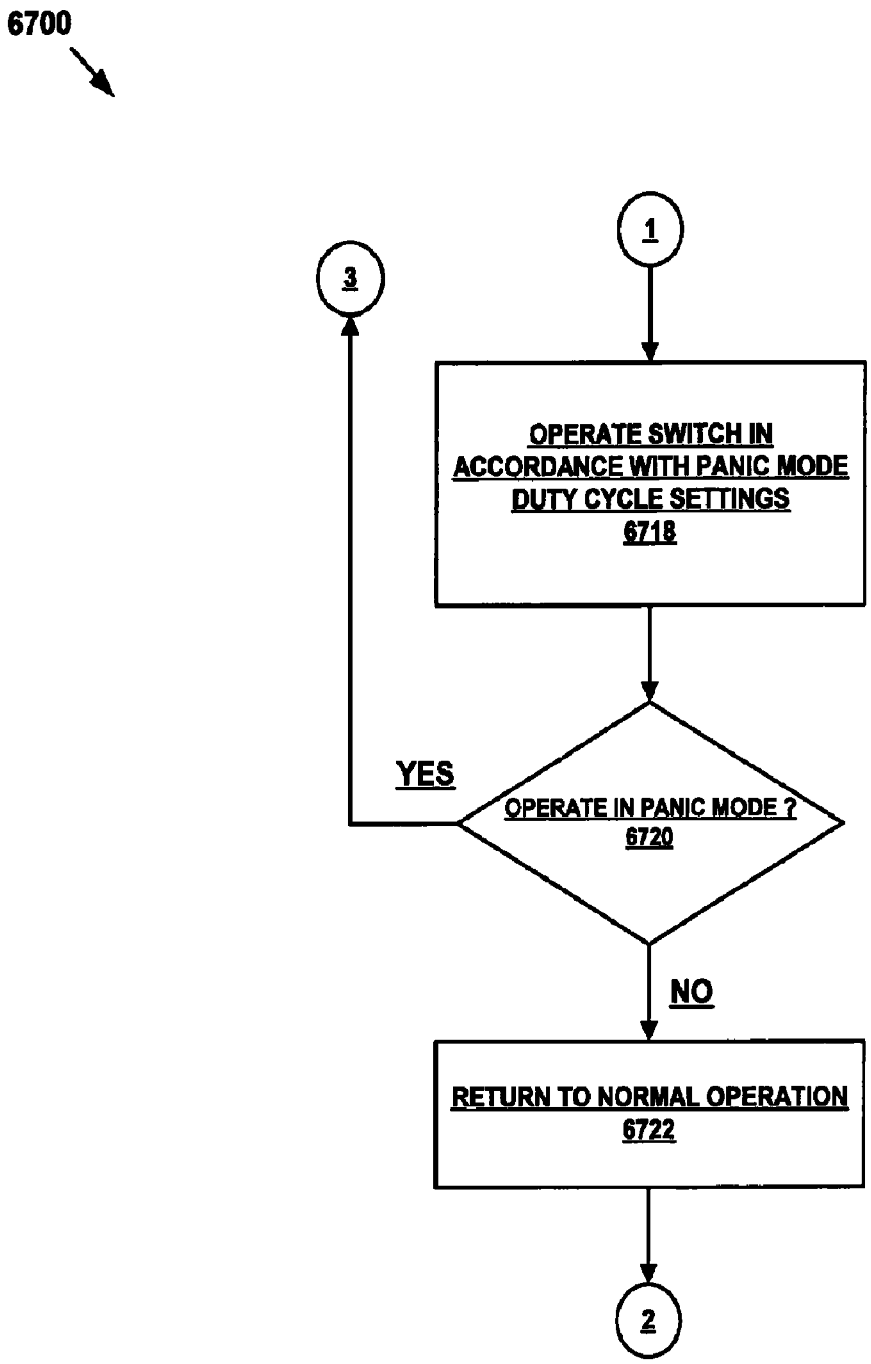

Referring to FIGS. 67*a* to 67*b*, in an exemplary embodiment, during operation of the RF switch 302, the RF switch implements a method of panic mode operation method 6700 in which it is first determined if a panic mode operation has been selected by a user of the system 100 in step 6702. In an exemplary embodiment, a panic mode operation may be selected by a user of the system 100 by operating one or more of the master nodes 102 of the system.

If a panic mode operation has been selected by a user of the system 100, then the RF switch 302 is operated in accordance with the operating parameters assigned to the RF switch during a panic mode of operation as, for example, contained within the panic database 6108, in step 6704. If the touchpad 5710 of the RF switch 302 is then depressed in step 6706, then the RF switch is operated to decouple the load 5724 from the power supply 5722 in step 6708. The panic mode of operation is then canceled in step 6710.

Alternatively, if the touchpad 5710 of the RF switch 302 is not then depressed in step 6706, then, if the panic mode of operation is canceled by a master node 102 of the system in step 6712, then the RF switch is operated to decouple the load 5724 from the power supply 5722 in step 6714. The panic mode of operation is then canceled in step 6716.

Alternatively, if the panic mode of operation is not canceled by a master node 102 of the system in step 6712, then the RF switch 302 is operated in accordance with the panic mode duty cycle settings for the RF switch contained within, for example, the panic database 6108, in step 6718. In an exemplary embodiment, the panic mode duty cycle settings define an amount of time to couple the load 5724 to the power supply 5722 and an amount of time to decouple the load from the power supply. For example, if the load 5724 is a light, operation of the RF switch 302 in a panic mode of operation will turn the light on and off in accordance with the panic mode duty cycle settings for the RF switch. If a panic mode of operation is canceled by a user of the system 100 in step 6720, then the operation of the RF switch 302 will return to normal in step 6722.

Figure 68:
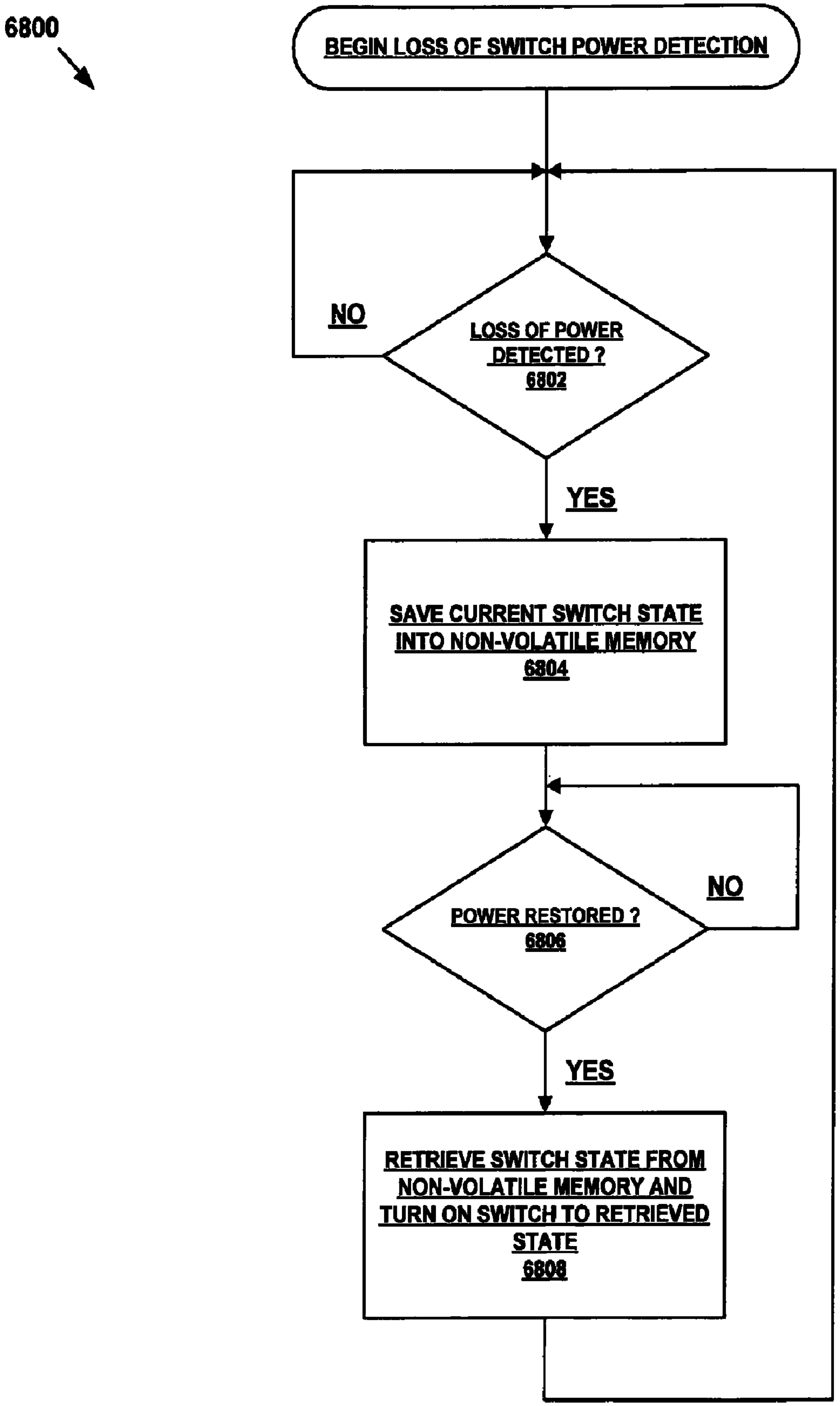
FIG. 68 is a flow chart illustration of an exemplary embodiment of a method of loss of power detection for the RF switch.

Referring to FIG. 68, in an exemplary embodiment, during operation of the RF switch 302, the RF switch implements a method of loss of power detection method 6700 in which it is first determined if a loss of power has occurred, for example, by monitoring the power supply 5722 in step 6702. If a loss of power is detected in step 6802, then the current operational state of the RF switch 302 is stored in the RF switch operational state database 6110 within the non-volatile memory 5704 of the RF switch in step 6804. It is then determined if power has been restored to the RF switch 302, for example, by monitoring the power supply 5722 in step 6806. If power has been restored to the RF switch 302, then the current operational state of the RF switch 302 is retrieved from the RF switch operational state database 6110 within the non-volatile memory 5704, and the operational state of the RF switch is restored to the operational state defined within the RF switch operational state database 6110 in step 6808.

In an exemplary embodiment, the design, operation and functionality of the light switch touch pad 5710, the install button 5712, the uninstall button 5714, and the associate button 5718 may be combined into a single push button.

Figure 69:
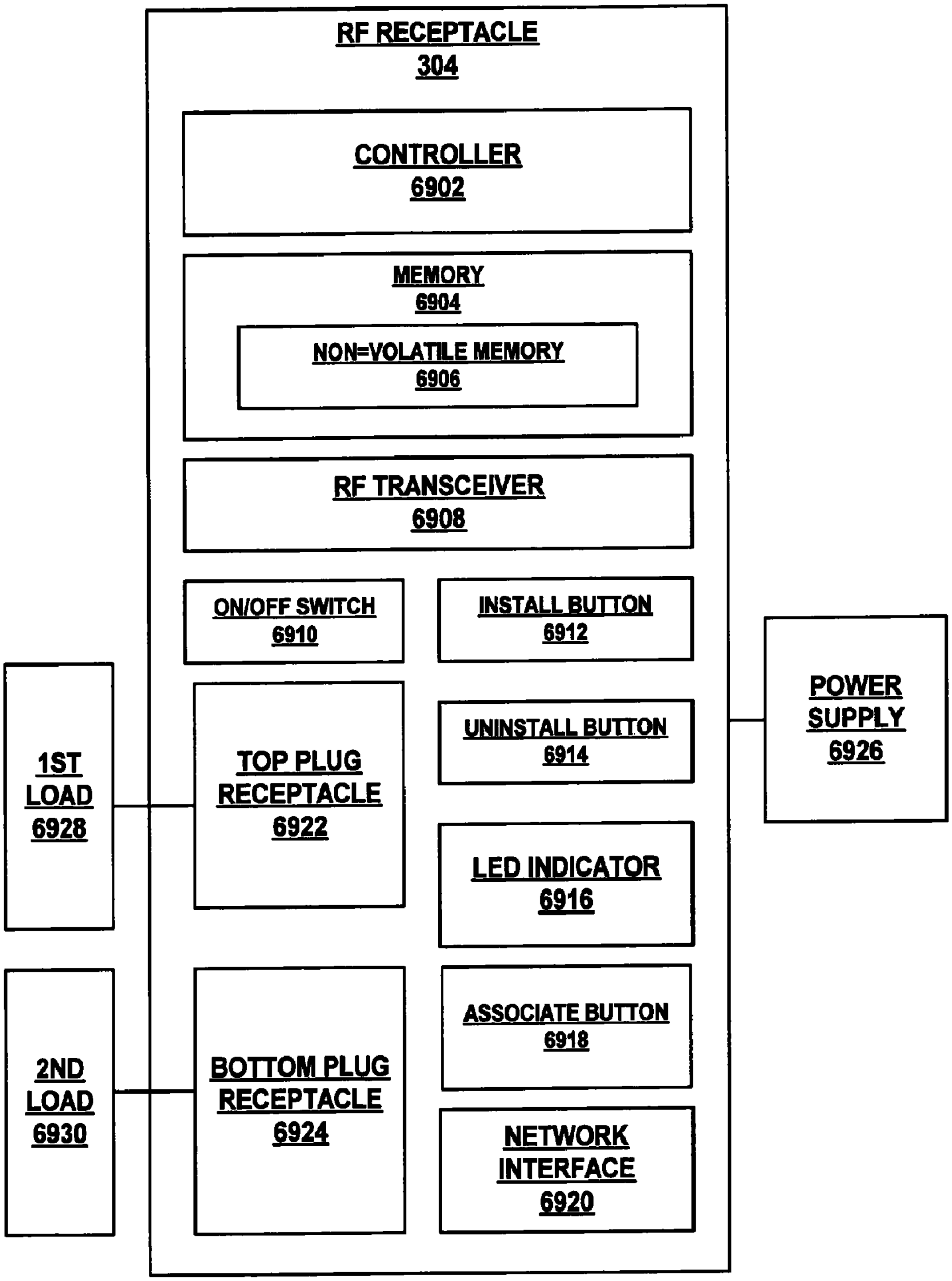
FIG. 69 is a schematic illustration of an exemplary embodiment of an RF receptacle for the system.

Referring now to FIG. 69, an exemplary embodiment of an RF receptacle 304 includes a controller 6902 that is operably coupled to: a memory 6904 including a non-volatile memory 6906, an RF transceiver 6908, an on/off switch 6910, an install button 6912, an uninstall button 6914, an LED indicator light 6916, an associate button 6918, a network interface 6920, a conventional top plug receptacle 6922, and a conventional bottom plug receptacle 6924. In an exemplary embodiment, a conventional power supply 6926 is operably coupled to the RF receptacle 304 for powering the operation of the RF receptacle, and the RF receptacle controllably couples and decouples $1^{st}$ and $2^{nd}$ loads, 6928 and 6930, respectively, to and from the power supply.

Figure 69A:
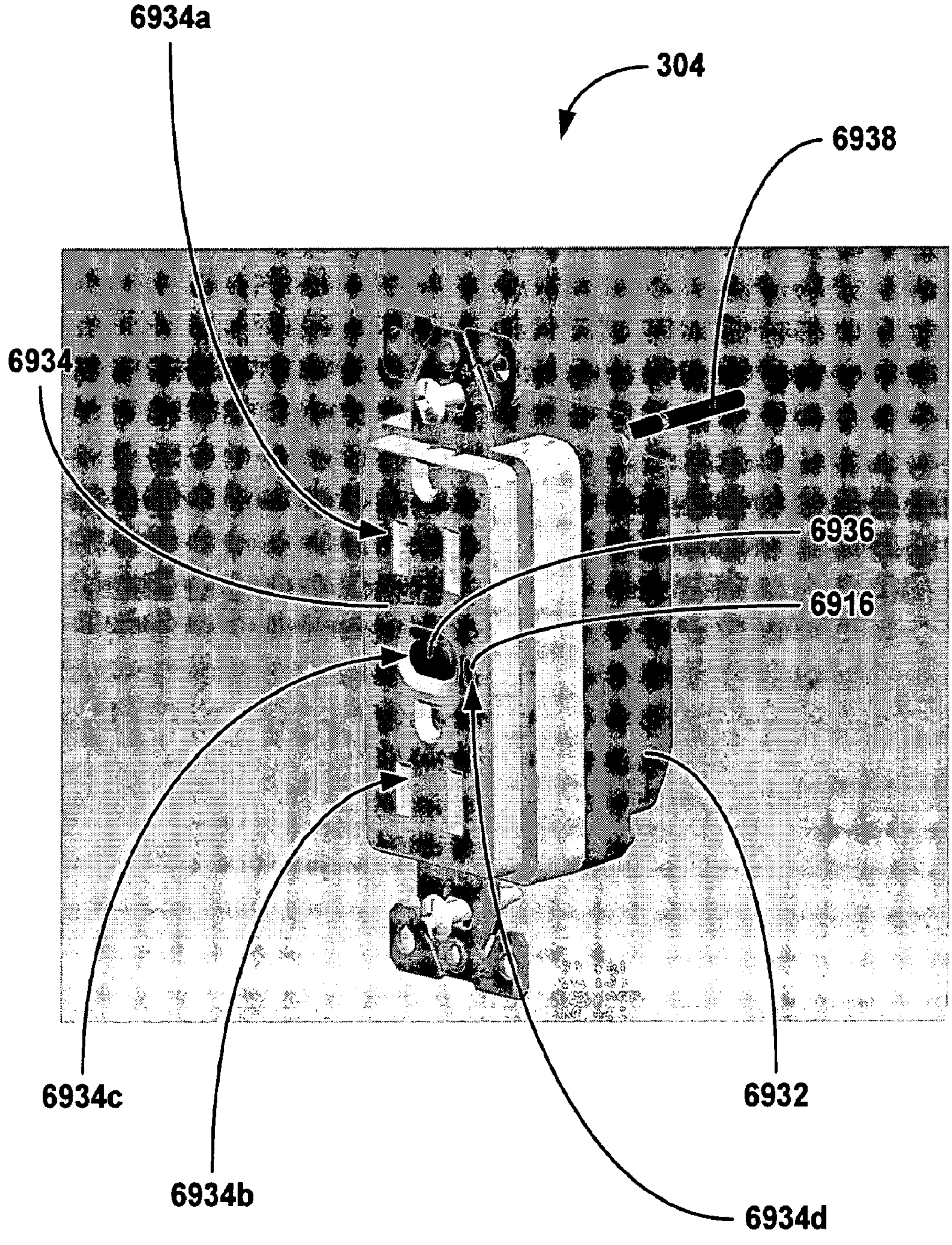
FIG. 69*a* is a perspective illustration of an exemplary embodiment of the RF receptacle.

Referring to FIG. 69*a*, in an exemplary embodiment, the RF receptacle 304 includes a housing 6932, for containing and supporting the elements of the RF receptacle, and a cover 6934 that defines top and bottom plug openings, 6934*a* and 6934*b*, for the top and bottom plug receptacles, 6922 and 6924, respectively, an opening 6934*c* for one or more buttons 6936 that may, for example, include one or more of the following: the on/off switch 6910, the install button 6912, the uninstall button 6914, and the associate button 6918, and an opening 6934*d* for the LED indicator 6916. In an exemplary embodiment, the RF receptacle 304 further includes an external RF antenna 6938 that is operably coupled to the RF transceiver 6908.

In an exemplary embodiment, the controller 6902 is adapted to monitor and control the operation of the memory 6904, including a non-volatile memory 6906, the RF transceiver 6908, the on/off switch 6910, the install button 6912, the uninstall button 6914, the LED indicator light 6916, the associate button 6918, the network interface 6920, the top plug receptacle 6922, and the bottom plug receptacle 6924. In an exemplary embodiment, the controller 6902 includes one or more of the following: a conventional programmable general purpose controller, an application specific integrated circuit (ASIC), one or more conventional relays for controllably coupling or decoupling one or both of the plug receptacles, 6922 and 6924, to or from the loads, 6928 and 6930, respectively, or other conventional controller devices. In an exemplary embodiment, the controller 6902 includes a model ZW0201 controller, commercially available from Zensys A/S.

Figure 70:
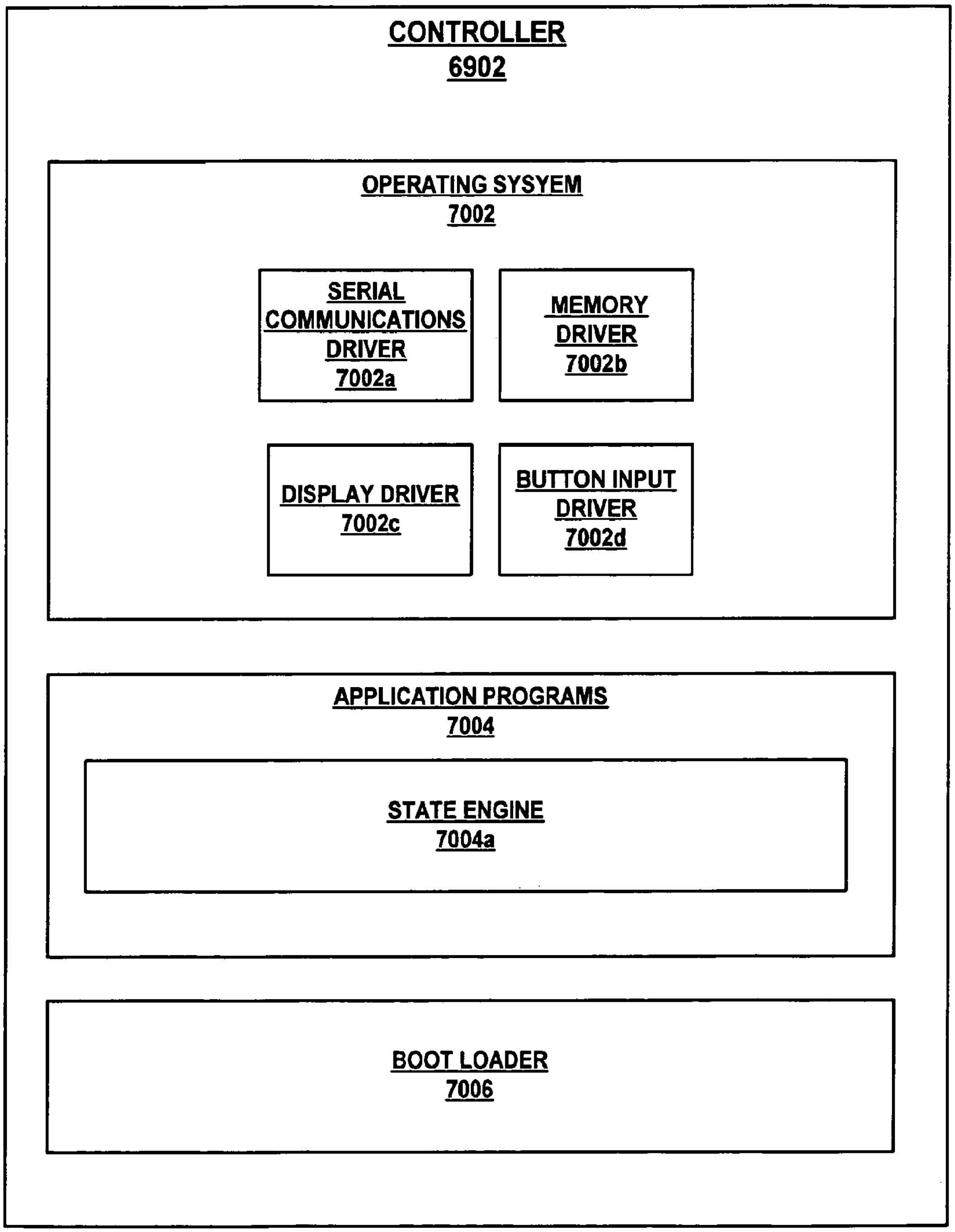
FIG. 70 is a schematic illustration of an exemplary embodiment of the controller of the RF receptacle.

Referring now to FIG. 70, in an exemplary embodiment, the controller 6902 includes an operating system 7002, application programs 7004, and a boot loader 7006. In an exemplary embodiment, the operating system 7002 includes a serial communications driver 7002*a*, a memory driver 7002*b*, a display driver 7002*c*, and a button input driver 7002*c*. In an exemplary embodiment, the serial communications driver 7002*a* controls serial communications using the RF serial transceiver 6908, the memory driver 7002*b* controls the memory 6904, including the non volatile memory 6906, the display driver 7002*c* controls the LED indicator light 6916, and the button input driver 7002*d* debounces button inputs provided by a user using the on/off switch 6910, the install button 6912, the uninstall button 6914, and the associate button 6918. In an exemplary embodiment, the serial communications driver 7002*a* includes a Z-Wave™ serial API driver that implements a Z-Wave™ serial API protocol. The Z-Wave™ serial API driver that implements a Z-Wave™ serial API protocol are both commercially available from Zensys A/S.

In an exemplary embodiment, the application programs 7004 include a state engine 7004*a*. In an exemplary embodiment, the state engine 7004*a* permits a user of one or more of the master nodes 102 to configure, control and monitor the operation of the RF receptacle 304.

Figure 71:
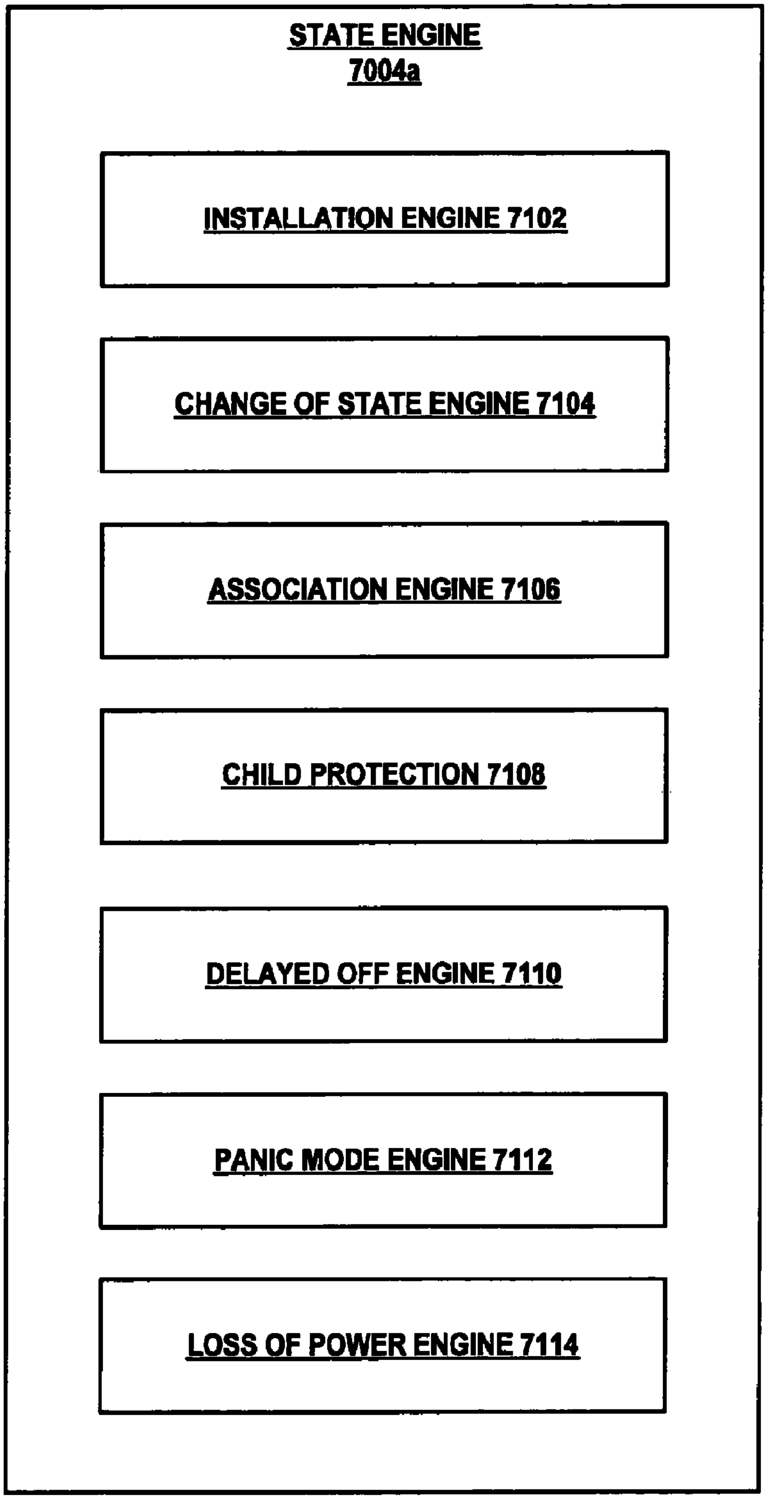
FIG. 71 is a schematic illustration of an exemplary embodiment of the state engine of the controller of the RF receptacle.

Referring now to FIG. 71, in an exemplary embodiment, the state engine 7004*a* includes an installation engine 7102, a change of state engine 7104, an association engine 7106, a child protection engine 7108, a delayed off engine 7110, a panic mode engine 7112, and a loss of power detection engine 7114.

In an exemplary embodiment, the installation engine 7102 monitors the operating state of the RF receptacle 304 and provides an indication to a user of the system 100 as to whether or not the RF receptacle has been installed in the system. In this manner, the installation engine 5902 facilitates the installation of the RF receptacle 304 into the system 100.

In an exemplary embodiment, the change of state engine 7104 monitors the operating state of the RF receptacle 304 and, upon a change in operating state, transmits information to one or more of the master nodes 102 regarding the configuration of the RF receptacle.

In an exemplary embodiment, the association engine 7106 is adapted to monitor and control the operation of the RF receptacle 304 when the RF receptacle is associated with one or more communication pathway 702.

In an exemplary embodiment, the child protection engine 7108 is adapted to monitor and control the operation of the RF receptacle 304 when the RF receptacle is operated in a child protection mode of operation.

In an exemplary embodiment, the delayed off engine 7110 is adapted to monitor and control the operation of the RF receptacle 304 when the RF receptacle is operated in a delayed off mode of operation.

In an exemplary embodiment, the panic mode engine 7112 is adapted to monitor and control the operation of the RF receptacle 304 when the RF receptacle is operated in a panic mode of operation.

In an exemplary embodiment, the loss of power detection engine 7114 is adapted to monitor the operating state of the RF receptacle 304 and, upon the loss of power, save the operating state of the RF receptacle 304 into the non volatile memory 6906. Upon the resumption of power to the RF receptacle 304, the loss of power detection engine 7114 then retrieves the stored operating state of the RF receptacle 304 from the non volatile memory 6906 and restores the operating state of the RF receptacle.

Figure 72:
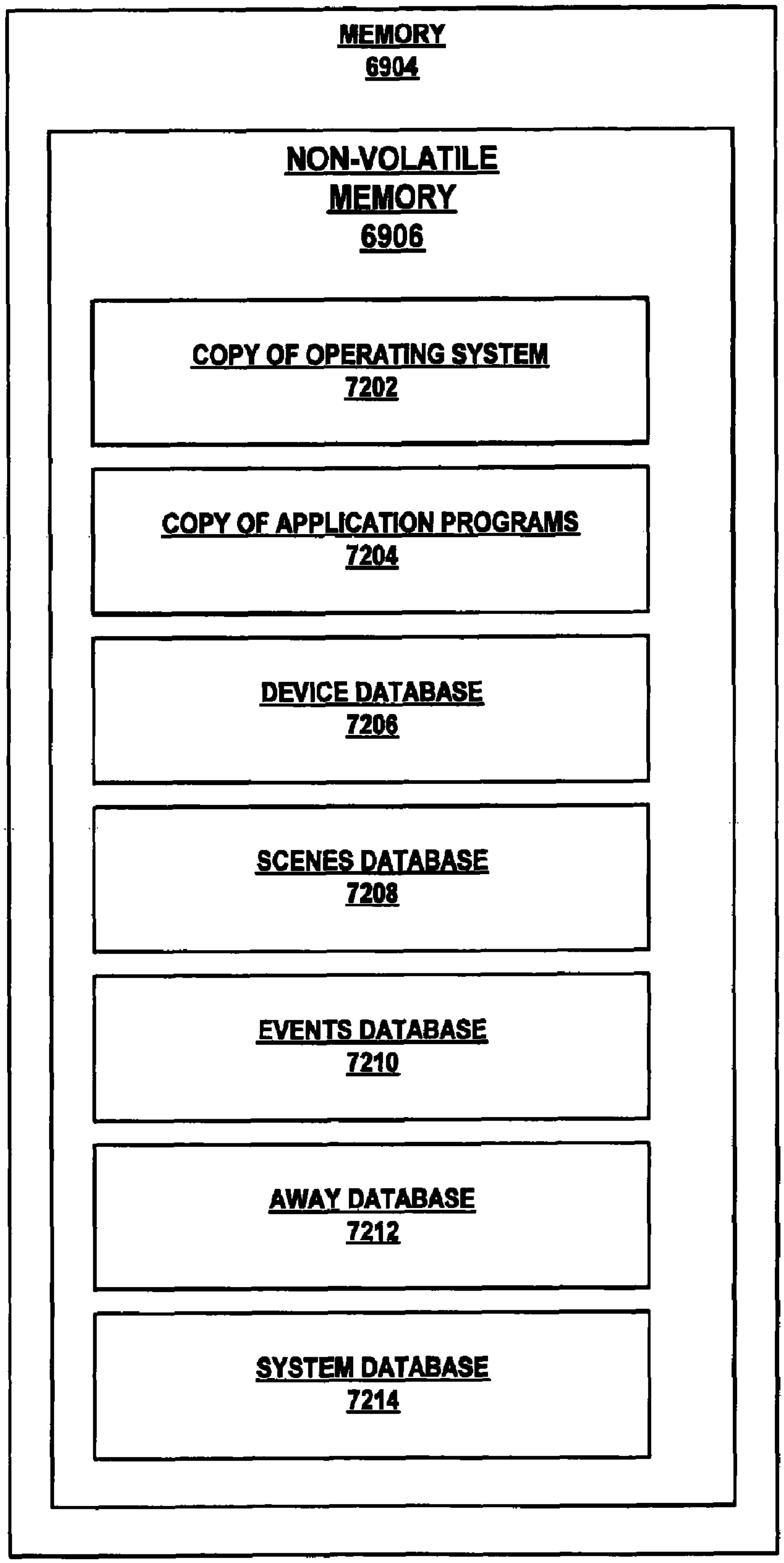
FIG. 72 is a schematic illustration of an exemplary embodiment of the memory of the RF receptacle.

In an exemplary embodiment, the memory 6904, including the non volatile memory 6906, is operably coupled to and controlled and monitored by the controller 6902. In an exemplary embodiment, as illustrated in FIG. 72, the memory 6904, including the non volatile memory 6906, includes a copy of the operating system 7202, a copy of the application programs 7204, a device database 7206, a scenes database 7208, an events database 7210, an away database 7212, and a system database 7214. In an exemplary embodiment, the memory 6904 includes a model 24 LC256 memory, commercially available from Microchip. In an exemplary embodiment, the non volatile memory 6906 includes a model 24 LC256 memory, commercially available from Microchip.

Figure 73:
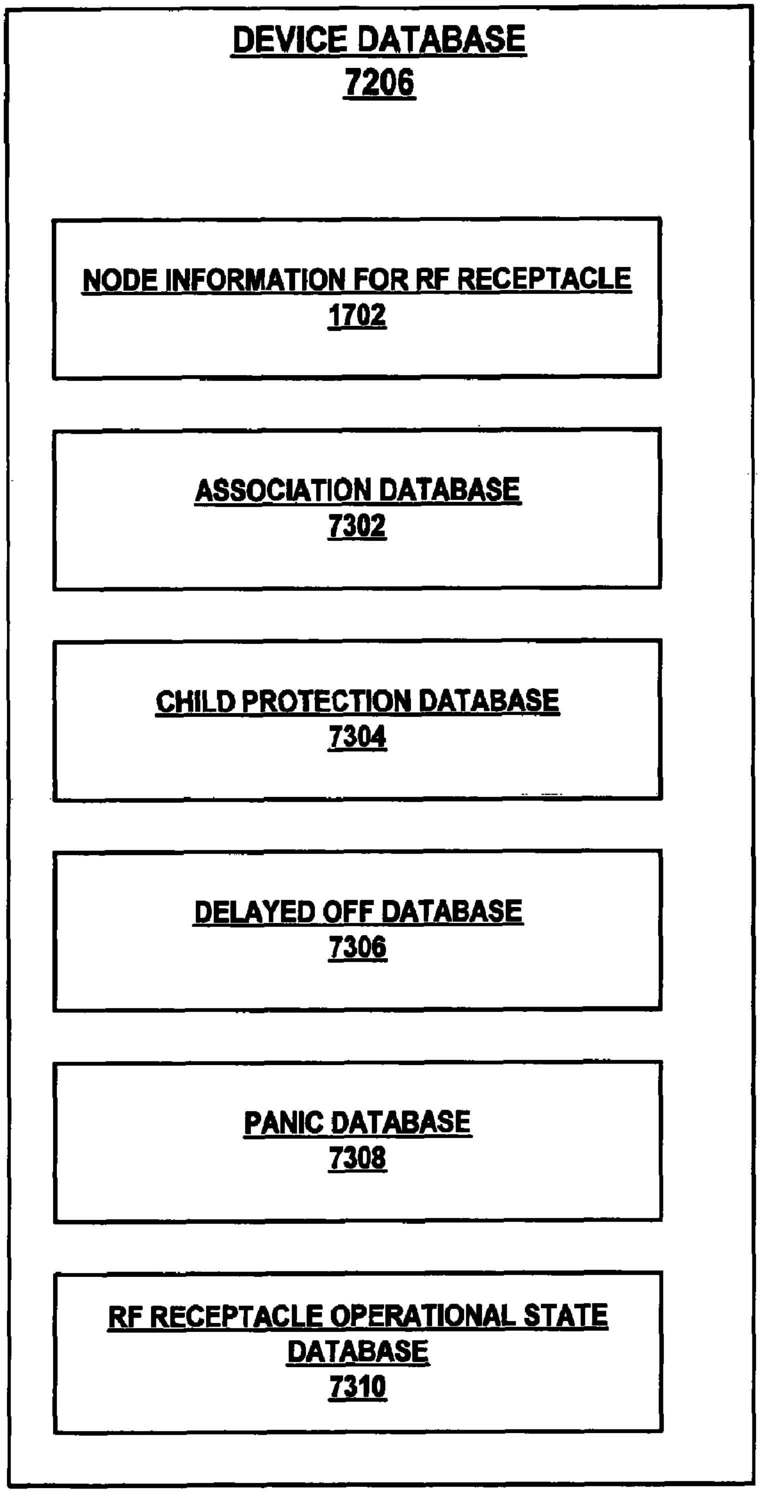
FIG. 73 is a schematic illustration of an exemplary embodiment of the device database of the memory of the RF receptacle.

In an exemplary embodiment, the device database 7206 includes information that is specific to the RF receptacle 304. In an exemplary embodiment, as illustrated in FIG. 73, the device database 7206 includes the node information frame 1702 for the RF receptacle 304, an association database 7302 for the RF receptacle, a child protection database 7304 for the RF receptacle, a delayed off database 7306 for the RF receptacle, a panic database 7308 for the RF receptacle, and an operating state database 7310 for the RF receptacle 304. In an exemplary embodiment, the association database 7302 for the RF receptacle 304 includes information regarding the communication pathways 702 associated with the RF receptacle. In an exemplary embodiment, the child protection database 7304 for the RF receptacle 304 includes information regarding the operating characteristics of the RF receptacle when child protection is enabled. In an exemplary embodiment, the delayed off database 7306 for the RF receptacle 304 includes information regarding the operating characteristics of the RF receptacle when delayed off is enabled. In an exemplary embodiment, the panic database 7308 for the RF receptacle 304 includes information regarding the operating characteristics of the RF receptacle when panic is enabled. In an exemplary embodiment, the operating state database 7310 for the RF receptacle 304 includes information representative of the operating state of the RF receptacle.

In an exemplary embodiment, the device database 7206 includes one or more of the following information:

| Parameter | Offset | Size | Default Value | Description |
|---|---|---|---|---|
| Child Protection Mode | 1 | 1 | 0 | This is the child protection mode of operation for the RF receptacle 304. |
| Off Delay | 2 | 1 | 10 | This is the number of seconds that the RF receptacle 304 will flash the LED indicator 6916 before switching off one or both of the loads, 6928 and/or 6930. |
| Panic On Time | 3 | 1 | 1 | This is the number of seconds the loads, 6928 and/or 6930, will be on while in panic mode. |
| Panic Off Time | 4 | 1 | 1 | This is the number of seconds the loads, 6928 and/or 6930, will be off while in panic mode. |
| Load State | 5 | 1 | 0 | This is the operational state of the loads, 6928 and/or 6930. The default value is for the loads, 6928 and/or 6930, to be OFF. |
| All Switch State | 6 | 1 | 0xFF | This is the state of the loads, 6928 and/or 6930, inclusion in the all switch group. The default is for the loads, 6928 and/or 6930, to be included for both All ON and All OFF. |
| Location | 7 | 25 | Duplex Receptacle | This is the location name. There is a maximum of 24 characters plus a null terminator. |
| Load Boot State | 32 | 1 | LAST VALUE | This is the state the loads, 6928 and/or 6930, takes on booting up the RF receptacle 304. |

-continued

| Parameter | Offset | Size | Default Value | Description |
|---|---|---|---|---|
| Panic Mode Enable | 33 | 1 | Enabled | This controls whether Panic Mode is enabled or disabled for the loads, 6928 and/or 6930. |

In an exemplary embodiment, the scenes database 7208 includes information regarding the scenes 802 that include the RF receptacle 304. In an exemplary embodiment, the events database 7210 includes information regarding the events 1002 that include the RF receptacle 304. In an exemplary embodiment, the away database 7212 includes information regarding the away group 1402 that includes the RF receptacle 304. In an exemplary embodiment, the system database 7214 includes system information that includes the RF receptacle 304.

In an exemplary embodiment, the RF transceiver 6908 is operably coupled to and controlled by the controller 6902. In an exemplary embodiment, the RF transceiver 6908 transmits and receives RF communications to and from other master and slave nodes, 102 and 104, respectively. In an exemplary embodiment, the RF transceiver 6908 may, for example, include one or more of the following: a conventional RF transceiver, and/or the model ZW0201 RF transceiver commercially available from Zensys A/S.

In an exemplary embodiment, the on/off switch 6910 is a conventional on/off switch and is operably coupled to and controlled and monitored by the controller 6902. In an exemplary embodiment, the on/off switch 6910 permits an operator of the RF receptacle 304, in combination with the system 100, to select the desired mode of operation of the RF receptacle 304.

In an exemplary embodiment, the install button 6912 is operably coupled to and controlled and monitored by the controller 6902. In an exemplary embodiment, the install button 6912 permits an operator of the RF receptacle 304, in combination with the system 100, to install the RF receptacle into the system.

In an exemplary embodiment, the uninstall button 6914 is operably coupled to and controlled and monitored by the controller 6902. In an exemplary embodiment, the uninstall button 6914 permits an operator of the RF receptacle 304, in combination with the system 100, to uninstall the RF receptacle from the system.

In an exemplary embodiment, the LED indicator light 6916 is operably coupled to and controlled and monitored by the controller 6902.

In an exemplary embodiment, the associate button 6918 is operably coupled to and controlled and monitored by the controller 6902. In an exemplary embodiment, the associate button 6918 permits an operator of the RF receptacle 304, in combination with the system 100, to associate the RF receptacle with communication pathways 702 in the system.

In an exemplary embodiment, the network interface 6920 is operably coupled to and controlled and monitored by the controller 6902. In an exemplary embodiment, the network interface 6920 permits an operator of the RF receptacle 304, in combination with the system 100, to network the RF receptacle with one or more networks such as, for example, local area networks, wide area networks, or the Internet.

In an exemplary embodiment, the top plug receptacle 6922 is coupled to and controlled by the controller 6902 and is adapted to receive a conventional male plug for operably coupling the top plug receptacle to the $1^{st}$ load 6928. In an exemplary embodiment, the controller 6902 controllably couples or decouples the top plug receptacle 6922 to or from the power supply 6926. In this manner, electrical power is provided to or denied to the $1^{st}$ load 6928.

In an exemplary embodiment, the bottom plug receptacle 6924 is coupled to and controlled by the controller 6902 and is adapted to receive a conventional male plug for operably coupling the bottom plug receptacle to the $2^{nd}$ load 6930. In an exemplary embodiment, the controller 6902 controllably couples or decouples the bottom plug receptacle 6924 to or from the power supply 6926. In this manner, electrical power is provided to or denied to the $2^{nd}$ load 6930.

Figure 74:
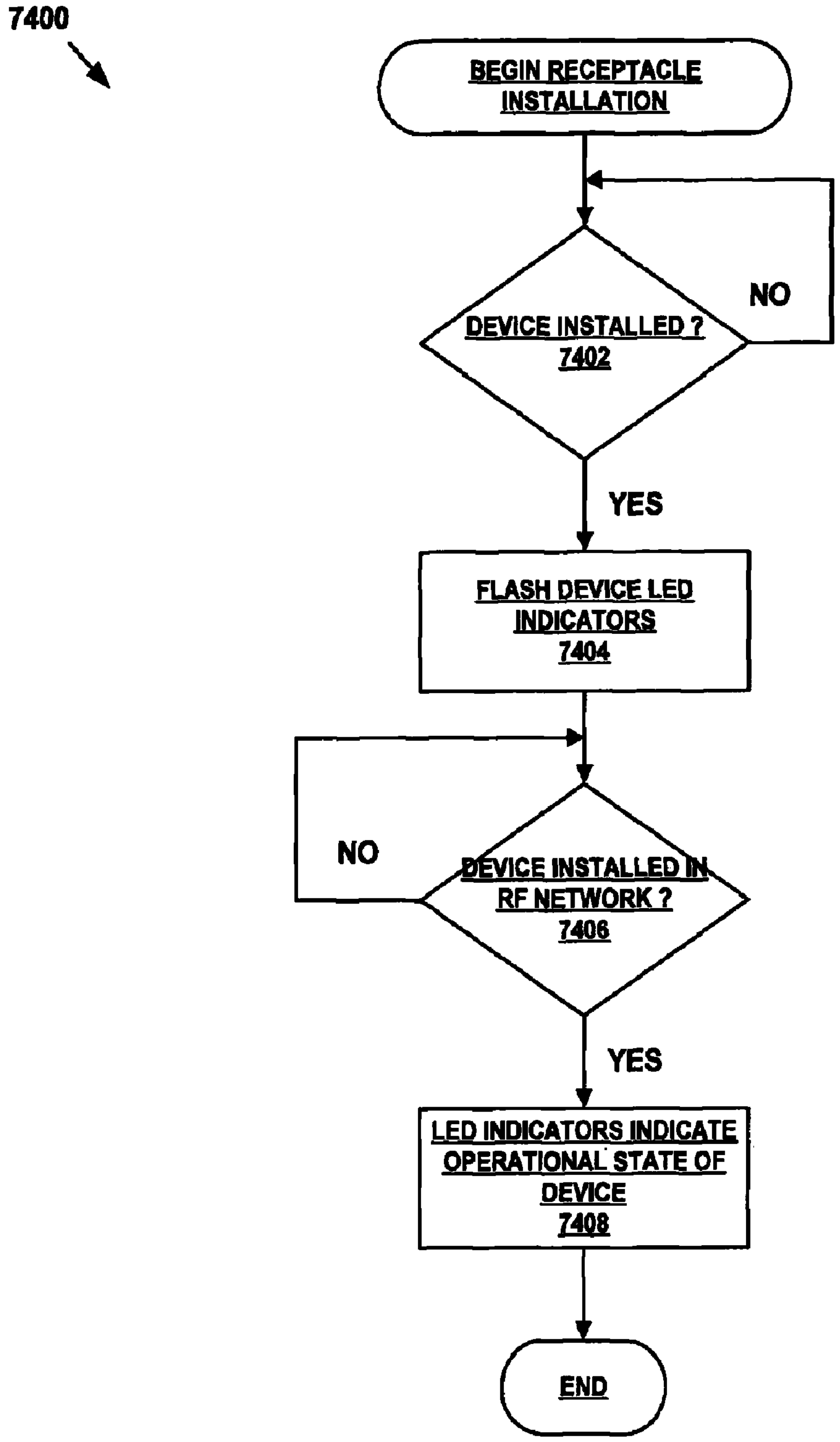
FIG. 74 is a flow chart illustration of an exemplary embodiment of a method of installation for the RF receptacle.

Referring to FIG. 74, in an exemplary embodiment, during operation of the RF receptacle 304, the RF receptacle implements a method of installation 7400 in which, if the RF receptacle has been operably coupled to the power supply 6926, then the LED indicator lights 6916 are operated to indicate this operational state in steps 7402 and 7404. Then, if the RF receptacle 304 has been installed in the system 100, then the LED indicator lights 6916 are operated to indicate this operational state in steps 7406 and 7408. In an exemplary embodiment, the LED indicator lights 6916 flash on an off to indicate the operational state in steps 7402 and 7404, and the LED indicator lights are turned on to indicate the operational state in steps 7406 and 7408. In this manner, an operator of the system 100 is provided with a visual and highly effective indication of the operational state of the RF receptacle 304 that is local to the RF receptacle. This permits an installer of the RF receptacle 304, in a large house or commercial building, with an effective means of determining the operational state of the RF receptacle 304 that is both local to the RF receptacle and avoids the need to interrogate a master node 102 to determine the operational state.

Figure 75:
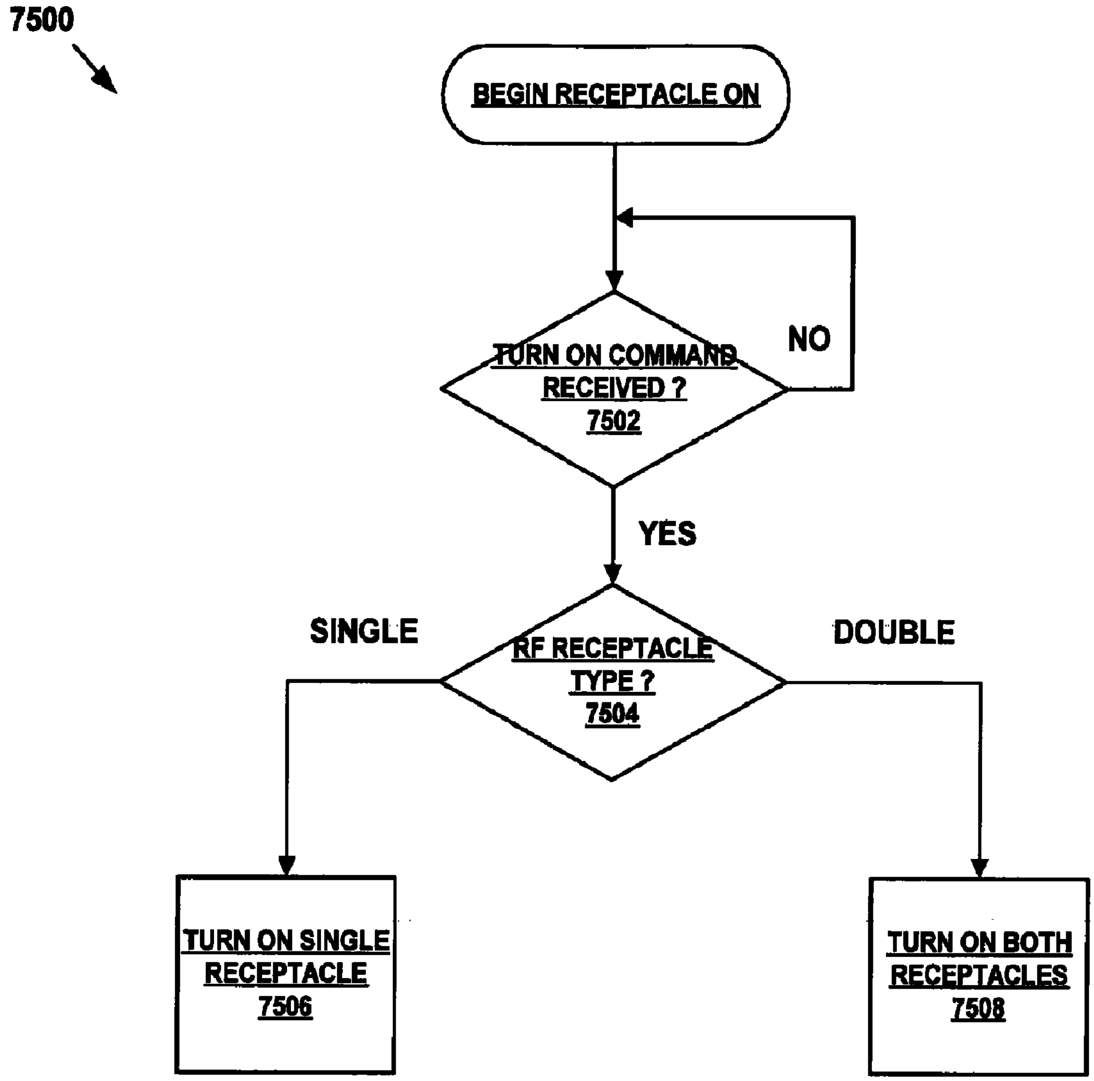
FIG. 75 is a flow chart illustration of an exemplary embodiment of a method of turning on the RF receptacle.

Referring to FIG. 75, in an exemplary embodiment, during operation of the RF receptacle 304, the RF receptacle implements a method of operation 7500 in which, it is determined if a command has been received from a master node 102 to couple the power supply 6926 to one or more both of the plug receptacles, 6922 and 6944, in step 7502. If a command has been received from a master node 102 to couple the power supply 6926 to one or more both of the plug receptacles, 6922 and 6944, then it is determined if the RF receptacle 304 includes a single plug receptacle or a pair of plug receptacles in step 7504. In an exemplary embodiment, for example, the RF receptacle 304 may include: a) a pair of plug receptacle that are both operably coupled to and controlled by the controller 6902; b) a pair of plug receptacles with only one of the plug receptacles operably coupled to and controlled by the controller and the other plug receptacle directly coupled to the power supply 6926; or c) a single plug receptacle that is operably coupled to and controlled by the controller.

If the RF receptacle 304 includes only a single plug receptacle that is operably coupled to and controlled by the controller 6902, then the single plug receptacle is operably coupled to the power supply 6926 in step 7506. Alternatively, if the RF receptacle 304 includes only a pair of plug receptacles that are operably coupled to and controlled by the controller 6902, then both of the plug receptacles are operably coupled to the power supply 6926 in step 7508.

Figure 76:
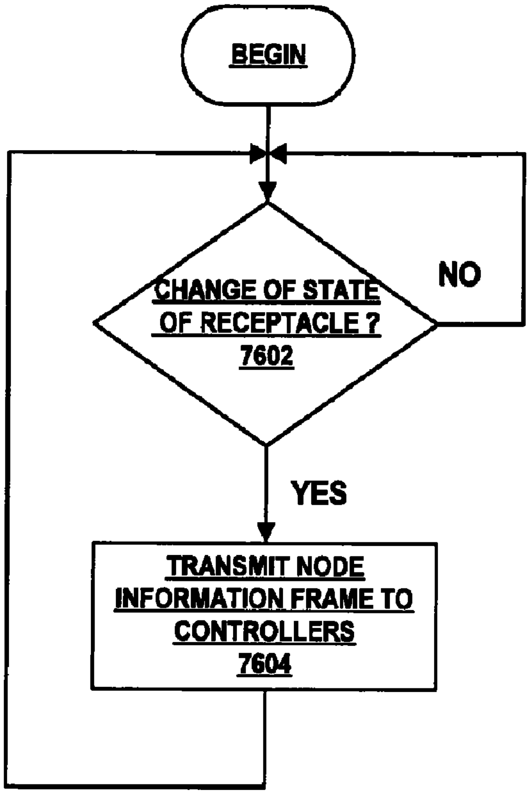
FIG. 76 is a flow chart illustration of an exemplary embodiment of a method of change of state for the RF receptacle.

Referring to FIG. 76, in an exemplary embodiment, during operation of the RF receptacle 304, the RF receptacle implements a method of detecting a change of state 7600 in which, if the operating state of the RF receptacle has changed, then the node information frame 1702 for the RF receptacle is transmitted to one or more of the master nodes 102 of the system 100 using the RF transceiver 6908 in steps 7602 and 7604.

Figure 77A:
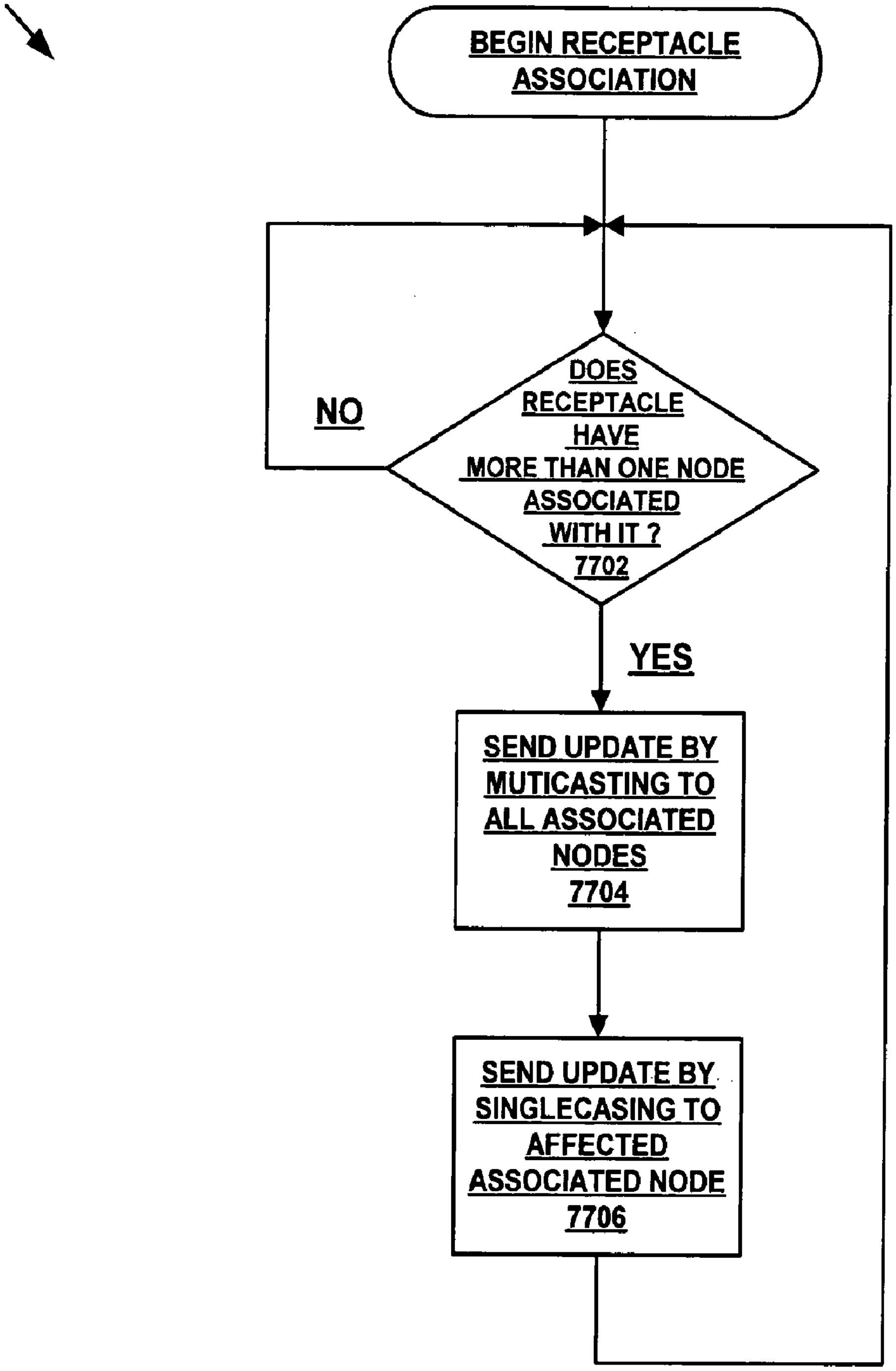
FIGS. 77*a* and 77*b* is a flow chart and schematic illustration of an exemplary embodiment of a method of association for the RF receptacle.
Figure 77B:
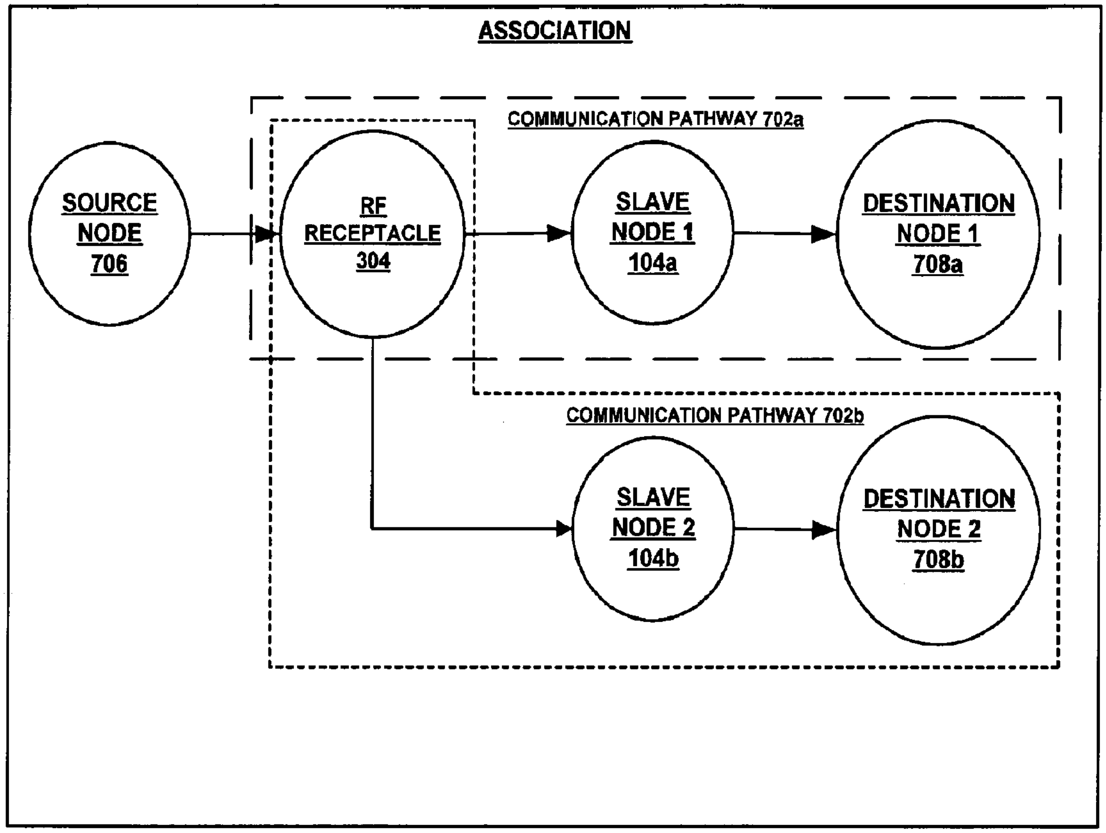

Referring to FIGS. 77*a*-77*b*, in an exemplary embodiment, during operation of the RF receptacle 304, the RF receptacle implements a method of association 7700 in which it is first determined if the RF receptacle is associated with a plurality of slave nodes 104, e.g., slave nodes 104*a* and 104*b*, and thereby is associated with a plurality of communication pathways, e.g., communication pathways 702*a* and 702*b*, in step 7702. If the RF receptacle 304 is associated with a plurality of slave nodes 104 and thereby is associated with a plurality of communication pathways 702, then a communication from the source node 706 that is principally directed to, and directly affects, only one of the destination nodes 708*a*, is transmitted by multicasting the communication to all of the nodes associated with the RF receptacle 304 in step 7704. I.e., the communication is transmitted by the RF receptacle 304 through all of the communication pathways, 702*a* and 702*b*, that the RF receptacle is associated with thereby transmitting the communication to the slave nodes, 104*a* and 104*b*, and the destination nodes, 708*a* and 708*b*. The communication is then single-casted to only the nodes directly affected by the communication in step 6406. I.e., the communication is only transmitted by the RF receptacle 304 through the communication pathway 702*a* thereby transmitting the communication to the slave node 104*a* and the destination node 708*a*. In this manner, the communication of the information to the affected nodes in the system 100 is assured by performing a multi-cast prior to a single-cast.

Figure 78:
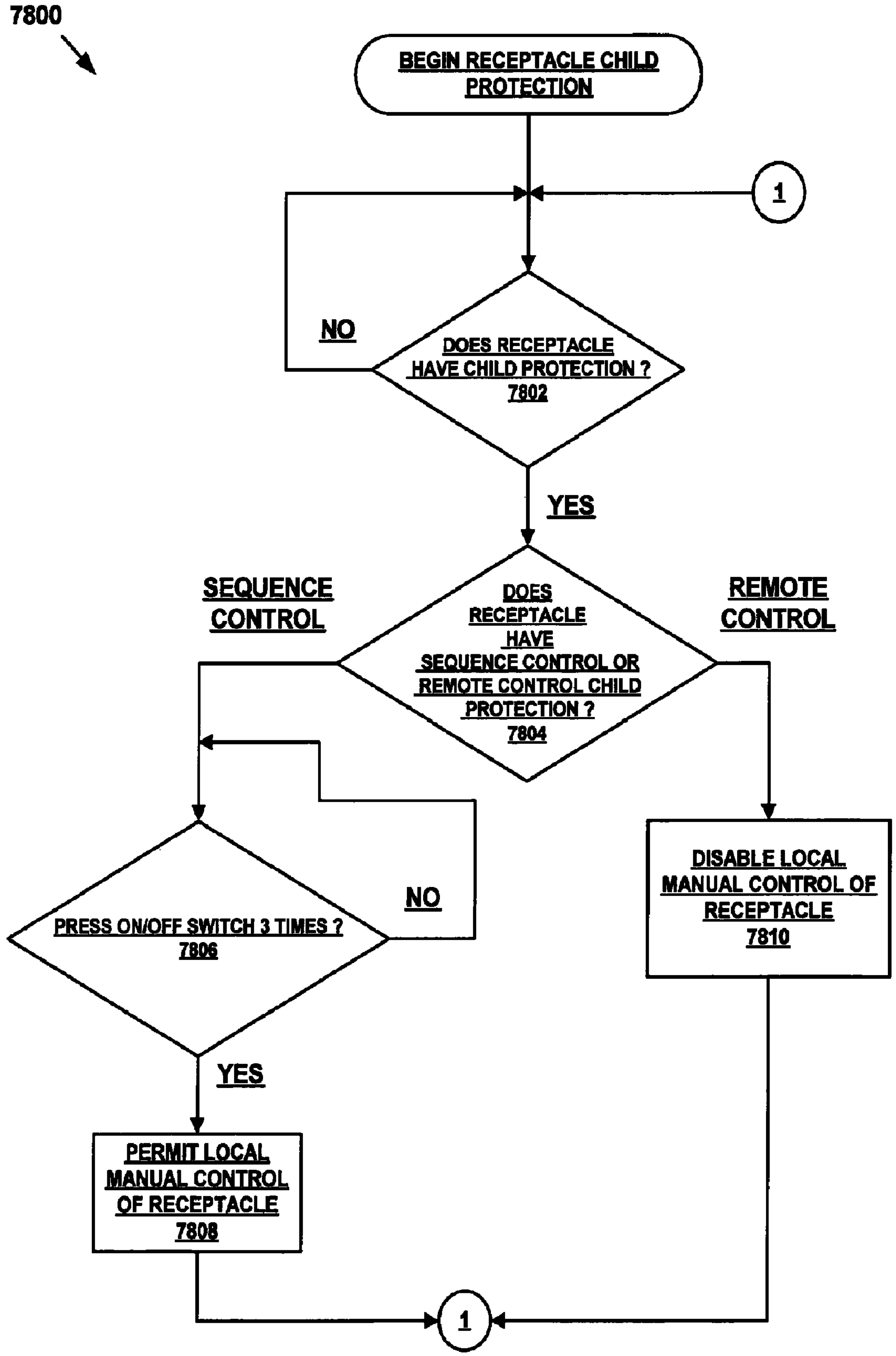
FIG. 78 is a flow chart illustration of an exemplary embodiment of a method of child protection for the RF receptacle.

Referring to FIG. 78, in an exemplary embodiment, during operation of the RF receptacle 304, the RF receptacle implements a method of child protection 7800 in which it is first determined if the RF receptacle has active child protection functionality in step 7802. If the RF receptacle 304 has active child protection functionality, then it is then determined if the RF receptacle has sequence control or remote control child protection functionality in step 7804.

If the RF receptacle 304 has sequence control child protection functionality, then, in order to permit local manual operation of the switch, a user must depress the on/off switch 6910 three times in step 7806. If a user of the RF receptacle 304 depresses the on/off switch 6910 three times in step 7806, then local manual operation of the RF receptacle, using the on/off switch 6910, is permitted in step 7808.

Alternatively, if the RF receptacle 304 has remote control child protection functionality, then, local manual operation of the receptacle, using the on/off switch 6910, is not permitted. Consequently, if the RF receptacle 304 has remote control child protection functionality, then local manual operation of the receptacle, using the on/off switch 6910, is not permitted in step 7810. As a result, control of the RF receptacle 304 is provided by one or more of the master nodes 102 of the system 100.

Figure 79A:
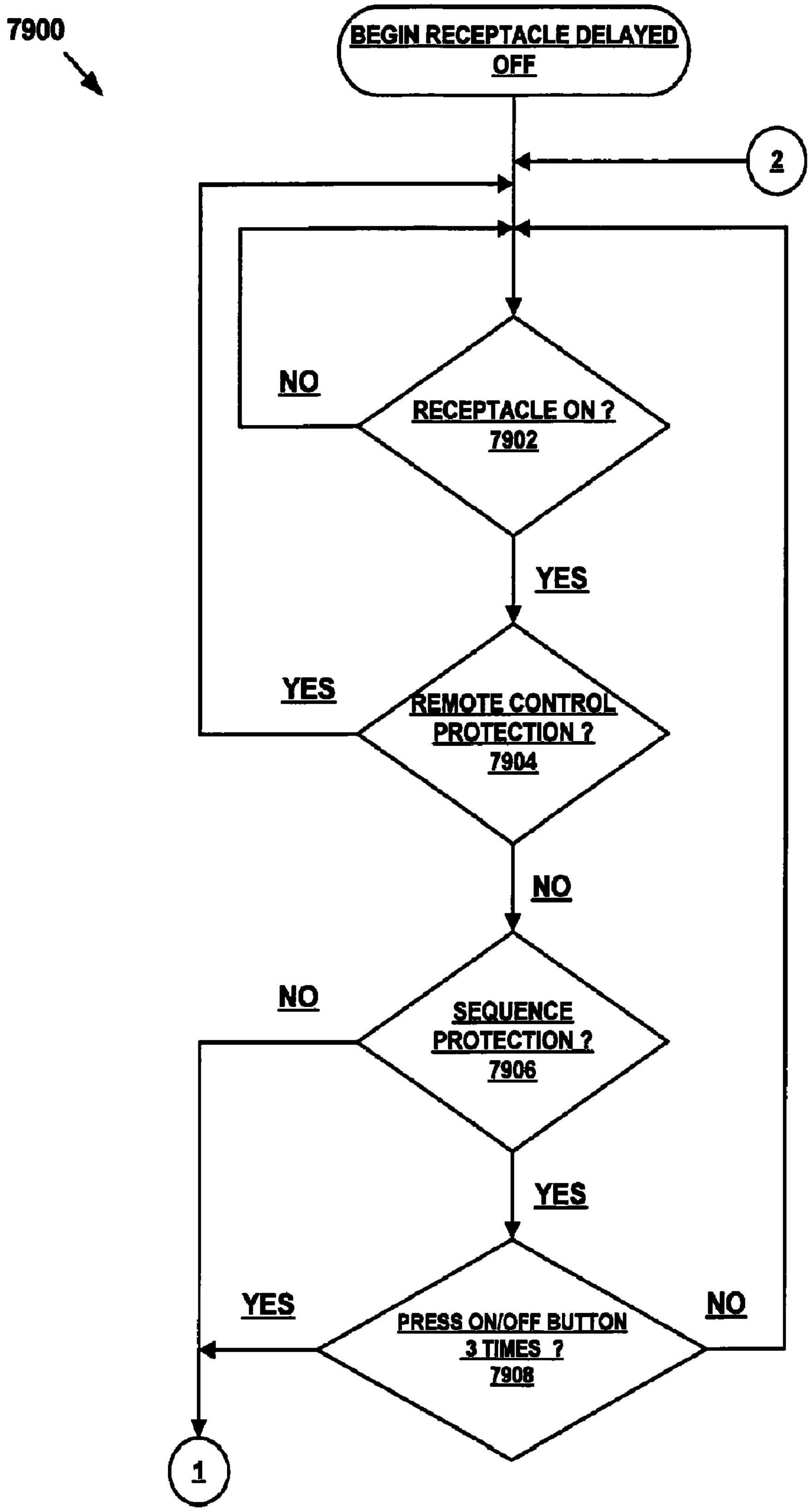
FIGS. 79*a* to 79*c* is a flow chart illustration of an exemplary embodiment of a method of delayed off for the RF receptacle.
Figure 79B:
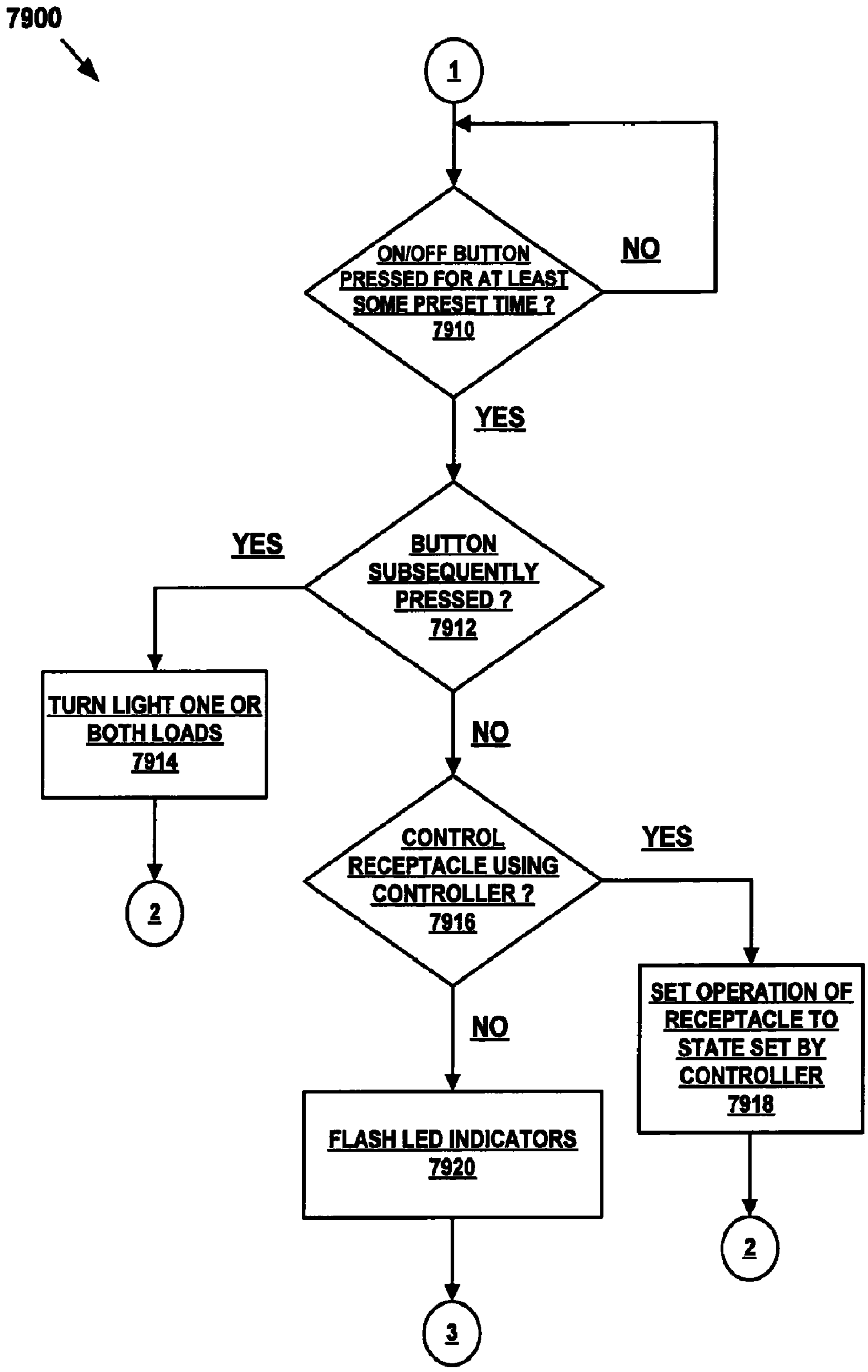
Figure 79C:
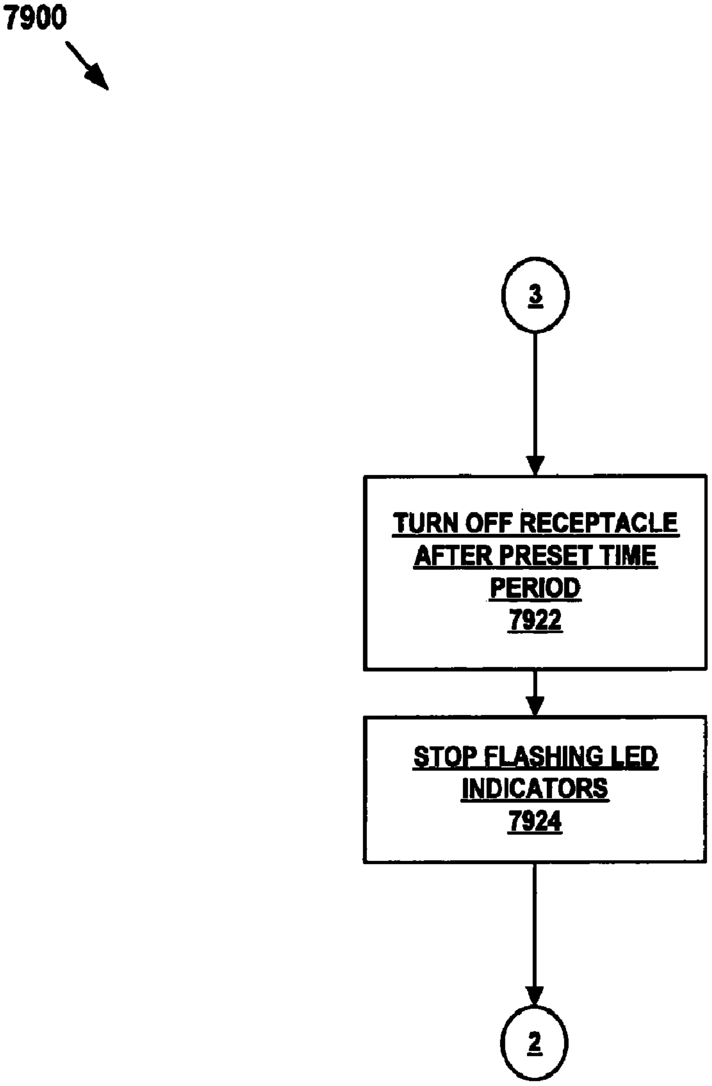

Referring to FIGS. 79*a* to 79*c*, in an exemplary embodiment, during operation of the RF receptacle 304, the RF receptacle implements a method of delayed off 7900 in which it is first determined if the on/off switch 6910 of the RF receptacle is in an on position in step 7902. If the on/off switch 6910 of the RF receptacle 304 is in an on position, then it is then determined if the RF receptacle has remote control protection in step 7904. If the RF receptacle 304 has remote control protection, then, local manual operation of the receptacle, using the on/off switch 6910, is not permitted.

If the RF receptacle 304 does not have remote control protection, then it is then determined if the RF receptacle has sequence control protection in step 7906. If the RF receptacle 304 has sequence control protection, then, if a user of the RF receptacle depresses the on/off switch 6910 of the RF receptacle three times in step 7908 or if the RF receptacle 304 does not have sequence control protection, then it is determined if the on/off switch was depressed for at least some predefined minimum time period in step 7910.

If the on/off switch 6910 of the RF receptacle 304 was depressed for at least some predefined minimum time, then it is determined if the on/off switch was also subsequently depressed in step 7912. If the on/off switch 6910 of the RF receptacle 304 was also subsequently depressed, then one or both of the loads, 6928 and 6930, that are operably coupled to one or more both of the plug receptacles, 6922 and 6924, the RF receptacle are decoupled from the power supply 6926 in step 7914. If the on/off switch 6910 of the RF receptacle 304 was not also subsequently depressed, then it is determined if the RF receptacle 304 will be controlled by one or more of the master nodes 102 in step 7916.

If the RF receptacle 304 will be controlled by one or more of the master nodes 102, then the operational state of the RF receptacle is controlled by one or more of the master nodes 102 in step 7918. Alternatively, if the RF receptacle 304 will not be controlled by one or more of the master nodes 102, then the LED indicator light 6916 of the RF receptacle are flashed in step 7920. The RF receptacle 304 is then operated to turn off on or more of the loads, 6928 and 6930, operably coupled to the RF receptacle after a predetermined time period in step 7922, and then the LED indicator light 6916 of the RF receptacle are turned off in step 7924.

Figure 80A:
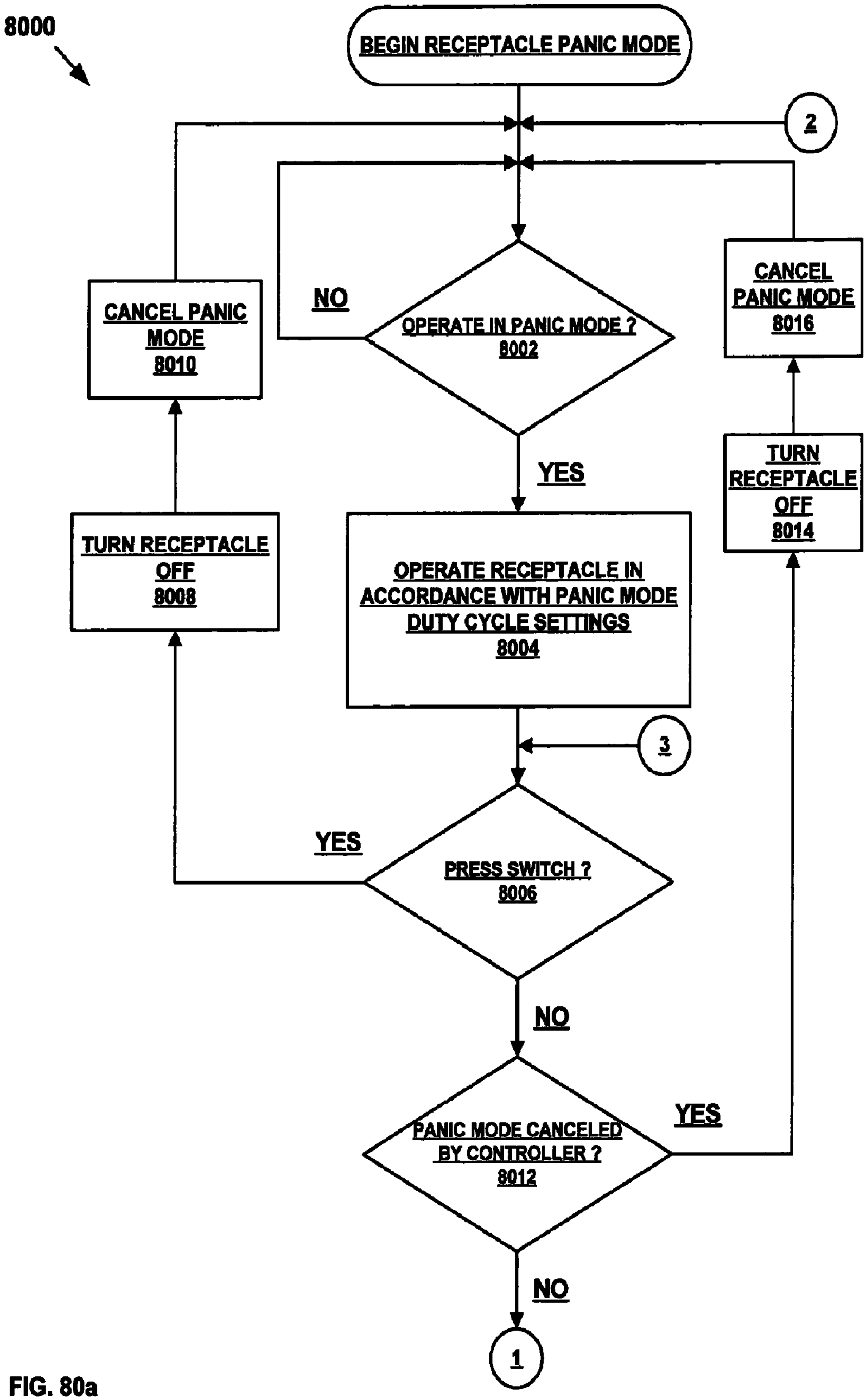
FIGS. 80*a* and 80*b* is a flow chart illustration of an exemplary embodiment of a method of panic mode for the RF receptacle.
Figure 80B:
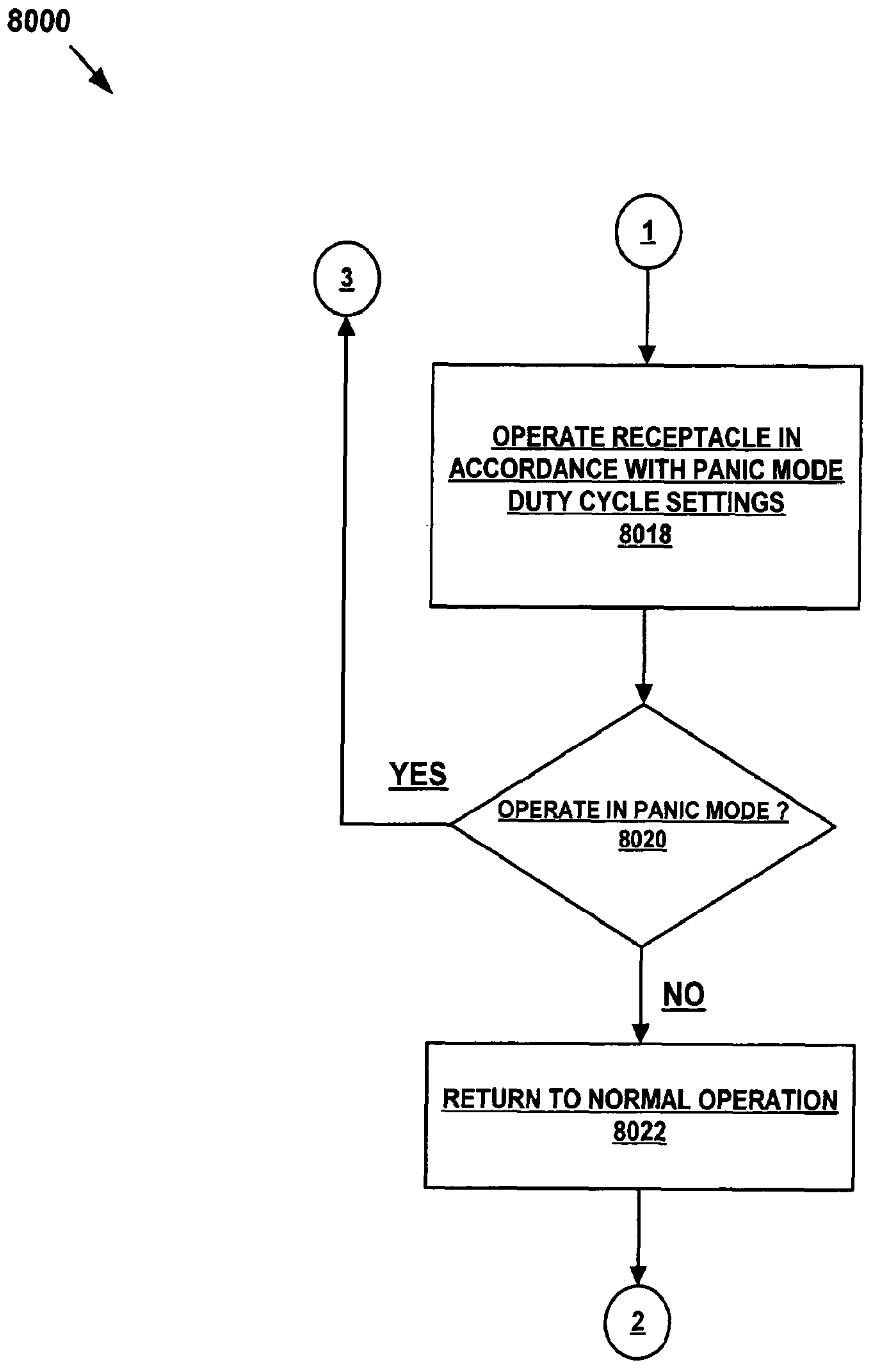

Referring to FIGS. 80*a* to 80*b*, in an exemplary embodiment, during operation of the RF receptacle 304, the RF receptacle implements a method of panic mode operation method 8000 in which it is first determined if a panic mode operation has been selected by a user of the system 100 in step 8002. In an exemplary embodiment, a panic mode operation may be selected by a user of the system 100 by operating one or more of the master nodes 102 of the system.

If a panic mode operation has been selected by a user of the system 100, then the RF receptacle 304 is operated in accordance with the operating parameters assigned to the RF receptacle during a panic mode of operation as, for example, contained within the panic database 7308, in step 8004. If the on/off switch 6910 of the RF receptacle 304 is then depressed in step 8006, then the RF receptacle is operated to decouple one or both of the loads, 6928 and 6930, from the power supply 6926 in step 8008. The panic mode of operation is then canceled in step 8010.

Alternatively, if the on/off switch 6910 of the RF receptacle 304 is not then depressed in step 8006, then, if the panic mode of operation is canceled by a master node 102 of the system in step 8012, then the RF receptacle is operated to decouple one or both of the loads, 6928 and 6930, from the power supply 6926 in step 8014. The panic mode of operation is then canceled in step 8016.

Alternatively, if the panic mode of operation is not canceled by a master node 102 of the system in step 8012, then the RF receptacle 304 is operated in accordance with the panic mode duty cycle settings for the RF receptacle contained within, for example, the panic database 7308, in step 8018. In an exemplary embodiment, the panic mode duty cycle settings define an amount of time to couple one or both of the loads, 6928 and 6930, to the power supply 6926 and an amount of time to decouple one or both of the loads from the power supply. For example, if the load 6928 is a light, operation of the RF receptacle 304 in a panic mode of operation will turn the light on and off in accordance with the panic mode duty cycle settings for the RF receptacle. If a panic mode of operation is canceled by a user of the system 100 in step 8020, then the operation of the RF receptacle 304 will return to normal in step 8022.

Figure 81:
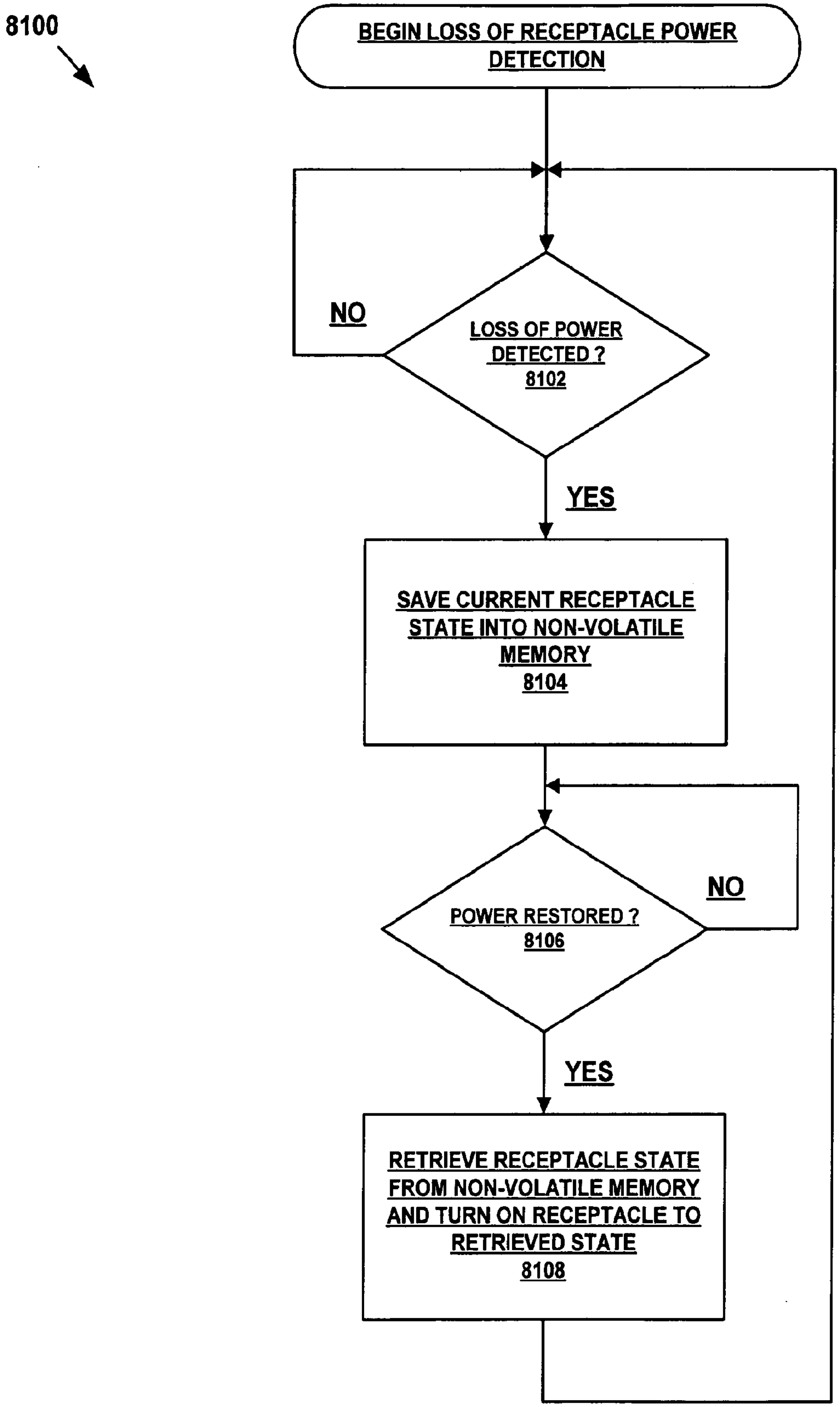
FIG. 81 is a flow chart illustration of an exemplary embodiment of a method of loss of power detection for the RF receptacle.

Referring to FIG. 81, in an exemplary embodiment, during operation of the RF receptacle 304, the RF receptacle implements a method of loss of power detection method 8100 in which it is first determined if a loss of power has occurred, for example, by monitoring the power supply 6926 in step 8102. If a loss of power is detected in step 8102, then the current operational state of the RF receptacle 304 is stored in the RF receptacle operational state database 7310 within the non-volatile memory 6906 of the RF receptacle in step 8104. It is then determined if power has been restored to the RF receptacle 304, for example, by monitoring the power supply 6926 in step 8106. If power has been restored to the RF receptacle 304, then the current operational state of the RF receptacle 304 is retrieved from the RF receptacle operational state database 7310 within the non-volatile memory 6906, and the operational state of the RF receptacle is restored to the operational state defined within the RF receptacle operational state database 7310 in step 8108.

In an exemplary embodiment, the design, operation and functionality of the on/off switch 6910, the install button 6912, the uninstall button 6914, and the associate button 6918 may be combined into a single push button.

Figure 82:
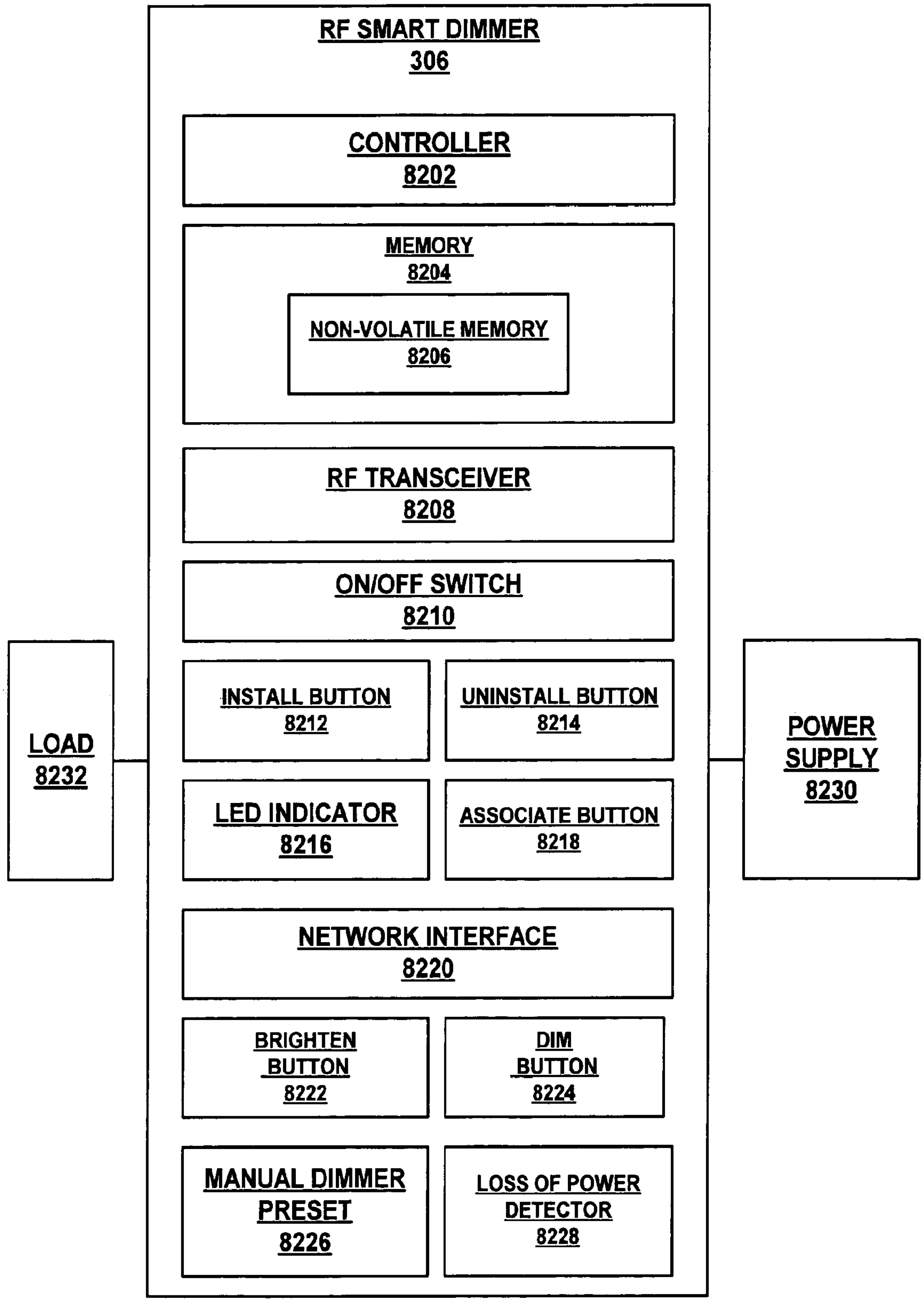
FIG. 82 is a schematic illustration of an exemplary embodiment of an RF smart dimmer for the system.
Figure 82A:
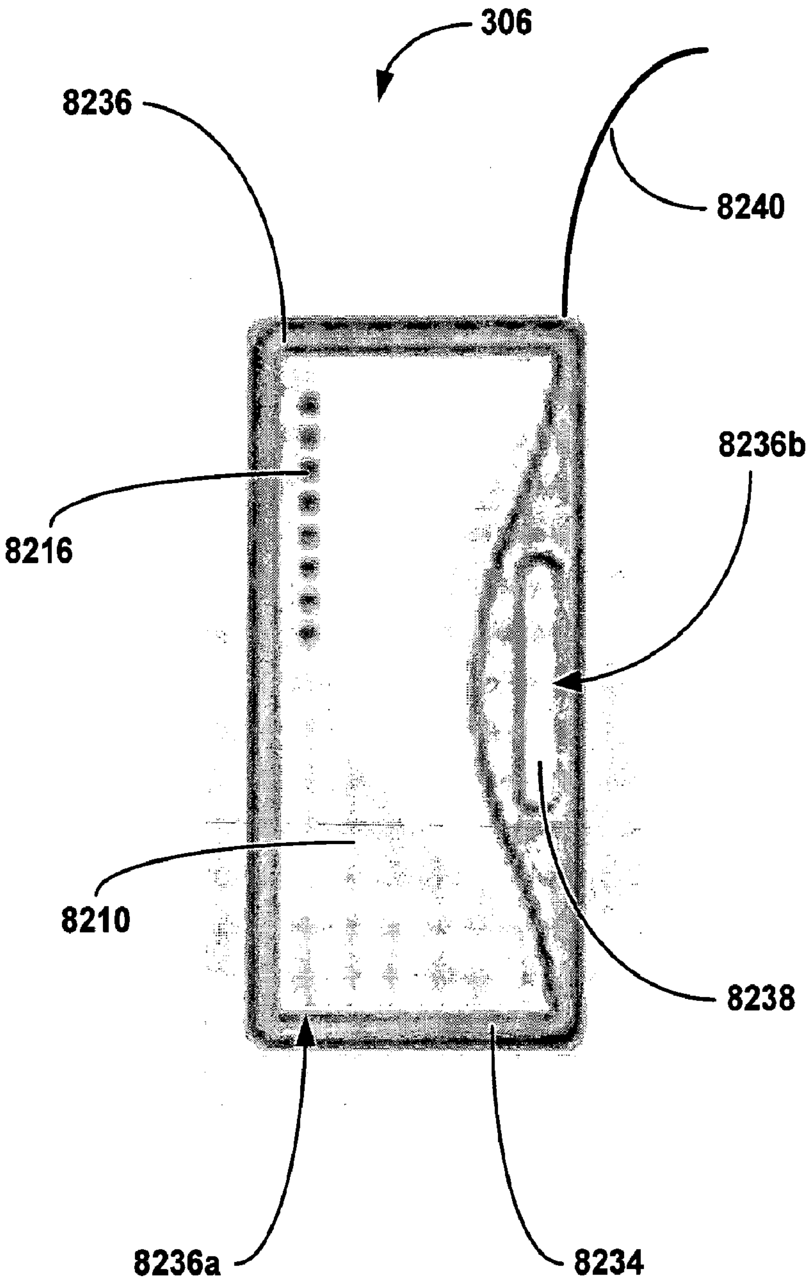
FIG. 82*a* is a perspective illustration of an exemplary embodiment of the RF smart dimmer.

Referring now to FIG. 82, an exemplary embodiment of an RF smart dimmer 306 includes a controller 8202 that is operably coupled to: a memory 8204, including a non-volatile memory 8206, an RF transceiver 8208, a light switch touch pad 8210, an install button 8212, an uninstall button 8214, an LED indicator light 8216, an associate button 8218, a network interface 8220, a brighten button 8222, a dimmer button 8224, a manual dimmer preset button 8226, and a loss of power detector 8228. In an exemplary embodiment, a conventional power supply 8230 is operably coupled to the RF smart dimmer 306 for powering the operation of the RF smart dimmer, and the RF smart dimmer controllably couples and decouples a load 8232 to and from the power supply.

In an exemplary embodiment, the controller 8202 is adapted to monitor and control the operation of the memory 8204, including a non-volatile memory 8206, the RF transceiver 8208, the light switch touch pad 8210, the install button 8212, the uninstall button 8214, the LED indicator light 8216, the associate button 8218, the network interface 8220, the brighten button 8222, the dimmer button 8224, the manual dimmer preset button 8226, and the loss of power detector 8228. In an exemplary embodiment, the controller 8202 includes one or more of the following: a conventional programmable general purpose controller, an application specific integrated circuit (ASIC), or other conventional controller devices. In an exemplary embodiment, the controller 8202 includes a model ZW0201 controller, commercially available from Zensys A/S.

Figure 83:
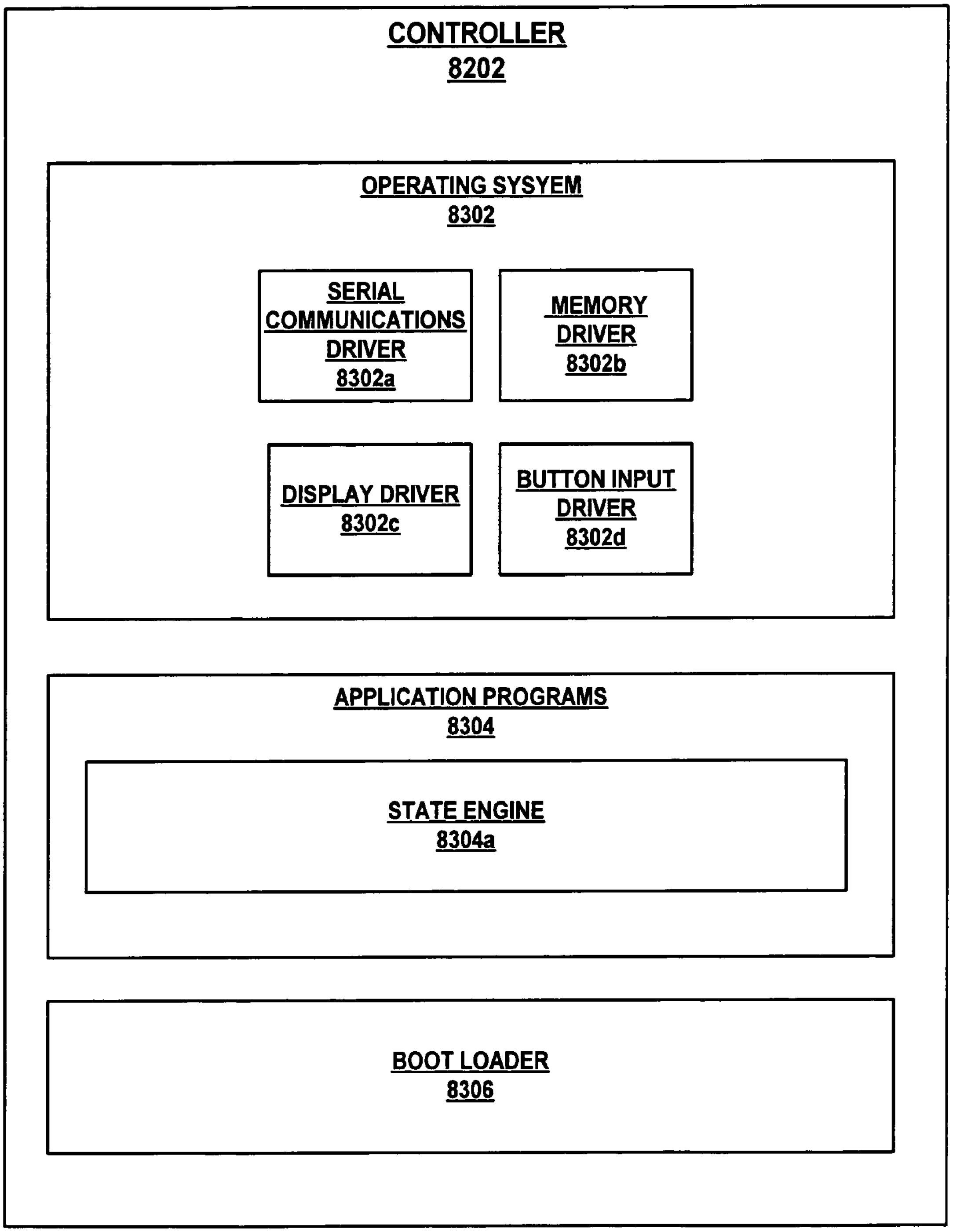
FIG. 83 is a schematic illustration of an exemplary embodiment of the controller of the RF smart dimmer.

Referring now to FIG. 83, in an exemplary embodiment, the controller 8202 includes an operating system 8302, application programs 8304, and a boot loader 8306. In an exemplary embodiment, the operating system 8302 includes a serial communications driver **8302*a*, a memory driver 8302*b*, a display driver 8302*c*, and a button input driver 8302*d*. In an exemplary embodiment, the serial communications driver 8302*a* controls serial communications using the RF serial transceiver 8208, the memory driver 8302*b* controls the memory 8204, including the non volatile memory 8206, the display driver 8302*c* controls the LED indicator light 8216, and the button input driver 8302*d* debounces button inputs provided by a user using one or more of: the light switch touchpad 8210, the install button 8212, the uninstall button 8214, the associate button 8218, the brighten button 8222, the dimmer button 8224, and the manual dimmer preset button 8226. In an exemplary embodiment, the serial communications driver 8302*a*** includes a Z-Wave™ serial API driver that implements a Z-Wave™ serial API protocol. The Z-Wave™ serial API driver that implements a Z-Wave™ serial API protocol are both commercially available from Zensys A/S.

In an exemplary embodiment, the application programs 8304 include a state engine **8304*a*. In an exemplary embodiment, the state engine 8304*a* permits a user of one or more of the master nodes 102 to configure, control and monitor the operation of the RF smart dimmer 306**.

Figure 84:
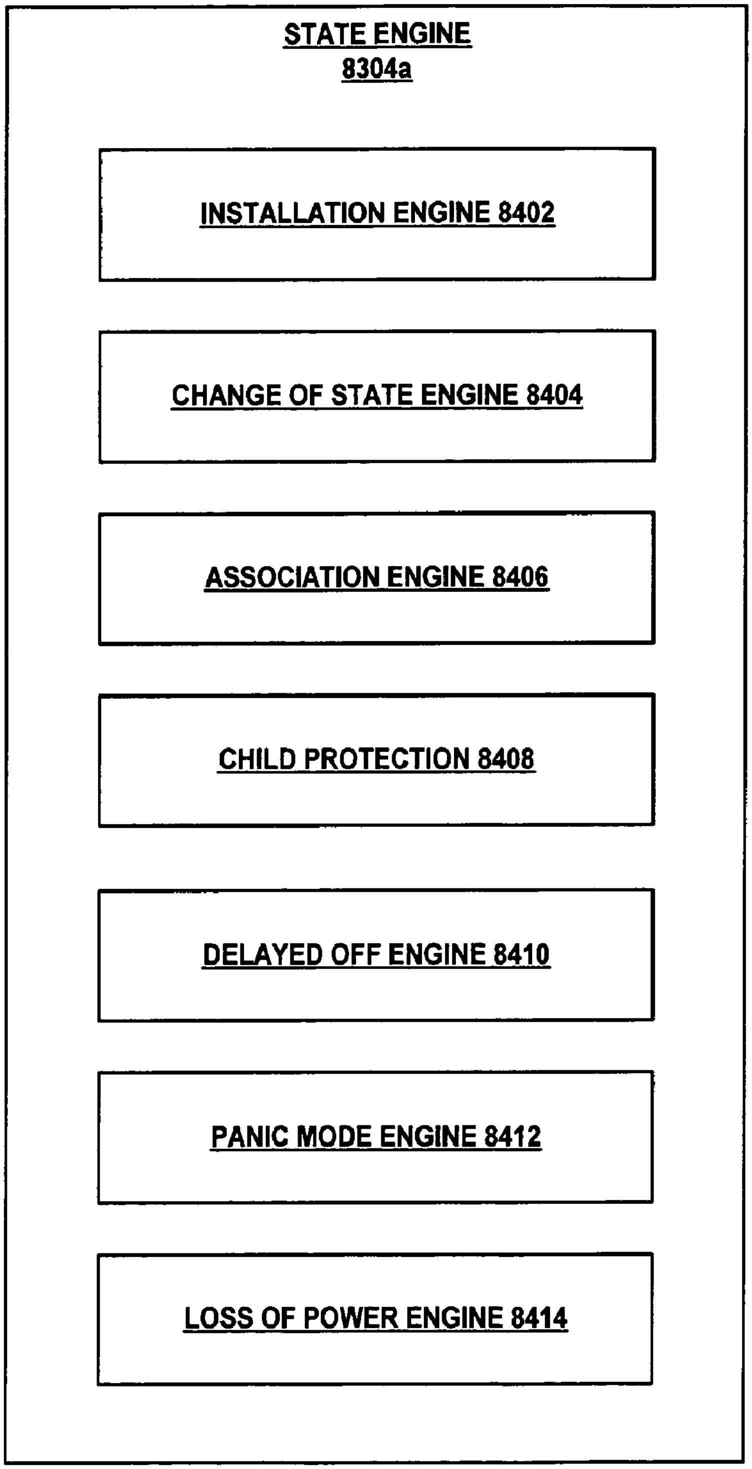
FIG. 84 is a schematic illustration of an exemplary embodiment of the state engine of the controller of the RF smart dimmer.

Referring now to FIG. 84, in an exemplary embodiment, the state engine **8304*a* includes an installation engine 8402, a change of state engine 8404, an association engine 8406, a child protection engine 8408, a delayed off engine 8410, a panic mode engine 8412, and a loss of power detection engine 8414**.

In an exemplary embodiment, the installation engine 8402 monitors the operating state of the RF smart dimmer 306 and provides an indication to a user of the system 100 as to whether or not the RF smart dimmer has been installed in the system. In this manner, the installation engine 8402 facilitates the installation of the RF smart dimmer 306 into the system 100.

In an exemplary embodiment, the change of state engine 8404 monitors the operating state of the RF smart dimmer 306 and, upon a change in operating state, transmits information to one or more of the master nodes 102 regarding the configuration of the RF smart dimmer.

In an exemplary embodiment, the association engine 8406 is adapted to monitor and control the operation of the RF smart dimmer 306 when the RF smart dimmer is associated with one or more communication pathway 702.

In an exemplary embodiment, the child protection engine 8408 is adapted to monitor and control the operation of the RF smart dimmer 306 when the RF smart dimmer is operated in a child protection mode of operation.

In an exemplary embodiment, the delayed off engine 8410 is adapted to monitor and control the operation of the RF smart dimmer 306 when the RF smart dimmer is operated in a delayed off mode of operation.

In an exemplary embodiment, the panic mode engine 8412 is adapted to monitor and control the operation of the RF smart dimmer 306 when the RF smart dimmer is operated in a panic mode of operation.

In an exemplary embodiment, the loss of power detection engine 8414 is adapted to monitor the operating state of the RF smart dimmer 306 and, upon the loss of power, save the operating state of the RF smart dimmer into the non volatile memory 8206. Upon the resumption of power to the RF smart dimmer 306, the loss of power detection engine 8414 then retrieves the stored operating state of the RF smart dimmer 306 from the non volatile memory 8206 and restores the operating state of the RF smart dimmer.

Figure 85:
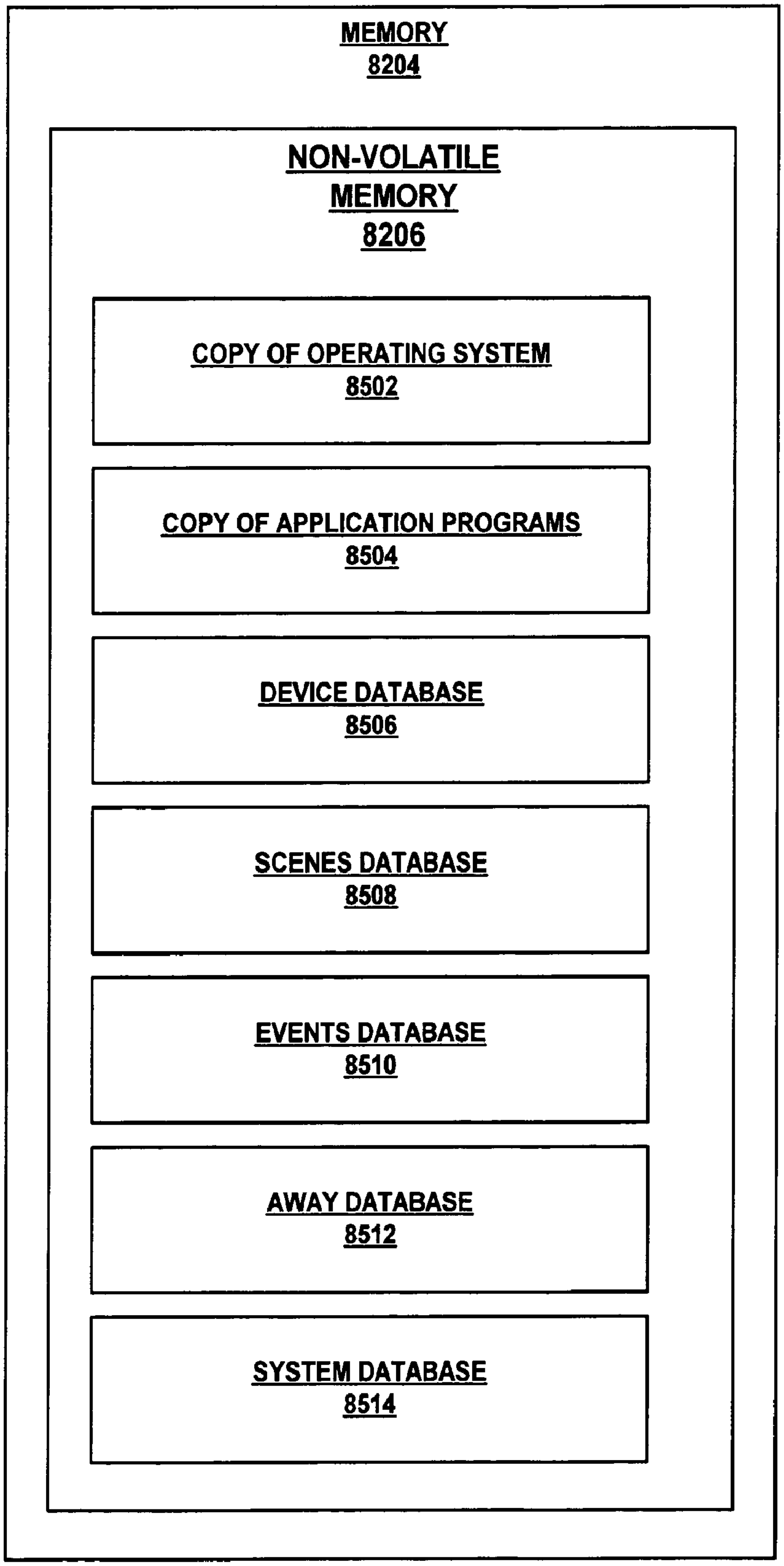
FIG. 85 is a schematic illustration of an exemplary embodiment of the memory of the RF smart dimmer.

In an exemplary embodiment, the memory 8204, including the non volatile memory 8206, is operably coupled to and controlled by the controller 8202. In an exemplary embodiment, as illustrated in FIG. 85, the memory 8204, including the non volatile memory 8206, includes a copy of the operating system 8502, a copy of the application programs 8504, a device database 8506, a scenes database 8508, an events database 8510, an away database 8512, and a system database 8514. In an exemplary embodiment, the memory 8204 includes a model 24LC256 non volatile memory, commercially available from Microchip.

smart dimmer when panic is enabled. In an exemplary embodiment, the operating state database 7312 for the RF smart dimmer 306 includes information representative of the operating state of the RF smart dimmer.

In an exemplary embodiment, the device database 8506 includes one or more of the following information:

| Parameter | Offset | Size | Default Value | Description |
|---|---|---|---|---|
| Child Protection Mode | 1 | 1 | 0 | This is the level of child protection for the RF smart dimmer 306. The default value of 0 corresponds to no child protection for the RF smart dimmer. |
| Off Delay | 2 | 1 | 10 | This is the number of seconds that the RF smart dimmer 306 will flash the LED indicator 8216 before switching off the load 8232. |
| Panic On Time | 3 | 1 | 1 | This is the number of seconds the load 8232 will be on while in panic mode. |
| Panic Off Time | 4 | 1 | 1 | This is the number of seconds the load 8232 will be off while in panic mode. |
| Load Level | 5 | 1 | 0 | This is the state of the load 8232. The default value is for the load 8232 to be OFF. |
| All Switch State | 6 | 1 | 0 | This is the operational status of the RF smart dimmer 306 with regard to inclusion in the all switch group. The default is for the RF smart dimmer 306 to be excluded from both all ON and all OFF. |
| Location | 7 | 25 | "Smart Dimmer" | This is the location name. There is a maximum of 24 characters plus a null terminator. |
| Power Loss Preset | 32 | 1 | 6 | This is the number of zero crossings not detected that will trigger the operational state of the load 8232 level to be saved to non volatile memory 8206. |
| Level Boot State | 33 | 1 | LAST VALUE | This is the operational state the load 8232 takes on boot. |
| Panic Mode Enable | 34 | 1 | Enabled | This controls whether Panic Mode is enabled or disabled. |
| Associated Nodes | 35 | 5 | 0 | The node IDs of associated nodes. |
| Preset Level | 40 | 1 | 4 | The preset level of the load 8232. |
| Ramp Time | 41 | 1 | 3 | The number of seconds to ramp the load 8232 from 0% to 100%. |

Figure 86:
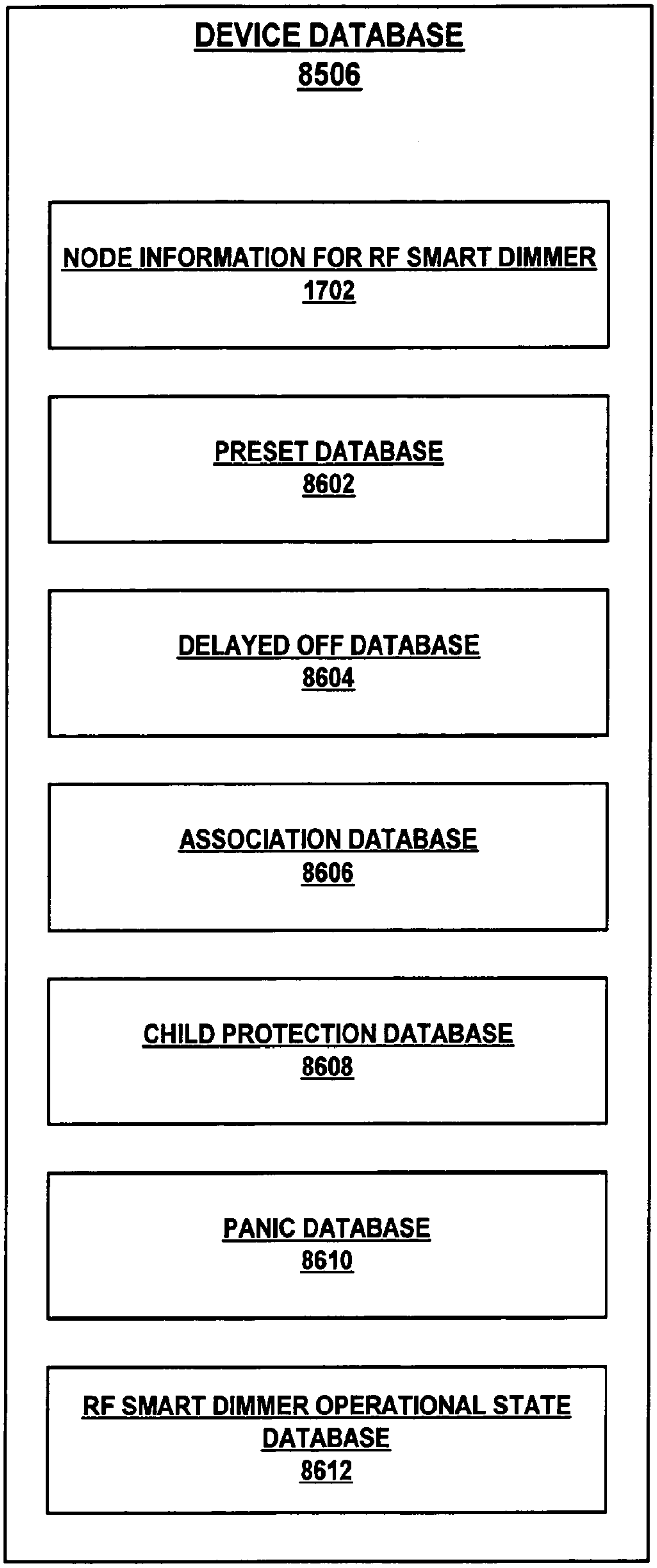
FIG. 86 is a schematic illustration of an exemplary embodiment of the device database of the memory of the RF smart dimmer.

In an exemplary embodiment, the device database 8506 includes information that is specific to the RF smart dimmer 306. In an exemplary embodiment, as illustrated in FIG. 86, the device database 7206 includes the node information frame 1702 for the RF smart dimmer 306, a preset database 7302 for the RF smart dimmer, a delayed off database 7304 for the RF smart dimmer, an association database 7306 for the RF smart dimmer, a child protection database 7308 for the RF smart dimmer, a panic database 7310 for the RF smart dimmer, and an operating state database 7312 for the RF smart dimmer. In an exemplary embodiment, the preset database 7302 includes information regarding the preset levels of the RF smart dimmer 306. In an exemplary embodiment, the delayed off database 7304 for the RF smart dimmer 306 includes information regarding the operating characteristics of the RF smart dimmer when delayed off is enabled. In an exemplary embodiment, the association database 7306 for the RF smart dimmer 306 includes information regarding the communication pathways 702 associated with the RF smart dimmer. In an exemplary embodiment, the child protection database 7308 for the RF smart dimmer 306 includes information regarding the operating characteristics of the RF smart dimmer when child protection is enabled. In an exemplary embodiment, the panic database 7310 for the RF smart dimmer 306 includes information regarding the operating characteristics of the RF In an exemplary embodiment, the scenes database 8508 includes information regarding the scenes 802 that include the RF smart dimmer 306. In an exemplary embodiment, the events database 8510 includes information regarding the events 1002 that include the RF smart dimmer 306. In an exemplary embodiment, the away database 8512 includes information regarding the away group 1402 that includes the RF smart dimmer 306. In an exemplary embodiment, the system database 8514 includes system information that includes the RF smart dimmer 306.

In an exemplary embodiment, the RF transceiver 8208 is operably coupled to and controlled and monitored by the controller 8202. In an exemplary embodiment, the RF transceiver 8208 transmits and receives RF communications to and from other master and slave nodes, 102 and 104, respectively. In an exemplary embodiment, the RF transceiver 8208 may, for example, include one or more of the following: a conventional RF transceiver, and/or the model ZW0201 RF transceiver commercially available from Zensys A/S.

In an exemplary embodiment, the light switch touch pad 8210 is a conventional light switch touch pad and is operably coupled to and controlled and monitored by the controller 8202. In an exemplary embodiment, the light switch touch pad 8210 permits an operator of the RF switch 302, in combination with the system 100, to select the desired mode of operation of the load 8232.

In an exemplary embodiment, the install button 8212 is operably coupled to and controlled and monitored by the controller 8202. In an exemplary embodiment, the install button 8212 permits an operator of the RF smart dimmer 306, in combination with the system 100, to install the RF smart dimmer into the system.

In an exemplary embodiment, the uninstall button 8214 is operably coupled to and controlled and monitored by the controller 8202. In an exemplary embodiment, the uninstall button 8214 permits an operator of the RF smart dimmer 306, in combination with the system 100, to uninstall the RF smart dimmer from the system.

In an exemplary embodiment, the LED indicator light 8216 is operably coupled to and controlled and monitored by the controller 8202.

In an exemplary embodiment, the associate button 8218 is operably coupled to and controlled and monitored by the controller 8202. In an exemplary embodiment, the associate button 8218 permits an operator of the RF smart dimmer 306, in combination with the system 100, to associate the RF smart dimmer with communication pathways 702 in the system.

In an exemplary embodiment, the network interface 8220 is operably coupled to and controlled and monitored by the controller 8202. In an exemplary embodiment, the network interface 8220 permits RF smart dimmer 306, in combination with the system 100, to be networked with other device within and outside of the system.

In an exemplary embodiment, the brighten button 8222 is operably coupled to and controlled and monitored by the controller 8202. In an exemplary embodiment, the brighten button 8222 permits an operator of the RF smart dimmer 306, in combination with the system 100, to increase the level of current provided by the power supply 8230 to the load 8232.

In an exemplary embodiment, the dimming button 8224 is operably coupled to and controlled and monitored by the controller 8202. In an exemplary embodiment, the dimming button 8224 permits an operator of the RF smart dimmer 306, in combination with the system 100, to decrease the level of current provided by the power supply 8230 to the load 8232.

In an exemplary embodiment, the manual dimmer preset button 8226 is operably coupled to and controlled and monitored by the controller 8202. In an exemplary embodiment, the manual dimmer preset button 8226 permits an operator of the RF smart dimmer 306, in combination with the system 100, to select one or more preset levels of current provided by the power supply 8230 to the load 8232.

In an exemplary embodiment, the loss of power detector 8228 is operably coupled to and controlled and monitored by the controller 8202. In an exemplary embodiment, the loss of power detector 8228 permits an operator of the RF smart dimmer 306, in combination with the system 100, to detect a loss of electrical power from the power supply 8230.

Figure 87:
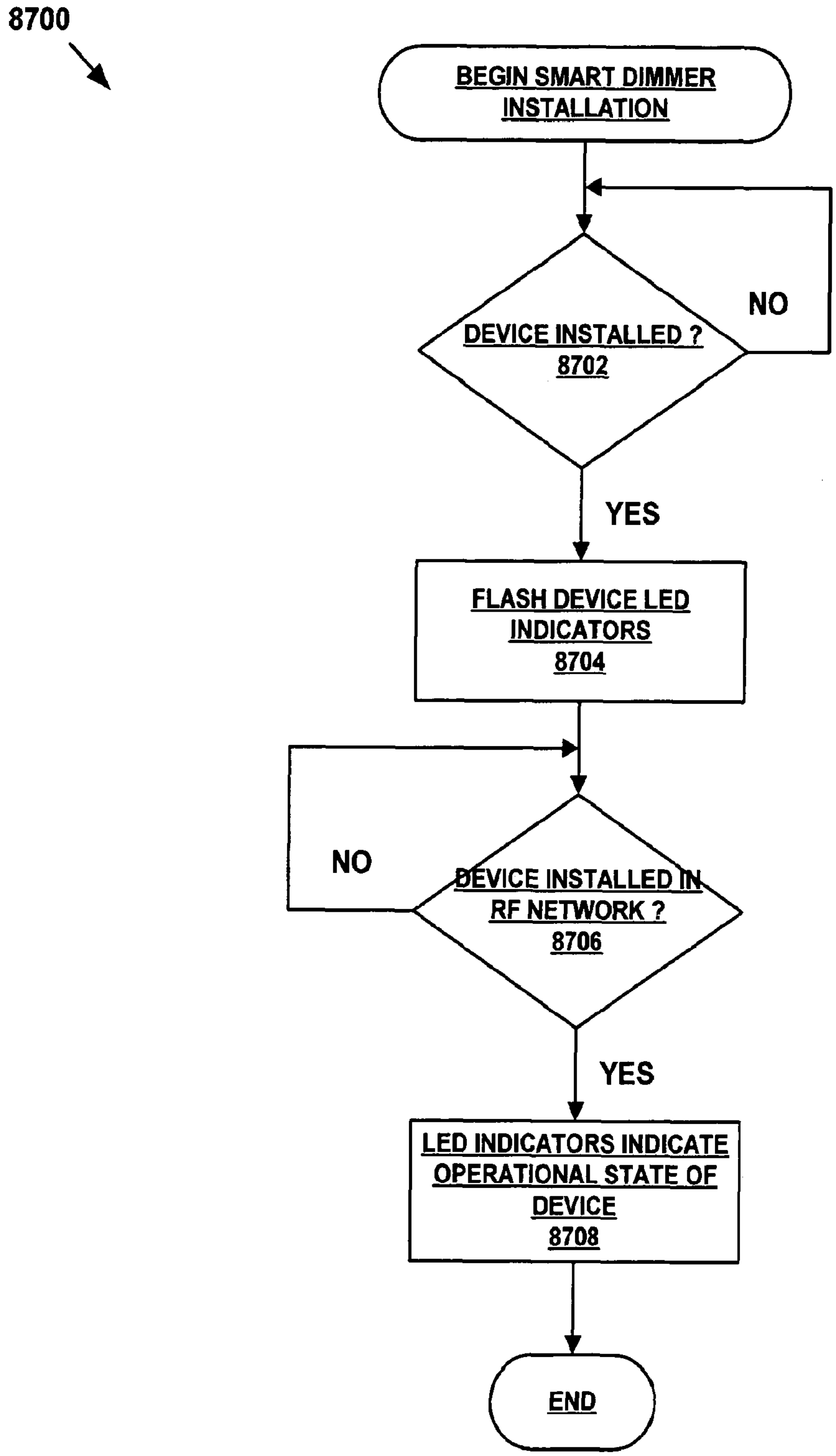
FIG. 87 is a flow chart illustration of an exemplary embodiment of a method of installation for the RF smart dimmer.

Referring to FIG. 87, in an exemplary embodiment, during operation of the RF smart dimmer 306, the RF smart dimmer implements a method of installation 8700 in which, if the RF smart dimmer has been operably coupled to the power supply 8230, then the LED indicator lights 8216 are operated to indicate this operational state in steps 8702 and 8704. Then, if the RF smart dimmer 306 has been installed in the system 100, then the LED indicator lights 8216 are operated to indicate this operational state in steps 8706 and 8708. In an exemplary embodiment, the LED indicator lights 8216 flash on an off to indicate the operational state in steps 8702 and 8704, and the LED indicator lights 8216 are turned on to indicate the operational state in steps 8706 and 8708. In this manner, an operator of the system 100 is provided with a visual and highly effective indication of the operational state of the RF smart dimmer 306 that is local to the RF smart dimmer. This permits an installer of the RF smart dimmer 306, in a large house or commercial building, with an effective means of determining the operational state of the RF smart dimmer 306 that is both local to the RF smart dimmer and avoids the need to interrogate a master node 102 to determine the operational state.

Figure 88:
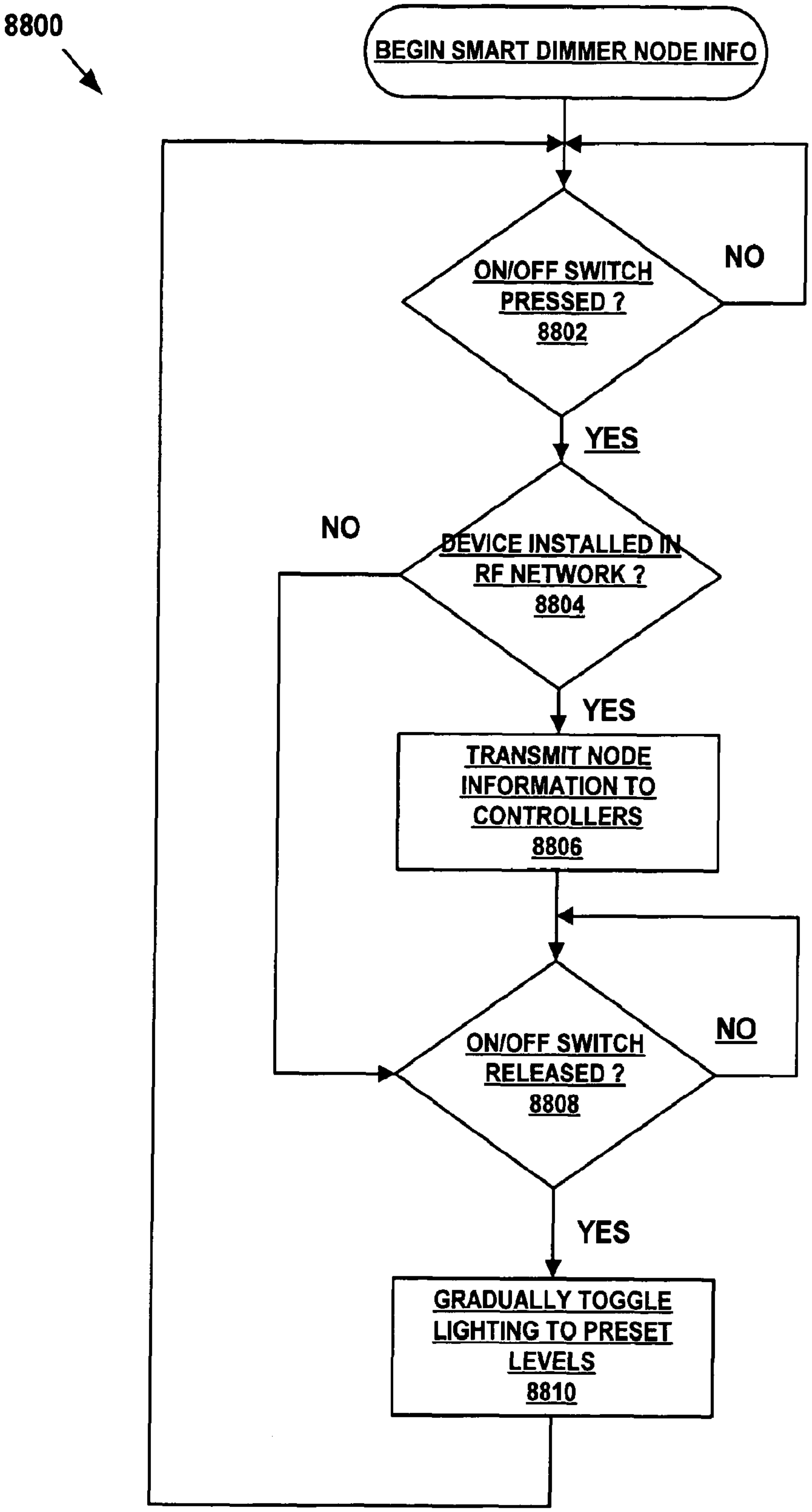
FIG. 88 is a flow chart illustration of an exemplary embodiment of a method of operating the RF smart dimmer.

Referring to FIG. 88, in an exemplary embodiment, during operation of the RF smart dimmer 306, the RF smart dimmer implements a method of operation 8800 in which it is determined if the on/off switch 8210 of the RF smart dimmer has been depressed in step 8802. If the on/off switch 8210 of the RF smart dimmer 306 has been depressed, then it is determined if the RF smart dimmer has been installed in the system 100 in step 8804. If the RF smart dimmer 306 has been installed in the system 100, then the node information frame 1702 for the RF smart dimmer is transmitted to one or more of the master nodes 102 of the system 100 using the RF transceiver 8208 in step 8806.

Alternatively, if the RF smart dimmer 306 has not been installed in the system 100, or after the node information frame 1702 for the RF smart dimmer is transmitted to one or more of the master nodes 102 of the system 100, it is determined if the on/off switch 8210 of the RF smart dimmer has been released in step 8808. If the on/off switch 8210 of the RF smart dimmer 306 has been released, then the RF smart dimmer operably gradually couples the power supply 8230 to the load 8232 in accordance with the preset levels in step 8810. For example, if the load 8232 is a light, in step 8810, the RF smart dimmer 306 gradually increases the lighting level of the light to the preset level.

Figure 89A:
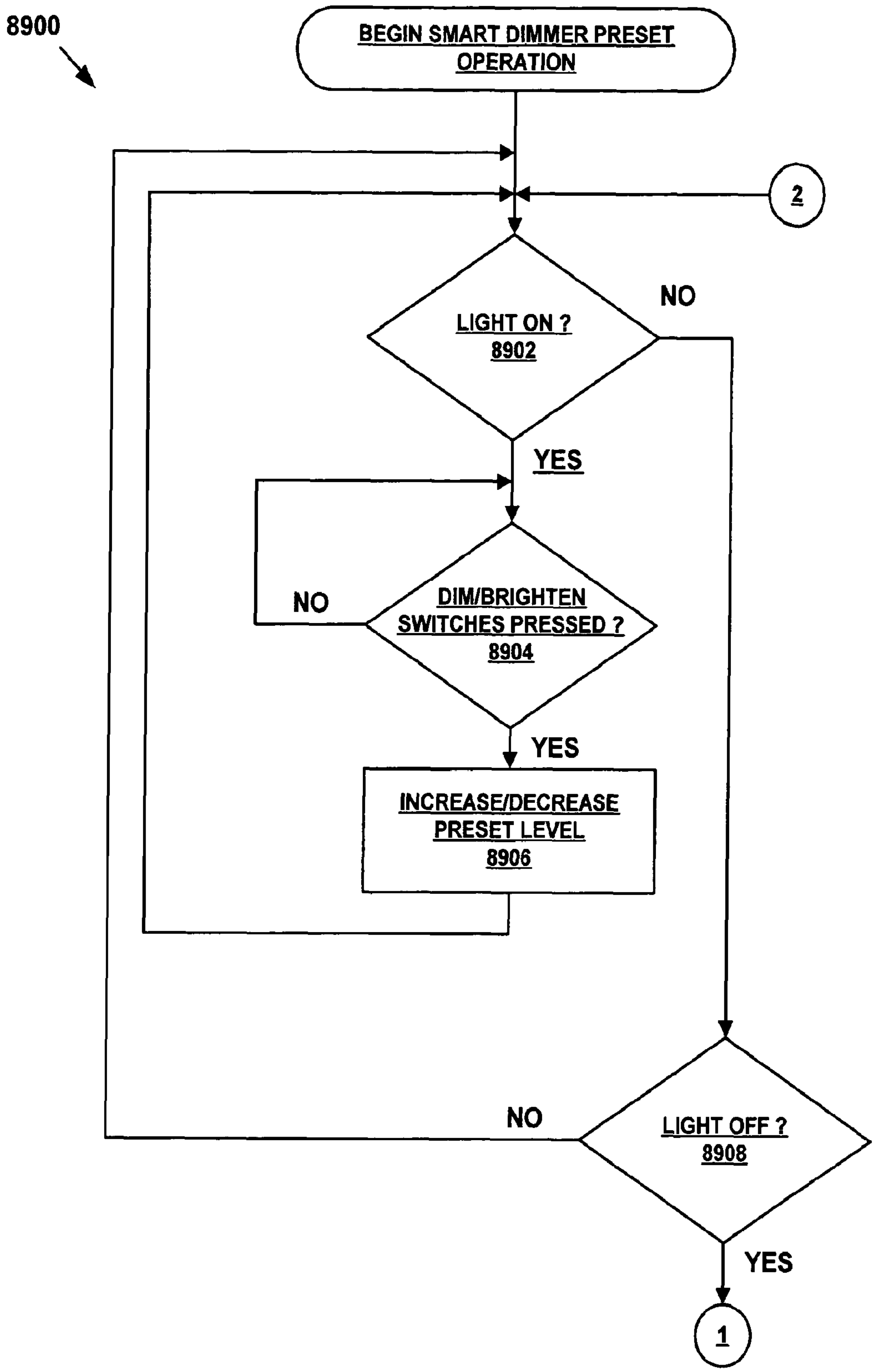
FIGS. 89*a*-89*b* is a flow chart illustration of an exemplary embodiment of a method of operating the RF smart dimmer.
Figure 89B:
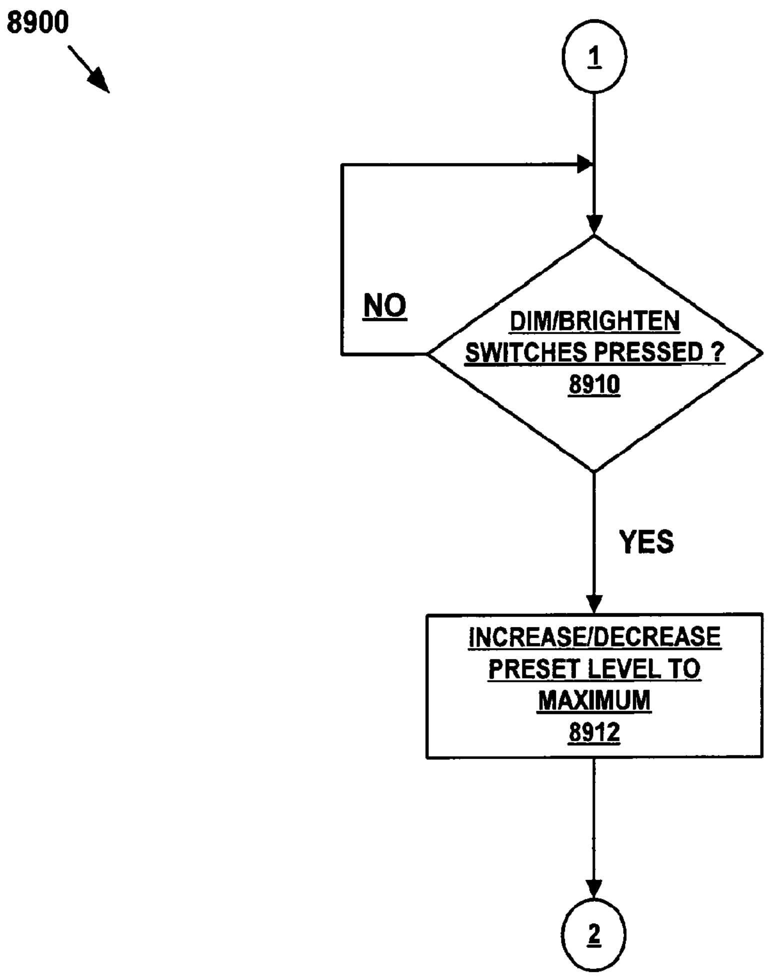

Referring to FIGS. 89*a* and 89*b*, in an exemplary embodiment, during operation of the RF smart dimmer 306, the RF smart dimmer implements a method of operation 8900 in which it is determined if the RF smart dimmer 306 is operably coupling the power supply 8230 to the load 8232 in step 8902. For example, if the load 8232 is a light, in step 8902, it is determined if the light is on. If the RF smart dimmer 306 is operably coupling the power supply 8230 to the load 8232, then it is determined if a user of the smart dimmer 306 has depressed the brighten or dimming buttons, 8222 or 8224, respectively, in step 8904. If a user of the RF smart dimmer 306 has depressed the brighten or dimming buttons, 8222 or 8224, respectively, then the RF smart dimmer increases or decreases the preset level of current supplied to the load 8232 by the power supply 8203 in step 8906. For example, in step 8906, if the load 8232 is a light, then, if the brighten button 8222 was depressed, the preset lighting level is increased. Alternatively, for example, in step 8906, if the load 8232 is a light, then, if the dimming button 8224 was depressed, the preset lighting level is decreased.

Alternatively, if the RF smart dimmer 306 is not operably coupling the power supply 8230 to the load 8232, then it is determined if a user of the smart dimmer 306 has depressed the brighten or dimming buttons, 8222 or 8224, respectively, in steps 8908 and 8910. If a user of the RF smart dimmer 306 has depressed the brighten or dimming buttons, 8222 or 8224, respectively, then the RF smart dimmer increases or decreases the preset level of current supplied to the load 8232 by the power supply 8203 to the maximum levels in step 8912. For example, in step 8912, if the load 8232 is a light, then, if the brighten button 8222 was depressed, the preset lighting level is increased to maximum possible level. Alternatively, for example, in step 8912, if the load 8232 is a light, then, if the dimming button 8224 was depressed, the preset lighting level is decreased to the minimum possible level.

Figure 90A:
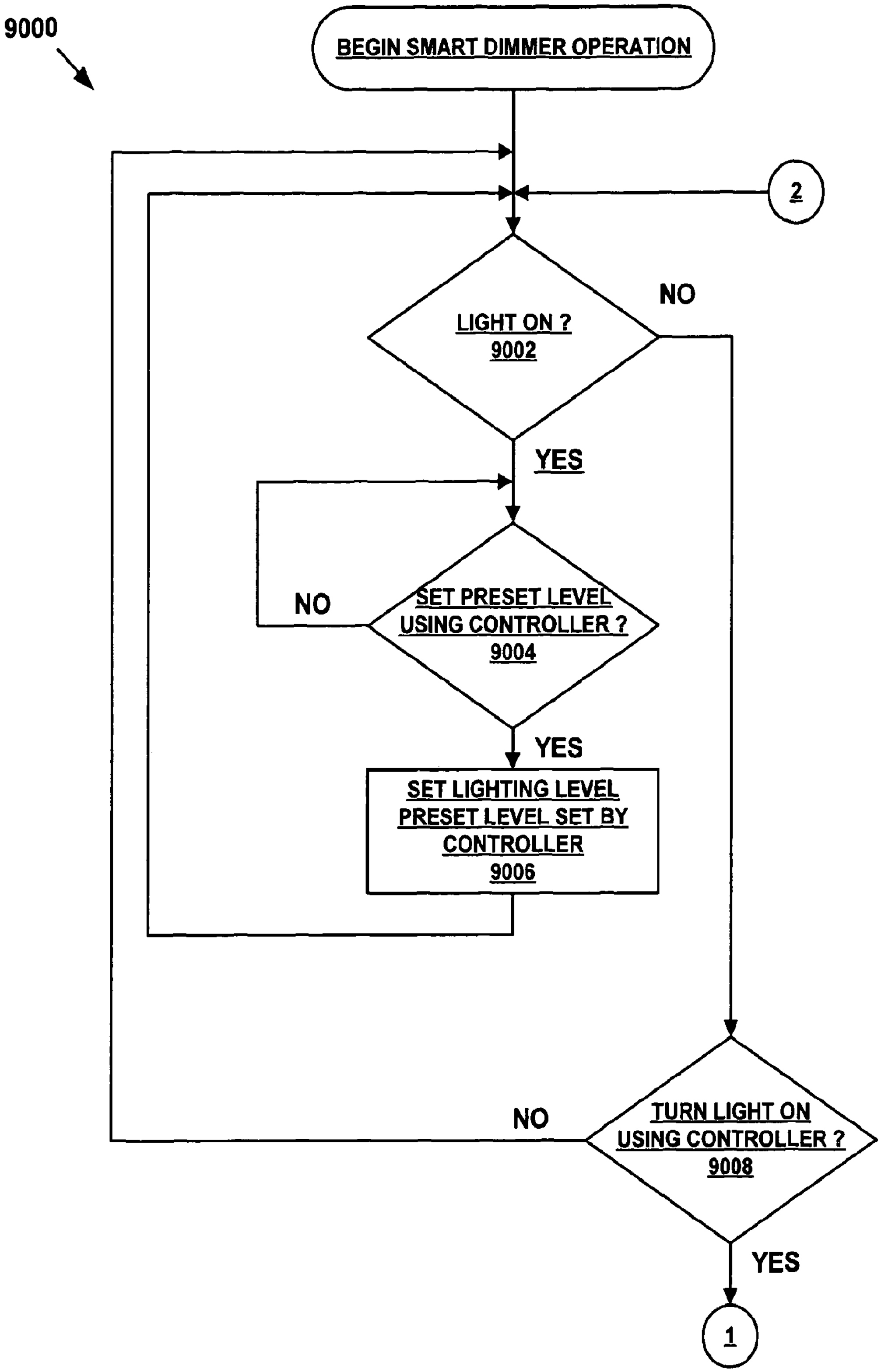
FIGS. 90*a* and 90*b* is a flow chart of an exemplary embodiment of a method of operating the RF smart dimmer.
Figure 90B:
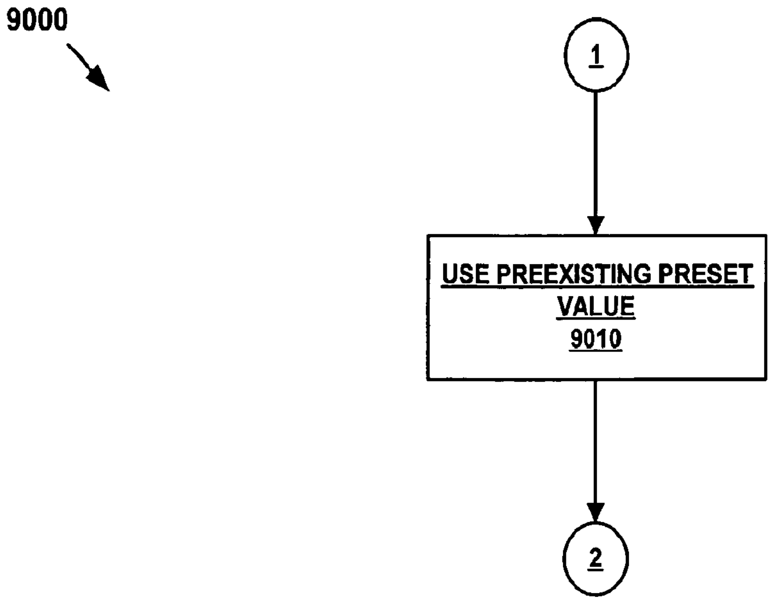

Referring to FIGS. 90*a* and 90*b*, in an exemplary embodiment, during operation of the RF smart dimmer 306, the RF smart dimmer implements a method of operation 9000 in which it is determined if the RF smart dimmer 306 is operably coupling the power supply 8230 to the load 8232 in step 9002. For example, if the load 8232 is a light, in step 8902, it is determined if the light is on. If the RF smart dimmer 306 is operably coupling the power supply 8230 to the load 8232, then it is determined if the preset levels for the RF smart dimmer were set by one or more of the master nodes 102 in step 9004. If the preset levels for the RF smart dimmer 306 were set by one or more of the master nodes 102, then level of current supplied by the power supply 8230 to the load 8232 is set to the preset level defined by the master nodes 102 in step 9006. For example, if the load 8232 is a light, then, in step 9006, the lighting level of the light is set to the preset lighting levels defined by the master nodes 102.

Alternatively, if the RF smart dimmer 306 is not operably coupling the power supply 8230 to the load 8232, then it is determined if any of the master nodes 102 have directed the RF smart dimmer to operably couple the power supply 8230 to the load 8232 in step 9008. If any of the master nodes 102 have directed the RF smart dimmer 306 to operably couple the power supply 8230 to the load 8232, then the RF smart dimmer couples the power supply 8230 to the load 8232 using the preset current levels contained within the preset database 7302 of the device database 7206 of the non volatile memory 8206 of the RF smart dimmer in step 9010.

Figure 91:
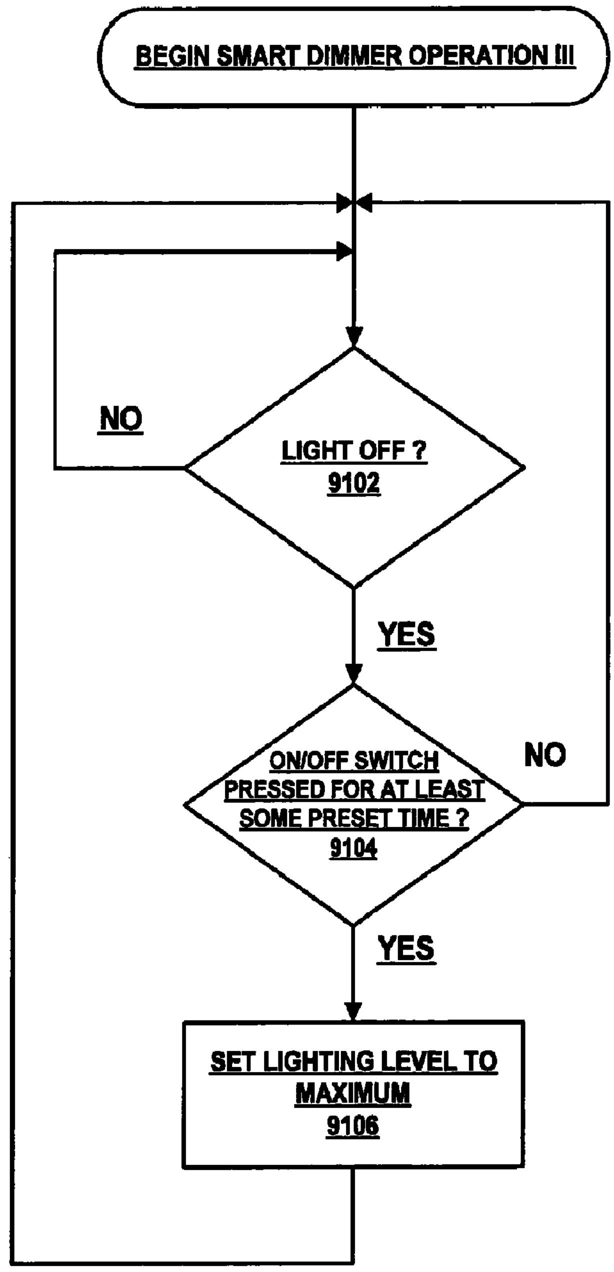
FIG. 91 is a flow chart of an exemplary embodiment of a method of operating the RF smart dimmer.

Referring to FIG. 91, in an exemplary embodiment, during operation of the RF smart dimmer 306, the RF smart dimmer implements a method of operation 9100 in which it is determined if the RF smart dimmer 306 is operably coupling the power supply 8230 to the load 8232 in step 9102. For example, if the load 8232 is a light, in step 9102, it is determined if the light is on. If the RF smart dimmer 306 is not operably coupling the power supply 8230 to the load 8232, then it is determined if the on/off switch 8210 of the RF smart dimmer has been depressed for at least some preset time in step 9104. If the on/off switch 8210 of the RF smart dimmer 306 has been depressed for at least some preset time, then RF smart dimmer is operated to supply the maximum level of current from the power supply 8230 to the load 8232 in step 9106. For example, if the load 8232 is a light, then, in step 9106, the lighting level of the light is set to the maximum possible level.

Figure 92A:
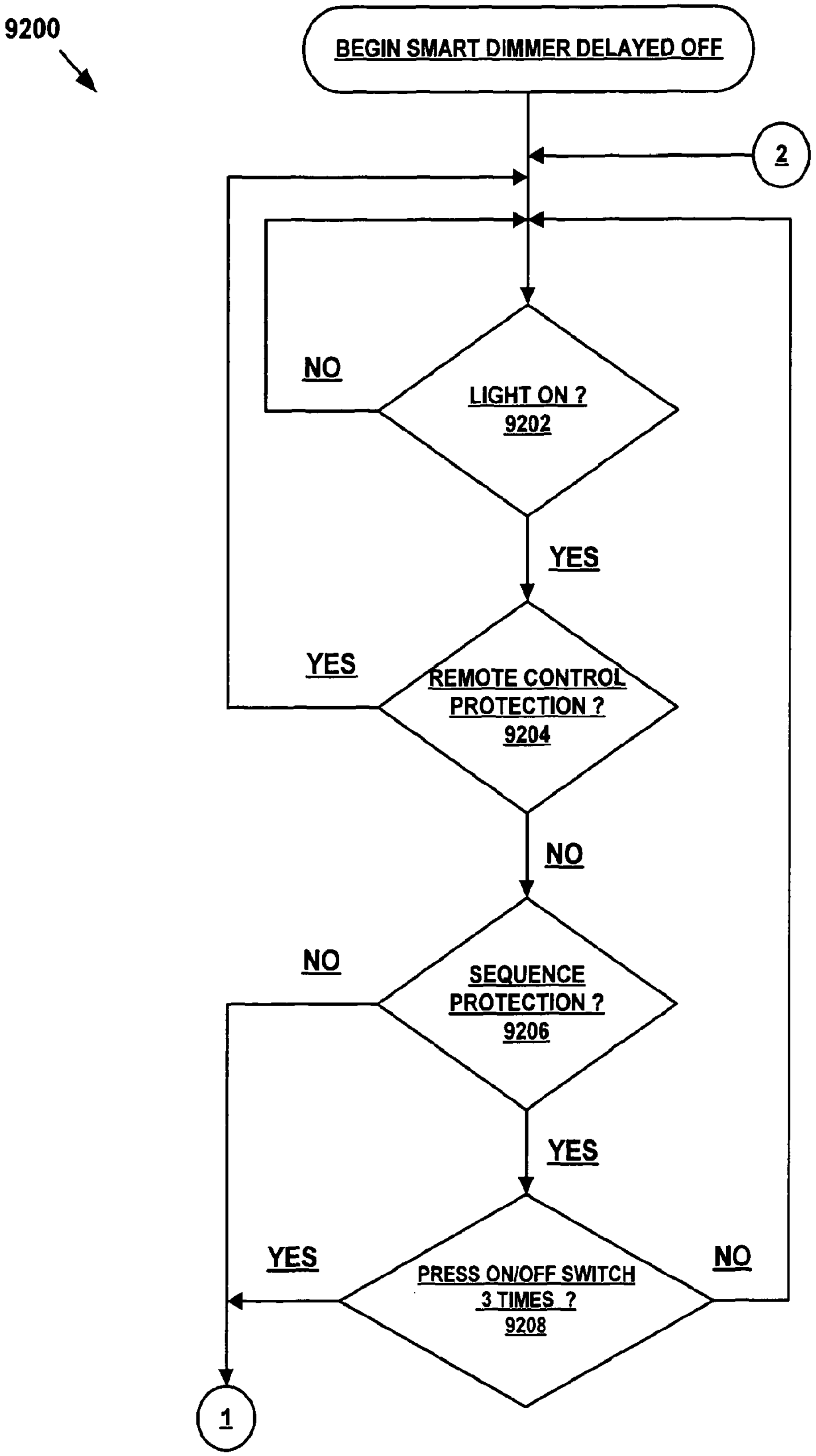
FIGS. 92*a* to 92*c* is a flow chart illustration of an exemplary embodiment of a method of delayed off for the RF smart dimmer.
Figure 92B:
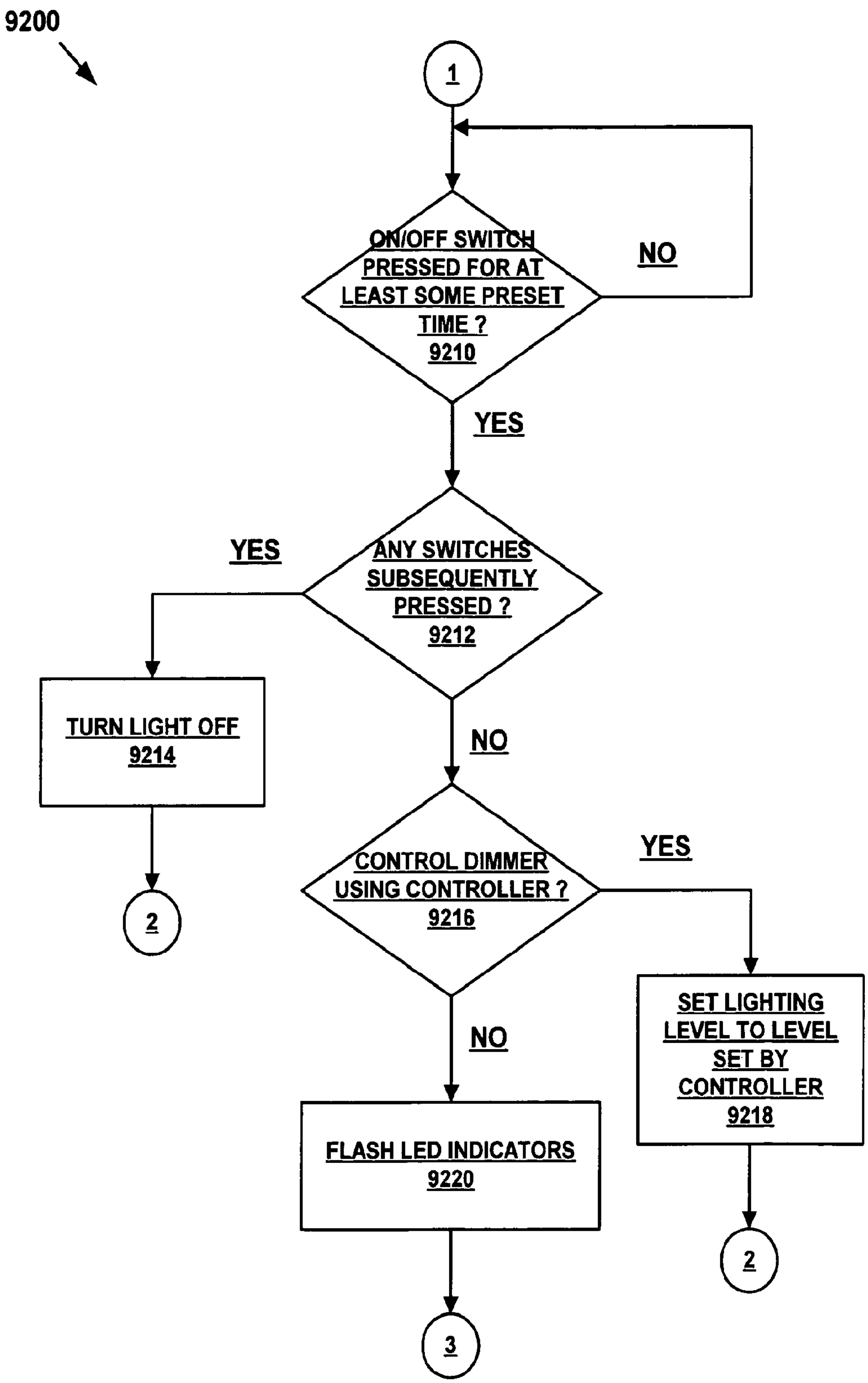
Figure 92C:
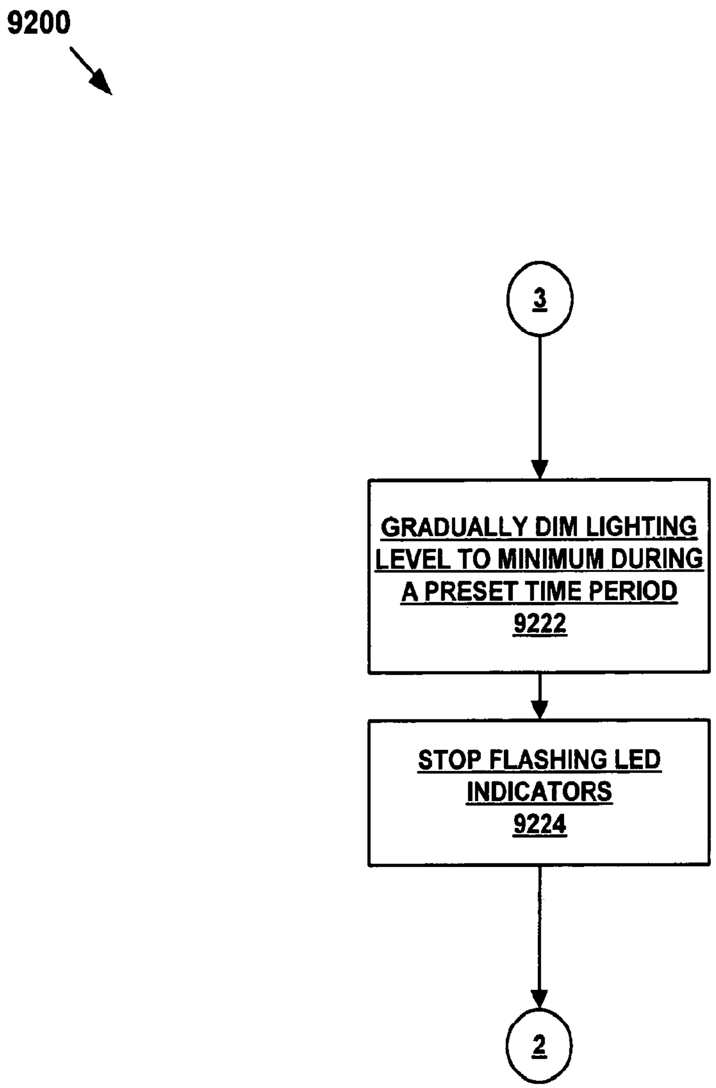

Referring to FIGS. 92*a* to 92*c*, in an exemplary embodiment, during operation of the RF smart dimmer 306, the RF smart dimmer implements a method of delayed off 9200 in which it is first determined if the touchpad 8210 of the RF smart dimmer is in an on position in step 9202. If the touchpad 8210 of the RF smart dimmer 306 is in an on position, then it is then determined if the RF smart dimmer has remote control protection in step 9204. If the RF smart dimmer 306 has remote control protection, then, local manual operation of the RF smart dimmer is not permitted.

If the RF smart dimmer 306 does not have remote control protection, then it is then determined if the RF smart dimmer has sequence control protection in step 9206. If the RF smart dimmer 306 has sequence control protection, then, if a user of the RF smart dimmer depresses the touchpad 8210 of the RF smart dimmer three times in step 9208 or if the RF smart dimmer does not have sequence control protection, then it is determined if the touchpad was depressed for at least some predefined minimum time period in step 9210.

If the touchpad 8210 of the RF smart dimmer 306 was depressed for at least some predefined minimum time, then it is determined if the touchpad was also subsequently depressed in step 9212. If the touchpad 8210 of the RF smart dimmer 306 was also subsequently depressed, then the load 8232 that is operably coupled to the RF smart dimmer 306 is turned off in step 9214. If the touchpad 8210 of the RF smart dimmer 306 was not also subsequently depressed, then it is determined if the RF smart dimmer 306 will be controlled by one or more of the master nodes 102 in step 9216.

If the RF smart dimmer 306 will be controlled by one or more of the master nodes 102, then the operational state of the RF smart dimmer is controlled by one or more of the master nodes 102 in step 9218. Alternatively, if the RF smart dimmer 306 will not be controlled by one or more of the master nodes 102, then the LED indicator light 8216 of the RF smart dimmer are flashed in step 9220. The RF smart dimmer 306 is then operated to turn off the load 8232 operably coupled to the RF smart dimmer after a predetermined time period in step 9222, and then the LED indicator light 8216 of the RF smart dimmer are turned off in step 9224.

Figure 93A:
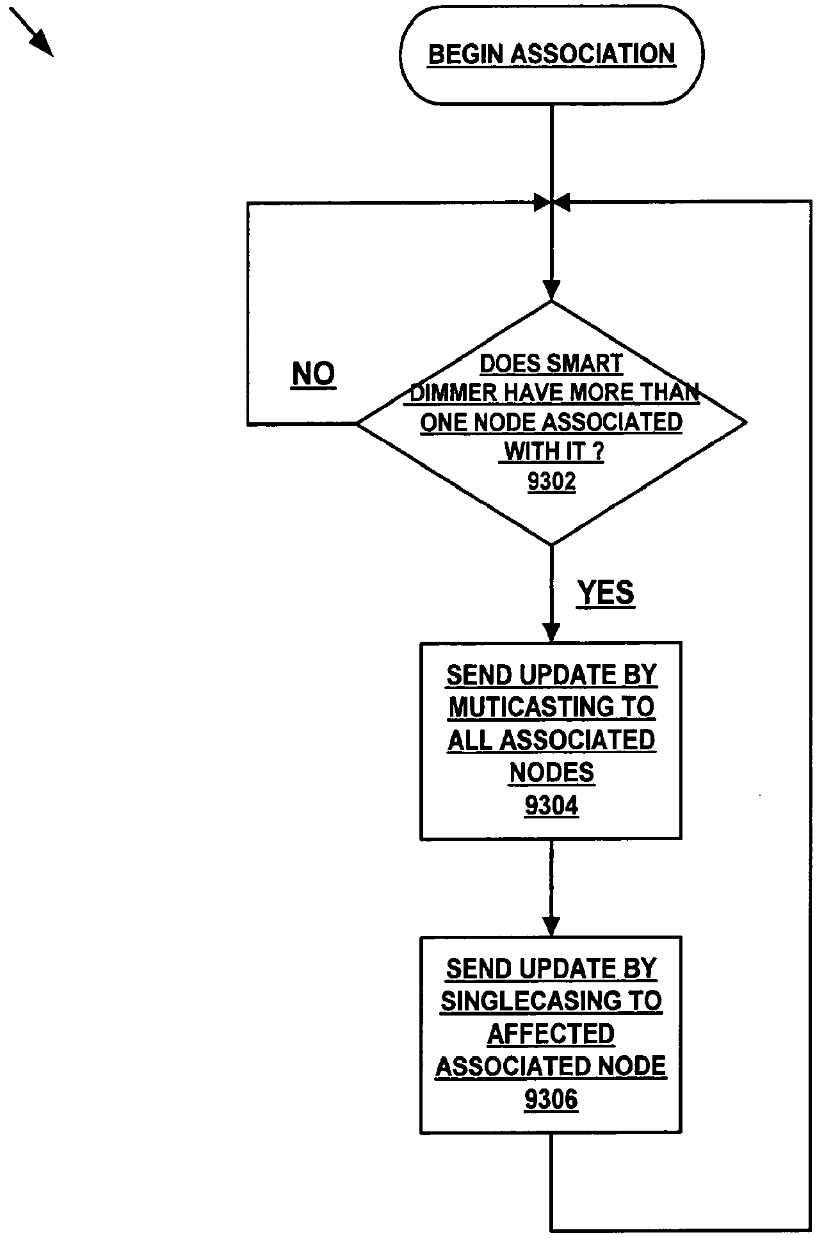
FIGS. 93*a* and 93*b* is a flow chart and schematic illustration of an exemplary embodiment of a method of association for the RF smart dimmer.
Figure 93B:
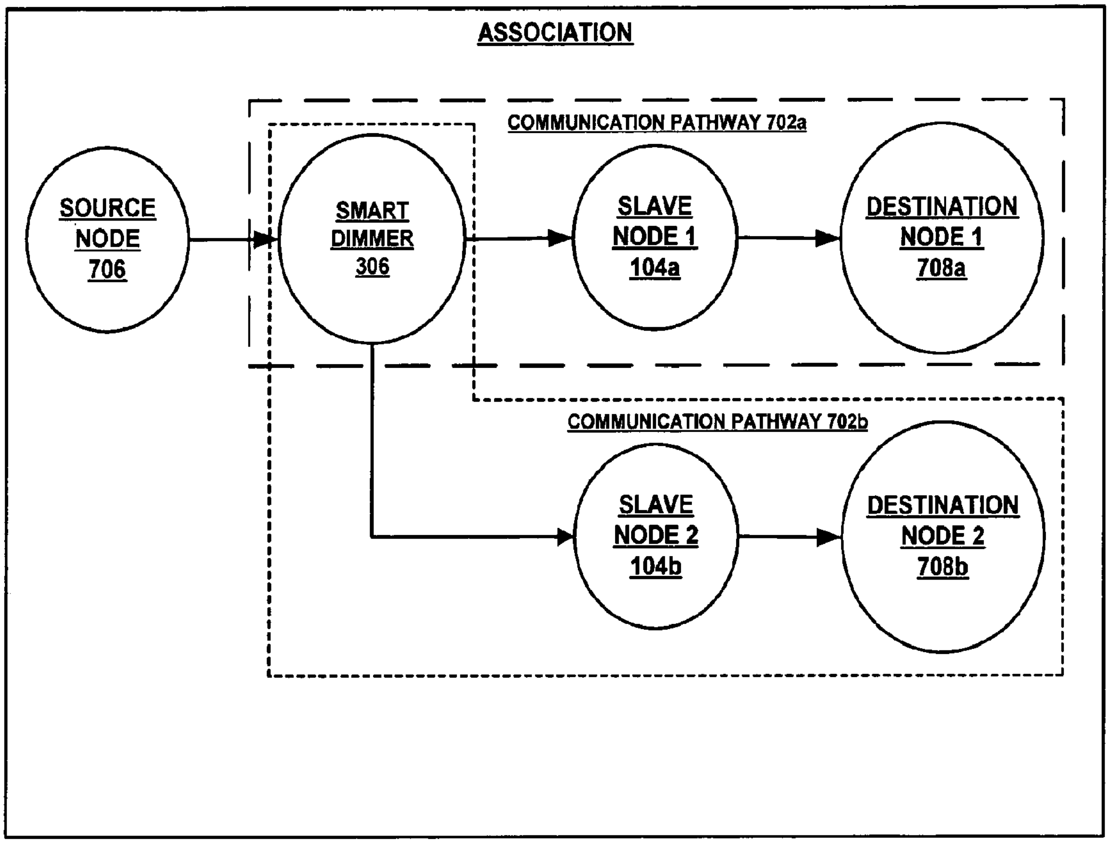

Referring to FIGS. 93*a*-93*b*, in an exemplary embodiment, during operation of the RF smart dimmer 306, the RF smart dimmer implements a method of association 9300 in which it is first determined if the RF smart dimmer is associated with a plurality of slave nodes 104, e.g., slave nodes 104*a* and 104*b*, and thereby is associated with a plurality of communication pathways, e.g., communication pathways 702*a* and 702*b*, in step 6402. If the RF smart dimmer 306 is associated with a plurality of slave nodes 104 and thereby is associated with a plurality of communication pathways 702, then a communication from the source node 706 that is principally directed to, and directly affects, only one of the destination nodes 708*a*, is transmitted by multicasting the communication to all of the nodes associated with the RF smart dimmer in step 9304. I.e., the communication is transmitted by the RF smart dimmer 306 through all of the communication pathways, 702*a* and 702*b*, that the RF smart dimmer is associated with thereby transmitting the communication to the slave nodes, 104*a* and 104*b*, and the destination nodes, 708*a* and 708*b*. The communication is then single-casted to only the nodes directly affected by the communication in step 9306. I.e., the communication is only transmitted by the RF smart dimmer 306 through the communication pathway 702*a* thereby transmitting the communication to the slave node 104*a* and the destination node 708*a*. In this manner, the communication of the information to the affected nodes in the system 100 is assured by performing a multi-cast prior to a single-cast.

Figure 94:
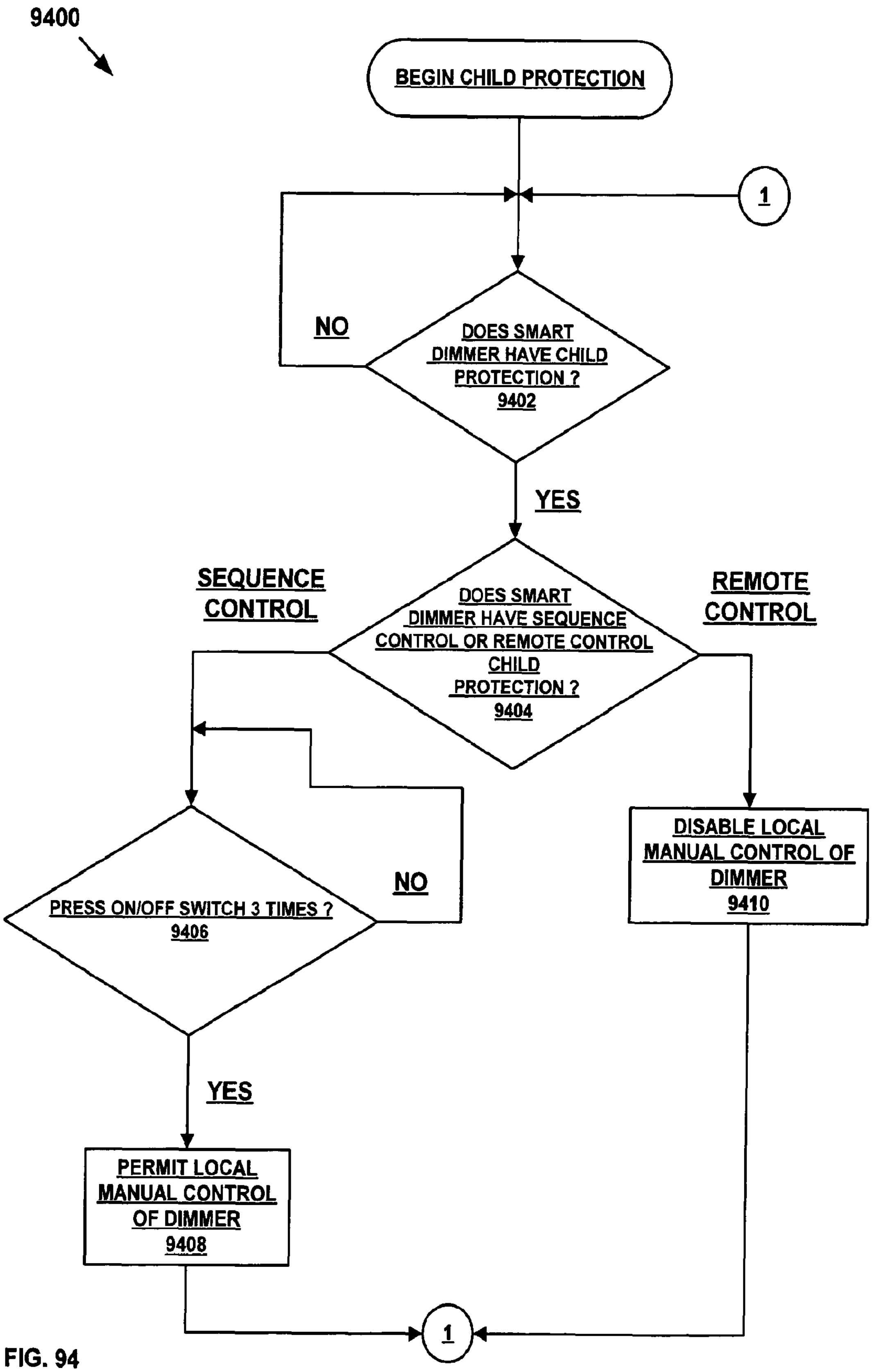
FIG. 94 is a flow chart illustration of an exemplary embodiment of a method of child protection for the RF smart dimmer.

Referring to FIG. 94, in an exemplary embodiment, during operation of the RF smart dimmer 306, the RF smart dimmer implements a method of child protection 9400 in which it is first determined if the RF smart dimmer has active child protection functionality in step 9402. If the RF smart dimmer 306 has active child protection functionality, then it is then determined if the RF smart dimmer has sequence control or remote control child protection functionality in step 9404.

If the RF smart dimmer 306 has sequence control child protection functionality, then, in order to permit local manual operation of the switch, a user must depress the touchpad 8210 three times in step 9406. If a user of the RF smart dimmer 306 depresses the touchpad 8210 three times in step 9406, then local manual operation of the RF smart dimmer is permitted in step 9408.

Alternatively, if the RF smart dimmer 306 has remote control child protection functionality, then, local manual operation of the RF smart dimmer is not permitted. Consequently, if the RF smart dimmer 306 has remote control child protection functionality, then local manual operation of the RF smart dimmer is not permitted in step 9410. As a result, control of the RF smart dimmer 306 is provided by one or more of the master nodes 102 of the system 100.

Figure 95A:
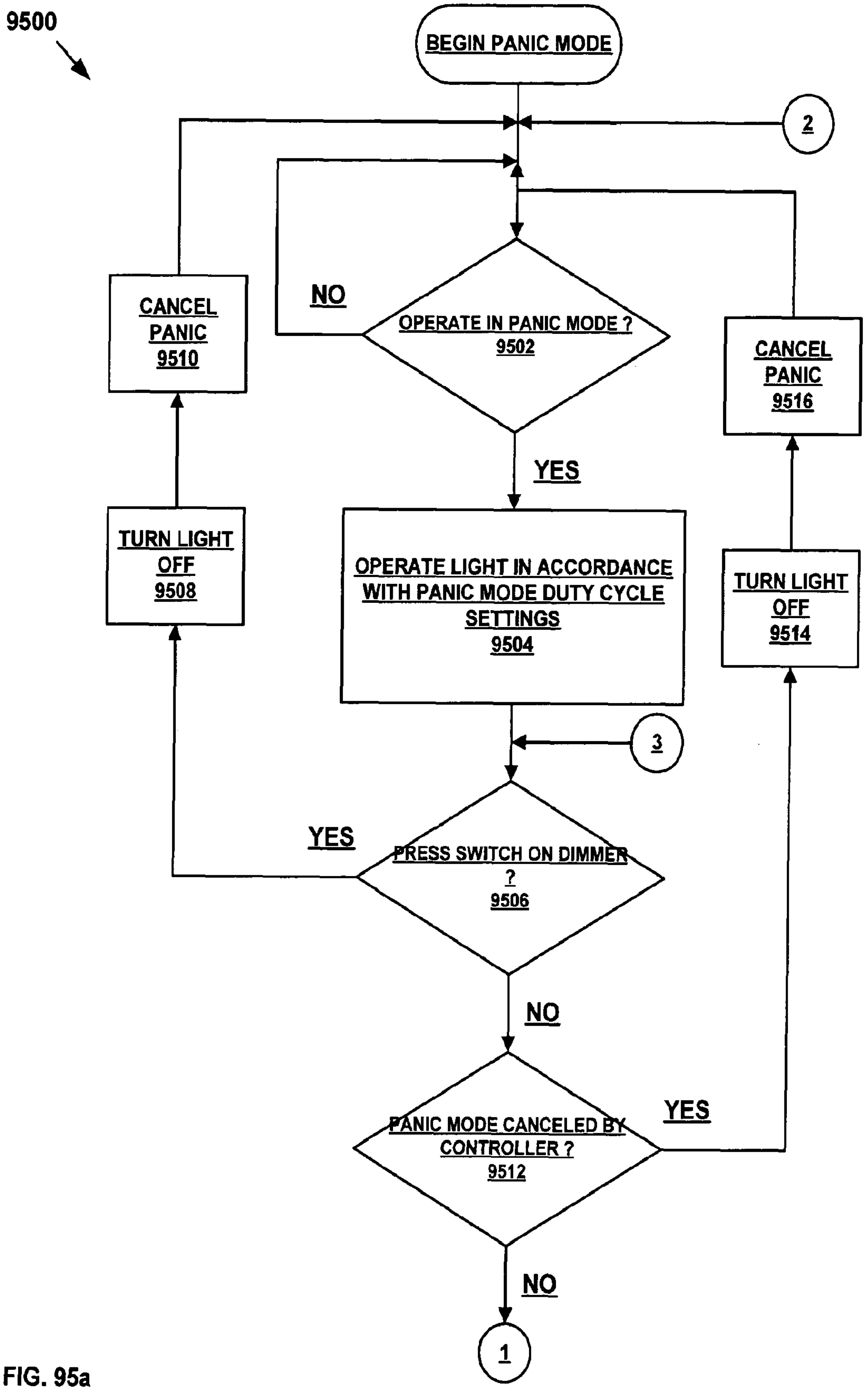
FIGS. 95*a* and 95*b* is a flow chart illustration of an exemplary embodiment of a method of panic mode for the RF smart dimmer.
Figure 95B:
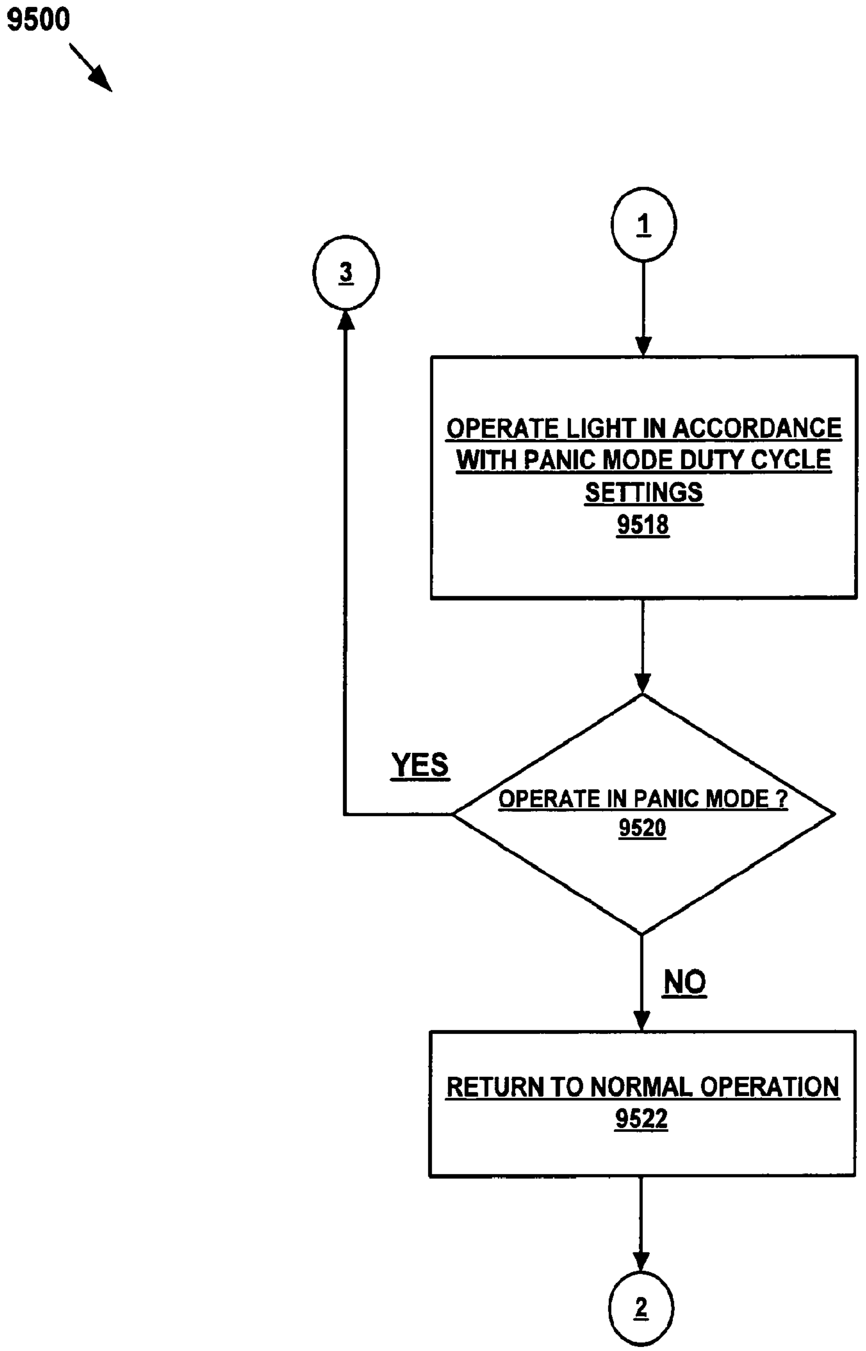

Referring to FIGS. 95*a* to 95*b*, in an exemplary embodiment, during operation of the RF smart dimmer 306, the RF smart dimmer implements a method of panic mode operation method 9500 in which it is first determined if a panic mode operation has been selected by a user of the system 100 in step 9502. In an exemplary embodiment, a panic mode operation may be selected by a user of the system 100 by operating one or more of the master nodes 102 of the system.

If a panic mode operation has been selected by a user of the system 100, then the RF smart dimmer 306 is operated in accordance with the operating parameters assigned to the RF smart dimmer during a panic mode of operation as, for example, contained within the panic database 7310, in step 9504. If the touchpad 8210 of the RF smart dimmer 306 is then depressed in step 9506, then the RF smart dimmer is operated to decouple the load 8232 from the power supply 8230 in step 9508. The panic mode of operation is then canceled in step 9510.

Alternatively, if the touchpad 8210 of the RF smart dimmer 306 is not then depressed in step 9506, then, if the panic mode of operation is canceled by a master node 102 of the system in step 9512, then the RF smart dimmer is operated to decouple the load 8232 from the power supply 8230 in step 9514. The panic mode of operation is then canceled in step 9516.

Alternatively, if the panic mode of operation is not canceled by a master node 102 of the system in step 9512, then the RF smart dimmer 306 is operated in accordance with the panic mode duty cycle settings for the RF smart dimmer contained within, for example, the panic database 7310, in step 9518. In an exemplary embodiment, the panic mode duty cycle settings define an amount of time to couple the load 8232 to the power supply 8230 and an amount of time to decouple the load from the power supply. For example, if the load 8232 is a light, operation of the RF smart dimmer 306 in a panic mode of operation will turn the light on and off in accordance with the panic mode duty cycle settings for the RF smart dimmer. If a panic mode of operation is canceled by a user of the system 100 in step 9520, then the operation of the RF smart dimmer 306 will return to normal in step 9522.

Figure 96:
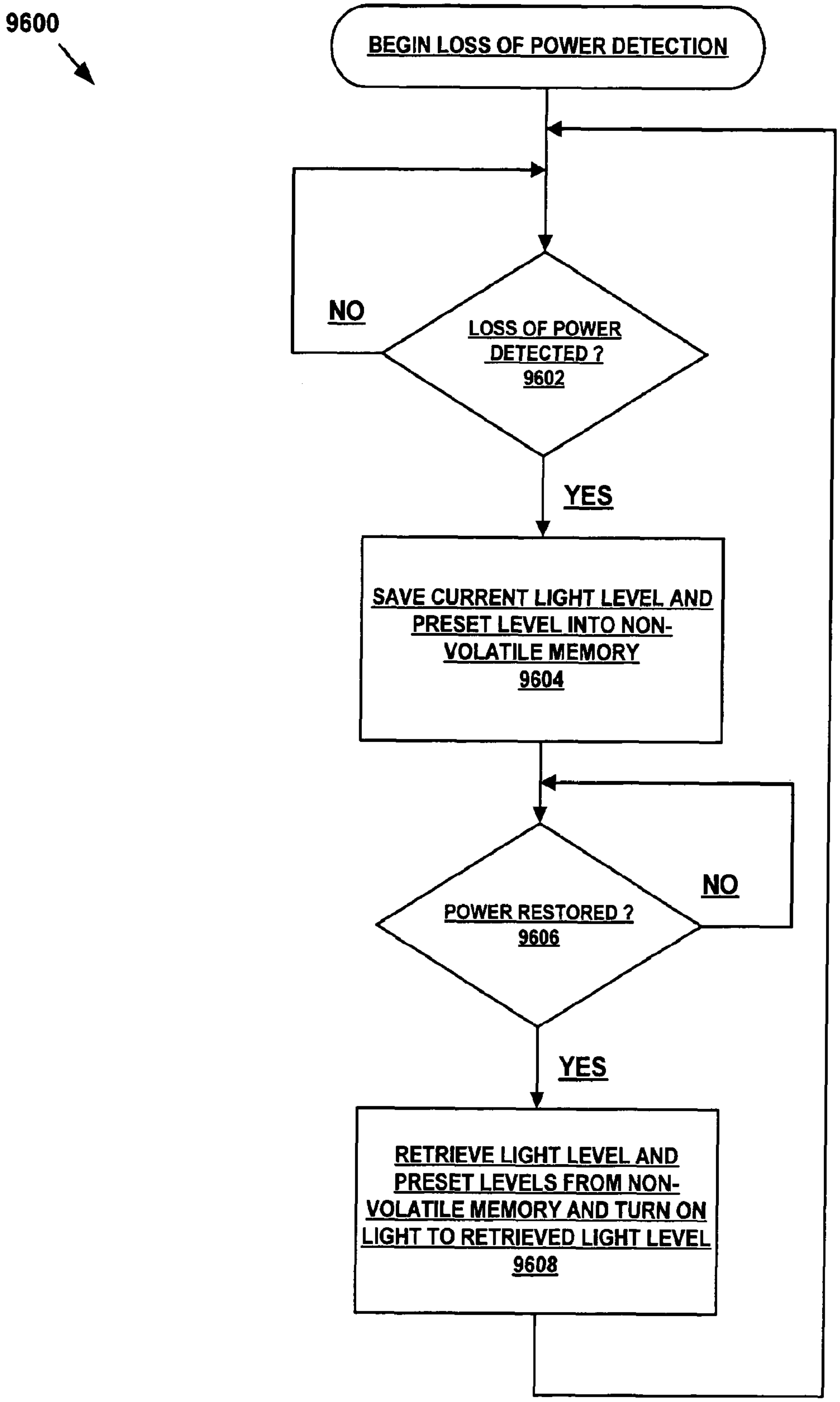
FIG. 96 is a flow chart illustration of an exemplary embodiment of a method of loss of power detection for the RF smart dimmer.

Referring to FIG. 96, in an exemplary embodiment, during operation of the RF smart dimmer 306, the RF smart dimmer implements a method of loss of power detection method 9600 in which it is first determined if a loss of power has occurred, for example, by monitoring the power supply 8230 in step 9602. If a loss of power is detected in step 9602, then the current operational state of the RF smart dimmer 306 is stored in the RF smart dimmer operational state database 7312 within the non-volatile memory 8206 of the RF smart dimmer in step 9604. It is then determined if power has been restored to the RF smart dimmer 306, for example, by monitoring the power supply 8230 in step 9606. If power has been restored to the RF smart dimmer 306, then the current operational state of the RF smart dimmer is retrieved from the RF switch operational state database 7312 within the non-volatile memory 8206, and the operational state of the RF smart dimmer is restored to the operational state defined within the RF smart dimmer operational state database 7312 in step 9608.

In an exemplary embodiment, the design, operation and functionality of the on/off switch 8210, the install button 8212, the uninstall button 8214, and the associate button 8218 may be combined into a single push button.

Figure 97:
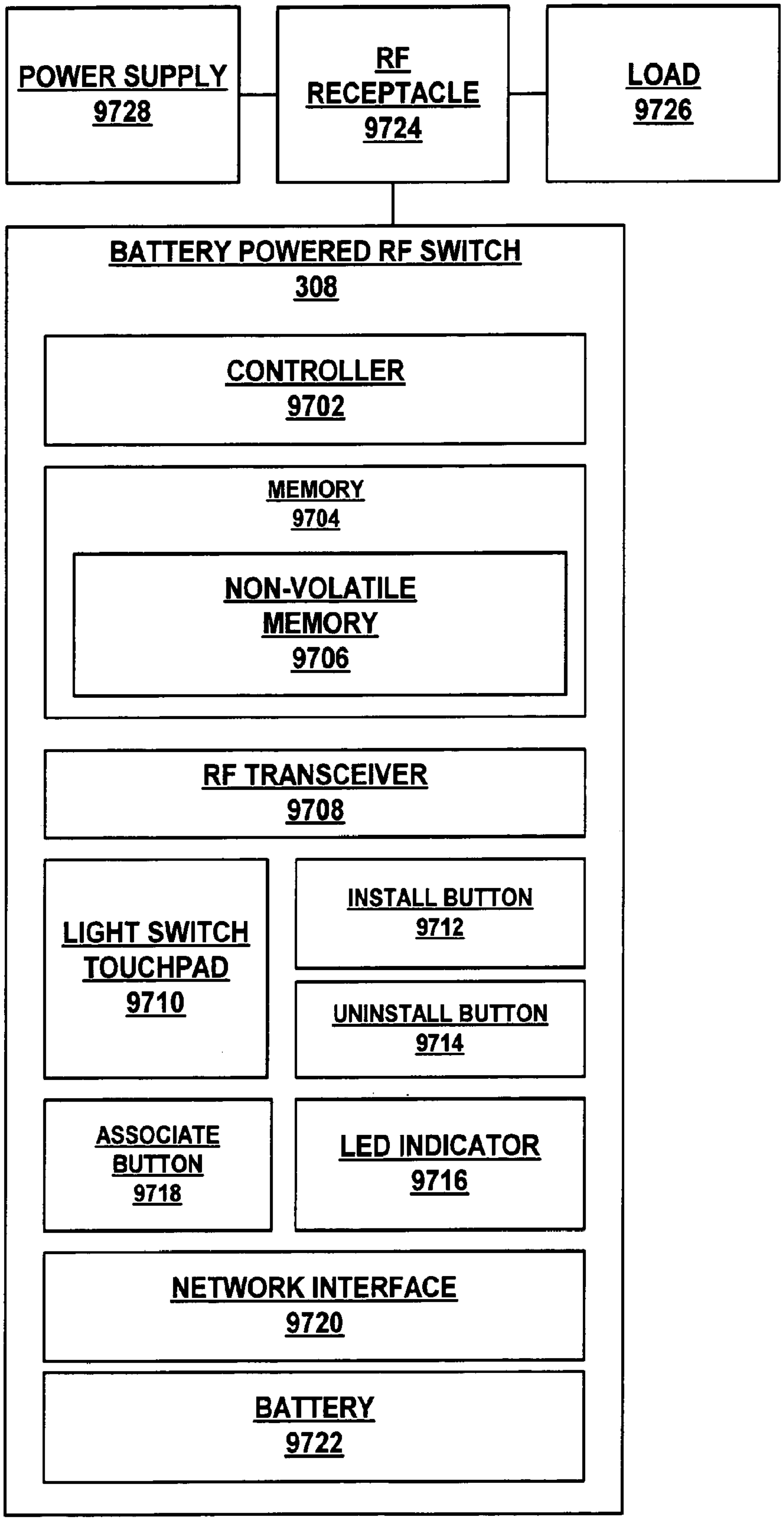
FIG. 97 is a schematic illustration of an exemplary embodiment of a battery powered RF switch for the system.

Referring now to FIG. 97, an exemplary embodiment of a battery powered RF switch 308 includes a controller 9702 that is operably coupled to: a memory 9704, including a non-volatile memory 9706, an RF transceiver 9708, a light switch touch pad 9710, an install button 9712, an uninstall button 9714, an LED indicator light 9716, an associate button 9718, a network interface 9720, and a battery 9722. In an exemplary embodiment, the battery powered RF switch 308 is operably coupled to and controls the operation of a device that is associated with the battery powered RF switch such as, for example, an RF receptacle 9724 that controllably operably couples a load 9726 to a power supply 9728.

In an exemplary embodiment, the controller 9702 is adapted to monitor and control the operation of the memory 9704 including a non-volatile memory 9706, the RF transceiver 9708, the light switch touch pad 9710, the install button 9712, the uninstall button 9714, the LED indicator light 9716, the associate button 9718, and the network interface 9720. In an exemplary embodiment, the controller 9702 includes one or more of the following: a conventional programmable general purpose controller, an application specific integrated circuit (ASIC), or other conventional controller devices. In an exemplary embodiment, the controller 9702 includes a model ZW0201 controller, commercially available from Zensys A/S.

Figure 98:
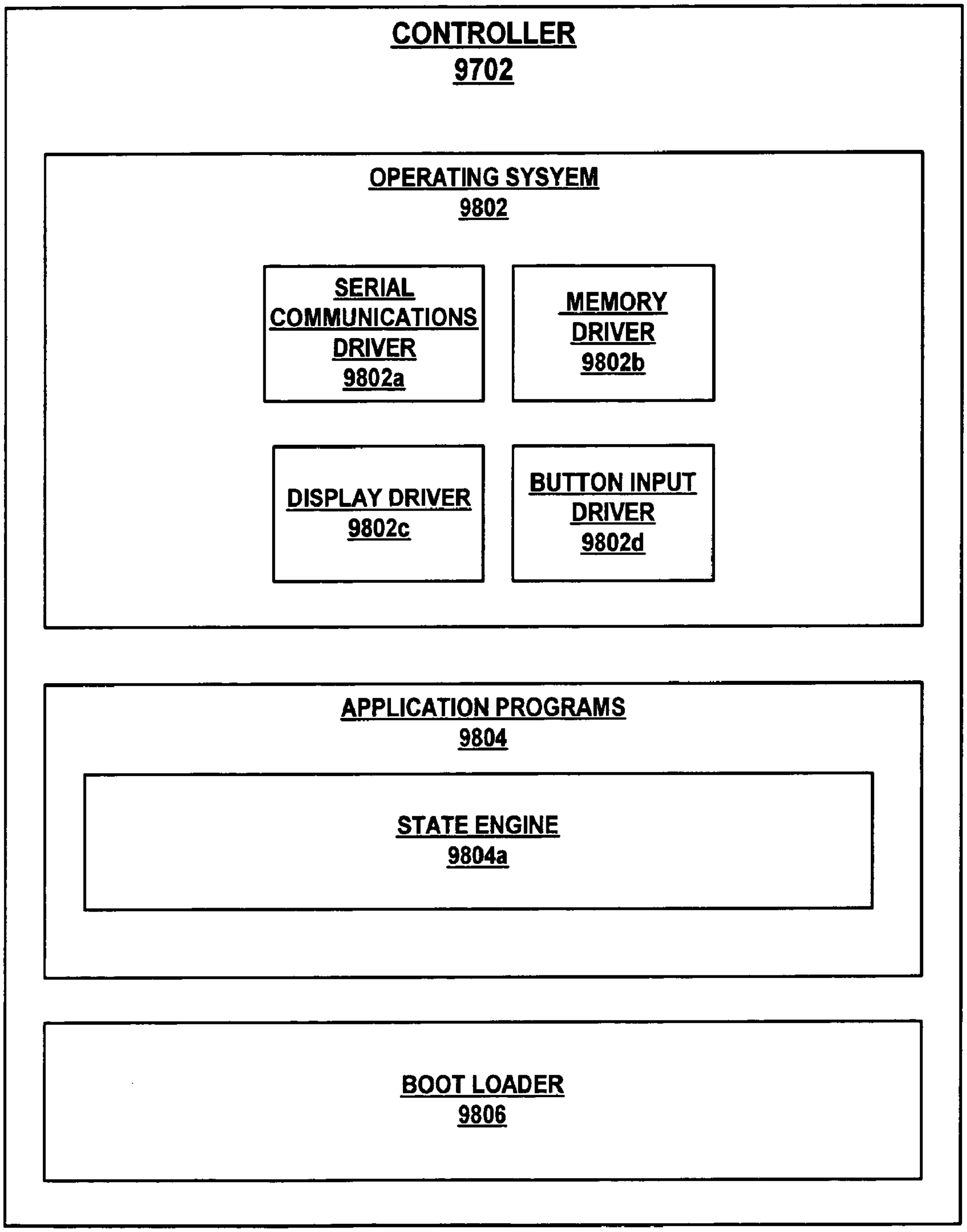
FIG. 98 is a schematic illustration of an exemplary embodiment of the controller of the battery powered RF switch.

Referring now to FIG. 98, in an exemplary embodiment, the controller 9702 includes an operating system 9802, application programs 9804, and a boot loader 9806. In an exemplary embodiment, the operating system 9802 includes a serial communications driver 9802*a*, a memory driver 9802*b*, a display driver 9802*c*, and a button input driver 9802*d*. In an exemplary embodiment, the serial communications driver 9802*a* controls serial communications using the RF serial transceiver 9708, the memory driver 9802*b* controls the memory 9704, including the non volatile memory 9706, the display driver 9802*c* controls the LED indicator light 9716, and the button input driver 9802*d* debounces button inputs provided by a user using one or more of: the light switch touchpad 9710, the install button 9712, the uninstall button 9714, and the associate button 9718. In an exemplary embodiment, the serial communications driver 9802*a* includes a Z-Wave™ serial API driver that implements a Z-Wave™ serial API protocol. The Z-Wave™ serial API driver that implements a Z-Wave™ serial API protocol are both commercially available from Zensys A/S.

In an exemplary embodiment, the application programs 9804 include a state engine 9804*a*. In an exemplary embodiment, the state engine 9804*a* permits a user of one or more of the master nodes 102 to configure, control and monitor the operation of the battery powered RF switch 308.

Figure 99:
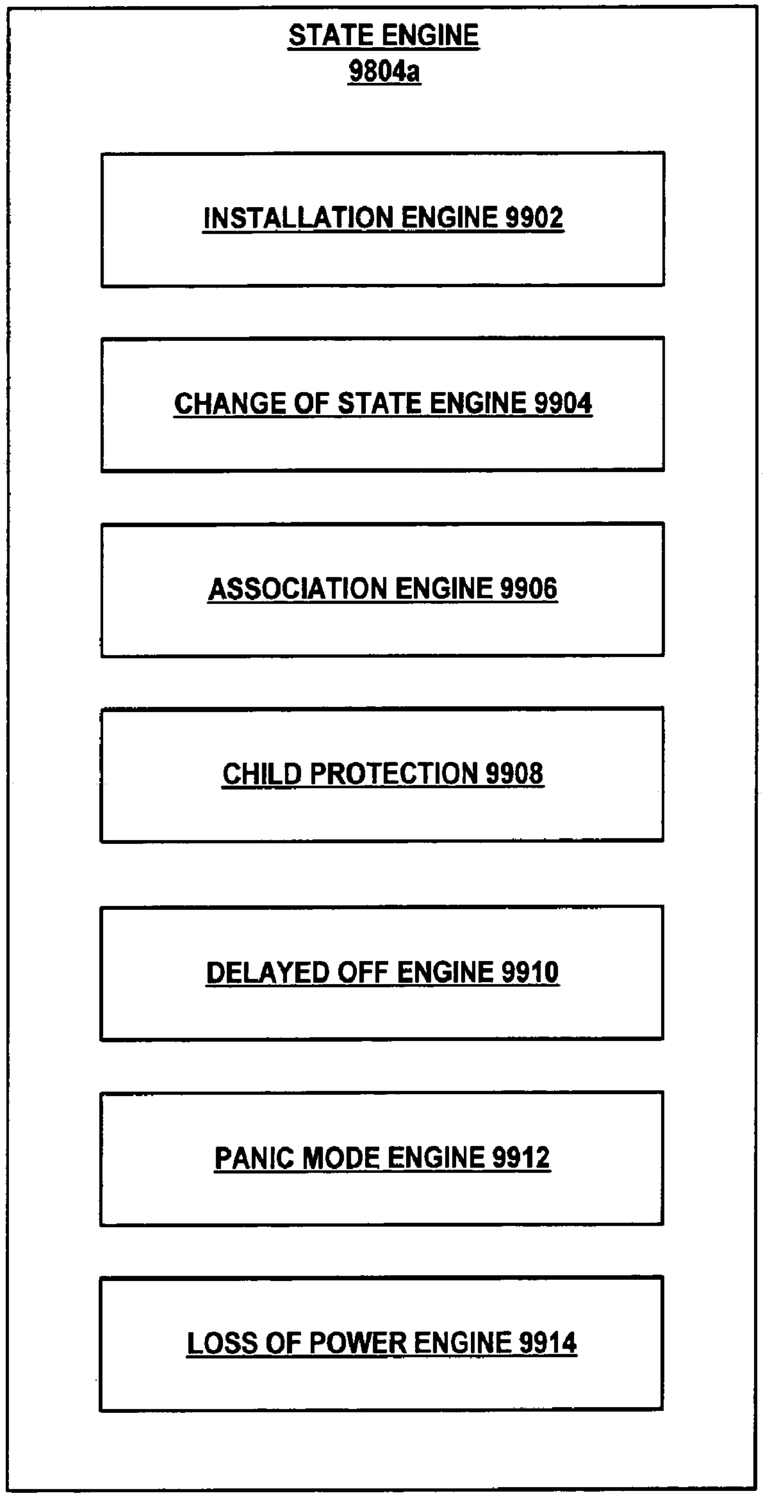
FIG. 99 is a schematic illustration of an exemplary embodiment of the state engine of the controller of the battery powered RF switch.

Referring now to FIG. 99, in an exemplary embodiment, the state engine 9804*a* includes an installation engine 9902, a change of state engine 9904, an association engine 9906, a child protection engine 9908, a delayed off engine 9910, a panic mode engine 9912, and a loss of power detection engine 9914.

In an exemplary embodiment, the installation engine 9902 monitors the operating state of the battery powered RF switch 308 and provides an indication to a user of the system 100 as to whether or not the battery powered RF switch has been installed in the system. In this manner, the installation engine 9902 facilitates the installation of the battery powered RF switch 308 into the system 100.

In an exemplary embodiment, the change of state engine 9904 monitors the operating state of the battery powered RF switch 308 and, upon a change in operating state, transmits information to one or more of the master nodes 102 regarding the configuration of the battery powered RF switch.

In an exemplary embodiment, the association engine 9906 is adapted to monitor and control the operation of the battery powered RF switch 308 when the battery powered RF switch is associated with one or more communication pathway 702.

In an exemplary embodiment, the child protection engine 9908 is adapted to monitor and control the operation of the battery powered RF switch 308 when the battery powered RF switch is operated in a child protection mode of operation.

In an exemplary embodiment, the delayed off engine 9910 is adapted to monitor and control the operation of the battery powered RF switch 308 when the battery powered RF switch is operated in a delayed off mode of operation.

In an exemplary embodiment, the panic mode engine 9912 is adapted to monitor and control the operation of the battery powered RF switch 308 when the battery powered RF switch is operated in a panic mode of operation.

In an exemplary embodiment, the loss of power detection engine 9914 is adapted to monitor the operating state of the battery powered RF switch 308 and, upon the loss of power, save the operating state of the battery powered RF switch into the non volatile memory 9706. Upon the resumption of power to the battery powered RF switch 308, the loss of power detection engine 9914 then retrieves the stored operating state of the battery powered RF switch 308 from the non volatile memory 9706 and restores the operating state of the battery powered RF switch.

Figure 100:
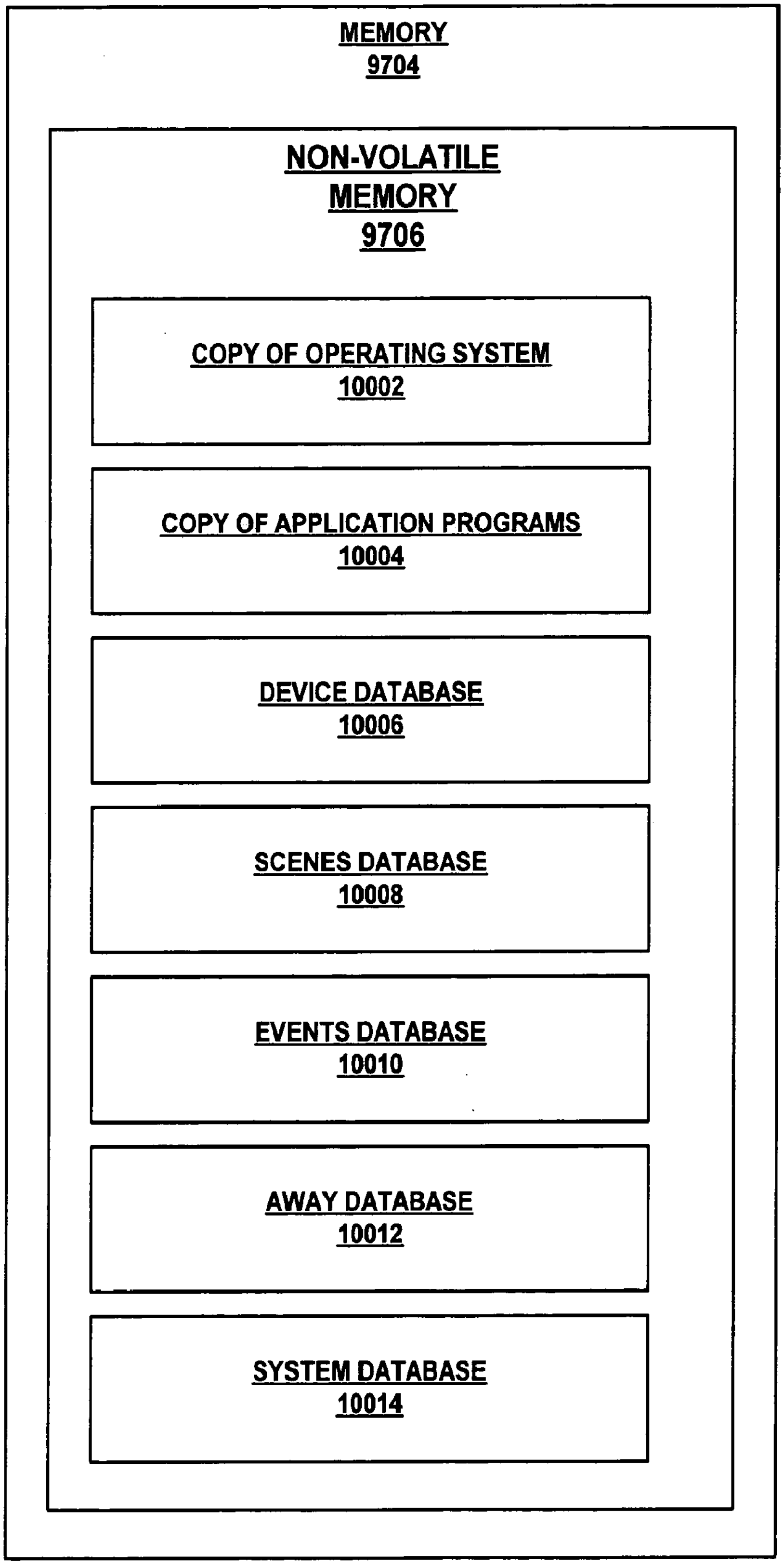
FIG. 100 is a schematic illustration of an exemplary embodiment of the memory of the battery powered RF switch.

In an exemplary embodiment, the memory 9704, including the non volatile memory 9706, is operably coupled to and controlled by the controller 9702. In an exemplary embodiment, as illustrated in FIG. 100, the memory 9704, including the non volatile memory 9706, includes a copy of the operating system 10002, a copy of the application programs 10004, a device database 10006, a scenes database 10008, an events database 10010, an away database 10012, and a system database 10014. In an exemplary embodiment, the memory 9704 includes a model 24LC256 non volatile memory, commercially available from Microchip.

Figure 101:
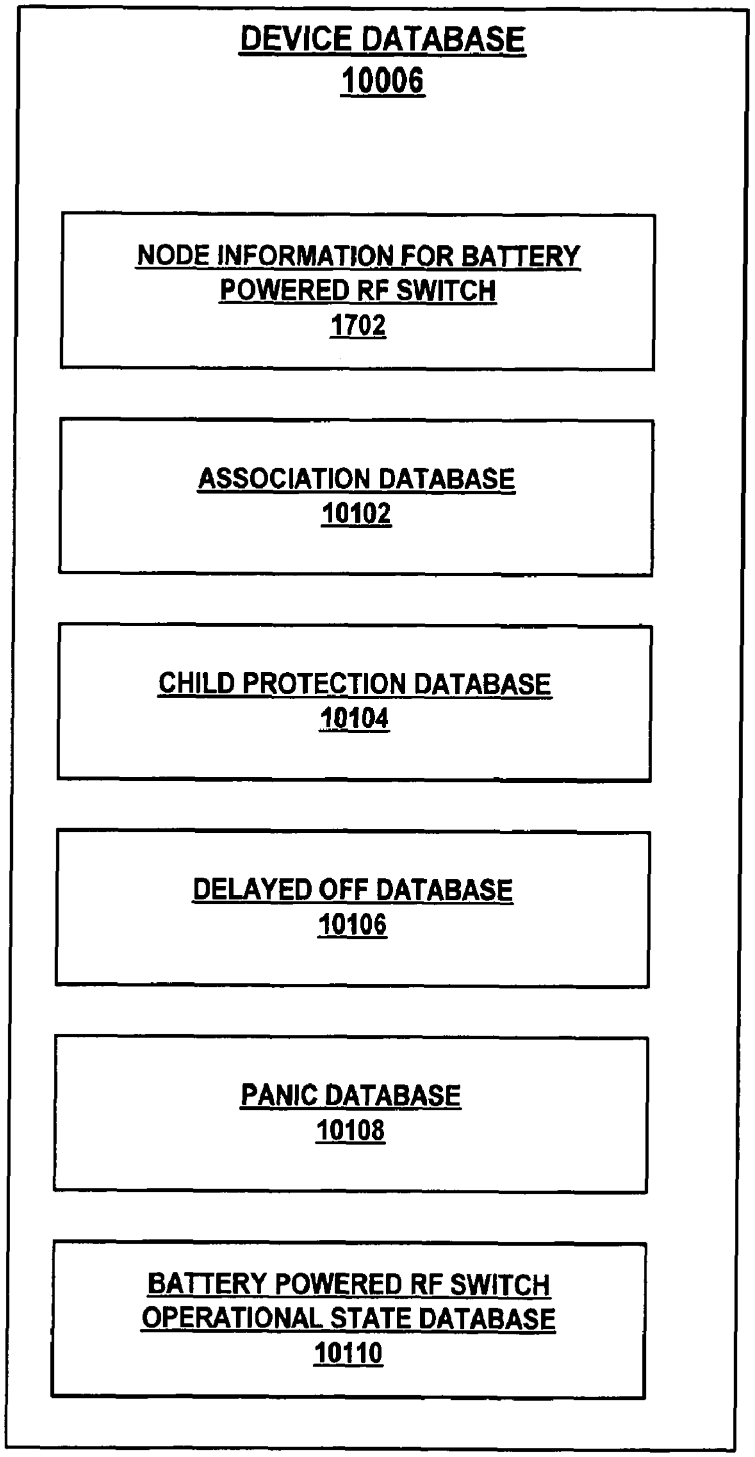
FIG. 101 is a schematic illustration of an exemplary embodiment of the device database of the memory of the battery powered RF switch.

In an exemplary embodiment, the device database 10006 includes information that is specific to the battery powered RF switch 308. In an exemplary embodiment, as illustrated in FIG. 101, the device database 10006 includes the node information frame 1702 for the battery powered RF switch 308, an association database 10102 for the battery powered RF switch, a child protection database 10104 for the battery powered RF switch, a delayed off database 10106 for the battery powered RF switch, a panic database 10108 for the battery powered RF switch, and an operating state database 10110 for the battery powered RF switch. In an exemplary embodiment, the association database 10102 for the battery powered RF switch 308 includes information regarding the communication pathways 702 associated with the battery powered RF switch. In an exemplary embodiment, the child protection database 10104 for the battery powered RF switch 308 includes information regarding the operating characteristics of the battery powered RF switch when child protection is enabled. In an exemplary embodiment, the delayed off database 10106 for the battery powered RF switch 308 includes information regarding the operating characteristics of the battery powered RF switch when delayed off is enabled. In an exemplary embodiment, the panic database 10108 for the battery powered RF switch 308 includes information regarding the operating characteristics of the battery powered RF switch when panic is enabled. In an exemplary embodiment, the operating state database 10110 for the battery powered RF switch 308 includes information representative of the operating state of the battery powered RF switch.

In an exemplary embodiment, the scenes database 10008 includes information regarding the scenes 802 that include the battery powered RF switch 308. In an exemplary embodiment, the events database 10010 includes information regarding the events 1002 that include the battery powered RF switch 308. In an exemplary embodiment, the away database 10012 includes information regarding the away group 1402 that includes the battery powered RF switch 308. In an exemplary embodiment, the system database 10014 includes system information that includes the battery powered RF switch 308.

In an exemplary embodiment, the RF transceiver 9708 is operably coupled to and controlled by the controller 9702. In an exemplary embodiment, the RF transceiver 9708 transmits and receives RF communications to and from other master and slave nodes, 102 and 104, respectively. In an exemplary embodiment, the RF transceiver 9708 may, for example, include one or more of the following: a conventional RF transceiver, and/or the model ZW0201 RF transceiver commercially available from Zensys A/S.

In an exemplary embodiment, the light switch touch pad 9710 is a conventional light switch touch pad and is operably coupled to and controlled and monitored and monitored by the controller 9702. In an exemplary embodiment, the light switch touch pad 9710 permits an operator of the battery powered RF switch 308, in combination with the system 100, to select the desired mode of operation of the receptacle 9724 and, correspondingly, the load 9726.

In an exemplary embodiment, the install button 9712 is operably coupled to and controlled and monitored by the controller 9702. In an exemplary embodiment, the install button 9712 permits an operator of the battery powered RF switch 308, in combination with the system 100, to install the battery powered RF switch into the system.

In an exemplary embodiment, the uninstall button 9714 is operably coupled to and controlled and monitored by the controller 9702. In an exemplary embodiment, the uninstall button 9714 permits an operator of the battery powered RF switch 308, in combination with the system 100, to uninstall the battery powered RF switch from the system.

In an exemplary embodiment, the LED indicator light 9716 is operably coupled to and controlled and monitored by the controller 9702.

In an exemplary embodiment, the associate button 9718 is operably coupled to and controlled and monitored by the controller 9702. In an exemplary embodiment, the associate button 9718 permits an operator of the battery powered RF switch 308, in combination with the system 100, to associate the battery powered RF switch with communication pathways 702 in the system.

In an exemplary embodiment, the network interface 9720 is operably coupled to and controlled and monitored by the controller 9702. In an exemplary embodiment, the network interface 9720 permits an operator of the battery powered RF switch 308 to network the battery operated RF switch with one or more elements within or outside of the system.

In an exemplary embodiment, the battery 9722 is operably coupled to, and provides electrical power to, all of the elements of the battery powered RF switch 308. In several exemplary embodiments, the battery 9722 is combined, or substituted, with other types of portable power supplies such as, for example, solar power. In several exemplary embodiments, the battery 9722 is combined, or substituted, with other types of portable power generation such as, for example, power generated by capturing the kinetic energy input into the on/off switch 9710 to generate electrical power.

Figure 102:
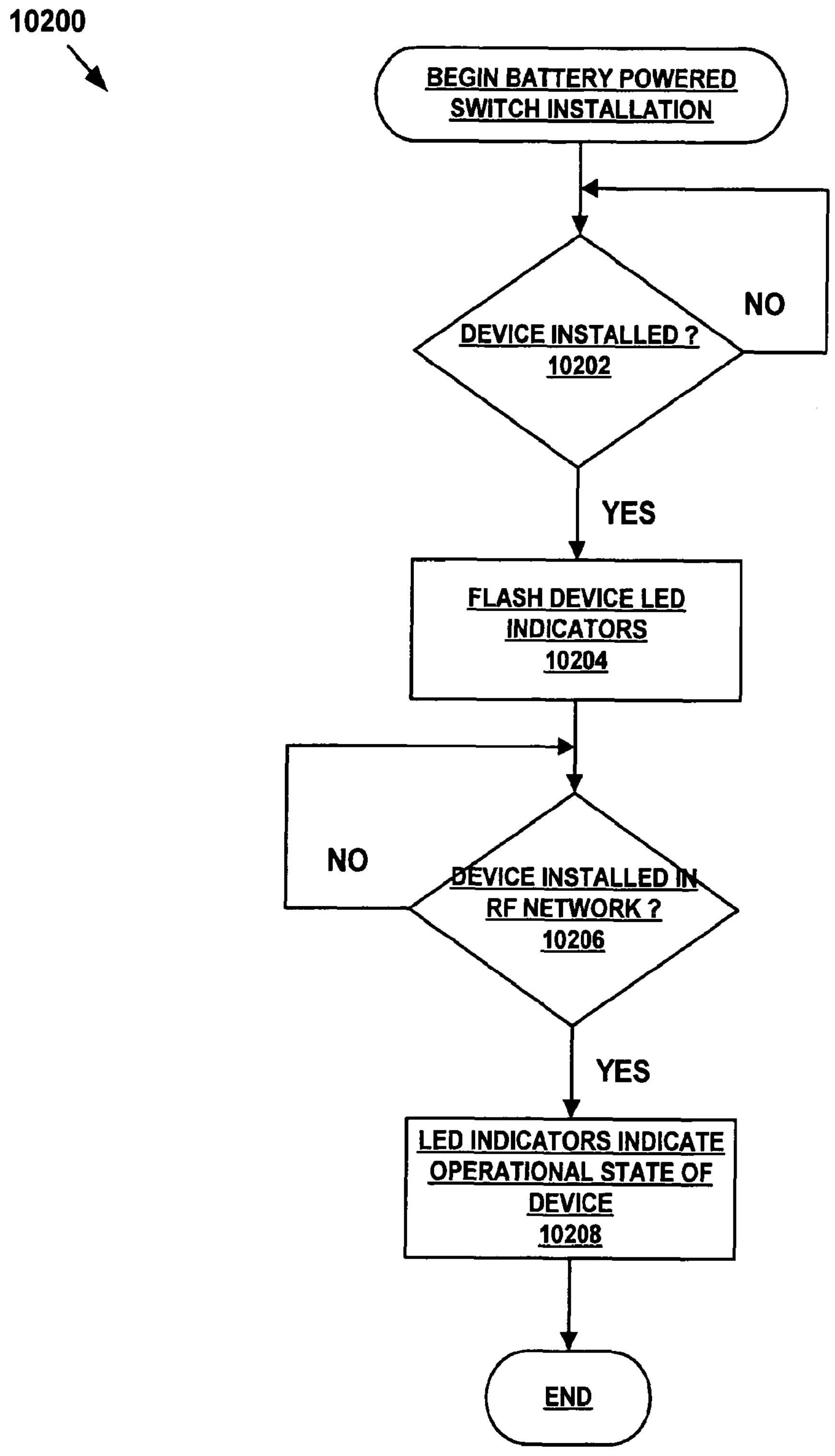
FIG. 102 is a flow chart illustration of an exemplary embodiment of a method of installation for the battery powered RF switch.

Referring to FIG. 102, in an exemplary embodiment, during operation of the battery powered RF switch 308, the battery powered RF switch implements a method of installation 10200 in which, if the battery powered RF switch has been operably coupled to the battery 9722, then the LED indicator lights 9716 are operated to indicate this operational state in steps 10202 and 10204. Then, if the battery powered RF switch 308 has been installed in the system 100, then the LED indicator lights 9716 are operated to indicate this operational state in steps 10206 and 10208. In an exemplary embodiment, the LED indicator lights 9716 flash on an off to indicate the operational state in steps 10202 and 10204, and the LED indicator lights 9716 are turned on to indicate the operational state in steps 10206 and 10208. In this manner, an operator of the system 100 is provided with a visual and highly effective indication of the operational state of the battery powered RF switch 308 that is local to the battery powered RF switch. This permits an installer of the battery powered RF switch 308, in a large house or commercial building, with an effective means of determining the operational state of the battery powered RF switch that is both local to the battery powered RF switch and avoids the need to interrogate a master node 102 to determine the operational state.

Figure 103:
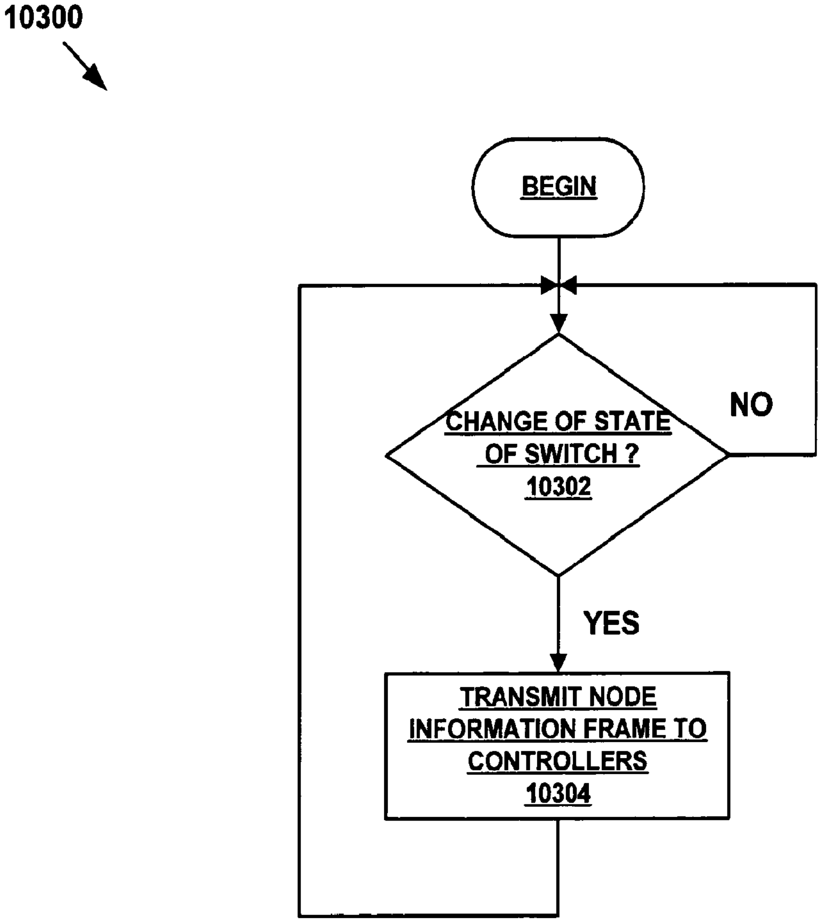
FIG. 103 is a flow chart illustration of an exemplary embodiment of a method of change of state for the battery powered RF switch.

Referring to FIG. 103, in an exemplary embodiment, during operation of the battery powered RF switch 308, the battery powered RF switch implements a method of detecting a change of state 10300 in which, if the operating state of the battery powered RF switch has changed, then the node information frame 1702 for the battery powered RF switch is transmitted to one or more of the master nodes 102 of the system 100 using the RF transceiver 9708 in steps 10302 and 10304.

Figure 104A:
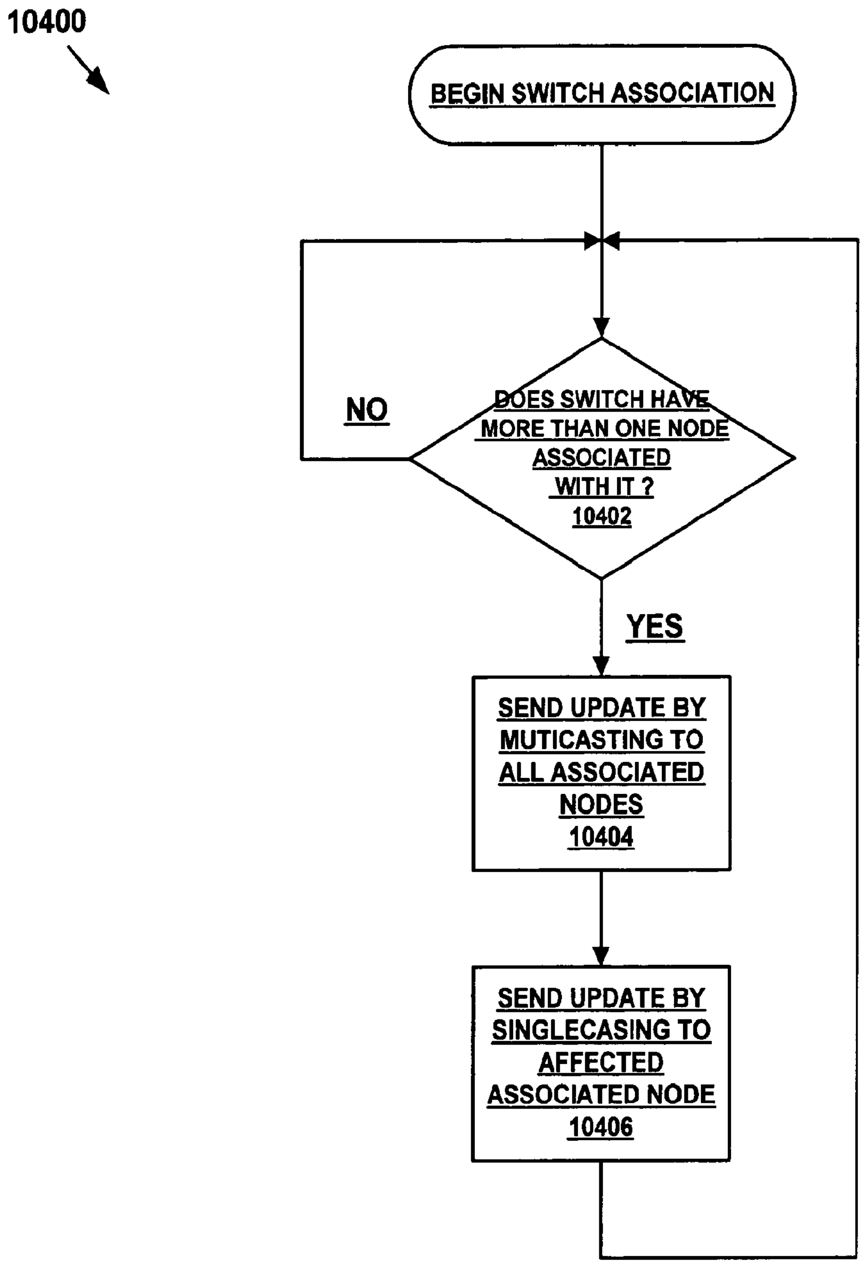
FIGS. 104*a* and 104*b* is a flow chart and schematic illustration of an exemplary embodiment of a method of association for the battery powered RF switch.
Figure 104B:
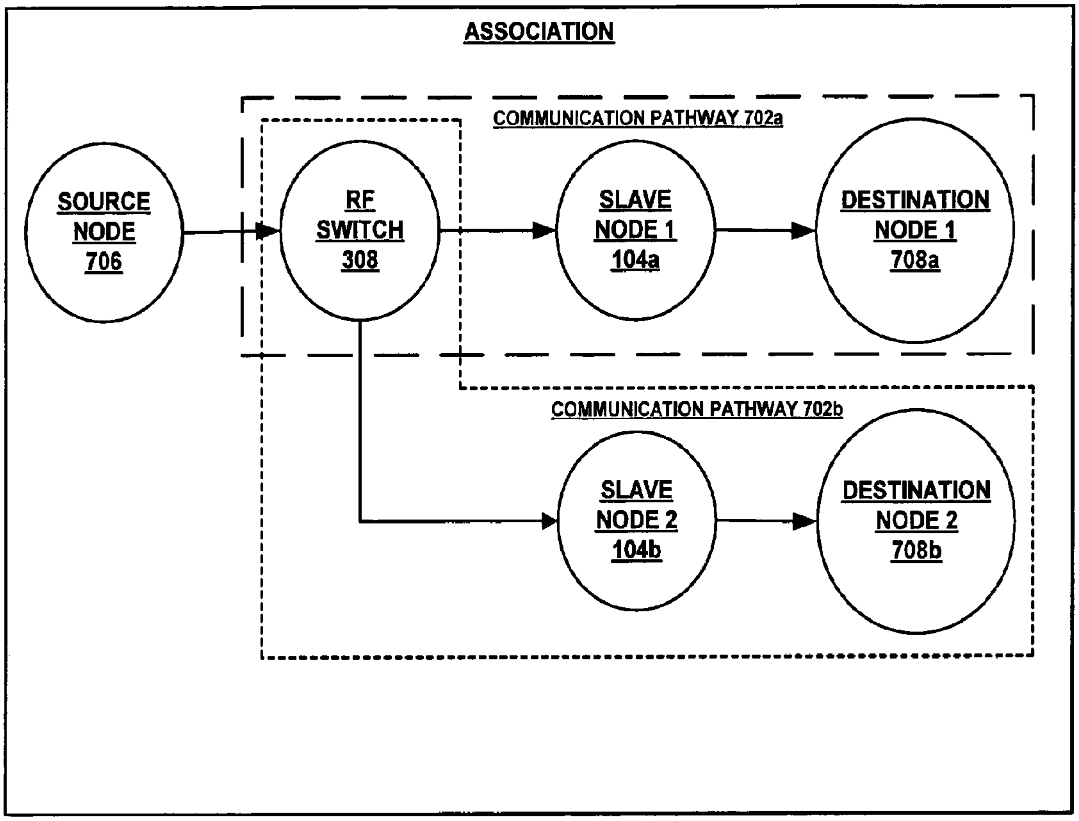

Referring to FIGS. 104*a*-104*b*, in an exemplary embodiment, during operation of the battery powered RF switch 308, the battery powered RF switch 308 implements a method of association 10400 in which it is first determined if the battery powered RF switch is associated with a plurality of slave nodes 104, e.g., slave nodes 104*a* and 104*b*, and thereby is associated with a plurality of communication pathways, e.g., communication pathways 702*a* and 702*b*, in step 6402. If the battery powered RF switch 308 is associated with a plurality of slave nodes 104 and thereby is associated with a plurality of communication pathways 702, then a communication from the source node 706 that is principally directed to, and directly affects, only one of the destination nodes 708*a*, is transmitted by multicasting the communication to all of the nodes associated with the battery powered RF switch in step 10404. I.e., the communication is transmitted by the battery powered RF switch 308 through all of the communication pathways, 702*a* and 702*b*, that the battery powered RF switch is associated with thereby transmitting the communication to the slave nodes, 104*a* and 104*b*, and the destination nodes, 708*a* and 708*b*. The communication is then single-casted to only the nodes directly affected by the communication in step 10406. I.e., the communication is only transmitted by the battery powered RF switch 308 through the communication pathway 702*a* thereby transmitting the communication to the slave node 104*a* and the destination node 708*a*. In this manner, the communication of the information to the affected nodes in the system 100 is assured by performing a multi-cast prior to a single-cast.

Figure 105:
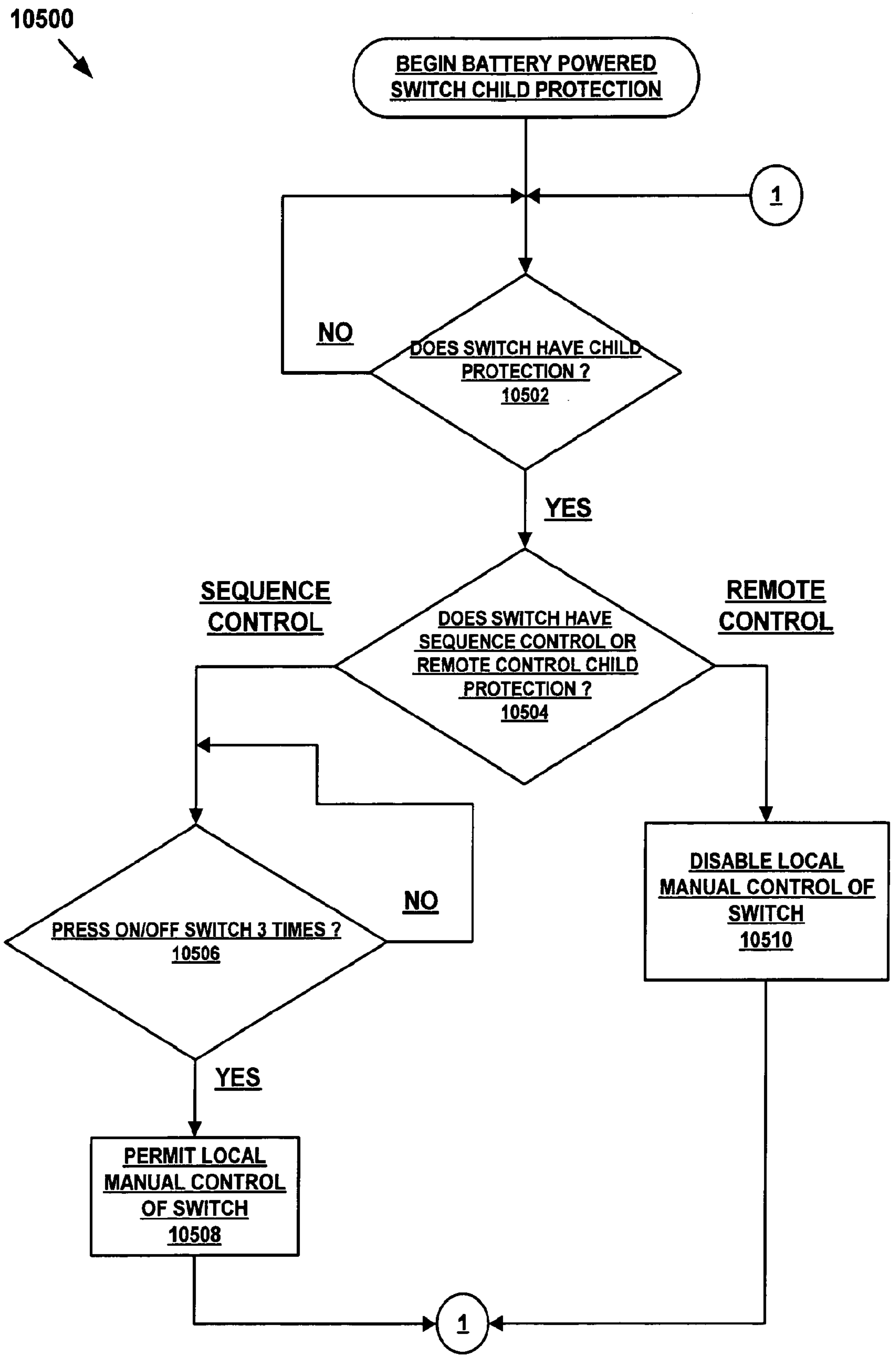
FIG. 105 is a flow chart illustration of an exemplary embodiment of a method of child protection for the battery powered RF switch.

Referring to FIG. 105, in an exemplary embodiment, during operation of the battery powered RF switch 308, the battery powered RF switch implements a method of child protection 10500 in which it is first determined if the battery powered RF switch has active child protection functionality in step 10502. If the battery powered RF switch 308 has active child protection functionality, then it is then determined if the battery powered RF switch has sequence control or remote control child protection functionality in step 10504.

If the battery powered RF switch 308 has sequence control child protection functionality, then, in order to permit local manual operation of the battery powered RF switch, a user must depress the touchpad 9710 three times in step 10506. If a user of the battery powered RF switch 308 depresses the touchpad 9710 three times in step 10506, then local manual operation of the battery powered RF switch, using the touchpad 9710, is permitted in step 10508.

Alternatively, if the battery powered RF switch 308 has remote control child protection functionality, then, local manual operation of the battery powered RF switch, using the touchpad 9710, is not permitted. Consequently, if the battery powered RF switch 308 has remote control child protection functionality, then local manual operation of the battery powered RF switch, using the touchpad 9710, is not permitted in step 10510. As a result, control of the battery powered RF switch 308 is provided by one or more of the master nodes 102 of the system 100.

Figure 106A:
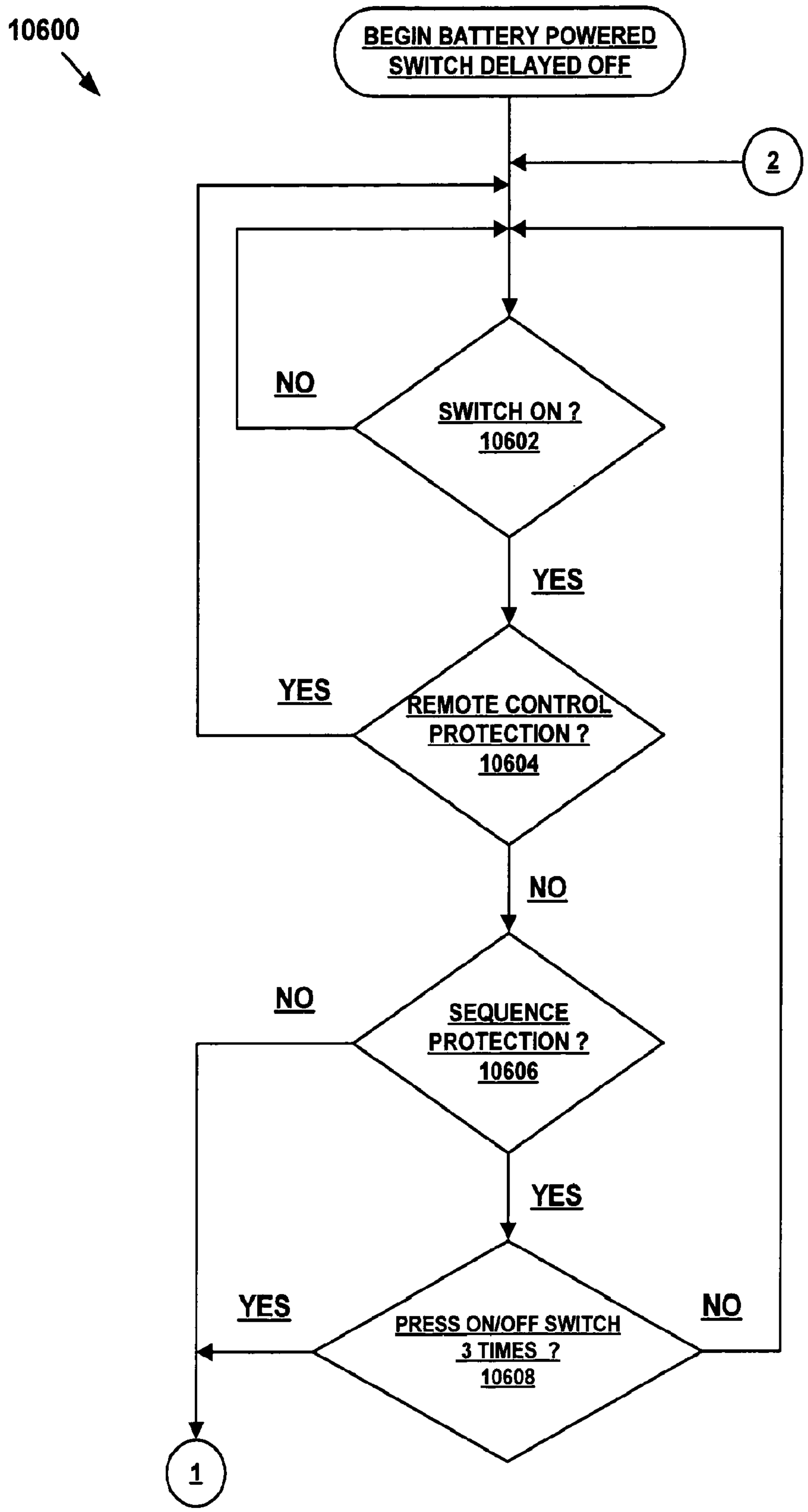
FIGS. 106*a* to 106*c* is a flow chart illustration of an exemplary embodiment of a method of delayed off for the battery powered RF switch.
Figure 106B:
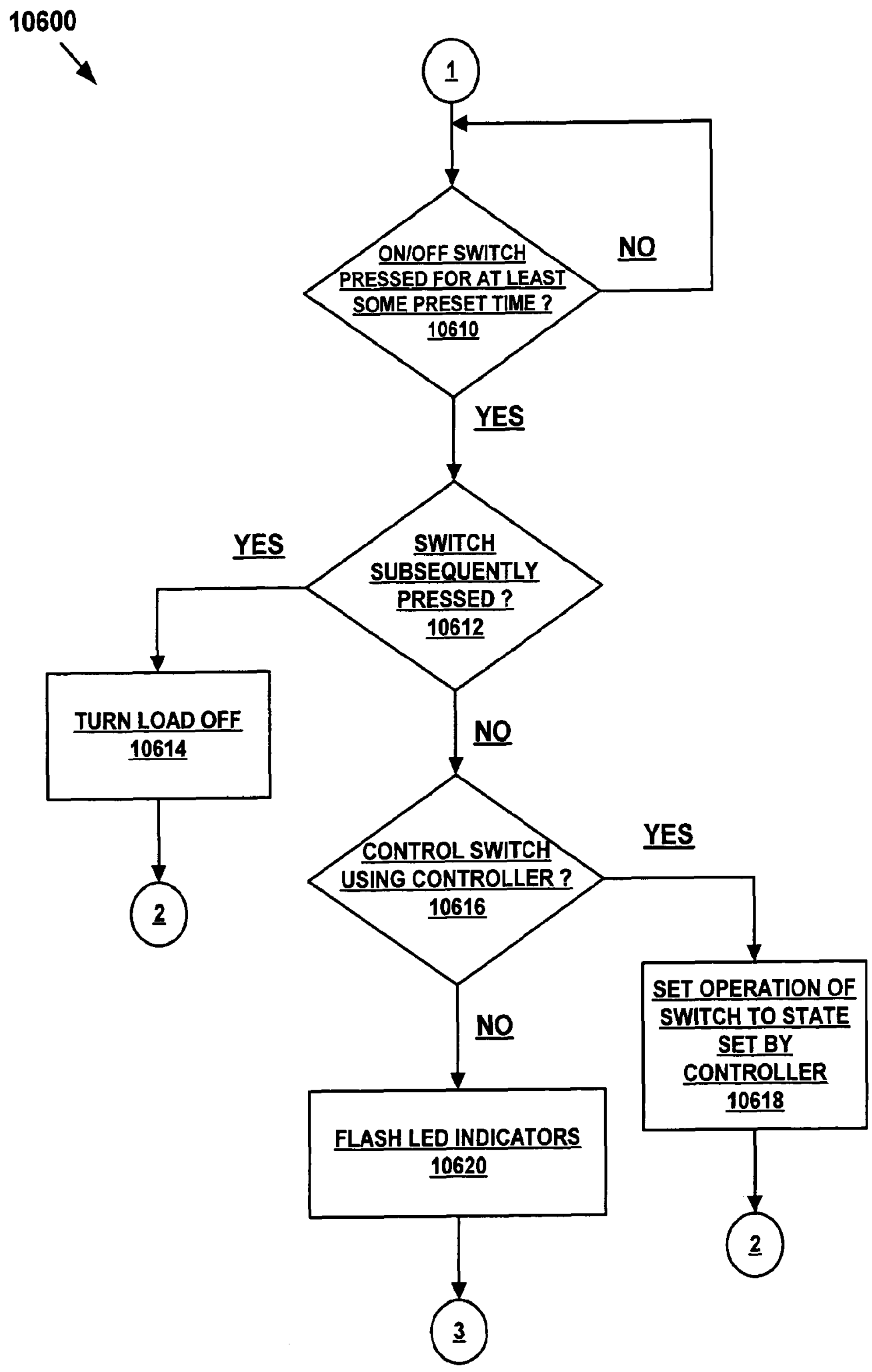
Figure 106C:
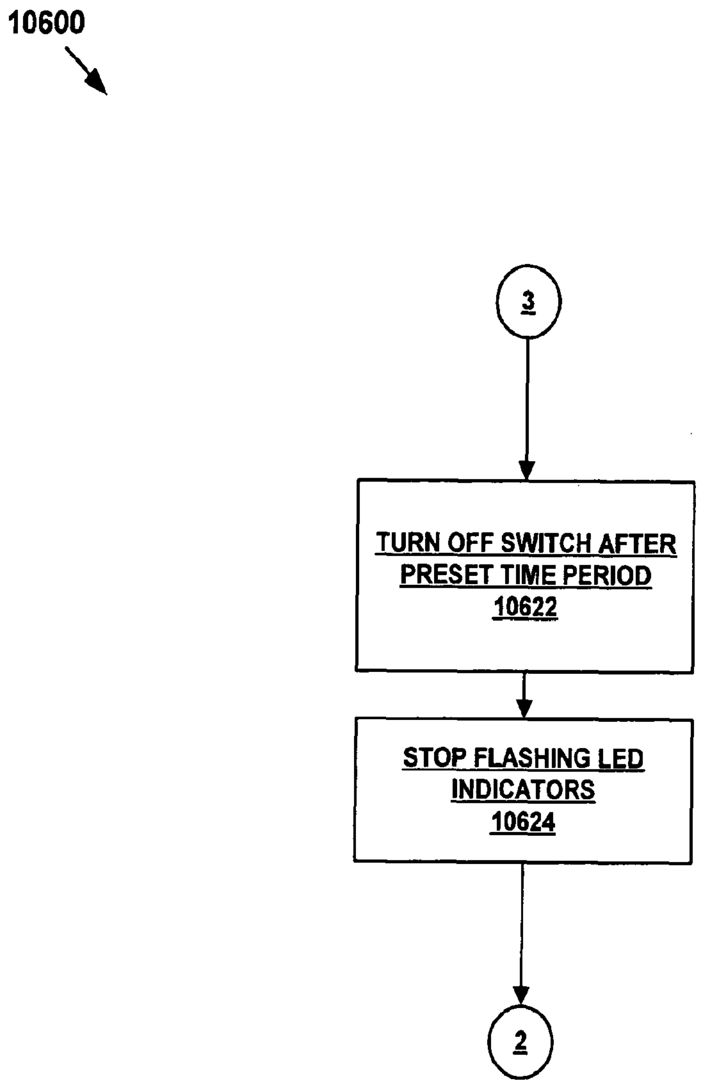

Referring to FIGS. 106*a* to 106*c*, in an exemplary embodiment, during operation of the battery powered RF switch 308, the battery powered RF switch implements a method of delayed off 10600 in which it is first determined if the touchpad 9710 of the battery powered RF switch is in an on position in step 10602. If the touchpad 9710 of the battery powered RF switch 308 is in an on position, then it is then determined if the battery powered RF switch has remote control protection in step 10604. If the battery powered RF switch 308 has remote control protection, then, local manual operation of the battery powered RF switch, using the touchpad 9710, is not permitted.

If the battery powered RF switch 308 does not have remote control protection, then it is then determined if the battery powered RF switch has sequence control protection in step 10606. If the battery powered RF switch 308 has sequence control protection, then, if a user of the battery powered RF switch depresses the touchpad 9710 of the battery powered RF switch three times in step 10608 or if the battery powered RF switch does not have sequence control protection, then it is determined if the touchpad was depressed for at least some predefined minimum time period in step 10610.

If the touchpad 9710 of the battery powered RF switch 308 was depressed for at least some predefined minimum time, then it is determined if the touchpad was also subsequently depressed in step 10612. If the touchpad 9710 of the battery powered RF switch 308 was also subsequently depressed, then the battery powered RF switch controls the RF receptacle 9724 to turn off the load 9726 in step 10614. If the touchpad 9710 of the battery powered RF switch 308 was not also subsequently depressed, then it is determined if the battery powered RF switch 308 will be controlled by one or more of the master nodes 102 in step 10616.

If the battery powered RF switch 308 will be controlled by one or more of the master nodes 102, then the operational state of the battery powered RF switch is controlled by one or more of the master nodes 102 in step 10618. Alternatively, if the battery powered RF switch 308 will not be controlled by one or more of the master nodes 102, then the LED indicator light 9716 of the battery powered RF switch are flashed in step 10620. The battery powered RF switch 308 is then operated to control the RF receptacle 9724 to turn off the load 9726 after a predetermined time period in step 10622, and then the LED indicator light 9716 of the battery powered RF switch are turned off in step 10624.

Figure 107A:
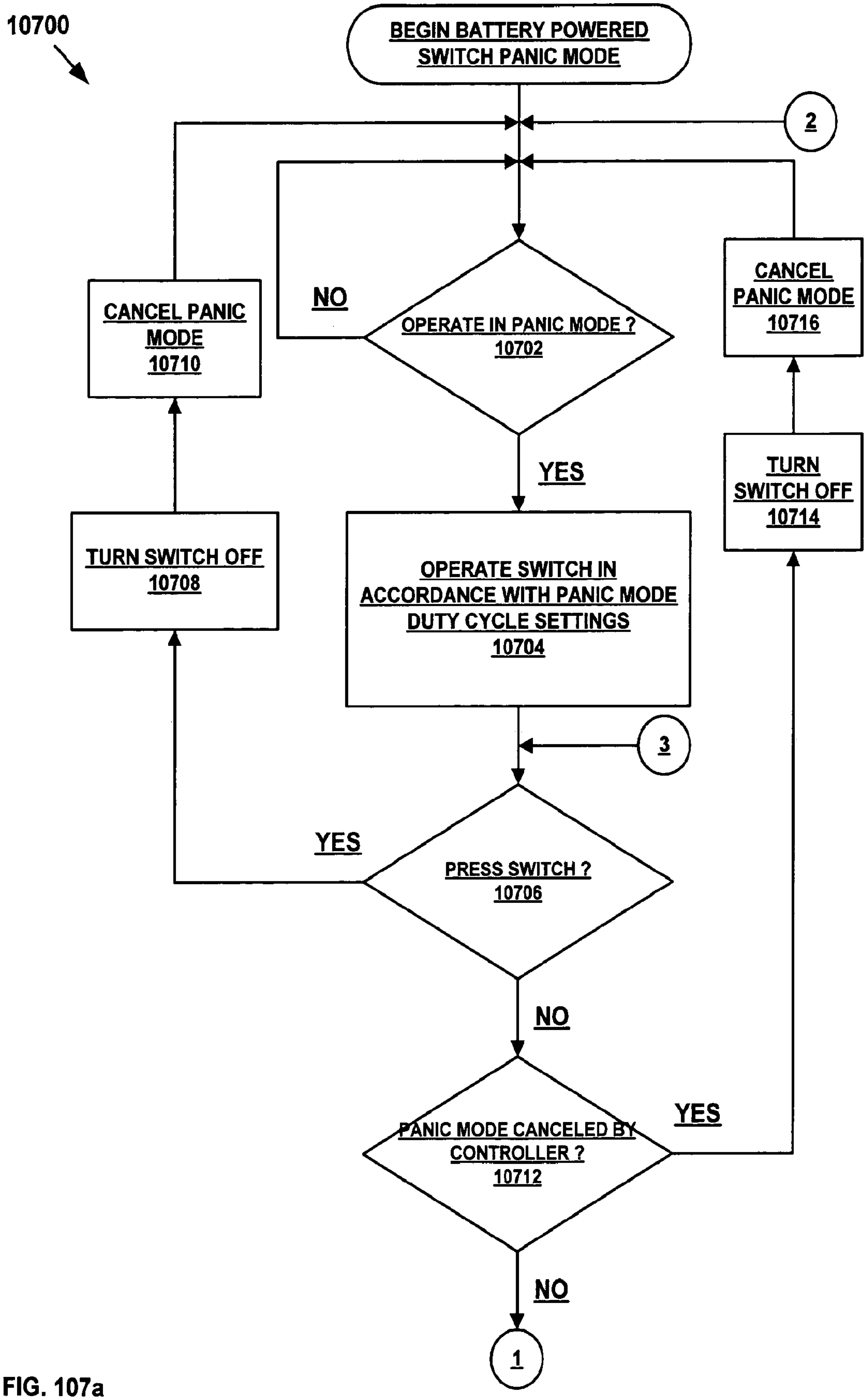
FIGS. 107*a* and 107*b* is a flow chart illustration of an exemplary embodiment of a method of panic mode for the battery powered RF switch.
Figure 107B:
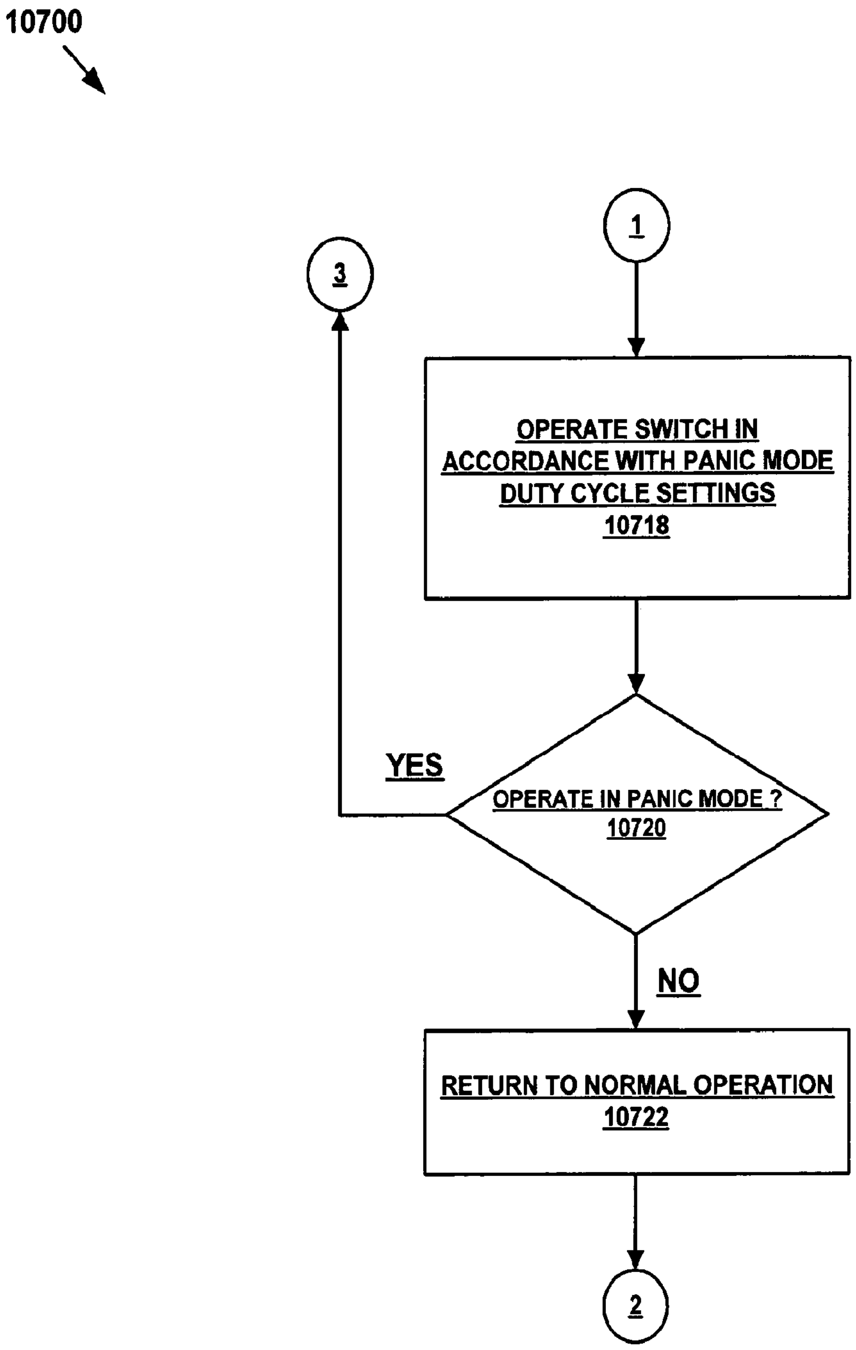

Referring to FIGS. 107*a* to 107*b*, in an exemplary embodiment, during operation of the battery powered RF switch 308, the battery powered RF switch implements a method of panic mode operation method 10700 in which it is first determined if a panic mode operation has been selected by a user of the system 100 in step 10702. In an exemplary embodiment, a panic mode operation may be selected by a user of the system 100 by operating one or more of the master nodes 102 of the system.

If a panic mode operation has been selected by a user of the system 100, then the battery powered RF switch 308 is operated in accordance with the operating parameters assigned to the battery powered RF switch during a panic mode of operation as, for example, contained within the panic database 10108, in step 10704. If the touchpad 9710 of the battery powered RF switch 308 is then depressed in step 10706, then the battery powered RF switch is operated to control the RF receptacle 9724 to decouple the load 9726 from the power supply 9728 in step 10708. The panic mode of operation is then canceled in step 10710.

Alternatively, if the touchpad 9710 of the battery powered RF switch 308 is not then depressed in step 10706, then, if the panic mode of operation is canceled by a master node 102 of the system in step 10712, then the battery powered RF switch is operated to control the RF receptacle 9724 to decouple the load 9726 from the power supply 9728 in step 10714. The panic mode of operation is then canceled in step 10716.

Alternatively, if the panic mode of operation is not canceled by a master node 102 of the system in step 10712, then the battery powered RF switch 308 is operated in accordance with the panic mode duty cycle settings for the battery powered RF switch contained within, for example, the panic database 10108, in step 10718. In an exemplary embodiment, the panic mode duty cycle settings define an amount of time to operate the RF receptacle 9724 to couple the load 9726 to the power supply 9728 and an amount of time to operate the RF receptacle to decouple the load from the power supply. For example, if the load 9726 is a light, operation of the battery powered RF switch 308 in a panic mode of operation will turn the light on and off in accordance with the panic mode duty cycle settings for the battery powered RF switch. If a panic mode of operation is canceled by a user of the system 100 in step 10720, then the operation of the battery powered RF switch 308 will return to normal in step 10722.

Figure 108:
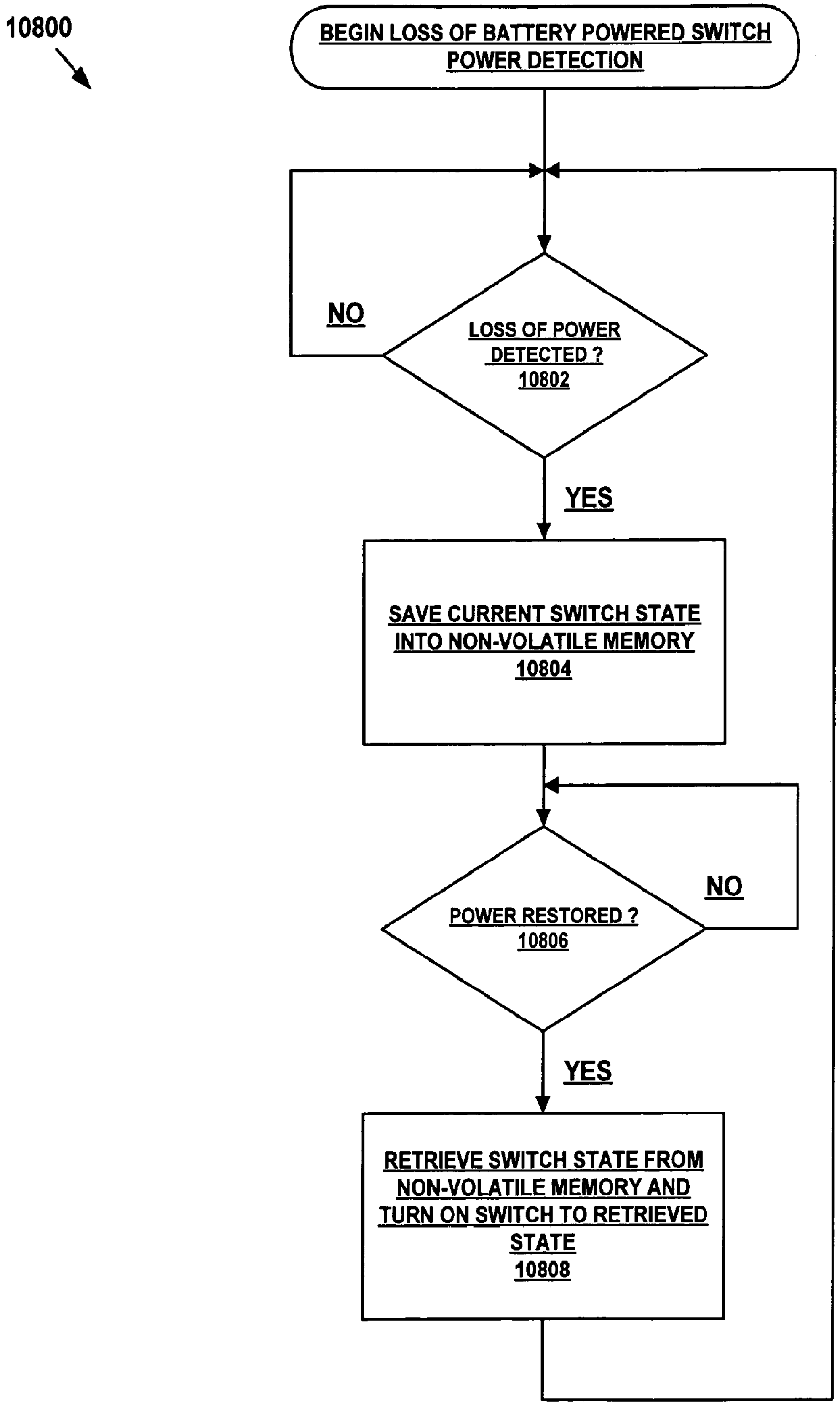
FIG. 108 is a flow chart illustration of an exemplary embodiment of a method of loss of power detection for the battery powered RF switch.

Referring to FIG. 108, in an exemplary embodiment, during operation of the battery powered RF switch 308, the battery powered RF switch implements a method of loss of power detection method 10800 in which it is first determined if a loss of power has occurred, for example, by monitoring the battery 9722 in step 10802. If a loss of power is detected in step 10802, then the current operational state of the battery powered RF switch 308 is stored in the battery powered RF switch operational state database 10110 within the non-volatile memory 9706 of the battery powered RF switch in step 10804. It is then determined if battery power has been restored to the battery powered RF switch 308, for example, by monitoring the battery 9722 in step 10806. If battery power has been restored to the battery powered RF switch 308, then the current operational state of the battery powered RF switch 308 is retrieved from the battery powered RF switch operational state database 10110 within the non-volatile memory 9706, and the operational state of the battery powered RF switch is restored to the operational state defined within the battery powered RF switch operational state database 10110 in step 10808.

In an exemplary embodiment, the design, operation and functionality of the on/off switch 9710, the install button 9712, the uninstall button 9714, and the associate button 9718 may be combined into a single push button.

In an exemplary embodiment, the battery operated RF switch 308 includes one or more elements and/or operational aspects of the RF smart dimmer 306.

Figure 109:
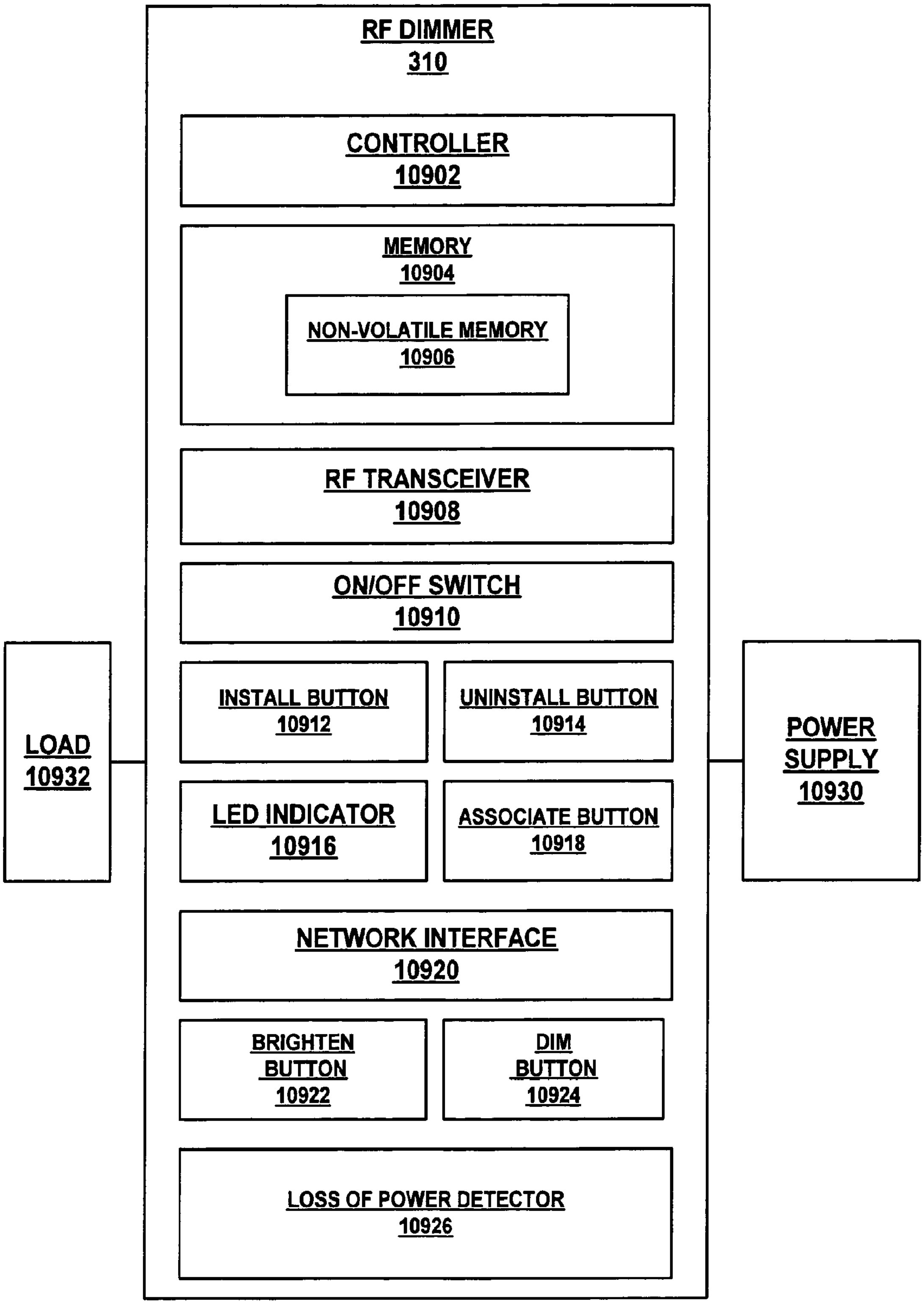
FIG. 109 is a schematic illustration of an exemplary embodiment of an RF dimmer for the system.
Figure 109A:
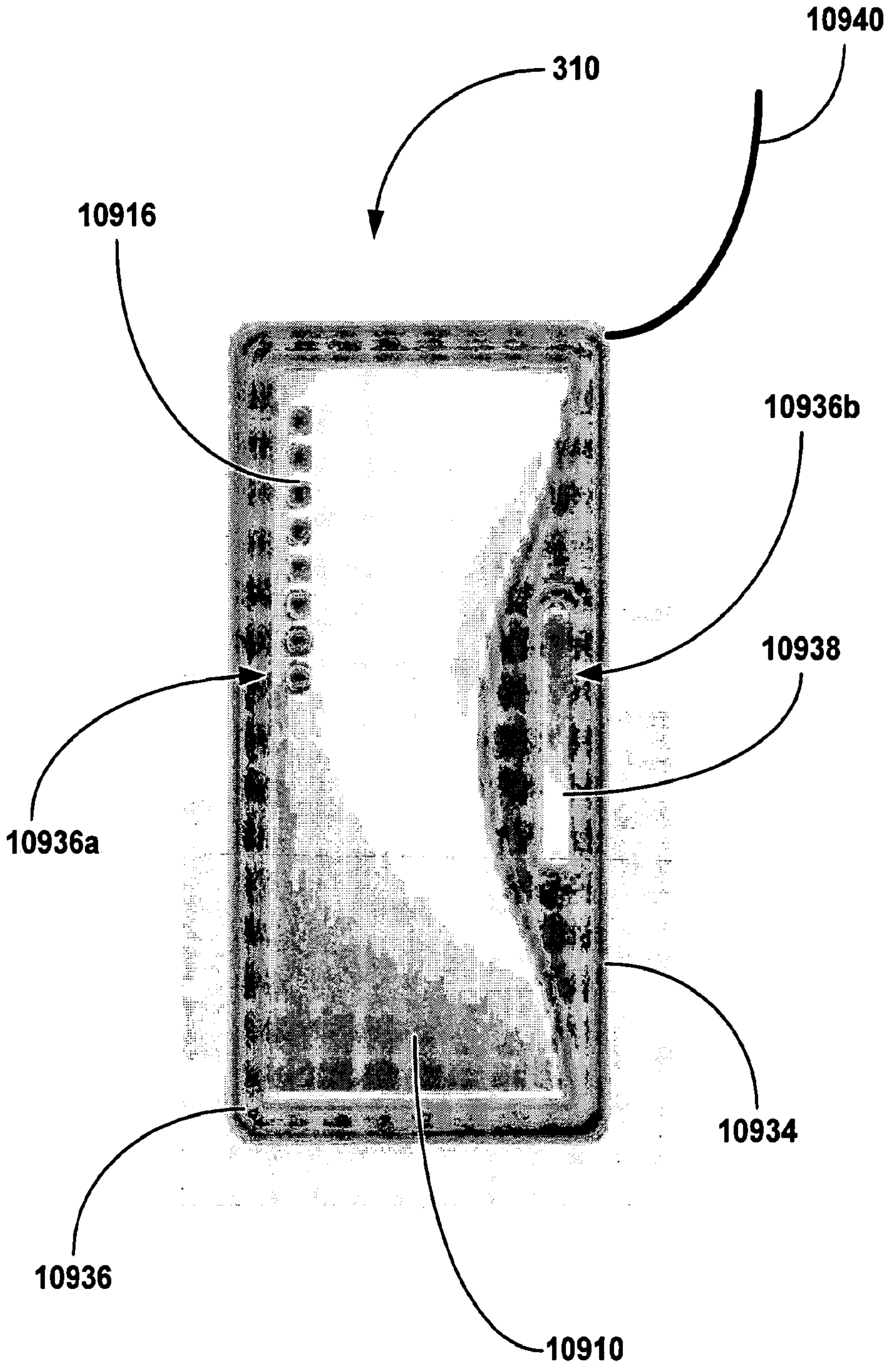
FIG. 109*a* is an illustration of an exemplary embodiment of an RF dimmer.

Referring now to FIG. 109, an exemplary embodiment of an RF dimmer 310 includes a controller 10902 that is operably coupled to: a memory 10904, including a non-volatile memory 10906, an RF transceiver 10908, a light switch touch pad 10910, an install button 10912, an uninstall button 10914, an LED indicator light 10916, an associate button 10918, a network interface 10920, a brighten button 10922, a dimmer button 10924, and a loss of power detector 10926. In an exemplary embodiment, a conventional power supply 10930 is operably coupled to the RF dimmer 310 for powering the operation of the RF dimmer, and the RF dimmer controllably couples and decouples a load 10932 to and from the power supply.

In an exemplary embodiment, the controller 10902 is adapted to monitor and control the operation of the memory 10904, including a non-volatile memory 10906, the RF transceiver 10908, the light switch touch pad 10910, the install button 10912, the uninstall button 10914, the LED indicator light 10916, the associate button 10918, the network interface 10920, the brighten button 10922, the dimmer button 10924, and the loss of power detector 10926. In an exemplary embodiment, the controller 10902 includes one or more of the following: a conventional programmable general purpose controller, an application specific integrated circuit (ASIC), or other conventional controller devices. In an exemplary embodiment, the controller 10902 includes a model ZW0201 controller, commercially available from Zensys A/S.

Figure 110:
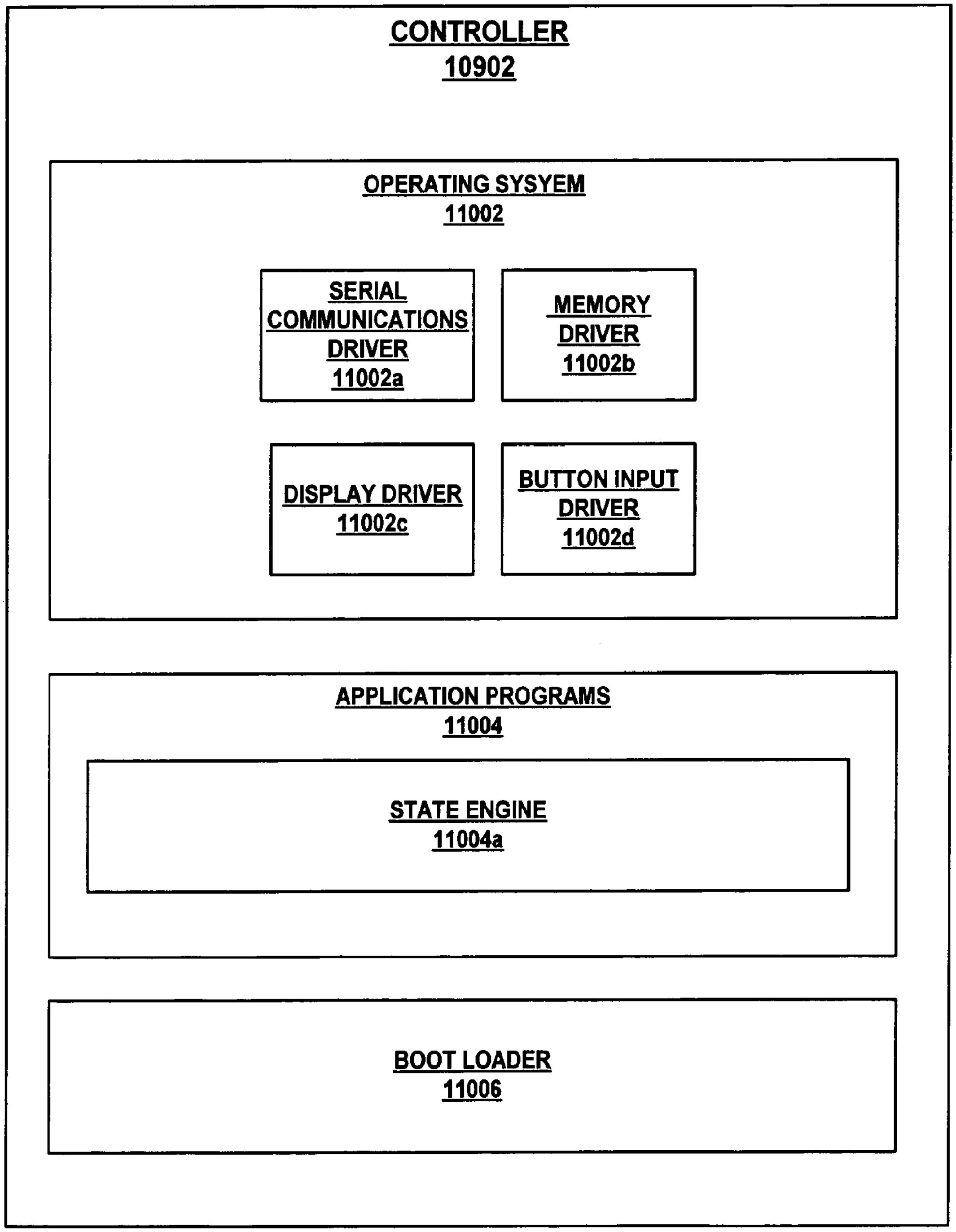
FIG. 110 is a schematic illustration of an exemplary embodiment of the controller of the RF dimmer.

Referring now to FIG. 110, in an exemplary embodiment, the controller 10902 includes an operating system 11002, application programs 11004, and a boot loader 11006. In an exemplary embodiment, the operating system 11002 includes a serial communications driver **11002*a*, a memory driver 11002*b*, a display driver 11002*c*, and a button input driver 11002*d*. In an exemplary embodiment, the serial communications driver 11002*a* controls serial communications using the RF serial transceiver 10908, the memory driver 11002*b* controls the memory 10904, including the non volatile memory 10906, the display driver 11002*c* controls the LED indicator light 10916, and the button input driver 11002*d* debounces button inputs provided by a user using one or more of: the light switch touchpad 10910, the install button 10912, the uninstall button 10914, the associate button 10918, the brighten button 10922, and the dimmer button 10924. In an exemplary embodiment, the serial communications driver 11002*a*** includes a Z-Wave™ serial API driver that implements a Z-Wave™ serial API protocol. The Z-Wave™ serial API driver that implements a Z-Wave™ serial API protocol are both commercially available from Zensys A/S.

In an exemplary embodiment, the application programs 11004 include a state engine **11004*a*. In an exemplary embodiment, the state engine 11004*a* permits a user of one or more of the master nodes 102 to configure, control and monitor the operation of the RF dimmer 310**.

Figure 111:
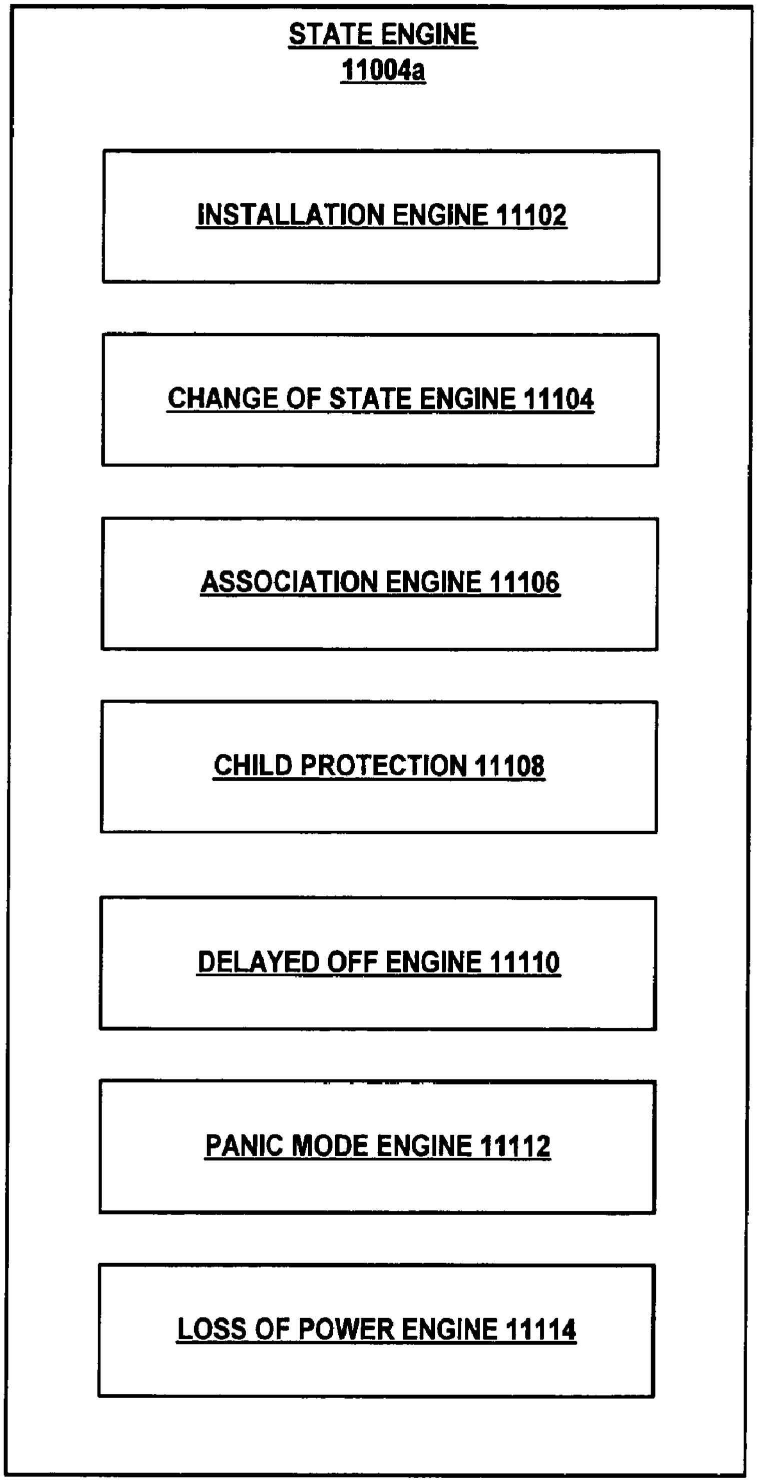
FIG. 111 is a schematic illustration of an exemplary embodiment of the state engine of the controller of the RF dimmer.

Referring now to FIG. 111, in an exemplary embodiment, the state engine **11004*a* includes an installation engine 11102, a change of state engine 11104, an association engine 11106, a child protection engine 11108, a delayed off engine 11110, a panic mode engine 11112, and a loss of power detection engine 11114**.

In an exemplary embodiment, the installation engine 11102 monitors the operating state of the RF dimmer 310 and provides an indication to a user of the system 100 as to whether or not the RF dimmer has been installed in the system. In this manner, the installation engine 11102 facilitates the installation of the RF dimmer 310 into the system 100.

In an exemplary embodiment, the change of state engine 11104 monitors the operating state of the RF dimmer 310 and, upon a change in operating state, transmits information to one or more of the master nodes 102 regarding the configuration of the RF dimmer.

In an exemplary embodiment, the association engine 11106 is adapted to monitor and control the operation of the RF dimmer 310 when the RF dimmer is associated with one or more communication pathway 702.

In an exemplary embodiment, the child protection engine 11108 is adapted to monitor and control the operation of the RF dimmer 310 when the RF dimmer is operated in a child protection mode of operation.

In an exemplary embodiment, the delayed off engine 11110 is adapted to monitor and control the operation of the RF dimmer 310 when the RF dimmer is operated in a delayed off mode of operation.

In an exemplary embodiment, the panic mode engine 11112 is adapted to monitor and control the operation of the RF dimmer 310 when the RF dimmer is operated in a panic mode of operation.

In an exemplary embodiment, the loss of power detection engine 11114 is adapted to monitor the operating state of the RF dimmer 310 and, upon the loss of power, save the operating state of the RF dimmer into the non volatile memory 10906. Upon the resumption of power to the RF dimmer 310, the loss of power detection engine 11114 then retrieves the stored operating state of the RF dimmer 310 from the non volatile memory 10906 and restores the operating state of the RF dimmer.

Figure 112:
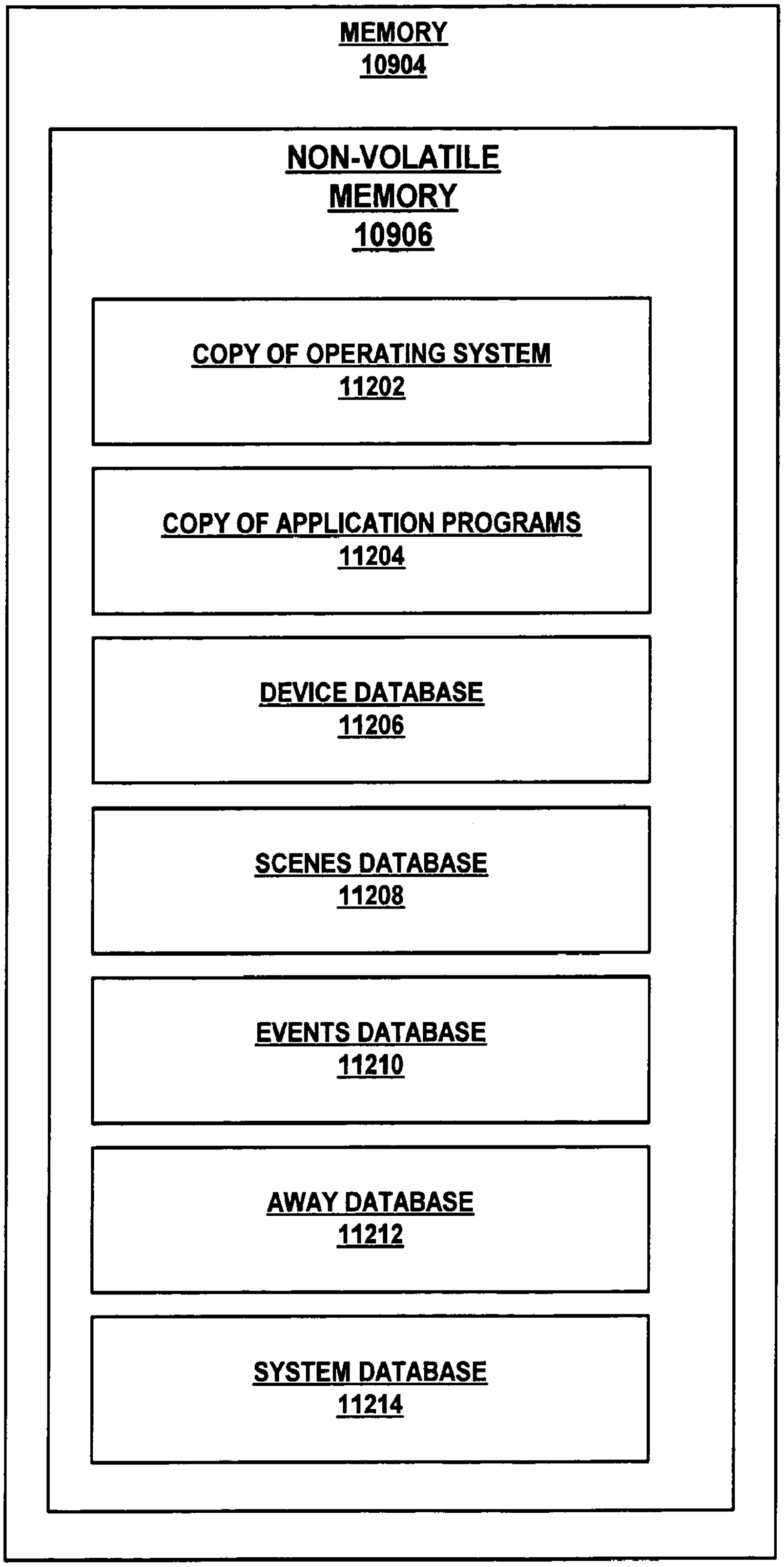
FIG. 112 is a schematic illustration of an exemplary embodiment of the memory of the RF dimmer.

In an exemplary embodiment, the memory 10904, including the non volatile memory 10906, is operably coupled to and controlled by the controller 10902. In an exemplary embodiment, as illustrated in FIG. 112, the memory 10904, including the non volatile memory 10906, includes a copy of the operating system 11202, a copy of the application programs 11204, a device database 11206, a scenes database 11208, an events database 11210, an away database 11212, and a system database 11214. In an exemplary embodiment, the memory 10904 includes a model 24LC256 non volatile memory, commercially available from Microchip.

Figure 113:
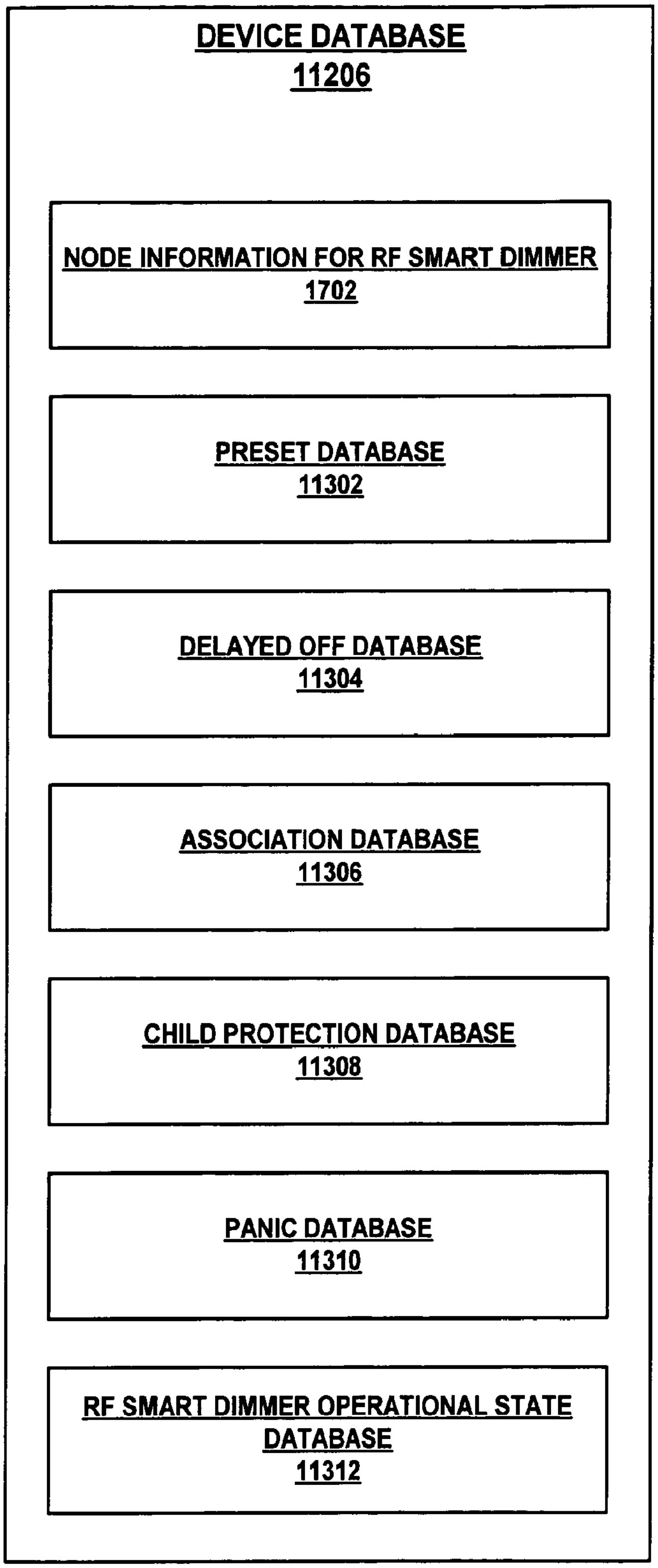

In an exemplary embodiment, the device database 11206 includes information that is specific to the RF dimmer 310. In an exemplary embodiment, as illustrated in FIG. 113, the device database 11206 includes the node information frame 1702 for the RF dimmer 310, a delayed off database 11304 for the RF dimmer, an association database 11306 for the RF dimmer, a child protection database 11308 for the RF dimmer, a panic database 11310 for the RF dimmer, and an operating state database 11312 for the RF dimmer. In an exemplary embodiment, the delayed off database 11304 for the RF dimmer 310 includes information regarding the operating characteristics of the RF dimmer when delayed off is enabled. In an exemplary embodiment, the association database 11306 for the RF dimmer 310 includes information regarding the communication pathways 702 associated with the RF dimmer. In an exemplary embodiment, the child protection database 11308 for the RF dimmer 310 includes information regarding the operating characteristics of the RF dimmer when child protection is enabled. In an exemplary embodiment, the panic database 11310 for the RF dimmer 310 includes information regarding the operating characteristics of the RF dimmer when panic is enabled. In an exemplary embodiment, the operating state database 11312 for the RF dimmer 310 includes information representative of the operating state of the RF dimmer.

In an exemplary embodiment, the scenes database 11208 includes information regarding the scenes 802 that include the RF dimmer 310. In an exemplary embodiment, the events database 11210 includes information regarding the events 1002 that include the RF dimmer 310. In an exemplary embodiment, the away database 11212 includes information regarding the away group 1402 that includes the RF dimmer 310. In an exemplary embodiment, the system database 11214 includes system information that includes the RF dimmer 310.

In an exemplary embodiment, the RF transceiver 10908 is operably coupled to and controlled by the controller 10902. In an exemplary embodiment, the RF transceiver 10908 transmits and receives RF communications to and from other master and slave nodes, 102 and 104, respectively. In an exemplary embodiment, the RF transceiver 10908 may, for example, include one or more of the following: a conventional RF transceiver, and/or the model ZW0201 RF transceiver commercially available from Zensys A/S.

In an exemplary embodiment, the light switch touch pad 10910 is a conventional light switch touch pad and is operably coupled to and controlled and monitored by the controller 10902. In an exemplary embodiment, the light switch touch pad 10910 permits an operator of the RF dimmer 310, in combination with the system 100, to select the desired mode of operation of the load 10932.

In an exemplary embodiment, the install button 10912 is operably coupled to and controlled and monitored by the controller 10902. In an exemplary embodiment, the install button 10912 permits an operator of the RF dimmer 310, in combination with the system 100, to install the RF dimmer into the system.

In an exemplary embodiment, the uninstall button 10914 is operably coupled to and controlled and monitored by the controller 10902. In an exemplary embodiment, the uninstall button 10914 permits an operator of the RF dimmer 310, in combination with the system 100, to uninstall the RF dimmer from the system.

In an exemplary embodiment, the LED indicator light 10916 is operably coupled to and controlled and monitored by the controller 10902.

In an exemplary embodiment, the associate button 10918 is operably coupled to and controlled and monitored by the controller 10902. In an exemplary embodiment, the associate button 10918 permits an operator of the RF dimmer 310, in combination with the system 100, to associate the RF dimmer with communication pathways 702 in the system.

In an exemplary embodiment, the network interface 10920 is operably coupled to and controlled and monitored by the controller 10902. In an exemplary embodiment, the network interface 10920 permits the RF dimmer 310, in combination with the system 100, to be networked with other device within and outside of the system.

In an exemplary embodiment, the brighten button 10922 is operably coupled to and controlled and monitored by the controller 10902. In an exemplary embodiment, the brighten button 10922 permits an operator of the RF dimmer 310, in combination with the system 100, to increase the level of current provided by the power supply 10930 to the load 10932.

In an exemplary embodiment, the dimming button 10924 is operably coupled to and controlled and monitored by the controller 10902. In an exemplary embodiment, the dimming button 10924 permits an operator of the RF dimmer 310, in combination with the system 100, to decrease the level of current provided by the power supply 10930 to the load 10932.

In an exemplary embodiment, the loss of power detector 10926 is operably coupled to and controlled and monitored by the controller 10902. In an exemplary embodiment, the loss of power detector 10926 permits an operator of the RF dimmer 310, in combination with the system 100, to detect a loss of electrical power from the power supply 10930.

Figure 114:
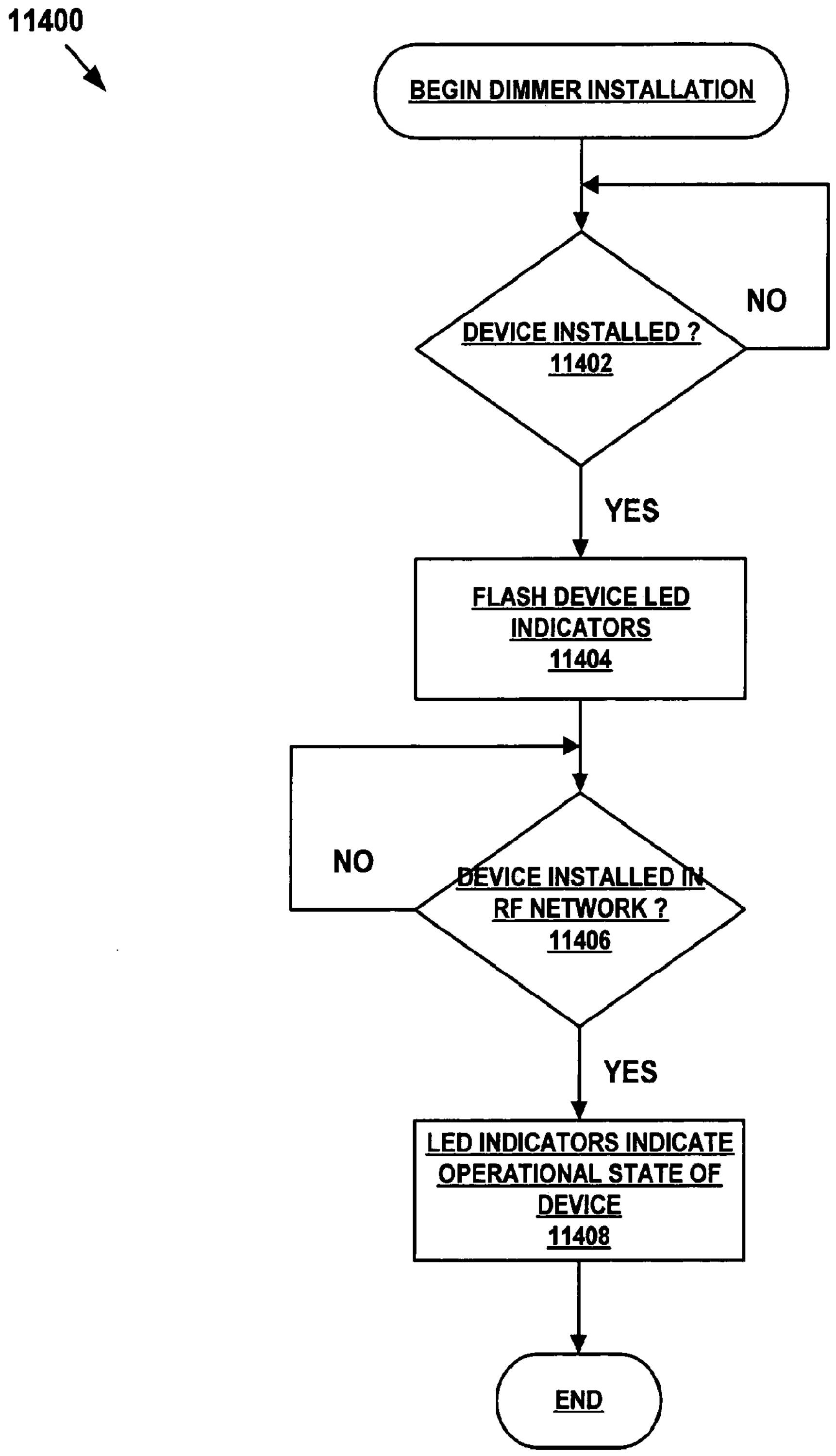

Referring to FIG. 114, in an exemplary embodiment, during operation of the RF dimmer 310, the RF dimmer implements a method of installation 11400 in which, if the RF dimmer has been operably coupled to the power supply 10230, then the LED indicator lights 10916 are operated to indicate this operational state in steps 11402 and 11404. Then, if the RF dimmer 310 has been installed in the system 100, then the LED indicator lights 10916 are operated to indicate this operational state in steps 11406 and 11408. In an exemplary embodiment, the LED indicator lights 10916 flash on an off to indicate the operational state in steps 11402 and 11404, and the LED indicator lights 10916 are turned on to indicate the operational state in steps 11406 and 11408. In this manner, an operator of the system 100 is provided with a visual and highly effective indication of the operational state of the RF dimmer 310 that is local to the RF dimmer. This permits an installer of the RF dimmer 310, in a large house or commercial building, with an effective means of determining the operational state of the RF dimmer that is both local to the RF dimmer and avoids the need to interrogate a master node 102 to determine the operational state.

Figure 115:
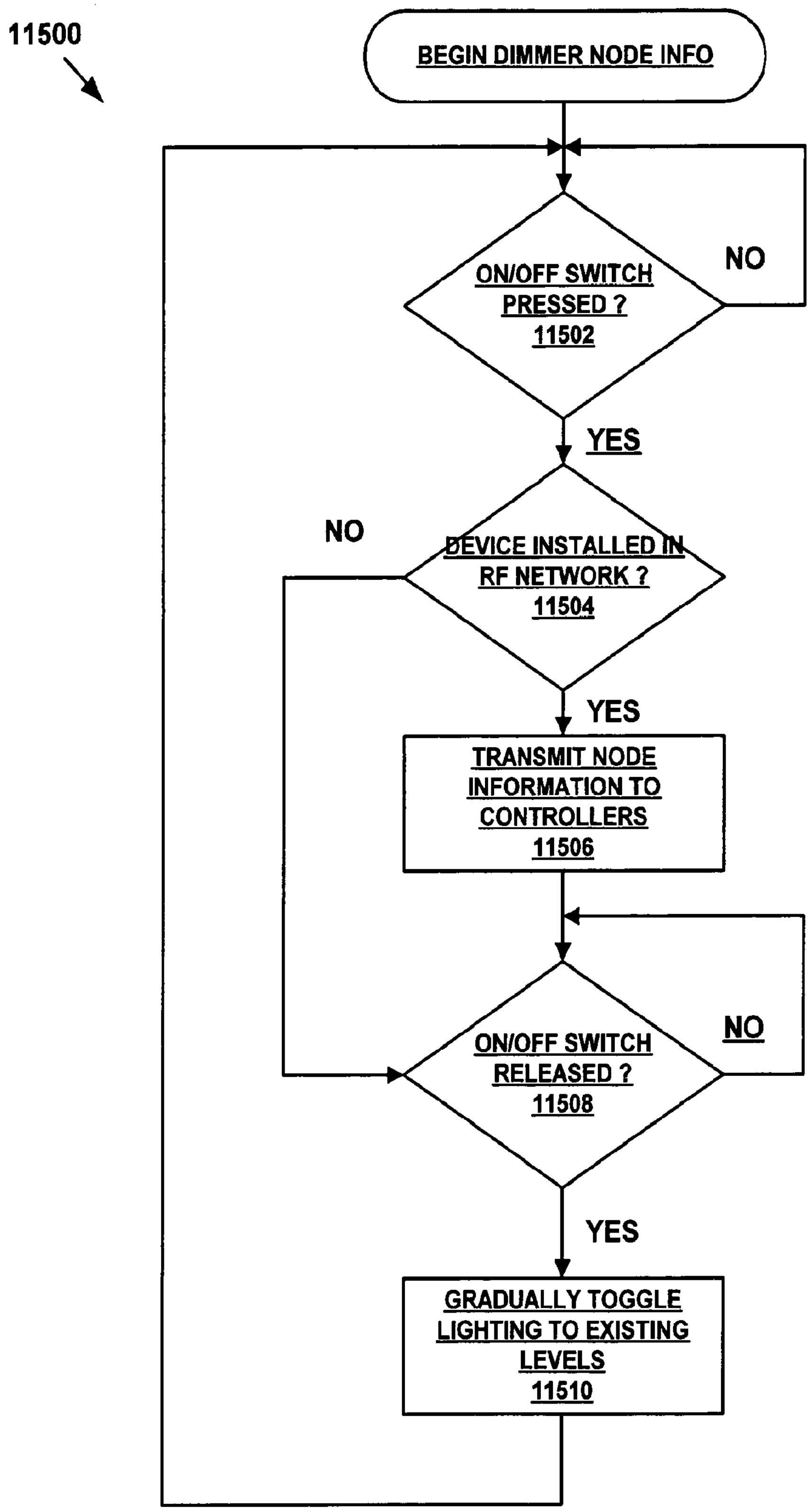

Referring to FIG. 115, in an exemplary embodiment, during operation of the RF dimmer 310, the RF dimmer implements a method of operation 11500 in which it is determined if the on/off switch 10910 of the RF dimmer has been depressed in step 11502. If the on/off switch 10910 of the RF dimmer 310 has been depressed, then it is determined if the RF dimmer has been installed in the system 100 in step 11504. If the RF dimmer 310 has been installed in the system 100, then the node information frame 1702 for the RF dimmer is transmitted to one or more of the master nodes 102 of the system 100 using the RF transceiver 10908 in step 11506.

Alternatively, if the RF dimmer 310 has not been installed in the system 100, or after the node information frame 1702 for the RF dimmer is transmitted to one or more of the master nodes 102 of the system 100, it is determined if the on/off switch 10910 of the RF dimmer has been released in step 11508. If the on/off switch 10910 of the RF dimmer 310 has been released, then the RF dimmer operably gradually couples the power supply 10930 to the load 10932 in accordance with the preset levels in step 11510. For example, if the load 10932 is a light, in step 11510, the RF dimmer 310 gradually increases the lighting level of the light to the preset level.

Figure 116:
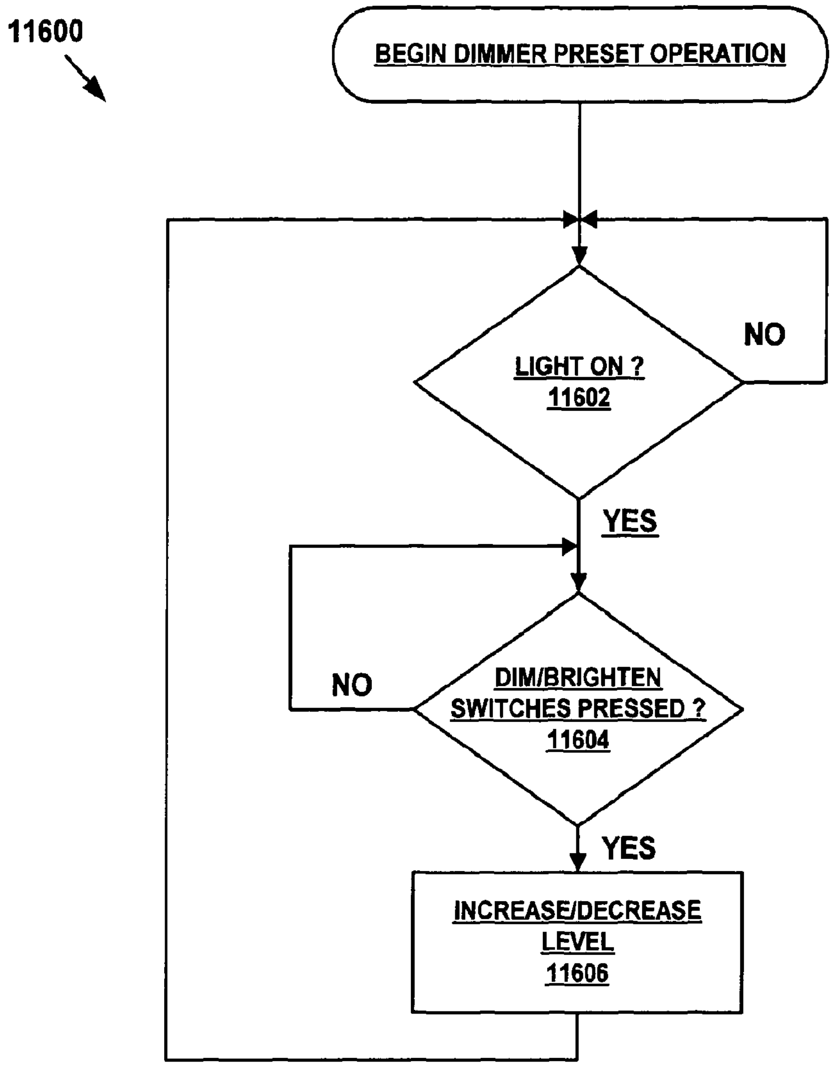

Referring to FIG. 116, in an exemplary embodiment, during operation of the RF dimmer 310, the RF dimmer implements a method of operation 11600 in which it is determined if the RF dimmer 310 is operably coupling the power supply 10930 to the load 10932 in step 11602. For example, if the load 10932 is a light, in step 11602, it is determined if the light is on. If the RF dimmer 310 is operably coupling the power supply 10930 to the load 10932, then it is determined if a user of the RF dimmer 310 has depressed the brighten or dimming buttons, 10922 or 10924, respectively, in step 11604. If a user of the RF dimmer 310 has depressed the brighten or dimming buttons, 10922 or 10924, respectively, then the RF dimmer increases or decreases the level of current supplied to the load 8232 by the power supply 8203 in step 11606. For example, in step 11606, if the load 10932 is a light, then, if the brighten button 10922 was depressed, the lighting level is increased. Alternatively, for example, in step 11606, if the load 10932 is a light, then, if the dimming button 10924 was depressed, the lighting level is decreased.

Referring to FIGS. 117*a* to 117*c*, in an exemplary embodiment, during operation of the RF dimmer 310, the RF dimmer implements a method of delayed off 11700 in which it is first determined if the touchpad 10910 of the RF dimmer is in an on position in step 11702. If the touchpad 10910 of the RF dimmer 310 is in an on position, then it is then determined if the RF dimmer has remote control protection in step 11704. If the RF dimmer 310 has remote control protection, then, local manual operation of the RF dimmer is not permitted.

If the RF dimmer 310 does not have remote control protection, then it is then determined if the RF dimmer has sequence control protection in step 11706. If the RF dimmer 310 has sequence control protection, then, if a user of the RF dimmer depresses the touchpad 10910 of the RF dimmer three times in step 11708 or if the RF dimmer does not have sequence control protection, then it is determined if the touchpad was depressed for at least some predefined minimum time period in step 11710.

If the touchpad 11710 of the RF dimmer 310 was depressed for at least some predefined minimum time, then it is determined if the touchpad was also subsequently depressed in step 11712. If the touchpad 10910 of the RF dimmer 310 was also subsequently depressed, then the load 10932 that is operably coupled to the RF dimmer 310 is turned off in step 11714. If the touchpad 10910 of the RF dimmer 310 was not also subsequently depressed, then it is determined if the RF dimmer 310 will be controlled by one or more of the master nodes 102 in step 11716.

If the RF dimmer 310 will be controlled by one or more of the master nodes 102, then the operational state of the RF dimmer is controlled by one or more of the master nodes 102 in step 11718. Alternatively, if the RF dimmer 310 will not be controlled by one or more of the master nodes 102, then the LED indicator light 10916 of the RF dimmer are flashed in step 11720. The RF dimmer 310 is then operated to turn off the load 10932 operably coupled to the RF dimmer after a predetermined time period in step 11722, and then the LED indicator light 10916 of the RF dimmer are turned off in step 11724.

Referring to FIGS. 118*a*-118*b*, in an exemplary embodiment, during operation of the RF dimmer 310, the RF dimmer implements a method of association 11800 in which it is first determined if the RF dimmer is associated with a plurality of slave nodes 104, e.g., slave nodes 104*a* and 104*b*, and thereby is associated with a plurality of communication pathways, e.g., communication pathways 702*a* and 702*b*, in step 11802. If the RF dimmer 310 is associated with a plurality of slave nodes 104 and thereby is associated with a plurality of communication pathways 702, then a communication from the source node 706 that is principally directed to, and directly affects, only one of the destination nodes 708*a*, is transmitted by multicasting the communication to all of the nodes associated with the RF smart dimmer in step 9304. I.e., the communication is transmitted by the RF dimmer 310 through all of the communication pathways, 702*a* and 702*b*, that the RF dimmer is associated with thereby transmitting the communication to the slave nodes, 104*a* and 104*b*, and the destination nodes, 708*a* and 708*b*. The communication is then single-casted to only the nodes directly affected by the communication in step 11806. I.e., the communication is only transmitted by the RF dimmer 310 through the communication pathway 702*a* thereby transmitting the communication to the slave node 104*a* and the destination node 708*a*. In this manner, the communication of the information to the affected nodes in the system 100 is assured by performing a multi-cast prior to a single-cast.

Referring to FIG. 119, in an exemplary embodiment, during operation of the RF dimmer 310, the RF dimmer implements a method of child protection 11900 in which it is first determined if the RF dimmer has active child protection functionality in step 11902. If the RF dimmer 310 has active child protection functionality, then it is then determined if the RF dimmer has sequence control or remote control child protection functionality in step 11904.

If the RF dimmer 310 has sequence control child protection functionality, then, in order to permit local manual operation of the RF dimmer, a user must depress the touchpad 10910 three times in step 11906. If a user of the RF dimmer 310 depresses the touchpad 10910 three times in step 11906, then local manual operation of the RF dimmer is permitted in step 11908.

Alternatively, if the RF dimmer 310 has remote control child protection functionality, then, local manual operation of the RF dimmer is not permitted. Consequently, if the RF dimmer 310 has remote control child protection functionality, then local manual operation of the RF dimmer is not permitted in step 11910. As a result, control of the RF dimmer 310 is provided by one or more of the master nodes 102 of the system 100.

Referring to FIGS. 120*a* to 120*b*, in an exemplary embodiment, during operation of the RF dimmer 310, the RF dimmer implements a method of panic mode operation method 12000 in which it is first determined if a panic mode operation has been selected by a user of the system 100 in step 12002. In an exemplary embodiment, a panic mode operation may be selected by a user of the system 100 by operating one or more of the master nodes 102 of the system.

If a panic mode operation has been selected by a user of the system 100, then the RF dimmer 310 is operated in accordance with the operating parameters assigned to the RF dimmer during a panic mode of operation as, for example, contained within the panic database 11310, in step 12004. If the touchpad 10910 of the RF dimmer 310 is then depressed in step 12006, then the RF dimmer is operated to decouple the load 10932 from the power supply 10930 in step 12008. The panic mode of operation is then canceled in step 12010.

Alternatively, if the touchpad 10910 of the RF dimmer 310 is not then depressed in step 12006, then, if the panic mode of operation is canceled by a master node 102 of the system in step 12012, then the RF dimmer is operated to decouple the load 10932 from the power supply 10930 in step 12014. The panic mode of operation is then canceled in step 12016.

Alternatively, if the panic mode of operation is not canceled by a master node 102 of the system in step 12012, then the RF dimmer 310 is operated in accordance with the panic mode duty cycle settings for the RF dimmer contained within, for example, the panic database 11310, in step 12018. In an exemplary embodiment, the panic mode duty cycle settings define an amount of time to couple the load 10932 to the power supply 10930 and an amount of time to decouple the load from the power supply. For example, if the load 10932 is a light, operation of the RF dimmer 310 in a panic mode of operation will turn the light on and off in accordance with the panic mode duty cycle settings for the RF dimmer. If a panic mode of operation is canceled by a user of the system 100 in step 12020, then the operation of the RF dimmer 310 will return to normal in step 12022.

Referring to FIG. 121, in an exemplary embodiment, during operation of the RF dimmer 310, the RF dimmer implements a method of loss of power detection method 12100 in which it is first determined if a loss of power has occurred, for example, by monitoring the power supply 10930 in step 12102. If a loss of power is detected in step 12102, then the current operational state of the RF dimmer 310 is stored in the RF dimmer operational state database 11312 within the non-volatile memory 10906 of the RF dimmer in step 12104. It is then determined if power has been restored to the RF dimmer 310, for example, by monitoring the power supply 10930 in step 12106. If power has been restored to the RF dimmer 310, then the current operational state of the RF dimmer is retrieved from the RF dimmer operational state database 11312 within the non-volatile memory 10906, and the operational state of the RF dimmer is restored to the operational state defined within the RF dimmer operational state database 11312 in step 12108.

Referring to FIG. 122, an exemplary embodiment of an RF thermostat 312 includes a conventional commercially available RF thermostat that is operably coupled to a conventional HVAC system 12202 and a conventional power supply 12204. In an exemplary embodiment, the RF thermostat 312 is adapted to monitor and control the operation of the HVAC system 12202 in a conventional manner while operating in the system 100 under the control of one or more of the master nodes 102.

In an exemplary embodiment, the RF thermostat 312 is further adapted to implement one or more of the operational aspects of one or more of the RF switch 302, the RF receptacle 304, the RF smart dimmer 306, the battery operated RF switch 308, and the RF dimmer 310.

In an exemplary embodiment, one or more of the slave nodes 104 of the system 100 are adapted to control and/or monitor the operation of one or more other slave nodes. In this manner, one or more of the slave nodes 104 of the system 100 may act as surrogate master nodes for one or more of the other slave nodes of the system.

Referring to FIG. 123, an exemplary embodiment of a control system 12300 includes the control system 100 and one or more slave nodes 12302 operably coupled to one or more of the master nodes 102 of the control system 100.

Referring to FIG. 124, in an exemplary embodiment, one or more of the master nodes 102 include a power line communication interface (PLC) 12402 that is operably coupled to PLC interfaces 12302*a*, provided in each of the slave nodes, e.g., $\mathbf{12302}_i$, $\mathbf{12302}_{i+1}$, and $\mathbf{12302}_N$, for communication with the slave nodes, using a conventional power supply circuit 12404, including a neutral terminal 12406, a hot terminal 12408, and a load 12410 coupled to the neutral and hot terminals.

Referring to FIG. 125, in an exemplary embodiment, during operation of the control system 12300, the master node 102 communicates with one or more of the slave nodes 12302 using the loop current 12502 of the power supply circuit 12404 and the slave nodes communicate with the master node 102 using the loop voltage 12504 of the power supply circuit. In particular, master to slave communication 12506 occurs when the line voltage 12508 of the power supply circuit 12404 has zero crossings 12510 and slave to master communication 12512 occurs when the line voltage 12508 of the power supply circuit 12404 has zero crossings 12514.

In an exemplary embodiment, those elements and operational aspects of the control system 12300 that relate to and support the master to slave communication 12506 and the slave to master communication 12512 are provided as disclosed in U.S. Pat. No. 6,815,625, the disclosure of which is incorporated herein by reference.

In an exemplary embodiment, the slave nodes 12302 of the control system 12300 include one or more of the following: the RF switch 302, the RF receptacle 304, the RF smart dimmer 306, the battery operated RF switch 308, the RF dimmer 310, and/or the RF thermostat 312 with the network interfaces, 5720, 6920, 8220, 9720, 10920, and/or 12220 including PLC interfaces 12302*a*.

In an exemplary embodiment, one or more of the operational elements and/or functionalities of the systems 100 and/or 12300 are localized and/or non-localized to thereby provide a system having elements and/or functionalities that are distributed among the elements, e.g., the master and slave nodes, 102 and 104, respectively, of the system.

In several exemplary embodiment, the radio frequency communication interfaces of the systems, 100 and 12300, may in addition, or in the alternative, use other types of signals such as, for example, infrared, acoustic, or other signals that do not employ a power line conductor.

Referring to FIGS. 126 and 127, in an exemplary embodiment, the battery powered RF switch 308 includes a top housing 12702 that defines upper and lower mounting holes, 12702*a* and 12702*b*, a bottom housing 12704 that defines upper and lower mounting grooves, 12704*a* and 12704*b*, a printed circuit board assembly 12706 that includes switch sensor buttons 12706*a*, a dimmer button 12706*b*, and an LED indicator 12706*c*, an on/off switch 12708, batteries, 12710*a* and 12710*b*, a battery retaining bracket 12712, a double-sided adhesive layer 12714, and mounting screws, 12716*a* and 12716*b*.

Referring to FIGS. 128 and 129, in an exemplary embodiment, the battery powered RF switch 308 is mounted onto a surface 12800 by adhesively affixing the switch to the surface using the adhesive layer 12714, threadably affixing the switch to the surface using the mounting screws, 12716*a* and 12716*b*, and then placing a conventional switch cover face plate 12802, over and around the periphery of the switch. In this manner, the battery powered RF switch 308 may be positioned virtually anywhere on the surface 12800, and then easily relocate to another location on the surface or another surface entirely.

Referring to FIGS. 130 and 131, in an exemplary embodiment, the battery powered RF switch 308 may be mounted onto the surface 12800 next to a conventional wall switch 13002 and then a conventional switch cover face plate 13004 may be placed, over and around the periphery of the switches. In this manner, the battery powered RF switch 308 may be ganged with conventional wall switches.

Referring to FIGS. 132 and 133, in an exemplary embodiment, the battery powered RF switch 308 may be mounted onto the surface 12800 next to a plurality of conventional wall switches, 13002*a* and 13002*b*, and then a conventional switch cover face plate 13202 may be placed, over and around the periphery of the switches. In this manner, the battery powered RF switch 308 may be ganged with a plurality of conventional wall switches.

Referring now to FIGS. 134*a*-134*b*, in an exemplary embodiment, during the operation of the hand held RF controller 202, after a user sequentially selects DEVICES 2004 and ASSOCIATE 2004*b*, using the menu-based program 2000, the controller implements a method 13400 in which the controller permits a user to associate devices, such as, for example, master and slave nodes, 102 and 104, respectively, to define a communication pathway 702 within the system 100. In particular, in step 13402 a user of the hand held RF controller 202 may select a source node 706 for the communication pathway 702. After a user of the hand held RF controller 202 selects a source node 706 for the communication pathway 702, if the source node is a battery power device such as, for example, the battery powered RF switch 308, the user of the hand held RF controller 202 will then depress the associate button on the battery powered source node 706 in step 13406.

If the source node 706 is not a battery power device or after the user of the hand held RF controller 202 has depressed the associate button on the battery powered source node, then the user of the hand held RF controller may select a destination node 708 for the communication pathway 702 in step 13408. After a user of the hand held RF controller 202 has selected a destination node 708 for the communication pathway 702, then the configuration of the communication pathways is loaded into respective memories of the controller, the source node 706, and the destination node in step 13410.

In an exemplary embodiment according to one or more aspects of the present disclosure, a lighting system may comprised one type of node that consists of core functionality and two options that can be enabled to provide additional functionality. The core function may be the control of a relay and a 0-10V control that controls an attached light. Both options may utilize hardware components located on the circuit board of the node and supporting software support. One option may be the sensing of motion and the other option may be the sensing of ambient light. Lighting systems within the scope of the present disclosure may require at least one node to have at least one of the options enabled.

A lighting system may comprise or be associated with one or more zones. A zone is a collection of nodes that may work together to set the level of the lights therein. For example, a zone may include several nodes, where one node may have motion sensing enabled while other nodes may have neither option enabled. While a motion sensing node is detecting motion, it may operate the lights for that node and/or other nodes within or otherwise associated with the zone. In another example, one of the nodes within or otherwise associated with a zone may sense ambient light instead of motion, or possibly in addition to sensing motion. Where ambient light is being detected, the light sensing node may set the level at which all lights in the zone are energized (or dimmed), although when there is no motion sensing enabled within the zone the lights may default to remain partially or fully energized at all times, possibly depending upon the amount of ambient natural light that is detected.

The motion sensing and/or the photo sensing information from one or more nodes may be communicated to other nodes in a lighting zone. This information may drive one or more receiving nodes to set their lights to a certain state, such as fully energized, fully not energized, or at some partially energized or dimmed level. The information may be communicated from the sensing node to other nodes at a regular interval, thereby operating as a heartbeat for the zone, and when the heartbeat is not present the nodes within the zone may respond by de-energizing or turning off the lights. The information in the heartbeat may contain a duration or time period during which the lights are to remain partially or fully energized, and may also contain an indication of the degree to which the lights are to be energized.

The sensing node, and possibly other nodes within a zone, may have two microcontrollers, including a first microcontroller which may operate to control networking of the node with other nodes, and a second microcontroller which may have access to peripheral interfaces. The first microcontroller may be or include a Z-Wave microcontroller, such as model number US-ZM-2102, which is commercially available from Zensys, Inc. of Upper Saddle River, N.J., or Zensys A/S of Copenhagen, Denmark, although other networking microcontrollers are also within the scope of the present disclosure. The second microcontroller may be operable to control the above-mentioned peripherals and interact with the first microcontroller and, as such, may be a master microcontroller for a particular node. The peripheral interfaces may include one or more of: an infrared motion detector; a photo sensor for detecting ambient or natural light; an IR beam detector that may be utilized to switch the motion and/or photo sensors into a programming mode, network inclusion, exclusion and association modes; an LED which may be located behind the IR lens and operable as a status indicator; a relay; and a 0-10 volt control. Communication between the networking microcontroller and the master microcontroller may be achieved via a serial interface, among other means.

The master microcontroller may be utilized independently, without the networking microcontroller being utilized or even present. However, since the networking microcontroller may provide, enable, or otherwise support networking operability, it may allow for the creation of lighting zones.

An exemplary embodiment of the hardware interface may comprise the serial communications to the master microcontroller. In addition to receiving and transmitting pins, there may also be one or more LEDs employed to indicate the presence of serial data being transmitted or received. The pins utilized for such an embodiment may be as described in the table below.

TABLE 1

Exemplary Hardware Interface Pinout

| Function | Pin | Description |
|---|---|---|
| Serial transmit | A | Serial communications transmit pin |
| Serial receive | B | Serial communications receive pin |
| Transmit LED | C | LED indicating that serial transmission is active |
| Receive LED | D | LED indicating that serial reception is active |

With regard to an exemplary embodiment of a serial communications protocol, hardware may be interfaced via a serial port to the master microcontroller. The master microcontroller may possess the functionality necessary to monitor and/or control the relay, the 0-10V control, the motion sensor and the photo sensor, where such peripherals are employed. The master microcontroller may also receive commands from handheld controllers in the network, such as via IR beam.

During operation, in an exemplary embodiment, the master microcontroller may attempt to communicate with the networking microcontroller upon power-up. If no response is received, then the master microcontroller may assume that it is in standalone mode and, therefore, appropriately control the peripherals. The master microcontroller may make one or more attempts, possibly at regular intervals, to communicate to the networking microcontroller, such as in the situation where an error may have previously occurred. The master microcontroller may receive commands from controllers (e.g., via the IR sensor). These commands may be relayed over a serial link to the networking microcontroller.

In an exemplary embodiment, the serial communications parameters may be fixed at 9600 baud, 8 databits, 1 stopbit and no parity. However, other parameters are also within the scope of the present disclosure.

FIG. 135*a* illustrates an exemplary embodiment of the layout of a data frame sent between the networking and master microcontrollers. Each command may be responded to by the receiving microcontroller with either an ACK or a NAK communication. An ACK may be sent in reply when a valid frame has been received and has been successfully acted upon. A NAK may be sent if a frame is invalid or cannot be acted upon. FIG. 135*b* illustrates an exemplary embodiment of a serial ACK frame, and FIG. 135*c* illustrates an exemplary embodiment of a serial NAK frame.

The Start field in the exemplary data frames described above may be employed such that each data frame starts with a value of 0x01. The Length field indicates the length of the frame, which may include the Length field, the Checksum field, and the interposing fields. The Command field may be a unique, one-byte value, and may describe a particular data set or command. The Data field may be zero or more bytes, and may be specific to the command. The Checksum field may be a one-byte checksum that is calculated over the Length field to the last byte of the Data field, possibly being a simple summation of these bytes. The Start, Length and Checksum fields may be non-printable ASCII characters. Other bytes in the frame, such as the Command and Data fields, may be printable ASCII characters, such as a value between 0x20 and 0x7E.

Table 2 below describes several options that may be communicated via the Command field.

TABLE 2

Serial Commands

| Command | Value | Description |
|---|---|---|
| SetRelay | 'A' (0x41) | This command may be utilized by the networking microcontroller to set the state of the relay. The data may be one byte, such as a "1" to energize the relay or a "0" to de-energize the relay. The 0-10 V control may be set to 10 V when the relay is activated and 0 V when deactivated. |
| SetOutput | 'B' (0x42) | This command may be utilized by the networking microcontroller to set the 0-10 V control. The data may be an ASCII representation of the value. For example, if the output is set to 10 V, then the data may be "100" or the 3 bytes 0x31, 0x30, 0x30. A value of 1 V may be represented by the string "10". The relay may be activated when the output is non-zero and deactivated when the output is 0 V. |
| GetMotion | 'C' (0x43) | This command may be utilized by the networking microcontroller to request the current state of motion detection. There may be no associated data. |

TABLE 2-continued

| Serial Commands | | |
|---|---|---|
| Command | Value | Description |
| Motion | (0x44) | This command may be sent by the master microcontroller to inform the networking microcontroller of the current motion detection state. The data may be one byte, such as a "1" to indicate that motion has been detected or a "0" to indicate that no motion has been detected. |
| GetPhoto | 'E' (0x45) | This command may be utilized by the networking microcontroller to request the current ambient light level. There may be no associated data. |
| PhotoLevel | 'F' (0x46) | This command may be sent by the master microcontroller to inform the networking microcontroller of the current ambient light level. The data may be the 0 - 10 V control. The master microcontroller may convert the detected ambient light level to the 0-10 V control. |
| WriteParam | 'G' (0x47) | This command may be utilized by the networking microcontroller to set a configuration parameter. The data may be the ID of the parameter followed by a comma or other delimiter and then the value. Both the ID and the value may be ASCII strings. |
| ReadParam | 'H' (0x48) | This command may be utilized by the networking microcontroller to read a configuration parameter. The data may be the ID of the parameter. |
| ParamValue | 'I' (0x49) | This command may be sent by the master microcontroller to inform the networking microcontroller of the current value of a configuration parameter. The data may be the ID of the parameter followed by a comma or other delimiter and then the value. Both the ID and value may be ASCII strings. |
| NodeInclusion | 'J' (0x4A) | This command may be utilized by the master microcontroller to inform the networking microcontroller that the master microcontroller has received a node inclusion message from a controller (e.g., via IR). There may be no associated data. |
| NodeInfo | 'K' (0x4B) | This command may be utilized by the master microcontroller to inform the networking microcontroller that the master microcontroller has received a node info message from a controller (e.g., via IR). There may be no associated data. |
| Indicate | 'M' (0x4D) | This command may be utilized by the networking microcontroller to set the state of an LED. The data may be one byte, such as a "1" to turn on the LED or a "0" to turn off the LED. This may be utilized to put the LED state machine into the Indicate state. |
| ResetParam | 'N' (0x4E) | This command may be utilized by the networking microcontroller to reset a configuration parameter back to its default value. The data may be the ID of the parameter, possibly as an ASCII string. |
| Heartbeat | 'O' (0x4F) | This command may be utilized by the networking microcontroller to inform the master microcontroller that a heartbeat message has been received by the networking microcontroller. The data may include the refresh time and the output voltage separated by a comma or other delimiter. Either of the values may be disabled and set to "255". |
| Panic | 'P' (0x50) | This command may be utilized by the networking microcontroller to set the panic state. The data may be one byte, such as a "1" to start the panic mode or a "0" to stop the panic mode. |
| GetInstallState | 'Q' (0x51) | This command may be utilized by the microcontroller to request the install state of the networking microcontroller. There may be no associated data. |
| InstallState | 'R' (0x52) | This command may be sent by the networking microcontroller to inform the master microcontroller of the current install state. The data may be one byte, such as a "1" to indicate that the node containing the networking microcontroller is installed or a "0" to indicate that the node is not installed. This command may be sent on request and/or when the install state changes. |
| SendHeartbeat | 'S' (0x53) | This command may be utilized by the master microcontroller to inform the networking microcontroller that a heartbeat message should be sent. The data may include a delayed-off time and a photo level separated by a comma or other delimiter. If motion sensing is disabled, the delayed-off time may be set to "255". If photo sensing is disabled, the photo level may be set to "255" |
| Evacuation | 'T' (0x54) | This command may be utilized by the networking microcontroller to set the evacuation state. The data may be one byte, such as a "1" to start the evacuation mode or a "0" to stop the evacuation mode. |
| GetRelay | 'U' (0x55) | This command may be utilized by the networking microcontroller to request the state of the relay. There may be no associated data. |
| RelayState | 'V' (0x56) | This command may be sent by the master microcontroller to inform the networking microcontroller of the current relay state. The data may be one byte, such as a "1" to indicate that the relay is energized or a "0" to indicate that the relay is not energized. |
| GetOutput | 'W' (0x57) | This command may be utilized by the networking microcontroller to request the state of the 0-10 V control. There may be no associated data. |
| OutputLevel | 'X' (0x58) | This command may be sent by the master microcontroller to inform the networking microcontroller of the current 0-10 V control. The data may be an ASCII representation of the value. |

TABLE 2-continued

| Serial Commands | | |
|---|---|---|
| Command | Value | Description |
| Reset | 'Y' (0x59) | This command may be sent by the master microcontroller to inform the networking microcontroller that it should reset itself. A reset may include initializing an EEPROM or other memory and/or calling a function operable to remove the node (containing the networking microcontroller) from a network. |

Every command may be responded to by an ACK or NAK frame. If a command requires a further response, then that response may be sent after the ACK. The response command may also be ACK'd. For example, FIG. 136 illustrates an exemplary embodiment of a sequence of frames that may be sent when the networking microcontroller requests the motion sensor state. The networking microcontroller may wait for a response from the master microcontroller for a predetermined duration (e.g., 100 ms) before sending out another command. If no ACK or NAK is received within the predetermined duration, then the networking microcontroller may not resend the unanswered command. The networking microcontroller may respond within about 1 or 2 ms.

As described above, lighting systems within the scope of the present disclosure may contain multiple zones, and a zone may be a collection of nodes where at least one node has motion sensing or photo sensing enabled to allow for control of lights within the zone. Zones may also overlap, such that some nodes may be part of more than one zone.

A node may have two separate types of sensors attached, both of which are optional. The motion sensor, which may be disabled by default, may be configured to sense the presence of motion and, in response to the detection of motion, communicate with other components integral to its node and/or one more other nodes in a zone to keep the lights energized throughout the zone. It is well known that humans and other heat radiating bodies generate infrared waves, and that movement of a person or temperature changes in a heat radiating body changes the infrared radiation around that person or body, which can be detected by a passive infra-red (PIR) sensor. The signal produced by a PIR can be detected by an electrical circuit and subsequently utilized as a means for detecting the presence of humans, animals and other heat radiators.

The photo sensor, which may be disabled by default, may be configured to sense natural or otherwise ambient light and, in response to the amount of light that is detected, communicate with other components integral to its node and/or one or more other nodes in a zone to set the level to which the lights throughout the zone are energized when they are not de-energized. In an exemplary embodiment, the photo sensor may comprise a device having a microlens array or other microelectronic light-sensing component as known in the art. Consequently, there may be three possible configuration options for any one node: motion sensing only, photo sensing only, and both motion sensing and photo sensing.

A node enabled with motion sensing and/or photo sensing may be configured to communicate a heartbeat message (as described above) via the network to the other nodes in the zone. The heartbeat message may contain the delayed-off time (duration) and the output voltage that is to be utilized to set the level to which the lights are to be energized. The heartbeat may be sent continuously, with the possible exception of where motion sensing is enabled but no motion has been detected.

If motion sensing is enabled, the heartbeat communication may be sent only when motion is detected, such that the lights will remain energized while there is motion. When photo sensing is also enabled, the heartbeat communication may also set the level to which the lights are to be energized while motion persists. If photo sensing is disabled, the lights may be set to their maximum setting (full-brightness). If motion sensing is disabled, the heartbeat may be sent continuously. The delayed-off time in the heartbeat communication may be disabled such that receiving nodes would not time-out and de-energize their lights. If both sensors are disabled, then the heartbeat communication may not be sent.

Receiving nodes may utilize the heartbeat communication to refresh an internal heartbeat timer. When nodes with motion sensing and/or photo sensing detect motion, they may refresh their own heartbeat timer in addition to transmitting the heartbeat communication. Accordingly, motion that is detected by a motion sensing enabled node may be utilized to energize the lights of all nodes within a zone.

Software implementation for the above-described apparatus may be split between the networking microcontroller and the master microcontroller. The networking microcontroller may act as a slave to the master microcontroller. For example, the networking microcontroller may function essentially as an RF interface to the master microcontroller. The master microcontroller may have the responsibility to implement the state machines that control the peripherals, such as the relay. Additionally, or alternatively, the master microcontroller may have the responsibility to store configuration variables in non-volatile memory. The networking microcontroller may present an RF interface that allows control of the peripherals and access to the configuration parameters.

The master microcontroller may have several responsibilities which may be separated into several functional blocks, such as: control of the relay and 0-10V control; control of one or more LEDs; motion sensing; and photo sensing. Each of these functional blocks can be described in a state diagram that details the states that each block can be occupy and the events that trigger a transition between such states. Some of these events may be internal to the master microcontroller while others may be commands that are received from the networking microcontroller (e.g., via the serial port).

Upon power-up, the master microcontroller may utilize a GetInstallState command to determine the initial state of the LED state machine. If there is no response, then the master microcontroller may assume that it is in a standalone mode, and thus operating independently of other nodes. The master microcontroller may make repeated attempts at regular intervals, for example, to communicate to the networking microcontroller, such as in the case where an error previously occurred.

The exemplary state machines described below require several parameters, which may be non-volatile in nature. Table 3 below shows an exemplary layout of the non-volatile memory, including an example default value for each parameter. The configuration parameters may be accessible by the networking microcontroller for both reading and writing. The ID number may be utilized in a serial protocol to identify which configuration parameter is being read/written.

TABLE 3

| Non Volatile Memory | | | | |
|---|---|---|---|---|
| Parameter | ID | Size | Default Value | Description |
| Delayed-Off Time | 1 | 1 | 5 | The duration of the delayed-off state (e.g., in minutes). |
| Panic-On Time | 2 | 1 | 5 | The duration during which a lamp is energized while in panic mode. |
| Panic-Off Time | 3 | 1 | 1 | The duration during which a lamp is de-energized while in panic mode. |
| Start-To-High (STH) Time | 4 | 1 | 15 | The duration during which a relay will be held on after a power cycle. |
| New Lamp Burn-In (NLB) Time | 5 | 2 | 0 | The duration of the NLB time. |
| Panic Mode Enable | 6 | 1 | Enabled (1) | Controls whether Panic Mode is enabled or disabled. |
| Motion Sensor Enable | 7 | 1 | Disabled (0) | Controls whether a node's motion detection functionality is enabled or disabled. |
| Photo Sensor Enable | 8 | 1 | Disabled (0) | Controls whether the node's photo detection functionality is enabled or disabled. |
| Lock Time | 9 | 1 | 10 | The duration during which a lamp is locked on or off when controlled via an external controller. |
| Evacuation Time | 10 | 1 | 30 | The duration of an evacuation state. |

The master microcontroller may be configured to maintain the heartbeat timer described above, which may be refreshed by detected motion. The heartbeat timer may also or alternatively rely on other nodes in the network that are detecting motion and communicating a heartbeat message (e.g., via RF). The heartbeat message may be received by the networking microcontroller and sent to the master microcontroller via a serial port.

If a node has an attached motion detector and has motion detection enabled, then it may refresh the heartbeat timer internally. It may also trigger a heartbeat message to be communicated to other nodes (e.g., via RF) every 30 seconds or at some other regular interval, by sending a message to the networking microcontroller.

The relay, along with the 0-10V control, may be utilized to control the lighting load. Control of the relay may comprise a state machine having six possible states, for example. FIG. 137 is a diagram illustrating an exemplary embodiment of the relay state machine 13700 having the following six states: the New Lamp Burn-in (NLB) state, the Start-to-High (STH) state, the heartbeat state, the locked state, the panic state and the evacuation state.

The programmable NLB mode may be available to operate the relay in High mode for 100 hours (or some other predetermined duration) after being manually reset via an installation tool. The NLB clock may continue counting regardless of power interruptions. The burn-in will occur when the node, on power up, reads the current burn-in time stored in non-volatile memory. The default value for the burn in time is 0 such that, upon the first power-up, the NLB mode may automatically start. Once the 100 hours has been reached, the node will transition to the STH state. The NLB time may be reset back to 0 via an RF command, such as to force the node into the NLB state.

A programmable Start-to-High (STH) mode is available, where the relay is locked in High mode for a programmable or otherwise predetermined duration (e.g., between 0 to 20 minutes) following a power interruption.

The normal state may be the heartbeat state. The relay may be controlled by the heartbeat timer. When the timer expires, the relay may be deactivated and the 0-10V control may be set to 0V. The heartbeat timer may be refreshed by the node receiving heartbeat messages. The heartbeat message may contain both a time for refreshing the heartbeat timer and the 0-10V control to be used while the lights are on.

The relay and 0-10V control may be controlled via the heartbeat message sent from the nodes with motion sensing or photo sensing enabled. However, the node may support the Basic command class and the Multilevel Switch command class that allow direct control of the relay and 0-10V control. If a controller directs a node to be either on or off, then that state may be locked for a predetermined duration. If the light is locked in an energized state, then when a heartbeat message is received the heartbeat timer may be still refreshed, but if a dim level is contained in the message then that level may be ignored. If the light is locked in a de-energized state, then when a heartbeat message is received the light may be not energized. Once the lock duration expires, the light remains in its current state until the heartbeat timer expires (thereby de-energizing the light) or a heartbeat message arrives (thereby energizing the light).

Table 4 shows possible effects of events on the above-described relay states.

TABLE 4

| Relay Transition Table | | | | | | |
|---|---|---|---|---|---|---|
| | State | | | | | |
| Event | NLB | STH | Heartbeat | Locked | Panic | Evac |
| Burn in time expires | Transition to STH state | N/A | N/A | N/A | N/A | N/A |

TABLE 4-continued

Relay Transition Table

| Event | State: NLB | STH | Heartbeat | Locked | Panic | Evac |
|---|---|---|---|---|---|---|
| STH time expires | N/A | Transition to Heartbeat state. If heartbeat timer is 0 deactivate relay otherwise activate relay and set 0-10 V to last known value. | N/A | N/A | N/A | N/A |
| Heartbeat timer expires | N/A | N/A | Deactivate the relay. Set the 0-10 V control to 0 V. | N/A | N/A | N/A |
| Heartbeat RF message received | Refresh the heartbeat timer. Cache 0-10 V value. | Refresh the heartbeat timer. Cache 0-10 V value. | Refresh the heartbeat timer. Cache 0-10 V value. Activate the relay and set the 0-10 V control. | Refresh the heartbeat timer. Cache 0-10 V value. | N/A | N/A |
| RF command received | N/A | N/A | Set the relay and 0-10 V control to requested value. Start the lock timer. Transition to the Locked state. | Set the relay and 0-10 V control to requested value. Refresh the lock timer. | N/A | N/A |
| Lock timer expires | N/A | N/A | N/A | Transition to the Heartbeat state. If heartbeat timer is 0 deactivate relay otherwise activate relay and set 0-10 V to last known value. | N/A | N/A |
| NLB time reset via RF command | Reset NLB Time | Transition to NLB state. Reset NLB Time | Transition to NLB state. Reset NLB Time | Transition to NLB state. Reset NLB Time | N/A | N/A |
| Panic start command received | Cache state. Transition to Panic state. | Cache state. Transition to Panic state. | Cache state. Transition to Panic state. | Cache state. Transition to Panic state. | No Action | No action. |
| Panic stop command received | N/A | N/A | N/A. | N/A | Move to cached state. | N/A |
| Evacuation start command received | Cache state. Transition to Evac state. | Cache state. Transition to Evac state. | Cache state. Transition to Evac state. | Cache state. Transition to Evac state. | Cache state. Transition to Evac state. | Reset the evac timer. |
| Evacuation stop command received | N/A | N/A | N/A. | N/A | N/A | Move to cached state. |

FIG. 138 is an exemplary embodiment of an LED state diagram 13800 according to one or more aspects of the present disclosure. One or more LEDs may be utilized to indicate various states that may be occupied by a node. Initially, when a node is not installed into the network, an LED may flash at a predetermined rate. Once the node is installed into the network, the LED may reflect the state of motion detection, such as ON when motion is detected and OFF when there is no motion detected.

Table 5 illustrates how such an LED may be controlled in the various states.

TABLE 5

| LED States | | | |
|---|---|---|---|
| State | Rate | Duration | Description |
| Not Installed | 2 Hz | Unlimited | Not included into Z-Wave Network. |
| Program Mode | 0.5 Hz | 15 seconds | Used to indicate to handheld controllers that it is now ready to receive commands via IR beam. |
| Delayed-Off | 1 Hz | Configurable from 5-99 minutes. | During the delayed off state. (Motion sensing only) |
| Relay-Off | Off | Unlimited | Relay in LOW mode |
| Relay-On | On | Unlimited | Relay in HIGH mode |
| Indicate-Off | Off | 30 seconds | An external controller set the LED off. |
| Indicate-On | On | 30 seconds | An external controller set the LED on. |

Various states of the LED may also utilized when the device is operating as a non-network device without the networking hardware. For example, the LED may flash every 15 seconds when there is no networking hardware detected by the master microcontroller, the LED may remain ON when motion is being detected, and the LED may flash at 1 Hz during Delayed-Off status (the time between the last detected motion and the time when the device will remain in "high" mode).

The Program state may be entered when the master microcontroller recognizes a correct IR or other wireless signal. The program state may last for 15 seconds or some other programmed or otherwise predetermined duration, during which time other wireless commands can be received and forwarded to the networking microcontroller. Examples of such commands include NodeInfo, NodeInclusion and Reset. If no further commands are received within the predetermined duration of the Program state, then the master microcontroller may automatically drop out of programming mode.

Table 6 illustrates exemplary effects of events on the LED states.

TABLE 6

| LED Transition Table | | | | | |
|---|---|---|---|---|---|
| | State | | | | |
| Event | Not Installed | Program Mode | Relay | Delayed Off (MS only) | Indicate |
| Node is installed. | Transition to Relay state. | N/A | N/A | N/A | N/A |
| Node is removed. | N/A | N/A | Transition to Not Installed state. | Transition to Not Installed state. | Transition to Not Installed state. |
| Relay is activated. | N/A | N/A | Turn LED on. | Ignore relay. | Ignore relay. |
| Relay is deactivated. | N/A | N/A | Turn LED off. | Ignore relay. | Ignore relay. |
| RF indicator command class received. | N/A | N/A | Transition to Indicate state. Set LED according to RF command. Start indicator timer. | Transition to Indicate state. Set LED according to RF command. Start indicator timer. | Set LED according to RF command. Refresh indicate timer. |
| Indicator timer expires. | N/A | N/A | N/A | N/A | Transition to Relay state. Set LED to match relay. |

TABLE 6-continued

LED Transition Table

| Event | State: Not Installed | Program Mode | Relay | Delayed Off (MS only) | Indicate |
|---|---|---|---|---|---|
| No motion detected after 5 seconds. (MS only) | N/A | N/A | Transition to Delayed Off state. Start delayed off timer. | No action. | No action. |
| Motion detected. (MS only) | N/A | N/A | No action. | Move to Relay state. Set LED to match relay. | No action. |
| Program Mode command is received. | Transition to Program Mode state. Cache state. | Refresh 15 second timer. | Transition to Program Mode state. | Transition to Program Mode state. | Transition to Program Mode state. |
| Program Mode 15 second timer expires. | N/A | Transition to cached state. | N/A | N/A | N/A |
| Node Inclusion command is received. | Command is ignored. | Send out Node Info frame via RF and transition to previous state. | Command is ignored. | Command is ignored. | Command is ignored. |

FIG. 139 is an exemplary embodiment of a motion sensing state diagram 13900 according to one or more aspects of the present disclosure. The node motion sensing can be in one of four states, MOTION DISABLED, MOTION DETECTED, NO MOTION or DELAYED-OFF. While motion is being detected, the heartbeat message may be sent out at regular intervals, and the node's internal heartbeat timer may be refreshed. After a timer expires (e.g., 5 seconds or some other predetermined duration), when no motion is detected, the node may transition to the DELAYED_OFF state. When the delayed-off timer expires, the node may transition to the NO_MOTION state. In this state, the heartbeat message may be not sent out, and the internal heartbeat timer may not be refreshed.

Table 7 illustrates exemplary effects of events on the motion sensing states.

TABLE 7

Motion Sensing Transition Table

| Event | State: Disabled | Motion Detected | Delayed Off | No Motion |
|---|---|---|---|---|
| Motion sensing is enabled. | Transition to Motion Detected state. Start sending the heartbeat message. | N/A | N/A | N/A |
| Motion sensing is disabled. | No action. | Transition to Disabled state. | Transition to Disabled state. | Transition to Disabled state. |
| Motion detected. | N/A | No action. | Transition to Motion Detected state. | Transition to Motion Detected state. Start sending the heartbeat message. |
| 5 seconds of no motion expires. | N/A | Transition to the Delayed Off state. | N/A | N/A |
| Delayed off timer expires. | N/A | N/A | Transition to No Motion state. Stop sending the heartbeat. | N/A |

FIG. 140 is an exemplary embodiment of a photo sensing state diagram 14000 according to one or more aspects of the present disclosure. The node photo sensing can be in one of two states, PHOTO DISABLED or PHOTO ENABLED. When enabled, the ambient light may be continuously scanned and converted to a 0-10 value that can be directly used by receiving nodes. This value may be inserted into the heartbeat message on every transmission.

The photo sensing state machine may be simple in that it may be either enabled or disabled. When enabled, photo sensing may be performed on a regular basis, and the result may be converted into a 0 to 10V value. This value may be used by the receiving nodes to set their light levels when on.

Turning to FIG. 141, the delayed-off state may apply to the lack of motion detected by the motion sensor on nodes where motion sensing is enabled. It may be used to allow users to stop and continue moving within the area of detection, where a programmable delay may be inserted to avoid switching the load to low mode too rapidly.

The DELAYED-OFF state may be entered after no motion is detected for five seconds or some other programmed or otherwise predetermined duration. Once the five seconds has elapsed, the LED may flash at programmed or otherwise predetermined rate (e.g., 1 Hz) for the configured off-delay time, at which time the node transitions into the NO MOTION state in which the heartbeat message not sent. The delayed-off state duration may be programmable between 5 to 99 minutes, among other durations within the scope of the present disclosure. Any motion that is detected may transition the node back to the MOTION DETECTED state. The heartbeat message may be sent out at a regular interval in both the DELAYED-OFF state and the MOTION DETECTED state.

When the EVACUATION MODE (shown in FIG. 139) is activated, the relay may be energized and the 0-10 control may be set to 10. A timer may be started to count to the configured evacuation time, at which point the node may revert back to its previous relay state.

The node may support a PANIC MODE (shown in FIG. 139) that is proprietary to Cooper Lighting. When this mode is activated, the relay may be continually pulsed such that the relay is activated for 1 second and then deactivated for 1 second. These durations may be the default values, and may be configurable. Similarly, the 0-10 volt control may be 1 second at 0 and 1 second at 10. This may allow devices powered by the relay to be toggled on and off, such as if there is a non-fire emergency in a noisy environment where fire protection and notification systems are not activated, but where the area needs to be evacuated, such that the flashing lights will be easily noticed by occupants with normal vision.

Panic mode may only be entered by receiving a command (e.g., via RF or other wireless interface) and may require receipt of another RF command before transitioning back out of panic mode to resume normal mode. The node may cease IR detection during panic mode. When the network exits PANIC MODE, all relays may be set to Low mode, and 0-10 volt signaling may be set at 0 volts, until signaled to switch to High by an associated motion sensor or lighting management system. The default may be for PANIC MODE to be enabled with an energized time of about 1 second and a de-energized time of about 1 second. Of course, other values are also within the scope of the present disclosure.

A node may be based on a static controller library, such as may be available with Z-Wave products. In an exemplary embodiment, the functions of the static controller library may comprise:

Must be in a fixed location

Must be listening at all times (mains powered)

Can reach other listening nodes in the network

Can be reached by all the other nodes in the network

Can be Primary

Can be configured as static update controller ("SUC") or a static ID controller ("SIS")

The static controller library may be selected to allow at least one device in a typical installation to have the SIS functionality. The node may enable SIS functionality on power up. It may be the responsibility of the install tool to select one node in a network to act as SIS. For example, the selected node may be the first node installed into the network. The role of a SIS and a SUC in the network may come under the heading of network management, as discussed further below.

When a node powers-up for the first time, it may detect that the non-volatile memory is not initialized and, consequently, may set all parameters stored in non-volatile memory to their default value. The parameters may also be initialized to their default values when the node is removed from a network. Examples of these parameters and their default values are described further below.

To install a node into a network, a remote programming/install tool may be aimed at the node. When the master microcontroller recognizes the IR or other wireless signal, it will forward it to the networking microcontroller to make it enter Program Mode. The remote install tool may set the primary network address and retain all network information as the network controller in its data table to perform all network management functions when necessary. The node may be physically mounted at a high level and may be out of reach of a low power signal. Consequently, the node information frame may be transmitted at full power.

Table 8 below provides an exemplary layout of the parameters in the non-volatile memory, including exemplary default values.

TABLE 8

Non-Volatile Memory Layout

| Parameter | Offset | Size | Default Value | Description |
|---|---|---|---|---|
| Magic Value | 0 | 1 | 0x5A | May be utilized to detect an un-initialized memory. |
| All Switch State | 1 | 1 | 0xFF | This is the state of the node's inclusion in the all-switch group. The default may be included for both All-ON (high) and All-OFF (low). |
| Location Length | 2 | 1 | 0 | Length of the location string. |
| Location | 3 | 16 | " " | Location of the node. For example, there may be a maximum of 16 characters plus a null terminator. |
| Name Length | 19 | 1 | 13 | Length of the name string. |
| Name | 20 | 16 | "ThinkWatt Node" | Name of the node. For example, there may be a maximum of 16 characters plus a null terminator. |
| Associated Nodes | 36 | 29 | 0, 0, . . . 0, 0 | A bit field describing which other nodes (e.g., of 1 through 232) are associated with this node. |

In an exemplary embodiment, an installation of a lighting system within the scope of the present disclosure may have multiple zones. A zone is a collection of nodes such that the detection of movement in any of the motion sensing enabled nodes keeps all the nodes in the zone active. A zone may be created through utilization of an association command class. An association is a connection between a node (that transmits a state) and another node (that receives the transmitted state and acts upon it). For example, in a lighting system, the source node is a node with motion sensing or photo sensing enabled, and the state information it sends is the fact that motion has been detected. The receiving node receives this state information and controls its heartbeat timer, as described above.

Groups may be used to support different events occurring on a node. For example, one event may trigger an update to one group of nodes while another event may trigger an update to a different group of nodes. The node has only one event, the timeout of the timer that drives the heartbeat message. Therefore, the node may support a group that has up to 231 nodes, for example.

The number of nodes in a zone may be large, and the use of multicasting to send the heartbeat to the zone may require substantial bandwidth. Accordingly, instead of multicasting, the heartbeat may be sent to the zone using non-routed singlecast first. This may have the effect of successfully reaching all nodes within direct RF range. Since each singlecast may be acknowledged, each failure can be noted and a second pass can then be made at sending the heartbeat to the associated nodes in the zone. However, the second pass may only target those nodes that failed during the first pass, and the single cast may now be sent with routing enabled. This may have the effect of successfully reaching nodes outside direct range. Failures on the second pass may be ignored.

The heartbeat may be sent once every minute, although other intervals are also within the scope of the present disclosure. The minimum delayed-off time may be five minutes, such that there may be five attempts to get a heartbeat to any one node before a node will incorrectly assume that there is no motion and dim down (assuming that there is no other node in the zone that could also be sending out a heartbeat).

Each node may utilize the static controller basic device class, and may use the multilevel switch generic device class and/or the multilevel power switch specific device class. Consequently, the relay and 0-10V control may be controlled remotely.

The multilevel switch may have the following command classes: Basic Command Class, and Multilevel Switch Command Class. The binary power switch specific device class may add the following command class: All Switch Command Class. In addition to these command classes, the node may also support the following command classes: Configuration Command Class, Manufacturer Specific Command Class, Version Command Class, Manufacturer Proprietary Command Class, Indicator Command Class, Association Command Class, Controller Replication, Binary Sensor (may be utilized to report motion detector state), Multilevel Sensor (may be utilized to report the photo level), and Node Naming and Location.

Some command classes may utilize specific formatting information that may not be covered by the device class specification. For example, the Configuration Command Class may be utilized to configure the node configuration parameters. In an exemplary embodiment, the following configuration parameters may be supported on the node: Off Delay, Panic Enable, Panic Mode On Time, Panic Mode Off Time, NLB Time, STH Time, Motion Sensor Enabled, Photo Sensor Enabled, Lock Time, and Evacuation Time.

The Off Delay is the time in minutes before the node stops sending out the heartbeat message. In an exemplary embodiment, this configuration parameter has a parameter number of 1 and is an eight-bit value, with a maximum value of 99 minutes, a minimum value of five minutes, and a default value of five minutes. FIGS. 141 and 142 show an example format used to set and report the Off Delay configuration parameter. In FIG. 141, if the default bit is set, then the Off Delay may be reset back to the default value of five minutes. The Off Delay value in the message may be ignored in this case.

The Panic Mode On and Off times are the times in seconds where the load is turned off then on. If the Off time is 0, then the load will be turned ON continuously during Panic Mode. If the On time is 0, then the load will be turned OFF continuously during Panic Mode. The default On and Off time may be 1 second.

FIGS. 143-146 show an exemplary format utilized to set and report the Panic Mode On Time and the Panic Mode Off Time configuration parameters. In FIG. 143, if the default bit is set, then the Panic Mode On Time may be reset back to the default value of 1 second. The Panic Mode On Time value in the message may be ignored in this case. In FIG. 145, if the default bit is set, then the Panic Mode Off Time may be reset back to the default value of 1 second. The Panic Mode Off Time value in the message may be ignored in this case.

The Panic Mode Enable is a Boolean that enables/disables Panic Mode. In an exemplary embodiment, this configuration parameter has a parameter number of 6 and is an 8 bit value, where a value of zero disables Panic Mode, non-zero values enable Panic Mode, and the default value is to enable Panic Mode. FIGS. 147 and 148 show an exemplary format utilized to set and report the Panic Mode Enable configuration parameter. In FIG. 147, if the default bit is set, then the Panic Mode Enable may be reset back to the default value of enabled. The Panic Mode Enable value in the message may be ignored in this case.

The New Lamp Burn In Time is an integer that allows access to the node's current burn in time. In an exemplary embodiment, this configuration parameter has a parameter number of 7 and is a 16 bit value, where the value is the number of minutes into the burn in time and has a default value of 0. The maximum value may be 6000 minutes (100 hours). FIGS. 149 and 150 show an exemplary format utilized to set and report the New Lamp Burn In Time configuration parameter. The NLB time may only be reset back to 0. If the set command contains any value other than 0, it may be ignored. In FIG. 149, if the default bit is set, then the New Lamp Burn In Time may be reset back to the default value of 0. The New Lamp Burn In Time value in the message may be ignored in this case.

The Motion Sensor Enabled configuration parameter allows control of whether a node is sensing motion or not. In an exemplary embodiment, this configuration parameter has a parameter number of 8 and is an 8 bit value, where a value of 0 means that the node is not sensing motion (e.g., motion sensing is disabled), a non-zero value means that the node is sensing motion, and the default value is 1 (thereby enabling motion sensing). FIGS. 151 and 152 show an exemplary format utilized to set and report the Motion Sensor Enabled configuration parameter. In FIG. 151, if the default bit is set, then the Motion Sensor Enabled may be reset back to the default value of 1. The Motion Sensor Enabled value in the message may be ignored in this case.

The Photo Sensor Enabled configuration parameter allows control of whether a node is sensing ambient light or not. In an exemplary embodiment, this configuration parameter has a parameter number of 9 and is an 8 bit value, where a value of 0 means that the node is not sensing ambient light (e.g, photo sensing is disabled), a non-zero value means that the node is sensing ambient light, and the default value is 0 (thereby disabling photo sensing). FIGS. 153 and 154 show an exemplary format used to set and report the Photo Sensor Enabled configuration parameter. In FIG. 153, if the default bit is set, then the Photo Sensor Enabled may be reset back to the default value of 0. The Photo Sensor Enabled value in the message may be ignored in this case.

The Lock Time is the time in minutes that a node locks the light on or off when controlled by an external controller. During this time, the heartbeat timer may be ignored if it times out. The heartbeat timer may still be refreshed when heartbeat messages are received. In an exemplary embodiment, this configuration parameter has a parameter number of 9 and is an 8 bit value, with a maximum value of 99 minutes, a minimum value of 0 minutes, and a default value of 10 minutes. FIGS. 155 and 156 show an exemplary format utilized to set and report the Lock Time configuration parameter. In FIG. 155, if the default bit is set, then the Lock Time may be rest back to the default value of 10 minutes. The Lock Time value in the message may be ignored in this case.

The STH Time is the time in minutes that a node keeps its relay activated upon power-up. In an exemplary embodiment, this configuration parameter has a parameter number of 11 and is an 8 bit value, with a maximum value of 20 minutes, a minimum value of 1 minute, and a default value of 15 minutes. FIGS. 157 and 158 show an exemplary format used to set and report the Start to High Time configuration parameter. In FIG. 157, if the default bit is set, then the Start to High Time may be reset back to the default value of 15 minutes. The Start to High Time value in the message may be ignored in this case.

The Evacuation Time is the time in minutes that a node locks the light on when commanded into the Evacuation Mode by an external controller. During this time, the heartbeat timer may be ignored if it times out. The heartbeat timer may still be refreshed when heartbeat messages are received. In an exemplary embodiment, this configuration parameter has a parameter number of 12 and is an 8 bit value, with a maximum value of 99 minutes, a minimum value of 0 minutes, and a default value of 30 minutes. FIGS. 159 and 160 show an exemplary format utilized to set and report the Lock Time configuration parameter. In FIG. 159, if the default bit is set, then the Lock Time may be rest back to the default value of 10 minutes. The Lock Time value in the message may be ignored in this case.

The Manufacturer Specific Command Class may be utilized such that the node can be asked to report its manufacturer information. An exemplary format of the response message is shown in FIG. 161.

The Manufacturer ID may be assigned by the commercial manufacturer or provider of the node, while the Product Type ID and the Product ID may be assigned by an integrator or installation entity. These IDs, shown in Table 9, may be assigned according to their configured functionality of whether motion sensing and/or photo sensing is enabled.

TABLE 9

Product ID Table

| Functionality | Product Type ID | Product ID |
|---|---|---|
| Motion sensing only enabled | 0x01 | 0x01 |
| Photo sensing only enabled | 0x01 | 0x02 |
| Both motion sensing and photo sensing enabled | 0x01 | 0x03 |
| No sensing enabled | 0x02 | 0x01 |

As discussed in a previous section, a lighted node may support a group of up to 231 nodes. FIG. 162 shows an exemplary format of the set command that associates a node with another node. The number of Node IDs is variable. The message may only contain one Node ID, where the mechanism for association may be by activating the associate mode on the sender and the receiver via a handheld tool. The length of the received message may determine the number of node IDs contained in the message. Where the node may only support one group, the Group Identifier field may be ignored.

FIG. 163 shows an exemplary format for the report sent in response to an ASSOCIATON_GET command. The number of Node IDs may be variable. If only one node is associated, then the report frame may only contain Node ID 1. The field Max Nodes Supported may be fixed at the value 231 for the maximum number of nodes supported in this one group. The field Reports To Follow may be fixed at the value 0 to indicate that there will be no more reports. The field Group Identifier may be fixed at the value 1. FIG. 164 shows an exemplary format for reporting the number of groups supported. The field Supported Groups may be fixed at the value 1.

FIG. 165 is a perspective view of a portion of an exemplary embodiment of a handheld controller 16500 in accord with one or more aspects of the present disclosure. The handheld controller 16500 may configure the first node installed into the network as the SIS. When installing subsequent nodes into the network, the handheld controller 16500 may be an inclusion controller configured to include nodes into the network on behalf of the SIS. For example, the home ID of the network may be taken from the home ID of the SIS, not the handheld controller 16500. This may allow the handheld controller 16500 to be used to install another network.

Each node in a network, other than the SIS, may communicate with the SIS periodically to receive any available updates to the network topology. For example, this period may be once a day, although other periods are also within the scope of the present disclosure. Nodes may utilize a RequestNetworkUpdate command to ask for network topology updates from the SIS. The update process may then start without any further calls from the application. Updates to the topology may be notified to the application via the ApplicationControllerUpdate callback. If, in an exemplary embodiment, there have been more than 64 changes to the network topology between updates, then the node may perform a controller replication to get the latest topology.

Referring to FIG. 166*a*, in an exemplary embodiment, a device network 16600 comprises nodes including lamps 16602*a* and 16602*b*, a motion sensor 16604, and a photo sensor 16606. One or more aspects of the nodes (16602*a*, 16602*b*, 16604, and 16606) may be substantially similar or identical to those of the nodes described above.

The lamp 16602*a* is a node having a lighting module and a motion sensor 16608 and/or a photo sensor 16610. Either or both of the sensors may be integral to the lamp 16602*a*, or they may be a discrete component that is assembled to the lamp 16602*a*. In contrast, lamp 16602*b* does not include the motion sensor 16608 or photo sensor 16610. That is, lamp 16602*b* may be a node having only a lighting module, but still having the master and networking microcontrollers described above and, therefore, configured for control in response to communications received from other nodes in the network.

Moreover, as also described above, the lamps 16602*a* and 16602*b*, motion sensor 16604, and photo sensor 16606 may each be configured for wireless intercommunication. For example, the lamps 16602*a* and 16602*b*, motion sensor 16604, and photo sensor 16606 may be wirelessly mesh-networked such that each is in communication with the others. One or more of these components may comprise a relay (e.g., a 30 Amp relay), and the lamps 16602*a* and 16602*b* may comprise a voltage control (e.g., a 0-10 Volt control) for electronic ballasts. The nodes may feature 120-277 Volt, 50/60 Hz operation, possibly with IP-65 protection.

Each of the nodes 16602*a*, 16602*b*, 16604 and 16606 may comprise a housing constructed from a composite plastic material, possibly similar to polycarbonate, and the housing may be configured for one or more of various mounting options. For example, one or more of the lamps 16602*a* and 16602*b*, motion sensor 16604, and photo sensor 16606 may be configured for standard electrical J-box mounting, L-bracket for machine or light fixture mounting, ½" trade size threaded nipple for KO mounting, or NEMA photocontrol twist-lock mounting, among others.

A conventional, proprietary, and/or future-developed wireless communication protocol may be utilized to link the lamps 16602*a* and 16602*b*, motion sensor 16604, and photo sensor 16606 together wirelessly in a mesh-network, as schematically depicted by the double-headed arrows in FIG. 166*a*, such that low-voltage cables, relay panels, complicated digital addresses or complex programming may be reduced or eliminated. The license-free 900 MHz band may be used for such communication, although other bands are also within the scope of the present disclosure. Software employed to install and/or set-up the network 16600 may run on PC or PDA, possibly in conjunction with the remote 16500 shown in FIG. 165, as described in more detail elsewhere in the present disclosure.

Referring to FIG. 166*b*, in an exemplary embodiment, a device network 16612 may be bridged with another device network 16614 via bridging means 16616 to form a local area network (LAN) or wide area network (WAN) 16601. One or more aspects of either of the device networks 16612 and 16614 may be substantially similar or identical to those of the device network 16600 shown in FIG. 166*a*. The bridging means 16616 may comprise wired or wireless means, possibly including Ethernet, token ring, fiber distributed data interface (FDDI), Bluetooth, WiMAX (IEEE 802.16), WLAN (IEEE 802.11), and/or others.

The device networks 16612 and 16614 each comprise a combination of one or more lamps 16602*a* and 16602*b*, motion sensors 16604 and photo sensors 16606, each of which may have one or more aspects that are substantially similar or identical to those of similarly referenced devices shown in FIG. 166*a*. Moreover, as a result of the device networks 16612 and 16614 being in communication via bridging means 16616, the motion sensors 16604 and/or photo sensors 16606 of the device network 16612 may be utilized in the control of one or more of the lamps 16602*a* and 16602*b* of the device network 16614. Similarly, the motion sensors 16608 and/or photo sensors 16610 of the lamps 16602*a* of the device network 16614 may be utilized in the control of one or more of the lamps 16602*a* and 16602*b* of the device network 16612.

Referring to FIG. 167*a*, in an exemplary embodiment, during a method 16700 of network operation, the operation of one or more motion sensors within a device network, a LAN, or a WAN (such as the motion sensors 16604 or 16608 of the device networks 16600, 16612, or 16614 shown in FIGS. 166*a* and 166*b*) may include a default, monitoring state in which a physical region surrounding or proximate the motion sensor is continuously, periodically, or otherwise monitored to detect human movement or other motion. Thus, as determined in a decisional step 16702, if no motion is detected, then a diminished or other current lighting level may be maintained in a step 16704, and the default monitoring state may then continue.

However, if motion is detected, then a subsequent step 16706 may be performed to detect a current lighting level via one or more photo sensors (such as the photo sensors 16606 or 16610 of the device networks 16600, 16612, or 16614 shown in FIGS. 166*a* and 166*b*). The detected lighting level may be a combination of direct natural or ambient daylight detected in the area covered by the sensor. Moreover, the detected lighting level may be in a different location or region of the device network, LAN, or WAN in which the motion was detected during step 16702. That is, the photo sensor(s) employed to detect a lighting level in step 16706 may not be located with, or even near, the motion sensor(s) employed to detect motion in step 16702.

In a subsequent step 16708, a lighting level may be adjusted by taking the 0 volts to 10 volts fed by an electronic ballast connected to a sensor in the network and correspondingly reducing that voltage within the sensor to signal the electronic ballast connected to it to adjust the output of the ballast driving the particular lamp (such as the lamps 16602*a* and 16602*b* of the device networks 16600, 16612, or 16614 shown in FIGS. 166*a* and 166*b*) connected to it. That is, the feed of 10 volts from the electronic ballast may be indexed on a scale of ten steps (or 100 steps, or 1000 steps, or some other regular interval). Accordingly, the brightest level of daylight sensed will result in the 10 volt feed from the ballast being reduced down to 0 volts, so that the ballast may cut the output of the lamp to its lowest possible level. Thus, in an exemplary embodiment, electrical lamp output may be inversely proportional to the brightness of the daylight level in the room. Similarly, moderate daylight detected may result in the 10 volt feed from the ballast being reduced down to 5 volts (or some other intermediate value).

The lamp adjusted during step 16708 may be in a different location or region of the device network, LAN, or WAN in which the motion was detected during step 16702, and/or may be in a different location or region of the device network, LAN, or WAN in which the lighting level was detected during step 16706. That is, the motion sensor(s) employed to detect motion in step 16702, the photo sensor(s) employed to detect motion in step 16706, and the lamp adjusted in step 16708 may not be co-located or even proximate one another.

Referring to FIG. 167*b*, in an exemplary embodiment, the amount by which a lamp may be adjusted (such as during execution of one or more aspects of the method 16700 shown in FIG. 167*a*) may be dependent upon not only the current lighting level (such as may be detected during step 16708 shown in FIG. 167*a*) but also upon the photo sensing range of the photo sensor employed to detect the current lighting level. For example, in the exemplary embodiment of FIG. 167*b*, the photo sensing range of the photo sensor employed to detect the current lighting level is subdivided into increments of 10%, or other uniformly-sized increments. Consequently, if the photo sensor detects very little or no light, then the amount by which the lamp is driven to adjust the lighting level may be about 100% of the maximum lamp driving level.

Thus, if the lamp is configured to be driven by adjusting the 0-10 V fed to the control circuit of the sensor by the ballast driving the lamp(s), then a 10 V signal may be employed to drive the lamp(s) to achieve the 100% lighting level. However, if the photo sensor detects a moderate lighting level, such as if the current lighting level is at about a midpoint of the photo sensing range of the photo sensor, then the amount by which the lamp is driven to adjust the lighting level may be about 50% of the maximum lamp driving level. Thus, if the lamp is configured to be driven by 0-10 V fed to the control circuit of the sensor by the ballast driving the lamp(s), then a 5 V signal may be employed to drive the lamp to achieve the 50% lighting level which, in combination with natural daylight, will provide an adequate level of light similar to the 100% level provided by artificial light only.

In the preceding example, the desired or otherwise predetermined lighting level, after adjustment in response to the detection of motion and the current lighting level, is approximately 100% of the artificial light provided by fixtures operated at full power. However, if the photo sensor detects a high lighting level, such as if the current lighting level is at about the top of the photo sensing range of the photo sensor, then the amount by which the lamp is driven to adjust the lighting level may be about 0% of the maximum lamp driving level because no electrical light may be needed to achieve the required lighting level.

Referring to FIG. 168, in an exemplary embodiment, during a method 16800 of lamp and/or network operation, the operation of one or more lamps within a device network, a LAN, or a WAN (such as the lamps 16602*a* or 16602*b* of the device networks 16600, 16612, or 16614 shown in FIGS. 166*a* and 166*b*) may include a standby or other default state while awaiting a signal to trigger a multi-level operation mode. The multi-level operation mode may be as described above with respect to FIGS. 167*a* and 167*b* in which, for example, the signal driving the lamp is employed to energize the lamp in response to local or remote motion detection and/or local or remote photo sensing.

Once the trigger is received in step 16802, a decisional step 16804 may include determining whether the cumulative operational hours of the lamp exceeds 100 hours or some other predetermined level. If it is determined during step 16804 that the lamp has not yet been operated for a total of 100 hours or some other predetermined level, then the lamp may continue to operate in a mode other than the multi-level operation mode, such as a safe mode or another default operational mode. However, if it is determined during step 16804 that the lamp has indeed operated for at least 100 hours or some other predetermined amount, then the multi-level operational mode may be initiated during step 16806.

Referring to FIG. 169, in an exemplary embodiment, during a method 16900 of lamp and/or network operation, the operation of one or more lamps within a device network, a LAN, or a WAN (such as the lamps 16602*a* or 16602*b* of the device networks 16600, 16612, or 16614 shown in FIGS. 166*a* and 166*b*) may include a standby or other default state while awaiting a signal to trigger a multi-level operation mode. The multi-level operation mode may be as described above with respect to FIGS. 167*a* and 167*b* in which, for example, the signal driving the lamp is employed to energize the lamp in response to local or remote motion detection and/or local or remote photo sensing.

Once the trigger is received in step 16902, a decisional step 16904 may include determining whether the current operation of the lamp exceeds 15 minutes or some other predetermined level since power to the lamp operating circuit was last interrupted. If it is determined during step 16904 that the lamp has not yet been operating for at least 15 minutes or some other predetermined level, then the lamp may continue to operate in a mode other than the multi-level operation mode, such as a safe mode or another default operational mode. However, if it is determined during step 16904 that the lamp has been operating for at least 15 minutes or some other predetermined amount, then the multi-level operational mode may be initiated during step 16906.

Referring to FIG. 170, in an exemplary embodiment of a wide area network (WAN) 17000 according to one or more aspects of the present disclosure, Network1, Network2, and Network3 may be configured for one- or two-way wired or wireless communication by, for example, the bridging means 16616 described above and depicted in FIG. 166*b*. The nodes of Network1 may include a plurality of lamps connected to sensors (Lamps 1.1-1.4), a plurality of sensors with motion detection enabled (MS1.1-1.4), and a plurality of sensors with photo sensing enabled (PS1.1-1.4). Network1 may also include other nodes, such as nodes with sensors having both motion and photo sensing enabled. Network2 and Network3 may each similarly include similar nodes.

A motion enabled and/or photo enabled sensor within a network may be employed in controlling the multi-level operation of any one or more of the lamps within that network, possibly in accord with one or more aspects of the methods described above. For example, MS1.3 may be employed to detect human motion within Network1, and then PS1.2 may be employed to detect the current or ambient lighting level in the region associated with Network1, such that Lamp1.1, Lamp1.2, and Lamp1.4 may be adjusted based on the detected ambient light. Thereafter, the lighting level may be continuously, periodically, intermittently, or otherwise maintained or adjusted based on continuous or repeated detection of the lighting level in the region via PS1.2. However, the lighting level may also or alternatively be maintained or adjusted based on continuous or repeated detection of the lighting level in the region via PS1.1, PS1.3, and/or PS1.4. Thus, one or more of MS1.1-1.4 and/or one or more of PS1.1-1.4 may be employed to initiate or trigger the multi-level operation of one or more of Lamp1.1-1.4, and the continued multi-level operation of the one or more Lamp1.1-1.4 may be at least partially controlled by a different one or more of MS1.1-1.4 and/or a different one or more of PS1.1-1.4 that were employed to initiate or trigger the multi-level operation.

However, a motion sensor and/or photo sensor within a network may also be employed in controlling the multi-level operation of any one or more of the lamps within another one or more networks, possibly in accord with one or more aspects of the methods described above. For example, MS1.3 may be employed to detect human motion within Network3, and then PS2.2 and/or PS3.2 (possibly among others) may be employed to detect the current or ambient lighting level in the region associated with Network2 and/or Network3. Thus, any one or more of Lamp3.1, Lamp3.2, Lamp3.3, and Lamp3.4 may be adjusted based on the detected ambient light, possibly relative to a desired or otherwise predetermined or pre-programmed lighting level. Thereafter, the lighting level may be continuously, periodically, intermittently, or otherwise maintained or adjusted based on continuous or repeated detection of the lighting level in the region via one or more of PS3.1-3.4. Moreover, any one or more of Lamp 2.1, Lamp2.2, Lamp2.3, and Lamp2.4 may also or alternatively be adjusted based on the ambient light detected in Network2 and/or Network3, and the lighting level may then be maintained or adjusted based on detection of the lighting level in the region via one or more of PS2.1-2.4 and/or PS3.1-3.4.

Thus, any one or more motion detectors and/or any one or more photo sensors in any network within the WAN 17000 may be employed to initiate and control operation of any one or more lamps within any one or more network within the WAN. Consequently, any one or more motion detectors and/or any one or more photo sensors may be employed to maintain one or more desired, pre-programmed, or otherwise predetermined lighting levels within the one or more regions corresponding to any one or more lamps within any one or more networks within the WAN. Moreover, in an exemplary embodiment, each of the networks within the WAN may comprise up to about 230 devices that are each addressable for wired or wireless communication within its network and/or the WAN. For example, each of the 230 devices may be a lamp with an attached sensor (such as the lamps 16602*a* and 16602*b* shown in FIGS. 166*a* and 166*b*), with motion sensing (such as the motion sensors 16604 and 16608 shown in FIGS. 166*a* and 166*b*), or a photo sensor (such as the photo sensors 16606 and 16610 shown in FIGS. 166*a* and 166*b*). Thus, in the exemplary embodiment depicted in FIG. 170 in which the WAN 17000 includes three networks bridged together, any one of up to 690 devices may be employed to control the lighting level in any one or more regions corresponding to lamp locations associated with the WAN. Of course, the scope of the present disclosure is not limited by the embodiment shown in FIG. 170, such that the WAN 17000 may comprise fewer or greater networks, each of which may comprise up to about 230 devices or some other predetermined number of devices.

Referring to FIG. 171, in an exemplary embodiment, a sensor 17100 may comprise a mounting interface 17102 providing an interface between a J-box 17104 (or other structure) and support structures 17106 and 17108. The sensor 17100 also comprises a housing that includes housing portions 17110 and 17112, each of which may be a substantially hollow structure having a substantially hemispherical shape. One of the housing portions 17110 and 17112 may have an opening through which motion or photo sensor transmissions may pass, although the opening may be at least partially covered by a screen or other cover 17114 through which the motion or photo sensor transmissions may also pass. Examples of the sensor 17100 may be or include, without limitation, Model No. 01-350 provided by Novitas of Peachtree, Ga.; Model No. CMR-10 provided by Sensor Switch of Wallingford, Conn.; or Model No. CX-100 provided by The Watt Stopper of Santa Clara, Calif.

Referring to FIG. 172, in an exemplary embodiment, a lamp 17200 may include a wireless device 17202 which is integral to the lamp 17200 or is a separate, discrete component that is assembled to the lamp 17200. One or more aspects of the wireless device 17202 may be substantially similar to those of the nodes described above, including the sensor 17100 described above and shown in FIG. 171. For example, the wireless device 17202 may be employed to switch a multi-level ballast-circuit when signaled by a remote motion sensor 17206.

One or more aspects of the remote motion sensor 17206 may also be substantially similar to those of the nodes described above, including sensor 17100 described above and shown in FIG. 171. The remote motion sensor 17206 may be common to all or several lamps within a zone or network, such that motion and photo sensing of one or more of the lamps within the zone or network may be disabled or deactivated. The wirelessly connected remote motion sensor 17206 can be located in an independent central location relative to a network comprising a plurality of the lamps 17200, such that the remote sensor 17206 can be networked wirelessly to any wireless device 17202 attached to lamps 17200.

Referring to FIG. 173, in an exemplary embodiment, a network 17300 may comprise a plurality of lamps 17302 each having an attached or integral wireless sensor 17304. For example, each lamp 17302 may have a motion or photo sensor 17304 attached to it. In an exemplary embodiment, all lamps 17302 in the network may have photo sensing disabled, with the possible exception of a selected one or more of the lamps 17302 that communicate to other lamps 17302 in the network 17300 how much daylight is being detected.

A lamp 17302 which detects motion may automatically switch to the high mode of multi-level operation. However, such switching is not necessarily to 100% output, but may instead include switching to a lower setting that compensates for the detected amount of daylight. Aspects of such operation may save energy relative to systems lacking this photo sensing function.

Referring to FIG. 174, in an exemplary embodiment, a graphical user interface (GUI) 17400 may be utilized with a PC to design a device network according to one or more aspects of the present disclosure. The GUI 17400 may include a "Home" tab or screen 17402 in which the device network may be created, and may also include an "Advanced Settings" tab or screen 17404 to control various aspects of the GUI 17400 and/or the device network and its components. The GUI 17400 may also include a "Changes Allowed" indicator 17406 to indicate that the current device network may be edited within the GUI 17400. The indicator 17406 may change status (e.g., to "No Changes Allowed") to indicate that the currently activated or selected device network is locked or otherwise cannot be changed.

The "Home" screen 17402 may include a "Design" tab or screen 17408 and a "Setup" tab or screen 17410. The "Design" screen 17408 may be employed to design the physical layout of the region associated with the device network, such as the size and location of rooms or zones within the network region, as well as the type and location of the devices included in the device network. The "Setup" screen 17410 may be employed to adjust the parameters and interconnection (whether wired or wireless) of the devices composing the device network.

For example, in the exemplary embodiment shown in FIG. 174, the GUI 17400 is being employed to design a device network for implementation within a school environment. The school includes a main office adjacent a principal's office and a vice principal's (VP) office. The offices are adjacent a library, a hallway, and a lobby. Two classrooms are located opposite the hallway and lobby from the library and offices. These rooms, or zones, may be created by employing a "Draw Rooms" button 17412, which may trigger a pop-up window in which the user may input room dimensions. Alternatively, the "Draw Rooms" button 17412 may trigger a drawing cursor with which the user may "click and drag" to draw the room within the workspace of the "Home" screen 17402. Of course, other means may also or alternatively be employed to draw the rooms or zones of the region associated with the device network.

The "Design" tab 17408 may also include an "Add Device" button 17416 which the user may click to add a network device to the various rooms or zones created within the workspace of the "Home" screen 17402. For example, in the exemplary embodiment depicted in FIG. 174, a lamp with attached wireless sensor device 17418 has been added to the hallway, and a lamp with integral wireless sensing 17420 has been added to the library. One or more aspects of the device 17418 may be substantially similar or identical to those of the device 17302/17304 shown in FIG. 173, and one or more aspects of the device 17420 may be substantially similar or identical to those of the device 16602*a* shown in FIGS. 166*a* and 166*b*.

Once a device (e.g., 17418 or 17420) has been added to the graphically depicted device network, the "Setup" tab 17410 may be activated to adjust the operational and internetworking parameters of the device, whether individually or relative to other devices existing in the network. As depicted in the exemplary embodiment shown in FIG. 174, the "Design" tab 17408 may also include an "Erase" button 17414 to delete any previously drawn zone or room within the network, and/or a "Remove Device" button 17422 to delete any previously added device.

Referring to FIG. 175, illustrated is an exemplary embodiment of a handheld personal digital assistant (PDA) implementation 17500 of the GUI 17400 shown in FIG. 174. The PDA implementation 17500 of the GUI 17400 may be a textual user interface, instead of a graphical interface. For example, the textual user interface may be menu driven. In an exemplary embodiment, a first menu 17510 may provide options for creating a new network, resetting a current network, receiving a network or device configuration, backing up a network, and/or restoring a network. Selecting one of these or other options (via stylus 17512) may trigger a second menu 17520 providing additional options from which the user may select. Options selected from the first menu 17510, the second menu 17520, and other menus may also provide the user option to enter alphanumeric text, the option to identify a device within a network, and/or the option to connect to a network or network device. Other menu options may also include device/network functions described above with respect to the GUI 17400 shown in FIG. 174.

The interfaces shown in FIGS. 174 and 175 and described above may be substantially similar to those provided by ControlThink of Orem, Utah.

Referring to FIG. 176, illustrated is a schematic diagram of at least a portion of an exemplary embodiment of a node 17600 according to one or more aspects of the present disclosure. One or more aspects of the node 17600 may be substantially similar or identical to those of the apparatus 17100 shown in FIG. 171, the apparatus 17202 and/or 17206 shown in FIG. 172, and/or the apparatus 17304 shown in FIG. 173.

The node 17600 comprises a master microcontroller 17602 and a networking microcontroller 17604, as described above, each of which may comprise a dedicated microprocessor or other chip. The master microcontroller 17602 and/or the networking microcontroller 17604 may be conventional or future-developed, and may either be off-the-shelf components or designed for a specific implementation (e.g., an application-specific-integrated circuit, or "ASIC").

The node 17600 may also comprise one or more circuit boards (although not depicted in FIG. 176 for the sake of clarity) to which the master microcontroller 17602 and the networking microcontroller 17604 may be coupled via conventional or future-developed means. Additional chips and other circuit components may also be coupled to the one or more circuit boards.

For example, the exemplary node 17600 depicted in FIG. 176 comprises an EEPROM or other non-volatile memory 17606 connected to the networking microcontroller 17604, the memory 17606 possibly being a conventional, commercially-available chip. Additional components which may be conventional or commercially-available components may include, as depicted in the exemplary embodiment shown in FIG. 176, an RF or other antenna 17608 connected to the networking microcontroller 17604, a photo sensor 17610 connected to the master microcontroller 17602, an IR sensor 17612 connected to the master microcontroller 17602, a relay 17614, and a power supply 17616 connected to the master microcontroller 17602 via the relay 17614.

The node 17600 may also comprise a PIR or other motion sensor 17618, which may be connected to a sensor control circuit 17620. The sensor control circuit 17620 may also be connected to the photo sensor 17610, the IR sensor 17612, and the master microcontroller 17602. A 0-10V control 17622 may also be connected to the master microcontroller 17602. Each of these components connected to the master microcontroller 17602 or the networking microcontroller 17604 may be substantially as described above with regard to components of other exemplary embodiments depicted in other figures of the present disclosure.

Once the one or more circuit boards are assembled as schematically depicted in FIG. 176, or before such assembly is completed, the circuit board(s) may be assembled within a housing or housing assembly formed of polycarbonate or similar materials. For example, the apparatus 17100 shown in FIG. 171 may include the components and circuitry schematically represented in FIG. 176.

Among other aspects, the present disclosure introduces a method comprising detecting at least one of: (1) motion within a region and (2) a lighting level within the region, and thereafter adjusting a lamp output in response to the detected one of motion and lighting level. Of course, other methods are also within the scope of the present disclosure.

For example, another method within the scope of the present disclosure comprise detecting motion within a first zone, detecting a lighting level within a second zone, and adjusting an extent to which a lamp within a third zone is energized in response to the detected motion and based on the detected lighting level. Another method within the scope of the present disclosure comprises receiving a first operation mode trigger and initiating the first operation mode in response to receiving the trigger if the lamp has operated continuously in a second operation mode for at least a predetermined duration, where the first operation mode is a multi-level operation mode. A similar method within the scope of the present disclosure comprises receiving a first operation mode trigger and initiating the first operation mode in response to receiving the trigger if cumulative operation of the lamp in a second operation mode equals a predetermined duration, where the first operation mode is a multi-level operation mode.

However, the present disclosure also introduces aspects of apparatus. For example, one apparatus within the scope of the present disclosure comprises means for detecting one of motion within a region and a lighting level within the region, and further comprises means for adjusting a lamp output in response to the detected one of motion and lighting level. Another apparatus within the scope of the present disclosure comprises a motion sensor configured to detect motion, a photo sensor configured to detect a lighting level, and a lamp having an adjustable output based on the motion and the lighting level.

The present disclosure also provides an apparatus comprising means for detecting motion within a first zone, means for detecting a lighting level within a second zone, and means for adjusting an extent to which a lamp within a third zone is energized in response to motion detected in the first zone and based on a detected lighting level in the second zone. Another apparatus introduced in the present disclosure comprises a motion sensor configured to detect motion within a first zone, a photo sensor configured to detect a lighting level within a second zone, and a processor configured to control an extent to which a lamp within a third zone is energized in response to motion detected in the first zone and based on the lighting level detected in the second zone.

Also within the scope of the present disclosure is an apparatus comprising means for receiving a first operation mode trigger and means for initiating the first operation mode in response to receipt of the trigger if the lamp has operated continuously in a second operation mode for at least a predetermined duration, where the first operation mode is a multi-level operation mode. Another apparatus introduced herein comprises a receiver configured to receive a wireless signal to trigger a first operation mode, and a controller configured to initiate the first operation mode upon receipt of the trigger if the lamp has operated continuously in a second operation mode for at least a predetermined duration, where the first operation mode is a multi-level operation mode.

A method has been described that includes detecting one of: motion within a region; and a lighting level within the region; and adjusting a lamp output in response to the detected one of motion and lighting level. In an exemplary embodiment, the method comprises a method of controlling wirelessly mesh networked nodes within the region to control a total lighting level within the region. In an exemplary embodiment, detecting the lighting level comprises detecting an ambient lighting level within the region. In an exemplary embodiment, detecting comprises detecting the motion within the region and the lighting level within the region, and wherein adjusting the lamp output comprises adjusting the lamp output in response to the detected motion and the detected lighting level. In an exemplary embodiment, detecting comprises detecting the motion within the region and the lighting level within the region, and wherein adjusting the lamp output comprises adjusting an extent to which a lamp within the region is energized in response to the detected motion and based on the detected ambient lighting level. In an exemplary embodiment, adjusting the extent to which the lamp is energized substantially compensates for a difference between the ambient lighting level and a lighting level attainable by controlling the lighting level within the region at full power for full light output. In an exemplary embodiment, adjusting the extent to which the lamp is energized comprises triggering a multi-level operation mode of the lamp. In an exemplary embodiment, the method further includes delaying triggering the multi-level operation mode until the lamp has been continuously energized in another mode for at least a predetermined duration. In an exemplary embodiment, the predetermined duration comprises about 15 minutes after power to the lamp is interrupted. In an exemplary embodiment, the predetermined duration comprises about 100 hours. In an exemplary embodiment, the method further includes wirelessly communicating a heartbeat signal in response to at least one of the detected motion and the detected ambient lighting level. In an exemplary embodiment, detecting the ambient lighting level employs a photo sensor comprising a photo sensing range, and wherein adjusting the extent to which the lamp is energized is in response to an ambient lighting level signal representing an increment of the photo sensing range. In an exemplary embodiment, the increment comprises one of a plurality of increments regularly spanning the photo sensing range. In an exemplary embodiment, the increment comprises one of ten regular increments collectively spanning the photo sensing range. In an exemplary embodiment, the increment comprises one of 100 regular increments collectively spanning the photo sensing range. In an exemplary embodiment, the increment comprises one of 1000 regular increments collectively spanning the photo sensing range. In an exemplary embodiment, adjusting the extent to which the lamp is energized comprises reducing a lamp energizing signal from a maximum value to a reduced value based on the detected ambient lighting level. In an exemplary embodiment, adjusting the extent to which the lamp is energized comprises reducing a lamp energizing signal to X % of a maximum lamp energizing signal, wherein X substantially equals the difference between detected ambient lighting level and the maximum lighting level detectable by the photo sensor.

An apparatus has been described that includes means for detecting one of: motion within a region; and a lighting level within the region; and means for adjusting a lamp output in response to the detected one of motion and lighting level. In an exemplary embodiment, the apparatus is configured to control wirelessly mesh networked nodes within the region to control a total lighting level within the region. In an exemplary embodiment, the lighting level detecting means comprises means for detecting an ambient lighting level within the region. In an exemplary embodiment, the detecting means include means for detecting the motion within the region and means for detecting the lighting level within the region, and wherein the adjusting means is configured for adjusting the lamp output in response to the detected motion and the detected lighting level. In an exemplary embodiment, the detecting means comprises means for detecting the motion within the region and means for detecting the lighting level within the region, and wherein the adjusting means is configured for adjusting an extent to which a lamp within the region is energized in response to the detected motion and based on the detected ambient lighting level. In an exemplary embodiment, the adjusting means is configured to adjust the extent to which the lamp is energized to substantially compensate for a difference between the ambient lighting level and a lighting level attainable by controlling the lighting level within the region at full power for full light output. In an exemplary embodiment, the adjusting means comprises means for triggering a multi-level operation mode of the lamp. In an exemplary embodiment, the apparatus further includes means for delaying triggering the multi-level operation mode until the lamp has been continuously energized in another mode for at least a predetermined duration. In an exemplary embodiment, the predetermined duration comprises about 15 minutes after power to the lamp is interrupted. In an exemplary embodiment, the apparatus further includes means for delaying triggering the multi-level operation mode until the lamp has been cumulatively energized in another mode for at least a predetermined duration. In an exemplary embodiment, the predetermined duration comprises about 100 hours. In an exemplary embodiment, the apparatus further includes means for wirelessly communicating a heartbeat signal in response to at least one of the detected motion and the detected ambient lighting level. In an exemplary embodiment, the means for detecting the ambient lighting level comprises a photo sensor comprising a photo sensing range, and wherein the means for adjusting the extent to which the lamp is energized is configured to adjust the extent to which the lamp is energized in response to an ambient lighting level signal representing an increment of the photo sensing range. In an exemplary embodiment, the increment comprises one of a plurality of increments regularly spanning the photo sensing range. In an exemplary embodiment, the increment comprises one of ten regular increments collectively spanning the photo sensing range. In an exemplary embodiment, the increment comprises one of 100 regular increments collectively spanning the photo sensing range. In an exemplary embodiment, the increment comprises one of 1000 regular increments collectively spanning the photo sensing range. In an exemplary embodiment, the means for adjusting the extent to which the lamp is energized is configured to reduce a lamp energizing signal from a maximum value to a reduced value based on the detected ambient lighting level. In an exemplary embodiment, the means for adjusting the extent to which the lamp is energized is configured to reduce a lamp energizing signal to X % of a maximum lamp energizing signal, wherein X substantially equals the difference between detected ambient lighting level and the maximum lighting level detectable by the photo sensor.

An apparatus has been described that includes a motion sensor configured to detect motion; a photo sensor configured to detect a lighting level; and a lamp comprising an adjustable output based on the motion and the lighting level. In an exemplary embodiment, at least one of the motion sensor and the photo sensor is remotely located relative to the lamp. In an exemplary embodiment, at least one of the motion sensor and the photo sensor is co-located with the lamp. In an exemplary embodiment, the lamp is operable in a multi-level operation mode in which the lamp is energized via a plurality of different power levels. In an exemplary embodiment, the apparatus further includes a control configured to delay triggering the multi-level operation mode until the lamp has been continuously energized in another mode for at least a predetermined duration. In an exemplary embodiment, the predetermined duration comprises about 15 minutes after power to the lamp is interrupted. In an exemplary embodiment, the apparatus further includes a control configured to delay triggering the multi-level operation mode until the lamp has been cumulatively energized in another mode for at least a predetermined duration. In an exemplary embodiment, the predetermined duration comprises about 100 hours. In an exemplary embodiment, the apparatus further includes a wireless communications component configured to communicate a heartbeat signal in response to at least one of the detected motion and the detected lighting level. In an exemplary embodiment, the wireless communications component comprises a receiver configured to receive wireless communications. In an exemplary embodiment, the wireless communications component comprises a transmitter configured to transmit wireless communications. In an exemplary embodiment, the photo sensor is operable within a photo sensing range, and wherein the adjustable output of the lamp is adjustable in response to an ambient lighting level signal representing an increment of the photo sensing range. In an exemplary embodiment, the increment comprises one of a plurality of increments regularly spanning the photo sensing range. In an exemplary embodiment, the increment comprises one of ten regular increments collectively spanning the photo sensing range. In an exemplary embodiment, the increment comprises one of 100 regular increments collectively spanning the photo sensing range. In an exemplary embodiment, the increment comprises one of 1000 regular increments collectively spanning the photo sensing range. In an exemplary embodiment, the lamp is configured such that the output is adjustable from a maximum value to a lower value based on the detected lighting level. In an exemplary embodiment, the lamp is configured such that the output is adjustable to X % of a maximum lamp energizing signal, wherein X substantially equals the difference between the detected lighting level and the maximum lighting level detectable by the photo sensor. In an exemplary embodiment, the apparatus further includes at least one of: an IR beam detector; an LED status indicator; a lamp relay; and a 0-10V control. In an exemplary embodiment, the apparatus further includes a processor configured to communicate signals between the motion sensor, the photo sensor, and an electrical ballast associated with the lamp. In an exemplary embodiment, the apparatus comprises one of a plurality of wirelessly mesh networked nodes and the processor comprises: a first microprocessor configured to control networking of the apparatus with other ones of the plurality of nodes; and a second microprocessor configured to control the motion sensor and the photo sensor and interact with the first microprocessor. In an exemplary embodiment, the apparatus further includes a plurality of peripheral devices including: an IR beam detector; an LED status indicator; a lamp relay; a 0-10V control; and a serial interface between the first and second microprocessors; wherein the second microprocessor is configured to control the peripheral devices.

A method has been described that includes activating a node comprising a lamp; after activating the node, operating the lamp at full power until: cumulative operation of the lamp equals at least about 100 hours, and operation of the lamp since a most recent power interruption equals at least about 15 minutes; and then activating a multi-level operation mode of the lamp, wherein the multi-level operation mode comprises: operating the lamp at a first compensating power level until the expiration of a timer, at which time operation of the lamp is halted; and restarting the timer and resuming operation of the lamp at a second compensating power level until the timer again expires, wherein the timer is restarted in response to receiving a signal, and wherein the signal is generated in response to a detected motion; wherein the first and second compensating power levels are each configured to energize the lamp to compensate for the difference between a predetermined light level and a detected daylight level.

A method of operating a node comprising a lamp has been described that includes if a burn-in time expires when a new lamp burn-in state is active, transitioning to a start-to-high state; if a start-to-high time expires when the start-to-high state is active, transitioning to a heartbeat state and: if a heartbeat timer is 0, deactivating a lamp relay by setting a 0-10V control to 0V; or if the heartbeat timer is not 0, activating the lamp relay by setting the 0-10V control to a last known value; if a heartbeat timer expires when the heartbeat state is active, deactivating the lamp relay by setting the 0-10V control to 0V; if a heartbeat message is received when the new lamp burn-in state is active, refreshing the heartbeat timer and caching a 0-10V value; if a heartbeat message is received when the start-to-high state is active, refreshing the heartbeat timer and caching a 0-10V value; if a heartbeat message is received when the heartbeat state is active, refreshing the heartbeat timer, caching a 0-10V value, and activating the relay by setting the 0-10V control to the cached 0-10V value; if a heartbeat message is received when a locked state is active, refreshing the heartbeat timer and caching a 0-10V value; if a radio-frequency (RF) command is received when the heartbeat state is active, setting the 0-10V control to a requested value, starting a lock timer, and transitioning to the locked state; if an RF command is received when the locked state is active, setting the 0-10V control to a requested value and refreshing the lock timer; if the lock timer expires when the locked state is active, transitioning to the heartbeat state and: if the heartbeat timer is 0, deactivating the relay by setting the 0-10V control to 0V, or if the heartbeat timer is not 0, activating the relay by setting the 0-10V control to a last known value; if a new lamp burn-in time is reset via RF command when the new lamp burn-in state is active, resetting the new lamp burn-in time; if the new lamp burn-in time is reset via RF command when the start-to-high state is active, transitioning to the new lamp burn-in state and resetting the new lamp burn-in time; if the new lamp burn-in time is reset via RF command when the heartbeat state is active, transitioning to the new lamp burn-in state and resetting the new lamp burn-in time; if the new lamp burn-in time is reset via RF command when the locked state is active, transitioning to the new lamp burn-in state and resetting the new lamp burn-in time; if a panic start command is received when the new lamp burn-in state is active, caching the new lamp burn-in state and transitioning to a panic state; if the panic start command is received when the start-to-high state is active, caching the start-to-high state and transitioning to the panic state; if the panic start command is received when the heartbeat state is active, caching the heartbeat state and transitioning to the panic state; if the panic start command is received when the locked state is active, caching the locked state and transitioning to the panic state; if the panic stop command is received, transitioning to a cached state; if an evacuation start command is received when the new lamp burn-in state is active, caching the new lamp burn-in state and transitioning to an evacuation state; if the evacuation start command is received when the start-to-high state is active, caching the start-to-high state and transitioning to the evacuation state; if the evacuation start command is received when the heartbeat state is active, caching the heartbeat state and transitioning to the evacuation state; if the evacuation start command is received when the locked state is active, caching the locked state and transitioning to the evacuation state; if the evacuation start command is received when the panic state is active, caching the panic state and transitioning to the evacuation state; if the evacuation start command is received when the evacuation state is active, resetting an evacuation timer; and if the evacuation stop command is received, transitioning to a cached state.

A system has been described that includes means for activating a node comprising a lamp; after activating the node, means for operating the lamp at full power until: cumulative operation of the lamp equals at least about 100 hours, and operation of the lamp since a most recent power interruption equals at least about 15 minutes; and then means for activating a multi-level operation mode of the lamp, wherein the multi-level operation mode comprises: means for operating the lamp at a first compensating power level until the expiration of a timer, at which time operation of the lamp is halted; and means for restarting the timer and resuming operation of the lamp at a second compensating power level until the timer again expires, wherein the timer is restarted in response to receiving a signal, and wherein the signal is generated in response to a detected motion; wherein the first and second compensating power levels are each configured to energize the lamp to compensate for the difference between a predetermined light level and a detected daylight level.

A system for operating a node comprising a lamp has been described that includes if a burn-in time expires when a new lamp burn-in state is active, means for transitioning to a start-to-high state; if a start-to-high time expires when the start-to-high state is active, means for transitioning to a heartbeat state and: if a heartbeat timer is 0, deactivating a lamp relay by setting a 0-10V control to 0V; or if the heartbeat timer is not 0, means for activating the lamp relay by setting the 0-10V control to a last known value; if a heartbeat timer expires when the heartbeat state is active, means for deactivating the lamp relay by setting the 0-10V control to 0V; if a heartbeat message is received when the new lamp burn-in state is active, means for refreshing the heartbeat timer and caching a 0-10V value; if a heartbeat message is received when the start-to-high state is active, means for refreshing the heartbeat timer and caching a 0-10V value; if a heartbeat message is received when the heartbeat state is active, means for refreshing the heartbeat timer, means for caching a 0-10V value, and means for activating the relay by setting the 0-10V control to the cached 0-10V value; if a heartbeat message is received when a locked state is active, means for refreshing the heartbeat timer and caching a 0-10V value; if a radio-frequency (RF) command is received when the heartbeat state is active, means for setting the 0-10V control to a requested value, means for starting a lock timer, and means for transitioning to the locked state; if an RF command is received when the locked state is active, means for setting the 0-10V control to a requested value and refreshing the lock timer; if the lock timer expires when the locked state is active, means for transitioning to the heartbeat state and: if the heartbeat timer is 0, means for deactivating the relay by setting the 0-10V control to 0V, or if the heartbeat timer is not 0, means for activating the relay by setting the 0-10V control to a last known value; if a new lamp burn-in time is reset via RF command when the new lamp burn-in state is active, means for resetting the new lamp burn-in time; if the new lamp burn-in time is reset via RF command when the start-to-high state is active, means for transitioning to the new lamp burn-in state and resetting the new lamp burn-in time; if the new lamp burn-in time is reset via RF command when the heartbeat state is active, means for transitioning to the new lamp burn-in state and resetting the new lamp burn-in time; if the new lamp burn-in time is reset via RF command when the locked state is active, means for transitioning to the new lamp burn-in state and resetting the new lamp burn-in time; if a panic start command is received when the new lamp burn-in state is active, means for caching the new lamp burn-in state and transitioning to a panic state; if the panic start command is received when the start-to-high state is active, means for caching the start-to-high state and transitioning to the panic state; if the panic start command is received when the heartbeat state is active, means for caching the heartbeat state and transitioning to the panic state; if the panic start command is received when the locked state is active, means for caching the locked state and transitioning to the panic state; if the panic stop command is received, means for transitioning to a cached state; if an evacuation start command is received when the new lamp burn-in state is active, means for caching the new lamp burn-in state and transitioning to an evacuation state; if the evacuation start command is received when the start-to-high state is active, means for caching the start-to-high state and transitioning to the evacuation state; if the evacuation start command is received when the heartbeat state is active, means for caching the heartbeat state and transitioning to the evacuation state; if the evacuation start command is received when the locked state is active, means for caching the locked state and transitioning to the evacuation state; if the evacuation start command is received when the panic state is active, means for caching the panic state and transitioning to the evacuation state; if the evacuation start command is received when the evacuation state is active, means for resetting an evacuation timer; and if the evacuation stop command is received, means for transitioning to a cached state.

A method has been described that includes detecting one of: motion within a region; and a lighting level within the region; adjusting a lamp output in response to the detected one of motion and lighting level; delaying triggering the multi-level operation mode until the lamp has been continuously energized in another mode for at least a predetermined duration; and wirelessly communicating a heartbeat signal in response to at least one of the detected motion and the detected ambient lighting level; wherein the method is a method of controlling wirelessly mesh networked nodes within the region to control a total lighting level within the region; wherein detecting the lighting level comprises detecting an ambient lighting level within the region; wherein detecting comprises detecting the motion within the region and the lighting level within the region; wherein adjusting the lamp output comprises adjusting the lamp output in response to the detected motion and the detected lighting level; wherein detecting comprises detecting the motion within the region and the lighting level within the region; wherein adjusting the lamp output comprises adjusting an extent to which a lamp within the region is energized in response to the detected motion and based on the detected ambient lighting level; wherein adjusting the extent to which the lamp is energized substantially compensates for a difference between the ambient lighting level and a lighting level attainable by controlling the lighting level within the region at full power for full light output; wherein adjusting the extent to which the lamp is energized comprises triggering a multi-level operation mode of the lamp; wherein the predetermined duration comprises about 15 minutes after power to the lamp is interrupted; wherein the predetermined duration comprises about 100 hours; wherein detecting the ambient lighting level employs a photo sensor comprising a photo sensing range; wherein adjusting the extent to which the lamp is energized is in response to an ambient lighting level signal representing an increment of the photo sensing range; wherein the increment comprises one of a plurality of increments regularly spanning the photo sensing range; wherein the increment comprises one of ten regular increments collectively spanning the photo sensing range; wherein the increment comprises one of 100 regular increments collectively spanning the photo sensing range; wherein the increment comprises one of 1000 regular increments collectively spanning the photo sensing range; wherein adjusting the extent to which the lamp is energized comprises reducing a lamp energizing signal from a maximum value to a reduced value based on the detected ambient lighting level; wherein adjusting the extent to which the lamp is energized comprises reducing a lamp energizing signal to X % of a maximum lamp energizing signal, wherein X substantially equals the difference between detected ambient lighting level and the maximum lighting level detectable by the photo sensor.

An apparatus has been described that includes means for detecting one of: motion within a region; and a lighting level within the region; means for adjusting a lamp output in response to the detected one of motion and lighting level; means for delaying triggering the multi-level operation mode until the lamp has been continuously energized in another mode for at least a predetermined duration; and means for wirelessly communicating a heartbeat signal in response to at least one of the detected motion and the detected ambient lighting level; wherein means for detecting the lighting level comprises means for detecting an ambient lighting level within the region; wherein means for detecting comprises means for detecting the motion within the region and the lighting level within the region; wherein means for adjusting the lamp output comprises means for adjusting the lamp output in response to the detected motion and the detected lighting level; wherein means for detecting comprises means for detecting the motion within the region and the lighting level within the region; wherein means for adjusting the lamp output comprises means for adjusting an extent to which a lamp within the region is energized in response to the detected motion and based on the detected ambient lighting level; wherein means for adjusting the extent to which the lamp is energized substantially compensates for a difference between the ambient lighting level and a lighting level attainable by controlling the lighting level within the region at full power for full light output; wherein means for adjusting the extent to which the lamp is energized comprises means for triggering a multi-level operation mode of the lamp; wherein the predetermined duration comprises about 15 minutes after power to the lamp is interrupted; wherein the predetermined duration comprises about 100 hours; wherein means for detecting the ambient lighting level employs a photo sensor comprising a photo sensing range; wherein means for adjusting the extent to which the lamp is energized is in response to an ambient lighting level signal representing an increment of the photo sensing range; wherein the increment comprises one of a plurality of increments regularly spanning the photo sensing range; wherein the increment comprises one of ten regular increments collectively spanning the photo sensing range; wherein the increment comprises one of 100 regular increments collectively spanning the photo sensing range; wherein the increment comprises one of 1000 regular increments collectively spanning the photo sensing range; wherein means for adjusting the extent to which the lamp is energized comprises means for reducing a lamp energizing signal from a maximum value to a reduced value based on the detected ambient lighting level; wherein means for adjusting the extent to which the lamp is energized comprises means for reducing a lamp energizing signal to X % of a maximum lamp energizing signal, wherein X substantially equals the difference between detected ambient lighting level and the maximum lighting level detectable by the photo sensor.

An apparatus has been described that includes a motion sensor configured to detect motion; a photo sensor configured to detect a lighting level; a lamp comprising an adjustable output based on the motion and the lighting level; a control configured to delay triggering the multi-level operation mode until the lamp has been continuously energized in another mode for at least a predetermined duration; a wireless communications component configured to communicate a heartbeat signal in response to at least one of the detected motion and the detected lighting level; at least one of: an IR beam detector; an LED status indicator; a lamp relay; and a 0-10V control; a processor configured to communicate signals between the motion sensor, the photo sensor, and an electrical ballast associated with the lamp; wherein at least one of the motion sensor and the photo sensor is remotely located relative to the lamp; wherein at least one of the motion sensor and the photo sensor is co-located with the lamp; wherein the lamp is operable in a multi-level operation mode in which the lamp is energized via a plurality of different power levels; wherein the predetermined duration comprises about 15 minutes after power to the lamp is interrupted; wherein the predetermined duration comprises about 100 hours; wherein the wireless communications component comprises a receiver configured to receive wireless communications; wherein the wireless communications component comprises a transmitter configured to transmit wireless communications; wherein the photo sensor is operable within a photo sensing range, and wherein the adjustable output of the lamp is adjustable in response to an ambient lighting level signal representing an increment of the photo sensing range; wherein the increment comprises one of a plurality of increments regularly spanning the photo sensing range; wherein the increment comprises one of ten regular increments collectively spanning the photo sensing range; wherein the increment comprises one of 100 regular increments collectively spanning the photo sensing range; wherein the increment comprises one of 1000 regular increments collectively spanning the photo sensing range; wherein the lamp is configured such that the output is adjustable from a maximum value to a lower value based on the detected lighting level; wherein the lamp is configured such that the output is adjustable to X % of a maximum lamp energizing signal, wherein X substantially equals the difference between the detected lighting level and the maximum lighting level detectable by the photo sensor; and wherein the apparatus comprises one of a plurality of wirelessly mesh networked nodes and the processor comprises: a first microprocessor configured to control networking of the apparatus with other ones of the plurality of nodes; and a second microprocessor configured to control the motion sensor and the photo sensor and interact with the first microprocessor; and further comprising a plurality of peripheral devices including: an IR beam detector; an LED status indicator; a lamp relay; a 0-10V control; and a serial interface between the first and second microprocessors; wherein the second microprocessor is configured to control the peripheral devices.

A method has been described that includes detecting motion within a first zone; detecting a lighting level within a second zone; and adjusting an extent to which a lamp within a third zone is energized in response to the detected motion and based on the detected lighting level. In an exemplary embodiment, the detected lighting level comprises an ambient daylight level. In an exemplary embodiment, the first, second and third zones are each physically separated from each other. In an exemplary embodiment, the first and second zones at least partially coincide. In an exemplary embodiment, the first, second and third zones at least partially coincide.

An apparatus has been described that includes means for detecting motion within a first zone; means for detecting a lighting level within a second zone; and means for adjusting an extent to which a lamp within a third zone is energized in response to motion detected in the first zone and based on a detected lighting level in the second zone. In an exemplary embodiment, the detected lighting level comprises an ambient daylight level. In an exemplary embodiment, the first, second and third zones are each physically separated from each other. In an exemplary embodiment, the first and second zones at least partially coincide. In an exemplary embodiment, the first, second and third zones at least partially coincide.

An apparatus has been described that includes a motion sensor configured to detect motion within a first zone; a photo sensor configured to detect a lighting level within a second zone; and a processor configured to control an extent to which a lamp within a third zone is energized in response to motion detected in the first zone and based on the lighting level detected in the second zone. In an exemplary embodiment, the detected lighting level comprises an ambient daylight level. In an exemplary embodiment, the first, second and third zones are each physically separated from each other. In an exemplary embodiment, the first and second zones at least partially coincide. In an exemplary embodiment, the first, second and third zones at least partially coincide.

A method of operating a first node comprising a lamp, wherein the first node is located within a first zone has been described that includes: if a burn-in time expires when a new lamp burn-in state is active, transitioning to a start-to-high state; if a start-to-high time expires when the start-to-high state is active, transitioning to a heartbeat state and: if a heartbeat timer is 0, deactivating a lamp relay by setting a 0-10V control to 0V; or if the heartbeat timer is not 0, activating the lamp relay by setting the 0-10V control to a last known value; if a heartbeat timer expires when the heartbeat state is active, deactivating the lamp relay by setting the 0-10V control to 0V; if a heartbeat message is received from a second node located within a second zone when the new lamp burn-in state is active, refreshing the heartbeat timer and caching a 0-10V value; if a heartbeat message is received from the second node when the start-to-high state is active, refreshing the heartbeat timer and caching a 0-10V value; if a heartbeat message is received from the second node when the heartbeat state is active, refreshing the heartbeat timer, caching a 0-10V value, and activating the relay by setting the 0-10V control to the cached 0-10V value; if a heartbeat message is received from the second node when a locked state is active, refreshing the heartbeat timer and caching a 0-10V value; if a radio-frequency (RF) command is received when the heartbeat state is active, setting the 0-10V control to a requested value, starting a lock timer, and transitioning to the locked state; if an RF command is received when the locked state is active, setting the 0-10V control to a requested value and refreshing the lock timer; if the lock timer expires when the locked state is active, transitioning to the heartbeat state and: if the heartbeat timer is 0, deactivating the relay by setting the 0-10V control to 0V, or if the heartbeat timer is not 0, activating the relay by setting the 0-10V control to a last known value; if a new lamp burn-in time is reset via RF command when the new lamp burn-in state is active, resetting the new lamp burn-in time; if the new lamp burn-in time is reset via RF command when the start-to-high state is active, transitioning to the new lamp burn-in state and resetting the new lamp burn-in time; if the new lamp burn-in time is reset via RF command when the heartbeat state is active, transitioning to the new lamp burn-in state and resetting the new lamp burn-in time; if the new lamp burn-in time is reset via RF command when the locked state is active, transitioning to the new lamp burn-in state and resetting the new lamp burn-in time; if a panic start command is received when the new lamp burn-in state is active, caching the new lamp burn-in state and transitioning to a panic state; if the panic start command is received when the start-to-high state is active, caching the start-to-high state and transitioning to the panic state; if the panic start command is received when the heartbeat state is active, caching the heartbeat state and transitioning to the panic state; if the panic start command is received when the locked state is active, caching the locked state and transitioning to the panic state; if the panic stop command is received, transitioning to a cached state; if an evacuation start command is received when the new lamp burn-in state is active, caching the new lamp burn-in state and transitioning to an evacuation state; if the evacuation start command is received when the start-to-high state is active, caching the start-to-high state and transitioning to the evacuation state; if the evacuation start command is received when the heartbeat state is active, caching the heartbeat state and transitioning to the evacuation state; if the evacuation start command is received when the locked state is active, caching the locked state and transitioning to the evacuation state; if the evacuation start command is received when the panic state is active, caching the panic state and transitioning to the evacuation state; if the evacuation start command is received when the evacuation state is active, resetting an evacuation timer; and if the evacuation stop command is received, transitioning to a cached state.

A system for operating a first node comprising a lamp, wherein the first node is located within a first zone, has been described that includes: if a burn-in time expires when a new lamp burn-in state is active, means for transitioning to a start-to-high state; if a start-to-high time expires when the start-to-high state is active, means for transitioning to a heartbeat state and: if a heartbeat timer is 0, means for deactivating a lamp relay by setting a 0-10V control to 0V; or if the heartbeat timer is not 0, means for activating the lamp relay by setting the 0-10V control to a last known value; if a heartbeat timer expires when the heartbeat state is active, means for deactivating the lamp relay by setting the 0-10V control to 0V; if a heartbeat message is received from a second node located within a second zone when the new lamp burn-in state is active, means for refreshing the heartbeat timer and caching a 0-10V value; if a heartbeat message is received from the second node when the start-to-high state is active, means for refreshing the heartbeat timer and caching a 0-10V value; if a heartbeat message is received from the second node when the heartbeat state is active, means for refreshing the heartbeat timer, caching a 0-10V value, and activating the relay by setting the 0-10V control to the cached 0-10V value; if a heartbeat message is received from the second node when a locked state is active, means for refreshing the heartbeat timer and caching a 0-10V value; if a radio-frequency (RF) command is received when the heartbeat state is active, setting the 0-10V control to a requested value, means for starting a lock timer, and transitioning to the locked state; if an RF command is received when the locked state is active, means for setting the 0-10V control to a requested value and refreshing the lock timer; if the lock timer expires when the locked state is active, means for transitioning to the heartbeat state and: if the heartbeat timer is 0, means for deactivating the relay by setting the 0-10V control to 0V, or if the heartbeat timer is not 0, means for activating the relay by setting the 0-10V control to a last known value; if a new lamp burn-in time is reset via RF command when the new lamp burn-in state is active, means for resetting the new lamp burn-in time; if the new lamp burn-in time is reset via RF command when the start-to-high state is active, means for transitioning to the new lamp burn-in state and resetting the new lamp burn-in time; if the new lamp burn-in time is reset via RF command when the heartbeat state is active, means for transitioning to the new lamp burn-in state and resetting the new lamp burn-in time; if the new lamp burn-in time is reset via RF command when the locked state is active, means for transitioning to the new lamp burn-in state and resetting the new lamp burn-in time; if a panic start command is received when the new lamp burn-in state is active, means for caching the new lamp burn-in state and transitioning to a panic state; if the panic start command is received when the start-to-high state is active, means for caching the start-to-high state and transitioning to the panic state; if the panic start command is received when the heartbeat state is active, means for caching the heartbeat state and transitioning to the panic state; if the panic start command is received when the locked state is active, means for caching the locked state and transitioning to the panic state; if the panic stop command is received, means for transitioning to a cached state; if an evacuation start command is received when the new lamp burn-in state is active, means for caching the new lamp burn-in state and transitioning to an evacuation state; if the evacuation start command is received when the start-to-high state is active, means for caching the start-to-high state and transitioning to the evacuation state; if the evacuation start command is received when the heartbeat state is active, means for caching the heartbeat state and transitioning to the evacuation state; if the evacuation start command is received when the locked state is active, means for caching the locked state and transitioning to the evacuation state; if the evacuation start command is received when the panic state is active, means for caching the panic state and transitioning to the evacuation state; if the evacuation start command is received when the evacuation state is active, means for resetting an evacuation timer; and if the evacuation stop command is received, means for transitioning to a cached state.

A method has been described that includes detecting motion within a first zone; detecting a lighting level within a second zone; and adjusting an extent to which a lamp within a third zone is energized in response to the detected motion and based on the detected lighting level; wherein the detected lighting level comprises an ambient daylight level; wherein the first, second and third zones are each physically separated from each other; wherein the first and second zones at least partially coincide; and wherein the first, second and third zones at least partially coincide.

An apparatus has been described that includes means for detecting motion within a first zone; means for detecting a lighting level within a second zone; and means for adjusting an extent to which a lamp within a third zone is energized in response to the detected motion and based on the detected lighting level; wherein the detected lighting level comprises an ambient daylight level; wherein the first, second and third zones are each physically separated from each other; wherein the first and second zones at least partially coincide; and wherein the first, second and third zones at least partially coincide.

An apparatus has been described that includes a motion sensor configured to detect motion within a first zone; a photo sensor configured to detect a lighting level within a second zone; and a processor configured to control an extent to which a lamp within a third zone is energized in response to motion detected in the first zone and based on the lighting level detected in the second zone; wherein the detected lighting level comprises an ambient daylight level; wherein the first, second and third zones are each physically separated from each other; wherein the first and second zones at least partially coincide; and wherein the first, second and third zones at least partially coincide.

A method of operating a lamp has been described that includes receiving a first operation mode trigger; and initiating the first operation mode in response to receiving the trigger if the lamp has operated continuously in a second operation mode for at least a predetermined duration; wherein the first operation mode is a multi-level operation mode. In an exemplary embodiment, the second operation mode comprises a full power operation mode. In an exemplary embodiment, the predetermined duration comprises about 15 minutes after a most recent power interruption. In an exemplary embodiment, the lamp comprises at least one of a photo sensor and a motion sensor. In an exemplary embodiment, the multi-level operation mode comprises energizing the lamp in response to a detected ambient lighting level to substantially compensate for a difference between the detected ambient lighting level and a lighting level attainable when the lamp is operated at full power to provide full light output. In an exemplary embodiment, the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output. In an exemplary embodiment, the multi-level operation mode trigger is indicative of motion detected in a zone associated with the lamp.

An apparatus for controlling a lamp has been described that includes means for receiving a first operation mode trigger; and means for initiating the first operation mode in response to receipt of the trigger if the lamp has operated continuously in a second operation mode for at least a predetermined duration; wherein the first operation mode is a multi-level operation mode. In an exemplary embodiment, the second operation mode comprises a full power operation mode. In an exemplary embodiment, the predetermined duration comprises about 15 minutes after a most recent power interruption. In an exemplary embodiment, the apparatus further includes means for detecting motion and means for detecting a lighting level. In an exemplary embodiment, the multi-level operation mode comprises energizing the lamp in response to a detected ambient lighting level to substantially compensate for a difference between the detected ambient lighting level and a lighting level attainable when the lamp is operated at full power to provide full light output. In an exemplary embodiment, the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output. In an exemplary embodiment, the multi-level operation mode trigger is indicative of motion detected in a zone associated with the lamp.

An apparatus for controlling a lamp has been described that includes a receiver configured to receive a wireless signal to trigger a first operation mode; and a controller configured to initiate the first operation mode upon receipt of the trigger if the lamp has operated continuously in a second operation mode for at least a predetermined duration; wherein the first operation mode is a multi-level operation mode. In an exemplary embodiment, the second operation mode comprises a full power operation mode. In an exemplary embodiment, the predetermined duration comprises about 15 minutes after a most recent power interruption. In an exemplary embodiment, the lamp comprises at least one of a photo sensor and a motion sensor. In an exemplary embodiment, the multi-level operation mode comprises energizing the lamp in response to a detected ambient lighting level to substantially compensate for a difference between the detected ambient lighting level and a lighting level attainable when the lamp is operated at full power to provide full light output. In an exemplary embodiment, the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output. In an exemplary embodiment, the multi-level operation mode trigger is indicative of motion detected in a zone associated with the lamp.

A method of operating a node comprising a lamp has been described that includes if a burn-in time expires when a new lamp burn-in state is active, transitioning to a start-to-high state; if a start-to-high timer expires when the start-to-high state is active, transitioning to a heartbeat state and: if a heartbeat timer is 0, deactivating a lamp relay by setting a 0-10V control to 0V; or if the heartbeat timer is not 0, activating the lamp relay by setting the 0-10V control to a last known value; if a heartbeat message is received when the start-to-high state is active, refreshing the heartbeat timer and caching a 0-10V value; if a new lamp burn-in time is reset via RF command when the start-to-high state is active, transitioning to the new lamp burn-in state and resetting the new lamp burn-in time; if a panic start command is received when the start-to-high state is active, caching the start-to-high state and transitioning to a panic state; and if an evacuation start command is received when the start-to-high state is active, caching the start-to-high state and transitioning to an evacuation state.

A system for operating a node comprising a lamp has been described that includes if a burn-in time expires when a new lamp burn-in state is active, means for transitioning to a start-to-high state; if a start-to-high timer expires when the start-to-high state is active, means for transitioning to a heartbeat state and: if a heartbeat timer is 0, means for deactivating a lamp relay by setting a 0-10V control to 0V; or if the heartbeat timer is not 0, means for activating the lamp relay by setting the 0-10V control to a last known value; if a heartbeat message is received when the start-to-high state is active, means for refreshing the heartbeat timer and caching a 0-10V value; if a new lamp burn-in time is reset via RF command when the start-to-high state is active, means for transitioning to the new lamp burn-in state and resetting the new lamp burn-in time; if a panic start command is received when the start-to-high state is active, means for caching the start-to-high state and transitioning to a panic state; and if an evacuation start command is received when the start-to-high state is active, means for caching the start-to-high state and transitioning to an evacuation state.

A method of operating a lamp has been described that includes receiving a first operation mode trigger; and initiating the first operation mode in response to receiving the trigger if the lamp has operated continuously in a second operation mode for at least a predetermined duration; wherein the first operation mode is a multi-level operation mode; wherein the second operation mode comprises a full power operation mode; wherein the predetermined duration comprises about 15 minutes after a most recent power interruption; wherein the lamp comprises at least one of a photo sensor and a motion sensor; wherein the multi-level operation mode comprises energizing the lamp in response to a detected ambient lighting level to substantially compensate for a difference between the detected ambient lighting level and a lighting level attainable when the lamp is operated at full power to provide full light output; wherein the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output; and wherein the multi-level operation mode trigger is indicative of motion detected in a zone associated with the lamp.

An apparatus for controlling a lamp has been described that includes means for receiving a first operation mode trigger; and means for initiating the first operation mode in response to receipt of the trigger if the lamp has operated continuously in a second operation mode for at least a predetermined duration; wherein the first operation mode is a multi-level operation mode; wherein the second operation mode comprises a full power operation mode; wherein the predetermined duration comprises about 15 minutes after a most recent power interruption; wherein the lamp comprises at least one of a photo sensor and a motion sensor; wherein the multi-level operation mode comprises energizing the lamp in response to a detected ambient lighting level to substantially compensate for a difference between the detected ambient lighting level and a lighting level attainable when the lamp is operated at full power to provide full light output; wherein the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output; and wherein the multi-level operation mode trigger is indicative of motion detected in a zone associated with the lamp.

An apparatus for controlling a lamp has been described that includes a receiver configured to receive a wireless signal to trigger a first operation mode; and a controller configured to initiate the first operation mode upon receipt of the trigger if the lamp has operated continuously in a second operation mode for at least a predetermined duration; wherein the first operation mode is a multi-level operation mode; wherein the second operation mode comprises a full power operation mode; wherein the predetermined duration comprises about 15 minutes after a most recent power interruption; wherein the lamp comprises at least one of a photo sensor and a motion sensor; wherein the multi-level operation mode comprises energizing the lamp in response to a detected ambient lighting level to substantially compensate for a difference between the detected ambient lighting level and a lighting level attainable when the lamp is operated at full power to provide full light output; wherein the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output; and wherein the multi-level operation mode trigger is indicative of motion detected in a zone associated with the lamp.

A method of operating a lamp has been described that includes receiving a first operation mode trigger; and initiating the first operation mode in response to receiving the trigger if cumulative operation of the lamp in a second operation mode equals a predetermined duration; wherein the first operation mode is a multi-level operation mode. In an exemplary embodiment, the second operation mode comprises a full power operation mode. In an exemplary embodiment, the predetermined duration comprises at least about 100 hours. In an exemplary embodiment, the lamp comprises at least one of a photo sensor and a motion sensor. In an exemplary embodiment, the multi-level operation mode comprises energizing the lamp in response to a detected ambient lighting level to substantially compensate for a difference between the detected ambient lighting level and a lighting level attainable when the lamp is operated at full power to provide full light output. In an exemplary embodiment, the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output. In an exemplary embodiment, the multi-level operation mode trigger is indicative of motion detected in a zone associated with the lamp.

An apparatus for controlling a lamp has been described that includes means for receiving a first operation mode trigger; and means for initiating the first operation mode in response to receipt of the trigger if the lamp has cumulatively operated in a second operation mode for at least a predetermined duration; wherein the first operation mode is a multi-level operation mode. In an exemplary embodiment, the second operation mode comprises a full power operation mode. In an exemplary embodiment, the predetermined duration comprises at least about 100 hours. In an exemplary embodiment, the apparatus further includes a motion sensor and a photo sensor. In an exemplary embodiment, the multi-level operation mode comprises energizing the lamp in response to a detected ambient lighting level to substantially compensate for a difference between the detected ambient lighting level and a lighting level attainable when the lamp is operated at full power to provide full light output. In an exemplary embodiment, the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output. In an exemplary embodiment, the multi-level operation mode trigger is indicative of motion detected in a zone associated with the lamp.

An apparatus for controlling a lamp has been described that includes a receiver configured to receive a wireless signal to trigger a first operation mode; and a controller configured to initiate the first operation mode upon receipt of the trigger if cumulative operation of the lamp in a second operation mode equals a predetermined duration; wherein the first operation mode is a multi-level operation mode. In an exemplary embodiment, the second operation mode comprises a full power operation mode. In an exemplary embodiment, the predetermined duration comprises at least about 100 hours. In an exemplary embodiment, the lamp comprises at least one of a photo sensor and a motion sensor. In an exemplary embodiment, the multi-level operation mode comprises energizing the lamp in response to a detected ambient lighting level to substantially compensate for a difference between the detected ambient lighting level and a lighting level attainable when the lamp is operated at full power to provide full light output. In an exemplary embodiment, the lamp comprises one of a plurality of lamps within a zone, and wherein the multi-level operation mode comprises energizing each of the lamps in response to a detected ambient lighting level to substantially compensate for a difference between the detected ambient lighting level and a lighting level attainable when the lamps are each operated at full power to provide full light output. In an exemplary embodiment, the multi-level operation mode trigger is indicative of motion detected in a zone associated with the lamp.

A method of operating a node comprising a lamp has been described that includes if a burn-in time expires when a new lamp burn-in state is active, transitioning to a start-to-high state; if a heartbeat message is received when the new lamp burn-in state is active, refreshing a heartbeat timer and caching a 0-10V value; if a new lamp burn-in time is reset via RF command when the new lamp burn-in state is active, resetting the new lamp burn-in time; if the new lamp burn-in time is reset via RF command when the start-to-high state is active, transitioning to the new lamp burn-in state and resetting the new lamp burn-in time; if the new lamp burn-in time is reset via RF command when a heartbeat state is active, transitioning to the new lamp burn-in state and resetting the new lamp burn-in time; if the new lamp burn-in time is reset via RF command when a locked state is active, transitioning to the new lamp burn-in state and resetting the new lamp burn-in time; if a panic start command is received when the new lamp burn-in state is active, caching the new lamp burn-in state and transitioning to a panic state; and if an evacuation start command is received when the new lamp burn-in state is active, caching the new lamp burn-in state and transitioning to an evacuation state.

A system for operating a node comprising a lamp has been described that includes if a burn-in time expires when a new lamp burn-in state is active, means for transitioning to a start-to-high state; if a heartbeat message is received when the new lamp burn-in state is active, means for refreshing a heartbeat timer and caching a 0-10V value; if a new lamp burn-in time is reset via RF command when the new lamp burn-in state is active, means for resetting the new lamp burn-in time; if the new lamp burn-in time is reset via RF command when the start-to-high state is active, means for transitioning to the new lamp burn-in state and resetting the new lamp burn-in time; if the new lamp burn-in time is reset via RF command when a heartbeat state is active, means for transitioning to the new lamp burn-in state and resetting the new lamp burn-in time; if the new lamp burn-in time is reset via RF command when a locked state is active, means for transitioning to the new lamp burn-in state and resetting the new lamp burn-in time; if a panic start command is received when the new lamp burn-in state is active, means for caching the new lamp burn-in state and transitioning to a panic state; and if an evacuation start command is received when the new lamp burn-in state is active, means for caching the new lamp burn-in state and transitioning to an evacuation state.

A method of operating a lamp has been described that includes receiving a first operation mode trigger; and initiating the first operation mode in response to receiving the trigger if cumulative operation of the lamp in a second operation mode equals a predetermined duration; wherein the first operation mode is a multi-level operation mode; wherein the second operation mode comprises a full power operation mode; wherein the predetermined duration comprises at least about 100 hours; wherein the lamp comprises at least one of a photo sensor and a motion sensor; wherein the multi-level operation mode comprises energizing the lamp in response to a detected ambient lighting level to substantially compensate for a difference between the detected ambient lighting level and a lighting level attainable when the lamp is operated at full power to provide full light output; wherein the lamp comprises one of a plurality of lamps within a zone; wherein the multi-level operation mode comprises energizing each of the lamps in response to a detected ambient lighting level to substantially compensate for a difference between the detected ambient lighting level and a lighting level attainable when the lamps are each operated at full power to provide full light output; and wherein the multi-level operation mode trigger is indicative of motion detected in a zone associated with the lamp.

An apparatus for controlling a lamp has been described that includes means for receiving a first operation mode trigger; and means for initiating the first operation mode in response to receipt of the trigger if the lamp has cumulatively operated in a second operation mode for at least a predetermined duration; wherein the first operation mode is a multi-level operation mode; wherein the second operation mode comprises a full power operation mode; wherein the predetermined duration comprises at least about 100 hours; wherein the lamp comprises at least one of a photo sensor and a motion sensor; wherein the multi-level operation mode comprises energizing the lamp in response to a detected ambient lighting level to substantially compensate for a difference between the detected ambient lighting level and a lighting level attainable when the lamp is operated at full power to provide full light output; wherein the lamp comprises one of a plurality of lamps within a zone; wherein the multi-level operation mode comprises energizing each of the lamps in response to a detected ambient lighting level to substantially compensate for a difference between the detected ambient lighting level and a lighting level attainable when the lamps are each operated at full power to provide full light output; and wherein the multi-level operation mode trigger is indicative of motion detected in a zone associated with the lamp.

An apparatus for controlling a lamp has been described that includes a receiver configured to receive a wireless signal to trigger a first operation mode; and a controller configured to initiate the first operation mode upon receipt of the trigger if cumulative operation of the lamp in a second operation mode equals a predetermined duration; wherein the first operation mode is a multi-level operation mode; wherein the second operation mode comprises a full power operation mode; wherein the predetermined duration comprises at least about 100 hours; wherein the lamp comprises at least one of a photo sensor and a motion sensor; wherein the multi-level operation mode comprises energizing the lamp in response to a detected ambient lighting level to substantially compensate for a difference between the detected ambient lighting level and a lighting level attainable when the lamp is operated at full power to provide full light output; wherein the lamp comprises one of a plurality of lamps within a zone; wherein the multi-level operation mode comprises energizing each of the lamps in response to a detected ambient lighting level to substantially compensate for a difference between the detected ambient lighting level and a lighting level attainable when the lamps are each operated at full power to provide full light output; and wherein the multi-level operation mode trigger is indicative of motion detected in a zone associated with the lamp.

It is understood that variations may be made in the foregoing without departing from the scope of the disclosure.

Any foregoing spatial references such as, for example, "upper," "lower," "above," "below," "rear," "between," "vertical," "angular," etc., are for the purpose of illustration only and do not limit the specific orientation or location of the structure described above.

In several exemplary embodiments, it is understood that one or more of the operational steps in each embodiment may be omitted. Moreover, in some instances, some features of the present disclosure may be employed without a corresponding use of the other features. Moreover, it is understood that one or more of the above-described embodiments and/or variations may be combined in whole or in part with any one or more of the other above-described embodiments and/or variations.

Although exemplary embodiments of this disclosure have been described in detail above, those skilled in the art will readily appreciate that many other modifications, changes and/or substitutions are possible in the exemplary embodiments without materially departing from the novel teachings and advantages of this disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method, comprising:

detecting motion within a first room;

detecting a lighting level within a second room; and adjusting an extent to which a lamp within a third room is energized in response to the detected motion and based on the detected lighting level.

2. The method of claim 1, wherein the detected lighting level comprises an ambient daylight level.

3. The method of claim 1, wherein the first, second and third zones are each physically separated from each other.

4. The method of claim 1, wherein the motion is detected with a motion sensor.

5. The method of claim 1, wherein the lighting level is detected with a photo sensor.

6. The method of claim 1, further comprising the step of wireless communicating the detected motion to a wireless network.

7. The method of claim 6, wherein the network comprises a local area network.

8. The method of claim 1 further comprising the step of wireless communicating the detected lighting level to a wireless network.

9. The method of claim 8 further comprising the step of wirelessly receiving the communication of the detected lighting level at the lamp.

10. An apparatus, comprising:

means for detecting motion within a first room;

means for detecting a lighting level within a second room; and means for adjusting an extent to which a lamp within a third room is energized in response to motion detected in the first room and based on a detected lighting level in the second room.

11. The apparatus of claim 10, wherein the detected lighting level comprises an ambient daylight level.

12. The apparatus of claim 10, wherein the first, second and third zones are each physically separated from each other.

13. The apparatus of claim 10, wherein the means for detection motion comprises a motion detector.

14. The apparatus of claim 10, wherein the means for detecting lighting level comprises a photo sensor.

15. The apparatus of claim 10, further comprising means for wirelessly communicating a signal from the means for detecting motion to a wireless network.

16. An apparatus, comprising a motion sensor configured to detect motion within a first room;

a photo sensor configured to detect a lighting level within a second room; and a processor configured to control an extent to which a lamp within a third room is energized in response to motion detected in the first room and based on the lighting level detected in the second room.

17. The apparatus of claim 16, wherein the detected lighting level comprises an ambient daylight level.

18. The apparatus of claim 16, wherein the first, second and third zones are each physically separated from each other.

19. The apparatus of claim 10, further comprising means for wireless communicating a signal from the means for detecting lighting level to a wireless network.

20. The apparatus of claim 16, further comprising a wireless device communicably coupled the processor and configured to receive wireless communication from at least one of the motion sensor and the photo sensor.

* * * * *

UNITED STATES PATENT AND TRADEMARK OFFICE

CERTIFICATE OF CORRECTION

PATENT NO. : 7,924,174 B1
APPLICATION NO. : 11/420561
DATED : April 12, 2011
INVENTOR(S) : Ranjit Gananathan It is certified that error appears in the above-identified patent and that said Letters Patent is hereby corrected as shown below:

Column 114, line 58, "third zones are each physically separated from each other." should be changed to -- third rooms are each physically separated from each other. --.

Column 114, line 64, "wireless communicating the detected motion to a wireless" should be changed to -- wirelessly communicating the detected motion to a wireless --.

Column 115, line 2, "wireless communicating the detected lighting level to a wire-" should be changed to -- wirelessly communicating the detected lighting level to a wire- --.

Column 115, line 19, "third zones are each physically separated from each other." should be changed to -- third rooms are each physically separated from each other. --.

Column 115, line 21, "detection motion comprises a motion detector." should be changed to -- detecting motion comprises a motion detector. --.

Column 116, line 15, "third zones are each physically separated from each other." should be changed to -- third rooms are each physically separated from each other. --.

Column 116, line 17, "for wireless communicating a signal from the means for" should be changed to -- for wirelessly communicating a signal from the means for --.

Signed and Sealed this
Twenty-sixth Day of July, 2011

David J. Kappos
*Director of the United States Patent and Trademark Office*